United States Patent [19]
Gates

[11] Patent Number: 5,748,806
[45] Date of Patent: May 5, 1998

[54] DESKEW CIRCUIT IN A HOST INTERFACE CIRCUIT

[75] Inventor: Stillman F. Gates, Los Gatos, Calif.

[73] Assignee: Adaptec, Inc., Milpitas, Calif.

[21] Appl. No.: 486,084

[22] Filed: Jun. 7, 1995

Related U.S. Application Data

[62] Division of Ser. No. 964,532, Oct. 15, 1992.
[51] Int. Cl.⁶ .............................. G06F 13/14; G06F 13/40
[52] U.S. Cl. ............................................ 395/306; 395/309
[58] Field of Search ...................................... 395/309, 306

[56] References Cited

U.S. PATENT DOCUMENTS

| | | | |
|---|---|---|---|
| 4,994,963 | 2/1991 | Rorden et al. | 395/309 |
| 5,204,951 | 4/1993 | Keener et al. | |
| 5,239,632 | 8/1993 | Larner. | |
| 5,257,391 | 10/1993 | DuLac et al. | |
| 5,265,252 | 11/1993 | Rawson, III et al. | |
| 5,293,624 | 3/1994 | Andrade et al. | |
| 5,297,067 | 3/1994 | Blackborow et al. | |
| 5,307,459 | 4/1994 | Petersen et al. | 395/200 |
| 5,319,752 | 6/1994 | Petersen et al. | 395/250 |
| 5,319,766 | 6/1994 | Thaller et al. | |
| 5,333,277 | 7/1994 | Searls. | |
| 5,355,453 | 10/1994 | Row et al. | |
| 5,359,717 | 10/1994 | Bowles et al. | 395/325 |
| 5,469,555 | 11/1995 | Ghosh et al. | 395/460 |

Primary Examiner—Krisna Lim
Attorney, Agent, or Firm—Skjerven, Morrill, MacPherson, Franklin & Friel; Forrest E. Gunnison

[57] ABSTRACT

The host adapter integrated circuit is a one chip high performance bus master host adapter for (i) connecting a first bus having a specified protocol for transferring information over the first bus and a first data transfer speed to a second bus having a specified protocol for transferring information over the second bus and a second data transfer speed, and (ii) transferring information between the two buses. The host adapter integrated circuit, hereinafter host adapter, includes a novel reduced instruction set computing (RISC) processor, a first interface module circuit connectable to the first bus and coupled to the RISC processor, a second interface module circuit connectable to the second bus and coupled to the RISC processor, and a memory circuit means connected to the first interface module circuit and to the second interface module circuit and coupled to the RISC processor. An I/O bus interconnects the first interface module circuit, the second interface module circuit, the memory circuit means, and the RISC processor. The I/O bus supports a read and a write operation by the RISC processor in single clock cycle of the RISC processor. The host adapter supports many features found in traditional add-in card SCSI host adapters. These features include bus master transfers, fast/wide SCSI, one interrupt per command, scatter/gather, overlapped seeks, tagged queuing, etc.

1 Claim, 94 Drawing Sheets

FIG. 12A

| OF40 SEQCTL | | OF41 SEQRAM | | OF42 SEQADDR0 | | OF43 SEQADDR1 | | OF44 ACCUM | | OF45 SINDEX | |
|---|---|---|---|---|---|---|---|---|---|---|---|
| R/W | | R/W | | R/W | | R/W | | R/W | | R/W | |
| 7 | PERRORDIS | 7 | SEQRAM(7) | 7 | SEQADDR0(07) | 7 | UNUSED | 7 | ACCUM(7) | 7 | SINDEX(7) |
| 6 | PAUSEDIS | 6 | SEQRAM(6) | 6 | SEQADDR0(06) | 6 | UNUSED | 6 | ACCUM(6) | 6 | SINDEX(6) |
| 5 | FAILDIS | 5 | SEQRAM(5) | 5 | SEQADDR0(05) | 5 | UNUSED | 5 | ACCUM(5) | 5 | SINDEX(5) |
| 4 | FASTMODE | 4 | SEQRAM(4) | 4 | SEQADDR0(04) | 4 | UNUSED | 4 | ACCUM(4) | 4 | SINDEX(4) |
| 3 | BRKADRINTEN | 3 | SEQRAM(3) | 3 | SEQADDR0(03) | 3 | UNUSED | 3 | ACCUM(3) | 3 | SINDEX(3) |
| 2 | STEP | 2 | SEQRAM(2) | 2 | SEQADDR0(02) | 2 | UNUSED | 2 | ACCUM(2) | 2 | SINDEX(2) |
| 1 | SEQRESET | 1 | SEQRAM(1) | 1 | SEQADDR0(01) | 1 | UNUSED | 1 | ACCUM(1) | 1 | SINDEX(1) |
| 0 | LOADRAM | 0 | SEQRAM(0) | 0 | SEQADDR0(00) | 0 | SEQADDR0(08) | 0 | ACCUM(0) | 0 | SINDEX(0) |

FIG. 12B

| OF46 DINDEX | | OF47 BRKADDR0 | | OF48 BRKADDR1 | | OF49 ALLONES | | OF4A ALLZEROS | | OF4A NONE | |
|---|---|---|---|---|---|---|---|---|---|---|---|
| R/W | | R/W | | R/W | | R | | R | | W | |
| 7 | DINDEX(7) | 7 | BRKADDR(07) | 7 | BRKDIS | 7 | "1" | 7 | "0" | | 7 |
| 6 | DINDEX(6) | 6 | BRKADDR(06) | 6 | UNUSED | 6 | "1" | 6 | "0" | | 6 |
| 5 | DINDEX(5) | 5 | BRKADDR(05) | 5 | UNUSED | 5 | "1" | 5 | "0" | | 5 |
| 4 | DINDEX(4) | 4 | BRKADDR(04) | 4 | UNUSED | 4 | "1" | 4 | "0" | | 4 |
| 3 | DINDEX(3) | 3 | BRKADDR(03) | 3 | UNUSED | 3 | "1" | 3 | "0" | | 3 |
| 2 | DINDEX(2) | 2 | BRKADDR(02) | 2 | UNUSED | 2 | "1" | 2 | "0" | | 2 |
| 1 | DINDEX(1) | 1 | BRKADDR(01) | 1 | UNUSED | 1 | "1" | 1 | "0" | | 1 |
| 0 | DINDEX(0) | 0 | BRKADDR(00) | 0 | BRKADDR(08) | 0 | "1" | 0 | "0" | | 0 |

FIG. 12C

| OF4B FLAGS | | OF4C SINDIR | OF4D DINDIR | OF4E FUNCTION1 | | OF4E FUNCTION1 | | OF4F STACK | |
|---|---|---|---|---|---|---|---|---|---|
| R | | R | W | W | | R | | R | |
| 7 | UNUSED | CONTENTS POINTED TO BY SINDEX | CONTENTS POINTED TO BY DINDEX | 7 | RSVD | 1 OF 8 DECODED VALUE OF FUN1DAT2-0 | | 7 | STACK(7) |
| 6 | UNUSED | | | 6 | FUN1DAT(2) | | | 6 | STACK(6) |
| 5 | UNUSED | | | 5 | FUN1DAT(1) | | | 5 | STACK(5) |
| 4 | UNUSED | | | 4 | FUN1DAT(0) | | | 4 | STACK(4) |
| 3 | UNUSED | | | 3 | | | | 3 | STACK(3) |
| 2 | UNUSED | | | 2 | | | | 2 | STACK(2) |
| 1 | ZERO | | | 1 | | | | 1 | STACK(1) |
| 0 | CARRY | | | 0 | | | | 0 | STACK(0) |

FIG. 32A

| 90 BID0 | | 81 BID1 | | 82 BID2 | | 83 BID3 | | 84 BCTL | | 85 BUSTIME | |
|---|---|---|---|---|---|---|---|---|---|---|---|
| R | (a) | R | (a) | R | (a) | R | (a) | R/W | (a) | R/W | (b) |
| 7 RSVD=0 | | 7 BID1=1 | | 7 BID2=0 | | 7 BID3=0 | | 7 RSVD | | 7 BOFF3 | |
| 6 BID0=0 | | 6 BID1=0 | | 6 BID2=1 | | 6 BID3=1 | | 6 RSVD | | 6 BOFF2 | |
| 5 BID0=0 | | 5 BID1=0 | | 5 BID2=1 | | 5 BID3=1 | | 5 RSVD | | 5 BOFF1 | |
| 4 BID0=0 | | 4 BID1=1 | | 4 BID2=1 | | 4 BID3=1 | | 4 RSVD | | 4 BOFF0 | |
| 3 BID0=0 | | 3 BID1=0 | | 3 BID2=0 | | 3 BID3=0 | | 3 ACE | | 3 BON3 | |
| 2 BID0=1 | | 2 BID1=0 | | 2 BID2=1 | | 2 BID3=0 | | 2 RSVD | | 2 BON2 | |
| 1 BID0=0 | | 1 BID1=0 | | 1 BID2=1 | | 1 BID3=0 | | 1 RSVD | | 1 BON1 | |
| 0 BID0=0 | | 0 BID1=0 | | 0 BID2=1 | | 0 BID3=0 | | 0 ENABLE | | 0 BON0 | |

FIG. 32B

| 86 BUSSPD | | 87 HCNTRL | | 88 HADDR0 | | 89 HADDR1 | | 8A HADDR2 | | 8B HADDR3 | |
|---|---|---|---|---|---|---|---|---|---|---|---|
| R/W | (b) | R/W | (a) | R/W | (b) | R/W | (b) | R/W | (b) | R/W | (b) |
| 7 DFTHRSH1 | | 7 RSVD | | 7 HADDR07 | | 7 HADDR15 | | 7 HADDR23 | | 7 HADDR31 | |
| 6 DFTHRSH0 | | 6 POWRDN | | 6 HADDR06 | | 6 HADDR14 | | 6 HADDR22 | | 6 HADDR30 | |
| 5 STBOFF2 | | 5 RSVD | | 5 HADDR05 | | 5 HADDR13 | | 5 HADDR21 | | 5 HADDR29 | |
| 4 STBOFF1 | | 4 SWINT | | 4 HADDR04 | | 4 HADDR12 | | 4 HADDR20 | | 4 HADDR28 | |
| 3 STBOFF0 | | 3 IRQMS | | 3 HADDR03 | | 3 HADDR11 | | 3 HADDR19 | | 3 HADDR27 | |
| 2 STBON2 | | 2 PAUSE[ACK] | | 2 HADDR02 | | 2 HADDR10 | | 2 HADDR18 | | 2 HADDR26 | |
| 1 STBON1 | | 1 INTEN | | 1 HADDR01 | | 1 HADDR09 | | 1 HADDR17 | | 1 HADDR25 | |
| 0 STBON0 | | 0 CHIPRST[ACK] | | 0 HADDR00 | | 0 HADDR08 | | 0 HADDR16 | | 0 HADDR24 | | a (register is assigned to the HIOBUS)
b (register is assigned to the CIOBUS)
c (register is not physically located in HIC, but listed here for convenience.)
d (Also used to load starting byte offsets to doubleword boundary and to flag new DMA start in ISAM.)

FIG. 32C

| 8C HCNT0 | | 8D HCNT1 | | 8E HCNT2 | | 8F RSVD | | 90 SCBPTR | | 91 INTSTAT | |
|---|---|---|---|---|---|---|---|---|---|---|---|
| R/W | (b) | R/W | (b) | R/W | (b) | R/W | (b) | R/W | (bc) | R (a) /W | (b) |
| 7 HCNT07 | | 7 HCNT15 | | 7 HCNT23 | | 7 RSVD | | 7 RSVD | | 7 INTCODE3 | |
| 6 HCNT06 | | 6 HCNT14 | | 6 HCNT22 | | 6 RSVD | | 6 RSVD | | 6 INTCODE2 | |
| 5 HCNT05 | | 5 HCNT13 | | 5 HCNT21 | | 5 RSVD | | 5 RSVD | | 5 INTCODE(1) | |
| 4 HCNT04 | | 4 HCNT12 | | 4 HCNT20 | | 4 RSVD | | 4 RSVD | | 4 INTCODE(0) | |
| 3 HCNT03 | | 3 HCNT11 | | 3 HCNT19 | | 3 RSVD | | 3 RSVD | | 3 BRKINT | |
| 2 HCNT02 | | 2 HCNT10 | | 2 HCNT18 | | 2 RSVD | | 2 SCBVAL2 | | 2 SCSIINT | |
| 1 HCNT01 | | 1 HCNT09 | | 1 HCNT17 | | 1 RSVD | | 1 SCBVAL1 | | 1 CMDCMPLT | |
| 0 HCNT00 | | 0 HCNT08 | | 0 HCNT16 | | 0 RSVD | | 0 SCBVAL0 | | 0 SEQINT | |

FIG. 32D

| 92 CLRINT | | 92 ERROR | | 93 DFCNTRL | | 94 DFSTATUS | | 95 DFWADDR0 | | 96 RSVD | |
|---|---|---|---|---|---|---|---|---|---|---|---|
| W | (a) | R | (a) | R/W | (b) | R | (b) | R/W | (bc) | R/W | (bc) |
| 7 RSVD | | 7 RSVD | | 7 RSVD | | 7 RSVD | | 7 TESTLOCK | | 7 RSVD | |
| 6 RSVD | | 6 RSVD | | 6 WIDEODD | | 6 RSVD | | 6 DFWADDR06 | | 6 RSVD | |
| 5 RSVD | | 5 RSVD | | 5 SCSIEN [ACK] | | 5 FIFOWDEMP | | 5 DFWADDR05 | | 5 RSVD | |
| 4 RSVD | | 4 RSVD | | 4 SDMAEN [ACK] | | 4 MREQPEND | | 4 DFWADDR04 | | 4 RSVD | |
| 3 CLRBRKINT | | 3 PARERR | | 3 HDMAEN [ACK] | | 3 HDONE | | 3 DFWADDR03 | | 3 RSVD | |
| 2 RSVD | | 2 ILLOPCODE | | 2 DIRECTION[ACK] | | 2 DFTHRSH | | 2 DFWADDR02 | | 2 RSVD | |
| 1 CLRCMDINT | | 1 ILLSADDR | | 1 FIFOFLUSH | | 1 FIFOFULL | | 1 DFWADDR01 | | 1 RSVD | |
| 0 CLRSEQINT | | 0 ILLHADDR | | 0 FIFORESET(cd) | | 0 FIFOEMP | | 0 DFWADDR00 | | 0 RSVD | | a (register is assigned to the HIOBUS)
b (register is assigned to the CIOBUS)
c (register is not physically located in HIC, but listed here for convenience.)
d (Also used to load starting byte offsets to doubleword boundary and to flag new DMA start in ISAM.)

| 97 FRADDR0 | | 98 RSVD | | 99 DFDAT | | 9A SCBCNT | | 9B QINFIFO | | 9C QINCNT | |
|---|---|---|---|---|---|---|---|---|---|---|---|
| R/W (bc) | | R/W (bc) | | R/W (bc) | | R/W (bc) | | R/W (b) | | R | |
| 7 | DFSDH | 7 | RSVD | 7 | FDAT7 | 7 | SCBAUTO | 7 | RSVD | 7 | RSVD |
| 6 | DFRADDR06 | 6 | RSVD | 6 | FDAT6 | 6 | RSVD | 6 | RSVD | 6 | RSVD |
| 5 | DFRADDR05 | 5 | RSVD | 5 | FDAT5 | 5 | RSVD | 5 | RSVD | 5 | RSVD |
| 4 | DFRADDR04 | 4 | RSVD | 4 | FDAT4 | 4 | SCBCNT4 | 4 | RSVD | 4 | RSVD |
| 3 | DFRADDR03 | 3 | RSVD | 3 | FDAT3 | 3 | SCBCNT3 | 3 | RSVD | 3 | RSVD |
| 2 | DFRADDR02 | 2 | RSVD | 2 | FDAT2 | 2 | SCBCNT2 | 2 | RSVD | 2 | QINCNT1 |
| 1 | DFRADDR01 | 1 | RSVD | 1 | FDAT1 | 1 | SCBCNT1 | 1 | QIN1 | 1 | QINCNT1 |
| 0 | DFRADDR00 | 0 | RSVD | 0 | FDAT0 | 0 | SCBCNT0 | 0 | QIN0 | 0 | QINCNT0 |

FIG. 32E

| 9D QOUTFIFO | | 9E QOUTCNT | | 9F TESTCHIP | |
|---|---|---|---|---|---|
| R (a) /W (b) | | R (a) | | R/W (b) | |
| 7 | RSVD | 7 | RSVD | 7 | TESTSEL2 |
| 6 | RSVD | 6 | RSVD | 6 | TESTSEL1 |
| 5 | RSVD | 5 | RSVD | 5 | TESTSEL0 |
| 4 | RSVD | 4 | RSVD | 4 | TESTRAM |
| 3 | RSVD | 3 | RSVD | 3 | TESTHOST |
| 2 | RSVD | 2 | QOUTCNT2 | 2 | TESTSEQ |
| 1 | QOUT1 | 1 | QOUTCNT1 | 1 | TESTFIFO |
| 0 | QOUT0 | 0 | QOUTCNT0 | 0 | TESTSCSI |

FIG. 32F a (register is assigned to the HIOBUS)
b (register is assigned to the CIOBUS)
c (register is not physically located in HIC, but listed here for convenience.)
d (Also used to load starting byte offsets to doubleword boundary and to flag new DMA start in ISAM.)

| Timing Parameters Description | | Time (ns) | |
|---|---|---|---|
| | | min | max |
| t1 | BCLK Period | 120 | |
| t2 | MREQ* hold from BCLK falling | 2 | 33 |
| t3 | MACK* setup to BCLK falling | 10 | |
| t4 | MACK* hold from BCLK falling | 25 | |
| n1 | First START | | |
| n2 | Last START | | |

| | Timing Parameters Description | Time (ns) min | max |
|---|---|---|---|
| t1 | BCLK Period | 120 | |
| t2 | MREQ* hold from BCLK falling | 2 | 33 |
| t3 | MACK* setup to BCLK falling | 10 | |
| t4 | MACK* hold from BCLK falling | 25 | |
| n1 | First START | | |

| | Timing Parameters Description | Time (ns) min | max |
|---|---|---|---|
| t1 | MASTER16* assert delay from BCLK rising | 2 | 50 |
| t2 | MASTER16* float delay from BCLK rising | 2 | 40 |
| t3 | LA, M-IO setup to START* | 10 | |
| t4 | LA, BE* delay from BCLK falling | 2 | 45 |
| t5 | BE*, W-R delay from BCLK rising | | 25 |
| t6 | START* delay from BCLK rising | 2 | 25 |
| t7 | CMD* delay from BCLK rising | 2 | 25 |
| t8 | EX16*, EX32* setup to BCLK rising | 25 | |
| t9 | EX16*, EX32* hold from BCLK rising | 55 | |
| t10 | MSBURST* delay from BCLK falling | 2 | 35 |
| t11 | SLBURST* setup to BCLK rising | 15 | |
| t12 | SLBURST* hold from BCLK rising | 25 | |
| t13 | Read Data setup to BCLK rising | 15 | |
| t14 | Read Data hold from BCLK rising | 5 | |
| t15 | Write Data delay from BCLK falling | 2 | 40 |
| t16 | Write Data delay from BCLK rising | 5 | 40 |
| t17 | Write Data hold from BCLK rising | 5 | |

FIG. 35D

| | Timing Parameters Description | Time (ns) min | max |
|---|---|---|---|
| t1 | MASTER16* assert delay from BCLK rising | 2 | 50 |
| t2 | MASTER16* float delay from BCLK rising | 2 | 40 |
| t3 | LA, M-IO setup to START* | 10 | |
| t4 | LA, M-IO float delay from BCLK falling | 2 | 50 |
| t5 | BE*, W-R delay from BCLK rising | | 25 |
| t6 | START* delay from BCLK rising | 2 | 25 |
| t7 | CMD* delay from BCLK rising | 2 | 25 |
| t8 | EX16*, EX32* setup to BCLK rising | 25 | |
| t9 | EX16*, EX32* hold from BCLK rising | 55 | |
| t10 | EXRDY setup to BCLK falling | 15 | |
| t11 | Read Data setup to BCLK rising | 15 | |
| t12 | Read Data hold from BCLK rising | 4 | |
| t13 | Write Data delay from BCLK falling | 2 | 40 |
| t14 | Write Data float delay from BCLK falling | 2 | 50 |

FIG. 36B

| | Timing Parameters Description | Time (ns) min | max |
|---|---|---|---|
| t1 | MASTER16* assert delay from BCLK rising | 2 | 50 |
| t2 | MASTER16* float delay from BCLK rising | 2 | 40 |
| t3 | LA, M-IO setup to START* | 10 | |
| t4 | LA, BE* delay from BCLK falling | 2 | 45 |
| t5 | BE*, W-R delay from BCLK rising | | 25 |
| t6 | BE, START, WRITE DATA, Float delay from BCLK falling | 2 | 50 |
| t7 | BE*, W-R delay from BCLK falling | 2 | 85 |
| t8 | START* delay from BCLK rising | 2 | 25 |
| t9 | CMD* delay from BCLK rising | 2 | 25 |
| t10 | EX16* setup to BCLK rising | 25 | |
| t11 | EX16* hold from BCLK rising | 55 | |
| t12 | EX32* setup to BCLK rising | 15 | |
| t13 | EX32* hold from BCLK rising | 50 | |
| t14 | Read Data setup to BCLK rising | 15 | |
| t15 | Read Data hold from BCLK rising | 4 | |
| t16 | Write Data delay from BCLK falling | 2 | 40 |
| t17 | Write Data hold from BCLK rising | 30 | |

FIG. 37B

| | Timing Parameters Description | Time (ns) | | |
|---|---|---|---|---|
| | | min | typ | max |
| t1 | LA, M-IO setup to START* negated | 120 | | |
| t2 | LA, M-IO hold from START* negated | 15 | | |
| t3 | BE(3:0), W-R setup to START* negated | 80 | | |
| t4 | BE(3:0), W-R hold from START* negated | 15 | | |
| t5 | AENX setup to START negated | 95 | | |
| t6 | AENX hold from START negated | 25 | | |
| t7 | NOWS* setup to BCLK rising edge | 15 | | |
| t8 | NOWS* hold from BCLK rising edge | 5 | | |
| t9 | DATA setup to CMD* negated | 100 | | |
| t10 | DATA hold from CMD* negated | 25 | | |

| | Timing Parameters Description | Time (ns) | | |
|---|---|---|---|---|
| | | min | typ | max |
| t1 | LA, M-IO setup to START* negated | 120 | | |
| t2 | LA, M-IO hold from START* negated | 15 | | |
| t3 | BE(3:0), W-R setup to START* negated | 80 | | |
| t4 | BE(3:0), W-R hold from START* negated | 15 | | |
| t5 | AENX setup to START negated | 95 | | |
| t6 | AENX hold from START negated | 25 | | |
| t7 | NOWS* setup to BCLK rising edge | 15 | | |
| t8 | NOWS* hold from BCLK rising edge | 5 | | |
| t9 | DATA setup to BCLK rising edge | 100 | | |
| t10 | DATA hold from BCLK rising edge | 25 | | |

| | Timing Parameters Description | Time (ns) min max |
|---|---|---|
| t1 | Delay to DREQ active from BCLK rising | |
| t2 | Delay to Master16* active from DACK* | |
| t3 | Delay to driving bus from BCLK rising | |
| t4 | Delay to releasing bus from BCLK rising | |
| n1 | One BCLK min from MASTER16* active | |

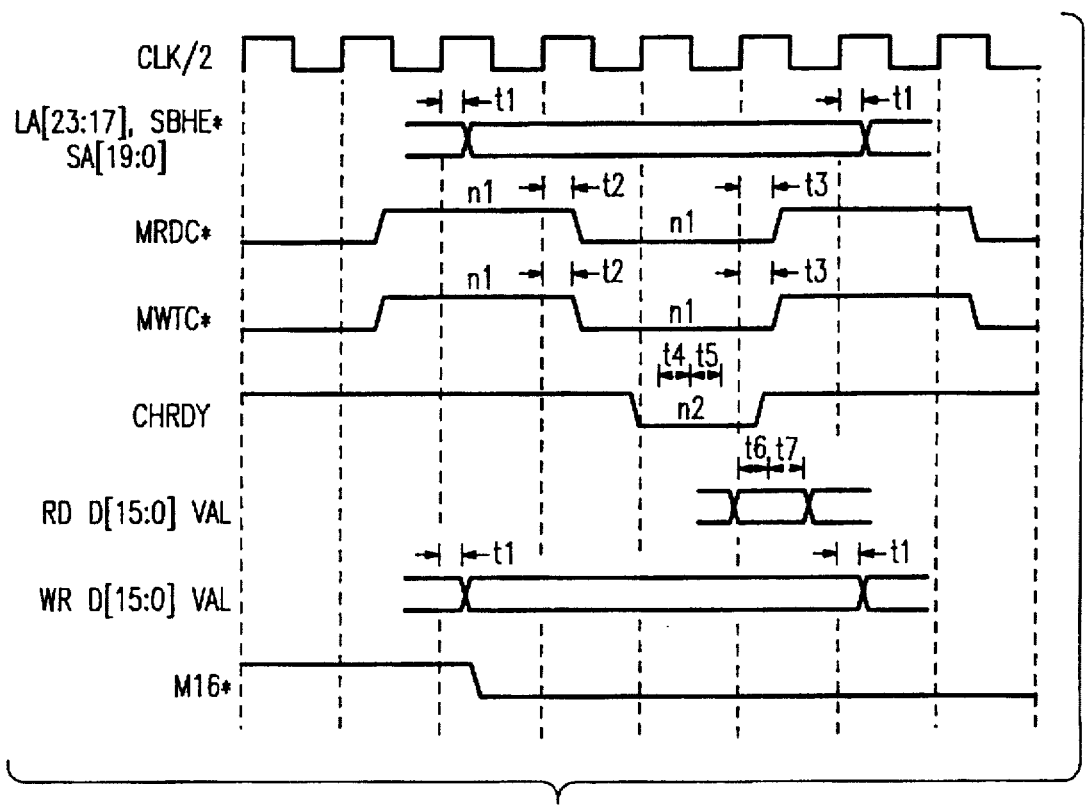

FIG. 42A

| | Timing Parameters Description | Time (ns) | |
|---|---|---|---|
| | | min | max |
| t1 | LA, SA, SBHE*, WRITE Data delay from CLK/2 rising | | |
| t2 | MRDC*, MWTC* asserted from CLK/2 rising | | |
| t3 | MRDC*, MWTC* deasserted from CLK/2 rising | | |
| t4 | CHRDY setup to CLK/2 falling | | |
| t5 | CHRDY hold from CLK/2 falling | | |
| t6 | Read Data setup to MRDC* deasserted | | |
| t7 | Read Data hold from MRDC* deasserted | | |
| n1 | The deassertion and assertion times are given by the number of clock cycles programmed in BUSSPD. | | |
| n2 | CHRDY is sampled on the last falling edge before the deassertion of MRDC* or MWTC* | | |

FIG. 42B

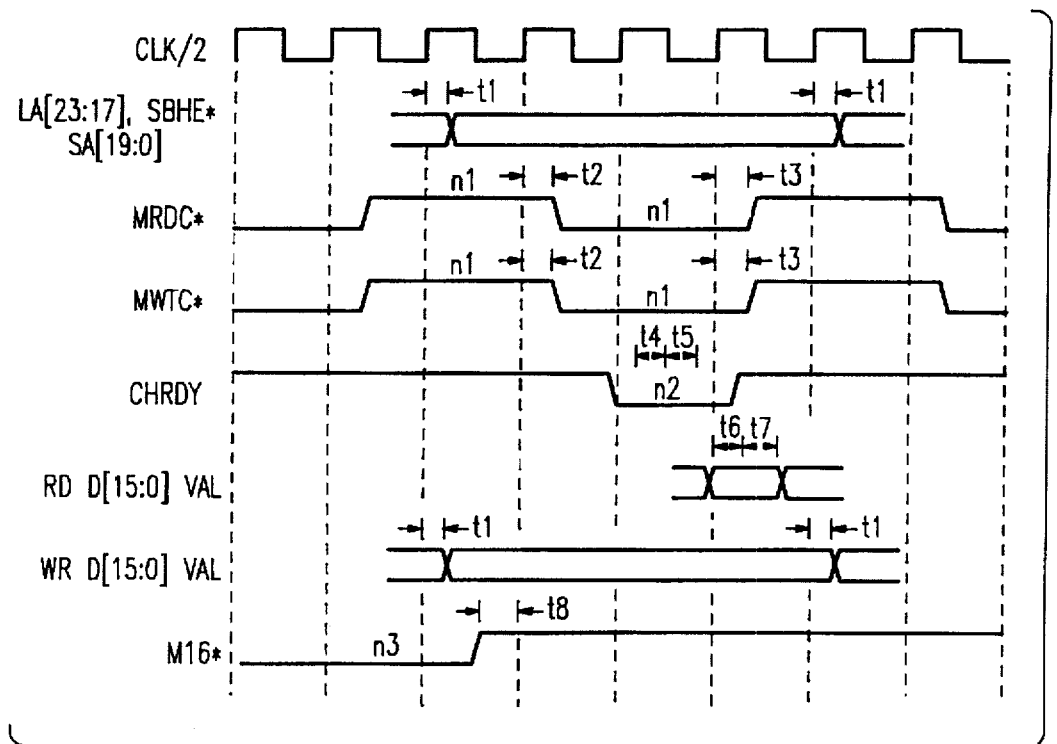

FIG. 43A

| | Timing Parameters Description | Time (ns) min max |
|---|---|---|
| t1 | LA, SA, SBHE*, WRITE Data delay from CLK/2 rising | |
| t2 | MRDC*, MWTC* asserted from CLK/2 rising | |
| t3 | MRDC*, MWTC* deasserted from CLK/2 rising | |
| t4 | CHRDY setup to CLK/2 falling | |
| t5 | CHRDY hold from CLK/2 falling | |
| t6 | Read Data setup to MRDC* deasserted | |
| t7 | Read Data hold from MRDC* deasserted | |
| t8 | M16* setup to CLK/2 before MRDC*, MWTC* | |
| n1 | The deassertion and assertion times are given by the number of clock cycles programmed in BUSSPD. | |
| n2 | CHRDY is sampled on the last falling edge before the deassertion of MRDC* or MWTC* | |
| n3 | M16* is sampled when A0000<addr<BFFFF | |

FIG. 43B

| | Timing Parameters Description | Time (ns) min | max |
|---|---|---|---|
| t1 | SA(15:0) setup to IOWC* active | 88 | |
| t2 | SA(15:0) hold from IOWC* negated | 32 | |
| t3 | AEN setup to IOWC* active | 100 | |
| t4 | NOWS* active delay from IOWC* active | | |
| t5 | NOWS* release delay from IOWC* negated | | |
| t6 | Data setup to IOWC* negated | 22 | |
| t7 | Data hold from IOWC* negated | 25 | |
| t8 | Data delay from IORC* active | 25 | |
| t9 | Data hold from IORC* negated | 25 | |

DATA TRANSFER SCSI BUS TO SYSTEM MEMORY

| (a) SCSI BUS | (b) ODD BYT | (c) SLAT 10 | (d) SDFDAT 10 | (e) WORD OFFSET (WOS) | (f) DFDAT 3210 | (g) HDFDAT 3210 | (h) MLAT 3210 | (i) BE 3210 | (j) HAD 10 | (k) DO 3210 | |
|---|---|---|---|---|---|---|---|---|---|---|---|
| 1 | 0 | D1 |    | 0 |      |      |      |      | 00 |      | ⎫ |
| 2 |   | 21 | 21 |   | DD21 |      |      |      |    |      |   |
| 3 |   | 23 |    |   |      |      |      |      |    |      |   |
| 4 |   | 43 | 43 | 1 | 4321 | 4321 | 4321 | 0000 |    | 4321 | ⎬ no byte offset |
| 5 |   | 45 |    |   |      |      |      |      |    |      |   |
| 6 |   | 65 | 65 | 0 | DD65 |      |      |      |    |      |   |
| 7 |   | 67 |    |   |      |      |      |      |    |      |   |
| 8 |   | 87 | 87 | 1 | 8765 | 8765 | 8765 | 0000 |    | 8765 | ⎭ |
| 1 | 1 | 1D | 1D | 0 | DD1D |      |      |      | 01 |      | ⎫ |
| 2 |   | 12 |    |   | DD1D |      |      |      |    |      |   |
| 3 |   | 32 | 32 | 1 | 321D | 321D | 321D | 0001 |    | 321– | ⎬ 1 byte offset |
| 4 |   | 34 |    |   |      |      |      |      |    |      |   |
| 5 |   | 54 | 54 | 0 | DD54 |      |      |      |    |      |   |
| 6 |   | 56 |    |   |      |      |      |      |    |      |   |
| 7 |   | 76 |    |   | 7654 | 7654 | 7654 | 0000 | 00 | 7654 | ⎭ |
| 1 | 0 | D1 |    | 1 |      |      |      |      | 10 |      | ⎫ |
| 2 |   | 21 | 21 |   | 21DD | 21DD | 21DD | 0011 |    | 21-- |   |
| 3 |   | 23 |    |   |      |      |      |      |    |      |   |
| 4 |   | 43 | 43 | 0 | DD43 |      |      |      |    |      | ⎬ 2 byte offset |
| 5 |   | 45 |    |   |      |      |      |      |    |      |   |
| 6 |   | 65 | 65 | 1 | 6543 | 6543 | 6543 | 0000 | 00 | 6543 | ⎭ |
| 1 | 1 | 1D | 1D | 1 | 1DDD | 1DDD | 1DDD | 0111 | 11 | 1--- | ⎫ |
| 2 |   | 12 |    |   |      |      |      |      |    |      |   |
| 3 |   | 32 | 32 | 0 | DD32 |      |      |      |    |      | ⎬ 3 byte offset |
| 4 |   | 34 |    |   |      |      |      |      |    |      |   |
| 5 |   | 54 | 54 | 1 | 5432 | 5432 | 5432 | 0000 | 00 | 5432 | ⎭ | a) SCSI Bus In SCDBI [7:0]–
b) ODDBYTE (CONTROL BIT)
c) SCSI (Pack/Unpack 2Byte Latch)
d) SCSI (16-bit Data PATH)
e) WORD OFFSET (CONTROL BIT)
f) DATA FIFO DATA RAM (32 BIT)
g) HOST (32-bit DATA PATH)
h) HOST (MDLAT INPUT Register)
i) HOST (BEO [3:0]
j) HOST HADDR [01:00]
k) HOST DO [31:0] (Bytes)

D = Dummy Byte

FIG. 45C

DATA TRANSFER SYSTEM MEMORY TO SCSI BUS

| (j) HODD 10 | (i) BE DI 3210 | (1) LANE 3210 | (h) MLAT 3210 | (g) HDFDAT 3210 | (f) DFDAT 3210 | (e) WRS | (d) SDFDAT 10 | (c) SLAT 10 | (b) ODD BYT | (m) SCSC BUS (8BIT) | |
|---|---|---|---|---|---|---|---|---|---|---|---|
| 00 | 0000 | 4321 | 4321 | 4321 | 4321 | 0 | 21 | 21 | 0 | 1 | |
|    |      |      |      |      |      | 1 | 34 | 43 |   | 2 | |
|    |      |      |      |      |      |   |    |    |   | 3 | |
|    |      |      |      |      |      |   |    |    |   | 4 | no byte offset |
| 00 | 0000 | 8765 | 8765 | 8765 | 8765 | 0 | 65 | 65 |   | 5 | |
|    |      |      |      |      |      |   |    |    |   | 6 | |
|    |      |      |      |      |      | 1 | 87 | 87 |   | 7 | |
|    |      |      |      |      |      |   |    |    |   | 8 | |
| 01 | 0001 | 321- | 321D | 321D | 321D | 0 | 1D | 1D | 1 | 1 | |
|    |      |      |      |      |      | 1 | 32 | 32 |   | 2 | |
|    |      |      |      |      |      |   |    |    |   | 3 | |
| 00 | 0000 | 7654 | 7654 | 7654 | 7654 | 0 | 54 | 54 |   | 4 | 1 byte offset |
|    |      |      |      |      |      |   |    |    |   | 5 | |
|    |      |      |      |      |      | 1 | 76 | 76 |   | 6 | |
|    |      |      |      |      |      |   |    |    |   | 7 | |
| 10 | 0011 | 21-- | 21DD | 21DD | 21DD | 1 | 21 | 21 | 0 | 1 | |
|    |      |      |      |      |      |   |    |    |   | 2 | |
| 00 | 0000 | 6543 | 6543 | 6543 | 6543 | 0 | 43 | 43 |   | 3 | 2 byte offset |
|    |      |      |      |      |      |   |    |    |   | 4 | |
|    |      |      |      |      |      | 1 | 65 | 65 |   | 5 | |
|    |      |      |      |      |      |   |    |    |   | 6 | |
| 11 | 0111 | 1--- | 1DDD | 1DDD | 1DDD | 1 | 1D | 1D | 1 | 1 | |
| 00 | 0000 | 5432 | 5432 | 5432 | 5432 | 0 | 32 | 32 |   | 2 | |
|    |      |      |      |      |      |   |    |    |   | 3 | 3 byte offset |
|    |      |      |      |      |      | 1 | 54 | 54 |   | 4 | |
|    |      |      |      |      |      |   |    |    |   | 5 | |

D = Dummy Byte

BE Value = decode from HADD 1:0 when HCNT > 3  (leading offset)
           decode from HCNT 1:0 when HCNT = 1-3  (Dividing offset)

(a) to (k) — See FIG. 45C

1 = HOST (DI [31:06]) (Data Bytes)
m = SCSI BUS OUT (SCDBO [7:0])

FIG. 45D

SCSI Registers

FIG. 49A

| SCSIEQ | SXFRCTL0 | SXFRCTL1 | SCSISIGO | SCSISIGI | SCSIRATE |
|---|---|---|---|---|---|
| R/W I-0340 C-00 | R/W I-0341 C-01 | R/W I-0342 C-02 | W I-0343 C-03 | R I-0343 C-03 | W I-0344 C-04 |
| 7 TEMODEO | 7 | 7 BITBUCKET | 7 CDO | 7 CDI | 7 WIDEXFER |
| 6 ENSELO | 6 | 6 SWRAPEN | 6 IOO | 6 IOI | 6 SXFR(2) |
| 5 ENSELI | 5 | 5 ENSPCHK | 5 MSGO | 5 MSGI | 5 SXFR(1) |
| 4 ENRSELI | 4 CLRSTCNT | 4 STIMESEL(1) | 4 ATNO | 4 ATNI | 4 SXFR(0) |
| 3 ENAUTOATNO | 3 SPIOEN | 3 STIMESEL(0) | 3 SELO | 3 SELI | 3 SOFS(3) |
| 2 ENAUTOATNI | 2 | 2 ENSTIMER | 2 BSYO | 2 BSYI | 2 SOFS(2) |
| 1 ENAUTOATNP | 1 CLRCHN | 1 | 1 REQO | 1 REQI | 1 SOFS(1) |
| 0 SCSIRSTO | 0 | 0 | 0 ACKO | 0 ACKI | 0 SOFS(0) |

FIG. 49B

| SCSIID | SCSIDATL | SCSIDATH | STCNT0 | STCNT1 | STCNT2 |
|---|---|---|---|---|---|
| R/W I-0345 C-05 | R/W I-0346 C-06 | R/W I-0347 C-07 | R/W I-0348 C-08 | R/W I-0349 C-09 | R/W I-034A C-0A |
| 7 TID(3) | 7 DB(07) | 7 DB(15) | 7 STCNT(07) | 7 STCNT(15) | 7 STCNT(23) |
| 6 TID(2) | 6 DB(06) | 6 DB(14) | 6 STCNT(06) | 6 STCNT(14) | 6 STCNT(22) |
| 5 TID(1) | 5 DB(05) | 5 DB(13) | 5 STCNT(05) | 5 STCNT(13) | 5 STCNT(21) |
| 4 TID(0) | 4 DB(04) | 4 DB(12) | 4 STCNT(04) | 4 STCNT(12) | 4 STCNT(20) |
| 3 OID(3) | 3 DB(03) | 3 DB(11) | 3 STCNT(03) | 3 STCNT(11) | 3 STCNT(19) |
| 2 OID(2) | 2 DB(02) | 2 DB(10) | 2 STCNT(02) | 2 STCNT(10) | 2 STCNT(18) |
| 1 OID(1) | 1 DB(01) | 1 DB(09) | 1 STCNT(01) | 1 STCNT(09) | 1 STCNT(17) |
| 0 OID(0) | 0 DB(00) | 0 DB(08) | 0 STCNT(00) | 0 STCNT(08) | 0 STCNT(16) |

FIG. 49C

| CLRSINT0 | SSTAT0 | CLRSINT1 | SSTAT1 | SSTAT2 | SSTAT3 |
|---|---|---|---|---|---|
| W I-034B C-0B | R I-034B C-0B | W I-034C C-0C | R I-034C C-0C | R I-034D C-0D | R I-034E C-0E |
| 7 | 7 TARGET | 7 CLRSELTIMO | 7 SELTO | 7 OVERRUN | 7 SCSICNT(3) |
| 6 CLRSELDO | 6 SELDO | 6 CLRATNO | 6 ATNTARG | 6 | 6 SCSICNT(2) |
| 5 CLRSELDI | 5 SELDI | 5 CLRSCSIRSTI | 5 SCSIRSTI | 5 | 5 SCSICNT(1) |
| 4 CLRSELINGO | 4 SELINGO | 4 | 4 PHASEMIS | 4 SFCNT(4) | 4 SCSICNT(0) |
| 3 CLRSWRAP | 3 SWRAP | 3 CLRBUSFREE | 3 BUSFREE | 3 SFCNT(3) | 3 OFFCNT(3) |
| 2 | 2 SDONE | 2 CLRSCSIPERR | 2 SCSIPERR | 2 SFCNT(2) | 2 OFFCNT(2) |
| 1 CLRSPIORDY | 1 SPIORDY | 1 CLRPHASECHG | 1 PHASECHG | 1 SFCNT(1) | 1 OFFCNT(1) |
| 0 | 0 DMADONE | 0 CLRREQINIT | 0 REQINIT | 0 SFCNT(0) | 0 OFFCNT(0) |

FIG. 49D

| SCSITEST | | SIMODE0 | | SIMODE1 | | SCSIBUSL | | SCSIBUSH | | SHADDR0 | |
|---|---|---|---|---|---|---|---|---|---|---|---|
| R/W I-034F C-0F | | R/W I-0350 C-10 | | R/W I-0351 C-11 | | R I-0352 C-12 | | R I-0353 C-13 | | R I-0354 C-14 | |
| 7 | | 7 | | 7 | ENSELTIMO | 7 | SDB(07) | 7 | SDB(15) | 7 | SHADDR(07) |
| 6 | | 6 | ENSELDO | 6 | ENATNTARG | 6 | SDB(06) | 6 | SDB(14) | 6 | SHADDR(06) |
| 5 | | 5 | ENSELDI | 5 | ENSCSIRST | 5 | SDB(05) | 5 | SDB(13) | 5 | SHADDR(05) |
| 4 | | 4 | ENSELINGO | 4 | ENPHASEMIS | 4 | SDB(04) | 4 | SDB(12) | 4 | SHADDR(04) |
| 3 | | 3 | ENSWRAP | 3 | ENBUSFREE | 3 | SDB(03) | 3 | SDB(11) | 3 | SHADDR(03) |
| 2 | RQAKCNT | 2 | ENSDONE | 2 | ENSCSIPERR | 2 | SDB(02) | 2 | SDB(10) | 2 | SHADDR(02) |
| 1 | CNTRTEST | 1 | ENSPIORDY | 1 | ENPHASECHG | 1 | SDB(01) | 1 | SDB(09) | 1 | SHADDR(01) |
| 0 | CTSTMODE | 0 | ENDMADONE | 0 | ENREQINIT | 0 | SDB(00) | 0 | SDB(08) | 0 | SHADDR(00) |

FIG. 49E

| SHADDR1 | | SHADDR2 | | SHADDR3 | | SELTIMER | | SELID | | SBLKCTL | |
|---|---|---|---|---|---|---|---|---|---|---|---|
| R I-0355 C-15 | | R I-0356 C-16 | | R I-0357 C-17 | | R I-0358 C-18 | | R I-0359 C-19 | | R/W I-035F C-1F | |
| 7 | SHADDR(15) | 7 | SHADDR(23) | 7 | SHADDR(31) | 7 | | 7 | SELID(3) | 7 | |
| 6 | SHADDR(14) | 6 | SHADDR(22) | 6 | SHADDR(30) | 6 | | 6 | SELID(2) | 6 | |
| 5 | SHADDR(13) | 5 | SHADDR(21) | 5 | SHADDR(29) | 5 | STAGE6 | 5 | SELID(1) | 5 | |
| 4 | SHADDR(12) | 4 | SHADDR(20) | 4 | SHADDR(28) | 4 | STAGE5 | 4 | SELID(0) | 4 | |
| 3 | SHADDR(11) | 3 | SHADDR(19) | 3 | SHADDR(27) | 3 | STAGE4 | 3 | ONEBIT | 3 | SELBUSI |
| 2 | SHADDR(10) | 2 | SHADDR(18) | 2 | SHADDR(26) | 2 | STAGE3 | 2 | | 2 | |
| 1 | SHADDR(09) | 1 | SHADDR(17) | 1 | SHADDR(25) | 1 | STAGE2 | 1 | | 1 | SELWIDE |
| 0 | SHADDR(08) | 0 | SHADDR(16) | 0 | SHADDR(24) | 0 | STAGE1 | 0 | | 0 | |

FIG. 49F

| SHADDR0 | | SHADDR1 | | SHADDR2 | | SHADDR3 | |
|---|---|---|---|---|---|---|---|
| W I-1340 C-88 | | W I-1341 C-89 | | W I-1342 C-8A | | W I-1343 C-8B | |
| 7 | SHADDR(07) | 7 | SHADDR(15) | 7 | SHADDR(23) | 7 | SHADDR(31) |
| 6 | SHADDR(06) | 6 | SHADDR(14) | 6 | SHADDR(22) | 6 | SHADDR(30) |
| 5 | SHADDR(05) | 5 | SHADDR(13) | 5 | SHADDR(21) | 5 | SHADDR(29) |
| 4 | SHADDR(04) | 4 | SHADDR(12) | 4 | SHADDR(20) | 4 | SHADDR(28) |
| 3 | SHADDR(03) | 3 | SHADDR(11) | 3 | SHADDR(19) | 3 | SHADDR(27) |
| 2 | SHADDR(02) | 2 | SHADDR(10) | 2 | SHADDR(18) | 2 | SHADDR(26) |
| 1 | SHADDR(01) | 1 | SHADDR(09) | 1 | SHADDR(17) | 1 | SHADDR(25) |
| 0 | SHADDR(00) | 0 | SHADDR(08) | 0 | SHADDR(16) | 0 | SHADDR(24) |

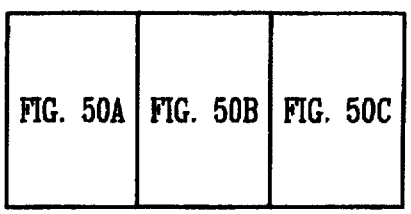
KEY TO FIG. 50
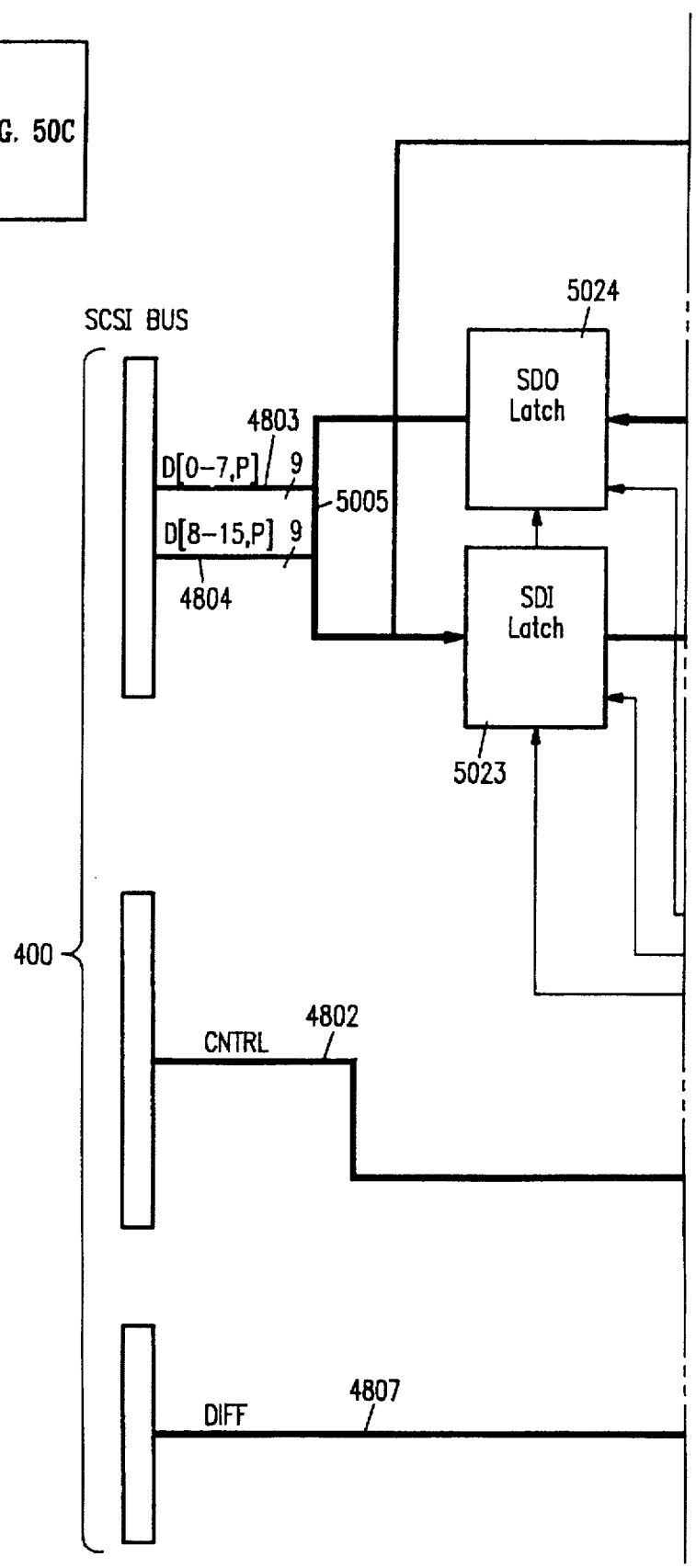
FIG. 50A

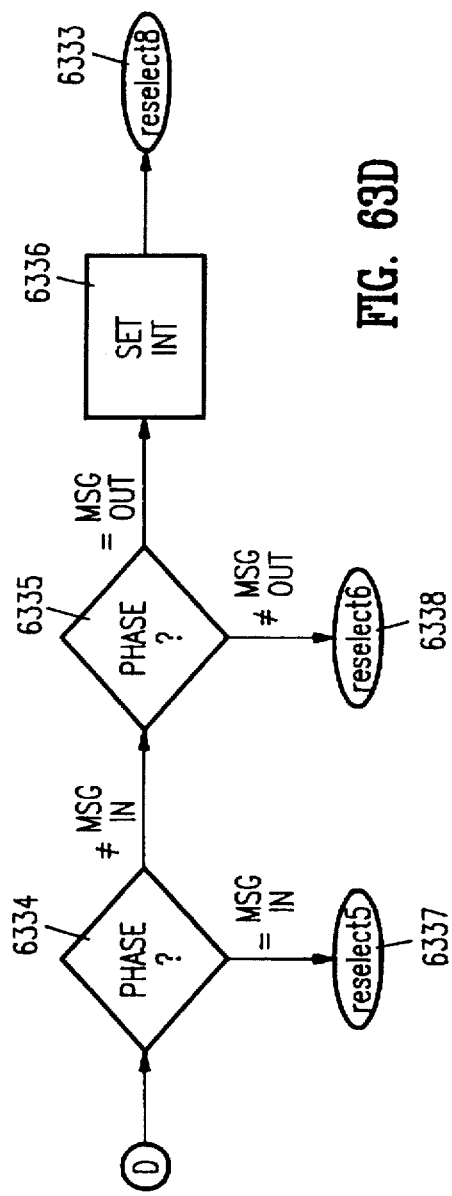
FIG. 63D
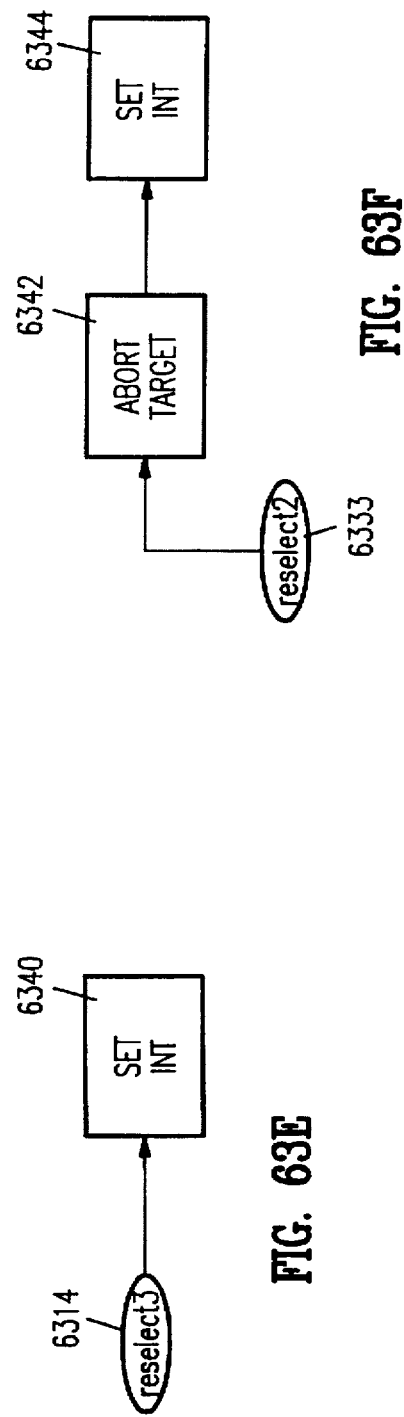
FIG. 63F
FIG. 63E

DESKEW CIRCUIT IN A HOST INTERFACE CIRCUIT

This application is a division of application Ser. No. 07/964,532, filed Oct. 15, 1992.

REFERENCE TO MICROFICHE APPENDIX

Appendix A, which is a part of the present disclosure, is a microfiche appendix consisting of 3 sheets of microfiche having a total of 202 frames. Microfiche Appendix A is a listing of computer programs and related data including a host adapter driver, sequencer firmware, and a compiler for generating sequencer firmware for use with one embodiment of this invention, which is described more completely below, and is incorporated herein by reference in its entirety.

Appendix B, which is a part of the present disclosure, is a microfiche appendix consisting of 5 sheets of microfiche having a total of 315 frames. Microfiche Appendix B is a complete set of detailed schematic drawings for one embodiment of this invention, which is described more completely below, and is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is related generally to host-adapter systems for information sharing between intelligent devices connected to a common data exchange bus such as a local area network (LAN) and more specifically to host-adapter systems for shared data exchange between a bus of a first device and a second bus, such as the Small Computer System Interface (SCSI) bus, to which one or more other devices are connected.

2. Description of the Related Art

Personal computers (PC's), sometimes referred to as microcomputers, have gained widespread use in recent years primarily because they are inexpensive and yet powerful enough to handle computationally-intensive user applications. The data storage and data sharing capabilities of personal computers are often expanded by coupling a group of such computers to peripheral devices such as disk drives, tape drives, and printers. The peripheral devices and the personal computers are interconnected through a single communications network, e.g., a local area network.

The Small Computer System Interface (SCSI) standard, which is specified by the American National Standards Institute (ANSI X3.131-1986, which is incorporated herein by reference in its entirety) of 1430 Broadway, New York, N.Y. 10018, is an example of an industry-recognized standard for a relatively complex local area network. Descriptions of the SCSI bus may be found for example in U.S. Pat. No. 4,864,291 "SCSI Converter" issued Sep. 5, 1989 to J. E. Korpi and in U.S. Pat. No. 4,905,184 "Address Control System for Segmented Buffer Memory" issued Feb. 27, 1990, to R. P. Giridhar, et al., which are incorporated herein by reference in their entirety.

A typical SCSI system 100 is illustrated in FIG. 1.

A plurality of intelligent devices 120, 140, 141, 142 are coupled to SCSI bus 110 so that these devices can exchange information. The intelligent devices are (i) a first host system 120, whose internal structure is shown in detail, (ii) a second host system 140, whose internal structure is similar to that shown for system 120, (iii) a first disk drive unit (Target-A) 141, and (iv) a second disk drive unit (Target-B) 142.

Communications over SCSI bus 110 begin when one of devices 120, 140 initiates a data transfer. A typical data transfer operation has seven SCSI "phases": (1) ARBITRATE, (2) SELECT, (3) MESSAGE(out), (4) COMMAND, (5) DATA, (6) STATUS and (7) MESSAGE (in).

The operation of the SCSI phases for data transfer is well-known to those skilled in the art. Briefly, during the ARBITRATE phase, competing host systems 120 and 140 decide which system gains exclusive control of SCSI bus 110. During the SELECT phase, the winning host designates one of the other devices as a "target". After selection of the target, a command is issued from the host to specify the details of the data transfer, such as direction, length, and address of the data in the target. Data is transferred over the SCSI bus 110 either synchronously or asynchronously in blocks of, for example, 512 bytes each at a speed up to 20 megabytes (Mbytes) per second.

The host and target exchange handshakes for each byte of data transferred over the SCSI bus. When the target anticipates a time delay in the data stream, the chosen target disconnects (in the logic sense) from SCSI bus 110, and the winning host relinquishes control over SCSI bus 110. This leaves SCSI bus 110 in a Bus-Free state, permitting other SCSI transfer operations to take place over bus 110. The data transfer operations can be either single-threaded (one host-target pair is active at a time) or multi-threaded (one host initiates transfers with many targets concurrently).

System 120 typically includes a third generation microprocessor 121, e.g., a 80386 microprocessor available from Intel Corp. of California, mounted on a printed-circuit motherboard 120a. The third generation microprocessor 121 (which will be referred to as the "host microprocessor") has a 16-bit or 32-bit wide data bus D and typically operates at a peak speed of approximately 25-50 million cycles per second. The motherboard also contains a standard expansion bus, typically either ISA or EISA 126a, 126b, 126c. The ISA data bus is 16-bits wide and transfers data at a maximum rate of 5.7 MBytes/sec.

The EISA data bus is 32-bits wide and transfers data at a maximum rate of 33 MBytes per second. The operation and data transfer over both an ISA bus and an EISA bus are well known to those skilled in the art.

Motherboard 120a also includes an optional math coprocessor 122, a host clock generating circuit 123 which normally includes an oscillator crystal 124 of fixed frequency, an interface circuit 125 that includes (i) address buffers 125a for coupling microprocessor address bus A to a 24-bit address bus portion 126a of expansion bus 126, (ii) data buffers 125b for coupling microprocessor data bus D to a 16-bit expansion data bus portion 126b, (iii) a bus controlling circuit 125c for coupling microprocessor control bus C to expansion bus control lines 126c and (iv) memory data buffers 125d for coupling microprocessor data bus D to an expansion memory data bus 126d, a plurality of expansion card connectors or 30 "slots" 127, a main memory system 130 including a nonvolatile read-only memory (ROM) 130a and dynamically-refreshed random-access memory (DRAM) 130b, a memory address multiplexer 132, a DMA controller 135 coupled to a DMA bus 136, local buffers 137, and page register 138. The operation and interaction of the components on motherboard 120a is known to those skilled-in-the art. Electrical power (e.g., +5 volts D.C.) is provided to host motherboard 120a and the expansion boards by an internal power supply 128.

A SCSI host-adapter board 160 is shown plugged into one of slots 127 of host system 120. Typically, board 160 includes a microprocessor 161 that usually is a first generation microprocessor (e.g., an Intel 8086 microprocessor) which has an eight-bit data bus and operates at a peak speed of approximately 10 MHz or less. The data processing resources of microprocessor 161, also referred to as adapter microprocessor 161, are devoted to managing SCSI bus data transfers.

In addition to adapter microprocessor 161, host-adapter board 160 typically includes a firmware ROM chip 165 for storing initialization and operational firmware used by adapter microprocessor 161. Host-adapter board 160 also includes a BIOS ROM chip 162 for storing initialization and operational software used by host microprocessor 121. In addition, board 160 includes several interface circuits. For example, a slot interface circuit 163 interfaces adapter board 160 to expansion slots 127. A SCSI bus interface circuit 164 interfaces board 160 to SCSI bus 110.

High speed firmware circuits 165, i.e., an Adaptec AIC-6250 available from Adaptec, Inc. of Milpitas, Calif., an NCR 5380 or an NCR 5390 chip, both available from NCR of Colorado Springs, Colo., are provided on host-adapter board 160 for handling functions that are too fast for adapter microprocessor 161. An on-board clock generating circuit 166 supplies a synchronizing clock signal to other components on adapter board 160. The components on adapter board 160 receive electrical power from power supply 128 of host system 120.

SCSI interface arrangement 100 is advantageous because there is minimal interference with application programs running on host microprocessor 121. Typically, host-adapter board 160 transfers data between SCSI bus 110 and memory 130 using a bus-master technique. In this technique, adapter board 160 forces microprocessor 121 into a temporary wait state and then takes control of expansion bus 126 and optionally also DMA bus 136. Bursts of data are transferred over SCSI bus 110 and expansion bus 126 to memory 130. Application programs running on microprocessor 121 are not affected by the data transfer because the state of the host microprocessor 121 is unchanged after host-adapter board 160 relinquishes control of expansion bus 126 and releases host microprocessor 121 from its wait state.

While the advantages of SCSI are widely recognized, host-adaptor board 160 limits the applications of SCSI. Most motherboards have a limited number of slots 127 and introduction of board 160 into one of the slots may eliminate another board that is needed by the user.

Further, small portable computers may not have any expansion slots and so connection of such computers to either a SCSI network or SCSI peripherals is not possible. SCSI adapter board 160 typically includes a number of high cost devices which make the SCSI adapter board itself expensive.

SUMMARY OF THE INVENTION

The bus master host adapter integrated circuit of this invention is a one chip high performance bus master host adapter for (i) connecting a first bus having a specified protocol for transferring information over the first bus and a first data transfer speed to a second bus having a specified protocol for transferring information over the second bus and a second data transfer speed, and (ii) transferring information between the two buses. The bus master host adapter integrated circuit, hereinafter host adapter, includes a novel reduced instruction set computing (RISC) processor which controls all operations necessary for the host adapter to function as a high speed bus master. The RISC processor has only a single clock and completes each instruction in one clock cycle. Moreover, the memory in the address space of the RISC processor is all included on-board the host adapter. This memory contains all the firmware for the RISC processor and includes data space as well as configuration, status, and control registers.

The host adapter of this invention includes a first interface module circuit connectable to the first bus and coupled to the RISC processor. The first interface module circuit transfers information to and from the first bus in response to instructions from and initialization by the RISC processor. The host adapter also includes a second interface module circuit connectable to the second bus and coupled to the RISC processor. The second interface module circuit transfers information to and from the second bus in response to instructions from and initialization by the RISC processor.

The host adapter further includes a memory circuit means connected to the first interface module circuit and to the second interface module circuit and coupled to the RISC processor. The memory circuit means buffers information so as to keep information streaming from the first bus to the second bus during an information transfer between the first bus and the second bus.

An I/O bus interconnects the first interface module circuit, the second interface module circuit, the memory circuit means, and the RISC processor. The I/O bus supports a read and a write operation by the RISC processor in single clock cycle of the RISC processor. The I/O bus includes a source bus with a source address bus and a source data bus, a destination bus with a destination address bus and a destination data bus as well as a plurality of control signal lines.

The memory circuit means includes a byte alignment circuit which provides "leading" address byte offsets to a specified bit boundary. For example, for 32-bit boundaries, a first data transfer through the memory circuit means may have an offset of 8-, 16-, or 24-bits. Similarly the byte alignment circuit provides "trailing" address byte offsets. In one embodiment, the memory circuit means has a width in bits which is the same width as the second bus.

The first interface module of this invention includes a programmably configurable circuit. Upon programming, the programmably configurable circuit, in one embodiment, supports one of a SCSI bus of a first width and a SCSI bus of a second width. In another embodiment, the programmably configurable circuit supports two SCSI buses of the same width. In either of these embodiments, one of the buses can be configured as a differential bus.

The second interface module of this invention is a programmably configurable circuit for supporting any one in a plurality of computer buses. In one embodiment, the plurality of computer buses include an EISA computer bus and an ISA computer bus. An input signal configures the programmably configurable circuit for either the ISA bus or the EISA bus.

The host adapter of this invention supports many features found in traditional add-in card SCSI host adapters. These features include bus master transfers, fast/wide SCSI, one interrupt per command, scatter/gather, overlapped seeks, tagged queuing, etc. To support these features, host adapter contains, the advanced RISC processor, mentioned above, that handles all normal SCSI phase sequences without intervention of a host adapter driver, which controls the commands performed by the host adapter.

There are three primary modes of operation for the RISC processor of this invention. In a first mode of operation, the RISC processor is in control of the I/O destination and source address buses. In this normal mode of operation, the RISC processor is controlled by firmware residing in RISC processor RAM. The firmware includes a command line that has, in one embodiment, a source address, a destination address, and an ALU operation. The command lines are move from RAM to a control register in the RISC processor. The source address is processed by a source address circuit and the destination address is processed by a destination address circuit. The ALU performs the designated operation on the data at the location of the source address and the result of the operation is placed at the destination address. This is all completed in one clock cycle using the I/O bus described above, because the I/O bus supports simultaneous read and write operations.

In a second mode of operation, a software driver is in control of both the source and destination address buses. In this mode, the software driver first pauses the RISC processor which causes the RISC processor to stop executing instructions and relinquish control of the source and destination address buses. As the RISC processor relinquishes control of these address buses, the RISC processor generates a signal that sets a bit PAUSEACK in a register HCNTRL. Upon detection that the bit PAUSEACK is set, the software driver performs the desired operations with the host adapter and upon completion of these operations restarts the RISC processor by releasing the pause signal. Upon release of the pause signal by the software driver, the RISC processor resumes operation in the normal mode.

A third mode of operation of the RISC processor is a "debug" mode. In the debug mode, the software driver can (1) pause the RISC processor and single step through sequencer firmware in RAM; (2) pause the RISC processor when a program counter reaches a known value; and (3) unpause the RISC processor and restart execution at a different location.

In one embodiment, the SCSI module of this invention includes two independent SCSI cells, cells one and zero, and a module control block. Each SCSI cell implements a single SCSI channel and although there are two distinct channels in the SCSI module, only one channel may be active at a time. The module control block contains a subset of the register set contained in the SCSI module.

This subset of registers provides stored data that controls the operations and performance of the SCSI module.

The SCSI module has four external buses, i.e., a SCSI channel zero bus, a SCSI channel one bus, a local bus, and a data transfer bus. The configuration of SCSI channel one bus is dependent upon the configuration of SCSI module. However, when the signal on a wide select line is active, the data signals on SCSI channel one bus are passed through a multiplexer to SCSI cell zero.

BRIEF DESCRIPTION OF THE DRAWINGS

FIGS. 12A through 12C illustrate in three sections one embodiment of the registers contained within the sequencer of this invention.

FIGS. 32A through 32F are a block diagram, illustrated in six sections, of one embodiment of the registers contained in the host interface module of this invention.

FIGS. 35A, 35B, 35C and 35D are timing diagrams for a 32-bit EISA burst transfer, an EISA burst transfer with a 16-bit downshift and no system copy, an EISA burst transfer with a 16-bit downshift and a system copy and the various timing variations for each of the three timing diagrams.

FIGS. 36A and 36B are the timing sequence for an EISA two-cycle 32-bit transfer and the timing variations therein.

FIGS. 37A and 37B are a timing diagram and timing parameter variations for an EISA two-cycle 16-bit data translation transfer.

FIGS. 42A and 42B are a timing diagram with timing variation parameters for an ISA bus master 16-bit transfer.

FIGS. 43A and 43B are a timing diagram with timing variations for an ISA bus master 8-bit data transfer.

FIG. 45C is an illustration showing the data transfer from the SCSI bus to system memory for various byte offsets.

FIG. 45D is a diagram of a data transfer from system memory to the SCSI bus for various byte offsets.

FIGS. 49A through 49F illustrate in six sections the register set contained within the SCSI module of this invention.

FIG. 53B is a timing diagram for initiator reselection for differential operation of the SCSI bus module of this invention.

FIGS. 61A and 61B, 62, 63A through 63I, 64A through 64E, 65, 66, 67, 68A and 68B, and 69 are process flow diagrams for the sequencer firmware of this invention.

DETAILED DESCRIPTION

Figure 1:
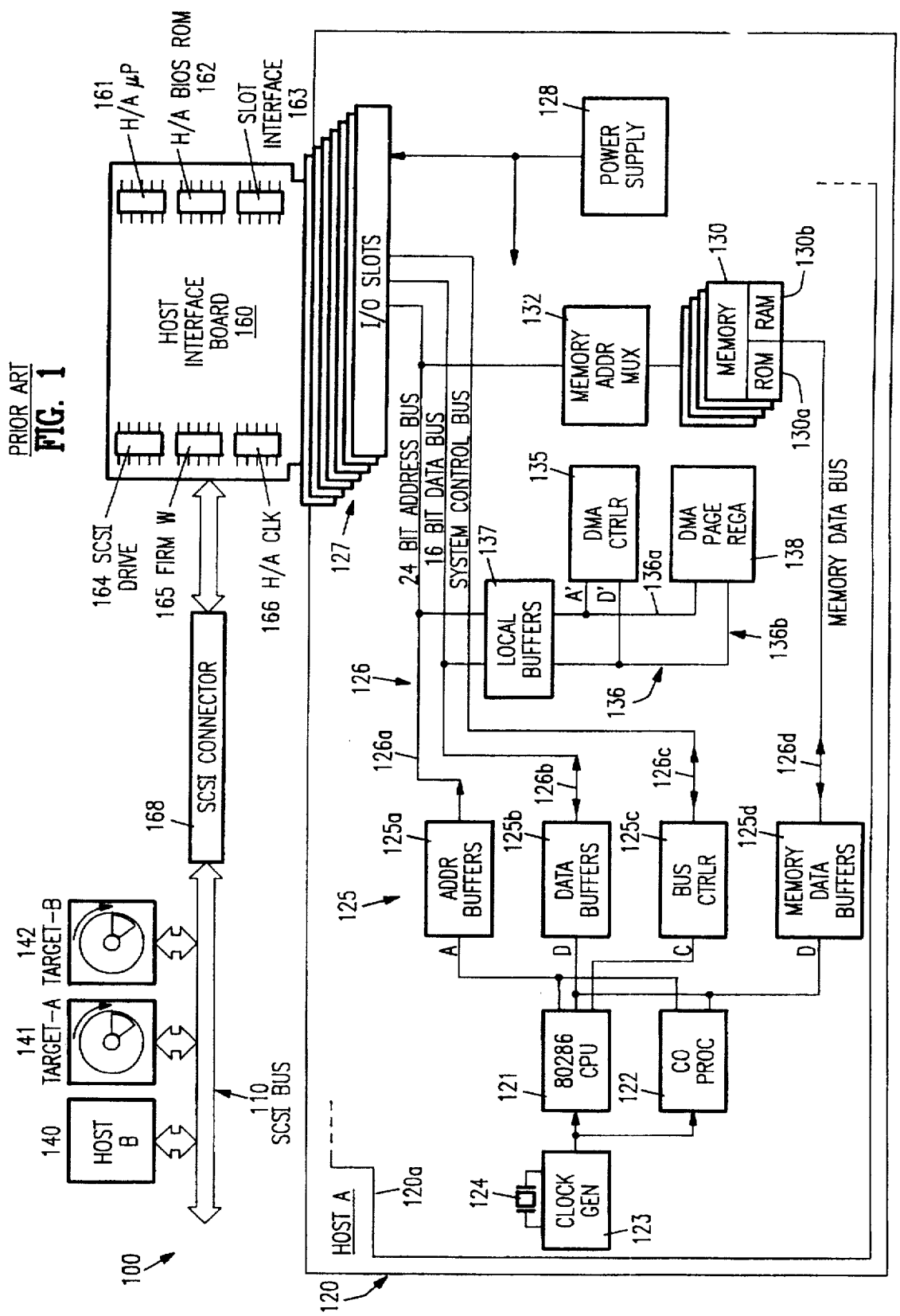
FIG. 1 is a diagram of a prior art computer system with multiple intelligent devices that use a host adapter interface card to communicate over a SCSI bus.

Host adapter integrated circuit of this invention 7770, hereinafter host adapter 7770, is a one chip high performance host adapter for connecting one of an ISA bus and an EISA bus, i.e., a first bus having a specified protocol for transferring information over the bus and a first data transfer speed to a SCSI bus 110, i.e., a second bus having a specified protocol for transferring information over the bus and a second data transfer speed. An input signal configures integrated circuit 7770 for either the ISA bus or the EISA bus, and so herein, the host computer bus structure selected by the user is simply referred as "host bus 226."

Host adapter integrated circuit 7770 of this invention, as explained more completely below, is a bus master that handles all low level protocols and many high level protocols required to transfer data on SCSI bus 110. In addition, host adapter integrated circuit 7770 of this invention performs data transfers between the two buses or between two SCSI devices with greater speed than prior art host adapter circuits. The higher level of performance is achieved by reducing the overhead needed to process a SCSI command. Specifically, as explained more completely below, the command overhead, the system software overhead, and the host bus utilization overhead have all been reduced over prior art host adapter circuits.

Hence, host adapter 7770 is a SCSI host adapter on a single chip. Host adapter 7770 supports many features found in traditional add-in card SCSI host adapters.

These features include bus master transfers, fast/wide SCSI, only one interrupt per command, scatter/gather, overlapped seeks, tagged queuing, etc. To support these features, host adapter 7770 contains, as explained more completely below, an advanced RISC (reduced instruction set computing) sequencer that handles all normal SCSI phase sequences without intervention of a host adapter driver 260, which, as explained more completely below, controls operation of host adapter 7770. Host adapter 7770 also includes a SCSI interface module and a host interface module. In prior art systems, each interface was typically at least one integrated circuit on the board and the board included a first generator microprocessor.

Thus, host adapter 7770 has a higher level of integration and the RISC sequencer, hereinafter "sequencer," provides significant speed advantages over the prior art processor used on host adapter boards.

However, to limit RAM requirements on-board host adapter 7770, the sequencer does not perform all SCSI functions. SCSI functions that are necessary for high speed performance are performed by the sequencer. SCSI functions, that by their very nature are slow, such as wide or synchronous negotiations, SCSI error handling, infrequent SCSI messages, and automatic request sense, are embedded in a host adapter driver 260, as explained more completely below. Data transfer is accomplished with either DMA (Direct Memory Access) or PIO (Programmed Input output) using a data path which has the same width in bits as host computer data bus 226b.

In one embodiment, no additional parts are necessary for incorporating host adapter 7770 into an IBM-AT compatible system. In IBM-AT compatible system 220 (FIG. 2), a single-chip host adapter integrated circuit (H/A-IC) 7770 interfaces SCSI bus 210 with computer bus 226. Like reference numerals are used in FIG. 2 to refer to elements which are similar, but not necessarily identical to those of FIG. 1, i.e., "100" was added to the reference numerals of system 120 of FIG. 1 to obtain the reference numerals of system 220 in FIG. 2.

Moreover, use of host adapter 7770 in an IBM-AT compatible system is only illustrative of the principles of this invention and is not intended to limit the invention to the computer bus structure or the microprocessor of such a system. In view of this disclosure, those skilled in the art will be able to implement the invention in other computer systems with different computer bus structures and different operating systems. Further, the use of a microprocessor is illustrative only of a general processing unit in a computer system and is not intended to limit the invention.

Unlike the prior art computer system 120, H/A host adapter 7770 is preferably mounted on motherboard 220a so that adapter board 160 (FIG. 1) is unneeded. Hence, the SCSI interface in system 200 (FIG. 2) is provided at a lower cost than cost of the interface in system 100 (FIG. 1). Specifically, the cost of mounting a plurality of discrete components 161–166 onto an expansion circuit board 160 has been eliminated.

Figure 2:
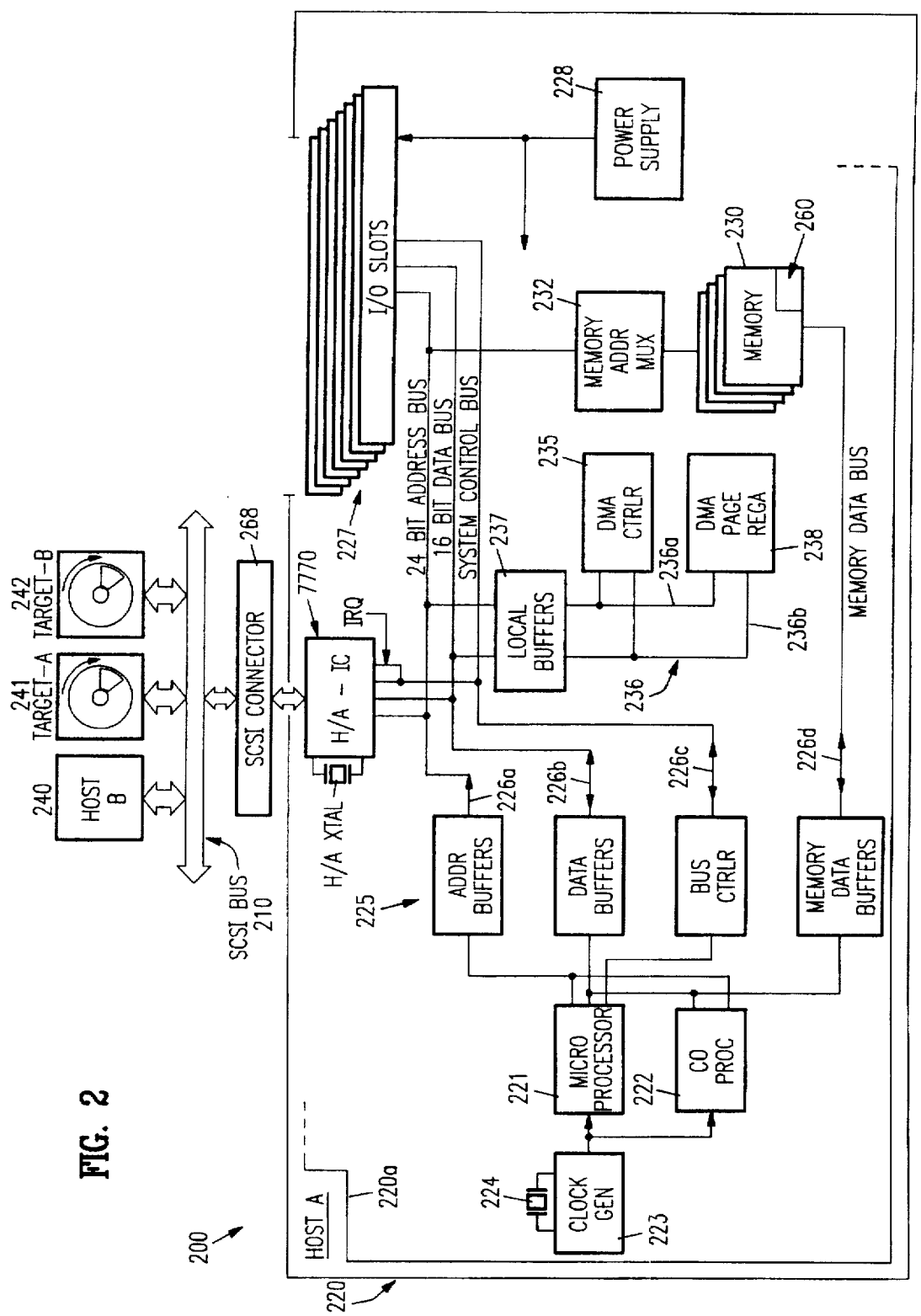
FIG. 2 is a diagram of a computer system that includes a computer with the bus master host adapter integrated circuit of this invention on the motherboard.

Host adapter driver 260, as described more completely below, is another important feature of this invention. One embodiment of the host adapter driver routines, used to implement the host adapter driver processes in computer system 220, is presented in Microfiche Appendix A which is incorporated herein by reference in its entirety. The other parts and components illustrated in FIG. 2 are a part of computer system 220 and are only illustrative of one embodiment of a system suitable for use with host adapter 7770 of this invention. In addition, the operation and interaction of the various components that make up computer system 220 are well known to those skilled in the art.

As explained more completely below, host adapter 7770 is controlled by software driver 260, sometimes referred to as "host adapter driver 260," which is executing from system memory 230 on processor 221 in host computer system 200. Alternatively, host adapter driver 260 can be included in BIOS routines for computer system 220. In one embodiment, as explained more completely below, software driver 260 includes an operating system specific module (OSM) and a hardware interface module (HIM). The OSM knows nothing about the hardware in host adapter 7770 and communicates with both the computer operating system and HIM. HIM communicates only with host adapter 7770 and OSM. Hence, changes in the hardware of host adapter 7770 do not require changes to OSM and conversely, changes in the operating system of computer system 220 do not require changes in host adapter 7770.

SCSI operations, sometimes referred to as low level protocols or basic protocols, that require high speed performance to maintain the performance of computer system 220, e.g., SCSI arbitration, selection, reselection, and data phases, are performed by host adapter 7770 without intervention of software driver 260. Software driver 260 sends a sequencer control block (SCB) to host adapter 7770. Host adapter 7770 uses the information in the SCB and initializes automated hardware in host adapter 7770.

As explained more completely below, the automated hardware, after initialization, automatically performs the SCSI command specified in the SCB and then notifies the sequencer that the command is completed. The sequencer in turn notifies host computer system via a hardware interrupt that the operation has been completed, i.e., a command complete interrupt is generated by host adapter 7770.

Thus, microprocessor 221 is interrupted by a signal, a system hardware interrupt, on an IRQ line of bus 226 from host adapter 7770 when host adapter 7770 has completed an operation. In response to the system hardware interrupt, sometimes referred to as a "hardware interrupt," microprocessor 221, through the operating system, calls host adapter driver 260. As explained more completely below, host adapter driver 260, in response to the operating system, processes the command complete notification.

An important aspect of this invention is the limitation of the number of hardware interrupts used to communicate between host adapter 7770 and host adapter driver 260. There is a large performance penalty every time host adapter 7770 requires attention from host adapter driver 260. Therefore, the optimum number of hardware interrupts is one or less than one per command to indicate that the command is finished. Host adapter 7770 accomplishes this goal for system interrupts by utilizing bus master techniques to transfer both data and SCSI commands without intervention of host microprocessor 221.

Host adapter 7770 not only takes care of the basic protocol on SCSI bus, but also more advanced features usually handled by host microprocessor 221, sometimes referred to as "microprocessor 221," or some other separate microprocessor. Reducing the features handled by host microprocessor 221 reduces the number of interrupts required to operate host adapter 7770.

For example, SCSI bus 210 allows a logical disconnection of a plurality of SCSI devices and then a reconnection at some later time. As explained more completely below, such a logical disconnection is accomplished through a message system which normally requires a microprocessor to control. The necessary and normal messages of "Save Data Pointers," "Disconnect," and the reconnection sequence are handled directly by the sequencer of this invention and so no microprocessor control is required. Thus, a hardware interrupt for intervention by host adapter driver 260 is not required to handle these processes.

Other advanced SCSI features, such as tagged queuing messages and modify data pointers message, are handled by host adapter 7770 in real time. These messages are defined in the SCSI-2 Specification.

Figure 3:
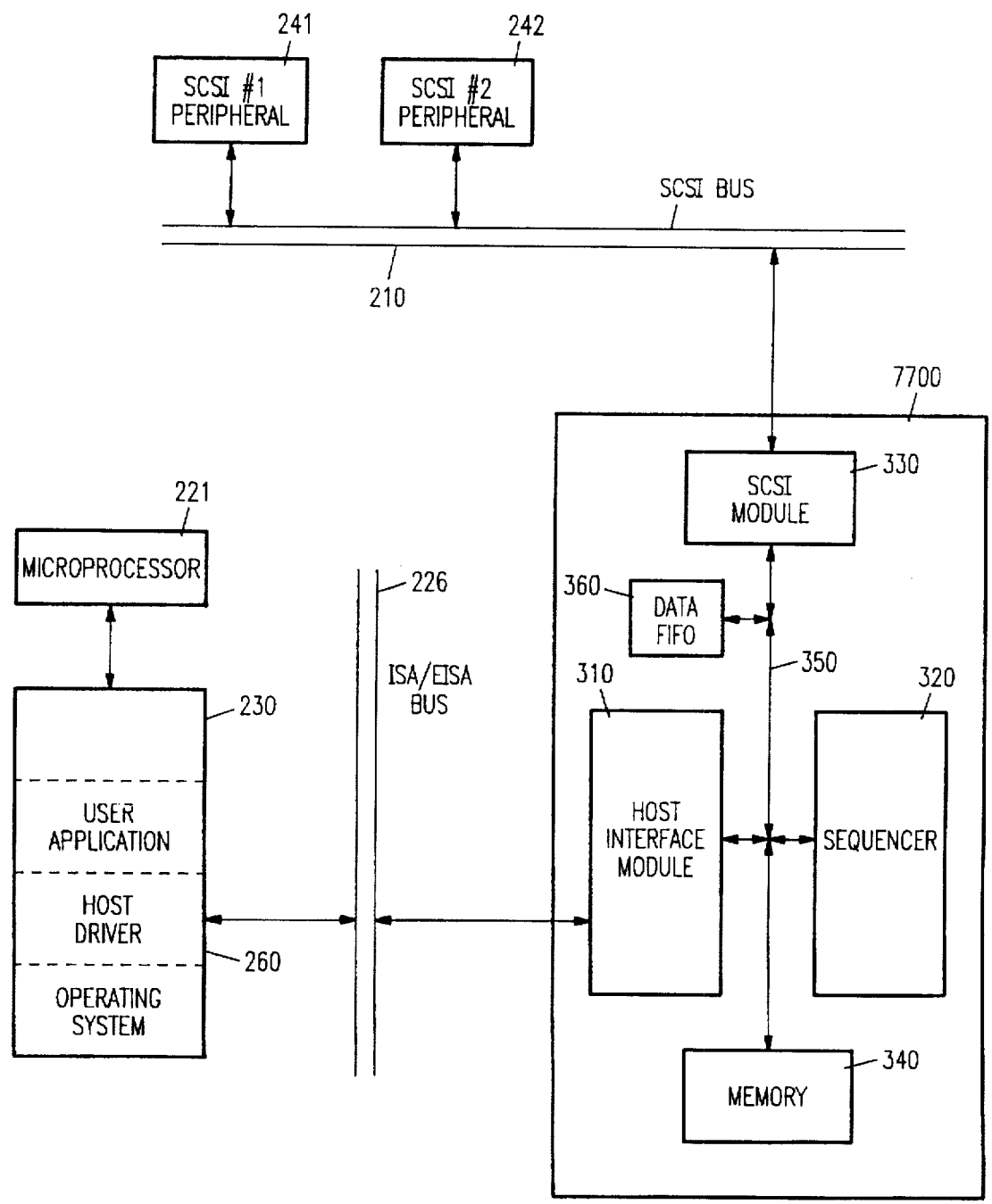
FIG. 3 is a block diagram showing selected components of the computer system and the basic modules within the bus master host adapter integrated circuit of this invention.

A more detailed block diagram of one embodiment of host adapter 7770 along with selected components from computer system 220 is illustrated in FIG. 3. Host adapter 7770 includes a SCSI module 330 that, in this embodiment, includes a plurality of SCSI cells where each SCSI cell supports a SCSI channel, a novel RISC sequencer 320, a data first-in-first-out(FIFO) memory circuit 360, a memory 340 and a host interface module 310. SCSI module 330, data FIFO memory circuit 360 and host interface module 310 are interconnected by a data transfer bus structure to form a high speed path for transfer of data between computer bus 226 and SCSI bus 210.

SCSI module 330, sequencer 320, data FIFO memory circuit 360, memory 340, and host interface module 310 are interconnected by a novel internal bus, hereinafter CIOBUS 350, which is used for control of host adapter integrated circuit 7770 both by host microprocessor 221 through host adapter driver 260 and by sequencer 320. As described more completely below, CIOBUS 350 includes (i) a source bus with separate address and data buses, (ii) a destination bus with separate address and data buses, and (iii) a plurality of control signal lines. CIOBUS 350 supports high speed normal operations that are controlled by sequencer 320 as well as slower but extended operations during error recovery that are controlled by host adapter driver 260 using host microprocessor 221. As explained more completely below, a novel process is used to prevent contentions on CIOBUS 350 between sequencer 320 and host adapter driver 260 as well as contentious between modules in host adapter 7770.

The structure of CIOBUS 350 is integral to the speed of host adapter 7770 and to a reduction in command overhead. Command overhead is the time taken by host adapter 7770 to process a SCSI command. CIOBUS 350 is designed so that a transfer of data from one part of host adapter 7770 to another on CIOBUS 350 takes less than 125 nanoseconds (ns). This allows 8 Mega-instructions per second (MIPS) operation, which is more than an order of magnitude faster than current embedded microprocessor host adapter designs. The splitting of CIOBUS 350 into source and destination buses allows each sequencer instruction to be completed in a single sequencer clock cycle, as opposed to the multiple cycles needed on a shared bus. Further, in some cases, as explained below, a write operation and a read operation can be performed simultaneously over CIOBUS 350.

Host interface module 310 provides functional control to operate host adapter 7770 either as an ISA bus slave, an ISA bus master, an EISA bus slave, or an EISA bus master that transfers data and commands between host computer bus 226 and CIOBUS 350. All data transfers, in one embodiment between host interface module 310 and host computer bus 226 are direct memory access (DMA) transfers. As used herein, a "DMA transfer" refers an information transfer where the starting address for the information and the length of the information are provided to a DMA hardware circuit and the DMA hardware circuit handles the data transfer.

Sequencer 320 handles all normal SCSI phase sequences without intervention of host adapter driver 260. Sequencer 320 also controls DMA and PIO data transfers. Sequencer 320 not only takes care of the basic protocol on the SCSI bus, but also handles more advanced features usually handled by host microprocessor 221. As explained above, the necessary and normal SCSI messages of Save Data Pointers, Disconnect, and the Reconnection sequence are handled directly by sequencer 320. In addition other advanced features such as Tagged Queuing messages and Modify Data Pointers message are handled by sequencer 320 in real time.

Moreover, sequencer 320, which includes a RISC processor with a single clock, completes each sequencer instruction in one sequencer clock cycle, unlike prior art RISC processors that required multiple overlapping clocks to achieve one instruction per clock cycle operation. As explained more completely below, all the memory addressed by sequencer 320 and all the sequencer firmware are contained within host adapter 7770.

In one embodiment, SCSI module 330 can be configured to support two normal SCSI buses, as defined in the SCSI-2 specification, or one 16-bit SCSI bus, as defined in the SCSI-3 specification in both normal and fast modes. Differential control of one SCSI bus is optional. The ability to support multiple SCSI bus configurations with one host adapter eliminates the need to obtain a different part for each SCSI bus configuration. Therefore, host adapter 7770 brings a new level of standardization to a wide variety of SCSI bus architectures.

Data FIFO memory circuit 360 is included in host adapter 7770 to maximize data transfer efficiency. Specifically, a data threshold for data FIFO memory circuit 360 is programmable based on the relative data transfer speeds of computer bus 226 and SCSI bus 210. Data FIFO memory circuit 360 provides an enable signal to host interface module 310 when the data threshold is reached and in turn host interface module 310 asserts a signal on host computer bus 226 that requests control of bus 226 as a bus master. Hence, host adapter 7770 takes control of host computer bus 226 only when host adapter 7770 is ready to provide or receive data from bus 226, as explained below. Therefore, host adapter 7770 can be configured to effectively utilize both SCSI bus 210 and computer bus 226 thereby minimizing the degradation of system performance commonly associated with the inefficient utilization of these buses by prior art SCSI host adapters.

Figure 4:
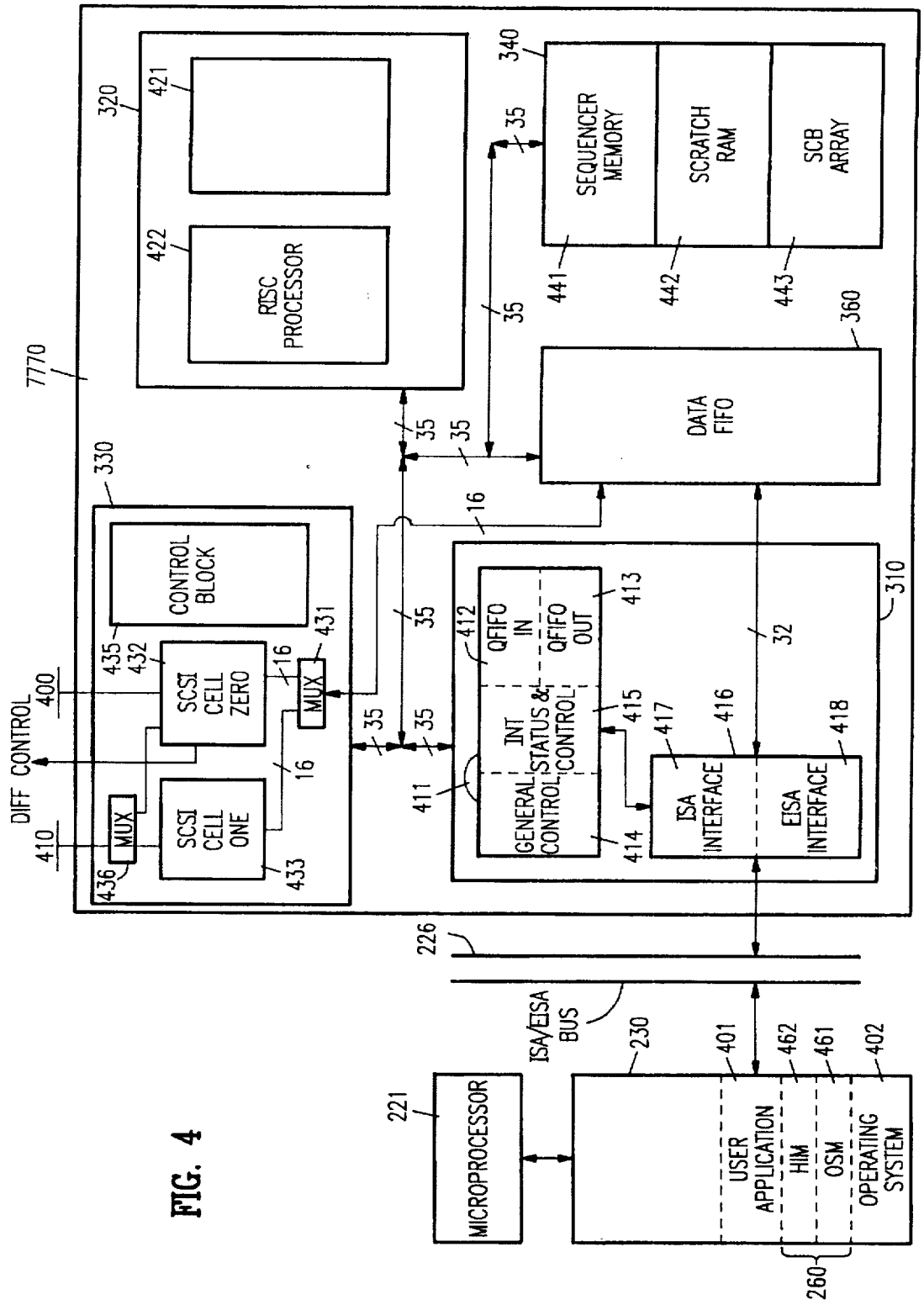
FIG. 4 is a more detailed block diagram of the bus master host adapter integrated circuit of this invention.

FIG. 4 illustrates in more detail the structure of host adapter 7770 of this invention. For clarity, specific connections between the various structures in host adapter 7770 are not illustrated in FIG. 4. The connections are defined more completely below in the detailed description of the various structures illustrated in FIG. 4. Moreover, a complete set of schematic diagrams for one embodiment of host adapter 7770 is presented in Microfiche Appendix B, which is appended hereto and incorporated herein by reference in its entirety.

SCSI module 330 includes SCSI cell 432 that is connectable to a first SCSI bus 400 and a second SCSI cell 433 that is connectable to a second SCSI bus 410. As explained more completely below each SCSI cell 432, 433 includes a SCSI FIFO, latches for PIO data transfers, automatic hardware SCSI sequencers, and a register set that stores SCSI control data, SCSI interrupt data, data for control of the automatic hardware SCSI sequencers as well as other information that is defined more completely below. Control block 435 includes a register set for configuring the operation of SCSI module 330 and controls for interfacing the various ports SCSI module 330.

There are three levels of definition of a SCSI bus. Herein, "SCSI-2" means data transfer speeds up to 10 MByte/sec in synchronous transfer mode on an eight bit wide SCSI data bus and the other SCSI bus features specified in the ANSI SCSI-2 specification, while "SCSI-3" means data transfer speeds up to 20 MByte/sec on a sixteen bit wide SCSI data bus and the other SCSI bus features specified in the draft ANSI SCSI-3 specification, often called "wide SCSI". Differential SCSI is a redefinition of the signal arrangement and electrical characteristics of the SCSI bus, and is defined in both SCSI-2 and SCSI-3.

The configuration of SCSI module 330 is programmable by setting or clearing bits within control block 435. SCSI module 330 can be programmed to operate in a number of combinations of the different SCSI configurations.

Figure 5C:
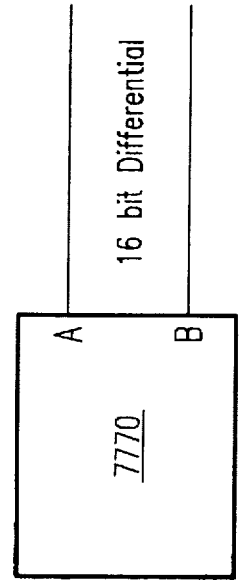
FIG. 5C is a block diagram illustrating that the bus master host adapter integrated circuit of this invention supports a sixteen-bit single ended SCSI bus.
Figure 5D:
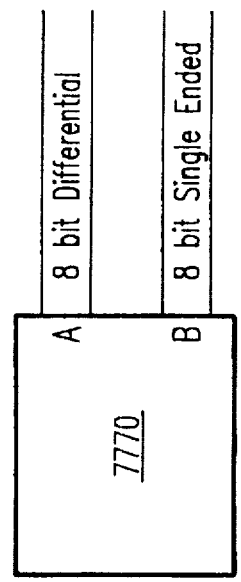
FIG. 5D is a block diagram illustrating that the bus master host adapter integrated circuit of this invention supports a sixteen-bit differential SCSI bus.
Figure 5A:
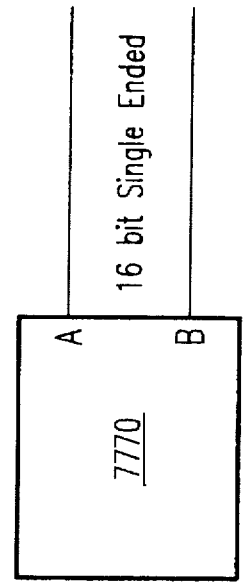
FIG. 5A is a block diagram illustrating that the bus master host adapter integrated circuit of this invention supports a combination of two separate eight-bit single ended SCSI buses.
Figure 5B:
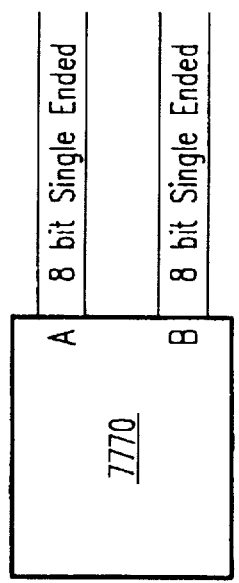
FIG. 5B is a block diagram illustrating that the bus master host adapter integrated circuit of this invention supports a combination of an eight-bit single ended SCSI bus and an eight-bit differential SCSI bus.

If multiplexer 436 is configured to connect the data portion of SCSI bus 410 to SCSI cell 433, SCSI module 330 is configured to support two single-ended SCSI-2 buses 410, 400 (FIG. 5A). Alternatively, SCSI cell 433 supports single-ended SCSI-2 bus 410 while SCSI cell 432 supports a differential SCSI-bus (FIG. 5B). Differential control signals from SCSI module 432 are used to control external logic, which in turn controls external differential drivers. The differential control signals are arranged as a miniature bus that includes an address bus(2 bits), a data bus(4 bits) and a strobe. The differential addresses are decoded by the external logic into differential signal groups; SCSI ID, Arbitration/Selection, and Initiator/Target. Although in these configurations, there are two distinct channels in SCSI module 330, only one channel may be transferring data at a time.

If multiplexer 436 is configured to connect the data portion of SCSI bus 410 to SCSI cell 432, SCSI module 330 is configured to support a single-ended SCSI-3 bus (FIG. 5C). Alternatively, SCSI module 330 can support a single differential SCSI-3 bus in conjunction with external logic (FIG. 5D). In FIGS. 5A to 5D, SCSI cell 432 is represented by "A" and SCSI cell 433 is represented by "B". SCSI module 330 supports both direct memory access (DMA) data transfers and programmed input/output (PIO) data transfers between SCSI buses 410, 400 and host computer data bus 226, which in this embodiment can be either an ISA bus or an EISA bus.

In this embodiment, sequencer 320 includes sequencer RAM, which in this embodiment is shown as sequencer memory 441 in memory 340, a novel RISC processor 422, and a sequencer register set 421. As explained more completely below, RISC processor 422 includes (i) a pipeline register 650 that contains a sequencer command line that is described more completely below; (ii) an ALU 610; and (iii) source and destination address control logic 620 that includes next address generation logic. One input port of ALU 610 is connected to the source data section of CIOBUS 350, hereinafter "CSDAT bus 602" and the other port is driven either by pipeline register 650 or a temporary holding register. The output port of ALU 610 drives the destination data section of CIOBUS 350, hereinafter "CDDAT bus 604."

A typical sequencer cycle sets an address on the source address section of CIOBUS 350, hereinafter "CSADR bus 601", receives source data from CSDAT bus 602, operates on the source data with a selected ALU operation, and writes the result of the operation over the destination data section of CIOBUS 350 to the destination specified by the address on the destination address portion of CIOBUS 350, hereinafter CDADR bus 603. Optionally, the result of the ALU operation may be examined for a zero value or a non-zero value, and the next address to sequencer RAM 441 can be modified. The next sequencer RAM address can also be explicitly changed, with the incremental address saved, effecting a subroutine call and return. Up to four levels of subroutine calls are supported by RISC processor 422.

RISC processor 422 and consequently sequencer 320 is designed to minimize the time required to complete the above mentioned operations. Currently, any operation is completed by sequencer 320 in 125 nanoseconds (ns). This speed coupled with the separate source and destination sections of CIOBUS 350 allows 8 MIPS operation. In addition to high speed, ALU 610 has logic AND, OR, XOR, and ADD functionality. RISC processor 422 can also test any bit or combination of bits for a one or zero and jump or call a subroutine as a result of the test. This operation also happens within one clock cycle.

ALU 610 also has source and destination index registers which are used for multi-byte transfers or additions. This functionality allows sequencer 320 to make decisions based on the state of SCSI bus 210 (FIG. 3), the data path hardware and software driver 260.

Figure 7:
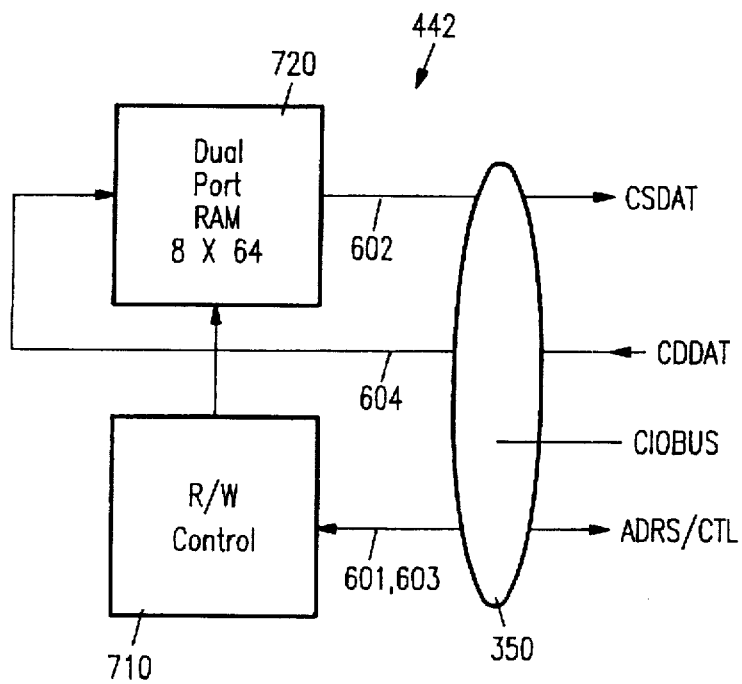
FIG. 7 is a block diagram of the scratch RAM in the bus master host adapter integrated circuit of this invention.
Figure 11:
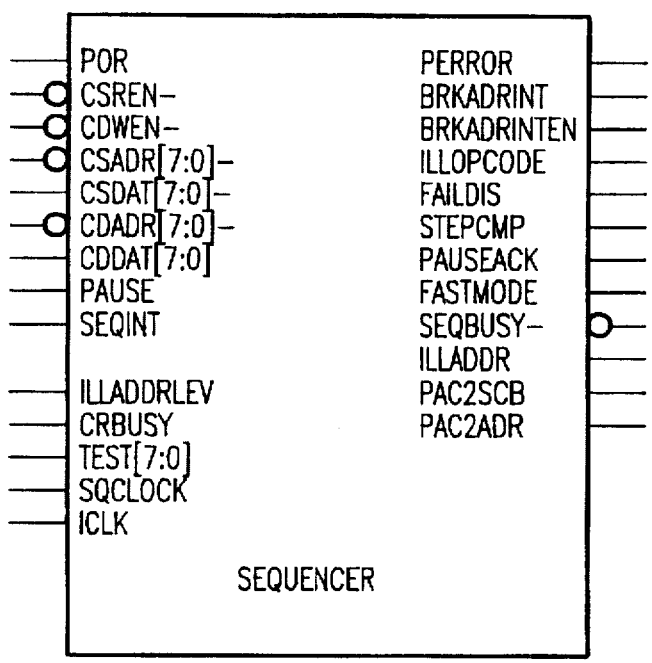
FIG. 11 illustrates the signal interface for the novel sequencer of this invention.

A scratch RAM area 442 in memory 340 is available for temporary storage of state information, e.g., in one embodiment a sequencer stack 680 is maintained in scratch RAM 442. FIG. 7 is a more detailed block diagram of one embodiment of scratch RAM 442. Scratch RAM 441 includes a dual port 8×64 RAM 720 (FIG. 7) that receives an address and strobe signals from read and write control circuit 710. Read and write control circuit 710 is driven by the plurality of control lines in CIOBUS 350 as well as CSADR bus 601 and CDADR bus 603. RAM 720 receives data from CDDAT bus 604 and drives CSDAT bus 602.

The sequencer firmware in sequencer RAM 441 has a powerful enough instruction set to allow extended SCSI protocols to be implemented and thereby executed by sequencer 320 without intervention by software driver 260. In addition, the ability to save the condition of a disconnected command allows sequencer 320 to queue commands on-board host adapter 7770.

Several features have been included to aid in the debugging of the sequencer firmware. A breakpoint can be set to stop sequencer 320 at any address. Once stopped, sequencer 320 can be stepped one instruction at a time. Sequencer stack 680 can be read to determine its contents.

Host interface module 310 contains module 416 that controls all signals and data paths to automatically transfer, as a bus master, 8-, 16-, or 32-bit wide data onto host computer bus 226. All I/O transfers from and to host microprocessor 221 are 8-bit transfers to reduce the logic internal to host adapter 7770 and consequently the die size.

Figure 8B:
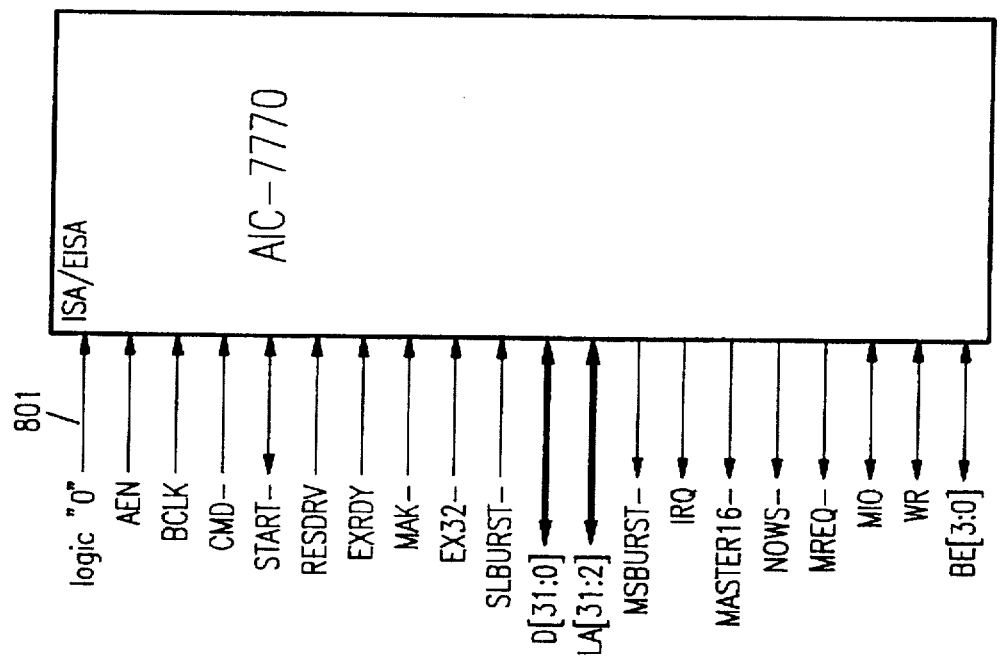
FIGS. 8A and 8B show two computer bus configurations supported by the bus master host adapter integrated circuit of this invention.
Figure 8A:
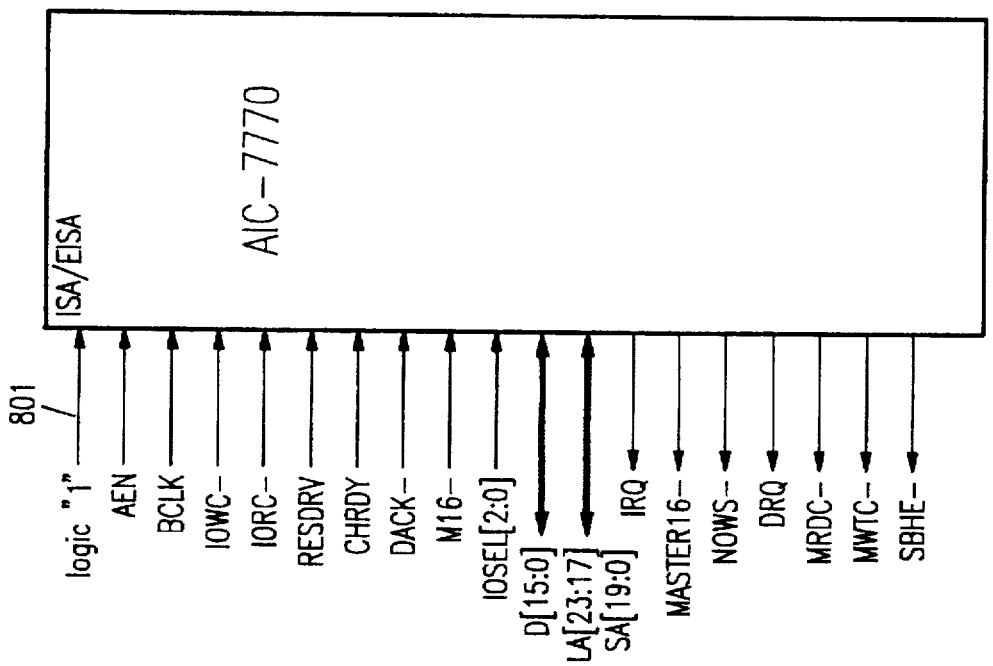

Module 416 includes an ISA interface module 417 and an EISA interface module 418. An input signal to host adapter 7770 on ISAEISA line 801 is used to configure module 416. When the signal on ISAEISA line 801 is high, ISA interface module 417 (FIG. 8A) is selected and conversely when the signal is low, EISA interface module 418 (FIG. 8B) is selected. The signals on the various lines in FIGS. 8A and 8B are explained more completely below. Moreover, while two discreet sets of signal lines are illustrated, in one embodiment, many of the signal lines to module 416 serve a dual function and the function is determined by the signal on line 801.

ISA interface module 417 supports 8- or 16-bit transfers, programmable transfer rates, and programmable bus on and off times to insure fair bus usage between multiple bus master devices. EISA interface module 418 supports three bus clock I/O cycles, 32-bit burst transfers, 16-bit downshift transfers, system translate cycle transfers, programmable interrupt level, and programmable bus release times.

Host interface module 310 also contains I/O registers 411 used by host adapter driver 260 during the normal operation of host adapter 7770 including general control registers 414 and interrupt status and control registers 415.

Host interface module 310 also includes a queue-in FIFO 412 and a queue-out FIFO 413 and related counters, which are used in transferring SCBs to and from host adapter 7770.

Most of registers 411 decoded by host interface module 310 are accessible by both host adapter driver 260 and sequencer 320. As explained more completely below, to access most registers in registers 411, i.e., the registers on CIOBUS 350, host adapter driver 260 first sets a bit PAUSE in a register HCNTRL within registers 411. When bit PAUSE is set, sequencer 320 is paused and sets bit PAUSEACK in register HCNTRL. Upon setting of bit PAUSEACK, CIOBUS 350 is transferred from sequencer 320 to host adapter driver 260 so that host adapter driver can access any register with the address space of CIOBUS 350.

Thus, CIOBUS 350 is operated in one of two modes selected by the state of bit PAUSEACK in host control register HCNTRL. When bit PAUSEACK and consequently signal PAUSEACK is in the inactive state, CIOBUS 350 supports both a write operation and a read operation within a single sequencer clock cycle. When bit PAUSEACK is in the active state, the I/O system board or any other bus master through module 416 may access any registers in host module 310 as well as any registers in host adapter 7770 that are on CIOBUS 350.

There are some special registers in registers 411 which can be read by host adapter driver 260 without pausing sequencer 320. These special registers are on a host interface bus, referred to as HIOBUS, contained in host interface module 310. HIOBUS is an input/output bus that includes an 8-bit input data bus, and 8-bit output data bus and a 2-bit control bus.

The first special register on HIOBUS is host control register HCNTRL that contains overall control bits for host adapter 7770. The bits in register HCNTRL can be set or cleared at any time.

Other registers on HIOBUS are used in the normal course of operation and are defined to improve the communication efficiency between host adapter 7770 and host adapter driver 260. These registers include a clear interrupt register CLRINT, an interrupt status register INTSTAT, queue-out FIFO register QOUTFIFO 411, and queue-out count register QOUTCNT. The use and contents of registers 411 are described more completely below.

Data FIFO memory circuit 360 buffers data so as to keep data streaming from one bus to the other. The rate of transfer of SCSI bus 210 and host computer bus 226 is generally different, and so data FIFO memory circuit 360 is also providing the additional functions of speed matching and minimal host bus time usage by bursting data at the host bus maximum rate.

Figure 9:
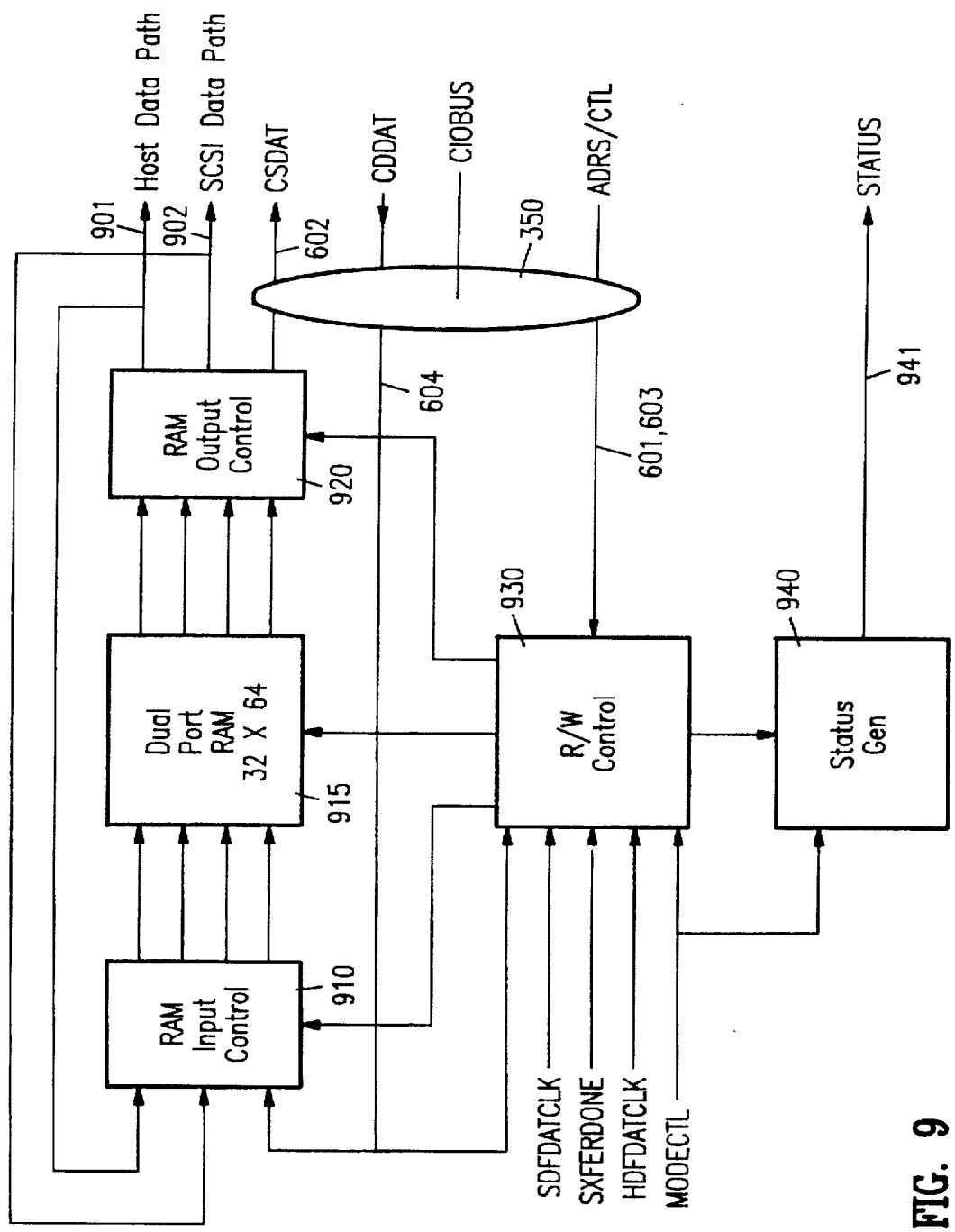
FIG. 9 is a block diagram of the data FIFO memory circuit of this invention.
Figure 10:
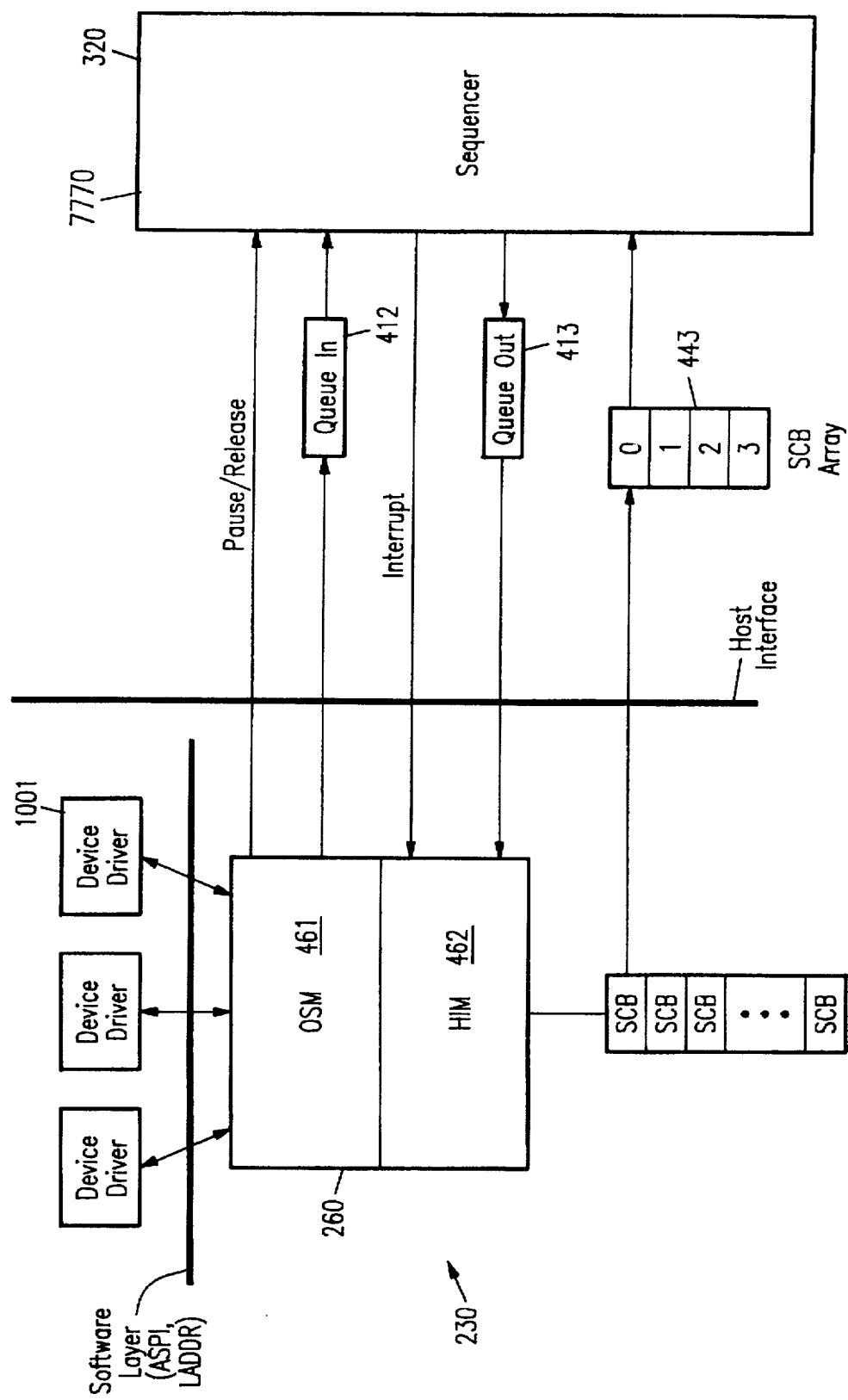
FIG. 10 is an illustration of the novel communications and control methods used for passing commands to the bus master host adapter integrated circuit of this invention.

FIG. 9 is a more detailed block diagram of one embodiment of data FIFO memory circuit 360. Host data path 901, a 32-bit bus, from host interface module 310 is connected to RAM input control circuit 910 and RAM output control circuit 920. SCSI data path 902, a 16-bit bus, from SCSI module 330 is connected to RAM input control circuit 910 and RAM output control circuit 920. As explained more completely below, RAM input and output control circuits 910 and 920, which are connected to data FIFO memory 915, control the direction of data transfer through data FIFO memory circuit 360.

The signals on CDDAT bus 604 are provided to read and write control circuit 930 and to RAM input control circuit 910. RAM output control circuit 920 drives CSDAT bus 602. CDADR bus 603 and CSADR bus 601 are connected to read and write control circuit 930. The signals on the other input lines to read write control circuit 930 are explained more completely below.

Read and write control circuit 930 provides addresses and control signals to data FIFO memory 915 and control signals to RAM input and output control circuits 910 and 920. In one embodiment, data FIFO memory 915 is a dual port 32×64 RAM. Read and write control circuit 930 also provides signals to status generation circuit 940 which drives status bus 941. As explained more completely below, the data FIFO memory circuit status information is stored in registers 411.

An important aspect of this invention is the data threshold control of data FIFO memory circuit 360. There are several possible situations which may result from mismatched data transfer rates on computer bus 226 and SCSI bus 210. In this embodiment, preferably at least three possible situations are considered and host adapter 7770 can be configured to efficiently handle each of the situations.

First, with prior art SCSI host adapters, if the host data transfer rate over computer bus 226 was much faster than the SCSI data transfer rate over SCSI bus 210, the host transfer data rate was tied to the slower rate of the SCSI peripheral, which unnecessarily maintained control of host computer bus 226 until the SCSI data transfer was complete. In contrast, according to the principles of this invention, when the host computer bus speed is much faster than the SCSI bus speed, e.g., 33 MBytes/s vs. 5 MBytes/sec, the threshold value for data FIFO memory circuit 360 is set at one hundred percent, i.e., a maximum value. Hence, in reading data from SCSI bus 210, host adapter 7770 starts transferring data from data FIFO memory circuit 360 to host memory 230 only when data FIFO memory circuit 360 is full because host computer system 220 can empty data FIFO memory circuit 360 long before the SCSI device can fill data FIFO memory circuit 360 again. Similarly, in writing data to SCSI bus 210, host adapter 7770 starts transferring data from host memory 230 to data FIFO memory circuit 360 only when data FIFO memory circuit 360 is empty. Thus, a burst of data to or from data FIFO memory circuit 360 is sent over computer bus 226 thereby utilizing bus 226 effectively.

Second, if the host data transfer rate is much slower than the SCSI data transfer rate, time may be spent unnecessarily waiting for a full or empty FIFO, or constant host bus computer bus arbitration, causing data transfer inefficiencies. Thus, according to the principles of this invention, when the host computer bus speed is slower than the SCSI bus speed, e.g., a slow ISA bus vs. a fast SCSI channel, the threshold value for data FIFO memory circuit 360 is set to a minimum value, i.e., zero.

Hence, in reading data from SCSI bus, host adapter 7770 starts transferring data from data FIFO memory circuit 360 to host memory as soon as data is available in data FIFO memory circuit 360. Similarly, in writing data to SCSI bus, host adapter starts transferring data from host memory to data FIFO memory circuit 360 as soon as there is room in data FIFO memory circuit 360. Thus, when the SCSI data transfer rate is much faster than the host data transfer rate, in a write operation to a SCSI device, the host is kept on the bus as much as possible, since the host data transfer rate is the limiting factor. Similarly in a read operation, data is transferred from data FIFO memory circuit 360 as soon as there is data available because the SCSI device can fill the data FIFO memory circuit 360 faster than the host can empty it.

When the host computer bus speed is nearly equal to the SCSI bus speed, e.g., an 8 MByte/s host bus v. 10 MByte/s SCSI bus, the threshold value for data FIFO memory circuit 360 is set at an intermediate value between the minimum and maximum values, typically 50%. Hence in reading data from SCSI bus 210, host adapter 7770 starts transferring data from data FIFO memory circuit 360 to host memory 230 as soon as data FIFO memory 915 in data FIFO memory circuit 360 is 50% full and continues until data FIFO memory 915 is empty. Similarly, in writing data to SCSI bus 210, host adapter 7770 starts transferring data from host memory 230 to data FIFO memory circuit 360 as soon as data FIFO memory 915 in data FIFO memory circuit DFIFO is 50% empty and continues until data FIFO memory 915 is full.

Thus, unlike prior art SCSI host adapters that added to the command overhead by inefficient host computer bus utilization, data FIFO memory circuit 360 and the attendant features are included in the data path to maximize the efficiency of host computer bus 226 thereby further minimizing the command overhead. Data is transferred at the maximum rate possible, leaving host computer bus free 226 for other activity, such as running an applications program on host microprocessor 221.

Upon power-up of computer system 220, host adapter driver 260 is loaded in memory 230 and subsequently, initializes host adapter 7770, performs diagnostics on host adapter 7770, and downloads the sequencer firmware to sequencer memory 441. When user application 401 instructs microprocessor 221 to either read data on or write data to SCSI device 141, for example, microprocessor 221 through operating system 402 vectors the request to device driver 1001. Device driver 1001 is designed to interface with another driver according to standards such as ASPI or LADDR. OSM 461 similarly is designed to interface with a device driver with such an interface. The specific operation of OSM 461 depends on the particular operating system 402. However, one skilled in the art is familiar with the requirements for configuring OSM to interact with interfaces such as ASPI or LADDR. Further, one embodiment of an OSM is included in Microfiche Appendix A, which is incorporated herein by reference in its entirety. In response to the instructions from device driver 1000, OSM 461 builds a sequencer control block. A sequencer control block (SCB) defines the SCSI command which is to be executed by host adapter 7770 and is the method used by host adapter driver 260 to communicate SCSI commands to host adapter 7770.

Specifically, as explained more completely below, the SCB includes a pointer to the SCSI command, a SCSI command length count, a pointer to a scatter/gather data transfer pointer list, a count of the number of elements in the scatter/gather list, the status returned by the target as well as temporary holding location and other statuses.

Some of the values in the SCB are provided subsequently by HIM 462 or sequencer 320. Upon completion of the sequencer control block, OSM 461 calls HIM 462 to send the SCB to host adapter 7770.

HIM 462 tracks SCB slots "0" to "3" in SCB array 443 to determine the number of free SCB slots. If a SCB slot is free, HIM 462 sets bit PAUSE in register HCNTRL in registers 411 thereby pausing sequencer 320. (The registers and bits within registers are described more completely in Appendices I, II, and III, which are incorporated herein by reference in their entirety.) This prevents sequencer 320 and HIM 462 from colliding on CIOBUS 350. When HIM 462 detects that bit PAUSEACK in register HCNTRL is active, HIM 462 saves the pointer in bits SCBVAL, i.e., bits 2:0 in register SCBPTR, so that the pointer may be restored later.

HIM 462 loads register SCBPTR with the page number of the empty SCB that HIM 462 wishes to load. The SCB is then loaded into the select slot, e.g., slot 0, in SCB array 443. The page number that was written in register SCBPTR is written to a four byte queue-in FIFO 412 through port register QINFIFO. Writing to register QINFIFO increments queue-in count register QINCNT in general control registers 414. After the SCB slot is loaded, HIM 462 restores the stored pointer to register SCBPTR and unpauses sequencer 320. Sequencer 320 continues with the sequence of operations that it was performing prior to being paused.

If a SCB slot is not available in SCB array 443, as indicated by the value of register QINCNT, HIM 462 queues the SCB in memory 230. When a SCB slot becomes available in SCB array 443, HIM 462 sends the oldest SCB in memory 230 using the process just described.

In one embodiment, SCB array 443 is a 128×8 RAM cell plus additional logic to selectively decode only 32 locations at a time. The group of 32 locations (called a page or a SCB slot) is selected by the value of bits SCBVAL in SCB pointer register SCBPTR in registers 421. Each page represents one SCB. Each of the 32 locations in an SCB slot may be accessed by a normal read or write to the address range assigned to SCB array 443.

Sequential locations in SCB array 443 are loaded rapidly using a SCB address register SCBCNT in registers 421 with the most significant bit SCBAUTO set to one. When bit SCBAUTO is set, the offset address into SCB array 443 is provided by bits [0:4] of register SCBCNT instead of the address supplied by CIOBUS 350.

Hence, with register SCBCNT providing the offset address, an SCB is loaded into SCB array 443 at the initial address retrieved from queue-in FIFO 412 in host interface module 310 and the address is automatically incremented with each write, i.e., register SCBCNT is automatically incremented with each write. Automatic increments for reads are also implemented using register SCBCNT. This feature may be used with the REP OUTSB instruction of the 286/386 microprocessor instruction set to quickly load an SCB into SCB array 443. The REP INSB instruction may be used to read the contents of an SCB. Bit SCBAUTO must be cleared to allow random access to SCB array 443.

With the queued commands in SCB array 443, more than one target device may have commands open but disconnected. The four SCB slots are for general purpose SCBs and the SCBs in the four SCB slots may be used in any combination on either SCSI channel in SCSI module 330. To preserve the order of execution for any target/LUN combination, the restriction is made that no more than two SCBs with the same target/channel/LUN identification can be loaded in SCB array 443. This restriction does not apply to tagged commands.

When sequencer 320 is not executing a SCSI command, sequencer 320 is in an idle loop and periodically scans the value of register QINCNT to determine whether a new SCB has been loaded in SCB array 443. When a queued SCB is detected by reading register QINCNT, sequencer 320 loads SCB pointer register SCBPTR in registers 411 with the page number of at the top of queue-in FIFO 412, which in turn decrements register QINCNT.

Since the address for every SCB is loaded into register SCBPTR and subsequently into the sequencer address circuitry, sequencer 320 must only specify an offset to obtain information from or write information to the active SCB. This greatly simplifies the sequencer firmware and thereby reduces the size of sequencer RAM required.

The new SCB contains pointers to the SCSI command to be completed as well as the locations in host memory 260 to read or write data. Sequencer 320 attempts to execute the new SCB if it does not conflict with an already open SCB, i.e., the target/channel/LUN in the new SCB matches the target/channel/LUN in the SCB for an open command. If the new SCB does conflict with an open command, the pointer for the SCB in register SCBPTR is written back to queue-in FIFO and register QINCNT incremented.

As just indicated, once a command is started, the target may disconnect. If a target does disconnect, sequencer 320 saves data pointers in the SCB for the command and marks the SCB as disconnected. In this case, sequencer 320 enters the idle loop and looks for the next SCB to execute. Notice that this is all done without the assistance of HIM driver 462.

When reselection occurs, a search for a disconnected SCB with the same target/channel/LUN is made and when found, the disconnected SCB is continued. If two reselections, one on each channel, happen at the same time, a fairness algorithm, which is explained more completely below, is used to prevent one channel from being locked out.

In the case of tagged commands, the number of SCBs to the same target/channel/LUN may equal the space in SCB array 443. The commands are sent with the tag value generated by sequencer 320. Upon reselection, sequencer 320 matches target/channel/LUN/tag before completing the command.

When sequencer 320 is finished with the command, sequencer 320 moves the SCB pointer from register SCBPTR to queue-out FIFO 413 through data port register QOUTFIFO and generates a hardware interrupt to microprocessor 221 by setting bit CMDCMPLT, i.e., bit 1 in register INTSTAT.

Writing to register QOUTFIFO increments the value in register QOUTCNT.

In response to the hardware interrupt, host microprocessor 221 transfers control to OSM 461 which in turn calls the interrupt handler in HIM 462. HIM 462 queries interrupt status register INTSTAT in registers 411 to determine the cause of the hardware interrupt. HIM 462 notes that the SCSI command was completed and then queries queue-out FIFO 413 to determine which SCB was completed. HIM 462 transfers that information to OSM 461 which in turn notifies user application 401 and issues an end of interrupt signal EOI to microprocessor 221. OSM 461 then directs HIM to release the completed SCB.

A key aspect of this invention is the queuing of SCBs on-board host adapter 7770. Holding the SCBs and hence, the SCSI commands, in a queue allows sequencer 320 to execute or suspend execution of a command at any point in the command sequence by placing the SCB back in queue-in FIFO 412 and updating the SCB to indicate the current completion status of the command. This ability to switch back and forth between SCBs, i.e. back and forth between SCSI commands, is referred to as context switching.

SCB array 443 typically has more than one SCSI command ready to execute at a time. This command queuing further reduces to the command overhead of host adapter 7770. For example, consider a queue of two commands, i.e., two SCBs in SCB array 443. There are two possibilities. First, the commands may be for the same SCSI device, and second, each command may be for a different SCSI device.

In the first case, for a SCSI device which takes only one command at a time, a performance advantage is obtained by starting the second command immediately following the first command. In normal operation, host adapter driver 260 responds to a hardware interrupt after some hardware interrupt response time. This time is serial to the execution of the two commands unless the commands are queued. If the commands are queued, the initial SCSI protocols for the second queued command are executed in parallel with the interrupt response time for the completion of the first queued command.

In the second case, under normal operation a SCSI disk drive disconnects from host adapter 7770 while the drive mechanics are repositioned. If commands are queued, the SCSI bus may be used to start or continue a command to the other SCSI device while the SCSI disk drive repositions the drive mechanics. This provides overall improved system performance. Other host adapters also issue SCSI commands in parallel.

The paging feature of SCB array 443 is another key element of the context switch feature of this invention. Sequencer 320 loads SCB pointer register SCBPTR with the page number of the current SCB. Hence, the firmware running in sequencer 320 must only address register SCBPTR to obtain the address for the current SCB. In this way, all SCBs effectively appear at the same address to sequencer 320, i.e., the address of register SCBPTR. This allows the same process to operate in sequencer 320 independently of which SCB is currently active which in turn simplifies the sequencer firmware, and reduces the size of the required RAM. This paging feature also allows the start of the next SCSI command before the end of the first is acknowledged by host adapter driver 260 thereby reducing the overhead of the SCSI command, as explained above.

Scatter/gather is implemented as a part of the normal operation of sequencer 320 for all data transfers. A Scatter/gather transfer is characterized by using a list of data segments which host adapter 7770 uses to transfer data to or from the SCSI bus. The list is composed of 1 to 255 elements. Each element has a segment data pointer (4 bytes) and a segment byte count (4 bytes). The scatter/gather list pointer is always valid and is used to obtain the elements of the list. Each segment is transferred as a stand alone entity until the number of segments transferred is equal to the scatter/gather segment count.

Data transfer is enabled by setting up SCSI module 330, data FIFO memory circuit 360, and host interface module 301 with regard to direction, pointers and count values. Data FIFO memory is cleared, and bits HDMAEN, SDMAEN, and SCSIEN in register DFCNTRL are set to one. Transfers may be disabled by clearing any of these bits, but they should be polled for zero before the transfers are guaranteed to have stopped.

The segment byte count is to be loaded into a SCSI counter STCNT in registers 421 and into counter HCNT in registers 441 by sequencer 320. The segment data pointer is loaded into host address registers HADDR in registers 411 and shadow host address registers SHADDR in registers 421 by sequencer 320 and the data transfer is started. When the SCSI counter STCNT is zero, the next segment data pointer and segment byte count are read from host memory using the list pointer. Sequencer 320 loads the new segment values in the hardware and starts the transfer in the normal manner. A more detailed discussion of these steps is given in the description of the sequencer firmware below.

The working values of the list pointer and segment count value are stored in scratch RAM 442. The current value of the segment data pointer is obtained from registers SHADDR and the value of the segment byte count is obtained from SCSI counter STCNT. If a "Save Data Pointers" message is received before a "Disconnect" message, the working values are saved in the SCB. If a "Disconnect" message is received without a "Save Data Pointers" message, the current value in the SCB is not modified.

To support scatter/gather data transfers, data transfer through SCSI module 330 can be stopped and restarted without losing data. The sequencer data path that is used to retrieve the next list element from system memory 230 does not interfere with the data path to SCSI bus 210.

If an error occurs during the execution of the SCSI command in a SCB, sequencer 320 updates the status information in the SCB, loads an interrupt code in register INTSTAT and sets bit SEQINT. When HIM 462 receives the interrupt, HIM 462 reads queue-out FIFO 413 to get the value of the SCB that has just finished. If an error occurred, HIM 462 saves the SCB pointer value, loads the SCB pointer of the finished SCB and reads the SCB information. All status information is reported in the SCB. After HIM 462 handles the interrupt, HIM 462 restores the SCB Pointer and clears bit PAUSE to continue processing by sequencer 320 if it is appropriate.

If sequencer 320 needs assistance to execute a command in an SCB, sequencer 320 also generates an interrupt with the appropriate interrupt code in register INTSTAT. Interrupts fall into four basic classes, normal operation, driver intervention, error, and diagnostic. The interrupt status is given in register INTSTAT. Sequencer 320 does not have to be paused for HIM 462 to read register INTSTAT.

As indicated above, bit CMDCMPLT in register INTSTAT is set by sequencer 320 to indicate that a command in a SCB has been completed and the location of the SCB has been written to queue-out FIFO 413. Sequencer 320 continues to execute any other SCBs that have been loaded. HIM 462 can read register QOUTFIFO and register QOUTCNT until queue-out FIFO 413 is empty without pausing sequencer 320. Thus, HIM 462 can service commands that have completed without error without pausing sequencer 320.

Sequencer interrupts, which are generated when bit SEQINT is set, are interrupts that require HIM 462 to intervene in the normal operation of sequencer 320 to perform a lengthy or difficult operation. In addition to setting bit SEQINT, sequencer 320 sets an interrupt code INTCODE in register INTSTAT.

When bit SEQINT is set, sequencer pauses itself by halting the clock signal to the pipeline register. HIM 462 determines the reason for the interrupt by reading register INTSTAT. HIM 462, as explained above, has the ability to access all registers in host adapter 7770 and may control SCSI bus 210 to service the interrupt.

When the interrupt is serviced, sequencer 320 may be restarted by clearing bit SEQINT bit and writing a zero to bit PAUSE in register HCNTRL. The sequencer firmware, as explained more completely below, is structured to continue after HIM 462 is finished handling the particular situation. Care is taken to restore all pointer registers which may be used by sequencer 320 before unpausing sequencer 320. The interrupt codes that may appear in bits 4–7 of register INTSTAT are given below in the description of HIM 462. These bits are only valid when bit SEQINT is set.

A SCSI interrupt is caused by some catastrophic event such as a SCSI reset, SCSI parity error, unexpected bus free, or selection timeout. A SCSI interrupt is generated by SCSI module 330 for any SCSI event that is enabled in registers SIMODE0 or SIMODE1. Sequencer 320 is also paused by this interrupt. A SCSI interrupt generates a hardware interrupt only if bit INTEN in register HCNTRL is set.

Interrupt BRKADRINT is used with special diagnostic code for the purpose of debugging sequencer firmware, or for the detection of a hardware failure. The sequencer is paused by this interrupt. This interrupt is used with a sequencer diagnostic feature which allows HIM 462 to stop sequencer 320 at a predetermined address. The predetermined address is loaded in registers BRKADDR0 and BRKADDR1 with bit BRKDIS (bit 7, BRKADDR1) cleared. When the value of program counter 530 equals the value loaded in register BRKADDR, sequencer 320 is paused and bit BRKADRINT in register INTSTAT is set. If bit BRKADRINTEN in register SEQCTL is set, IRQ pin is also driven active.

Interrupt BRKADRINT is cleared by setting bit CLR-BRKADRINT in register CLRINT.

Interrupt BRKADRINT is also set upon detection of an illegal opcode, illegal I/O address, or sequencer RAM parity error. This feature is disabled by setting bit FAILDIS in register SEQCTL.

Interrupt line IRQ is also driven by setting bit SWINT in register HCNTRL for a software interrupt and bit INTEN is set. The signal on line IRQ remain active until bit SWINT is cleared.

Power may be conserved by degating the clock to most of host adapter 7770. Setting bit POWRDN in register HCNTRL will causes the entire host adapter, with the exception of I/O decode logic, to remain in a quiescent state. This disables any interrupts that may be generated independent from the clock. Interrupts pending in this case drive line IRQ as soon as bit POWRDN is cleared.

In the event that an error occurs on a target, a check condition is sent to host adapter 7770 in the status byte of the SCB. In this case, sense information is kept by the target pertaining to the command which was in error for host adapter 7770. This information is kept until the next command is sent to the target. Sequencer 320 interrupts HIM 462 and pauses itself upon receipt of any non-zero status from the target after the command completes. HIM 462 gets all information from the SCB and then reloads the SCB with a SCSI sense command. HIM 462 restarts sequencer 320 at the point where sequencer 320 executes the sense command.

When HIM 462 receives an abort request as the interrupt code in register INTSTAT, the SCSI command could be in several states of execution. The SCB for containing the command may be in HIM's own SCB queue, in queue-in FIFO 412, in SCB Array 443 but disconnected, or active on the SCSI bus. If the SCB is in HIM's own queue, it need only remove it and report completion. If the SCB is not there, HIM 462 pauses sequencer 320 and searches queue-in FIFO 412, first. If the SCB is there, HIM 462 removes that entry from the queue and unpauses sequencer 320.

If the SCB is in SCB array 443 and either waiting for selection or disconnected, HIM 462 clears those status bits in the SCB. When sequencer 320 responds to the selection or reselection, it discovers that there is no command available and issues the "Abort" message on the SCSI bus.

If the SCB is active at the time, HIM 462 recovers by sending an Abort message, completing the command, or resetting the SCSI bus.

There are occasions when a SCSI command terminates with a busy bit set in the SCB status byte. Sequencer 320 generates an interrupt with a non-zero status interrupt code. HIM 462 handles the option of retrying the command or reporting the error to the original caller.

To execute a tagged command, the tag enable bit in the control byte of the SCB must be set. The type of tag is also indicated by coding bits 0 and 1 of the same byte. A 00 means a simple queue is intended, a 01 means a head of queue message is sent, and a 10 means an ordered queue message is sent. The tag value is the address of the SCB in the array. The tag message is first sent to the target after selection, and then expected from the target after reselection. Once the tag value is received, the correct SCB is chosen and the command is resumed.

SCSI command linking is implemented by HIM 462. Sequencer 320 responds with an interrupt code of "Unknown Message In". In response, HIM 462 reloads the SCB array with the new SCB and restarts sequencer 320 at the entry which will execute the new command.

In this embodiment of host adapter 7700, target mode is not implemented. However, target mode may be implemented with some sequencer firmware to handle the Select In sequence on the SCSI bus. Sequencer 320 would respond to selection, accept the ID and SCSI Command, and then disconnect. Detection of a Select In would interrupt HIM 462 to pass the initiator/Lun information. HIM 462 would prepare a target command to pass data and complete the handshaking of the command.

Sequencer 320 (FIG. 3), as explained above, is controlled by microcode that resides within random access memory of sequencer 320, i.e., sequencer RAM 441. Sequencer 320 interfaces with other modules 310, 330, and 360 as well as scratch RAM 442 and SCB array 443 through CIOBUS bus 350 and selected control signals. While, in this embodiment, sequencer 320 is utilized in host adapter 7770, sequencer 320 is a general RISC processor that may be utilized in a wide variety of applications.

Figure 6:
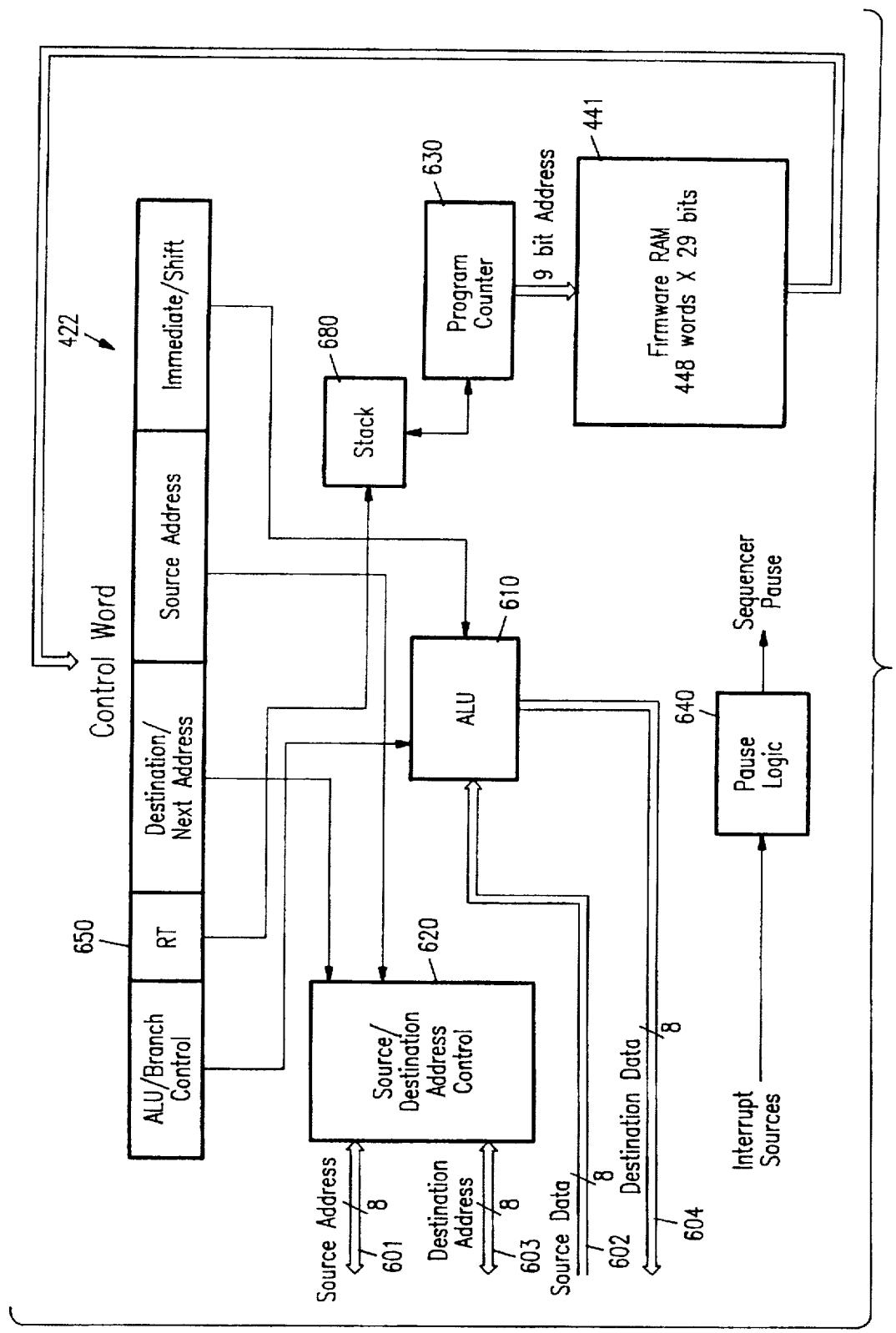
FIG. 6 is a block diagram of the novel RISC processor of this invention.

As previously described, thirty-five bit CIOBUS 350 includes two data buses, an eight-bit source data bus, i.e., CSDAT bus 602 (FIG. 6), and an eight-bit destination data bus, i.e., CDDAT bus 604, as well as two eight-bit address buses, a source address bus, i.e., CSADR bus 601, and destination address bus, i.e., CDADR bus 603, a read enable signal line CSREN-, a write enable signal line CDWEN-, and a read busy signal line CRBUSY. The operation of these control signals is described more completely below.

There are three primary modes of operation for sequencer 320 (FIG. 3) of this invention. In a first mode of operation, sequencer 320 is in control of CDADR and CSADR buses 601, 603. In this normal mode of operation, sequencer 320 is controlled by sequencer firmware residing in sequencer RAM 441.

In a second mode of operation, software driver 260 is in control of both CDADR and CSADR buses 601, 603. In this mode, software driver 260 first pauses sequencer 320 which causes sequencer 320 to stop executing instructions and relinquish control of CDADR and CSADR buses 601, 603. As sequencer 320 relinquishes control of CDADR and CSADR buses 601, 603, sequencer 320 generates a signal that sets bit PAUSEACK in register HCNTRL. Software driver 260 performs the desired operations and upon completion of these operations restarts sequencer 320 by releasing the pause signal. Upon release of the pause signal by software driver 260, sequencer 320 resumes operation in the normal mode.

A third mode of operation of sequencer 320 is a "debug" mode. In the debug mode, software driver 260 can (1) pause sequencer 320 and single step through sequencer microcode in sequencer RAM 441; (2) pause sequencer 320 when program counter 630 reaches a known value; and (3) unpauses sequencer 320 and restart execution at a different location. Each of the modes of operation are described more completely below.

Figure 14A:
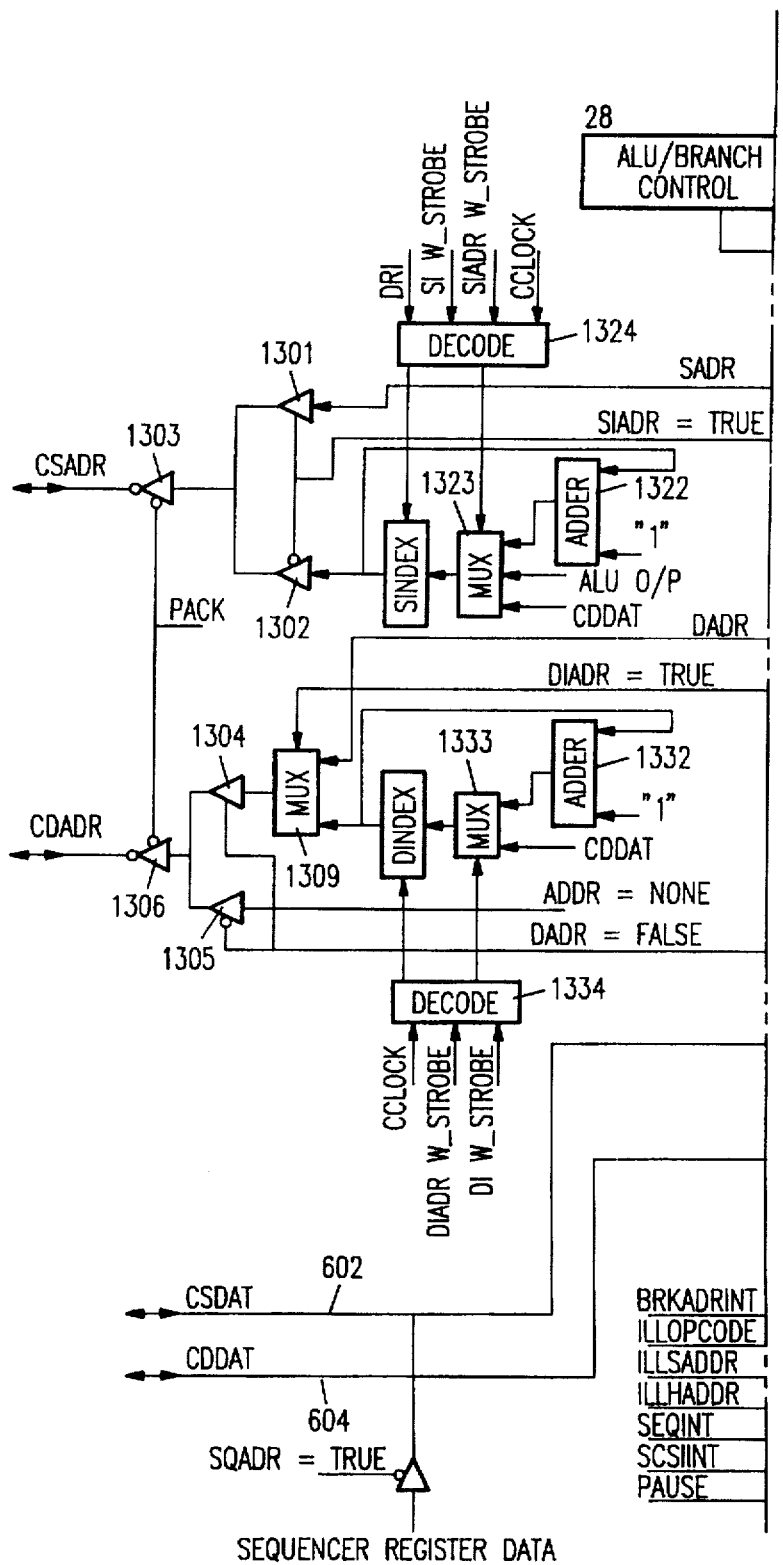
FIG. 14, which is a key to FIGS. 14A, 14B, and 14C, is a more detailed diagram of the sequencer of this invention.
Figure 14B:
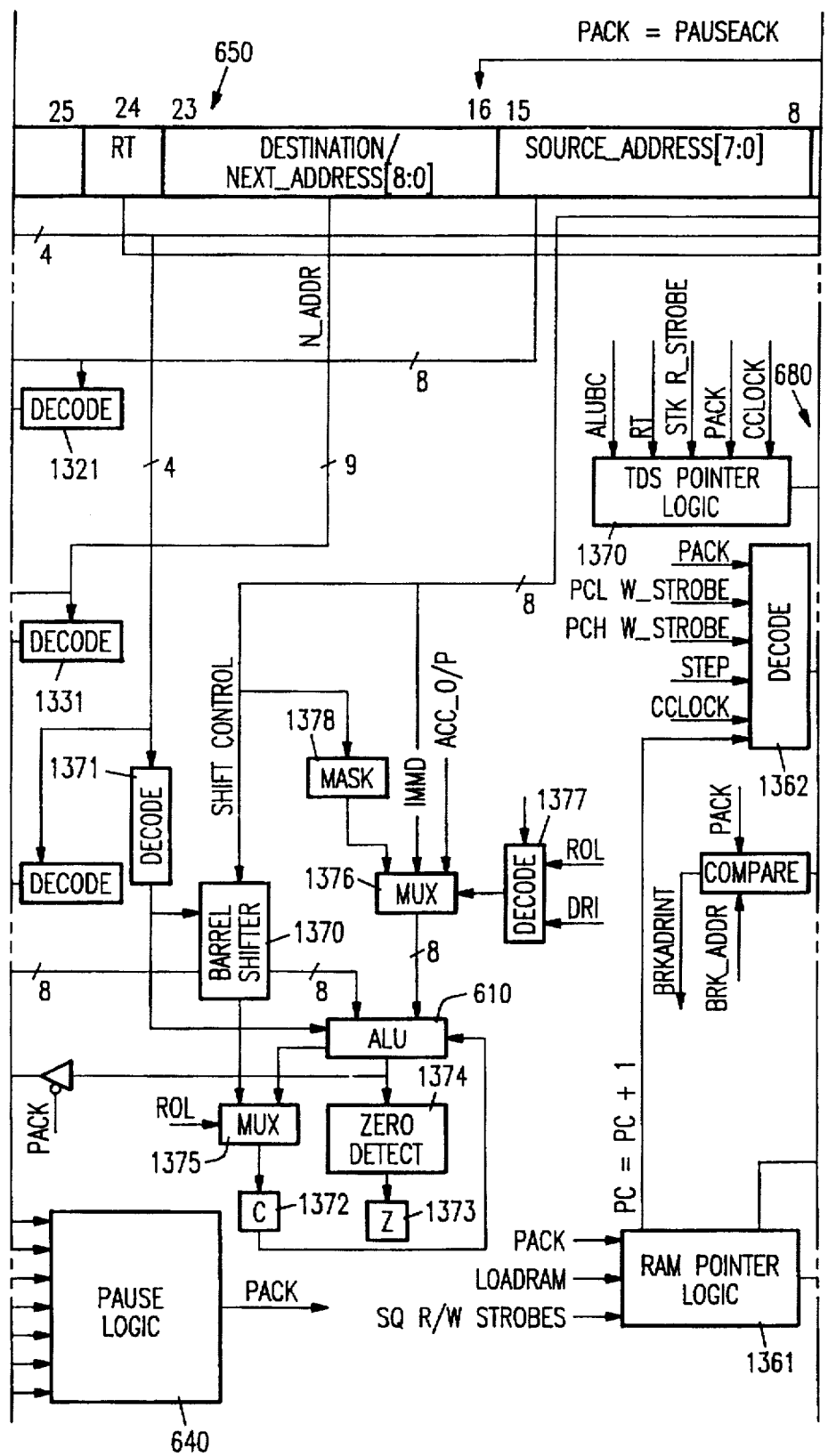
Figure 14C:
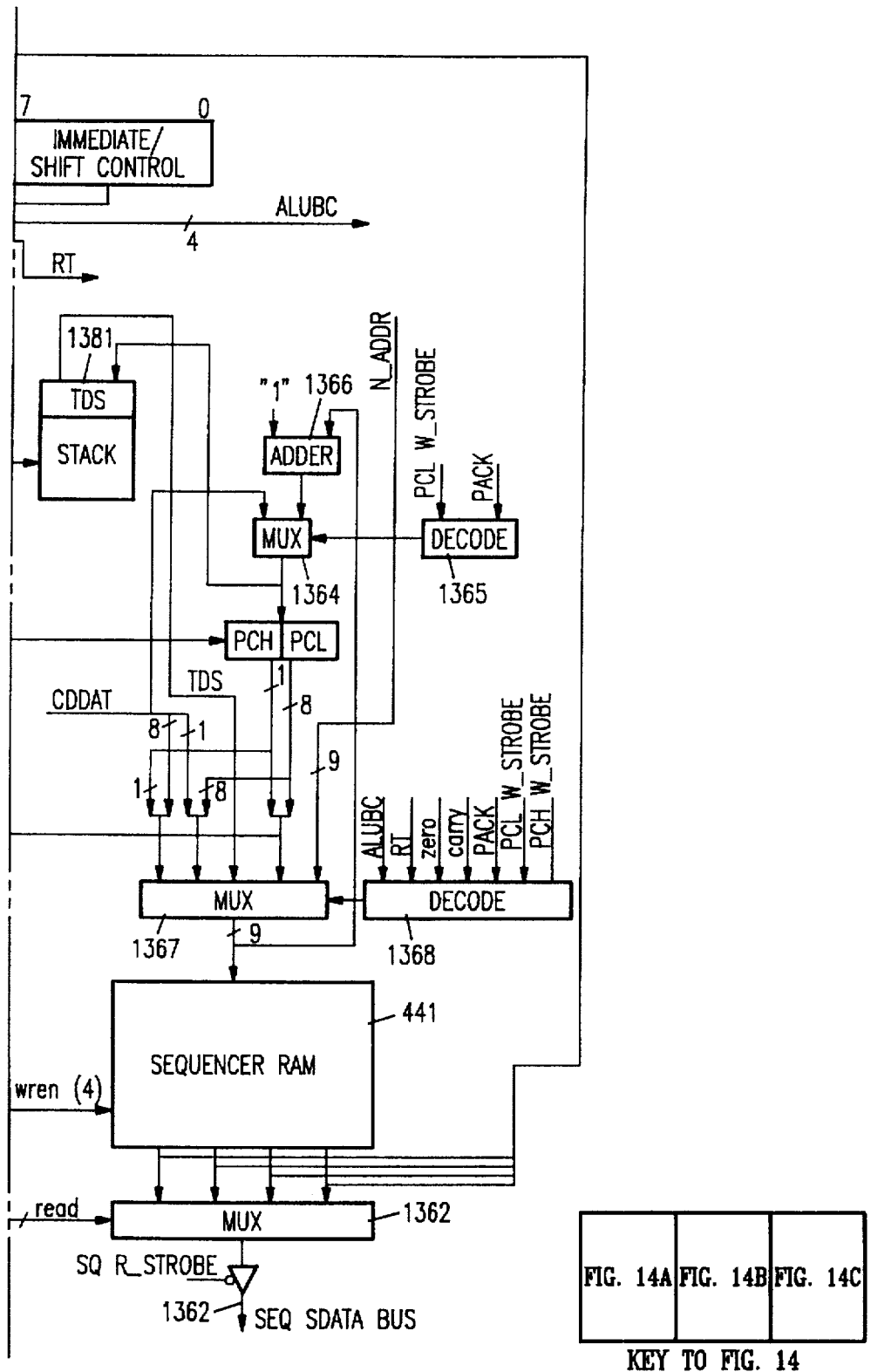

FIG. 14 is a diagram of the signal interface of one embodiment of sequencer 320 showing the input signals and output signals to sequencer 320. Microfiche Appendix B includes a complete set of detailed schematics for one embodiment of sequencer 320, which are incorporated herein by reference in their entirety. Table 1 includes the symbol name for each signal, the type of signal, the signal drive and a brief description of the signal.

TABLE 1

| SEQUENCER SIGNAL IDENTIFIERS | | | |
|---|---|---|---|
| SYMBOL | TYPE | DRIVE | DESCRIPTION |
| POR | I/1 | 4X to 8X | Power up reset. |
| CSREN- | TS/1 | 4X to 8X | Source data read enable. |
| CDWEN- | TS/1 | 4X to 8X | Destination data write enable. |
| CSADR- | TS/8 | 4X to 8X | Source address. |
| CSDAT | TS/8 | 4X to 8X | Source data. |
| CDADR- | TS/8 | 4X to 8X | Destination address. |
| CDDAT | TS/8 | 4X to 8X | Destination data. |
| SEQINT | I/1 | 2X | Sequencer interrupt. |
| PAUSE | I/1 | 2X | Pause request from Host. |
| ILLADDRLEV | I/1 | 2X | Illegal Sequencer address level interrupt. |
| ILLADDR | I/1 | 2X | Illegal Sequencer address clocked interrupt. |
| SQCLOCK | I/1 | 2X | Sequencer clock. |
| ICLK | I/1 | 4X to 8X | Interrupt clock used in interrupt logic. |
| BRKADRINT | O/1 | 4X to 8X | Break address equal interrupt. |
| BRKADRINTEN | O/1 | 4X to 8X | Break address equal interrupt enable. |

TABLE 1-continued

SEQUENCER SIGNAL IDENTIFIERS

| SYMBOL | TYPE | DRIVE | DESCRIPTION |
|---|---|---|---|
| ILLOPCODE | O/1 | 4X to 8X | Illegal opcode encountered. |
| FAILDIS | O/1 | 4X to 8X | Disable illegal opcodes and addresses. |
| PAUSEACK | O/1 | 4X to 8X | This signal switches control between the Host and the Sequencer and vice versa. |
| FASTMODE | O/1 | 1X | Input clock divide by 2 or 4. |
| STEPCMP | O/1 | 2X | Pulse to HIC to indicate completion of a single step operation. |
| SEQBUSY | O/1 | 2X | Signal indicating read address is within Sequencer address space. |
| CRBUSY | I/1 | 4X to 8X | Chip read busy signal. |
| TEST[7:0] | I/8 | 2X | Test control signals. |
| PERROR | O/1 | 2X | Sequencer RAM parity error. |
| PAC2SCB | O/1 | 4X to 8X | Pause signal to SCB Ram array. |
| PAC2ADR | O/1 | 4X to 8X | Pause signal to Common logic cell. |

O = output; I = Input; TS = tri-state

A drive of "1X" is considered normal. The higher drive signals are widely routed and are the more dynamic signals, meaning that they change state frequently.

FIG. 12 is a block diagram of each register in register 421 (FIG. 4) within this embodiment of sequencer 320. Each register is represented by a column in FIG. 12. The first row in the column gives the address for the register and the register name. The second row indicates whether the register is read only "R", write only "W", or read and write "R/W". The last eight rows in the column represent the bits in the register. The first number in these rows is the bit location within the register. The alphanumeric string is the name of the bit. If a number in quotes is used in place of the alphanumeric string, the number is the value of the bit. A "(0)" after the alphanumeric string indicates that the bit is cleared when bit RESET is active. A "(1)" after the alphanumeric string indicates that the bit is set when bit RESET is active. A "(x)" after the alphanumeric string, where "x" is a number other than zero or one, indicates that the bit is in an unknown state after reset. Each bit in FIG. 12 is described more completely in Appendix I. Herein, a bit that is set is loaded with a one and a bit that is cleared is loaded with a zero.

Sequencer control register SEQCTL contains bits that control the operation of sequencer 320. Sequencer RAM data register SEQRAM is a port to sequencer RAM 441. Sequencer RAM 441 can be loaded by first pausing sequencer 320 and then asserting bit LOADRAM in register SEQCTL. The starting address is written into registers SEQADDR0 and SEQADDR1 before writing to this register. The byte ordering should be from the least significant byte first to the most significant. The address automatically increments after the most significant byte is written to facilitate loading the program.

Figure 56:
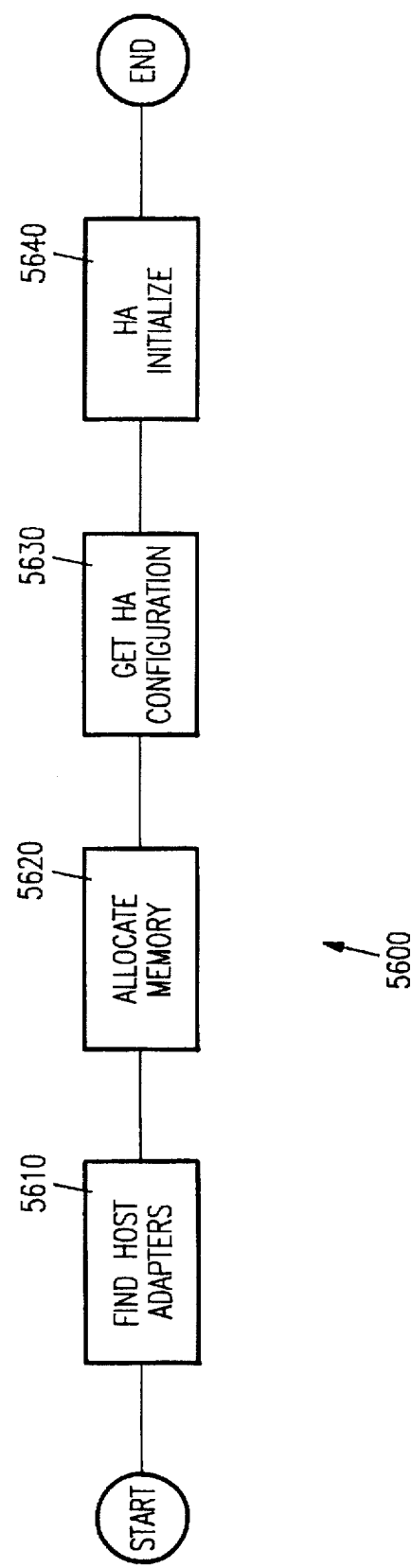
FIG. 56 is a process flow diagram that illustrates the steps in the initialization of the host adapter integrated circuit of this invention.

Sequencer address registers SEQADDR0/1 contain the address of the instruction within sequencer RAM 441 that is executed on the next clock edge. These registers may be written to for the purpose of changing the execution location after first pausing sequencer 320. These registers may also be written to on the fly by sequencer 320. Either the low byte or the high byte may be written to when sequencer 320 has not been paused. This accomplishes an indirect jump instruction. These registers are also used to specify the starting location when loading sequencer firmware in host adapter initialization process 5640 (FIG. 56). The address is automatically incremented while loading the sequencer firmware after every fourth byte. The fourth byte index is cleared when these registers are written. Each bit of these two registers powers up to a value of zero.

Accumulator register ACCUM is a temporary holding place for arithmetic or logical operations. This register is the second source to the ALU when the value of the 'immediate' field in the microcode word, which is described more completely below, is zero. An exception to this is for ORI operations where operand2 is always the value contained in the immediate field. All bits of this register power up to a value of zero.

Source index register SINDEX is a temporary holding register or may be used as an indirect address for source operands for some ALU operations. HIM 462 must not use this register to indirectly address a source operand. All bits of this register power up to a value of zero.

Destination index register DINDEX is a temporary holding register or may be used as an indirect address for destination operands for some ALU operations. HIM 462 must not use this register to indirectly address the destination. All bits of this register power up to a value of zero.

Break address low register BRKADDR0 is used for diagnostic purposes to halt sequencer 320 at a specific address. This register is loaded with the lower byte of the break address. All bits of this register power up to a value of zero.

Break address high register BRKADDR1 is used for diagnostic purposes to halt sequencer 320 at a specific address. This register is loaded with the upper byte of the break address. In addition, bit 7 is a break condition disable. To break at an instruction located at address 'X' the value of the break address should be 'X+1' provided the instruction at address 'X+1' is the logical outcome of the instruction located at 'X'.

Source data equals FFh register ALLONES is used to feed a value of FFh onto operand1 to ALU 610. Source data equals 00h register ALLZEROS is used to feed a value of 00h onto operand1 to ALU 610. Write destination equals none register NONE is used as the destination when it is desired to make no change to any location.

Carry and zero flags register FLAGS stores the carry flag and the zero flag.

Indirect address for source register SINDIR is used for indirectly addressing the source data. When a transfer is done from this port, the contents of register SINDEX are used as the source address. The contents of register SINDEX are auto-incremented the clock cycle after this register has been addressed. The address for register SINDIR must not be used by HIM 462.

Indirect address destination register DINDIR is used for indirectly addressing destination write register DINDEX. When a transfer is done to this port, the contents of register DINDEX are used as the destination address. The contents of register DINDEX are auto-incremented the clock cycle after this register has been addressed. This address must not be used by HIM 462.

Function 1 register FUNCTION1 is used to perform a special function by sequencer 320 to minimize the number of instructions. Data is written to registers FUNCTION1 with valid data in bits 6 to 4. This actual value is decoded into a 1 of 8-bit positions. A value of zero gives a one in bit position zero. A value of one gives a one in bit position one. etc., with all other bit positions having a value of zero. Sequencer stack register STACK is a stack for sequencer 320. The contents of the stack are reported one byte at a time starting from the last location pushed on the stack until all entries are reported. The stack entries are reported on consecutive reads alternating low byte and then high byte. Location zero points to the last pushed entry. Location one points to the entry pushed before that, etc. The stack pointer increments after a read of the high byte. Therefore, eight reads must be made to restore the location of the stack pointer to the original value if it is intended to continue proper program execution.

Figure 13:
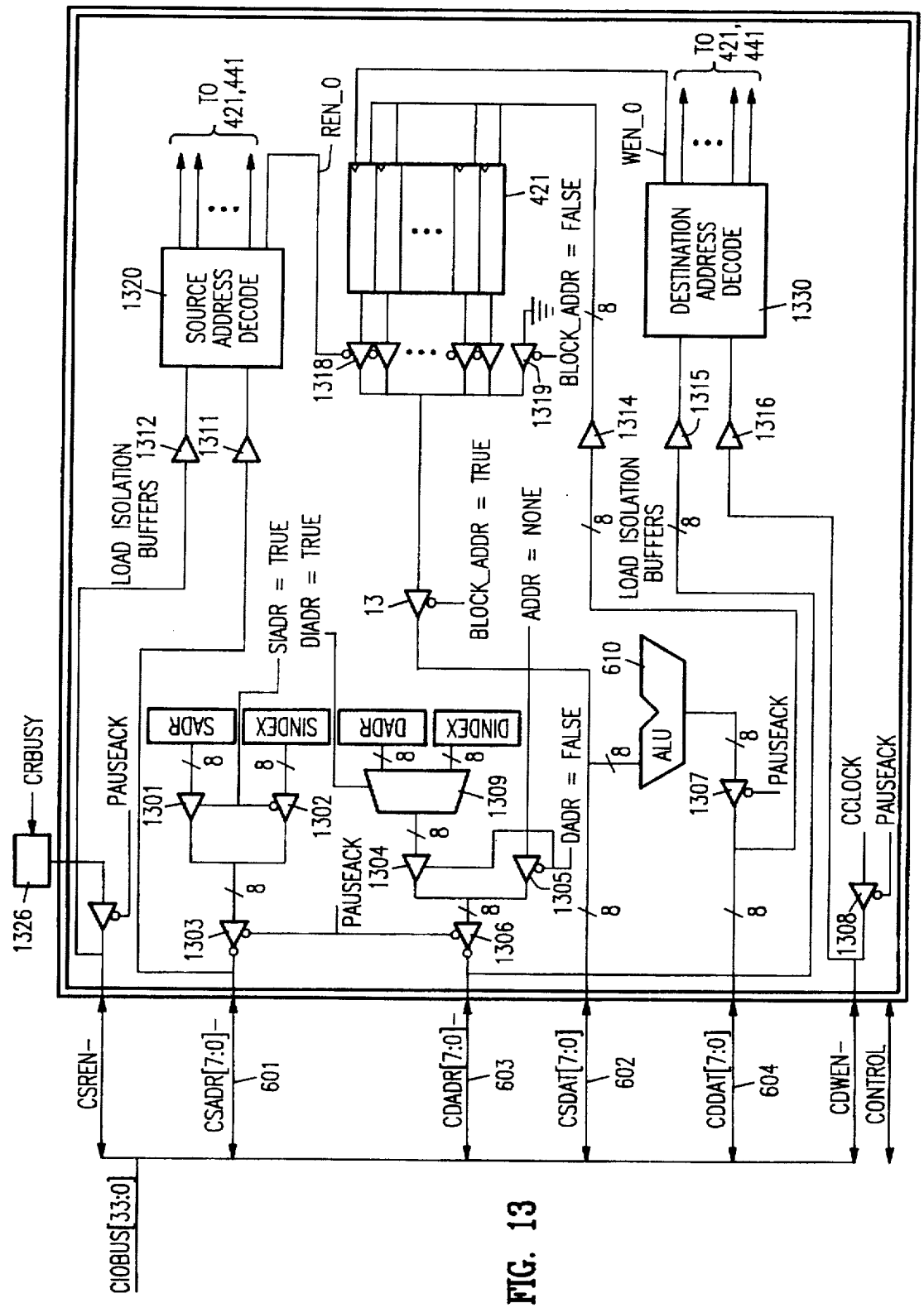
FIG. 13 is a simplified diagram of the bus structure in the sequencer of this invention.

FIG. 13 is a simplified block diagram of the bus structure of sequencer 320. The sequencer bus structure includes source address and source data bus capability as well as destination address and destination data bus capability. ALU 610 in sequencer 320 also interfaces with the sequencer bus structure. The sequencer bus structure, as explained more completely below, supports direct addressing, indirect addressing, and an address definition of "none".

Source address SADR, which is described more completely below, drives tri-state buffers 1301 while source index register SINDEX (FIGS. 12 and 13) drives tristate buffers 1302. Tri-state buffers 1301 are controlled by the signal on source indirect address line SIADR and tri-state buffers 1302 are controlled by the complement of the signal on line SIADR. The signal on line SIADR is active when indirect addressing is specified.

Since buffers 1301 for source address SADR from register 650 are controlled by the complement of the signal that controls buffers 1302 for source index register SINDEX, only one address is provided to inverting tri-state buffers 1303 which drive CSADR bus 601. The source address on CSADR bus 601 is fed through load isolation buffers 1311 to source address decode circuit 1320.

Source address decode circuit 1320 decodes the source address on CSADR bus 601 and if the address is for memory within the address space of sequencer 320, circuit 1320 generates an address and strobe for the appropriate memory location. Herein, "memory" includes sequencer RAM 441 as well as registers 421 and control register 650.

The signal on source read enable line CSREN- is passed through a load isolation buffer 1312 to source address decode circuit 1320 to enable source address decode circuit 1320. The signal on source read enable line CSREN- is controlled by circuit 1326 which is described more completely below.

Register DINDEX and destination address DADR from register 650 provide two sets of input signals to multiplexer 1309. The set of input signals passed through multiplexer 1309 is determined by a signal on destination indirect address line DIADR. The set of output signals from multiplexer 1309 drive tri-state buffers 1304. When the signal on destination address field line is active, tri-state buffers 1304 drive inverting tri-state buffers 1306. When the signal on destination address field line is inactive, buffers 1304 are tri-stated and tri-state buffers 1305 pass the value of register NONE (FIG. 12) therethrough to inverting tri-state buffers 1306. Inverting tri-state buffers 1306 drive CDADR bus 603. The destination address on CDADR bus 603 is fed through load isolation buffers 1315 to destination address decode circuit 1330. Similarly, the signal on destination write enable line CDWEN- is passed through load isolation buffer 1316 to destination address decode circuit 1330. The signal on destination write enable line CDWEN- follows the signal on line CCLOCK when the signal on pause acknowledge line PAUSEACK is low. In one embodiment, line CCLOCK is driven by an 8 MHz clock.

Destination address decode circuit 1330 decodes the destination address on CDADR bus 603 and if the address is for memory within the address space of sequencer 320, circuit 1330 generates an address and strobe for the appropriate memory location.

Inverting tri-state buffers 1303, that drive CSADR bus 601 and inverting tri-state buffers 1306, that drive CDADR bus 603, are controlled by the signal on pause acknowledge line PAUSEACK. Thus, when sequencer 320 receives the pause instruction and generates an active signal on line PAUSEACK, buffers 1304 and 1306 isolate the circuitry in sequencer 320 that drives CDADR and CSADR buses 601, 603 from these buses. At this time, signals on CDADR and CSADR buses 601, 603 from host driver 260 (FIG. 3) drive destination address decode circuit 1330 and source address decode circuit 1320.

Arithmetic logic unit 610 (FIG. 13), which is described more completely below, drives tri-state buffers 1307 which in turn drives CDDAT bus 602. Tri-state buffers 1307 are controlled by the signal on pause acknowledge line PAUSEACK. The signals on CDDAT bus 604 are also fed to registers 421.

Registers 421 drive tri-state buffers 1318. The signal on read enable out line REN_O from source address decode circuit 1320 controls the state of tri-state buffers 1318. Tri-state buffer 1319, which has the input terminal grounded, drives one line to tri-state buffers 1313. The other input lines to tri-state buffers 1313 are driven by the output signals from tri-state buffers 1318. The signal on block address line BLOCK ADDR controls tri-state buffer 1319 and tri-state buffers 1313. When the signal on line BLOCK_ADDR is inactive, buffers 1313 are tri-stated, and conversely when the signal on line BLOCK_ADDR is active, the output signals from buffers 1318 are passed through tri-state buffers 1313 to source data bus CSDAT and to one input port of ALU 1310. Tri-state buffer 1319 is used to prevent the bus structure from registers 421 from floating.

A more detailed block diagram of a portion of sequencer 320 is illustrated in FIG. 14. As previously described, each SCB invokes a SCSI command for a complete data transfer. The operations performed by sequencer 320 to complete the data transfer are defined by microcode words. A microcode word in sequencer RAM 441 is accessed using a nine bit address and the information in the microcode word is loaded in control register 650 (FIG. 14) on the active edge of a clock. In this embodiment, control register 650 is 29 bits wide.

Figure 15:
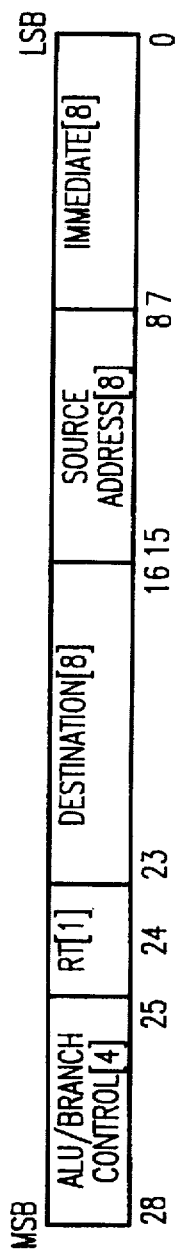
FIG. 15 is an illustration of a first format for the command line used to provide instructions to the sequencer of this invention.
Figure 16:
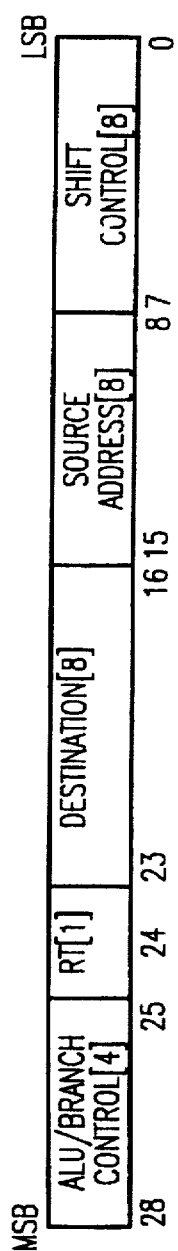
FIG. 16 is an illustration of a second format for the command line used to provide instructions to the sequencer of this invention.
Figure 17:
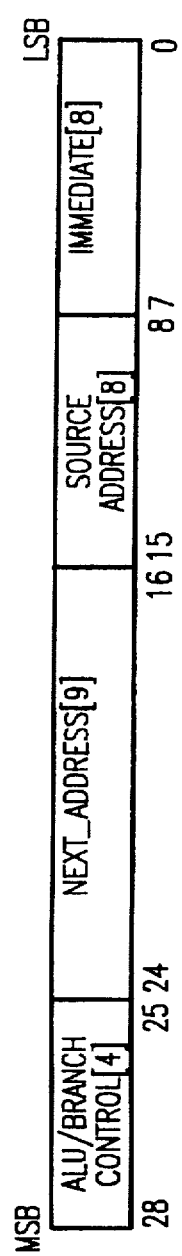
FIG. 17 is an illustration of a third format for the command line used to provide instructions to the sequencer of this invention.

FIGS. 15 through 17 are examples of 29 bit command line in register 650. The 29 bit command lines are generated by the compilation of a set of instructions that is described more completely below. Each microcode word is a command line. In general, each command line performs one of two types of operations: (i) fetch the contents of a source register, modify the contents, and save the modified contents in a destination register; or (ii) examine a register and execute the next program instruction or branch to a different instruction based on the contents of the register.

There are three command line formats that are illustrated in FIGS. 15 through 17. The first four most significant bits, bits 25 to 28, are the ALU/branch control bits and these four bits are referred to as the "ALU/branch control field" of the command line. The "ALU branch control" field is a component of all three command line types. In fact, this field is decoded to identify the particular format of the command line. The interpretation of the other fields on the command line is therefore defined by the field. In addition, the "ALU/branch control" field is an encodation of the ALU function and the branch control, which specify the primary operation to be performed by the command line. The sets of ALU functions and the branch controls are defined separately below, and are followed by a table of the encodations of the two.

In FIGS. 15 and 16, the twenty-fourth bit is return control bit RT. The single-bit return field specifies whether or not a subroutine return is executed at the end of the command line operation. When bit RT is set to one, a subroutine return is executed after the other command line operation is complete. When bit RT is set to zero, the next command line executed is the next line in the program list. Bit RT is an element of the set of branch controls, which are described below. It is the only element which is specified in a separate field. All other branch controls are encoded with the ALU functions to define the "ALU/branch control" field.

The sixteenth through twenty-third bits are the destination address, which can have a value from 00h through FFh. Bits sixteen through twenty-three are referred to as the destination address field. The destination address field can contain the write address of any internal register of host adapter 7770 plus sequencer specific functions, such as sequencer accumulators or sequencer special function registers.

In FIG. 17, the sixteenth to twenty-fourth bits provide the next address. When a branch in program execution is to be taken, the "next address" field specifies the address of the next command line to be exported.

In each of the formats, the source address is contained in the eighth through fifteenth bits, i.e., in the source address field of the command line. The source address can have any value between 00h and FFh. The source address field indicates a read address of any internal register of host adapter 7770 plus sequencer specific functions, such as sequencer accumulators or sequencer special function registers.

In the first command line format (FIG. 15) and the third command line format (FIG. 17), the immediate field occupies the seventh through zeroth bits and is a constant that is fed to ALU 10 as "operand2", as described more completely below. An immediate field with a value equal to zero has a special meaning for some ALU opcodes, as explained below. For these special cases, the constant operand is replaced by the contents of register ACCUM, the accumulator.

In the second format (FIG. 16), the seventh through the zeroth bits are a shift control field and are used to control a rotation shift function of ALU 610 and to specify how many positions the bits are moved, as explained more completely below with respect to Table 5.

Each of the three command line types was designed to perform a specific type of operation. For the command line in FIG. 15, the content of the register specified by the source field is combined with the immediate field, as specified by the opcode in the ALU/branch control field. The result is moved to the register specified by the destination field. For the command line in FIG. 16, the content of the register specified by the source field is rotated or shifted by some number of bit positions, as specified by the shift control field. The result is moved to the destination register. For the command line the content of the register specified by the source field is examined as specified by the ALU/branch control field and the immediate field. The result determines whether or not program execution branches. If the branch is taken, the next address field specifies the address of the next command line to be executed. Otherwise, the next command line in the list is executed.

The eight source address bits in control register 650 are source address SADR (FIGS. 12 and 13). The next address field, bits 16 through 24 (FIG. 16) in control register 650 contains the address of the next instruction to be executed. As sequencer 320 needs nine bits to address the range of sequencer RAM 441, instructions that specify the next address cannot have a destination address specified within the same command line. Moreover, the bit field used by the "return" encoding is interpreted as the most significant bit of the next address field.

Sequencer RAM 441 is 33×448, in this embodiment, and each word is 29 bits wide, i.e., the width of the command line and there is room for one parity bit for each of the four possible fields.

As explained more completely below, sequencer RAM 441 is written into or read from only when sequencer 320 has been paused and bit LOADRAM (FIG. 12) is set in register SEQCTL by software driver 260 (FIG. 2). The read/write operations to sequencer RAM 441 (FIG. 14) are one byte at a time. A program counter, e.g., registers SEQADDR0 and SEQADDR1, which are indicated by PCL and PCH, respectively, in FIG. 14, is first loaded with a starting address for the read/write operation by software driver 260. The read/write strobes to sequencer RAM 441 determine the number of bytes that are read/written. Similarly, read lines to multiplexer 1362 are sequentially driven by RAM pointer logic 1361 so that the four bytes in a double word are sequentially driven on source data bus 1363. Again, program counter PCH, PCL is incremented after every fourth byte by RAM pointer logic 1361 driving line PC active.

RAM pointer logic 1361 receives the sequencer read/write strobes from either source address decode logic 1320 or destination address decode logic 1330, depending on whether a read from or a write to sequencer RAM 441 is being done. As explained above, in response to the write strobe, RAM pointer logic 1361 sequentially addresses each of the four bytes in a double word over lines WREN(4) and after the most significant byte is written to RAM 441, the address in program counter PCH, PCL is incremented in response to a signal on line PC to decoder 1362. Thus, program counter PCH, PCL is also automatically incremented every four read/write strobes. All read/write operations start with the least significant bit and end with the most significant bit within the double word.

ALU 610 (FIG. 14) receives two input signals "operand1" and "operand2" and produces an 8 bit output signal that is coupled to CDDAT bus 604, as described above. Operand1 and operand2, in this embodiment, are both 8 bits wide. Data on CSDAT bus 602 are supplied to a barrel shifter 1370. Barrel shifter 1370 operates on this data as directed by the command line in control register 650. Specifically, barrel shifter 1370 receives shift control signals eight least significant bits of control register 650, i.e., the immediate/shift control field. Also, the four most significant bits of control register 650, i.e., the ALU/branch control field, drive a decode circuit 71, which in turn generates a shift parameter signal to barrel shifter 1370 and ALU 610. In response to the control signals, barrel shifter 1370 generates operand1 for ALU 610. Sources for operand2 are described more completely below. The result of any ALU operation is not necessarily stored in an accumulator, i.e., register ACCUM unless the destination address in control register 650 explicitly specifies the accumulator as the designation for the ALU output signal.

ALU operations affect a "carry" flag bit 1372 and a "zero" flag bit 1373. In one embodiment, carry flag bit 1372 and zero flag bit 1373 are the zeroth and first bits respectively in register FLAGS (FIG. 12). The output signal from ALU 610 is processed by zero detect circuit 1374 which in turn sets zero flag 1373 upon detection of a zero output signal. All ALU operations can change zero flag 1373.

Barrel shifter 1370 provides a first carry input signal to multiplexer 1375 and ALU 610 provides a second carry input signal to multiplexer 1375. The signal on left rotation line ROL to multiplexer 1375 causes multiplexer 1375 to pass one of the two carry input signals therethrough to carry bit 1372. Logic functions preserve carry flag 1372 while arithmetic and rotate options change carry flag 1372.

Conditional jumps based on the carry flag are directed to look at carry flag 1372. However, conditional jumps based on a zero condition look at the current output signal of ALU 610 operation and not at zero flag 1373.

The four most significant bits in control register 650 determine the basic ALU operation that is performed on the two input operands. As indicated above, the two input operands are called "operand1" and "operand2". The data used to generate operand1, i.e. the data on CSDAT bus 602, is determined by the source address field encoded in the command line in control register 650. When the immediate field in control register 650 has a value of zero, operand2 to ALU 610 is the value in the accumulator. Otherwise, operand2 is the value contained in the intermediate field of control register 650. Specifically, the eight bits in the intermediate field of control register 650 are a first eight-bit signal to multiplexer 1376. The eight bits in register ACCUM (FIG. 12) are a second eight-bit input signal to multiplexer 1376. Decoder circuit 1377 receives two ALU operation signals ORI and ROL which are described more completely below. And the output signal of decoder 1377 controls multiplexer.

When the immediate field has a zero value, the accumulator value is passed through multiplexer 1376 to the second input port of ALU 610. For all ALU operations ORI, operand2 is always the value contained in the intermediate field of control register 650 and the destination address is fixed as source index register SINDEX (FIG. 14).

The basic ALU operations that can be encoded in bits 24 to 29 of microcode word 650 are given in Table 2.

TABLE 2

| ALU 610 OPERATIONS | |
|---|---|
| OPERATION | DESCRIPTION |
| OR | Source data ORed with Operand2 |
| AND | Source data ANDed with Operand2 |
| XOR | Source data XORed with Operand2 |
| ADD | Source data ADDed with Operand2 w/o saved carry |
| ADC | Source data ADDed with Operand2 w/ saved carry |
| ORI | Source data ORed with Immediate value |
| ROL | Source data rotated left as specified by shift control |

The functions OR, AND, XOR perform the normal logical operations. When the immediate field is zero, operand2 is the accumulator. When the immediate field is non-zero, operand2 is the immediate. The carry flag is not altered. Function ADD performs a normal arithmetic addition. When the immediate field is zero, operand2 is the accumulator. When the immediate field is non-zero, operand2 is the immediate. The carry is not added to the source register contents and operand2. The carry flag is set to one if the sum overflows, and to zero for no overflow. Function ADC performs a normal arithmetic addition. When the immediate field is zero, operand2 is the accumulator. When the immediate field is non-zero, operand2 is the immediate. The carry is added to the source register contents and operand2. The carry flag is set to one if the sum overflows, and to zero for no overflow. Function ORI logically ORs the source register with the immediate field for all values of the immediate. Destination of the result is source index register, SINDEX. Function ROL rotates left the value in the source register as specified by the 'shift control' field. The carry flag is altered.

In four most significant bits in the command line, as indicated above, are also used to encode branch control instructions for ALU 610.

The branch control instructions encoded in the four most significant bits of the command line, in this embodiment, are given in Table 3.

TABLE 3

| BRANCH TYPE | DESCRIPTION |
|---|---|
| JMP | Unconditional jump to address in next address field |
| JZ | Conditional jump to address in next address field on zero result |
| JNZ | Conditional jump to address in next address field on non-zero result |
| JC | Conditional jump to address in next address field on saved carry equals "1" |
| JNC | Conditional jump to address in next address field on saved carry equals "0" |
| CALL | Unconditional call to subroutine at address in next address field (push next address + 1 onto stack for the return) |
| RET | Performs an unconditional subroutine return to the address stored on the top of stack |
| NB | No branch |

For unconditional jump JMP, program execution branches unconditionally to the address specified in the 'next address' field.

For jump on zero JZ, if the result of the operation in the current command line is zero, program execution branches to the address specified in the 'next address' field. If the result is not zero, the next command line executed is the next command line in the program list. The zero flag is altered by every command line, and therefore the zero flag data after a command cannot be tested by a following command.

For jump on not zero JNZ, if the result of the operation in the current command line is not zero, program execution branches to the address specified in the 'next address' field. If the result is zero, the next command line executed is the next command line in the program list. The zero flag is altered by every command line, and therefore the zero flag state after a command cannot be tested by a following command.

For jump on carry JC, if the last command which alters the carry flag has set the carry flag, program execution branches to the address specified in the 'next address' field of the current command. If the last command reset the carry flag, the next command line executed after the current command is the next command line in the program list. The carry flag is altered only by commands which require a destination field. Jump on carry JC branch requires a 'next address' field. Since the 'next address' and destination fields are shared by the command line, the jump on carry branch control cannot coexist on the same command line with an ALU function that alters the carry flag. Therefore, branch is a function of the carry state defined by a previous command the jump on carry.

For jump on not carry JNC, if the last command which alters the carry flag has reset the carry flag, program execution branches to the address specified in the 'next address' field of the current command. If the last command set the carry flag, the next command line executed after the current command is the next command line in the program list. The carry flag is altered by the commands which require a destination field. The jump on not carry branch requires a 'next address' field. Since the 'next address' and destination fields are shared on the command line, the jump on not carry branch control cannot coexist on the same command line with an ALU function that alters the carry flag. Therefore, the jump on not carry branch is a function of the carry state defined by a previous command.

For subroutine call CALL, program execution branches unconditionally via a subroutine call to the address specified in 'next address' field. The address of the current command line, incremented by one, is pushed onto the stack.

For subroutine return RET, program execution branches unconditionally via a subroutine return to the address saved on the top of the stack. The return address is popped off the stack. A 'next address' field is not required for this branch. Subroutine return is the only branch control which is not encoded in the ALU/branch control field. It is specified in the return field RT.

For no branch NB, no branch in program execution is taken. The next command line executed after the current command is the next command line in the program list. Since no branch is taken, no next address field is required on the command line.

The instructions that sequencer 320 is capable of executing are distinctly categorized into four groups. Table 4 summarizes these four groups. The general format for command line in Group 1 instructions is given in FIG. 15. The general format for the command line in Groups 2 and 3 is given in FIG. 17, while FIG. 16 gives the format for Group 4. In each group, the value of each field and the ALU operands are defined in Table 4.

TABLE 4

MICROWORD FIELDS

| ALU/BRANCH CONTROL [5] GROUP 1 | DESTINATION ADDRESS[8] | SOURCE ADDRESS[8] Operand1 to ALU | IMMEDIATE [8] Operand2 to ALU |
|---|---|---|---|
| OR 0000 0/1<br>AND 0001 0/1<br>XOR 0010 0/1<br>ADD 0011 0/1<br>ADC 07770 0/1 | 00h THRU FFh Valid Addresses | 00h THRU FFh Valid Addresses | IF Immediate= 0 THEN Op2=ACCUM ELSE Op2 = Immediate |

TABLE 4-continued

MICROWORD FIELDS

| ALU/BRANCH CONTROL [4] GROUP 2 | NEXT ADDRESS[9] | SOURCE ADDRESS[8] Operand1 to ALU | IMMEDIATE [8] Operand2 to ALU |
|---|---|---|---|
| ORI 77700 jmp<br>ORI 77701 jc<br>ORI 1010 jnc<br>ORI 1011 call | | 00h THRU FFh Valid Addresses | Op2 = Immediate |

| ALU/BRANCH CONTROL [4] GROUP 3 | NEXT ADDRESS[9] | SOURCE ADDRESS[8] Operand1 to ALU | IMMEDIATE [8] Operand2 to ALU |
|---|---|---|---|
| XOR 17770 jnz<br>AND 1101 jnz<br>XOR 1110 jz<br>AND 1111 jz | | 00h THRU FFh Valid Addresses | IF Immediate= 0 THEN Op2=ACCUM ELSE Op2 = Immediate |

| ALU/BRANCH CONTROL [5] GROUP 4 | DESTINATION ADDRESSES [8] | SOURCE ADDRESS[8] Operand1 to ALU | SHIFT CONTROL[8] |
|---|---|---|---|
| ROL 0101 0/1 | 00h THRU FFh Valid Addresses | 00h THRU FFh Valid Addresses | See Table 5 |

In Table 4, the Group 1 instructions require a source address and a destination address. These instructions allow the programmer to use either a direct or an indirect mode of addressing for both the source and designation. Depending upon the value of bit 24 in control register 650 (the least significant bit is the right most bit in Table 4) sequencer 320 performs a return to the address stored on top of stack 1381 (FIG. 14). In this embodiment, stack 680 allows a maximum of four pending returns. This instruction group also allows the programmer to perform special byte manipulation by moving any source byte to register FUNCTION1 (FIG. 12) in a first clock cycle and then reading this byte in the next clock cycle. The programmer has effectively performed the following function: f1→ONE_OF_EIGHT(Source byte bits [6–4]).

Group 2 instructions are primarily used to pass parameters to subroutines on a "call". The destination address is fixed as the value of source index register SINDEX.

Group 3 instructions are used for bit testing. The destination address in this case is none.

Group 4 instructions are used to perform left/right shifts on operand1 to ALU 610. The least significant 8 bits of control register 650 are interpreted to be "shift control bits" and are used only in conjunction with ALU function ROL. These 8 bits specify whether the function is a rotate or a shift and how many positions the bits are moved. A rotate moves all bits to the left with bit 7 moving to bit 0 for each step. All bits are preserved by masking a value of FFh onto operand2 to ALU 610. For shift operations, the appropriate mask is generated for operand2 to zero out certain bits. The basic ALU operations performed in both these cases are a left rotate followed by a logic AND operation. For both rotates and shifts, the carry flag is set to the previous bit 7 or bit 0 value after each step of the move. Table 5 briefly summarizes these operations.

TABLE 5

DEFINITIONS OF BITS IN SHIFT CONTROL FIELD OF MICROCODE WORD 650

| | |
|---|---|
| Bits 2-0: | Specify the number of bits rotations steps to the left. |
| Bit 3: | direction bit<br>= 0: Bit mask is right justified. Carry is set from bit 7.<br>= 1: Bit mask is left justified. Carry is set from bit 0. |
| Bits 6-4: | Mask encode.<br>Equals the binary value of the number of contiguous bits to be masked out. Bit 3 aligns the mask with the right or left byte boundary. |
| Bit 7: | To mask out all eight bits set bits 7-4 to 1. When fewer than eight bits are masked, set bit 7 = 0. |

Some examples of shift controls and bits masks are given in Table 6. In Table 6, a zero in the bit mask indicates the bit to be masked out. An "X" indicates a don't care bit value.

TABLE 6

| FUNCTION | SHIFT CONTROL Bit FIELD Bit | | BIT MASK |
|---|---|---|---|
| | 7 | 0 | |
| Rotate left by 2 | 0 000 | 0 010 | 1111 1111 |
| Shift left by 1 | 0 001 | 0 001 | 1111 1110 |
| Shift left by 7 | 0 111 | 0 111 | 1000 0000 |
| Shift left by > 7 | 1 111 | 0 XXX | 0000 0000 |
| Shift right by 1 | 0 001 | 1 111 | 0111 1111 |
| Shift right by 7 | 0 111 | 1 001 | 0000 0001 |

As described above, ALU 610 and branch control functions are encoded in a single field. With the above definitions, the states of ALU 610 are summarized in Table 7. Function and control combinations which are not considered useful have been deleted.

TABLE 7

| Opcode | ALU function | branch control | Found |
|---|---|---|---|
| 0 | OR | NB/RET | FIG. 15 |
| 1 | AND | NB/RET | FIG. 15 |
| 15 | AND | JZ | FIG. 15 |
| 13 | AND | JNZ | FIG. 17 |
| 2 | XOR | NB/RET | FIG. 15 |
| 14 | XOR | JZ | FIG. 17 |
| 12 | XOR | JNZ | FIG. 17 |
| 3 | ADD | NB/RET | FIG. 15 |
| 4 | ADC | NB/RET | FIG. 15 |
| 8 | ORI | JMP | FIG. 17 |
| 9 | ORI | JC | FIG. 17 |
| 10 | ORI | JNC | FIG. 17 |
| 11 | ORI | CALL | FIG. 17 |
| 5 | ROL | NB/RET | FIG. 16 | nb/ret = no branch/return

ALU function OR with branch control NB is a bit set. Bits which are set in the immediate field (or accumulator, if immediate is zero) are set in the destination register. Bits which are set in the source register are also set in the destination register. The next command line to be executed immediately follows the current command line in the program list.

ALU function OR with branch control RET is a bit set. This is the same as ALU function OR with branch control NB, except a subroutine return branch is executed after the logical OR operation. The logical OR and the return are both executed by one command line.

ALU function AND with branch control NB/RET is a bit reset. The source register is first moved to the destination register. Then bits which are reset in the immediate field (or accumulator, if immediate is zero) are reset in the destination register.

ALU function AND with branch control JZ is a bit test and branch. A branch to the address in the 'next address' field is taken if none of the bits set in the immediate field (or accumulator, if immediate is zero) are set in the source register.

ALU function AND with branch control JNZ is a bit test and branch. A branch to the address in the 'next address' field is taken if one or more for the bits set in the immediate field (or accumulator, if immediate is zero) are set in the source register.

ALU function XOR with branch control NB/RET is a bit complement. The source register is first moved to the destination register. Then, the bits set in the immediate field (or accumulator, if immediate is zero) are complemented in the destination register.

ALU function XOR with branch control JZ is a byte comparison. The source register content is compared with the immediate field (or accumulator, if immediate is zero). If the two are equal, a branch to the address in the 'next address' field is taken at the end of the command line.

ALU function XOR with branch control JNZ is a byte comparison. The source register content is compared with the immediate field (or accumulator, if immediate is zero). If the two are not equal, a branch to the address in the 'next address' field is taken at the end of the command line.

ALU function ADD with branch control NB/RET is an addition of two bytes. The content of the source register is added to the immediate field (or accumulator, if immediate is zero). The sum is moved to the destination register. This command type is used for single-precision addition, or for adding the least significant bytes in multi-precision addition.

ALU function ADC with branch control NB/RET is an addition of two bytes. The content of the source register and the carry are added to the immediate field (or accumulator, if immediate is zero). The sum is moved to the destination register. This command type is used for multi-precision addition of bytes other than the least significant.

ALU function ORI with branch control JMP/CALL is a source index register (sindex) load and branch. A single command line will load the index register SINDEX with the logical OR of the source register and immediate field, and then branch unconditionally to the address in the 'next address' field. This command type is useful for passing a constant or variable into a subroutine via register SINDEX, and calling the subroutine.

ALU function ORI with branch control JC/JNC is a source index register (sindex) load and branch. A single command line will load the source index register SINDEX with the logical OR of the source register and immediate field, and then branch conditionally to the address in the 'next address' field, depending on the state of the carry flag. (This command type does not alter the carry flag.)

ALU function ROL with branch control is a shift or rotate. The source register is first moved to the destination register, and then the destination register is either shifted or rotated.

Register SINDEX is written to in one of three ways: (1) register SINDEX is directly written to by explicitly specifying the write address of register SINDEX as the destination address in microcode word 50; (2) the contents of register SINDEX are automatically incremented when the register is used as an indirect source address; and (3) register SINDEX is an implicit designation for all ALU instructions ORI.

Thus, it is possible that more than one write operation is specified to register SINDEX in a single instruction. The truth table in Table 8 resolves which write operation takes priority when more than one write operation to register SINDEX is specified in a single instruction.

TABLE 8

| | OPCODE ORIWRITE | DADR FIELD SINDEX WRITE | SADR FIELD SINDIR WRITE | H/W ALLOWS | OPERATION |
|---|---|---|---|---|---|
| 1 | 1 | 1 | 1 | No | — |
| 2 | 1 | 1 | 0 | No | — |
| 3 | 1 | 0 | 1 | Yes | Oriwrite |
| 4 | 1 | 0 | 0 | Yes | Oriwrite |
| 5 | 0 | 1 | 1 | Yes | Sindex write |
| 6 | 0 | 1 | 0 | Yes | Sindex write |
| 7 | 0 | 0 | 1 | Yes | Sindex increment |
| 8 | 0 | 0 | 0 | Yes | — |

The destination and source address fields in control register 650 (FIG. 14) are capable of addressing all I/O registers on CIOBUs 350 in host adapter 7770. In one embodiment, the addresses in Table 9 are reserved for registers 421 within sequencer 320.

TABLE 9

| DESCRIPTION | REFERENCE | ADDRESS |
|---|---|---|
| Sequencer Control | SEQCTL | 60h R/W |
| Sequencer RAM port | SEQRAM | 61h R/W |
| Sequencer RAM Address Low | SEQADDR0 | 62h R/W |
| Sequencer RAM Address High | SEQADDR1 | 63h R/W |
| Accumulator | ACCUM | 64h R/W |
| Source Index Register, direct | SINDEX | 65h R/W |
| Destination Index Register, direct | DINDEX | 66h R/W |
| Break Address Low | BRKADDR0 | 67h R/W |
| Break Address High | BRKADDR1 | 68h R/W |
| Source data equals FFh | ALLONES | 69h R |
| Source data equals 00h | ALLZEROS | 6Ah R |
| Destination = none | NONE | 6Ah W |
| Carry and Zero flags | FLAGS | 6Bh R |
| Indirect address for Source | SINDIR | 6Ch R |
| Indirect address for Destination | DINDIR | 6Dh R |
| Function 1 | FUNCTION1 | 6Eh R/W |
| Stack | STACK | 6Fh R |

Destination address logic processes the destination address field in control register 650 and determines the destination address for a sequencer operation. The sequencer operation can be either a special function operation or an ALU operation. The destination address can be either none, direct, or indirect.

In the destination address, logic decoder 1331 (FIG. 14) processes bits 16 to 23 of control register 650 to determine whether indirect destination addressing is being utilized. If indirect destination addressing is being utilized, decoder 1371 drives the signal on line DIADR to multiplexer 1309 active. In response to the active signal on line DIADR, multiplexer 1309 passes the eight-bit address in register DINDEX to buffers 1304 which in turn supply the address to inverting tri-state buffers 1306 that drive destination address bus CDADR. The clock signal to register DINDEX is controlled by signals DIW_STROBE and DIADR W STROBE from destination address decode logic 1330 to decoder 1334.

The address in register DINDEX is also a first input signal to adder circuit 1332. The second input signal to adder circuit 1332 is a value of one. Adder circuit 1332 increments the address and supplies the new address to multiplexer 1333 as a first set of input signals.

The signals on CDDAT bus 604 are a second set of input signals to multiplexer 1333. The set of signals passed through multiplexer 1333 is determined by a first output signal from decoder circuit 1334. Decode circuit 1334 receives as input signals, the clock signal on line CCLOCK, destination indirect address write strobe on line DIADRW_STROBE and the signal on destination write strobe line DIW_STROBE.

Source address logic processes the source address field in control register 650 and determines the source address for a sequencer operation. A sequencer operation is either a special function operation or an ALU operation. The source address can be either none, direct, or indirect (increment index after operation).

A decoder 1321 processes bits 8 to 15 of control register 650 to determine whether indirect source addressing is being utilized. If indirect source addressing is being utilized, decoder 1321 drives the signal on line SIADR to tri-state buffers 1301 and to tri-state buffers 1302 active. In response to the active signal on line SIADR, buffers 1301 are tri-stated so that the address in the source address field of control register 650 is not supplied to CSADR bus 601. The inverter on the control line to buffers 1302 inverts the active signal on line SIADR so that the set of input signals to buffers 1302 from register SINDEX are passed to CSADR bus 601.

The address in register SINDEX is also a first input signal to adder circuit 1322. The second input signal to adder circuit 1322 is a value of one. Thus, adder circuit 1322 increments the source address and supplies the new source address to multiplexer 1323 as a first set of input signals.

The signals on CDDAT bus 604 are a second set of input signals to multiplexer 1323. The signals on ALU output bus ALU_O/P are a third set of input signals to multiplexer 1323. The set of signals passed through multiplexer 1323 is determined by a first output signal from a decoder circuit 1324. Decoder circuit 1324 receives as input signals, the clock signal on line CCLOCK, instruction ORI from ALU/BRANCH field of control register 650, the source indirect address write strobe on line SIADRW_STROBE and the signal on source write strobe line SIW_STROBE.

RAM address logic within sequencer 320 determines the correct sequencer RAM address to access the control line that is decoded in the next clock cycle by sequencer 320. RAM address logic also determines the next value of the program counter PCH, PCL and manages top of stack 1381. Sequencer stack 680 is four words deep. RAM address logic has two distinct modes of operation; a first mode of operation is the normal mode and a second mode of operation is the pause mode. In the normal mode for RAM address logic, bit PAUSE is deasserted and conversely in the second mode. In the normal mode, sequencer 320 reads from sequencer RAM 441. In the second mode, HIM 462 steps bit LOADRAM to count to sequencer RAM 441 and can also read from sequencer RAM 441. For clarity all the connections to sequencer RAM are not shown in FIG. 14. A detailed schematic diagram of sequencer 320 is provided in Microfiche Appendix B, which is incorporated herein by reference in its entirety.

The pause acknowledge signal PAUSEACK is generated by pause logic 640 in response to any one of the input signals PAUSE, BRKADRINT, ILLOPCODE, ILLSADR, and SEQINT which are related to bits that have the same name.

Program counter PCH, PCL is clocked by a signal from decode logic 1362. The input address to program counter PCH, PCL is provided by multiplexer 1364 which is controlled by a signal from decoder 1365 that has input signal PACK, which is the same as signal PAUSEACK, and input signal PCLW_STROBE. The current address to sequencer RAM 441 is incremented by adder 1366 and provided as a first input signal to multiplexer 1364. The second input signal to multiplexer 1364 is from CDDAT bus 604. The output of multiplexer 1364 is also provided to stack 680.

Top of stack 1381, CDDAT bus 604, program counter PCH, PCL and write address line W_ADDR from destination address decode logic are input to multiplexer 1367. The address passed through multiplexer 1367 is determined by decode circuit 1368. Top of stack pointer logic 1370 controls the stack pointer.

The RAM address logic functions are summarized in the following three tables, i.e., Tables 10–12. Each table describes the function for a particular group or groups of instructions, as defined above.

The first entry in the "RAM ADDRESS" column for any particular instruction denotes the sequencer RAM address.

The second entry denotes the corresponding stack operation for that instruction. Entries for the same instruction are separated by semicolons. An entry surrounded by brackets denotes the contents of that location. For example, (PC), denotes the contents of the program counter. "TOS" stands for the Top of Stack, "PC" stands for Program Counter and "NCTS" stands for No Change To stack.

The entry in the POGRAM COUNTER column for any particular instruction indicates the value of the program counter for the next clock cycle.

TABLE 10

| GROUPS 1 AND 4 INSTRUCTIONS | RETURN BIT | RAM ADDRESS | PROGRAM COUNTER |
|---|---|---|---|
| OR | 0 | (PC); NCTS; | (PC) + 1; (TOS) |
|  | 1 | (TOS); TOS = TOS − 1; | + 1; |
| AND | 0 | (PC); NCTS; | (PC) + 1; (TOS) |
|  | 1 | (TOS); TOS = TOS − 1; | + 1; |
| XOR | 0 | (PC); NCTS; | (PC) + 1; (TOS) |
|  | 1 | (TOS); TOS = TOS − 1; | + 1; |
| ADD | 0 | (PC); NCTS; | (PC) + 1; (TOS) |
|  | 1 | (TOS); TOS = TOS − 1; | + 1; |
| ADC | 0 | (PC); NCTS; | (PC) + 1; (TOS) |
|  | 1 | (TOS); TOS = TOS − 1; | + 1; |
| ROL | 0 | (PC); NCTS; | (PC) + 1; (TOS) |
|  | 1 | (TOS); TOS = TOS − 1; | + 1; |

TABLE 11

| GROUP 2 INSTRUCTIONS | CARRY BIT | RAM ADDRESS | PROGRAM COUNTER |
|---|---|---|---|
| ORI jmp | X | (next_addr); NCTS; | (next_addr) + 1; |
| ORI jc | 0 | (PC); NCTS; | (PC) + 1; |
|  | 1 | (next_addr); | (next_addr) + 1; |

TABLE 11-continued

| GROUP 2 INSTRUCTIONS | CARRY BIT | RAM ADDRESS | PROGRAM COUNTER |
|---|---|---|---|
| ORI jnc | 0 | NCTS; (next_addr); NCTS; | (next_addr) + 1; |
|  | 1 | (PC); NCTS; | (PC) + 1; |
| ORI call | X | (next_addr); TOS = TOS + 1; | (next_addr) + 1; |
|  | X | (TOS) = (PC); |  |

TABLE 12

| GROUP 3 INSTRUCTIONS | ZERO | RAM ADDRESS | PROGRAM COUNTER |
|---|---|---|---|
| XOR jnz | 0 | (next_addr); NCTS; | (next_addr) + 1; |
|  | 1 | (PC); NCTS; | (PC) + 1; |
| AND jnz | 0 | (next_addr); NCTS; | (next_addr) + 1; |
|  | 1 | (PC); NCTS; | (PC) + 1; |
| XOR jz | 0 | (PC); NCTS; | (PC) + 1; |
|  | 1 | (next_addr); NCTS; | (next_addr); + 1; |
| AND jz | 0 | (PC); NCTS; | (PC) + 1; |
|  | 1 | (next_addr); NCTS; | next_addr) + 1; |

The functionality of the RAM address logic is described using the PASCAL like code in Table 13.

TABLE 13

```
CASE "pause" OF
0:    enable_clock(program_counter); {Normal mode
         behavior}
      enable_clock(stack);
      enable_clock(control_register);
1:    BEGIN
      disable_clock(program_counter);
      disable_clock(stack);
      disable_clock(control_register);
         while "pause" = 1 DO
         BEGIN
            IF "PC_LOW_STROBE" THEN pc_low_byte : =
               source_data_bus;
            IF "PC_HIGH_STROBE" THEN pc : =
               (source_data_bus,pc_low_byte) + 1;
            IF "loadram" = 0 THEN
               BEGIN END {do nothing};
                            ELSE
               BEGIN
               reset(read_write_byte_counter);
               IF "RAM_WRITE_STROBE" THEN ram_data :
                  = source_data_bus;
               IF "RAM_READ_STROBE" THEN
               source_data_bus : = ram_data;
                  increment_program_counter_every_4
                  _read/write_strobes:
               END;
            IF "STEP" = 1 THEN
               BEGIN execute_one_clock_cycle;
                  STEP : = 0;
               END:
         END;{while}
         disable_all_interrupts_for_1_clock_cycle;
      END;{case 1};
END;{case};
```

Figure 18:
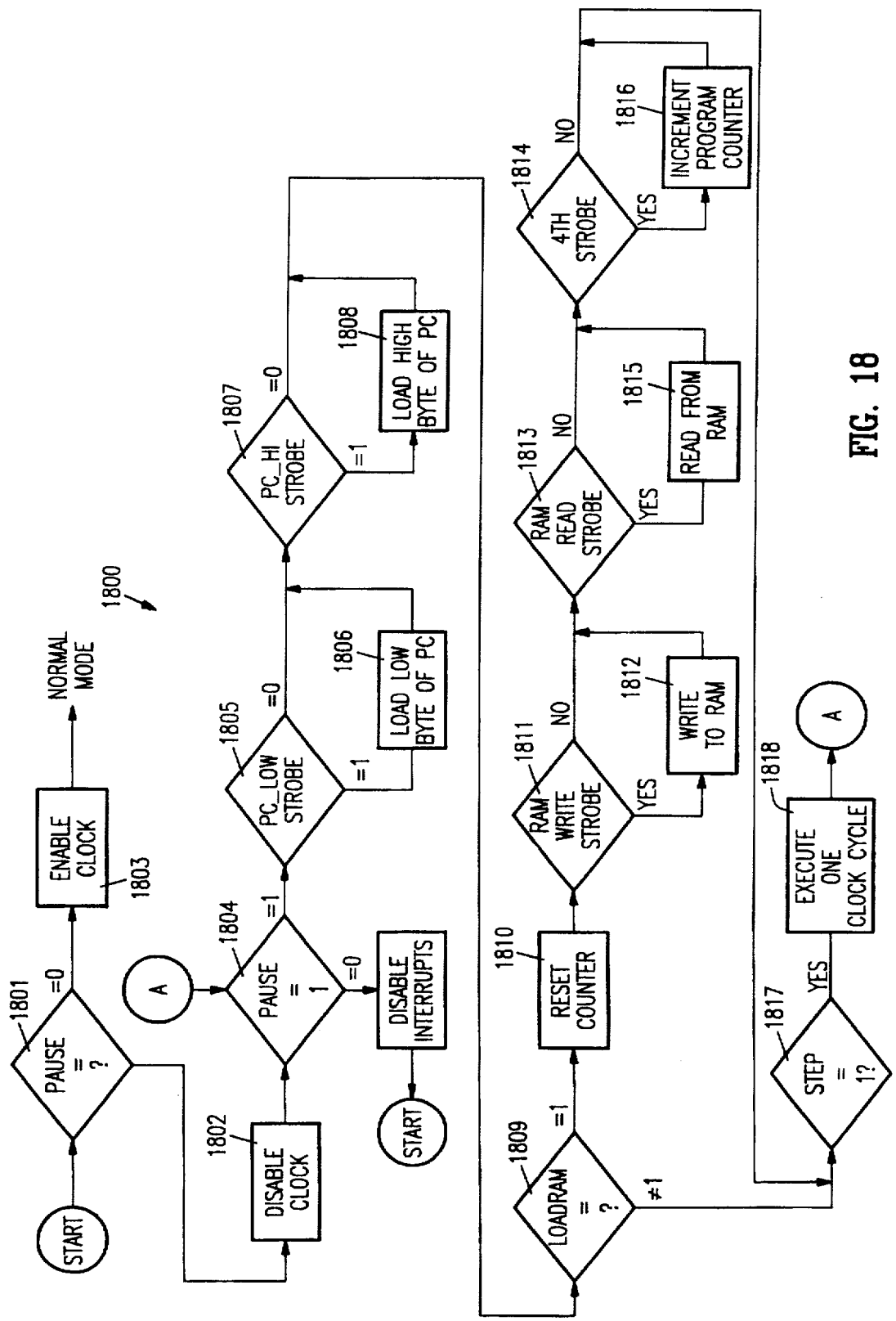
FIG. 18 is a flow diagram illustrating the pausing and unpausing of the sequencer of this invention.

FIG. 18 is a process flow diagram illustrating the pausing and unpausing of sequence 320 that corresponds to the pseudo-code in Table 13. The above pseudo-code gives a better understanding of the pausing and the unpausing of sequencer 320 in addition to the timing diagrams described below. It also emphasizes the sequence of steps necessary to accomplish any operation within sequencer 320 while it is paused.

Specifically, process 1800 first checks the status of bit PAUSE in register HCNTRL in check 1801. When bit PAUSE is not set, processing transfers to enable clock 1803 which enables the sequencer for the normal mode of operation by providing the program counter, stack, and control register with a clock signal.

Conversely, if check 1801 determines that bit PAUSE is not set, processing transfers to disable clock 1802 which discontinues the clock signal to the program counter, stack, and control register. Next, check 1804 determines whether bit PAUSE is still set and if so transfers processing to check 1805. Check 1805 determines whether the signal on program counter low byte strobe line PCL_WSTROBE to the low byte of the program counter is active. If the signal is active, load low byte of program counter 1806 loads the data on the CSDAT bus 602 into the low byte of the program counter.

Both check 1805 and load step 1806 pass processing to check 1807 which determines whether the signal on program counter high byte strobe line PCH_WSTROBE is high. If the signal is high, load high byte of PC 1808 loads a "1" in the high byte of the program counter. If the program counter high strobe is not active or if the high byte in the program counter has been loaded, processing passes to check 1809 which determines whether bit LOADRAM in register SEQCTL is high.

If bit LOADRAM is not high, processing jumps to check step equals one 1817, which is described more completely below. However, if bit LOADRAM is high, reset counter 1810 resets the read/write byte counter in RAM pointer logic 1360. Check 1811 determines whether the signal on line RAM_WRITE_STROBE is active. If the signal is active, write to RAM 1812 loads the eight bits of data on CDDAT bus 604 into sequencer RAM 441. In either case, RAM read strobe check 1813 determines whether the signal on line RAM_READ_STROBE is active. If the RAM read strobe signal is active, the data in RAM is put onto source data bus CSDAT. After checking for either a read or write operation, fourth strobe check 1814 determines whether there have been four read/write strobes and if so increment program counter step 1816 increments the program counter.

Step one check 1817 determines whether bit STEP in register SEQCTL is set and if so one cycle is provided to sequencer 320 so that the read instruction is executed. Processing returns to check 1804 which determines whether bit PAUSE is still set. As long as bit PAUSE is set, steps 1805 through 1818 are repeated. When bit PAUSE is no longer set, processing transfers from PAUSE check 1804 to disable 1819 which in turns disables all interrupts for one clock cycle and then ends the "unpause" process. Thus, check 1801 returns sequencer 320 to the normal mode of operation.

Sequencer 320 interrupts are used to control the operation of sequencer 320. In one embodiment, sequencer 320 interrupts include (i) a sequencer interrupt; (ii) an illegal opcode interrupt; (iii) an illegal sequencer address interrupt; (iv) a pause request interrupt from host driver; (v) a break address interrupt; and (vi) a sequencer RAM parity error. Notice that a line for each of these interrupts drives pause logic circuit.

Host interface module 310 on detecting a SCSI interrupt sets bit PAUSE in register HCNTRL. Sequencer 320 pauses itself after at least one and at most two instruction cycles. Since sequencer 320 executes one instruction in one clock cycle, an instruction cycle is the same as a clock cycle in duration. Setting bit PAUSE cleanly switches CIOBUS 350 (FIG. 3) from sequencer 320. When the bus has been switched, sequencer 320 asserts signal PAUSEACK to host interface module 310.

Sequencer 320 may pause itself by setting bit SEQINT in register INTSTAT to request HIM 462 intervention. Sequencer 320 halts executing the instruction that follows the one that sets bit SEQINT. Again, host interface module 310 sets bit PAUSE in register HCNTRL to allow clean switching of CIOBUS 350 from sequencer 320. After CIOBUS 350 is switched, sequencer 320 asserts signal PAUSEACK to the host computer.

An illegal opcode interrupt is generated by sequencer 320 when an illegal opcode is detected. An illegal opcode is a catastrophic condition and halts sequencer 320 on this illegal instruction if bit FAILDIS in register SEQCTL is zero. Host interface module 310 sets bit PAUSE in register HCNTRL to cleanly switch bus CIOBUS from sequencer 320. When bit PAUSE is set, sequencer 320 asserts signal PAUSEACK to host interface module 310. The clean switching of the bus in this case is done for consistency with the handling of the other interrupts. A clean exit from the illegal opcode interrupt requires a host adapter reset. If bit FAILDIS is one, the corresponding interrupt is set in register ERROR, but sequencer 320 is not paused.

The illegal sequencer address interrupt is generated when sequencer 320 tries to read or write to an illegal address. This is also a catastrophic condition and halts the sequencer 320 on this illegal address if bit FAILDIS is zero. Host interface module 310 sets bit PAUSE in register HCNTRL again to allow clean switching of bus CIOBUS from sequencer 320. The subsequent operations are the same as those defined above for the illegal opcode interrupt.

Pause request interrupt is an interrupt from HIM 462 to sequencer 320. This interrupt can be disabled by sequencer 320 setting bit PAUSDIS in register SEQCTL. As many as five instructions may be executed by sequencer 320 before coming to a halt. CIOBUS 350 cleanly switches to host interface module 310 at this point. When the switch has occurred, sequencer 320 asserts bit PAUSEACK to the host module. Sequencer 320 disables all interim interrupts including the current interrupt for one instruction cycle upon being unpaused. An exception is an illegal opcode interrupt or an illegal address access interrupt.

The break address interrupt is generated when the program counter value equals a break address value loaded in registers BRKADDR1 and BRKADDR0. Sequencer 320 asserts the signal on line BRKADRINT to the host. This interrupt can be disabled when bit 7 of register BRKADDR1 is set, i.e., bit BRKDIS. Upon break address interrupt, sequencer 320 halts executing its current instruction and host interface module 310 sets bit PAUSE in register HCNTRL to again allow clean switching of CIOBUS 350 from sequencer 320. Sequencer 320 disables all interim interrupts including the current interrupt for one instruction cycle on being unpaused.

The last interrupt is the sequencer RAM parity error which is generated during normal execution of sequencer firmware when a sequencer RAM parity error is detected. This interrupt halts sequencer 320 operation immediately. Bit PERROR in register ERROR is set, and host interface module 310 generates a hardware interrupt on line IRQ. This is a fatal error and requires a host adapter reset. The sequencer RAM parity error can be disabled by writing a one to bit PERRORDIS in register SEQCTL. For normal sequencer firmware execution, this interrupt is enabled by writing a zero to bit PERRORDIS in register SEQCTL. The status and error registers are maintained in the host interface module 310 which is described more completely above.

Irrespective of the interrupt, CIOBUS 350 switches cleanly from control by sequencer 320 to control by HIM 462 and conversely. The switching sequence for bus CIOBUS is always initiated by setting/resetting bit PAUSE in register HCNTRL. CIOBUS 350 switches from sequencer 320 control to HIM 462 control when bit PAUSE is set. CIOBUS 350 switches from HIM 462 control to sequencer 320 control when bit PAUSE is reset.

Figure 19:
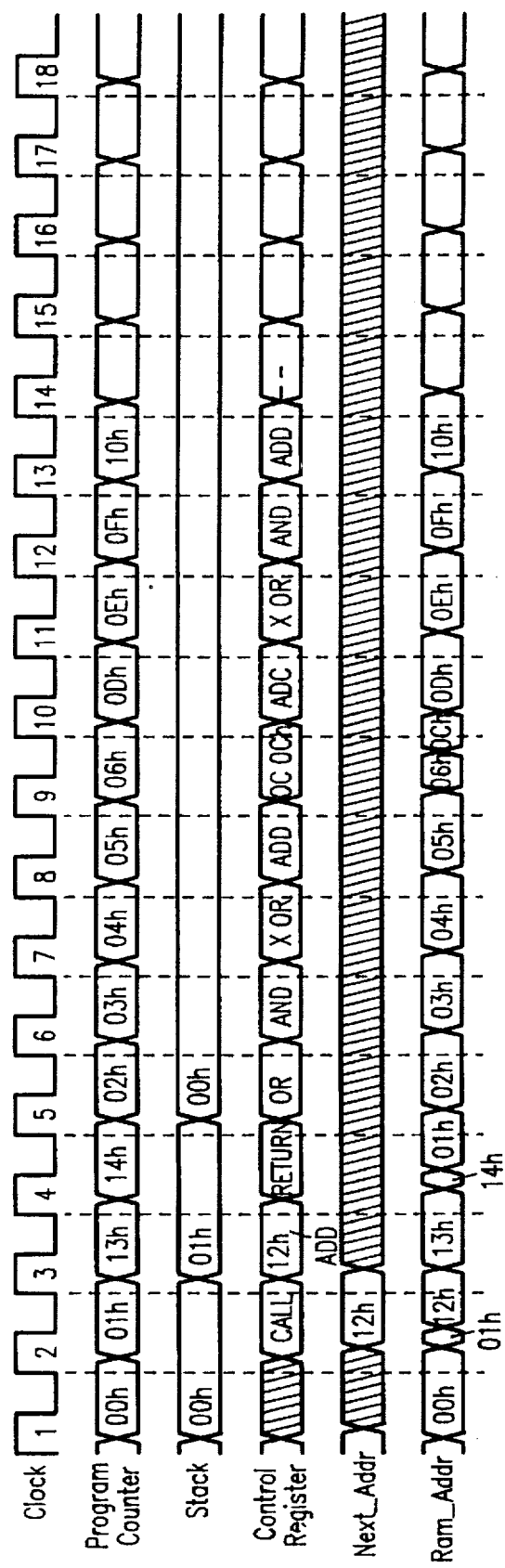
FIG. 19 is a timing diagram that illustrates the normal operation of the sequencer of this invention.

To demonstrate the normal operation of sequencer 320, a specific example is used to illustrate what happens within sequencer 320 as various instructions are executed. The sample program in Table 14 contains a "call" to a subroutine, a "return", and a "conditional jump" along with some other instructions. This set of instructions was chosen because the instructions demonstrate all the possible scenarios in the operation of sequencer 320. Timing diagram 1900 in FIG. 19 has waveforms for sequencer clock, program counter, i.e., registers SEQADDR1 and SEQADDR0, top of stack 1381 (FIG. 14), control register 650, the next address field of control register 650, and the sequencer RAM address. The simple program residing in sequencer RAM 441 is given in Table 14.

TABLE 14

| LOCATION | INSTRUCTION |
|---|---|
| 000 | CALL 12 |
| 001 | OR |
| 002 | AND |
| 003 | XOR |
| 004 | ADD |
| 005 | JC 0C |
| 006 | AND |
| 007 | XOR |
| 008 | OR |
| 009 | ADC |
| 00A | — |
| 00B | — |
| 00C | ADC |
| 00D | XOR |
| 00E | AND |
| 00F | ADD |
| 010 | — |
| 012 | ADD |
| 013 | RETURN |
| 014 | — |

In the normal mode of operation, bit PAUSE in register HCNTRL is de-asserted. The value on top of the stack 1382 is assumed to be zero when the first instruction in the above code stream is encountered. During clock cycle 2, control register 650 is loaded with instruction "call 12h". Sequencer 320 on seeing instruction "call 12h" feeds the sequencer RAM address port with "12h" and at the rising edge of clock cycle 3, this value is incremented so program counter PCH, PCL is loaded with 13h and address 01h, the return address, is pushed onto top of stack 1381.

Control register 650 now contains instruction "add" which was at location 12h in sequencer RAM 441 (FIG. 14). The add instruction is executed during clock cycle 3 and at the rising edge of clock cycle 4 the program counter is incremented. Instruction "return" is loaded in control register 650 and executed. In response to instruction "return", sequencer 320 pops address 01h off top of stack 1381 and feeds the sequencer RAM address port with 01h. At the rising edge of clock cycle 5, sequencer 320 loads program counter PCH, PCL (FIG. 14) with 02h. Control register 650 contains instruction "OR" located at address 01h. The next three instructions, "AND", "XOR", and "ADD", are executed in sequence without any branches in response to the rising edge of clock cycles 6, 7, and 8, respectively. Note herein, the rising clock edge of a cycle is defined as the edge adjacent the number indicating the cycle.

There is a one clock phase lag between the instruction fetch and execute cycles. During clock cycle 9, sequencer 320 executes instruction "JC 0Ch" located at address 05h. In this example, the outcome of the execution of the instruction is assumed to result in the branch being taken. Sequencer 320 feeds the sequencer RAM address port with 0Ch and at the rising edge of clock cycle 10, program counter PCH, PCL is loaded with address 0Dh, which is address 0Ch plus one, and control 650 register with instruction "ADC" located at 0Ch. The remainder of the code continues to execute in this fashion.

Figure 20:
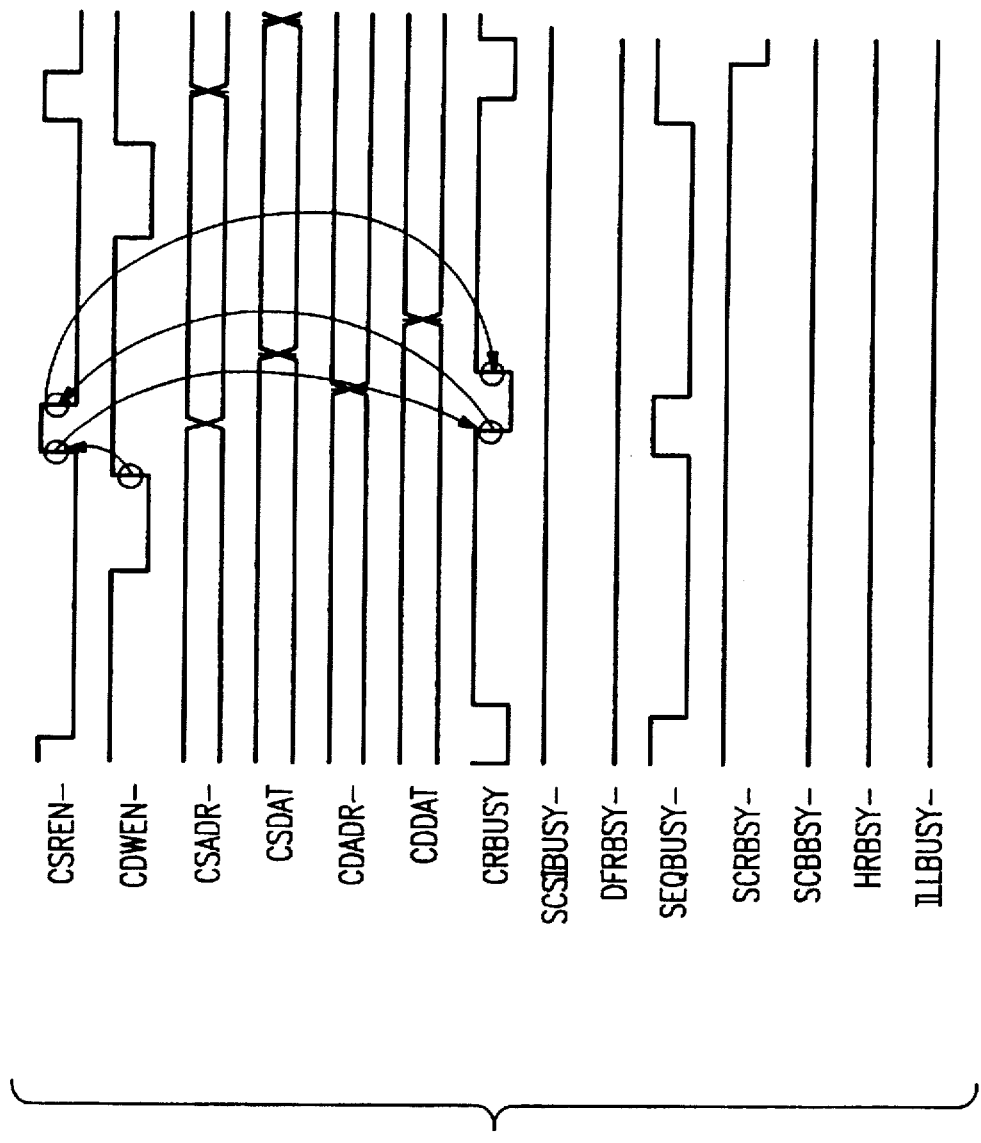
FIG. 20 is a timing diagram that illustrates the operation of the CIOBUS of this invention.

In addition to smoothly switching CIOBUS 350 from control by sequencer 320 to control by HIM 462, CIOBUS 350 is controlled so that modules within host adapter do not create contentions on the bus and so that CIOBUS 350 is in a quiescent state before a module takes control of the bus. In FIG. 20, signals CSREN-, CDWEN- CSADR-, CSDAT, CDADR-, CDDAT, and CRBUSY are the signals on the portions of CIOBUS 350 with corresponding names. The remaining signals are generated by different modules of host adapter 7770 to show that the particular module is busy. CIOBUS busy signal CRBUSY is driven active when one of the modules of host adapter 7770 takes control of the bus. When signal CRBUSY is active, other modules are inhibited from using CIOBUS 350. For the signal sequence in FIG. 20, sequencer busy signal SEQBUSY- is active showing that sequencer 320 has control of CIOBUS 350 and all the other busy signals are inactive. However, if sequencer 320 relinquished CIOBUS 350 and another module immediately came onto the bus, erroneous information might be created on CIOBUS 350.

When CIOBUS 350 write enable signal CDWEN- goes inactive, the rising edge drives read enable signal CSREN- inactive. Since CIOBUS 350 is no longer available, sequencer 320 goes inactive and so sequencer busy signal SEQBUSY- goes high. The rising edge on CSREN- drives CIOBUS busy signal CRBUSY inactive, but CIOBUS busy signal CRBUSY is held active for a sufficient time to allow signals to stabilize. Specifically, sequencer 320 gets off CIOBUS 350 and since signal CRBUSY is still active, no other part of host adapter 7770 tries to use CIOBUS 350 until CIOBUS 350 is quiescent. Thus, the possibility of generating erroneous information on the bus is eliminated. As signal CRBUSY goes inactive, the falling edge forces read enable signal CSREN- active so that CIOBUS 350 is again available for use.

Figure 21:
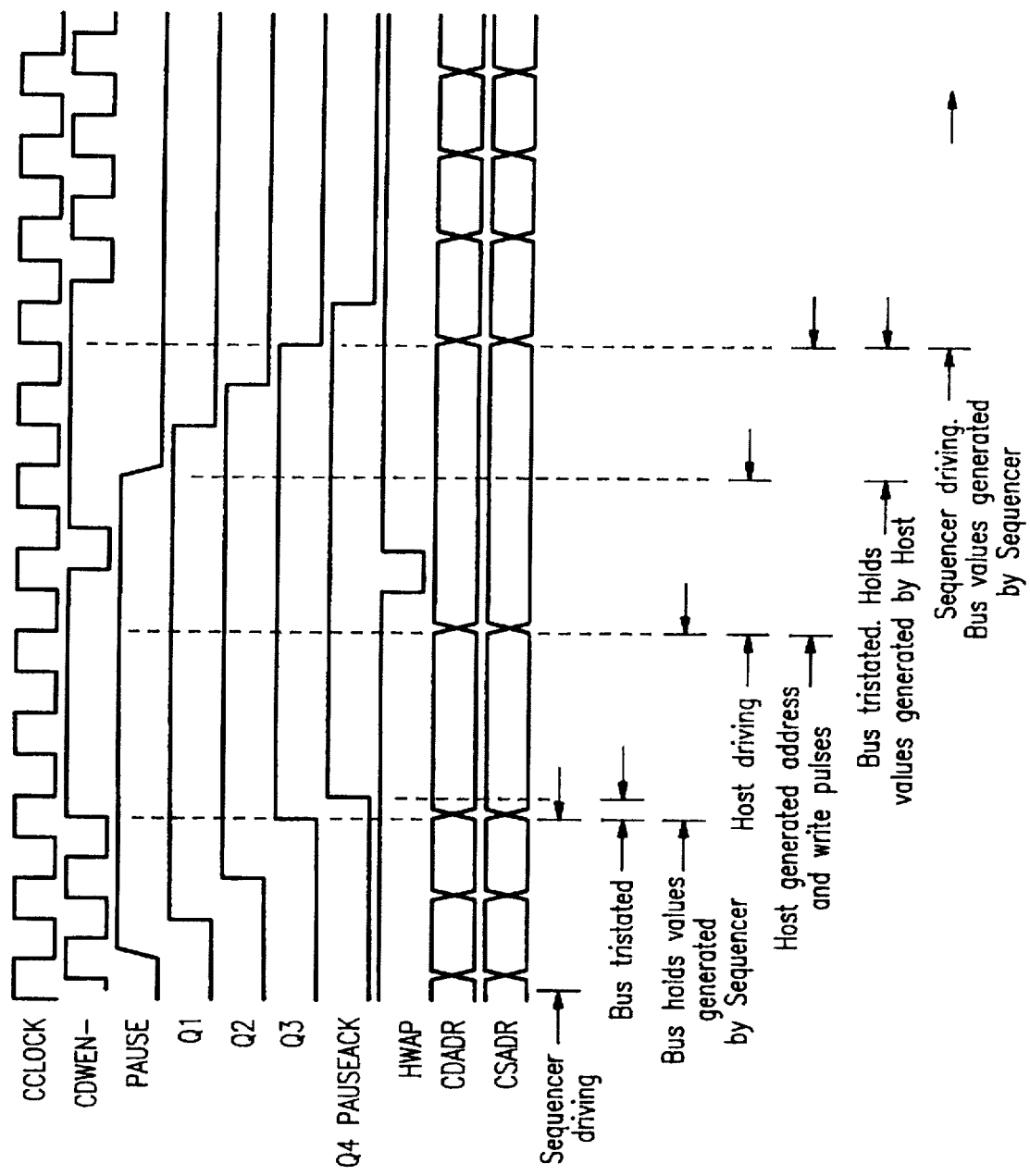
FIG. 21 is a timing diagram that illustrates the pausing and unpausing of the CIOBUS of this invention and the tristating of that bus.

A timing diagram for switching CIOBUS 350 upon setting of bit PAUSE is given in FIG. 21.

Bit PAUSE is asserted during the first clock cycle, i.e., HIM 462 sets bit PAUSE, and upon the rising edge of the second clock cycle, the signal on line Q1 is driven active. On the falling edge of the second clock cycle, the signal on line Q2 goes active. The signal on line Q3 goes active on a rising edge of data bus write enable signal CDWEN- after the signal on line Q2 goes active.

At this time, CIOBUS 350 is tri-stated and remains tri-stated until the falling edge of the third clock signal when signal PAUSEACK goes active. Here, signal PAUSEACK is bit PAUSEACK being set in register HCNTRL and is not the signal PAUSEACK generated in sequencer 320 which sets bit PAUSEACK. When bit PAUSEACK is set, HIM 462 can access CIOBUS 350 through host interface module 310.

After the bus is tri-stated, CIOBUS 350 holds the value generated by sequencer 320 until HIM 462 drives CSADR, bus and CDADR bus after the falling edge of clock cycle 5.

HIM 462 drives signal CDWEN- active and when HIM 462 has completed the desired operation or operations, HIM 462 bit PAUSE in register HCNTRL and so the PAUSE signal is deasserted. When bit PAUSE is de-asserted, CIOBUS 350 is again tristated, but CIOBUS 350 holds the values generated by HIM 462.

At the start of clock cycle 9 sequencer again starts to drive CIOBUS 320.

Sequencer 320 can be paused at any time during normal execution. When bit PAUSE is set, sequencer 320 is said to be in the paused state. Depending on the interrupt, as explained above, when sequencer 320 is paused by an interrupt, sequencer 320 either halts execution of its current instruction or halts execution after at most five instructions. When HIM 462 wants to take control of host adapter 7770, HIM sets bit PAUSE and then polls bit PAUSEACK in register HCNTRL to determine when that bit is set. Bit PAUSEACK acts like an acknowledge signal to HIM 462.

Figure 22:
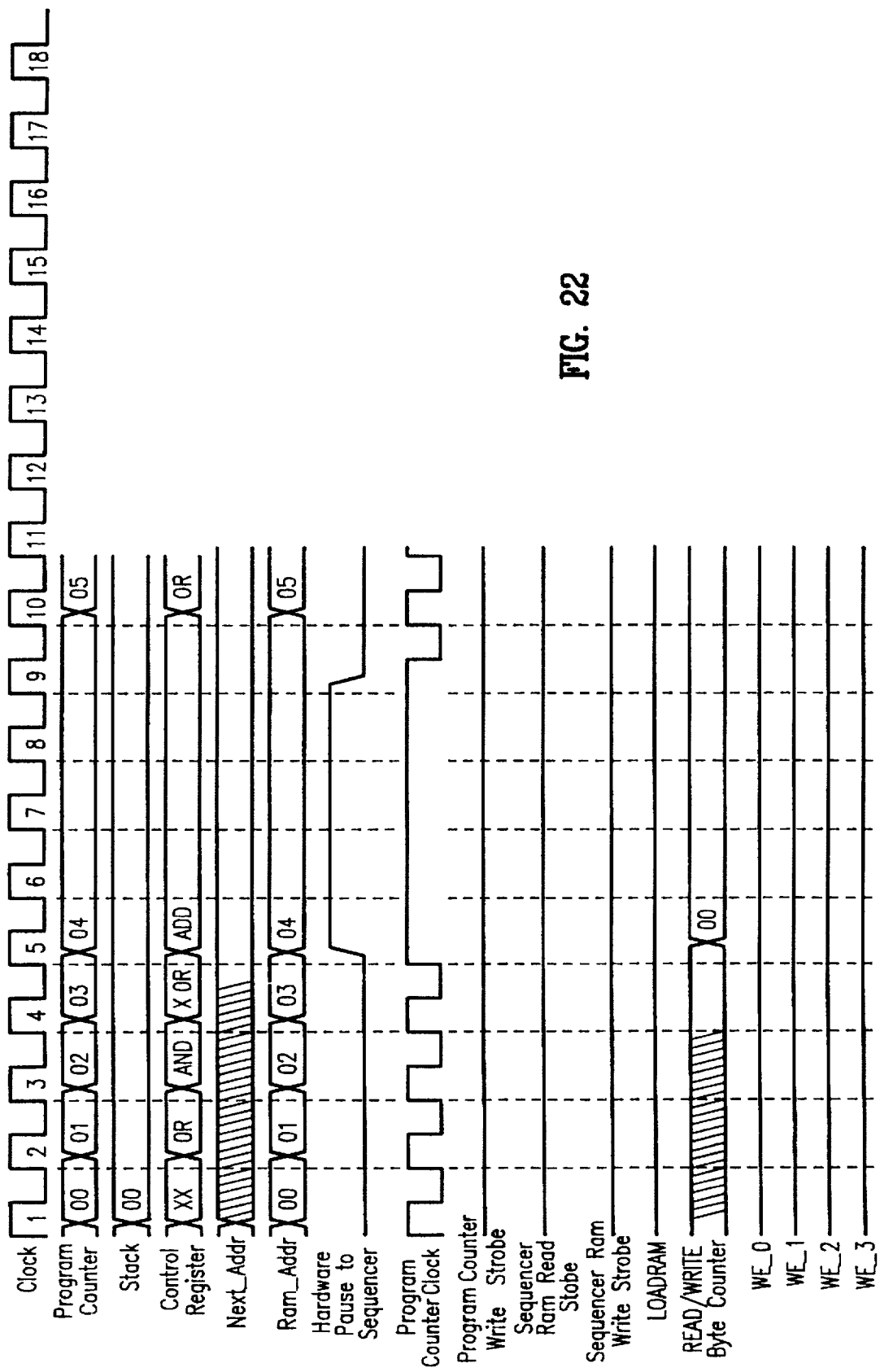
FIG. 22 is a timing diagram illustrating the pausing and restarting of the sequencer of this invention at the same location.

FIG. 22 is a timing diagram illustrating action of sequencer 320 when sequence 320 is paused and restarted at the same location. The timing diagram illustrates execution of the instructions in Table 15.

TABLE 15

| LOCATION | INSTRUCTION |
|----------|-------------|
| 00 | OR |
| 01 | AND |
| 02 | XOR |
| 03 | ADD |
| 04 | OR |
| 05 | — |

FIG. 22 includes traces for sequencer clock, program counter, stack, control register, next address, sequencer RAM address, bit PAUSE, program counter clock, program counter write strobe, sequencer RAM read strobe, sequencer RAM write strobe, bit LOADRAM, read/write byte counter and write enable 0 to write enable 3 from RAM pointer logic to sequencer RAM.

Bit PAUSE is set during clock cycle 5. The resulting active signal on line PAUSE to pause logic circuit drives the signal on line PAUSEACK active which in turn halts sequencer 320 during clock cycle 5 while sequencer 320 is executing instruction "ADD" located at address 004h in sequencer RAM. The signal on line PAUSE and consequently the signal on line PAUSEACK is held active through clock cycles 6, 7 and 8 and goes inactive during clock cycle 9. Thus, sequencer 320 is "unpaused" at the rising edge of clock cycle 10 and resumes execution of instruction "ADD". Note that while sequencer 320 was paused, no change was made to the contents of the program counter by HIM 462. There were no read/write strobes to the program counter and neither was bit LOADRAM asserted.

This is an important aspect of sequencer 320 operation because any change in either the read/write strobes to the program counter or bit LOADRAM would result in a different sequence of operations. Thus, if the intention of the programmer is to merely stop and restart the sequencer 320 at the same point, all that is needed is to assert bit PAUSE in register HCNTRL and deassert bit PAUSE when so desired. As explained previously, the assertion and deassertion of bit pause in register HCNTRL allows a clean switch of CIOBUS 350 from sequencer 320 to HIM 462 and conversely.

Figure 23:
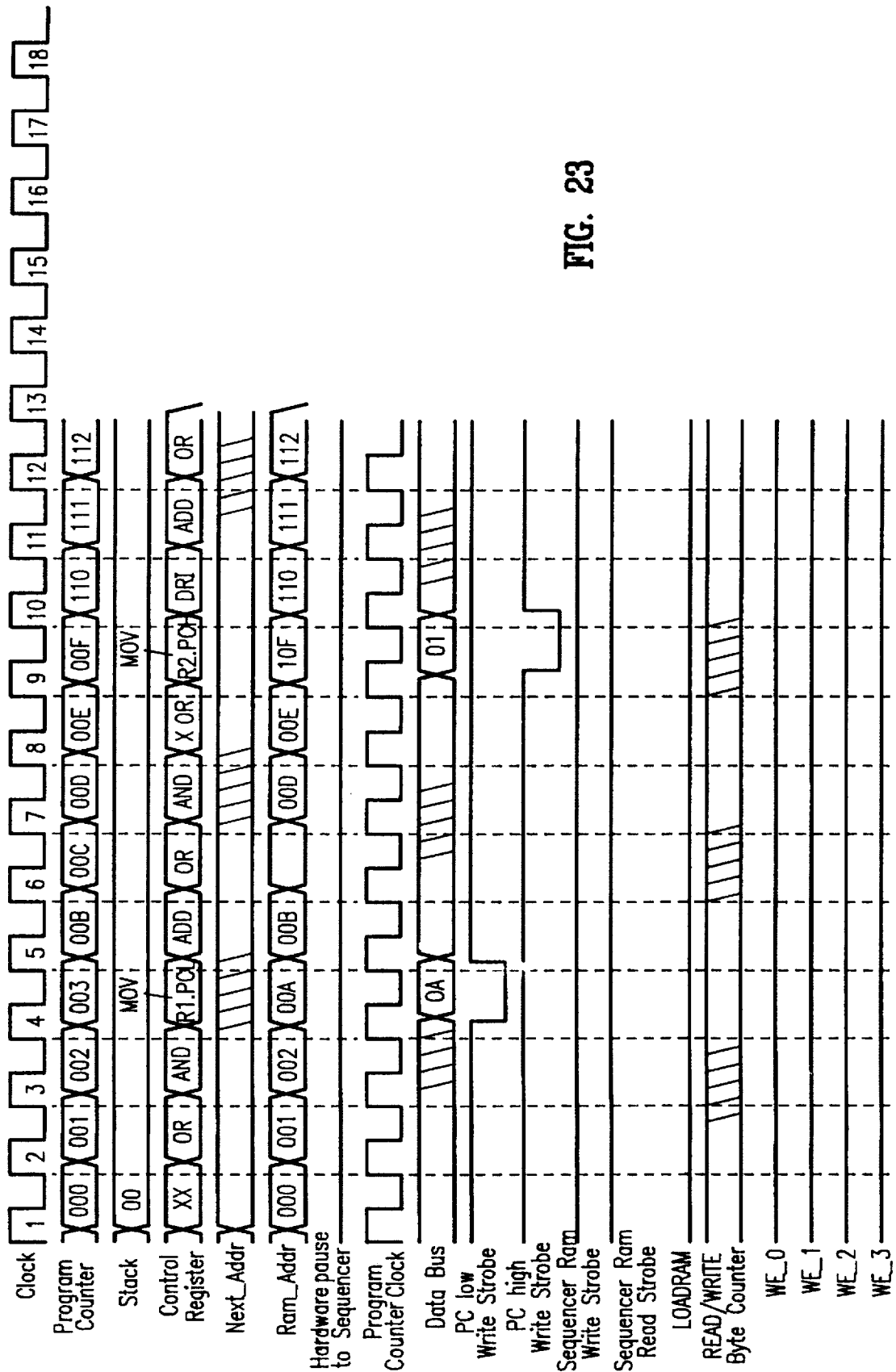
FIG. 23 is a timing diagram illustrating changing on the fly the contents of the program counter in the sequencer of this invention.

The contents of the program counter can be changed without pausing sequencer 320. Either the low or the high bit of the program counter can be written to while sequencer 320 is executing. This ability allows the programmer the luxury of executing an indirect jump instruction. FIG. 23 shows a timing diagram for changing the program counter contents on the fly.

FIG. 23 includes traces for sequencer clock, program counter, stack, control register, next address, sequencer RAM address, bit PAUSE, program counter clock, source data CDDAT bus 604, program counter low byte write strobe, program counter high byte write strobe, sequencer RAM read strobe, sequencer RAM write strobe, bit LOADRAM, read/write byte counter and write enable 0 to write enable 3 from RAM pointer logic to sequencer RAM.

The sequencer instructions for this example are given in Table 16.

TABLE 16

| LOCATION | INSTRUCTION |
|----------|-------------|
| 00 | OR |
| 01 | AND |
| 02 | MOV R1.PCL |
| — | — |
| — | — |
| 0A | ADD |
| 0B | OR |
| 0C | AND |
| 0D | XOR |
| 0E | MOV R2.PCL |
| — | — |
| — | — |
| 10F | ORI |
| 110 | ADD |
| 111 | OR |

Further, for this example, register one contains 0Ah while register two contains 01h. The program instruction to move the contents of register one to the lower byte of the program counter is initiated in the fourth clock cycle. The value 0Ah is on CDDAT bus 604 and the program counter low byte strobe goes low. In the fourth clock cycle, the valve of program counter is 003h but when the program counter low byte write strobe goes low, the value of the RAM address port is 0Ah. Thus, on the fifth clock cycle, the value of the RAM address port is incremented and loaded in the program counter on the rising edge of the program counter low byte write strobe. Execution continues in a normal fashion, i.e., the next instruction executed is at location 0Ah in sequencer RAM 441 and is instruction "ADD". Thus, a jump was effectively executed from location 02h to location 0Ah in sequencer RAM 441.

The program instruction to move the contents of register two to the high bit of the program counter is executed in the ninth clock cycle. In the ninth clock cycle, the program counter has the value 000Fh, the value 01h from register two is on CDDAT bus 604; and the program counter high byte strobe goes low.

When the program counter high byte write strobe goes low, the value of the RAM address port is 10Fh. Thus, on the tenth clock cycle, the value of the RAM address port is incremented and loaded in the program counter on the rising edge of the program counter high byte write strobe. Execution continues in a normal fashion, i.e., the next instruction executed is at location 10Fh in sequencer RAM and is instruction "ORI". Thus, a jump was effectively executed from location 00Fh to location 10Fh in sequencer RAM 441.

To write to sequencer RAM 441, HIM 462 pauses sequencer 320 by setting bit PAUSE (FIG. 24) in register HCNTRL. Upon pausing of sequencer 320, control of CIOBUS 350 is transferred from sequencer 320 to software driver 260, as described above. Once sequencer 320 is paused, software driver 260 sets bit LOADRAM in register SEQCTL to inform sequencer 320 that either a write or a read operation on sequencer RAM 441 is about to occur.

For a write operation, following setting of bit LOADRAM, software driver 260 provides the starting write address by first writing to register SEQADDR0 and then to register SEQADDR1. An important aspect of this invention is that software driver 260 first pauses the sequencer 320, asserts signal LOADRAM and then loads the program counter with the starting address for the write operation. The read/write strobes are used to increment register SEQRAM so that software driver 260 can monitor the number of bytes written to sequencer RAM 441.

An internal counter in RAM pointer logic 1361 increments the sequencer RAM pointer every four sequencer RAM read/write strobes. The programmer must load sequencer RAM 441 starting from the least significant byte first. Similarly, on a read operation the least significant bit of the RAM word is read first. Sequencer RAM 441 cannot be loaded in a middle of a word or read starting from the middle of a word. All read/write operations start from the least significant byte of word boundaries, although the read/write operation can end in the middle of a word.

Figure 24:
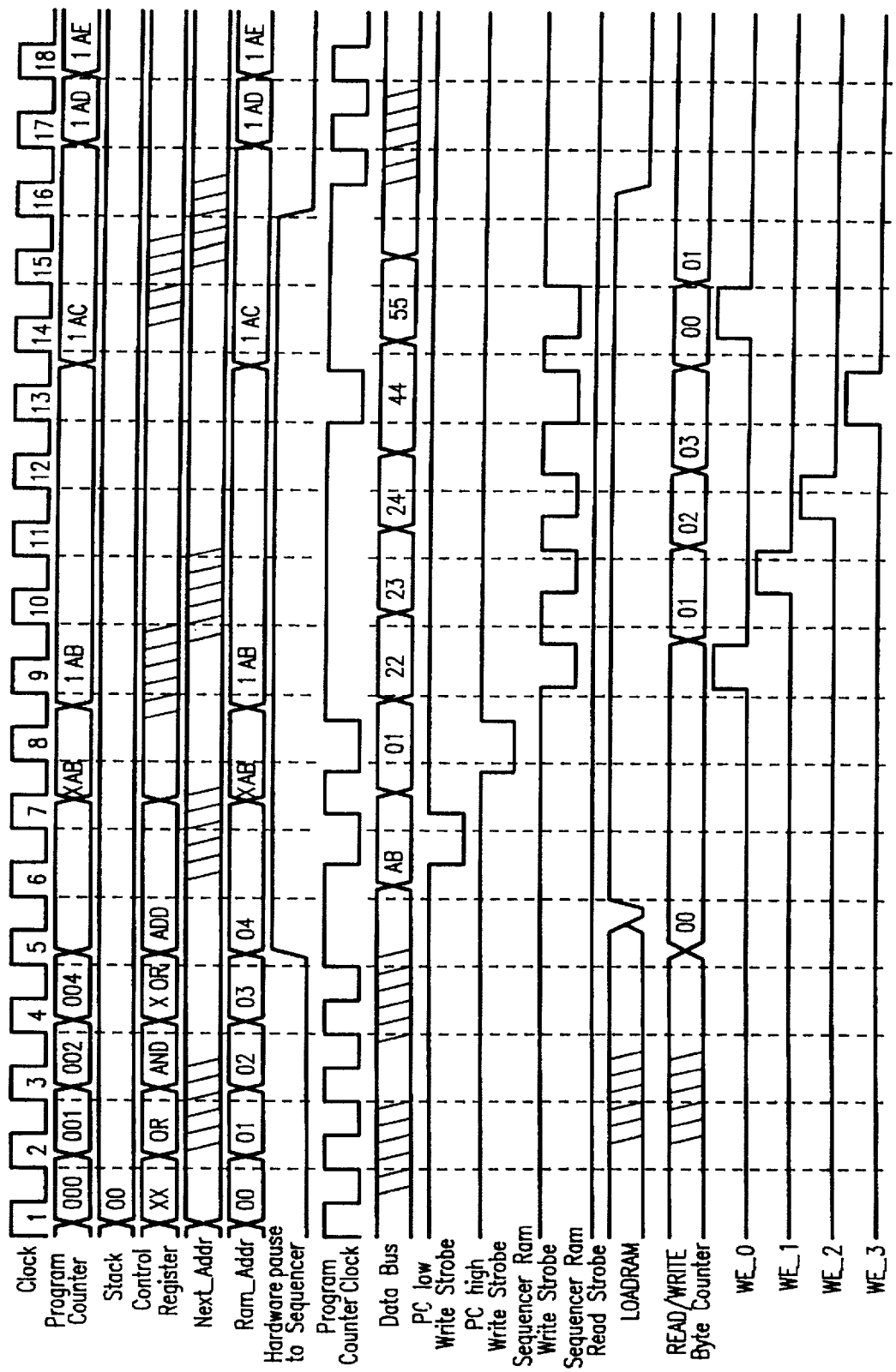
FIG. 24 is a timing diagram illustrating pausing the sequencer and writing five bytes to location 1ABh.

FIG. 24 is a timing diagram for writing five bytes of data to location 1AB in sequencer RAM 441 by HIM 462. The process is identical to that just described and so the process is not repeated here completely. FIG. 24 includes traces for sequencer clock, program counter, stack, control register, next address, sequencer RAM address, bit PAUSE, program counter clock, CDDAT bus 602, program counter low byte write strobe, program counter high bite strobe, sequencer RAM read strobe, sequencer RAM write strobe, bit LOADRAM, read/write byte counter and write enable 0 to write enable 3 from RAM pointer logic 1361 to sequencer RAM 441. The sequencer instructions being executed prior to the write for this example are given in Table 17.

TABLE 17

| LOCATION | INSTRUCTION |
| --- | --- |
| 00 | OR |
| 01 | AND |
| 02 | XOR |
| 03 | ADD |
| 04 | OR |
| 05 | — |

On clock cycle 2, 3 and 4, sequencer 320 executes indstruction "OR", "AND", and "XOR", respectively. Bit PAUSE in register HCNTRL is set at the rising edge of clock cycle 5 and signal PAUSE goes active during clock cycle 5 thereby pausing sequencer 320 on instruction "ADD". Upon sequencer 320 sensing that bit PAUSE is set, signal PAUSEACK is driven active which in turn, as described above, transfers control of CIOBUS 350 from sequencer 320 to software driver 260. Hence, software driver 260 loads bit LOADRAM so that signal LOADRAM is asserted at the start of clock cycle 6. Process flow diagram 1800 and Table 13, which described the sequence of operations when sequencer 320 is paused, describe the sequence of actions that now occur.

Specifically, software driver 260 puts value ABh on CDDAT bus 602. Signal PAUSEACK is active and when the signal on program counter low byte write strobe goes active in clock cycle 7 value ABh is loaded into the least significant byte PCL of the program counter. [Note that him 462 is controlling the program counter clock.]

Software driver 260 puts value 01h on CDDAT 602. Signal PAUSEACK is still active, and when the signal on program counter high byte write strobe goes active in clock cycle 8 value 01h is loaded into the most significant byte PCH of the program counter.

Thus, at the start of clock cycle 9, the sequencer RAM address is 1ABh. Software driver 260 next loads, in sequence, values 22h, 23h, 24h, 44h, and 45h, and provides signals that generate five sequential rising clock edges on sequencer RAM write strobe line. When the signal on sequencer RAM write strobe line goes low, a write enable signal corresponding to the number of times the write strobe line has gone low, goes active. In this embodiment, there are four write enable lines and so the number of times the write strobe line goes low is cyclic with respect to the four write enable lines.

The write enable signal in combination with the write strobe, loads the value on CDDAT bus 602 into sequencer RAM 441 and the write strobe increments read/write byte counter. When write enable line WE_3 goes active to write 44h into sequencer RAM, RAM pointer logic also generates a signal that drives the program counter clock low. As the program counter clock goes high, the program counter is incremented to the new address 1ACh. Also, this enables roll-over, so that the fifty byte is loaded in conjunction with the signal on WE_1 on the write strobe.

Figure 25:
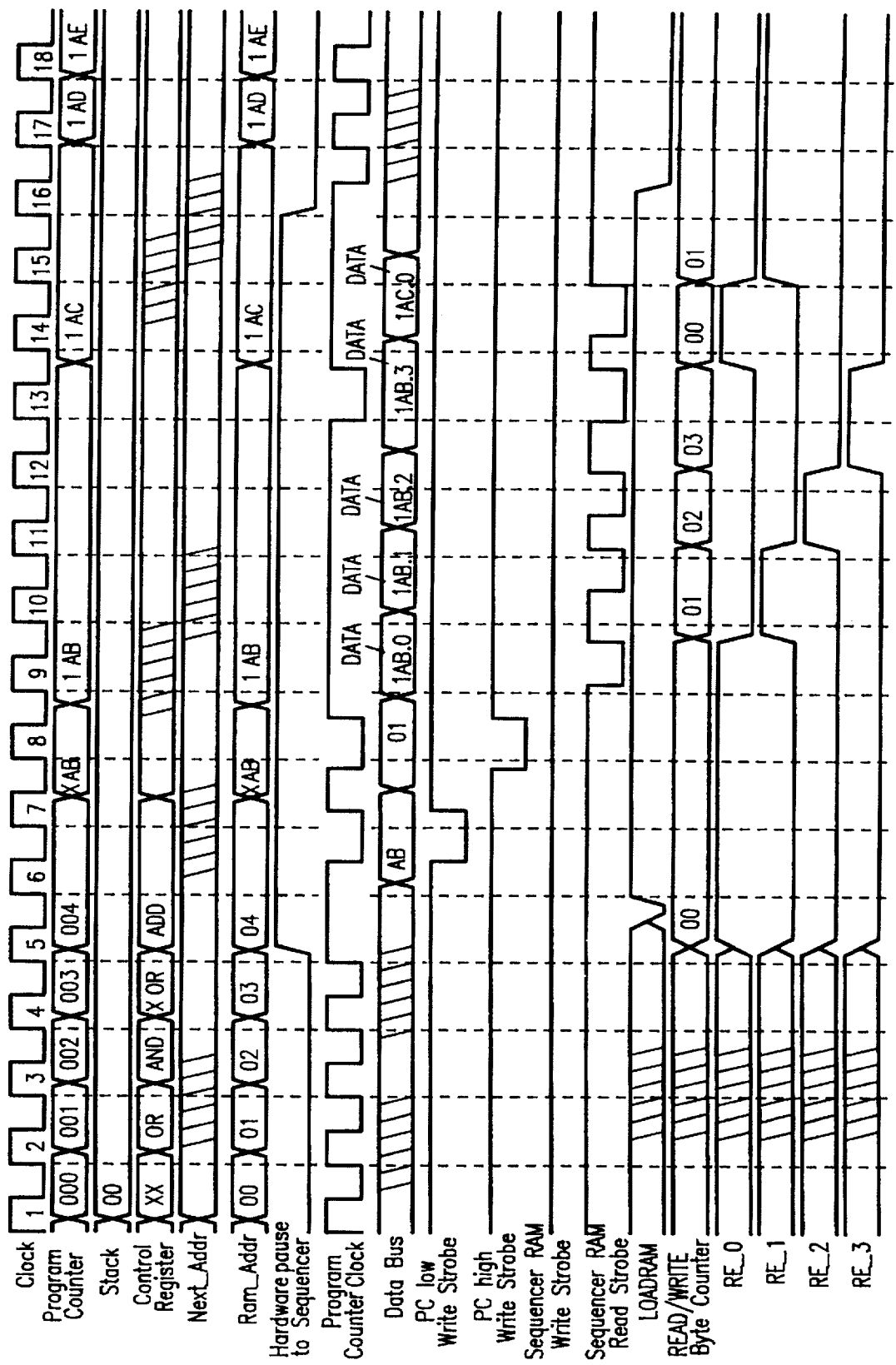
FIG. 25 is a diagram illustrating pausing the sequencer of this invention and reading five bytes from location 1ABh.

Sequencer 320 is unpaused at the rising edge of clock cycle 16 and returns to normal operation. The timing diagram for a read of five bytes of data at sequencer RAM location 1ABh (FIG. 25) is identical to the write timing diagram except for the read/write strobes and enable signals. It is also important to note that signal LOADRAM needs to be toggled if software driver 260 wants to read the contents of sequencer RAM 60 that was just written to without unpausing sequencer 320.

In addition to the normal operation of sequencer 320, there are three debug features within sequencer 320. These features include single stepping through microcode, pausing sequencer 320 at a known sequencer RAM address, and pausing sequencer 320 at a first sequencer RAM address and restarting sequencer 320 at a different second sequencer RAM address.

Figure 26:
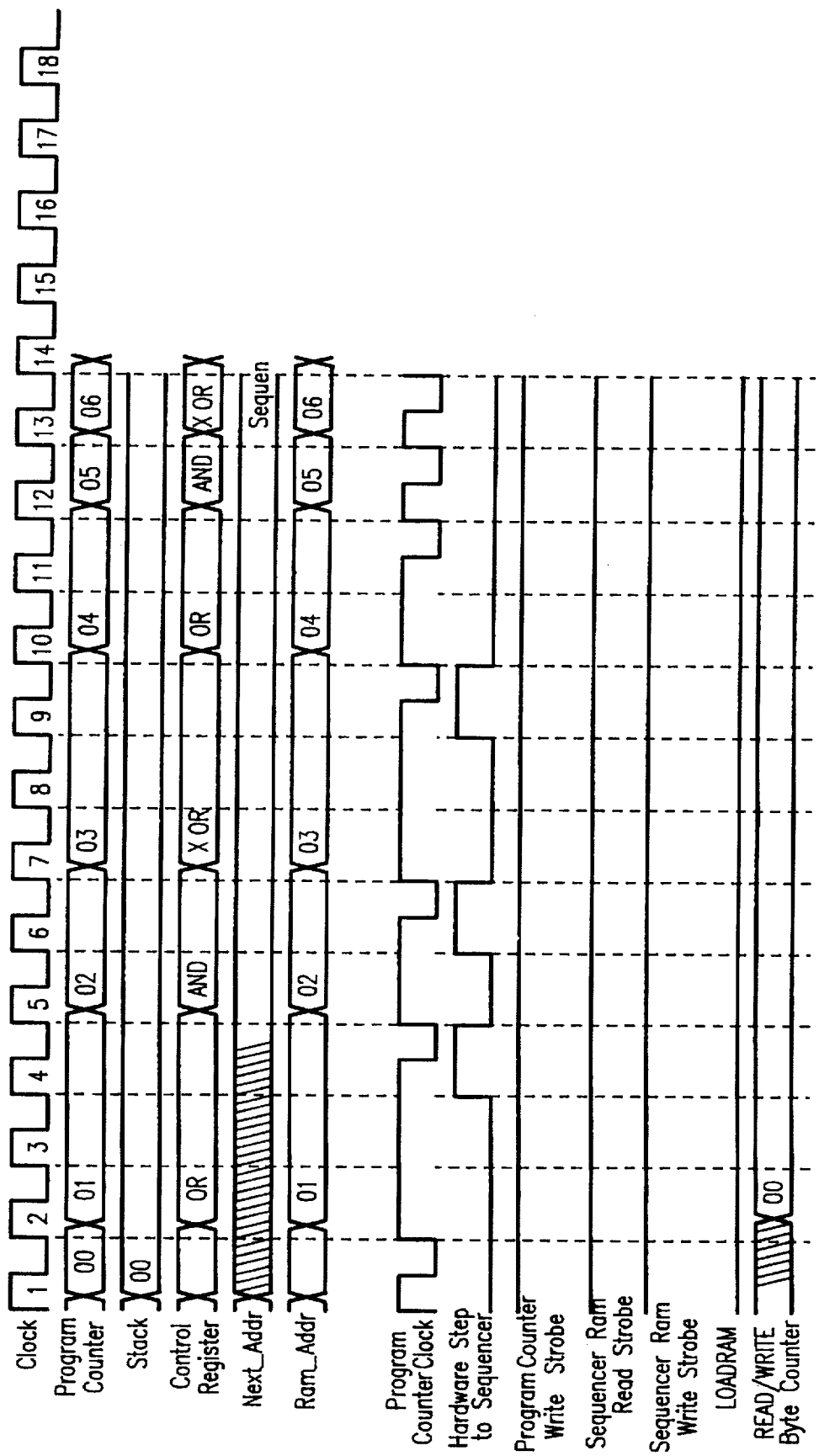
FIG. 26 is a timing diagram illustrating single stepping through the sequencer firmware of this invention.

To single step sequencer 320, software driver 260 first pauses sequencer 320 by setting bit PAUSE in register HCNTRL. After software driver 260 receives signal PAUSEACK, driver 260 sets bit STEP in register SEQCTL. Software driver 260 then unpauses sequencer 320 by writing a zero to bit PAUSE. Sequencer 320 executes one instruction and pauses. Host driver single steps through sequencer 320 microcode in this fashion for as many clock cycles as desired by resetting bit PAUSE in register HCNTRL. Sequencer 320 is returned to the normal mode of operation by writing a zero to bit STEP and then unpausing sequencer 320. The timing diagram for single stepping is given in FIG. 26.

To pause on a known sequencer RAM address, software driver 260 first loads break address registers BRKADDR1 and BRKADDR0 with the desired nine bit address after pausing sequencer 320. If the most significant bit of register BRKADDR1 is set, address comparison is disabled. Sequencer 320 is then unpaused and allowed to run. When the program counter equals the break address, sequencer 320 halts executing at the current instruction. Sequencer 320 asserts the break address interrupt on line BRKADRINT to the host interface module 310. At this point, the programmer can either load a new break address and restart sequencer 320 execution by unpausing sequencer 320, or single step through sequencer microcode, as described above. To allow resumption of execution from the same point after breaking on an address, address comparison is deliberately disabled for one clock cycle after bit PAUSE is released. This is consistent with the handling of other interrupts which are disabled for the first sequencer instruction execution cycle after bit "PAUSE" is released.

If a programmer wishes to break on an instruction located at address "X", then the break address loaded should be 'X+1' provided the instruction located at 'X+1' is the logical outcome of the execution of the instruction located at "X", considering the pipelined nature between the value of the program counter and the instruction being executed.

Figure 27:
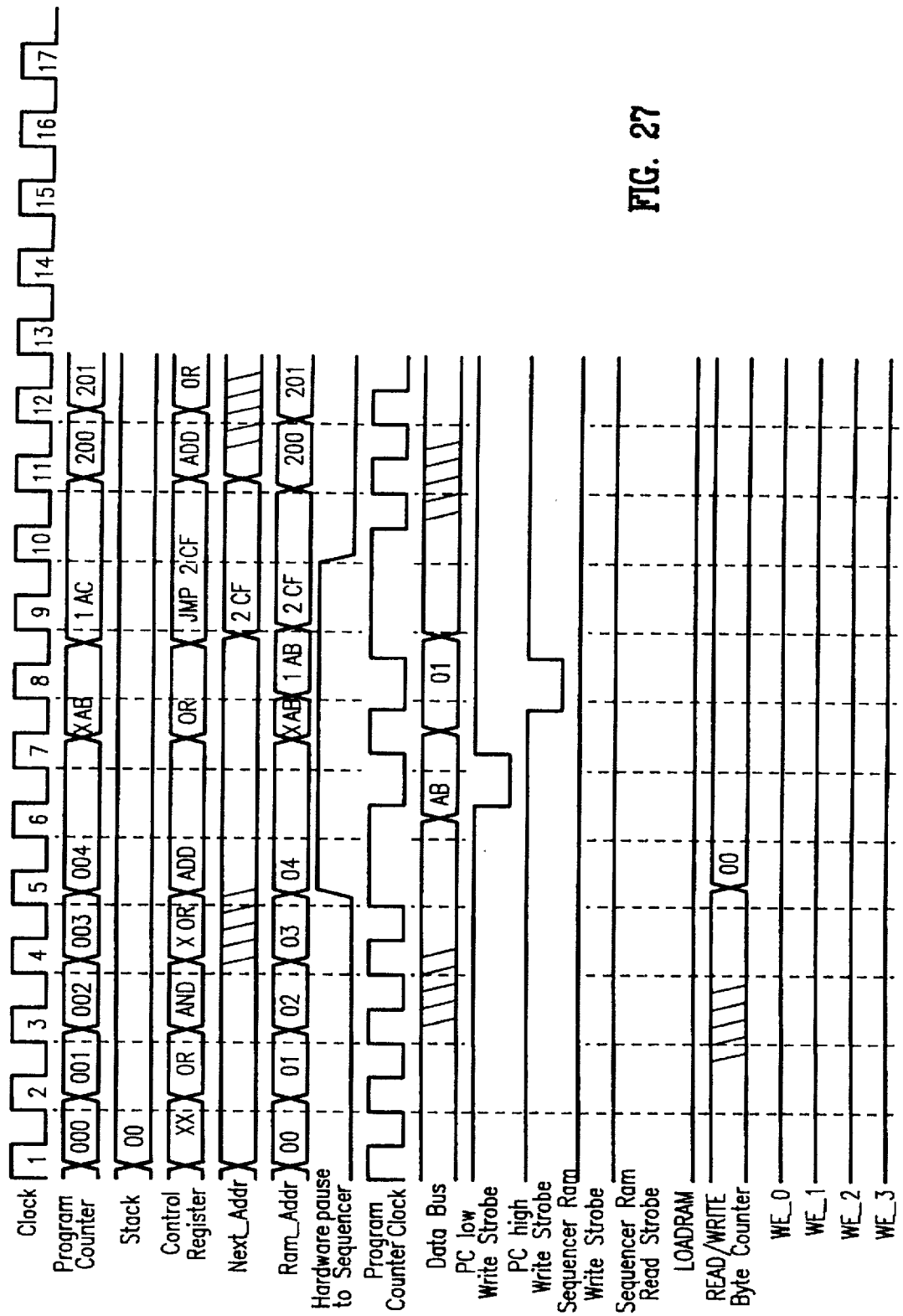
FIG. 27 is a timing diagram of pausing the sequencer of this invention and restarting the sequencer at a new address location.

After sequencer 320 is paused, sequencer 320 is restarted by releasing bit PAUSE in register HCNTRL. If the programmer intends sequencer 320 to restart execution at a different location in the sequencer map, he or she has the ability to do so. This feature could be used as a debugging aid. The timing diagram of FIG. 27 illustrates this operation. Sequencer 320 is paused during the execution of instruction "ADD" at the rising edge of clock cycle 5. The programmer wishes to restart sequencer 320 at location 1ABh, which has an unconditional jump instruction in this example. The programmer must first load the low byte of the address in register SEQADDR0 and then the high byte of the address in register SEQADDR1. The programmer has no choice but to load the address in this sequence to ensure proper operation of sequencer 320. After the new location address is loaded into the program counter, sequencer 320 is restarted by deasserting bit PAUSE in register HCNTRL. In this example, sequencer 320 is unpaused at the rising edge of clock cycle 10, where it executes an unconditional jump instruction. Please note that bit LOADRAM signal was deasserted throughout this operation.

Program development for sequencer 320 is done with the Microsoft Macro Assembler. A series of instructions are defined and implemented in a macro include file which compile to a linkable object module. The resulting object module can be directly loaded into sequencer RAM 441.

The following is a definition of the instruction set for generating sequencer programs for host adapter integrated circuit 7770 of this invention. These instructions are compiled to multi-byte opcodes, which are loaded into control register 650 of sequencer 320. All instructions compile to one opcode, unless otherwise indicated.

```
Definitions
    A =
    accumulator
    ret =
    return
    [] =
    optional
    / =
    alternative
    Z =
    zero
    flag
    CY
    =
    carry
    flag
Move
    mov destination,source [ret]
        Move source to destination.
        Return (optional).
        Flags affected: Z
    mvi destination,immediate [ret]
        Move immediate to destination.
        Return (optional).
```

-continued

```
        Flags affected: Z
Logical
    not destination[,source] [ret]
        Move source to destination (optional).
        Move one's complement of destination to
        destination.
        Return (optional).
        Flags affected: Z
    and destination,immediate/A[,source] [ret]
        Move source to destination (optional).
        Move logical AND of destination and
        immediate/accumulator to destination.
        Return (optional).
        Flags affected: Z
    or  destination,immediate/A[,source] [ret]
        Move source to destination (optional).
        Move logical OR of destination and
        immediate/accumulator to destination.
        Return (optional).
        Flags affected: Z
    xor destination,immediate/A[,source] [ret]
        Move source to destination (optional).
        Move logical Exclusive OR of destination
        and immediate/accumulator to destination.
        Return (optional).
        Flags affected: Z
    nop
        No operation performed.
        No destinations altered.
        Flags affected: Z
Arithmetic
    add destination,immediate/A[,source] [ret]
        Move source to destination (optional).
        Move arithmetic ADD without carry of
        destination and immediate/accumulator to
        destination.
        If immediate = 0:
            Moves destination prior to ADD to
            accumulator.
            Compiles to two instructions;
        Return (optional).
        Flags affected: Z, CY
    adc destination,immediate/A[,source] [ret]
        Move source to destination (optional).
        Arithmetic ADD with carry of destination
        and immediate/accumulator to destination.
        If immediate = 0:
            Moves destination prior to ADD to
            accumulator.
            Compiles to two instructions.
        Return (optional).
        Flags affected: Z, CY
    inc destination[,source] [ret]
        Move source to destination (optional).
        increment destination.
        Return (optional).
        Flags affected: Z, CY
    dec destination[,source] [ret]
        Move source to destination (optional).
        Decrement destination.
        Return (optional).
        Flags affected: Z, CY
Shifts,
rotates
    shl destination[,source],number [ret]
        Move source to destination (optional).
        Shift destination left by 'number' bit
        positions.
        256 > number > = 0
        n = bits 2–0 of 'number'
        Move bit 8–n to CY.
        Move bit 0 to 0, . . . ,n–1,n–2.
        Return (optional).
        Flags affected: Z, CY
    shr destination[,source],number [ret]
        Move source to destination (optional).
        Shift destination right by 'number' bit
```

-continued

```
            positions.
            256 > number > = 0
            n = bits 2-0 of 'number'
            Move 0 to bits 7, . . . ,8-n.
            Move bit n-1 to CY.
            Return (optional).
            Flags affected: Z, CY
    rol  destination[,source],number [ret]
            Move source to destination (optional).
            Rotate destination left by 'number' bit
            positions.
            256 > number > = 0
            n = bits 2-0 of 'number'
            Move bit 8-n to CY.
            Move bit 8-n to bit 0.
            Return (optional).
            Flags affected: Z, CY
    ror  destination[,source],number [ret]
            Move source to destination (optional).
            Rotate destination right by 'number' bit
            positions.
            256 > number > = 0
            n = bits 2-0 of 'number'
            Move bit n-1 to bits 7.
            Move bit n-1 to CY.
            Return (optional).
            Flags affected: Z, CY
    rcl  destination[,source] [ret]
            Move source to destination (optional).
            Move destination to accumulator.
            Rotate destination left through carry.
            Move bit 7 to CY.
            Move CY to bit 0.
            Compiles to 2 command lines.
            Return (optional).
            Flags affected: Z, CY
    xchg destination[,source] [ret]
            Move source to destination (optional).
            Exchange nibbles in destination.
            Return (optional).
            Flags affected: Z, CY
Branches jmp/jc/jnc/call address
            Unconditional jump/jump on carry/jump on
            not carry/call to next address.
            Flags affected: Z
    mov  source jmp/jc/jnc/call address
            Move source to source index register.
            Unconditional jump/jump on carry/jump on
            not carry/call to next address.
            Flags affected: Z
    mvi  immediate jmp/jc/jnc/call address
            Move immediate to source index register.
            Unconditional jump/jump on carry/jump on
            not carry/call to next address.
            Flags affected: Z
    or   source,immediate jmp/jc/jnc/call address
            Move logical OR of source and immediate to
            source index register.
            Unconditional jump/jump on carry/jump on
            not carry/call to next address.
            Flags affected: Z
```

```
    test source,immediate/A jz/jnz address
            Logical AND of source and
            immediate/accumulator.
            Jump on zero/not zero to next address.
            No destination are altered.
            Flags affected: Z
    cmp  source,immediate/A je/jne address
            Compare source and immediate/accumulator.
            Jump on equal/not equal to next address.
            No destination are altered.
            Flags affected: Z
    ret
            Unconditional return from subroutine.
            No destinations altered.
            Flags affected: Z
Flag operations -
    clc  [mov destination,immediate/A| [ret]
            Clear carry flag.
            Move immediate or accumulator to
            destination (optional).
            Return (optional).
            Flags affected: Z, CY
    stc  [destination] [ret]
            Set carry flag.
            Clear destination (optional).
            Return (optional).
            Flags affected: Z, CY
```

Figure 28:
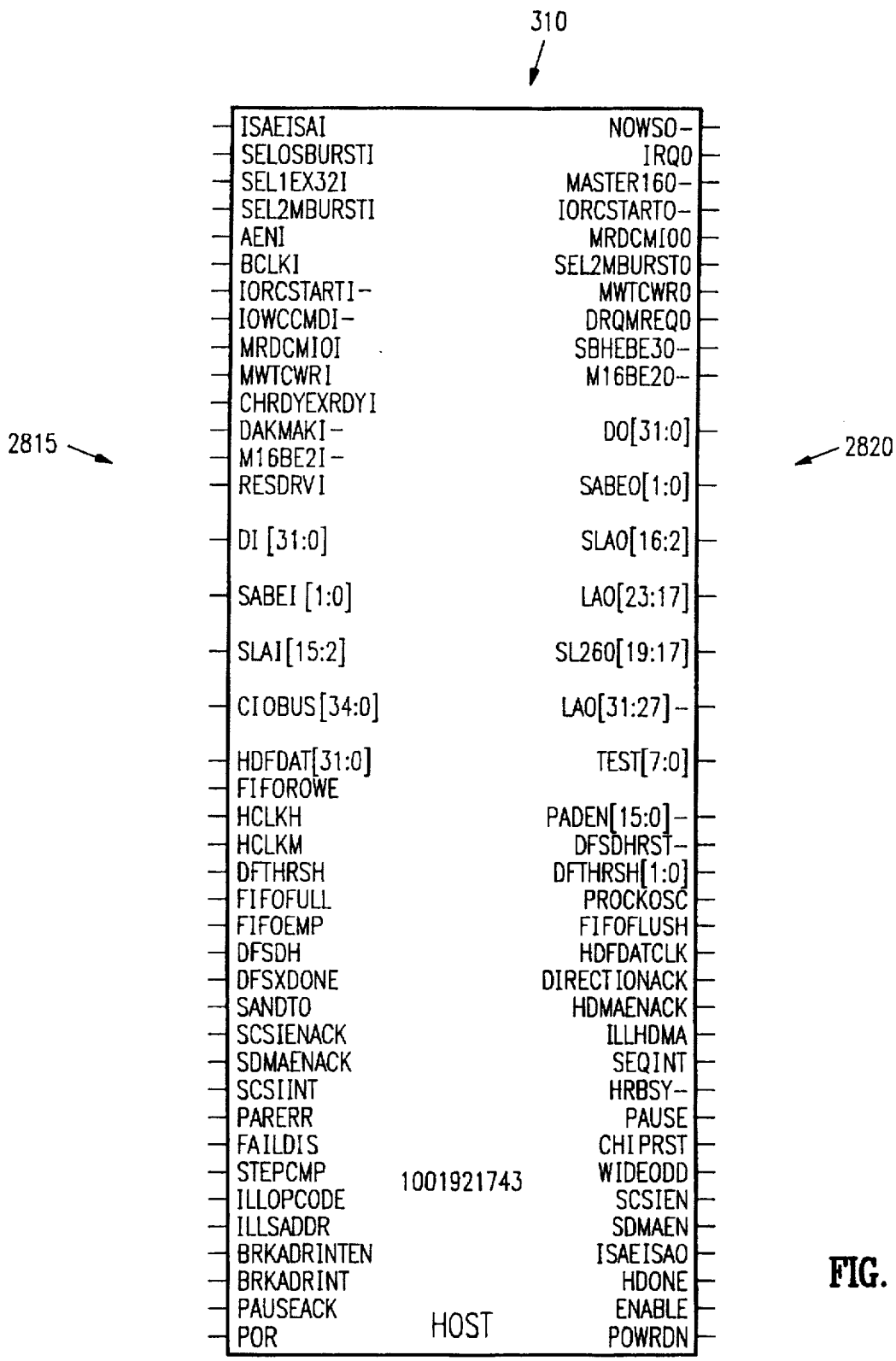
FIG. 28 is an illustration of the signal interface for the host interface module of this invention.

FIG. 28 is one embodiment of host interface module 310 signal interface showing external signal interface 2815 and internal signal interface 2820. Host interface module 310 provides the functional control to operate host adapter 7770 either as a ISA bus slave, an ISA bus master, an EISA slave, or an EISA bus master to transfer data and commands between external interface 315, which is connected to host adapter 7770 and internal interface 320 to other modules in host adapter 7770.

When host interface module 310 is configured to support an ISA bus 226 (FIG. 3), host interface module 310 as an ISA slave has a bus address range selected from one of eight possible ranges. Specifically, in ISA mode, a flexible capability is provided to externally select one of the eight primary address range selections given in Table 18 below, from the ISA expansion board I/O address range of 100h to 3FFh, for host adapter 7770 ISA mode I/O decode primary address space of 32 addresses with low signals on lines SA[15:13]. After the ISA address range is selected, the other seven ranges can be used as aliases selected by address bits on lines SA[12:10], which are described more completely below, to expand host adapter I/O addressing to 256 addresses. Alias 4, address range 125fh:1120h, (with a low signal on lines IOSEL[2:0]) is reserved for host interface internal registers, which are described more completely below.

TABLE 18

| ISA I/O DECODE PRIMARY RANGE SELECTIONS | | | | | | | | | |
|---|---|---|---|---|---|---|---|---|---|
| IOSEL (210) | Primary | ALIAS1 | ALIAS2 | ALIAS3 | ALIAS4 | ALIAS5 | ALIAS6 | ALIAS7 | (5:9) |
| 000 | 0120-013F | 0520-053F | 0920-093F | 0D20-0D3F | 1120-125F | 1520-153F | 1920-193F | 1D20-1D3F | 09 |
| 001 | 0140-015F | 0540-055F | 0940-095F | 0D40-0D5F | 1140-115F | 1540-155F | 1940-195F | 1D40-1D5F | 0A |
| 010 | 0220-023F | 0620-063F | 0A20-0A3F | 0E20-0E3F | 1220-123F | 1620-163F | 1A20-1A3F | 1E20-1E3F | 11 |
| 011 | 0240-025F | 0640-065F | 0A40-0A5F | 0E40-0E5F | 1240-125F | 1640-165F | 1A40-1A5F | 1E40-1E5F | 12 |
| 100 | 0280-029F | 0680-069F | 0A80-0A9F | 0E80-0E9F | 1280-129F | 1680-169F | 1A80-1A9F | 1E80-1E9F | 14 |
| 101 | 02A0-02BF | 06A0-06BF | 0AA0-0ABF | 0EA0-0EBF | 12A0-12BF | 16A0-16BF | 1AA0-1ABF | 1EA0-1EBF | 15 |

TABLE 18-continued

ISA I/O DECODE PRIMARY RANGE SELECTIONS

| IOSEL (210) | Primary | ALIAS1 | ALIAS2 | ALIAS3 | ALIAS4 | ALIAS5 | ALIAS6 | ALIAS7 | (5:9) |
|---|---|---|---|---|---|---|---|---|---|
| 110 | 0320-033f | 0720-073F | 0b20-0B3F | 0F20-0F3F | 1320-135F | 1720-173f | 1b20-1b3f | 1f20-1f3f | 19 |
| 111 | 0340-035F | 0740-075F | 0B40-0B5F | 0F40-0F5F | 1340-135F | 1740-175F | 1B40-1B5F | 1F40-1F5F | 1A |

In addition to external ISA address range selection, host interface module 310, as an ISA 8-bit bus slave is capable of fast I/O that is programmable for three or four bus clock periods (the default is four and no ISA channel ready delays). As an ISA bus master, host interface module 310 supports a twenty four-bit address range, programmable memory command signal timing (50 nsec steps) for memory transfer rates of from 2 to 10 Mbytes/sec for 8- or 16-bit data with no channel ready delays, programmable bus master active period and from two bus clock periods and from 1 to 15 μs with a requirement of at least one data transfer, and a programmable bus master active period separation of two bus clock periods and from 4 to 60 μs. Further, ISA mode operation provides pullup termination of unused EISA input lines.

In an EISA mode of operation, host interface module 310 supports EISA 8-bit bus slave operation with fast I/O (three bus clock periods), signals STARTI- and CMDI-signal deskew, and no EISA channel ready delays and includes EISA product identification and board control register support. As an EISA bus master, host interface module 310 supports 32-bit memory data transfers with no channel ready delays in normal mode up to 16.5 MBytes/sec including leading and trailing 32-bit boundary offsets, i.e., the first transfer advances to the next higher 32-bit boundary (one to three bytes for reading offsets), and the last transfer, when the transfer count is less than four transfers one to three bytes for trailing offset; 32-bit memory data transfers in burst mode at up to 33 MBytes/sec including leading and trailing 32-bit offsets; downshift capability for EISA 16-bit memory burst mode transfers up to 16.5 MBytes/sec; 32-bit memory data transfers in data size translation mode at up to 11 MBytes/sec; and a 32-bit address range.

The EISA I/O map is contained entirely within the slot specific address range of zCOO-zCFF where "z" is the slot number. The on-chip address may be obtained from the EISA address by using the lower 8 bits of the EISA address. Address bits LA10 and LA11 are not decoded so that host adapter 7770 will respond to addresses 000-0BF, 400-4BF, 800-8BF, and C00-CBF. This is to allow for multiple host adapters attached to a single EISA slot with some additional external decoding logic. The EISA ranges for the current embodiment are summarized in Table 19.

TABLE 19

| Register Group | Address range |
|---|---|
| SCSI Module | C00-C1F |
| Scratch Ram | C20-C5F |
| Sequencer | C60-C7F |
| Host Interface Module | C80-C9F |
| SCB Array | CA0-CBF |

Further, as explained more completely below, host interface module 310 supports the operation of data FIFO memory circuit 360 and SCB array 443. Also, as explained more completely below, data FIFO memory circuit 360 includes a data FIFO with bi-directional 8-, 16-, and 32-bit data paths with leading and trailing byte offset control as well as capability for packing and unpacking to and from 32-bits for 8-bit and 16-bit external transfers. Programmable data FIFO threshold levels are used to initiate bus master requests. Further, a capability for both automatic and manual data FIFO flushes for transfer to system memory 230 is supported by both host interface module 310 and data FIFO module 360.

Other features included in host interface module are FIFOs for managing SCB transfer to and from SCB array 443; selection of either positive or negative active hardware interrupts to computer system 200; power down capability; interrupt status; an error register; data FIFO status; data path control; illegal address detection and interrupt generation.

Table 20 includes the symbol name for each line in external signal interface 2815 and the ISA and EISA signals carried over that line. For convenience, herein, a line and the signal on that line have the same reference numeral. Further, when, for example, EISA mode of operation is described, the EISA signal names are used. Table 20 provides a translation of each EISA signal name to the line in external signal interface 2815 for such discussions.

External signal interface 2815 is configured to support one of an ISA bus interface pinout or an EISA bus interface pinout. The state of the signal on one external interface pin, a bus mode select pin, selects either the ISA bus interface pinout or the EISA bus interface pinout. External interface 2815 includes 83 signal pins plus 13 ground pins and five power pins. Thirty of the signal pins are common to both the ISA bus interface pinout or the EISA bus interface pinout. Twenty-one of the signal pins are used only in the EISA bus interface and thirty-two of the signal pins are switched between the two bus interfaces by the signal on the bus mode select pin.

TABLE 20

| SYMBOL FOR EX. LINE | TYPE | DESCRIPTION |
|---|---|---|
| AENI | I,2x | Address enable input signal |
| BCLKI | I,4 | Bus clock input signal |
| CHRDYEXRDYI | I,1x | This combined name signal has a dual purpose and is switched from ISA channel ready input signal CHRDYI to EISA channel ready input signal EXRDYI by the state of input signal ISAEISA. |
| DAKMAKI- | I,2x | This combined name signal has a dual purpose and is switched from ISA DMA acknowledge input signal DAKI- to ISA memory acknowledge signal MAKI- by the state of input signal ISAEISA. |
| DO[7:0] | O,6x | Data out lines [7:0] are the low 8-bits of the system data out bus DO[31:0]. |

TABLE 20-continued

| SYMBOL FOR EX. LINE | TYPE | DESCRIPTION |
|---|---|---|
| DI[7:0] | I,3x | Data input lines [7:0] are the low 8-bits of the system data in bus DI[31:0]. |
| DO[15:8] | O,6x | Data out lines [15:8] are the high 8-bits of the low 16-bit data word. |
| DI[15:8] | I,2x | Data input lines [15:8] are the high 8-bits of the low 16-bit data word. |
| DO[23:16] | O,6x | Data output lines [23:16] are the third 8 bits (least significant plus two bytes of a double word) of the 32-bit EISA data bus. |
| DI[23:16] | I,2x | Data input lines [23:16] are the third 8 bits (least significant plus two bytes of a double word) of the 32-bit EISA data bus. |
| DO[31:24]- | O,6x | Data output lines [31:24] are the fourth 8 bits (least significant plus three bytes of a double word) of the 32-bit EISA data bus. |
| DI[31:24]- | I,2x | Data input lines [31:24] are the fourth 8-bits (least significant plus three bytes of a double word) of the 32-bit EISA data bus. |
| DRQMREQO | O,6x | This combined name signal has a dual purpose and is switched from ISA DMA request output line DRQO to EISA memory request output line MREQO- by the state of input signal ISAEISA. |
| IORCSTARTO- | O,8x | This combined name signal has a dual purpose and is switched from ISA I/O read command output signal IORCO- to start transfer cycle output signal STARTO- by the state of input signal ISAEISA. |
| IORCSTARTI | I,2x | This combined name signal has a dual purpose and is switched from ISA I/O read command in signal IORCI- to start transfer cycle input signal STARTI- by the state of input signal ISAEISA. |
| SEL1EX32I | I,3x | This combined name signal has a dual purpose and is switched from ISA I/O select input1 signal IOSELI1 to EISA 32-bit data status input- signal EX32I- by the state of ISAEISA input signal. |
| SEL2MBURSTO | O,6x | This combined name signal has a dual purpose and is switched from ISA I/O select output IOSELO2 to EISA master burst output signal MBURSTO- by the state of input signal ISAEISA. |
| SEL2MBURSTI | I,2x | This combined name signal has a dual purpose and is switched from ISA I/O select input-2 IOSEL2I to EISA Memory burst input signal MBURSTI- another by the state of input signal ISAEISA. |
| IOWCCMDI- | I,2x | This combined name signal has a dual purpose and is switched from ISA I/O write command input signal IOWCI- to EISA command input signal CMD- by the state of input signal ISAEISA. |
| IRQO | O,4x | Interrupt request output signal. |
| ISAEISAI | O,6x | ISAEISA input signal. |
| LAO[23:17] | O,6x | Latched address output lines [23:17]. |
| LAO[31:24]- | O,6x | Latched address output lines [31:24]-. |
| M16BE2O | O,6x | This combined name signal has a dual purpose and is switched from ISA memory 16-bit output signal M16O- to EISA byte enable output -2 signal BE2- by the state of input signal ISAEISA. |
| M16BE2I | I,2x | This combined name signal has a dual purpose and is switched from ISA memory 16-bit status input signal M16I- to EISA byte enable input 2, BEI2- by the state of input signal ISAEISA. |
| MASTER16O- | O,6x | Master 16-bit data status output-signal. |
| MRDCMIOO | O,6x | This combined name signal has a dual purpose and is switched from ISA memory read command output signal MRDCO- to EISA memory I/O data status output signal MIOO by the state of input signal ISAEISA. |
| MRDCMIOI | I,2x | This combined name signal has a dual purpose and is switched from ISA memory read command input signal MRDCI- to EISA memory/IO data status signal MIOI by the state of ISAEISA input signal. |
| MWTCWRO | O,6x | This combined name signal has a dual purpose and is switched from ISA memory write command output signal MWTCO- to EISA write data status output signal WRO by the state of ISAEISA input signal. |
| MWTCWRI | I,2x | This combined name signal has a dual purpose and is switched from ISA memory write command output signal MWTCI- to EISA write data status output signal WRI by the state of ISAEISA input signal. |
| NOWSO- | O,6x | No wait state output signal |
| PADEN[15:0]- | O,8x | Pad enable bus [15:0]-. |
| RESDRVI | I,2x | Reset drive input signal. |
| SABEO[1:0] | O,6x | These combined name signals have a dual purpose and are switched from ISA system address output lines SAO[1:0] to EISA byte enable input lines BEO[1:0]- by the state of input signal ISAEISA. |
| SABEI[1:0] | I,2x | These combined name signals have a dual purpose and are switched from ISA system address input lines SAI[1:0] to EISA byte enable input lines BEI[1:0]-by the state of input signal ISAEISA. |
| SLAO[11:2] | O,6x | These combined name signals have a dual purpose and are switched from ISA system address output lines SAO[11:2] to EISA latched address output lines LAO[11:2] by the state of input signal ISAEISA. |
| SLAI[11:2] | I,2x | These combined name signals have a dual purpose and are switched from by ISA system address input lines SAI[11:2] to EISA latched address input lines LAI[11:2] by the state of input signal ISAEISA. |
| SLAO[15:12] | O,6x | This combined name signal has a dual purpose and is switched from ISA system address output line SAO[15:12] to EISA latched address output line LAO[15:12] by the state of input signal ISAEISA. |
| SLAI[15:12] | I,2x | This combined name signal has a dual purpose and is switched from ISA system address input line SAI[15:12] to EISA latched address input line LAI[15:12] by the state of input signal ISAEISA. |
| SLAO16 | O,6x | These combined name signals have a |

TABLE 20-continued

| SYMBOL FOR EX. LINE | TYPE | DESCRIPTION |
|---|---|---|
| | | dual purpose and are switched from ISA system address output lines SAO16 to EISA latched address output lines LAO16 by the state of input signal ISAEISA. |
| SL26O[19:17] | O,6x | These combined name signals have a dual purpose and are switched from ISA system address output lines SAO[19:17] to EISA latched address output lines LAO[26:24] by the state of input signal ISAEISA. |
| SBHEBE3O- | O,6x | This combined name signal has a dual purpose and is switched from ISA system byte high enable input signal SBHEO- to EISA byte enable input-3 signal BEO3, which is not used, by the state of input signal ISAEISA. |
| SELOBURSTI | I | This combined name signal has a dual purpose and is switched from I/O select signal IOSELI[0] to EISA slave burst status input signal SBURSTI- by the state of input signal ISAEISA. |

In Table 20, and in the following discussion, the logical state of a signal whose name does not end in a minus sign is asserted, i.e., active, when high and is deasserted, i.e., inactive, when low. The logical state of a signal whose name ends in a minus sign is asserted, i.e., active, when low and is deasserted, i.e. inactive, when high. Signal names ending in "I" are input signals from a die pad. Signal names ending in "O" are output signals going to a die pad. Some input/ output signals that connect to die pads are used for different purposes depending on the state of input signal ISAEISA and the signals' names were combined for those signals. The type of the signal designates either input "I" or output "O" and the signal drive where "2x" means twice the normal drive of four input loads.

Note, LA[31:2] implies that both signal groups LA[23:2] and LA[31:24]- are included. Also that all outputs are floated (tri-stated, or high impedance) except signals DRQ, MREQ and IRQ (when bit ENABLE is inactive) when host interface module is not a bus master, unless host interface module is being accessed as a slave, then host interface module is an ISA or EISA slave and drives DO[7:0] for I/O read and NOWSO- for both I/O read and write.

Tables 21A and 21B are an alternative presentation of the information in Table 20. Tables 21A and 21B show which of the EISA defined signals and the ISA defined signals are used in host interface module 310 for both bus master and slave operations. The PADEN column in Tables 21A and 21B specifies the control line that, when active, places the associated die pad output drivers in the driven state so that the output driver may be asserted or deasserted by the data input signal on the line in the same row to the die output driver. When line PADEN is in the inactive state, the associated die pad output drivers are tri-stated and the active/inactive state of data input signal to the die output driver is not visible to the connected external logic. Signal names that are given in Table 20 but which do not appear in Tables 21A and 21B are not utilized in this embodiment of the invention.

TABLE 21A

HOST INTERFACE MODULE EXTERNAL INTERFACE
ISA SIGNAL SELECTIONS AND USAGE
PIN FUNCTION

| ISA | QTY PINS | ISA MASTER | ISA SLAVE | PADEN |
|---|---|---|---|---|
| AEN | 1 | — | I | — |
| BCLK | 1 | I | I | — |
| ISAEISA | 1 | I | I | — |
| D[7:0] | 8 | IO,3SH | IO,3SH | 7 |
| D[15:8] | 8 | IO,3SH | IO,3SH | 8 |
| IRQ | 1 | O,OCL | O,OCL | 10 |
| LA[23:17] | 7 | O,3SH | — | 4 |
| MASTER16- | 1 | O,OCH | — | — |
| NOWS- | 1 | — | O,OCH | — |
| RESDRV* | 1 | I | I | — |
| GROUND | 13 | | | |
| POWER | 3 | | | |
| (a) | 8 | IO,3SH | IO,3SH | 14 |
| (a) | 8 | — | — | 13 |
| (b) | 5 | — | — | 5 |
| CHRDY | 1 | I | — | — |
| DAK- | 1 | I | — | — |
| DRQ | 1 | O,3SL | — | 0 |
| IORC- | 1 | — | I | 1 |
| IOWC | 1 | — | I | — |
| M16- | 1 | I | — | 11 |
| MRDC- | 1 | O,3SH | — | 12 |
| MWTC- | 1 | O,3SH | — | 9 |
| IOSEL0 | 1 | I | I | — |
| IOSEL1 | 1 | I | I | — |
| IOSEL2 | 1 | I | I | 6 |
| SBHE- | 1 | O,3SH | — | 2 |
| SA[1:0] | 2 | O,3SH | I | 2 |
| SA[9:2] | 8 | O,3SH | I | 3 |
| SA10 | 1 | O,3SH | I | 3 |
| SA11 | 1 | O,3SH | I | 15 |
| SA[15:12] | 4 | O,3SH | I | 15 |
| SA16 | 1 | O,SH | — | 4 |
| SA[19:17] | 3 | O,3SH | — | 15 |

TABLE 21B

HOST INTERFACE MODULE EXTERNAL INTERFACE
EISA SIGNAL SELECTIONS AND USAGE
PIN FUNCTION

| EISA | QTY PINS | EISA MASTER | EISA SLAVE | PADEN |
|---|---|---|---|---|
| AEN | 1 | — | I | — |
| BCLK | 1 | I | I | — |
| ISAEISA | 1 | I | I | — |
| D[7:0] | 8 | IO,3SH | IO,3SH | 7 |
| D[15:8] | 8 | IO,3SH | IO,3SH | 8 |
| IRQ | 1 | O,OCL | O,OCL | 10 |
| LA[23:17] | 7 | O,3SH | — | 4 |
| MASTER16- | 1 | O,OCH | — | |
| NOWS- | 1 | — | O,OCH | |
| RESDRV* | 1 | I | I | — |
| GROUND | 13 | | | |
| POWER | 3 | | | |
| D[23:16] | 8 | IO,3SH | — | 14 |
| D[31:24] | 8 | IO,3SH | — | 13 |
| LA[31:27]- | 5 | O,3SH | — | 5 |
| EXRDY | 1 | I | — | — |
| MAK- | 1 | I | — | — |
| MREQ- | 1 | O,3SL | — | 0 |
| START- | 1 | O,3SH | I | 1 |
| CMD- | 1 | I | I | — |
| BE2- | 1 | O,3SH | I | 11 |
| MIO | 1 | O,3SH | I | 12 |
| WR | 1 | O,3SH | I | 9 |
| SBURST- | 1 | I | — | — |
| EX32- | 1 | I | — | — |

TABLE 21B-continued

HOST INTERFACE MODULE EXTERNAL INTERFACE
EISA SIGNAL SELECTIONS AND USAGE
PIN FUNCTION

| EISA | QTY PINS | EISA MASTER | EISA SLAVE | PADEN |
|---|---|---|---|---|
| MBURST- | 1 | O,3SH | — | 6 |
| BE3- | 1 | O,3SH | — | 2 |
| BE[1:0]- | 2 | O,3SH | I | 2 |
| LA[9:2] | 8 | O,3SH | I | 3 |
| LA10 | 1 | O,3SH | — | 3 |
| LA11 | 1 | O,3SH | — | 15 |
| LA[15:12] | 4 | O,3SH | — | 15 |
| LA16 | 1 | O,3SH | — | 4 |
| LA[26:24]- | 3 | O,3SH | — | 15 |

(a) always enabled, self pullup
(b) always disabled
*output uses a tri-state pad to simulate an open collector pad Definitions for columns 3 and 4 in Tables 21A and 21B are derived from the EISA specification, i.e.:

| | VOH = 2.4V VOL = 0.5V | |
|---|---|---|
| | $IO_H$(mA) | $IO_L$(mA) |
| 3SH | −3.0 | 24.0 |
| 3SL | −0.4 | 5.0 |
| OCH | — | 24.0 |
| OCL | — | 5.0 |

Host interface module 310 does not use or support the following ISA/EISA bus signals; BALE, REFR-, I016-, IOCHK-, LOCK-, OSC, SMRD-, SMWTC-, TC, and EX16-. Also, in this embodiment, host interface module does not support the EISA bus master 1.5 bus clock periods compressed cycle operation.

Assertion of reset drive input signal RESDRVI causes a hardware initialization within host interface module 310 with all bus drivers inhibited (except signals DRQ and IRQ in ISA mode) until signal RESDRVI is deasserted. After signal RESDRVI is deasserted all host interface module external interface bus drivers remain inhibited until bit ENABLE in register BCTL is set, by an I/O write cycle from the computer system except, as requested by an I/O read cycle from the computer system (in ISA mode, bit ENABLE is used for NOWSO). Data values read from RAM cells within host interface module 310 or associated modules are undetermined following the assertion of signal RESDRVI. (Herein, the term associated modules includes sequencer 320 and data FIFO memory circuit 360 as well as SCSI module 330 and scratch RAM 442.)

Signal RESDRVI is asserted by the computer system at power-up, or after a bus time out and has a minimum pulse width of nine bus clock periods. The internal power-on-reset (POR) caused by assertion of signal RESDRVI is extended two to three host adapter clock input periods (40 MHz) to ensure complete internal initialization and to synchronize the inactive edge of power-on reset signal to the clock should short assertions of signal RESDRVI occur. In addition, the input pad for signal RESDRVI is of a Schmitt type. This function performed by the common cell logic is illustrated in FIG. 31. A more detailed schematic diagram of the common cell logic is presented in Microfiche Appendix B. Note, chip reset signal CHIPRST is active when signal RESDRVI is active or an I/O write is made to register HCNTRL with bit zero set.

Table 22 is a brief summary of the signals in host interface module internal signal interface 2820. The host interface module internal interface provides interconnections for host interface module bus master transfer of system memory data to host interface module associated modules, for host interface module bus slave transfer of data to host interface module associated modules, and for host interface module register data and logic control/status lines to host interface module associated modules on host adapter 7770.

The logical state of a signal whose name does not end in a minus sign is asserted, i.e., active, when high and is deasserted, i.e., inactive, when low. The logical state of a signal whose name ends in a minus sign is asserted, i.e., active, when low and is deasserted, i.e. inactive, when high. Each signal's type, drive capabilities are indicated in column TYPE (i.e. I "input of 1 normal load") (i.e. O, 2× "output with 2 times normal drive").

TABLE 22

Host Interface Module Internal Interface Signal Summary

| SIGNAL REFERENCE | SIGNAL | TYPE NAME |
|---|---|---|
| BRKADRINT | I,1X | Break address interrupt |
| BRKADRINTEN | I,1X | Break address interrupt enable |
| CHIPRST | O,2X | Chip reset |
| CIOBUS[34:0] | I,2X,O,9X | Chip IO bus[34:0] |
| DFSDH | I,4X | DFIFO stored data high |
| DFSDHRST- | O,2X | DFIFO stored data high reset |
| DFSXDONE | I,2 | DFIFO SCSI transfer done |
| DFTHRSH | I,4X | DFIFO threshold (status) |
| DFTHRSH[1:0] | O,2X | DFIFO threshold [1:0] (select) |
| DIRECTIONACK | O,2X | Direction (data direction flow control) |
| ENABLE | O,2X | Enable outputs (ISA/EISA bus) |
| FAILDIS | I,2X | Fail disable (illegal address) |
| FIFOEMP | I,1X | DFIFO empty (Double word) |
| FIFOROWE | I,X | DFIFO empty (Byte) |
| FIFOFULL | I,2X | DFIFO full |
| FIFOFLUSH | O,2X | DFIFO flush |
| HCLKH | I,1X | Host interface module clock (buffered 40 MHz) (sync and timing) |
| HCLKM | I,2X | Host interface module clock (buffered 20 MHz) (sync and timing) |
| HDFDAT[31:0] | I,1X,O,3X | Host interface module-DFIFO data [31:0] |
| HDFDATCLK | O,3X | Host interface module DFIFO data clock |
| HDMAENACK | O,4X | Host interface module DMA enable |
| HDONE | O,2X | Host interface module transfer done (complete) |
| HRBSY- | O,2X | Host interface module read busy |
| ILLHDMA | O,2X | Illegal host interface module DMA |
| ILLOPCODE | I,1X | Illegal op-code |
| ILLSADDR | I,1X | Illegal sequencer address |
| ISAEISAO | O,2X | ISA or EISA bus (select) |
| PARERR | I,2X | Parity error |
| PAUSE | O,2X | Pause (half free running Sequencer) |
| PAUSEACK | I,1X | Pause acknowledge (CIOBUS switched) |
| POR | I,2X | Power-on-rest |
| POWRDN | O,2X | Power down |
| PROCKOSC | O,2X | Process check oscillator |

TABLE 22-continued

Host Interface Module Internal Interface Signal Summary

| SIGNAL REFERENCE | SIGNAL | TYPE NAME |
| --- | --- | --- |
| SANDTO | I,1 | SCSI ANDed input string |
| SCSIEN | O,2X | SCSI enable |
| SCSIENACK | O,2X | SCSI enable knowledge |
| SCSIINT | I | SCSI interrupt |
| SDMAEN | O,2X | SCSI DMA enable |
| SDMAENACK | I | SCSI DMA enable acknowledge |
| SEQINT | I | Sequencer interrupt |
| STEPCMP | I | Step complete |
| TEST[7:0] | O,2X | Test chip register bus |
| WIDEODD | O,2X | Wide odd |

Figure 29:
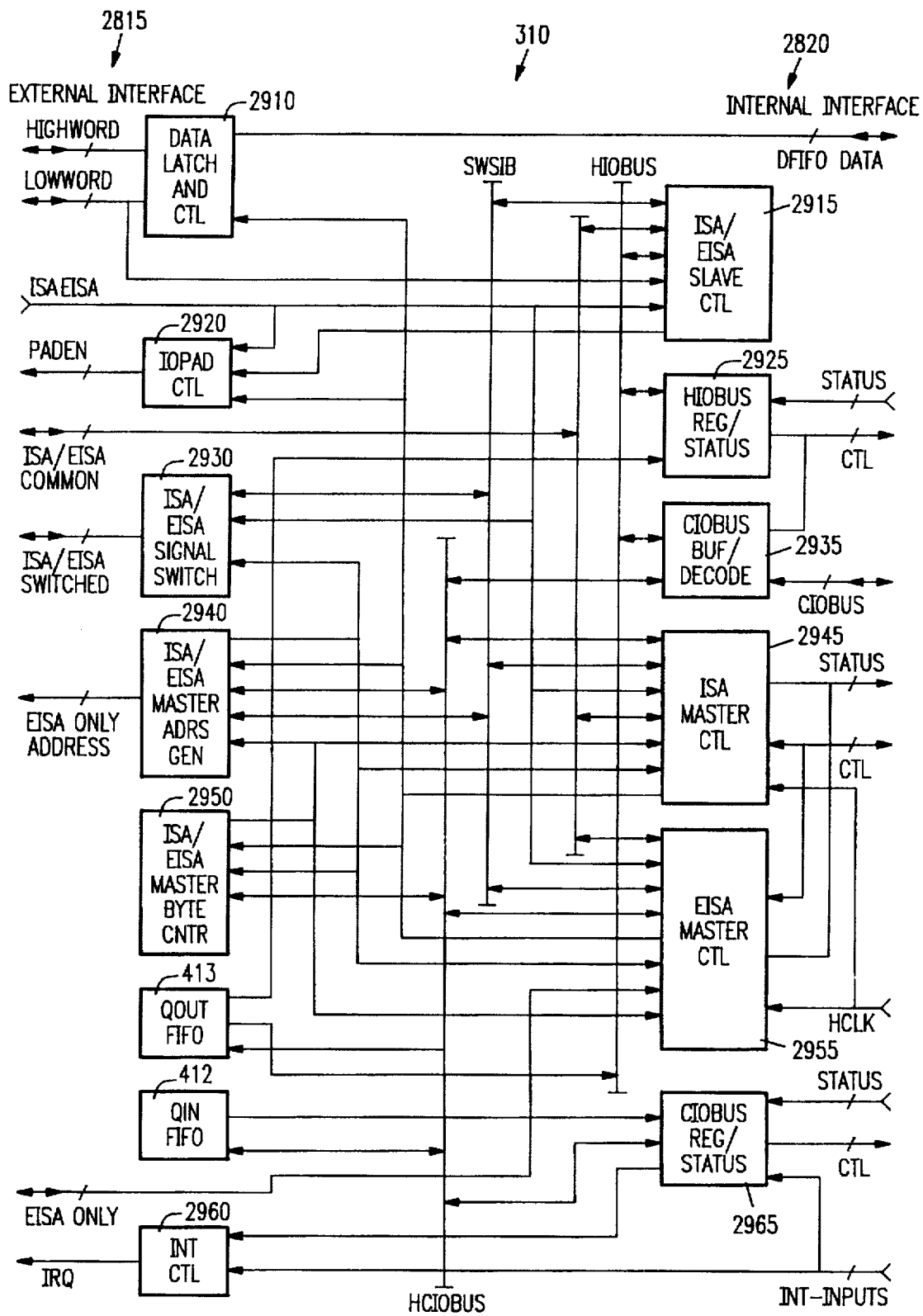
FIG. 29 is a block diagram illustrating the internal bus structure and the basic structure of the host interface module of this invention.

FIG. 29 is a more detailed block diagram of host interface module 310. Data and latch control circuit 2910, sometimes called MDLAT or MDLAT32, receives and transmits data to data FIFO circuit 360 over host data FIFO bus HDFDAT [31:0]. Data is written to data FIFO bus HDFDAT[31:0] when bit DIRECTION in register DFCNTRL is active, and data is read from data FIFO bus HDFDAT[31:0] when bit DIRECTION is inactive. Data and latch control circuit 2910 also receives input signals from EISA master control circuit 2955 which control the transfer of data between data in bus DI[31:0] and data FIFO bus HDFDAT[31:0] as well as between data out bus DO[31:0] and data FIFO bus HDFDAT [31:0]. These signals are briefly discussed herein. The low byte of data in bus DI[7:0] is provided to ISA/EISA slave control circuit 2915. The signals generated and the timing of the signals generated by ISA/EISA slave control circuit 2915 are described more completely below in the discussion of the EISA and ISA slave timing diagrams.

The input signals to circuit MDLAT32 are now each briefly described followed by a brief discussion of the data path. Detailed schematic diagrams are provided in Microfiche Appendix B, which is incorporated herein by reference in its entirety.

Signal HDMAENBUSY, along with signal DIRACKB, selects the data direction on bus HDFDAT. Bus HDADDR [31:0] is used in the byte string decode. Signal MBURSTMB- enables clock HDFCLK to be generated when in EISA EDNSHIFTM and the last word in is from data in bus DI[15:0]. Signal IOGO gates bus DI[7:0] into bus HIODI only when a slave I/O write signal is being performed to conserve power. Signal ISAEISAIB selects ISA or EISA mode of operation. Clock DBCLK is EISA mode clock source DFCLK and is gated with signals ETCLKEN and DNSHIFTM. Signal BCLKIE provides an early latch of DI bus for minimum DI hold time. Signal EHIBYTEWREN is used with EDNSHIFTM to indicate which bytes are being latched [1:0] or [3:2]. Signal ETCKLEN is a timing control generated to enable data to be latched from DI bus or bus HDFDAT. Timing is effected by signal EXRDY disassertion and EISA mode in process. Signal EDLCLK-loads selected data from the input latch to the output latch with provides date to DOI bus. This data is enabled out of the host adapter by the signal asserted BE[3:0]. Signal IPDWDENDWR generates clock HDFCLK when counter HCNT has expired in ISA mode and only a partial double word has been latched from DI bus (and no more will be). Signal PLHAD is pipelined address bits 1:0 used in ISA mode to steer DI[15:00] or DI[7:0] to the proper byte location in this 32-bit input latch. Signal IENDONTD- is used for timing of input byte steering from DI bus. Clock enable signal ITCLKEN is a timing control generated to enable data to be latched for DI bus or bus HDFDAT. Timing is effected by signal CHRDY de-assertion and ISA mode in process. Clock IDLCLK- loads selected data from input latch to output latch with provides data to DOT bus. This functions in the same manner as clock EDLCLK-. Signal EMASTER indicates EISAM is in a master state and data will be transferred. Signal IMASTER16 indicates ISAM is in a master state and data will be transferred. Clock ITCLCK-20 is an ISA mode DFCLK clock source. Clock ITCLCK- is gated with ITCLKEN and IDNSHFT- and PLHAD 1-0. Signal IDNSHFT- indicates ISA mode master in 8-bit transfer mode.

Figure 30A:
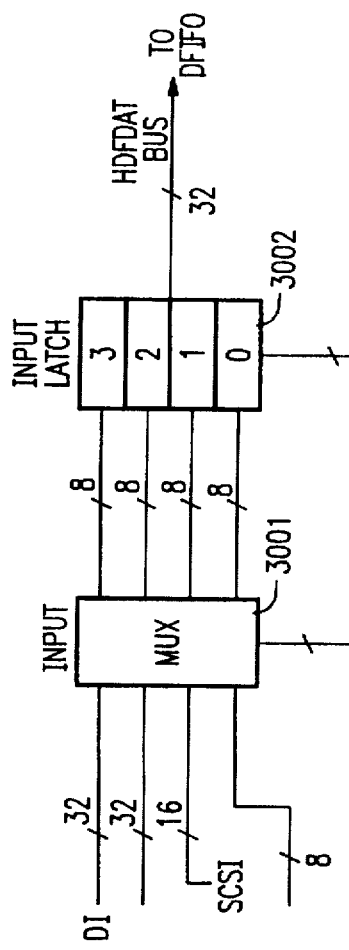
FIGS. 30A and 30B illustrate the circuitry within the host interface module of this invention to handle various byte offsets in passing to and from the data FIFO memory circuit of this invention.

Data is provided to multiplexer 3001 (FIG. 30A) from SCSI module 330, from CSDAT[7:0], HDFDAT[31:0] and from bus DI[31:0]. When data is stored into input byte 3 of input latch 3002, clock HDFCLK is generated to move the data in input latch to data FIFO memory circuit 360. This is generated for all modes and also when no more data is to be stored, i.e., the count in register HCNT has expired.

Input multiplexer 3001 steers selected bytes of bus DI to the proper byte location of the input latches (i.e., ISA downshift mode DI[7:0] is stored in input latch byte 0, then 1, then 2, 3 and a HDFCLK generated.)

Figure 30B:
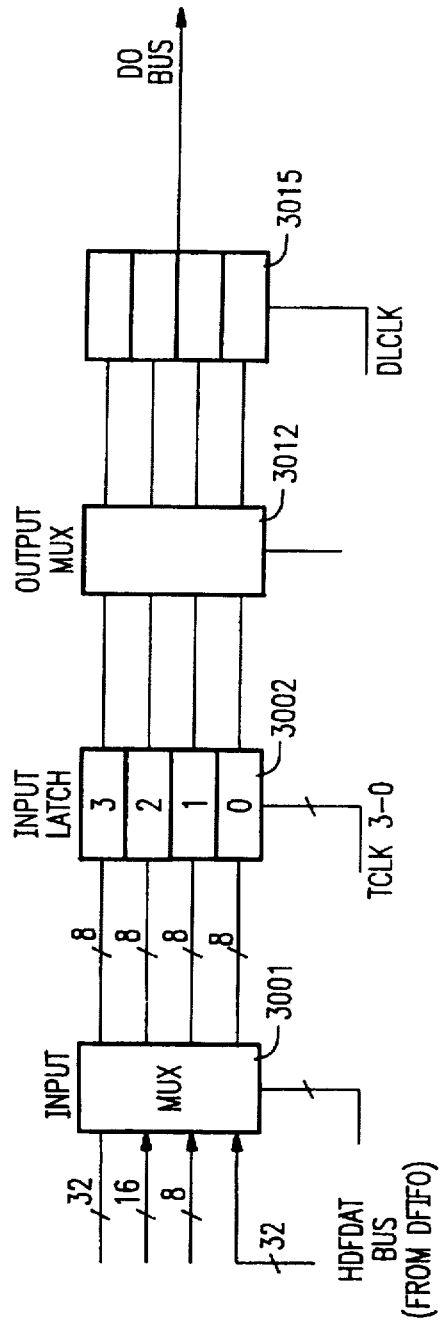

In FIG. 30B, multiplexer 3001 receives data from data FIFO memory circuit 360. Clock signal TCLK[3-0] stores all bus HDFDAT data into input latch bytes[3-0] 3002. For EISA 32-bit modes, all bytes in input latch 3002 are moved though output multiplexer 3012 to output latch 3015 by clock DLCLK and bus DO is enabled out of chip by assorted PADEN signals and valid bytes are indicated by lines BE[3:0].

For EISA 16 bit mode input latch bytes 1 and 0 are moved to output latch bytes 1 and 0, then input latch bytes 3 and 2 are moved to output latch 1 and 0. For ISA 16 bit mode the action is the same as EISA 16 bit mode. For ISA 8 bit mode input latch byte 0 is moved to output latch byte 0, then input latch byte 1 is moved to output latch 0 and so on for bytes 2 and 3.

I/O pad control circuit 2920 receives signals from ISA/ EISA control line ISAEISA, ISA/EISA slave control circuit 2915, from ISA and EISA master control circuits. I/O pad control circuit 2920 decodes the input signals and generates the appropriate signals on pad enable bus PADEN[15:0] so that the pins for a particular bus operation are enabled.

Bus ISA/EISA represents the thirty common signal lines to the EISA and ISA interfaces and consequently provide signals to and receive signal from ISA/EISA slave control circuit 2915, ISA master control circuit 2945, and EISA master control circuit 2955. ISA/EISA switched bus, which represents the signals lines that serve a dual function, as described above in Tables 20, 21A and 21B, provides signals to and receives signals from ISA/EISA signal switch circuit 2930. The line functions selected by ISA/EISA signal switch circuit 2930 is determined by the signal level on line ISAEISA. ISA/EISA signal switch circuit 2930 communicates with ISA/EISA master address generator circuit 2940, ISA/EISA slave control circuit 2915, ISA master control circuit 2945 and EISA master control circuit 2955 through switched signal bus SWSIG. In addition, ISA/EISA signal switch circuit 2930 communicates directly with EISA master control circuit 2955.

ISA/EISA master address generator circuit 2940 generates the address for host system memory 230. ISA/EISA master address generator circuit 2940 directly drives EISA only address lines, which are latched address lines LA[31:27]-. Address bits 1, 0, 17 to 19, and 24 to 26 are routed to switch signal bus SWSIG for connection to ISA/

EISA signal switch circuit 2930. The remaining bits are routed through IOTEST logic to the output pins. Circuit 2940 also communicates with HCIOBUS, which is described more completely below, and receives input signals from ISA/EISA master byte counter circuit 2950 and EISA master control circuit 2955.

ISA/EISA master byte counter circuit 2950 counts the number of bytes transferred to and from host computer bus 226. ISA/EISA master byte counter circuit 2950 communicates with HCIOBUS, and master control circuits 2945 and 2955.

Queue-in and -out FIFOs 412 and 413 are used in control of SCB array 443 and are discussed more completely above. EISA only bus is the set of lines in Tables 20 and 21 which are used only in the EISA interface.

Interrupt control circuit 2960 receives a SCSI interrupt signal, a parity error interrupt, a command complete interrupt along with a four bit interrupt code, a sequencer interrupt illegal address interrupt signals, a break interrupt, an illegal op code interrupt, clear interrupt signals (CMDCMPLT, SEQINT, BRKINT), a master interrupt enable signal, a software interrupt as well as other control signals from CIOBUS registers 2965. When a hardware interrupt IRQ is generated except for a command complete interrupt CMDCMPLT, interrupt control circuit 2960 sets bit PAUSE in register HCNTRL which in turn pauses sequencer 320 and drives line IRQ. Interrupt control circuit 2960 can be configured by either setting or clearing bit IRQMS in register HCNTRL to operate in either the IRQO-edge interrupt mode (active or asserted level is positive) or the IRQO-level interrupt mode (active or asserted level is negative). Line IRQ is not driven if bit INTEN in register HCNTRL is not active, bit POWRDN is active, and in EISA mode bit ENABLE in register BCTL is active. In ISA mode signal ENABLE is forced "TRUE" all the lines and bit ENABLE is used for NOWS 2115 bit timing.

Table 23 is a truth table that demonstrates the interrupt signal level generated by interrupt control circuit 2960.

TABLE 23

| REGISTER BCTL: ENABLE BIT | REGISTER HCNTRL: BITS 6,3,1 | INTERRUPT CONDITION BIT | INTERRUPT OUTPUT ACTIVE | EXTERNAL LEVEL |
|---|---|---|---|---|
| 1 | 0,0,1 | 0 | N | L |
| 1 | 0,0,1 | 1 | Y | R |
| 1 | 0,1,1 | 0 | N | R |
| 1 | 0,1,1 | 1 | Y | L |
| 0 | 0,X,0 | X | X | R |
| 1 | 1,X,X | X | X | R |
| 0* | 0,X,X | X | X | R |

N = no,
Y = yes,
L = low,
R = bus pullup,
X = Don't Care.
*EISA only

Table 24 is an interrupt status summary. When bit FAILDIS in register SEQCTL is active, interrupts ILLHADDR, ILLSADDR, and ILLOPCODE are disabled. However, the occurrence of these interrupts is stored in register ERROR.

Table 24 lists the conditions under which host computer system 220 may be interrupted by a hardware interrupt on line IRQ.

TABLE 24

INTERRUPT STATUS SUMMARY

| Description | Enable Conditions (INTEN=1) | Pause | INSTAT Register bit | ERROR Register bit |
|---|---|---|---|---|
| Sequencer parity error | PERRORDIS=0 AND Parity error detected during opcode read | YES | BRKADRINT | PARERR |
| Illegal Opcode | FAILDIS=0 AND illegal opcode detected | YES | BRKADRINT | ILLOPCODE |
| Illegal sequencer address detected | FAILDIS=0 AND illegal host address detected | YES | BRKADRINT | ILLSADDR |
| Illegal host address detected | FAILDIS=0 AND illegal sequencer address detected | YES | BRKADRINT | ILLHADDR |
| Sequencer break address accessed | BRKDIS=0 AND BRKADRINTEN=1 AND BRKADDR compares with sequencer address | YES | BRKADRINT | NONE |
| SCSI Event | Set in SIMODE0 and SIMODE1 | YES | SCSIINT | NONE |
| Sequencer Event | Always enabled, SEQINT=1 | YES | SEQINT | NONE |
| Software Interrupt | SWINT=1 | NO | NONE | NONE |
| Command complete | Always enabled CMDCMPLT=1 | NO | CMDCMPLT | NONE |

Signal IRQ is not asserted for internal interrupt conditions that drive bit BRKINT in register INTSTAT unless host interface module internal interface signal BRKINTEN is also active. Line IRQ is in a tri-state condition while host interface module 310 is in the disabled state caused by assertion of signal RESDRVI and/or a write by the system board to register BCTL to set bit ENABLE inactive.

Control circuits 2915, 2945, and 2955 generate signals that control transfer of information between other modules in host adapter 7770 and the selected bus interface. The signals and timing of the signals generated by control circuits 2915, 2945, and 2955 are described more completely below.

Host adapter input/output bus, herein CIOBUS [34:0] (CIOBUS[34:0] and CIOBUS 350 are the same), is a global input/output data/control bus for access of registers assigned to CIOBUS[34:0] and located in host adapter 7770. Lines CIOBUS[23:16] are source data bus CSDAT[7:0] that is referred to as CSDAT bus 602. Lines CIOBUS[7:0] are destination data bus CDDAT[7:0] that is referred to as CDDAT bus 604. Lines CIOBUS[31:24] are source address bus CSADR[7:0] that is referred to as CSADR bus 601. Lines CIOBUS[15:8] are destination address bus CDADR [7:0] that is referred to as CDADR bus 603. CIOBUS line 32 is chip destination write enable line CDWEN-. CIOBUS line 33 is chip source read enable line CSREN-. CIOBUS line 34 is chip read busy line CRBSY.

As explained above, CIOBUS 350 operates in one of two modes which is selected by the state of bit PAUSEACK in register HCNTRL. When bit PAUSEACK is in the inactive state, CIOBUS 350 can perform both a write and a read at the same time by utilizing all it's signals, which are controlled by other modules in host adapter 7770. When bit PAUSEACK is in the active state, the system board or other bus master can access host interface module as a slave through host interface module's external interface and access CIOBUS 350 through host interface module's HIOBUS[25:0]. Since HIOBUS[25:0] can not perform a write and a read at the same time, CIOBUS 350, when in this mode, also only performs a single operation at a time. HCIOBUS in the internal portion of CIOBUS 350 within host adapter interface module 310.

CDDAT bus 604 is a tri-state bus that accesses registers that are assigned to CIOBUS 350 and addressed by CDADR bus 602. Host interface module has 19 registers that are assigned to CIOBUS 350 to store data from CDDAT bus 604. See Appendix II. CDDAT bus 604 contains BUSHOLD cells that maintain the last driven state when the bus is tri-stated.

CDADR bus 602 is a tri-state bus that allows selection of registers assigned to CIOBUS 350 so that data may be stored in them. Each state of lines CDADR[7:5] provide a block of 32 addresses which are assigned to host interface module 310, SCSI module 330, scratch RAM 442, or sequencer 320. The assigned value for host interface module 310 is 4. CDADR bus 602 contains BUSHOLD cells that maintain the last driven state when the bus is tri-stated.

Destination write enable signal CDWEN- is a tri-state signal that enables data on CDDAT bus 604 to be stored in the register selected by the address on CDADR bus 602 with the rising edge of destination write enable signal CDWEN-. Destination write enable signal CDWEN- is always in the positive state, i.e., inactive, when control of CIOBUS 350 is switched by a change in the state of bit PAUSEACK. Destination write enable line CDWEN- contains a BUSHOLD cell that maintains the last driven state of the line when the line is tri-stated.

CSDAT bus 602 accesses data in registers that are assigned to CIOBUS 350 and addressed by CSADR bus 601. CSDAT bus 602 contains BUSHOLD cells that maintain the last driven state of the bus when the bus is tri-stated.

CSADR bus 601 selects a register assigned to CIOBUS 350 so that data can be read from the register. Each state of lines CSADR[7:5] provides a block of 32 addresses which are assigned to host interface module 310, SCSI module 330, scratch RAM 442, or sequencer 320. The assigned value for host interface module 310 is 4. Host interface module 310 has 19 registers assigned to CIOBUS 350 that can be addressed by CSADR bus 601. CSADR bus 601 contains BUSHOLD cells that maintain the last driven state of the bus when the bus is tri-stated.

Source read enable signal CSREN- enables data stored in a register assigned to CIOBUS 350 and selected by an address on CSADR bus 601 to be driven onto CSDAT bus 602 while source read enable signal CSREN- is active. While source read enable signal CSREN- is inactive, all block address decoders are disabled, e.g., the last valid latched block address is cleared and no new block address may be latched.

When bit PAUSEACK is in the inactive state, source read enable signal CSREN- is clocked to the inactive state by each rising edge of destination write enable signal CDWEN-. This forces host interface module's address decoders for CSADR bus 601 to become inactive while the new address value is settling and provides a clock edge to separate each address decode period which is needed by those sources that are single address ports into multi-address data areas (i.e. RAM) which are pointed to by a counter address.

When host interface module's address decoders for CSADR bus 601 are inactive, host interface module's block address busy line HRBSY- becomes inactive. When host interface module's block address busy line HRBSY- is active, it indicates that host interface module 310 has latched the assigned block address and is decoding the register address for the register that will drive data onto CSDAT bus 602. When the Common Logic Cell (CLC), determines that all host adapter busy status lines, e.g., line HRBSY-, are inactive and makes signal CRBUSY inactive which, CLC forces source read enable line CSREN- active again. (See FIG. 20.)

Figure 31A:
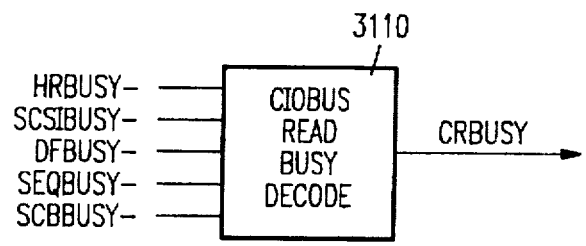
FIG. 31A is a block diagram of a CIOBUS read busy decode circuit in the common logic cell of this invention.
Figure 31B:
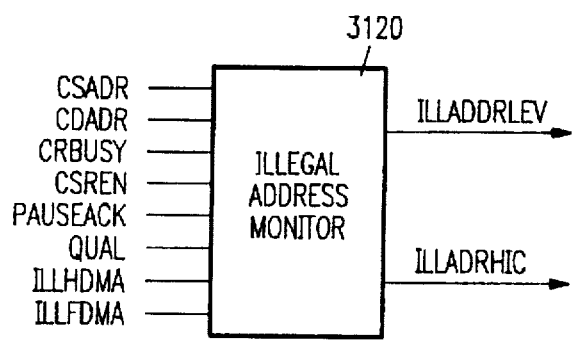
FIG. 31B is a block diagram of a illegal address monitor circuit in the common logic cell of this invention.
Figure 31C:
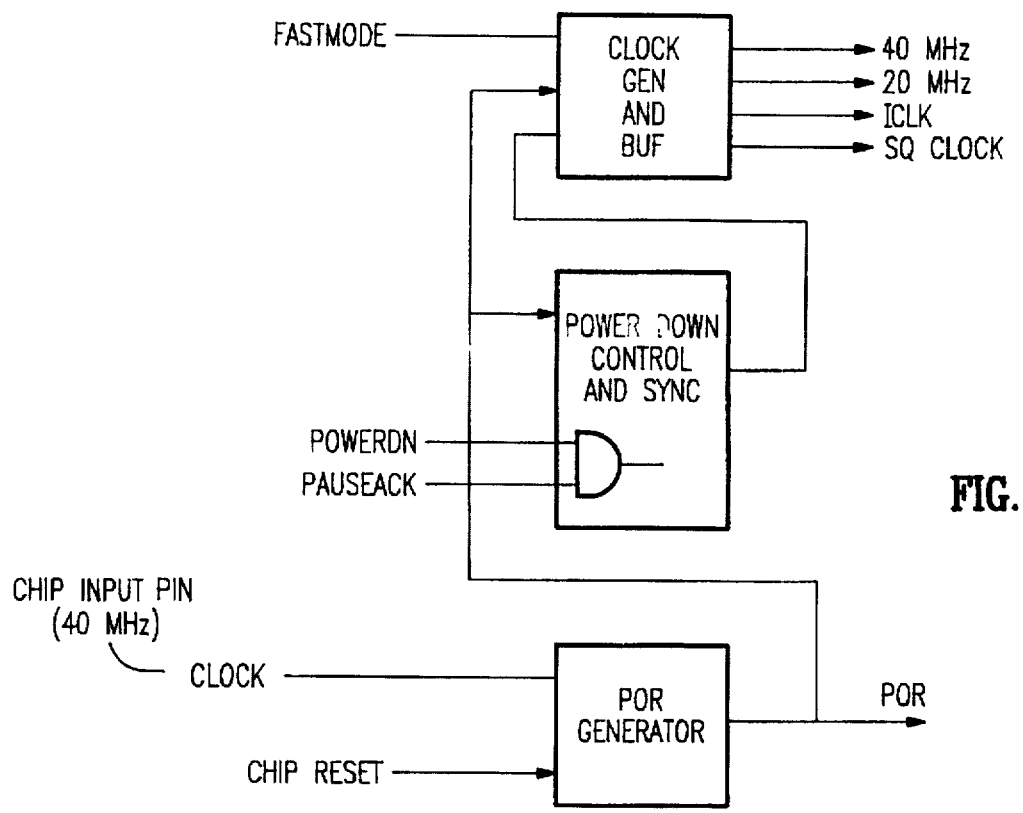
FIG. 31C is a block diagram of a clock generation and buffer circuit, a power down control and synchronization circuit, and a power on reset circuit in the common logic cell of this invention.

FIGS. 31A to 31C are a block diagram of the common logic cell of this invention. CIOBUS read busy decode circuit 3110 receives busy signals HRBSY-, SCSIBSY-, DFBUSY-, SEQBUSY- and SCBBUSY- and generates signal CRBUSY with the timing illustrated in FIG. 20. Illegal address monitor 3120 monitors the address for host adapter 7770 and generates an output signal when an invalid address is detected. The circuit in FIG. 31C receives the clock input signal from a pin of host adapter 7770 and generates clock signals as shown.

If host interface module's assigned block address combination on lines CSADR[7:5] is valid when source read enable signal CREN- again becomes active, host interface module 310 drives signal HRBSY- active and starts driving the addressed register data onto CSDAT bus 602. This synchronized combinational interlock enables data on CSDAT bus 602 to be driven valid at the earliest time after the address on CSADR bus 601 has changed value. This action allows read-modify-write operations to be performed in a single destination write enable signal CDWEN- clock cycle with no false address decoder active conditions during the address value settling time on CSADR bus 601.

When bit PAUSEACK is in the active state, source read enable signal CSREN- is inactive, except when host interface module read address pulse HRAP- is active. The address on CSADR bus 601 is always valid and settled before, during, and after a host interface module read address pulse HRAP- active period. Source read enable line CSREN- contains a BUSHOLD cell that maintains the last driven state of the line when the line is tri-stated.

Read busy signal CRBSY, an input signal, is sourced from the Common Logic Cell (CLC) (FIG. 31A). Read busy signal CRBSY is forced to the active state whenever a module busy line, e.g., line HRBSY-, is active and returns to the inactive state when no module busy lines are active. Host interface module 310 can latch an active signal on host interface module's block address busy line HRBSY- only while read busy line CRBSY is inactive, source read enable signal CSREN- is active, and the value on lines CSADR [7:5] is 4.

Host interface module input/output bus, herein HIOBUS [25:0], is an input data, output data, and control bus for external interface access of registers located on host interface module 310 and other registers in host adapter 7770. HIOBUS[25:0] can only perform a write or a read at one time. HIOBUS[25:0] includes host interface module I/O data out bus HIODO[7:0], host interface module I/O data in bus HIODI[7:0], host interface module address bus HADR [7:0]-, and lines HWAP- and HRAP-. The control state of bit PAUSEACK, bit 2 in register HCNTRL, determines which registers may be accessed. Attempts to access registers assigned to CIOBUS 350 through the host interface module external interface 2815 with bit PAUSEACK inactive sets bit ILLHADDR, bit 0 in register ERROR. Read accesses return error "00" and write accesses are ignored.

Host interface module address bus HADR[7:0]- is an host interface module input address bus for I/O register access of registers located in host adapter 7770. The address on bus HADR[7:0]- is transferred from system address input line SA[12:10, 4:0] for ISA mode or from host interface module latched address input lines LA[7:2] and byte enable bus BE[3:0]- for EISA mode.

Host interface module I/O data out bus HIODO[7:0] is the host interface module output data bus for I/O access of data from registers located in host adapter 7770. Data on host interface module I/O data bus HIODO[7:0] for read accesses is transferred out on lines DO[7:0].

Host interface module I/O data in bus HIODI[7:0] is the host interface module input data bus for I/O access to registers located in host adapter 7770. Data on host interface I/O data in bus HIODI[7:0] for write accesses is transferred in on line DI[7:0].

Host interface module read address pulse HRAP- is a control output signal generated from ISA signals, address enable input signal AENI and I/O read command input signal IORCI-, or EISA signals, host interface module latched address enable input signal AENI, memory/IO data status input signal MIOI, write data status input signal WRI and command input signal CMDI- when the host interface module slave address is valid and is used by the register decode logic to read data from address selected registers.

Host interface module write address pulse HWAP- is a control output signal generated from ISA signals, address enable input signal AENI and I/O write command input signal IOWC-, or EISA signals, host interface module latched address enable input signal AENI, memory/IO data status input signal MIOI, write data status input signal WRI and command input signal CMDI- when the host interface module slave address is valid and is used by the register decode logic to write data from address selected registers. The address and status lines are latched by signal STARTI in EISA mode and in ISA mode, the latch is always open.

A HIOBUS[25:0] to CIOBUS[34:0] write operation uses data buses CDDAT[7:0] and HIODI[7:0], address buses CDADR[7:0]- and HADR[7:0]- and control lines CDWEN- and HWAP-. A HIOBUS[25:0] to CIOBUS[34:0] read operation uses data buses CSDAT[7:0] and HIODO[7:0], address buses CSADR[7:0]- and HADR[7:0]- and control lines CSREN- and HRAP-. Address bus HADR[7:0]- drives address buses CDADR[7:0]- and CSADR[7:0]- in parallel for both read and write accesses with signals HWAP- and HRAP- activating the desired operation.

The registers in HIOBUS registers/status 2925 and CIOBUS registers/status 2965 are illustrated in FIGS. 32A to 32F and listed in Table 25. Each bit in the registers is described more completely below.

TABLE 25

| Name | Acronym | ISA Address | EISA Address | HA Address |
|---|---|---|---|---|
| BOARD ID0 | BID0 | I-4ss00h | E-zC80h | C-80h* |
| BOARD ID1 | BID1 | I-4ss01h | E-zC81h | C-81h* |
| BOARD ID2 | BID2 | I-4ss02h | E-zC82h | C-82h* |
| BOARD ID3 | BID3 | I-4ss03h | E-zC83h | C-83h* |
| BOARD CONTROL | BCTL | I-4ss04h | E-zC84h | C-84h* |
| BOARD ON/OFF TIME | BUSTIME | I-4ss05h | E-zC85h | C-85h |
| BUS SPEED | BUSSPD | I-4ss06h | E-zC86h | C-86h |
| HOST CONTROL | HCNTRL | I-4ss07h | E-zC87h | C-87h |
| HOST ADDRESS 0 | HADDR0 | I-4ss08h | E-zC88h | C-88h |
| HOST ADDRESS 1 | HADDR1 | I-4ss09h | E-zC89h | C-89h |
| HOST ADDRESS 2 | HADDR2 | I-4ss0Ah | E-Zc8AH | C-8Ah |
| HOST ADDRESS 3 | HADDR3 | I-4ss0Bh | E-zC8Bh | C-8Bh |
| HOST COUNT 0 | HCNT0 | I-4ss0Ch | E-zC8Ch | C-8Ch |
| HOST COUNT 1 | HCNT1 | I-4ss0Dh | E-zC8Dh | C-8Dh |
| HOST COUNT 2 | HCNT2 | I-4ss0Eh | E-zC8Eh | C-8Eh |
| reserved | | I-4ss0Fh | E-zC8Fh | C-8Fh |
| SCB POINTER | SCBPTR | I-4ss10h | E-zC90h | C-90h |
| INTERRUPT STATUS | INTSTAT | I-4ss11h | E-zC91h | C-91h |
| CLEAR INTERRUPT STATUS | CLRINT | I-4ss12h | E-zC92h | C-92h |
| HARD ERROR | ERROR | I-4ss12h | E-zC92h | C-92h |
| DATA FIFO CONTROL | DFCNTRL | I-4ss13h | E-zC93h | C-93h |
| DATA FIFO STATUS | DFSTATUS | I-4ss14h | E-zC94h | C-94h |
| DATA FIFO WRITE ADDRESS | DFWADDR0 | I-4ss15h | E-zC95h | C-95h |
| reserved | | I-4ss16h | E-zC96h | C-96h |
| DATA FIFO READ ADDRESS | DFRADDR0 | I-4ss17h | E-zC97h | C-97h |
| reserved | | I-4ss18h | E-zC98h | C-98h |
| DATA FIFO DATA | DFDAT | I-4ss19h | E-zC99h | C-99h |
| SCB AUTO INCREMENT | SCBCNT | I-4ss1Ah | E-zC9Ah | C-9Ah |
| QUEUE-IN FIFO | QINFIFO | I-4ss1Bh | E-zC9Bh | C-9Bh |
| QUEUE-IN COUNT | QINCNT | I-4ss1Ch | E-zC9Ch | C-9Ch |
| QUEUE-OUT FIFO | QOUTFIFO | I-4ss1Dh | E-zC9Dh | C-9Dh |
| QUEUE-OUT COUNT | QOUTCNT | I-4ss1Eh | E-zC9Eh | C-9Eh |
| TEST CHIP | TESTCHIP | I-4ss1Fh | E-zC9Fh | C-9Fh |

*Assigned to HIOBUS (Queue-out FIFO for read only)

EISA bus board identifier registers BID[3:0] contain product information for use by host adapter driver 260 in initialization and configuration of the system. The first two bytes in registers BID[1:0] contain a compressed representation of the manufacturer code for host adapter 7770. The manufacturers characters for host adapter 7770 are:

1st ID char=A.

2nd ID char=D.

3rd ID char=P.

The third byte register BID[2] and the most significant five bits of the fourth byte register BID[3] contain a representation of product code. The product codes for host interface module are "0770" which will be interpreted by host adapter driver 260 as "7770." This interpretation of the most significant digit (single bit) by host adapter driver 260 allows 2 number series to be supported with full flexibility for number selection with the other 3 digits. I/O access to register BID[3:0] is through HIOBUS[25:0]. Register BID [3:0] may be accessed without consideration of the state of sequencer 320. The EISA configuration registers are available in ISA mode for identification purposes. Registers BID0, BID1, BID2, and BID3 are hard wired values.

Board control register BCTL provides the capability for the EISA system board to enable or disable use of host adapter 7770 in the computer system. Host interface module 310 supports the EISA register BCTL required bit functions.

Board enable/disable ENABLE bit is a read/write bit. Bit ENABLE, when set, enables EISA output drivers and so host adapter 7770 can become an EISA bus master. Alternatively, for ISA mode, the output drivers are always enabled and this bit, when set, requests a three bus clock BCLK I/O cycle for NOWS-.

Bit IOCHKERR always responds with no error pending, and bit IOCHRST is ignored as host interface module reports no errors. I/O access to register BCTL is through HIOBUS[25:0]. Bit ACE is a software R/W bit that is used as a compatibility flag when host adapter 7770 is used in systems supporting the Advanced RISC Computing Standard Specification for EISA Based Systems, Rev. 1.00, Addendum, 2 Jul. 91. Register BCTL may be accessed at any time without consideration of the state of sequencer 320.

Values stored in bits BON of register BUSTIME are used to adjust the maximum length of time host interface module 310 retains bus master status in ISA mode and bits BOFF are the number of bus clock periods host interface module retains bus master status in EISA mode after a bus master preempt request (signal MACK de-asserted with signal MREQ still asserted) by the EISA system board. When host interface module reverts to a bus slave after being a bus master, values stored in register BUSTIME, bits BOFF for ISA and two bus clock periods for EISA provide the minimum length of time that must pass before host interface module 310 again requests bus master status. I/O access to register BUSTIME is through CIOBUS 350. Time values in register BUSTIME are relative to host interface module internal interface input host clock HCLKM for ISA and to signal BCLK for EISA. Host clock HCLKM is a divide by two of the direct input host adapter clock CLK running at 40 MHz.

Bus on values (bits BON for ISA) are from two bus clock periods (value=0) or 1 to 15 μsec. Bus off values (bits BOFF for ISA) are from two bus clock periods (value=0) or 4 to 60 μsec in increments of 4 μsec. For EISA bus on time after a preempt is selected by BOFF bit values, 0=2 BCLKS, 1–15=4 to 60 BCLKS in increments of 4 BCLKS. Bus time is chosen to optimize system throughput. For a minimum configuration, a large bus on time with a small bus off time gives the best performance. When another I/O device is on the bus and used at the same time as the host adapter 7770, overall system performance may be improved by reducing bus on and/or increasing bus off time. Host adapter 7770 must get off the bus every 15 μs minimum to allow refresh to occur.

Bus on time indicates the time that host adapter 7770 stays on host computer bus 226 before giving it up. Bus on time for ISA is measured from DMA acknowledge input signal DAKI asserted to DMA request output signal DRQO deasserted for EISA see bits BOFF. Once signal DRQO or MREQ is asserted at least one data transfer must occur before the signal can be deasserted, even if the bus on or preempt time expires. Bus on time may be longer than the value programmed in the case of a slow data transfer rate and a minimum bus on time. In addition, for ISA there is some time, equal to or less than one bus clock cycle, required after a transfer in order to synchronize DMA request output DRQO deassertion.

Bus off time is the time host adapter 7770 stays off bus 226 before requesting bus 226 again. Bus off time for ISA is measured from DMA request output signal DRQO deasserted to DMA request output signal DRQO asserted.

Register BUSSPD provides the ability to adjust the host interface module ISA bus master 16-bit data transfer rate to accommodate various implementations. The transfer rates listed in register BUSSPD are referenced to the host interface module internal interface input host clock HCLKM with a period of 50 ns. When the data transfer is within the video address range and memory 16-bit status input signal M16I is not asserted the data transfer is 8-bits. Register BUSSPD is forced the default value of zero when power-on reset signal POR is active.

The transfer rate can be adjusted for 2 to 10 MBytes/second by setting the value of bits STBOFF[2:0] and STBON[2:0] as shown in the first column of Table 26.

TABLE 26

| STBON/STBOFF 210 | TIME ns | Address/Data Setup ns | Address/Data Hold ns |
| --- | --- | --- | --- |
| 000 | 100 | 70 | 30 |
| 001 | 150 | 120 | 30 |
| 010 | 200 | 120 | 80 |
| 011 | 250 | 170 | 80 |
| 100 | 300 | 170 | 130 |
| 101 | 350 | 220 | 130 |
| 110 | 400 | 270 | 130 |
| 111 | 500 | 320 | 180 |

Bus speed may be adjusted to provide the maximum bus band width allowed on the ISA bus. Care is taken when choosing a bus speed value to consider the bus on time choice. For slower speed, the bus on time may be over before the first transfer has completed. In any case, at least one transfer will take place before bus 226 is given up by host adapter 7770. This, however, extends the bus on time.

Register HCNTRL provides capability to gain I/O access to registers located on CIOBUS 350 in both in host interface module 310 and other modules in host adapter 7770 through the host interface module external interface along with some host interface module mode selections. Register HCNTRL may be written to at any time without consideration of the state of the associated modules. I/O access to register HCNTRL is through HIOBUS. Register HCNTRL is cleared and set to a value of 5 when power-on reset signal POR is active.

Host interface module address registers HADDR[3:0] contain the system memory address of the data host interface module 310 to transfers to or from the data FIFO memory circuit as an active bus master. When registers HADDR[3:0] are loaded with a new starting address, the same address is also stored in registers SHADDR[3:0] with the same bit relationship. Registers SHADDR[3:0] are located in SCSI module 330. Bit 0 of register HADDR0 is bit 0 of the transfer address, the least significant bit. Bit 0 of register HADDR1 is address bit 8. Bit 0 of register HADDR2 is address bit 16 and bit 0 of register HADDR3 is address bit 24.

Registers HADDR[3:0] function as count up counters, and count up by one for each byte transferred between host interface module 310 and system memory 230. I/O access to registers HADDR[3:0] is through CIOBUS 350. Registers HADDR[3:0] may be read at any time. Registers HADDR [3:0] can be only written to when bit HDMAENACK in register DFCNTRL is inactive or error bit ILLSADDR in register ERROR is set. Registers HADDR[3:0] counts up by one for 8-bit transfers, by two for 16-bit transfers, by three for 24-bit transfers and by four for 32-bit transfers. Register HADDR3 is not used in ISA mode. Register SHADDR[3:0] do not count in the same manner as registers HADDR[3:0] for SCSI DMA transfers.

In EISA mode DMA "leading" address byte offsets to 32-bit boundaries cause the first DMA transfer to be 8-, 16-, or 24-bits with register HADDR[3:0] counting 1, 2, or 3 respectively to align following data transfers to 32-bit boundaries. When the count in counter HCNT[2:0] is less than four bytes, the last transfer, if it contains "trailing" offsets, is 8-, 16-, or 24-bits as required to complete the DMA transfer count.

In ISA 16-bit transfers, DMA "leading" address byte offsets to 16-bit boundaries cause the first DMA transfer to be 8-bits with registers HADDR[3:0] counting by one to align following transfers to 16-bit boundaries. When the count in register HCNT[2:0] is less than two bytes, the last transfer, if it contains a "trailing" offset, is 8-bits to complete the DMA transfer count.

In ISA mode, when the transfer is within the ISA video RAM address range of 0BFFFF:0A0000, which is reserved for the graphics display buffer, registers HADDR [3:0] count by two when memory 16-bit status input signal M16I- is asserted (16-bit transfers) and by one when memory 16-bit status input signal M16I- is de-asserted (8-bit transfers).

ISA/EISA master address generator circuit 2940, which contains registers HADDR[3:0] also contains logic to detect 1K system memory page boundary locations to enable EISA bus master burst transfers by host interface module 310 to be halted and a normal transfer performed as the first transfer in each 1K page. Burst transfers resume in the second address of the new page. Registers HADDR[3:0] are cleared to 00 whenever power-on reset signal POR is active.

When register HADDR0 is loaded, the value stored in bit HADDR00 is also stored in a control bit ODDBYTE and the value stored in bit HADDR01 is also stored in a control bit ODDWORD in data FIFO memory circuit 360. The values stored in control bits ODDBYTE and ODDWORD enable the bus master logic to determine the proper starting location of the first byte within the first 32-bit doubleword transferred to/from the 32-bit data FIFO memory circuit 360. After registers HADDR[3:0] and registers HCNT[2:0] have been loaded with the desired values and bit HDMAEN in register DFCNTRL placed in the active state prior to registers HCNT[2:0] reaching a count of zero, it is disallowed to reload register HADDR[3:0] with new values and placing bit HDMAEN back in the active state. Control bits ODDBYTE and ODDWORD are forced inactive whenever power-on reset signal POR is active.

Host interface module transfer byte count registers HCNT [2:0] contain a count of the number of bytes to be transferred between system memory 230 and data FIFO memory circuit 360 when host interface module 310 is an active bus master. Register HCNT3 is reserved for future expansion. Bit 0 of register HCNT0 is address bit 00 of the transfer count, i.e., the least significant bit. Bit 0 of register HCNT1 is address bit 08 and bit 0 of HCNT2 is address bit 16.

Registers HCNT[2:0] function as count down counters, and count down by one for each byte transferred between system memory 230 and data FIFO memory circuit 360. I/O access to registers HCNT[3:0] is through CIOBUS[34:0]. Registers HCNT[2:0] may be read at any time. Registers HCNT[2:0] may only be written to when bit HDMAEN-ACK is inactive without setting error bit ILLSADDR active. Registers HCNT[2:0] count down by one for 8-bit transfers, by two for 16-bit transfers, by three for 24-bit transfers, and by four for 32-bit transfers.

In EISA mode, data transfer "leading" address byte offsets to 32-bit boundaries will cause the first data transfer to be 8-, 16-, or 24-bits with registers HCNT[3:0] counting by 1, 2, or 3, respectively. The subsequent 32-bit data transfers decrement counter HCNT[2:0] by four until the count is less than 4 bytes, at which time the last transfer count is 1, 2, or 3 as required to complete the data byte transfer count.

In ISA mode (16-bit data transfer), data transfer "leading" address byte offsets to 16-bit boundaries cause the first data transfer to be 8-bits with registers HCNT[2:0] counting down by one to align following transfers to 16-bit boundaries. Subsequent 16-bit data transfers decrement counter HCNT[2:0] by two until the count is less than two bytes, at which time the last transfer if it contains a "trailing" offset will be 8-bits to complete the data transfer count.

In EISA mode, host interface module data transfers count down by four for each transfer and as above for leading and trailing offsets. In ISA mode when the transfer is within the ISA video RAM address range of 0BFFFF:0A0000, which is reserved for the graphics display buffer, register HCNT[2:0] counts down by two when memory 16-bit status input signal M16I- is asserted (16-bit transfers) and by one when memory 16-bit status input signal M16I- is de-asserted (8-bit transfers). Registers HCNT[2:0] are cleared whenever power on reset signal POR is active.

ISA/EISA master byte counter circuit 2950, which contains registers HCNT[2:0], also contains detectors for remaining byte count of: zero; less than two, four; two; four; greater than two, four; which are used by the bus master logic circuits 2945 and 2955.

Register SCBPTR provides for selection of pages in SCB array 443. Read/write I/O access to register SCBPTR is through CIOBUS 350. Register SCBPTR is cleared to 00 whenever power on reset signal POR is active. In this embodiment, bits SCBVAL[1:0] in register SCBPTR are address bit extensions that actually select a page (32 registers) in SCB array 443.

Register INTSTAT provides the interrupt status when an interrupt condition occurs. Register INTSTAT is written to through CIOBUS 350 and is read through HIOBUS allowing register INTSTAT to be read without bit PAUSE being active. Write operations to register INTSTAT on CIOBUS 350 only affect bits[7:4,1:0] and not bits[3:2], whose state is controlled by other modules in host adapter 7770. Register INTSTAT is set to 00 whenever power on reset signal POR is active. Bits[3,1:0] may also be individually reset by use of register CLRINT.

Register CLRINT is written with the desired bit pattern equal to one to clear active interrupt bits in register INTSTAT. The bits in register CLRINT are self-clearing (write decode only, no storage). This register is only accessible through the host interface module external interface via HIOBUS. When power on reset signal POR is active, it forces bit CLRBRKINT, CLRCMDINT and CLRSEQINT to be active.

Hard "Error" register ERROR provides access to fatal software, firmware, and hardware error conditions that must be corrected for proper host adapter 7770 operation.

Register DFCNTRL provides control of data FIFO memory circuit 360. Some bits are self-clearing and some must be cleared by HIM sequence 320. Bits FIFORESET and WIDEODD may be set at anytime. Bit FIFOFLUSH may only be set when FIFOEMP is not active. When power on reset signal POR is active, all bits in register DFCNTRL are forced equal to zero. I/O access to register DFCNTRL is through CIOBUS 350. Data FIFO memory circuit data path access is determined by the state of bits DIRECTION, HDMAEN, and SDMAEN in register DFCNTRL as illustrated in Table 27.

TABLE 27

| DFCNTRL BITS | | | | |
|---|---|---|---|---|
| DIRECTION | HDMAEN | SDMAEN | DFIFO ACCESS | |
| BIT 2 | BIT 3 | BIT 4 | READ | WRITE |
| 0 | 1 | 1 | HOST | SCSI |
| 1 | 1 | 1 | SCSI | HOST |
| 0 | 0 | 1 | SEQUENCER | SCSI |
| 1 | 0 | 1 | SCSI | SEQUENCER |
| 0 | 1 | 0 | HOST | SEQUENCER |
| 1 | 1 | 0 | SEQUENCER | HOST |
| X | 0 | 0 | SEQUENCER | SEQUENCER |

Register DFSTATUS contains status information about data DFIFO memory circuit 360. I/O access to register DFSTATUS is through CIOBUS 350.

Data FIFO write address registers DFWADDR[1:0] provide a write address pointer for the data FIFO in data FIFO memory circuit 360. Each value points to a 32-bit doubleword location in data FIFO memory circuit 360. Normally registers DFWADDR[1:0] are incremented by data FIFO data clock HDFDATCLK during host interface module bus master 32-bit data transfers to data FIFO memory circuit 360 from system memory 230 or by SCSI FIFO data clock SDFDATCLK during 16-bit data transfers from SCSI module 330 to data FIFO memory circuit 360. Data FIFO data clock HDFDATCLK is a control output signal to data FIFO memory circuit 360. Data FIFO data clock HDFDATCLK is used for host interface module 310 reading and writing to data FIFO memory circuit (DFIFO) 360 with bits HDMAEN and DIRECTION selecting the proper operation in data FIFO memory circuit 360. When bit direction is active, the rising (leading) edge of data FIFO data clock HDFDATCLK initiates a write operation in the data FIFO memory. The falling edge latches the data in the memory and also increments the data FIFO memory write counter. When bit DIRECTION is inactive, the rising edge of data FIFO data clock HDFDATCLK initiates a data FIFO read clock DFRDCLK and the falling edge of clock HDFDATCLK terminates clock DFRDCLK causing the data FIFO memory read counters to increment. Both read and write operations are synchronized to the host clock HCLKH rising edge which is the same edge SCSI module 330 used for data FIFO memory circuit 360 accesses.

Registers DFWADDR[1:0] also are incremented when 8-bit data is written to register DFDAT and the data is stored in data FIFO bits [31:24]. Registers DFWADDR[1:0] are incremented after four 8-bit writes to register DFDAT which started when bits HADDR[01:00] in host address register HADDR were both zero, and after 1, 2, or 3 8-bit writes to register DFDAT for states 3, 2, 1 respectively in bits HADDR[01:00]. Bit 0, bit FWADDROO in register DFWADDRO, is the least significant address bit. In this embodiment, register DFWADDR[1] is reserved for future expansion. I/O access to register DFWADDR[1:0] is through CIOBUS 350. Registers DFWADDR[1:0] are zeroed when power on reset signal POR is active or when bit FIFORESET is written. The physical location of registers DFWADDR[1:0] is in data FIFO memory circuit 360. In this embodiment, only bits DFWADDR[06:00] in register DFWADDRO are used with bit FWADDR[06] being used for roll over (FIFOFULL, FIFOEMP, DFTHRSH, DFSDH and FIFOWDEMP) status control.

Data FIFO read address registers DFRADDR[1:0] provide a read address pointer for the data FIFO memory in data FIFO memory circuit 360. Each value points to a 32-bit doubleword location in data FIFO memory circuit 360.

Normally registers DFRADDR[1:0] are incremented by data FIFO data clock HDFDATCLK during host interface module bus master 32-bit data transfers from data FIFO memory circuit 360 to system memory 230 or by SCSI FIFO data clock SDFDATCLK (uses leading edge) during 16-bit data transfers to SCSI module 330 from data FIFO memory circuit 360. The interaction of data FIFO data clock HDFDATCLK with circuit 360 was just described and the description for SDFDATCLK is incorporated herein by reference.

Registers DFRADDR[1:0] also are incremented when 8-bit data is read from register DFDAT and the accessed data is stored in data FIFO bits[31:24]. Registers DFRADDR[1:0] are incremented after four 8-bit reads from register DFDAT which started when bits HADDR[01:00] in host address register HADDR were both zero, and after 1, 2, or 3 8-bit reads from register DFDAT for states 3, 2, 1 respectively in bits HADDR[01:00]. Bit 0, bit DFRADDROO in register DFRADDRO, is the least significant address bit. In this embodiment, register DFRADDR[1] is reserved for future expansion. I/O access to register DFRADDR[1:0] is through CIOBUS 350. Registers DFRADDR[1:0] are zeroed when power on reset signal POR is active or when bit FIFORESET is written. The physical location of registers DFRADDR[1:0] is in data FIFO memory circuit 360. In this embodiment, only bits DFRADDR[06:00] in register DFRADDRO are used with bit DFRADDR[06] being used for roll over (FIFOFULL, FIFOEMP, DFTHRSH, DFSDH and FIFOWDEMP) status control.

Data FIFO data register DFDAT, is an 8-bit port into the host data FIFO in data FIFO memory circuit 360 which is organized in 32-bit doublewords. Reading register DFDAT transfers data from the data FIFO location pointed to by bits DFRADDR[05:00] in register DFRADDRO and the states of pointers DFRB01 and DFRBO, which are 2-bit read-byte offset pointers that are used by sequencer 320 in a read of port DFDAT. The states of these pointers decode which byte is accessed in the 32-bit data FIFO data output signal. The states of pointers DFRB1 and DFRBO are loaded with the stored states of ODDWORD and ODDBYTE memories, which store the initial value that was stored at bits HADDR [01:00] when bit FIFORESET is written. The states stored in the ODDWORD and ODDBYTE memories adjust the initial access from register DFDAT to the first valid data location when the data FIFO is initialized by setting bit FIFORESET prior to writing to the data FIFO.

Writing to the DFDAT register transfers data to the data FIFO location pointed to by bits DFRADDR[05:00] in registers DFWADDR[1:0] and the states of pointers DFWB1 and DFWB0. The states of these pointers decode which byte is written to the 32-bit data FIFO input lines. The states of the ODDWORD and ODDBYTE memories, which store the initial value that HADDR[01:00] were stored at, adjust the initial write access to register DFDAT to the first valid data location when data FIFO is initialized by setting bit FIFORESET prior to writing to register DFDAT.

I/O access to data FIFO memory 915 through register DFDAT is through the CIOBUS. Attempts to perform 8-bit data accesses to or from data FIFO through register DFDAT with non-listed combinations of bits DIRECTIONACK, HDMAENACK and SDMAENACK, as indicated in Table 27 above, are not allowed and set error status bit ILLSADDR. Note that these bits are set in response to the bits listed in Table 27 being set.

When the data stored in the data FIFO is from previous host interface module double word writes or SCSI word writes, assuming that the data FIFO was initialized by setting bit FIFORESET and registers HADDR[3:0] were loaded with the required address, prior to writing the data currently stored in the data FIFO, the bytes may be read from register DFDAT starting at the first valid byte. Reading data bytes from register DFDAT accesses a stream of bytes in the proper order for the number of bytes desired as long as bit FIFOEMP is not active. Bit FIFOEMP is not active unless all bytes of the remaining data FIFO 32-bit location have been read.

When writing a stream of bytes to register DFDAT, assuming that the data FIFO was initialized by setting bit FIFORESET and registers HADDR[3:0] were loaded with the required address, prior to writing the data, the bytes are stored in the proper order until bit FIFOFULL becomes active. When the final bytes written to register DFDAT only store from one to three bytes in a data FIFO 32-bit location, the bytes are not accessible for reading to the host or SCSI modules until all bytes are written to that data FIFO location. To ensure all bytes are accessible the byte count must be known and adjusted for the combination of bits ODDWORD, ODDBYTE and register HCNT conditions for that transfer, or three filler byte writes always appended to register DFDAT to ensure the last valid byte is accessible, to the host interface or SCSI modules.

Register SCBCNT provides the starting address and the enable bit for automatically incrementing the address of SCB array 443. When bit SCBAUTO, bit 7 in register SCBCNT, is set any access of the SCB array address space uses the contents of bits SCBCNT[4:0] in register SCBCNT for an offset into SCB array address space instead of using the address accompanying the I/O access. Each access increments the contents of bits SCBCNT[4:0] by one. When bit SCBAUTO is inactive, all SCB array I/O accesses use the accompanying address directly. When bit SCBAUTO is inactive, the SCB array access can be a read or write to the same address or different address, or a read-modify-write to the same address. However, when bit SCBAUTO is active, both the SCB array's read address and write address ports are connected to bit SCBNT[4:0] and all combinations of read and/or write are to the same address in SCB array 443. Bits SCBCNT[4:0] are cleared to zero when power-on reset signal POR is active.

Register QINFIFO is the data port to queue-in FIFO 412, a four byte FIFO. Writing to register QINFIFO stores data in the current write location and increments the queue-in FIFO count in register QINCNT. Reading from register QINFIFO accesses the data at the current read location and decrements the count in register QINCNT. Data written to register QINFIFO, while bits QINCNT[2:0] in register QINCNT indicate that all positions in queue-in FIFO 412 are occupied, is ignored. Data read from register QINFIFO, while bits QINCNT[2:0] in register QINCNT indicate that all positions in queue-in FIFO are empty, repeatedly accesses the same byte. I/O access to register QINFIFO is through CIOBUS 350. Note only bits [1:0] of each location may be written to, with bits [7:2] as constant "0" on reads. All locations of the QINFIFO are cleared to "0" when power-on reset signal POR is active.

Register QINCNT contains the count of the number of data bytes stored in queue-in FIFO with a range of from 0 to 4. Register QINCNT is cleared when power-on reset signal POR is active.

Register QOUTFIFO is the data port to the queue-out FIFO 413, a four byte FIFO. Writing to register QOUTFIFO stores data in the current write location of queue-out FIFO and increments the count in register QOUTCNT. Reading from register QOUTFIFO accesses the data at the current read location and decrements the count in register QOUTCNT. Data written to register QOUTFIFO while the counter QOUTCNT[2:0] indicates that all positions are full is ignored. Write access to the register QOUTFIFO register is through CIOBUS 350. Read access to register QOUTFIFO is through HIOBUS[25:0] with the data latched on the leading edge to provide stable data for the read. Note only bits[1:0] of each location may be written to, with bits[7:2] set as constant "0" on reads. All locations of register QOUTFIFO are cleared to "0" when power-on reset signal POR is active.

Register QOUTCNT contains the count of the number of data bytes data stored in register QOUTFIFO with a range of from zero to four. Read access to register QOUTCNT is through HIOBUS[25:0] with the data latched on the leading edge to provide stable data for the read. Register QOUTCNT is cleared to "0" when power-on reset signal POR is active.

Register Test Chip (TESTCHIP) includes bits that select certain sections of the chip for test purposes. The register should not be written during the normal operation except for RAM stress testing as test logic will disrupt the operation. Register TESTCHIP is cleared to "0" when power on reset signal POR is active.

Figures 33A, 33B:
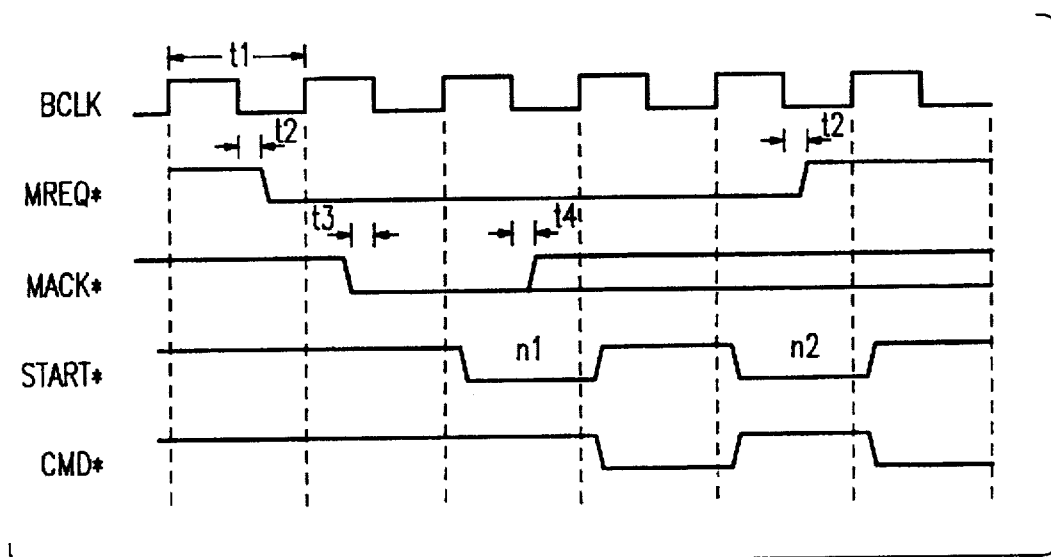
FIGS. 33A and 33B are a timing diagram with timing variations for EISA bus master timing during arbitration.

All operations over EISA bus are synchronized to one or more edges of bus clock BCLK (FIG. 33A). Bus clock BCLK provides the capability to synchronize host interface module bus activities to the external EISA interface bus clock. Bus clock BCLK, which is the same as bus clock BCKLI, operates at frequencies between 8.333 MHz and 6 MHz with a normal duty cycle of 50 percent. Bus clock BCLK is driven only by the EISA system board. As shown in FIGS. 33A and 33B, period t1 of bus clock BCLK is a minimum of 120 ns. Period t1 is sometimes extended for synchronization to microprocessor 221 or other system board devices. During bus master accesses the EISA system board extends bus clock BCLK only when required to synchronize with main memory 230.

In general, as explained below, events are synchronized to edges of bus clock BCLK without regard to frequency or duty cycle. Bus clock BCLK is always synchronous with the trailing edge of start transfer cycle output signal STARTO-, start transfer cycle input signal STARTI- and the leading edge of command input signal CMDI-. Bus clock BCLKI may not be synchronous with the trailing edge of command input signal CMDI-.

Bus clock BCLK characteristics are the same for the ISA mode with signals NOWSO- and DRQO referenced to bus clock BCLK. When bit POWRDN is active, host interface module 310 restricts use of bus clock BCLK to slave NOWSO- generator, with bus clock BCLK used by other logic maintained in the active state.

FIG. 33A is a timing diagram and FIG. 33B gives timing variations for EISA bus master arbitration timing in normal cycles. Note that in the timing diagrams features are compressed to illustrate a particular sequence. The following discussion of the various signals involved gives the relationship as if the complete time scale was illustrated. Also, as each signal is encountered the signals is discussed in some detail. Therefore, to follow just the timing sequence these background discussions are not required. Initially, memory request output signal MREQO- is asserted by host interface module within a time t2 from falling edge of bus clock signal BCLKI to request access to the EISA bus as an EISA bus master. As shown in FIG. 33B, time t2 is in the range of from 2 ns to 33 ns.

Host interface module 310 asserts memory request output signal MREQO- for system memory for data FIFO memory circuit 360 data transfers, i.e., when bits HDMAEN and DIRECTION in register DFCNTRL are active, when bit DFTHRSH in register DFSTATUS or bit FIFOEMP in register DFSTATUS become active with status HCNTZ inactive. Status HCNTZ is a decode of register HCNT[2:0] with values of all zeros which means the data transfer count is complete. Note in this direction bit FIFOEMP is used in place of bit DFTHRSH in register DFSTATUS to allow asserting the first memory request output signal MREQO- after bit FIFORESET has been written to and after bit HDMAEN in register DFCNTRL is set active to fill data FIFO memory circuit 360. Thereafter, the normal status of bit DFRHRSH from data FIFO memory circuit 360 activates memory request output signal MREQO- when the data FIFO has been emptied down to the selected threshold level. Memory request output signal MREQO- remains asserted until bit DFSDH or bit FIFOFULL becomes active, as long as bit HDMAEN is active, counter HCNT is not zero and memory acknowledge input signal MAKI- is asserted, or if memory acknowledge input signal MAKI- is deasserted until the bus-off timer expires.

Host interface module 310 asserts memory request output signal MREQO- for data FIFO memory circuit 360 to system memory 230 transfers, i.e., bit HDMAEN is active and bit DIRECTION is inactive, when bit DFTHRSH bit DFSXDONE or bit FIFOFULL become active. In this direction, bit DFTHRSH is overridden by bit DFSXDONE, which is the logical OR bits SXFERDONE or FIFOFLUSH, when either becomes active. Status MREOPEN remains active until bit FIFOEMP or status HCNTZ goes active. Memory request output signal MREQO- remains asserted until bit FIFOEMP becomes active, as long as bit HDMAEN is active, counter HCNT is not zero and memory acknowledge input signal MAKI- is asserted, or if memory acknowledge input signal MAKI- is de-asserted until the bus-off timer expires. In either transfer direction, memory request output signal MREQO- is not deasserted until at least one data byte transfer has been completed should bit HDMAEN be set inactive while memory request output signal MREQO- is also asserted. Memory request output signal MREQO- assertions and deassertion is synchronized to the following edge of bus clock BCLK.

In response to memory request output signal MREQO- going active (FIG. 33A), memory acknowledge input signal MAKI- is asserted by the EISA bus system with the rising edge of bus clock BCLKI to indicate to host interface module 310 that it has been granted bus access as a 32-bit EISA bus master. As illustrated in FIGS. 33A and 33B, memory acknowledge input signal MAKI- must have a setup time t3 of a minimum of ten nanoseconds prior to falling edge of bus clock BCLKI.

Start transfer cycle output signal STARTO- changes from a tri-state to a driven state on the falling edge of BCLKI that the host interface module 310 detects that memory acknowledge input signal MAKI- is asserted as does signals LAO [31:2], MBURSTO-, MASTER160-, BEO[3:0]-, MIOO, and WRO. Start transfer cycle output STARTO- is asserted on the next rising edge of bus clock BCLKI for one bus clock cycle so that start transfer cycle output STARTO- is de-asserted on the next rising edge of bus clock BCLK. Bus DO[31:0] is driven on the falling edge of bus block BCLKI while signal STARTO- is asserted.

Command input signal CMD-, which provides timing control within an EISA bus cycle is asserted by the EISA system board on the rising edge of bus clock BCLKI that deasserts start transfer cycle output signal STARTO-. The EISA system board holds command input signal CMDI- asserted for one bus clock period for a normal cycle. The deassertion of command input signal CMD- is normally synchronized with the rising edge of bus clock BCLKI. Note that in the figures a "*" is used instead of a "–" to designate signals that are active low. Also the signal direction designator at the end of the signal reference, i.e.; either "I" or "O", are not used in the figures, because the figures apply to transfers in both directions. Nevertheless, for clarity, herein, the direction designators "I" and "O" are used.

Host interface module 310 deasserts memory request output signal MREQO- on the falling edge of bus clock BCLKI when no more EISA bus cycles are needed. Cycle completion is indicated by the addressed EISA memory slave asserting EISA channel ready input signal EXRDYI to indicate extra cycle completion (this is true for each data transfer of any byte width while signal CMDI- is asserted), or the system board asserting EISA 32-bit data status input signal EX32I- to indicate the completion of a data translation operation, or master burst output signal MBURSTO- deassertion for delayed copydown data cycles. Host interface module 310, in EISA mode, waits a minimum of two bus cycles between deasserting memory request output signal MREQO- and reasserting memory request output signal MREQO-, if the need still exists.

Additional bus cycles are required if EISA channel ready input signal EXRDYI was sampled deasserted on the last bus cycle or any cycle; if EISA 32-bit data status input signal EX32I- and slave burst status input signal SBURSTI- were both sampled de-asserted at the trailing edge of start transfer cycle output signal STARTO-; or EISA 32-bit data status input signal EX32I- was sampled deasserted with slave burst status input signal SBURSTI- asserted and a delayed copydown data cycle is required. EISA memory request output signal MREQO- is not used by host interface module 310 in ISA mode.

Start transfer cycle output signal STARTO- returns to tri-state on the rising edge of bus clock BCLKI following the deassertion of memory request output signal MREQO- for normal cycles. The EISA system board deasserts memory acknowledge input signal MAKI- on the rising edge of bus clock BCLKI after sampling memory request output signal MREQO- deasserted.

When memory acknowledge input signal MAKI- is asserted, host interface module 310, as an EISA bus master, can drive data out bus DO[31:0], latched address out bus LAO[32:2], four byte enable output bus BE[3:0]-, start transfer cycle output signal STARTO-, master burst output signal MBURSTO-, memory/IO data status output signal MIOO, master 16-bit data status output signal MASTER160- and write data status output signal WRO to perform bus transfers.

Start transfer cycle output signal STARTO-, master burst output signal MBURSTO-, memory/IO data status output signal MIOO, master 16-bit data status output signal MASTER160-, and write data status output signal WRO are described more completely below. The function of data out bus DO[31:0], latched address out bus LAO[32:2], four byte enable output bus BE[3:0]- are considered prior to further consideration of the timing on the EISA bus with host interface module as an EISA bus master because an understanding of these buses facilitates the timing discussion.

In host interface module EISA bus master mode, latched address output lines LAO[31:24]- are for addressing host memory 230 and are driven on the falling edge of bus clock BCLKI after memory acknowledge input signal MAKI- is asserted. The address becomes valid before start transfer cycle output signal STARTO- is asserted and remains valid for each normal, burst, or translation cycle. Latched address output lines LAO[31:24]- are tri-stated on the falling edge of bus clock BCLKI that deasserts memory request output signal MREQO-.

Note the logical assertion state of latched address output lines LAO[31:24]- is inverted in relation to latched address output lines LAO[23:2]. Latched address output lines LAO [31:24]- are referenced to output pads LAO[31:24]- and are not used or driven by host interface module in ISA master mode, ISA slave mode, or EISA slave mode.

With host interface module in EISA master mode, latched address output lines LAO[23:17], LOA16, LAO[15:12], LAO[11:2] which are pipelined from one cycle to the next carry an address for host memory 230 and are driven on the falling edge of bus clock BCLKI after memory acknowledge input signal MAKI- is asserted. The address becomes valid before start transfer cycle output signal STARTO- is asserted and remains valid for each normal, burst, or translation cycle. Latched address output lines LAO[23:17], LA016, LAO[15:12], LAO[11:2] are tri-stated on the falling edge of bus clock BCLKI that deasserts memory request output signal MREQO-. While master burst output signal MBURSTO- is asserted in EISA, output line LAO[31:10] remain constant and mode host interface module 310 provides a new valid address on latched address output lines LAO[9:2], on every falling edge of bus clock BCLKI except when a delayed copydown cycle is being performed or EISA channel ready input signal EXRDYI is sampled and is deasserted. Latched address output lines LAO[15:12], LOA16, LAO[15:12], LAO[11:2] are not used by host interface module in ISA modes.

Host interface module 310, in EISA bus master mode, extends a data transfer cycle between system memory 230 and data FIFO memory circuit 360 whenever command input signal CMD- is asserted and EISA channel ready input signal EXRDYI is sampled deasserted and at least one half a bus clock period after sampling, EISA channel ready input signal EXRDYI is asserted. EISA channel ready input signal EXRDYI is sampled on each falling edge of bus clock BCLKI. EISA channel ready input signal EXRDYI must be asserted synchronously with a bus clock falling edge and must not be deasserted longer than 2.5 μs. EISA channel ready input signal EXRDYI is not used in host interface module ISA mode or in host interface module EISA slave mode.

Byte enable output bus BEO[3:0]- carries four byte enable output signals that identify the specific bytes addressed in a 32-bit boundary space pointed to by the address on latched address output lines LAO[31:2] and that are pipelined from one cycle to the next. A signal on a line of byte enable output bus BEO[3:0]- becomes driven on the same falling edge of bus clock BCLKI after memory acknowledge input signal MAKI- asserted. Byte enable output bus BEO[3:0]- is tri-stated on the falling edge of bus clock BCKLI following the deassertion of start transfer cycle output signal STARTO- for translation cycles, or on the same falling edge of bus clock BCLKI that deasserts memory request output signal MREQO-.

Host interface module 310 asserts signals on byte enable output bus BEO[3:0]-, as explained more completely below, when in 32-bit EISA bus master mode to indicate the location of the first byte in a 32-bit boundary space and to match the data width being transferred. The least significant byte enable line on which a signal is asserted points at the lowest byte 0–3 that is valid in the transfer and the most significant byte enable line on which a signal is asserted gives the data width being transferred. Host interface module 310, in EISA bus master downshift mode, transfers 8-bits or 16-bits only on data lanes 1 and/or 0 with byte enable output bus BEO[3:0]- continuing to provide location information in the 32-bit boundary space. A more descriptive term for "data lanes" is "byte lanes." Data lines describe 8-bit groupings of the 32-bit data bus, i.e., byte lane 0 is bits 0–7; byte lane 1 is bits 8–15; byte lane 2 is bits 16–23; and byte lane 3 is bits 24–31. The lines of byte enable output bus BEO[3:0] correspond to named byte lanes and indicate valid data.

The signals on byte enable output bus BEO[3:0]- are asserted in reference to the falling edge of bus clock BCLKI, and remain valid as long as the address on latched address output lines LAO[31:2] remains valid. Byte enable output line BEO3- is referenced to IO pad SBHE-/BE3-. Byte enable output line BEO2- is referenced to IO pad M16-/BE2-, and byte enable output lines BEO[1:0]- are referenced to IO pads SA[1:0]/BE[1:0]-. Byte enable output bus BEO [3:0]- is not used in ISA mode.

Host interface module 310, as a 16-bit EISA downshift bus master, uses data out lines DO[7:0] of host computer data bus to write the lower half of a 16-bit data word to memory 230 when either signal BEO0- or signal BEO2- is asserted. In this case, host interface module uses data out lines DO[15:8] to output the high half of the 16-bit data word when either signal BEO1- or signal BEO3- is asserted.

Host interface module 310, as a 32-bit EISA bus master, uses data out lines DO[31:24]- to write the fourth 8 bits (least significant plus three bytes of a double word) of a 32-bit double word to host memory 230 when signal BEO3- is asserted; (ii) data output lines DO[23:16] to write the third 8 bits (least significant plus two bytes of a double word) to host memory 230 when signal BEO2- is asserted; data out lines DO[15:8] to write the second (least significant plus one byte of a double word) to memory 230 when signal BEO1- is asserted; and (iv) data output lines DO[7:0] to write the first (lowest or least significant) byte of a 32-bit double word) when BEO0- is asserted.

In EISA bus master mode, host interface module 310 data out lines DO[7:0] drivers are enabled following the assertion of memory acknowledge input signal MAKI- valid data is asserted in reference to the falling edge of BCLKI for normal cycles, and in reference to the rising edge of BCLKI for burst cycles when signal MBURSTO- is asserted. Data out lines DO[7:0] are tri-stated on the falling edge of bus clock BCLKI following deassertion memory request output signal MREQO- for all cycles except a delayed copydown cycle (host interface module 310 in downshift mode) and a translation cycle. In a delayed copydown cycle, data out lines DO[7:0] are tri-stated on the falling edge of bus clock BCLKI after the deassertion of master burst output signal MBURSTO-. For a translation cycle, lines DO[7:0] are tri-stated on the falling edge of bus clock signal BCLKI after the deassertion of start transfer cycle input signal STARTI-.

The timing and floating of data out lines DO[31:24], DO[23:16] and DO[15:8] is identical to that of data out lines DO[7:0] when the appropriate bus enable out signal is asserted.

Figures 34A, 34B:
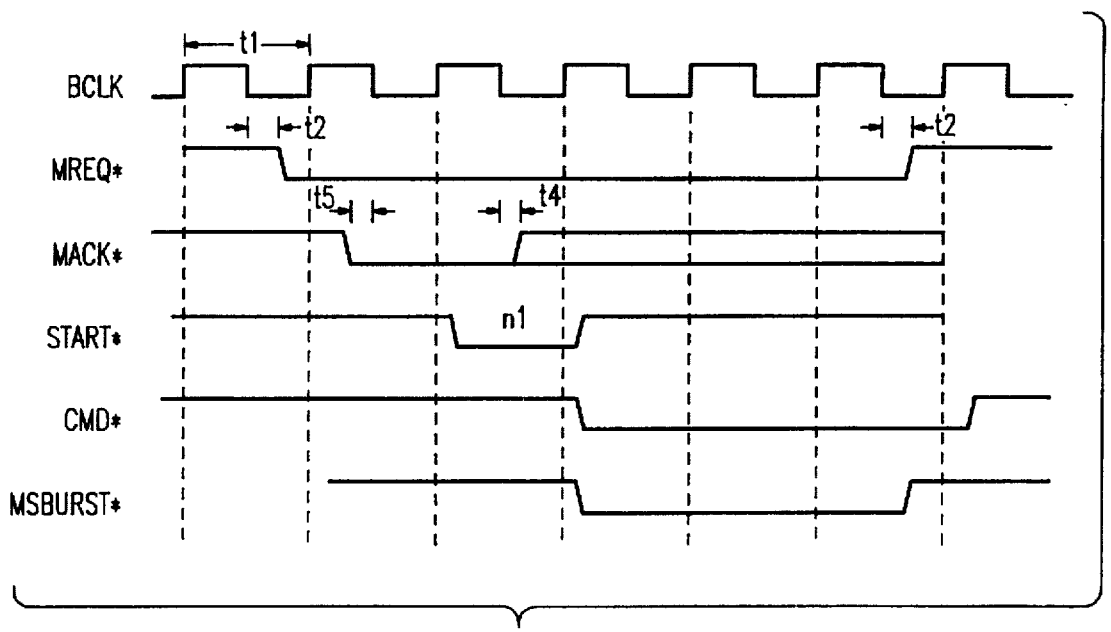
FIGS. 34A and 34B are a timing diagram with timing variations for an EISA bus master arbitration for a burst transfer.
Figure 35A:
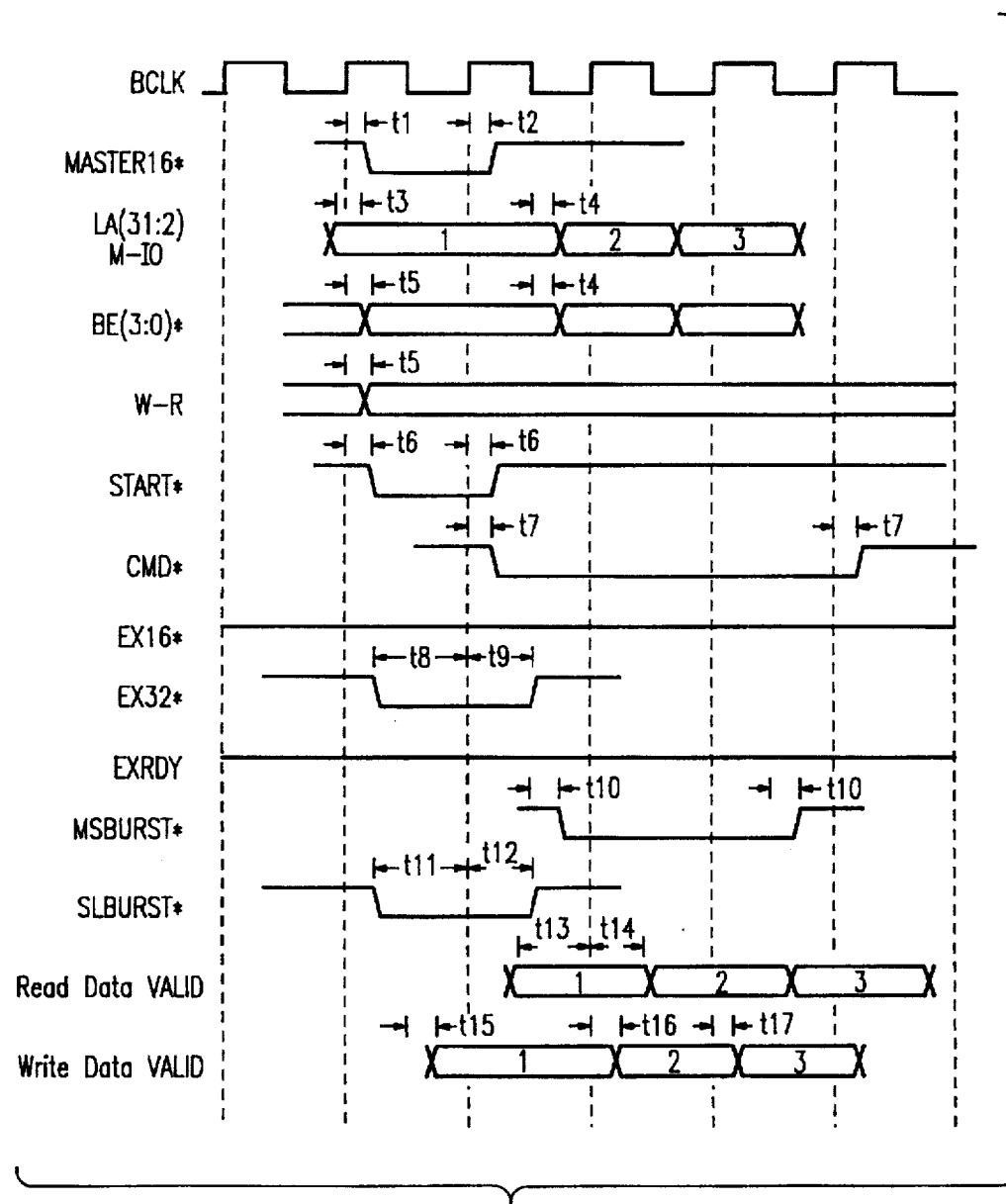

FIG. 34A is system timing diagrams for EISA bus master arbitration timing for a burst transfer and a downshift burst transfer and FIG. 34B give the timing variation. To facilitate discussion of the burst transfer downshift, FIGS. 35A, 35B and 35C and the timing variations in FIG. 35D which follow the arbitration, are considered with features common to the burst and downshift being discussed and then the burst only steps are considered followed by the downshift only steps. Throughout this discussion as new signals are encountered they are discussed in some detail. The arbitration timing is similar to that illustrated in FIGS. 33A and 33B. Memory request output signal MREQO- is asserted by host interface module 310 to request access to the EISA bus as an EISA bus master.

In response to memory request output signal MREQO- going active, memory acknowledge input signal MAKI- is asserted by the EISA bus system with the rising edge of bus clock BCLKI to indicate to host interface module 310 that it has been granted bus access as a 32-bit EISA bus master.

Host interface module 310 latches the starting address for the data transfer in ISA/EISA master address generator circuit so that the address is driven on latched address output lines LAO[31:2] (FIGS. 35A, 35B, and 35C) on the falling edge of bus clock BCLKI after memory acknowledge input signal MAKI- is asserted. The address becomes valid before start transfer cycle output signal STARTO- is asserted and remains valid for each normal, burst, or translation cycle.

In addition, memory/IO data status output signal MIOO (FIGS. 35A, 35B, and 35C) is asserted by host interface module 310 to indicate the type of cycle in progress is "a memory data transfer cycle". Memory/IO data status output signal MIOO is deasserted to indicate that the cycle in progress is "an IO cycle" and is asserted to indicate that the cycle in progress is "a memory data transfer cycle". Thus, host interface module 310, as an EISA bus master, always asserts memory/IO data status output signal MIOO for data transfers with the same timing as for latched address output lines LAO[31:2]. Memory/IO data status output signal MIOO is pipelined from one cycle to the next and must be latched along with latched address input lines LAI[31:2] and write data status input signal WRI by EISA slaves.

Start transfer cycle output signal STARTO- (FIGS. 34A and 35A to 35C) is changed from floating to a driven state on the rising edge of bus clock BCLKI by host interface module 310 following host interface module 310 detecting that memory acknowledge input signal MAKI- (FIG. 34A) is asserted. (Signal MAKI- is the same as signal MACK*.) Start transfer cycle output STARTO- is asserted for one bus clock cycle so that start transfer cycle output signal STARTO- is de-asserted on falling edge of bus clock BCLKI.

The signals on byte enable output bus (FIGS. 35A to 35C) BEO[3:0]- are asserted initially by host interface module 310 when the signals on lines LAO[31:2] are asserted. The signals on byte enable output bus BEO[3:0]- are also asserted by host interface module 310 on the falling edge of bus clock BCLKI for subsequent burst cycles. Note that in the timing diagrams the signals on lines BEO[3:0]- are shown being asserted at a somewhat later time for the first data transfer cycle. However, more margin is obtained with the timing described herein. Also, the names of the signals in the timing diagrams are not identical to these used herein. However, the two names are substantially similar, e.g. "MSBURSTO" vs. MBURSTO."

Master 16-bit data status output signal MASTER160- (FIGS. 35A to 35C) is asserted by host interface module 310 to indicate a capability to perform 16-bit burst data transfers. Host interface module 310 drives, asserts and floats master 16-bit data status output line MASTER160- with the same timing as start transfer cycle output signal STARTO-. An active signal on master 16-bit data status output line MASTER160- indicates to the EISA system board hat host interface module is a 32-bit burst transfer capable bus master that can downshift to be a 16-bit burst transfer capable bus master. In response to this signal, the EISA system board disables automatic 32-to-16-bit data size translation for an addressed 16-bit EISA memory burst slave during the first transfer. Host interface module 310 can then perform 16-bit EISA burst cycles should the EISA memory slave respond with slave burst status input signal SBURSTI- asserted and EISA 32-bit data status input signal EX32I- deasserted.

Write data status output signal WRO is asserted by host interface module 310 to indicate to the addressed slave that data is being transferred to it. When data status output signal WRO is deasserted, it indicates to the slave that data is being transferred from the slave. As the EISA bus master, host interface module 310 asserts write data status output signal WRO with the same rising edge of bus clock BCLKI on which start transfer cycle output signal STARTO- is asserted. Write data status output signal WRO remains valid as long as the addresses on latched address output lines LAO[31:2] are valid. Write data status output line WRO is tri-stated on the falling edge of bus clock BCKLI on which memory request output signal MREQO- is de-asserted.

Slave burst status input signal SBURSTI- is asserted by the appropriate EISA slave upon decoding a valid address from latched address output lines LAO[31:2] and with memory/IO data status output signal MIOO asserted. EISA 32-bit data status input signal EX32I- is asserted by a 32-bit EISA memory slave after decoding a valid address on signals latched address output lines LAO[31:2] with memory/IO data status output signal MIOO asserted to indicate that it can accept up to 32-bit data transfers. EISA system board and host interface module 310, as a 32-bit EISA bus master, sample the assertion of EISA 32-bit data status input signal EX32I- at the trailing edge of start transfer cycle output signal STARTO- to confirm that the addressed memory slave can accept 32-bit data transfers directly.

Command input signal CMDI-, which provides timing control within an EISA bus cycle is asserted by the EISA system board on the rising edge of bus clock BCLKI that deasserts start transfer cycle output signal STARTO-. When burst cycles are performed, the EISA system board extends the assertion of command input signal CMDI- until the rising edge of BCLKI following the deassertion of master burst output signal MBURSTO-.

After asserting master burst output signal MBURSTO-, host interface module in EISA bus master mode samples to determine whether slave burst status input signal SBURSTI- is asserted with the rising edge of bus clock BCLK at the end of start transfer output signal STARTO- to determine if the addressed EISA memory slave is able to perform EISA burst cycles.

Host interface module 310 begins a data transfer to or from memory 230 with normal cycles, i.e., two bus clock periods/cycle, and assets master burst output signal MBURSTO- and shifts to burst cycles, i.e., one bus clock period/cycle, when host interface module 310 detects that slave burst status input signal SBURST- is asserted with the rising edge of bus clock BCLKI at the end of start transfer cycle output signal STARTO- as long as EISA channel ready input signal EXRDYI is sampled asserted on the next falling edge of bus clock BCLKI, and signal NBURSTO- is asserted or if a first data transfer of a memory request output signal MREQO- and an end condition, i.e., bits HCNTZ-, FIFOWDEMP, DFSDN or FIFOFULL, is not active.

Master burst output signal MBURSTO- is sampled with the rising edge of bus clock BCLKI by the EISA slave. Detection of a 1K address page boundary during a burst sequence causes the burst to be interrupted with a normal cycle being performed for the first address of the new 1K address page. After the normal cycle, the burst transfer is resumed until one of the following occurs: host DMA enable bit HDMAEN in register DFCNTRL is cleared; space is not available in data FIFO memory circuit 360 for system memory reads; data is not available in data FIFO memory circuit 360 for system memory writes; the data transfer count in register HCNT (herein, "register HCNT" is used as a shorthand notation for registers HCNT0 to HCNT2) has expired; or host interface module's EISA bus master status is preempted by the EISA system board and the number of bus clock periods selected by value BOFF of register BUSTIME have passed including the bus clock periods needed to complete EISA channel ready input signal EXRDY extensions or delayed copydown cycles.

Host interface module 310 drives memory request output signal MREQO- inactive when no more EISA bus cycles are needed. The EISA system board deasserts memory acknowledge input signal MAKI- on the falling edge of bus clock BCLKI after sampling memory request output signal MREQO- deasserted. Master burst output signal MBURSTO- returns to tri-state on the same edge of bus clock BCLKI that deasserts memory request output signal MREQO- for normal cycles or on the second rising edge of bus clock BCLKI following the deassertion of memory request output signal MREQO- for burst cycles when delayed copydown cycles are required unless further extended by deassertions of EISA channel ready input signal EXRDY.

Figure 35B:
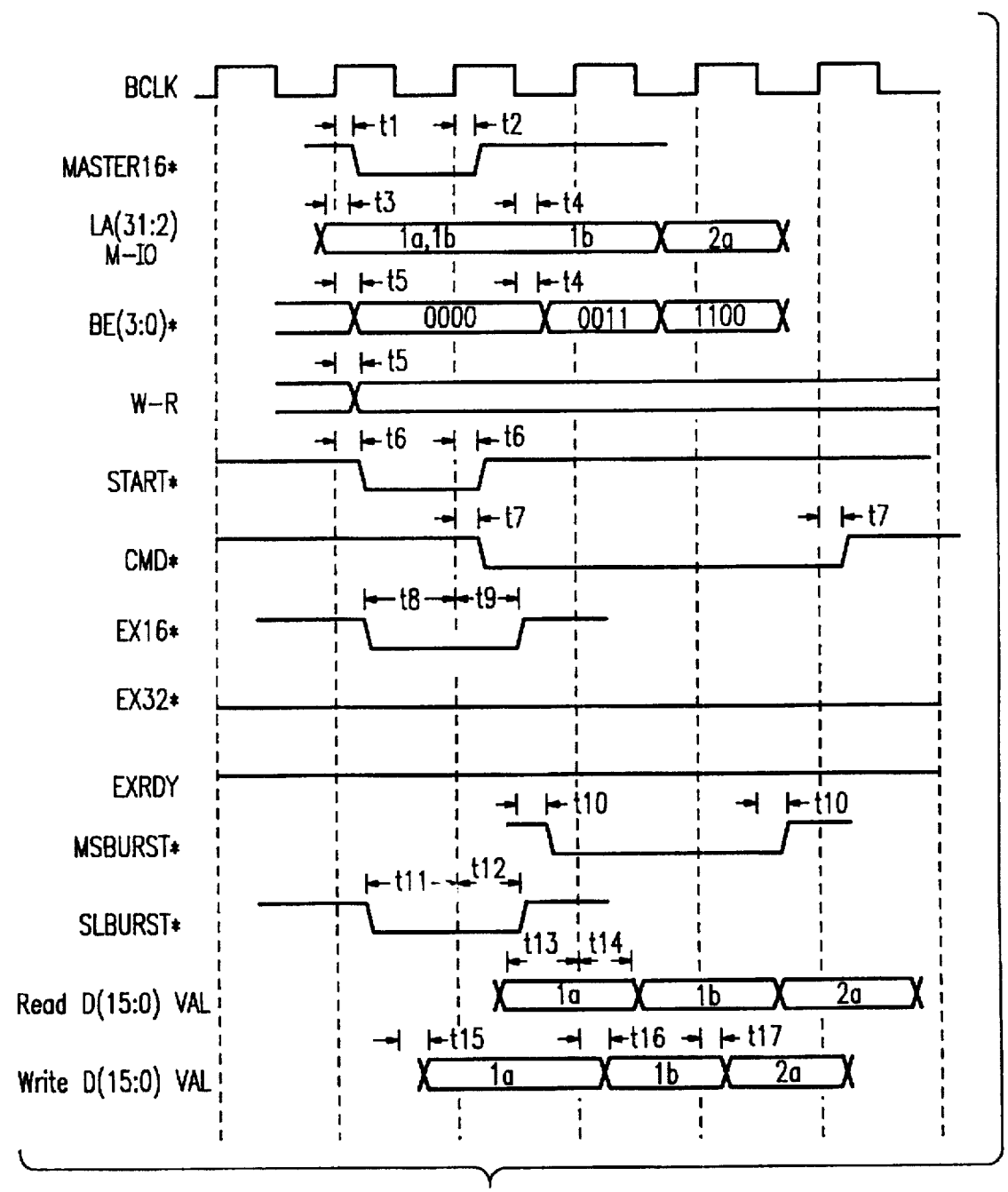
Figure 35C:
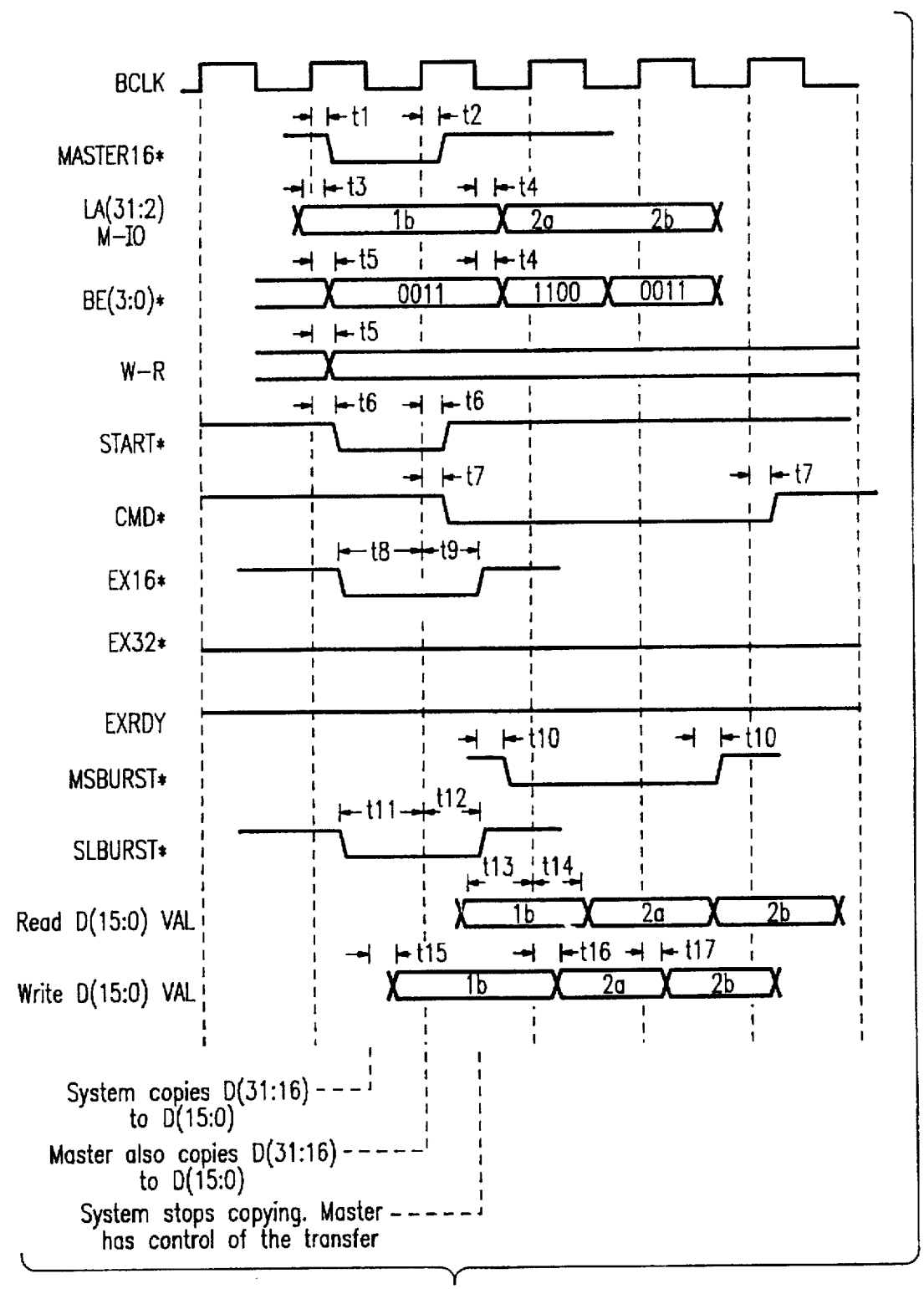

FIGS. 35B and 35C are system timing diagrams for EISA bus master timing for a burst transfer with a 16-bit downshift memory slave. The arbitration timing as well as the timing of signals on lines master 16-bit data status output line MASTER16O-, latched address output lines LAO[31:2], memory/IO data status output signal MIOO, byte enable output bus BEO(3:0)-, write data status output signal WRO, start transfer cycle output signal STARTO- and command input signal CMD- is the same as just described with respect to FIG. 6A and that description is incorporated herein by reference.

Since the addressed slave cannot support 32-bit data transfers, EISA 32-bit data status input signal EX32I- is not asserted. Slave burst status input signal SBURSTI- is asserted by the appropriate EISA slave upon decoding a valid address from latched address output lines LAO[31:2] and with memory/IO data status output signal MIOO asserted.

When EISA 32-bit data status input signal EX32I- is sampled deasserted with slave burst status input signal SBURSTI- asserted, host interface module 310 downshifts to a 16-bit burst bus master by asserting master burst output signal MBURSTO- with the next falling edge of bus clock BCLKI and transfers 16-bit data directly to or from the 16-bit EISA memory slave only on data lanes 1 and 0. A data lane is a byte of the data in a data out bus depending on the direction of transfer. Data lane 0 is the least significant byte of the bus.

For system memory 230 to data FIFO memory circuit 360 transfers with only the signal on byte enable output line BEO3- and/or the signal on byte enable output line BEO2- asserted, host interface module 310 accesses the indicated data from data lanes 1 and/or 0 instead of data lanes 3 and/or 2. When the signal on byte enable output line BEO3- and/or the signal on byte enable output line BEO2- are asserted along with the signal on byte enable output line BEO1- and/or the signal on byte enable output line BEO0-, host interface module 310 accesses the data indicated by the signal on byte enable output line BEO1- and/or the signal on byte enable output line BEO0- on lanes 1 and/or 0 respectively. Host interface module 310 then performs a second cycle with the same assertion state for the signal on byte enable output line BEO3- and/or the signal on byte enable output line BEO2- and with both the signals on byte enable output lines BEO1- and BEO0- deasserted and accesses the indicated data on lanes 1 and/or 0.

For data FIFO memory circuit 360 to system memory 230 transfers with only the signal on byte enable output line BEO3- and/or the signal on byte enable output line BEO2- asserted, the EISA system board performs an automatic copydown of host interface module's data from lanes 3 and/or 2 to data lanes 1 and/or 0. Host interface module 310 also performs an immediate copydown in parallel with the EISA system board starting with the rising edge of bus clock BCLKI that deasserts start transfer cycle output signal STARTO-. These actions are required so that the 16-bit slave may access the data originally output on lanes 3 and/or 2 from lanes 1 and/or 0. Should the signal on byte enable output line BEO3- and/or the signal on byte enable output line BEO2- be asserted along with the signal on byte enable output line BEO1- and/or the signal on byte enable output line BEO0-, the 16-bit slave accesses the data on data lanes 1 and/or 0 indicated by the signal on byte enable output line BEO1 and/or the signal on byte enable output line BEO0-. Host interface module 310 then performs a second delayed copydown cycle of the data indicated by the signal on byte enable output line BEO3- and/or the signal on byte enable output line BEO2- on lanes 3 and/or 2 to data lanes 1 and/or 0 with the same assertion state for the signal on byte enable output line BEO3- and/or the signal on byte enable output line BEO2- and with both the signal on byte enable output line BEO1- and/or the signal on byte enable output line BEO0- deasserted.

For memory request output signal MREQO- asserted cycles where only one transfer occurs starting in the last address of a 1-K boundary:

(a) If a 32-bit EISA burst slave responds, master burst output signal MBURSTO- is not asserted. Only a normal cycle occurs and then memory request output signal MREQO- is de-asserted.

(b) If a 16-bit EISA burst slave responds, and the transfer does not require one of byte enable output signals BEO[3:2] and one of BE[1:0] (BEHIANDLOW) asserted, master burst output signal MBURSTO- is not asserted and only a normal cycle occurs and then memory request output signal MREQO- is de-asserted.

(c) If a 16-bit EISA burst slave responds and the transfer does require BEHIANDLOW, a normal cycle is performed for the low word followed with master burst output signal MBURSTO- being asserted and a burst cycle performed for the high word. Then, memory request output signal MREQO- is de-asserted.

For memory request output signal MREQO- asserted cycles where multiple transfers occur starting in the last address of a 1-K boundary:

(a) If a 32-bit EISA burst slave responds, master burst output signal MBURSTO- is not be asserted and a normal cycle is performed. In the first address of the next 1-K boundary, a normal cycle is performed followed by burst cycles.

(b) If a 16-bit EISA burst slave responds and the first transfer does not require BEHIANDLOW, master burst output signal MBURSTO- is not asserted and a normal cycle is performed for the high word. In the first address of the next 1-K boundary a normal cycle is performed followed by burst cycles.

(c) If a 16-bit EISA burst slave responds and the first transfer does not require BEHIANDLOW, master burst output signal MBURSTO- is not asserted and a normal cycle is performed for the low word. Then, master burst output signal MBURSTO- is asserted and a burst cycle performed for the high word. In the first address of the next 1-K boundary, a normal cycle is performed followed by a burst cycles.

For memory request output signal MREQO- asserted cycles where multiple transfers will occur not starting in the last address of a 1-K boundary:

(a) For 16-bit or 32-bit EISA burst slaves, the first cycle is a normal cycle followed by burst cycles with, master burst output signal MBURSTO- asserted up to and including the last address of a 1-K boundary.

For memory request output signal MREQO- asserted cycles for single or multiple transfers starting at any address:

(a) For 16-bit EISA non-burst slaves and all non-EISA slaves, master burst output signal MBURSTO- is not asserted and a 32-bit translation transfer cycle is performed by the system board. Each translation transfer cycle completion is indicated by the system board asserting EISA 32-bit data status input signal EX32I-.

Figure 36A:
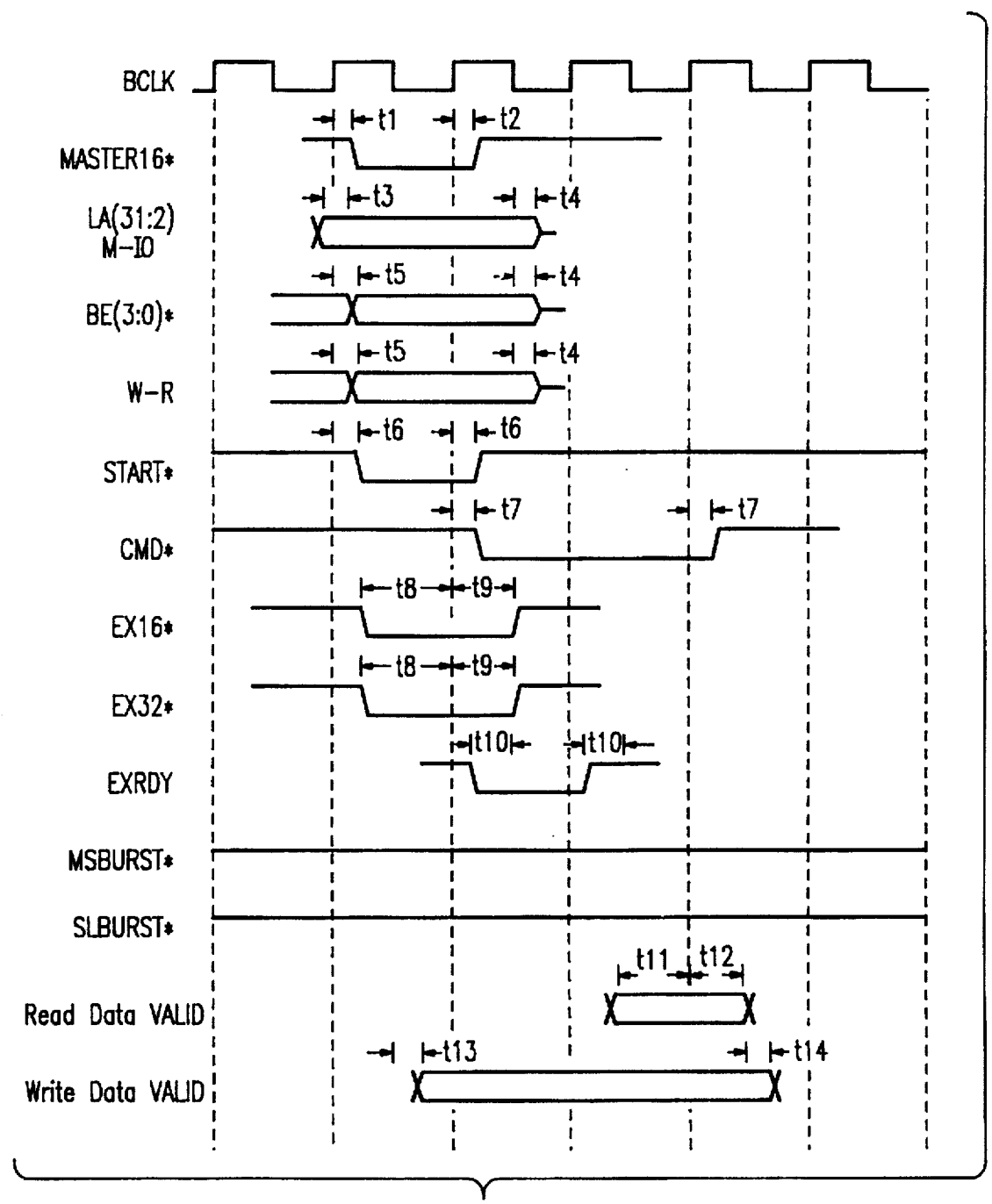

FIG. 36A is a timing diagram for a normal EISA two cycle data transfer and FIG. 36B gives timing variations. In this case, signals MBURSTO- and SBURSTI- are not asserted so none of the burst features described above are initiated. Thus, the normal cycle is initiated with at least the timing illustrated in FIG. 36A. Each of the signals functions as described elsewhere herein.

Figure 37A:
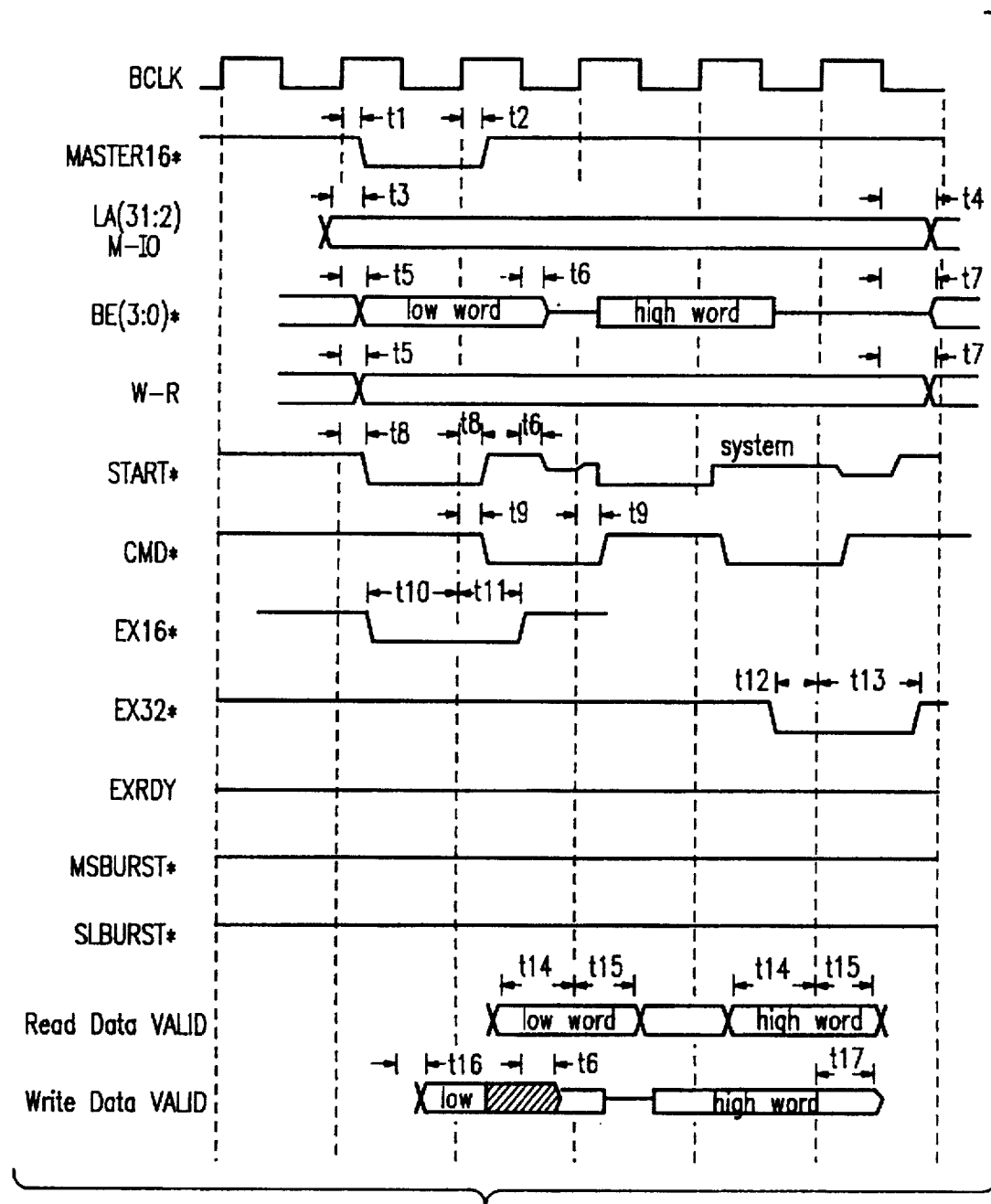

FIGS. 37A and 37B are system timing diagrams for EISA bus master timing for an EISA two cycle transfer with a 16-bit translation. The arbitration timing is the same as that illustrated in FIGS. 33A and 33B. Memory request output signal MREQO- is asserted by host interface module 310 to request access to the EISA bus as an EISA bus master. In response to memory request output signal MREQO- going active, memory acknowledge input signal MAKI- is asserted by the EISA bus system with the rising edge of bus clock BCLKI to indicate to host interface module 310 that it has been granted bus access as a 32-bit EISA bus master.

Host interface module 310 latches the starting address for the data transfer in ISA/EISA master address generator circuit so that the address is driven on latched address output lines LAO[31:2] on the falling edge of bus clock BCLKI after memory acknowledge input signal MAKI- is asserted. The address becomes valid before start transfer cycle output signal STARTO- is asserted and remains valid for each translation cycle.

In addition, memory/IO data status output signal MIOO is asserted by host interface module, as an EISA bus master, with the same timing for latched address output lines LAO [31:2].

Start transfer cycle output signal STARTO- is changed from tri-stated to a driven state on the rising edge of BCLKI by host interface module following host interface module detecting that memory acknowledge input signal MAKI- is asserted. Start transfer cycle output STARTO- is asserted for one bus clock cycle so that start transfer cycle output signal STARTO- is de-asserted on falling edge of bus clock BCKL.

Byte enable output bus BEO[3:0]- is driven by host interface module 310 on the falling edge of bus clock BCLKI after memory acknowledge input signal MAKI- is asserted, and is tri-stated on the falling edge of bus clock BCKLI following the deassertion of start transfer cycle output signal STARTO- for translation cycles. Note again byte enable output bus BEO[3:0]- is started earlier than shown in the timing diagram to obtain timing margin.

Host interface module 310 asserts write data status output signal WRO with the same rising edge of bus clock BCLKI on which start transfer cycle output signal STARTO- is asserted. Write data status output signal WRO remains valid as long as the addresses on latched address output lines LAO[31:2] are valid. Write data status output line WRO is tri-stated on the falling edge of bus clock BCKLI on which memory request output signal MREQO- is de-asserted Command input signal CMD-, which provides timing control within an EISA bus cycle, is asserted by the EISA system board on the rising edge of bus clock BCLKI that deasserts start transfer cycle output signal STARTO-. EISA system board holds command input signal CMD- for one bus period, but signal CMD- can be extended by the EISA system board while it performs the translation.

Slave burst status input signal SBURSTI- and master burst output signal MBURSTO- are not asserted. The slave does not assert EISA 32-bit data status input signal because the slave can not support 32-bit data transfers.

The EISA system board and host interface module 310, as a 32-bit EISA bus master, samples the assertion of EISA 32-bit data status input signal EX32I- at the trailing edge of start transfer cycle output signal STARTO- to confirm that the addressed memory slave can accept 32-bit data transfers directly. For data FIFO memory circuit 360 to system memory 230 transfers when both EISA 32-bit data status input signal EX32I- and slave burst status input signal SBURSTI- are sampled deasserted, host interface module 310 floats start transfer cycle output signal STARTO-, byte enable output bus BEO[3:0]-, and data-out bus DO[31:0] on the falling edge of bus clock BCLKI which follows the deassertion of start transfer cycle output signal STARTO-. Host interface module 310 waits for the EISA system board to perform ISA/EISA operation/data size translations and to assert EISA 32-bit data status input signal EX32I- to indicate completion of the translation. Notice that the EISA system board drives start transfer cycle output signal STARTO- low so that upon deassertion of signal STARTO- a second command input signal CMD- to transfer the second word in 32-bit transfers. After the EISA system board performs a operation/size translation for the slave and the EISA system board drives EISA 32-bit data status input signal EX32I- indicating completion of the host interface module 32-bit transfer.

When host interface module 310 samples signal EX32I- asserted with the rising edge of bus clock BCLKI, on the next falling edge of BCLKI (if another cycle is required), host interface module 310 drives start transfer cycle output signal STARTO-, BEO[3:0] and the next address, on the next rising edge of signal BCLKI, signal STARTO- is asserted and for data FIFO memory circuit 360 to system memory 230 transfers, data-out bus DO[31:0] is asserted on the next falling edge of bus clock BCLKI on the next rising edge of signal BCLK, signal STARTO- is de-asserted and signal EX32I- is sampled.

Figures 38A, 38B:
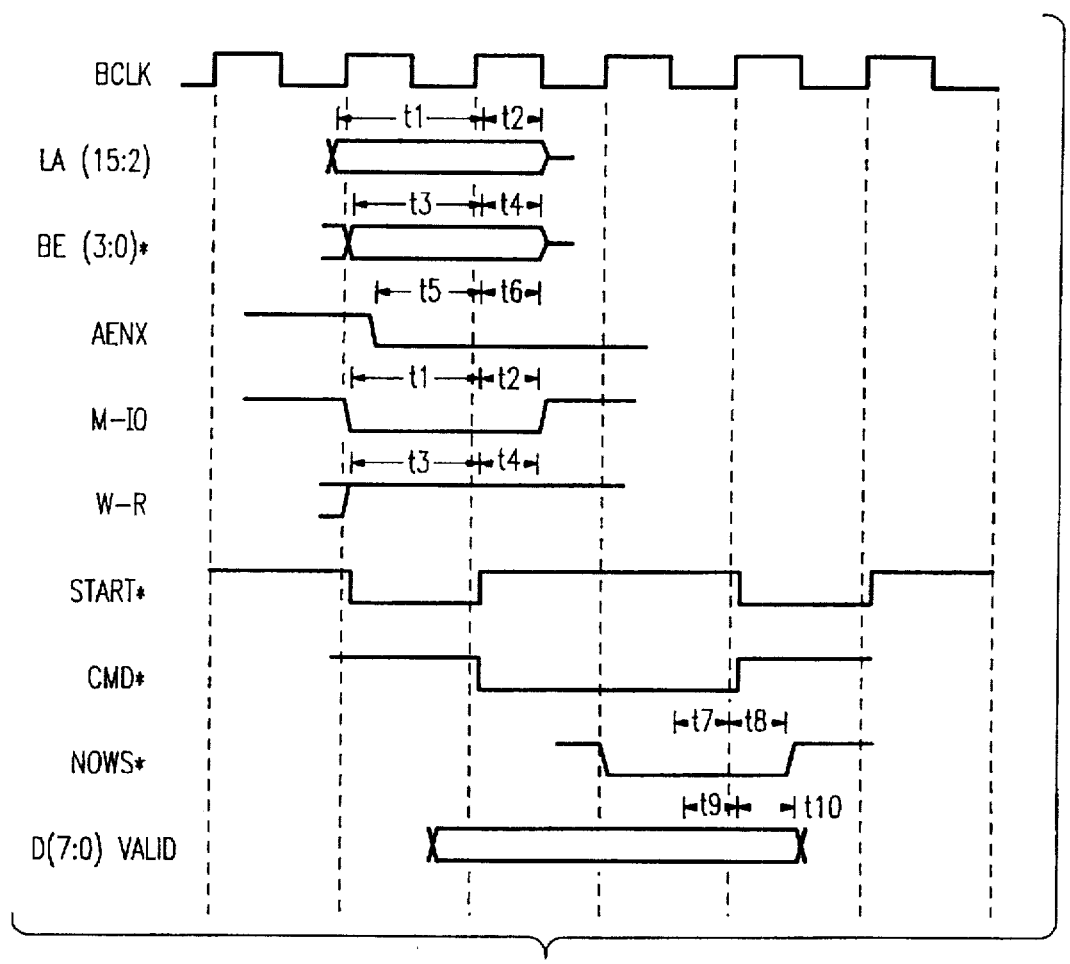
FIGS. 38A and 38B are a timing diagram and timing parameter description for an ISA I/O slave 8-bit write.

With host interface module 310 in I/O slave mode for an 8-bit write (FIGS. 38A and 38B), host interface module 310 samples for a valid host interface module I/O address on lines LAI[9:2] along with the deassertion of signal AENI, signal WRI and memory/IO data status input signal MIOI when start transfer cycle input signal STARTI-, is asserted to determine if host interface module 310 is being accessed for a read or write operation.

Write data status input signal WRI is asserted to indicate to the addressed slave that the EISA bus master is transferring data to a slave. Write data status input WRI is de-asserted to indicate to the addressed slave that the EISA bus master is transferring data from the slave. Host interface module 310 in EISA bus slave mode inputs data from data in bus DI[7:0] while write data status input signal WRI is de-asserted and command input signal CMDI- is asserted, and outputs data on DO[7:0] when data status input signal WRI is asserted and command input signal CMDI- is asserted. Write data status input signal WRI is driven from the same edge of bus clock BCLKI that results in the assertion of start transfer cycle input signal STARTI- and remains valid as long as the address on latched address input lines LAI[9:2] remains valid.

Memory/IO data status signal MIOI is pipelined from one cycle to the next and is asserted by a EISA bus master or the EISA system board to indicate the type of cycle in progress is a memory cycle. Memory/IO data status signal MIOI is de-asserted to indicate that the cycle in progress is an I/O cycle.

In EISA slave mode, only the input signals on line LAI[9:2] are latched for I/O address decoding along with address enable input AENI, the signals on byte enable input bus BEI[3:0]-, memory/IO data status input signal MIOI, and write data status input signal WRI on the trailing edge of start transfer cycle input signal STARTI-. The address on latched address input lines LAI[9:2] is valid before start transfer cycle input signal STARTI- is asserted and remains valid at least one half bus clock period after command input signal CMDI- is de-asserted.

The signals on byte enables input bus BEI[3:0]- are asserted by the EISA system board or a bus master to access host adapter 7770 as a bus slave. Host adapter 7770 decodes the signals to determine the state of signals on line LAI[1:0] for internal addressing

TABLE 28

| BEI- BIT 3 2 1 0 | LAI BIT 1 0 |
|---|---|
| 1 1 1 0 | 0 0 |
| 1 1 0 1 | 0 1 |
| 1 0 1 1 | 1 0 |
| 0 1 1 1 | 1 1 |

The EISA system board asserts command input signal CMDI- on the rising edge of bus clock BCLKI that causes deassertion of start transfer cycle input signal STARTI-. The system board holds command input signal CMDI- asserted for five bus clock periods for a normal 8-bit cycle.

Thus, for host adapter 7770 as an EISA I/O slave for an 8-bit unit, signal MIOI is deasserted to indicate that an I/O cycle is in progress. Start transfer output signal STARTI- is asserted and in response address enable input signal AENI is de-asserted. With signal STARTI- asserted and signals MIOI and AENI deasserted, host adapter 7770 opens it's slave control/address latch and samples for a valid I/O address on line LAI[9:2] and BEI[3:0]-. Since signal WRI is asserted to indicate a write, after one bus clock cycle, signal STARTI- is de-asserted, which asserts signal CMDI-. The slave/control latch is closed and maintains the sampled signals until signal STARTI- is asserted again.

Host interface module 310 asserts no wait state output signal NOWSO- when responding as an 8-bit slave to shorten the standard six bus clock periods I/O cycle to three bus clock period I/O cycle for EISA modes. Host interface module 310 latches the 8-bit data value received from data in bus DI[7:0] into the addressed register with the deassertion edge of command input signal CMDI- for I/O cycles.

Figures 39A, 39B:
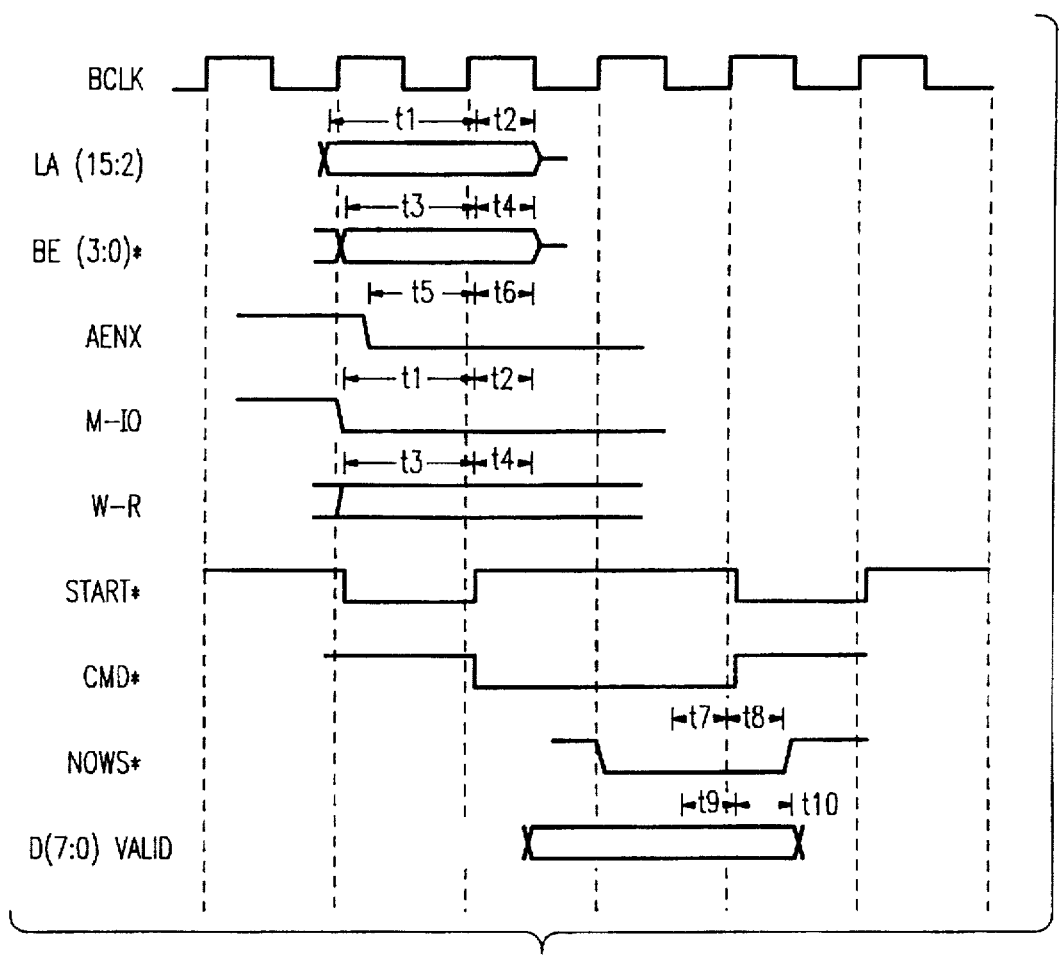
FIGS. 39A and 39B are a timing diagram with timing variations for an ISA I/O slave 8-bit read.

An EISA I/O slave 8-bit read is substantially the same as the write process when the differences in direction and the assertion and de-assertion of write data status input signal WRI, memory/IO data status input signal MIOI, and address enable signal AENI, as described above are considered. Therefore, the timing of the EISA I/O slave 8-bit read, as illustrated in FIGS. 39A and 39B, is not considered in further detail.

Figure 40:
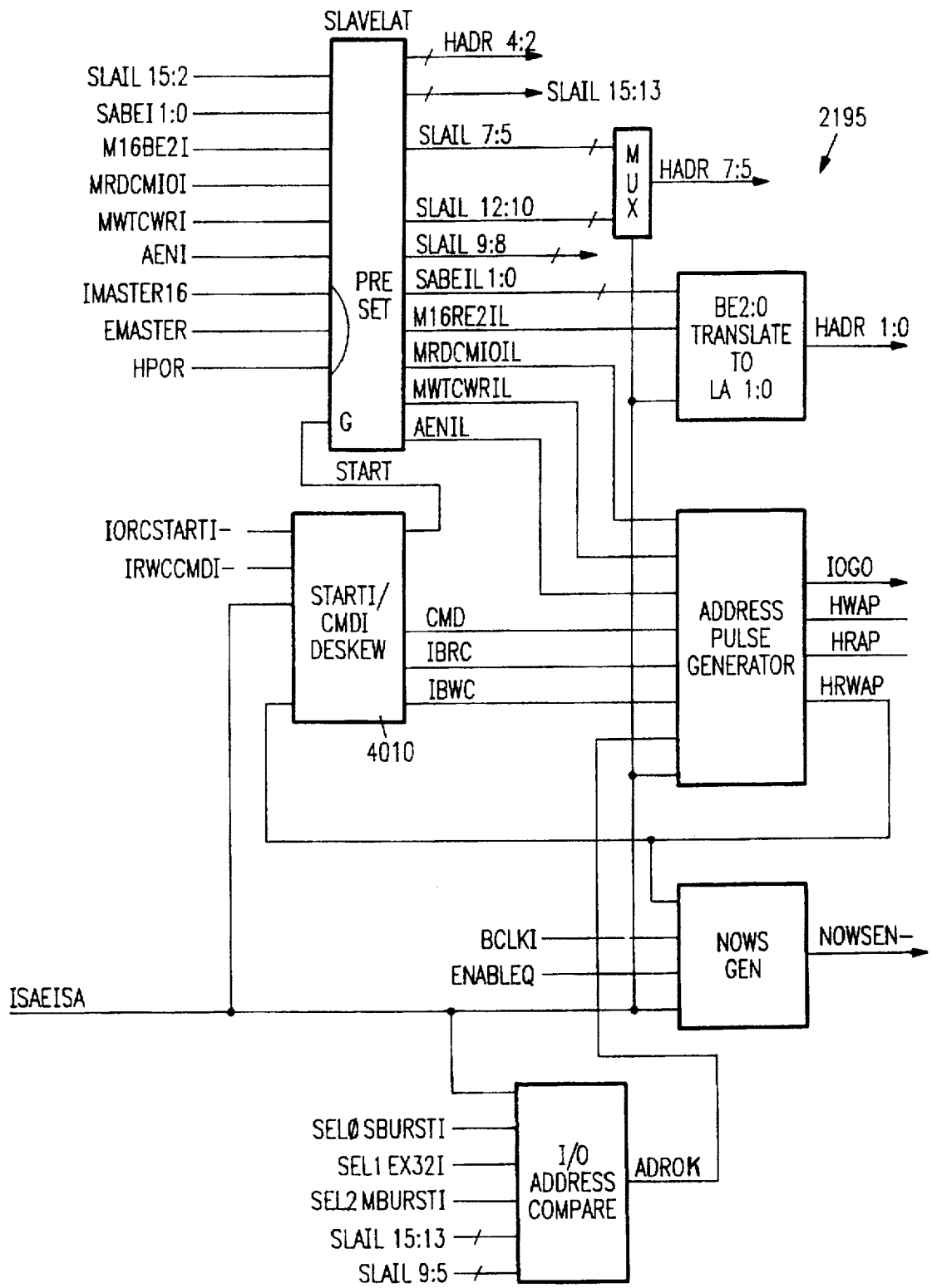
FIG. 40 is a block diagram for the slave control circuit within the host interface module of this invention and in particular the deskew circuit for signals STARTI- and CMDI-.

Host adapter 7770 can operate at high speeds. The EISA specification allows some overlap in signals STARTI- and CMDI-. At high speeds, this overlap may result in writing to an erroneous address. Therefore, slave control circuit 2915, as illustrated in more detail in FIG. 40, includes a STARTI/CMDI deskew circuit 4010. A detailed schematic of this circuit is presented on Microfiche Appendix B.

In deskew circuit 4010, signal STARTI- which is the same as signal IORCSTARTI-, is interlocked with signal CMDI-, which is the same as signal IOWCCMDI-, such that the first signal of the two that is asserted locks out the other signal until the first signal is de-asserted. Thus, the possibility of erroneous I/O read or write operations caused by the overlap of signals STARTI- and CMDI- has been eliminated.

Figures 41A, 41B:
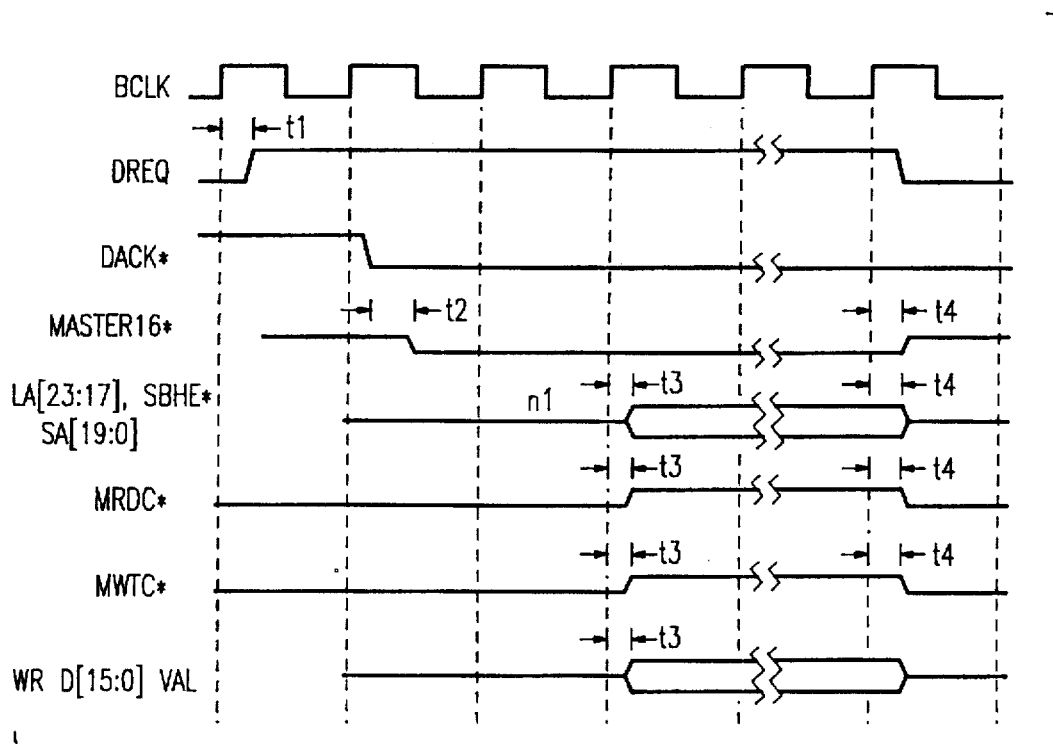
FIGS. 41A and 41B are a timing diagram for an ISA bus master arbitration.

DMA request output signal DRQO (FIGS. 41A and 41B) is asserted by host interface module 310 to request ISA system board DMA transfers on the ISA computer bus. Host interface module 310, in ISA mode, asserts DMA request output signal DRQO for system memory 230 to data FIFO memory circuit 360 transfers, i.e., bits HDMAEN and DIRECTION in register DFCNTRL are active, when bit DFTHRSH or bit FIFOEMP become active and bus-off times BOFF i.e., bits BOFF0 to BOFF3 in register BUSTIME has expired. In this case, signal DRQO remains asserted until bit DFSDH or bit FIFOFULL becomes active, as long as bit HDMAEN is active, host counter HCNT (herein, "register HCNT" is used as a shorthand notation for registers HCNT0 to HCNT2) is not zero and bus on time BON has not expired.

Bit DFTHRSH from data FIFO memory circuit 360 activates DMA request output signal DRQO when data FIFO memory circuit 360 reaches the selected threshold level.

Host interface module 310 in ISA bus master mode asserts DMA request output DRQO for data FIFO memory circuit 360 to system memory 230 transfers, i.e., bit HDMAEN is active bit DIRECTION, is inactive when bit DFTHRSH, DFSXDONE, or FIFOFULL become active and bus-off time BOFF has expired. In this direction, bit DFTHRSH is forced active by the setting of bit DFSXDONE or bit FIFOFLUSH. Bit DFTHRSH remains active until bits FIFOEMP or bit HCNTZ goes active. However, the FIFOEMP status does not stop host transfers, it only blocks more reads from the data FIFO memory. MLATEMP stops the host transfer (the last read from the data FIFO memory caused bit FIFOEMP to become active). The data from the data FIFO memory is in MDLAT and the flushing action cannot be stopped until all the data in MDLAT is sent to system memory 230.

In this case, DMA request output signal DRQO remains asserted until bit FIFOEMP is active and all the bytes in the last data FIFO read have been transferred to the system as long as bit HDMAEN is active, register HCNT is not zero and the time period stored in bits BON [3:0] of register BUSTIME has not expired. In either direction signal DRQO is not de-asserted until at least one data transfer has been completed. DMA request output signal DRQO is asserted and deasserted, synchronized to the falling edge of bus clock BCLKI to meet setup and hold time to the sampling point for proper system operation. Host interface module 310 in ISA mode waits for the time period stored in bits BOF[3:0] of register BUSTIME between deasserting DMA request output signal DRQO and again asserting DMA request output signal DRQO. DMA request output signal DRQO is not used in EISA mode.

DMA acknowledge input signal DAKI- is asserted by the ISA system board to acknowledge the grant of the ISA system board DMA controller channel to host interface module 310 in reply to DMA request output signal DRQO being asserted by host interface module 310. Host interface module 310 asserts a signal on master 16-bit data status output line MASTER160- after detecting DMA acknowledge input signal DAKI- asserted to cause the system board DMA controller to release the ISA system bus to host interface module 310 as an ISA bus master. After waiting one bus clock period and an ISA turn-on time, host interface module 310 may drive latched address output lines LAO [23:17], system address output lines SAO[19:0], system byte high enable output signal SBHEO-, data out bus DO[15:0], memory read command output signal MRDCO- and memory write command output signal MWTCO- to perform bus transfers. DMA acknowledge input signal DAKI- is not used in EISA mode.

Host interface module 310 immediately stops driving drive latched address output lines LAO[23:17], system address output lines SAO[19:0], system byte high enable output signal SBHEO-, data out bus DO[15:0], memory read command output signal MRDCO- and memory write command output signal MWTCO- when signal DAKI- is deasserted.

Host interface module 310 in ISA mode, asserts the signal on master 16-bit data status output line MASTER160- in response to the ISA system board asserting DMA acknowledge input signal DAKI- to obtain bus master status from the ISA system board DMA engine. Host interface module 310 waits until the expiration of an ISA turn-on delay before driving lines LAO[23:17], SAO[19:0], SHBEO-, MRDCO-, and MWTCO-, which are described more completely below.

The signals on lines MASTER160-, LAO[23:17], SAO [19:0], SHBEO-, MRDCO-, and MWTCO- are deasserted and/or tri-stated immediately when the ISA system board deasserts signal DAKI-.

In host interface module 310 ISA bus master mode, latched address output lines LAO[23:17] provide an address for system memory 230 and are driven one bus clock period after DMA acknowledge input signal DAKI- is asserted and on ISA turn-on time expires. The address is valid before, during, and after memory read command output signal MRDCO- or memory write command output signal MWTCO- signal is asserted. Latched address output lines LAO[23:17] are tri-stated at the same time that DMA request output signal DRQO is deasserted.

In host interface module 310 ISA master mode, system address output lines SAO[19:17], SAO16, SAO[15:12], SAO[11:2], SAO[1:0] are part of ISA system address output bus SAO[19:0]. The signals on system address output bus SAO[19:0] are latched by host interface module 310 for addressing system memory. System address output bus SAO[19:0] is driven one bus clock period plus the ISA turn-on time after sampling DMA acknowledge input signal DAKI- asserted, and the signals are valid before, during, and after memory read command output signal MRDCO- or memory write command output signal MWTCO- is asserted. In host interface module 310 ISA bus master mode, system address output bus SAO[19:0] is tri-stated at the same time signal DAKI- is deasserted. System address output bus SAO[19:0] is not used by host interface module 310 in EISA mode.

System byte high enable output signal SBHEO- is asserted to indicate that a data transfer is to be made on bits DO[15:8] of 16-bit ISA data out bus DO[15:0]. In host interface module ISA master mode system byte high enable output signal SBHEO- is latched by host interface module 310 for addressing memory. System byte high enable output signal SBHEO-is driven after the ISA turn-on delay and after sampling DMA acknowledge input signal DAKI- asserted, and is valid before, during and after memory read command output signal MRDCO- or memory write command output signal MWTCO- is asserted. System byte high enable output signal SBHEO- is tri-stated at the same line as signal DAKI- is de-asserted. System byte high enable output signal SBHEO- is not used by host interface module 310 in EISA mode Host interface module 310, in ISA mode as a bus master, asserts memory read command output signal MRDCO- to indicate to the addressed ISA memory slave to drive its data onto the ISA data bus and hold the data valid until after memory read command output signal MRDCO- is deasserted. The assertion and deassertion periods of memory read command output signal MRDCO- are determined by the value stored in register BUSSPD. When ISA channel ready input signal CHRDYI is deasserted (FIGS. 42A and 43A) while memory read command output signal MRDCO- is asserted, host interface module 310 extends memory read command output signal MRDCO- until after ISA channel ready input signal CHRDYI is asserted, plus one to two 40 MHz host clock periods. Signal CHRDYI is only sampled at the end of signals MRDCO- or MWTCO- less 50 ns. If signal CHRDY is deasserted before this and then reasserted before the sampling period, the cycle is not extended.

Host interface module 310, in ISA mode as a bus master, asserts memory write command output signal MWTCO- to indicate to the addressed ISA memory slave to latch valid data from the ISA data bus on the de-assertion edge of memory write command output signal MWTCO-. In ISA bus master mode, memory write command output signal MWTCO- is driven after host interface module 310 samples DMA acknowledge input signal DAKI- asserted and the ISA turn-on delay has expired. Memory write command output signal MWTCO- is tri-stated at the same time DMA acknowledge input signal DAKI- is de-asserted. The assertion and deassertion periods of memory write command output signal MWTCO- are determined by the values stored in register BUSSPD. When ISA channel ready input signal CHRDYI is deasserted while memory write command output signal MWTCO- is asserted, host interface module 310 extends memory write command output signal MWTCO- until after ISA channel ready input CHRDYI is asserted, plus one to two 40 MHz host clock periods.

When host adapter 7770 is functioning as an ISA bus master, memory 16-bit status input signal M16I- is active when an addressed memory slave is capable of performing 16-bit data transfers. Host interface module 310 assumes that all ISA memory slaves can perform 16-bit data transfers and ignores the assertion state of memory 16-bit status input signal M16I- except when the data transfer is within the ISA video RAM address range of 0BFFFF:0A0000 which is reserved for the graphics display buffer. When the transfer is within this address range, the data width is 16-bit data on data-in bus DI[15:0] and data-out bus DO[15:0] when memory 16-bit status input signal M16I- is asserted, (FIGS. 42A and 42B) and 8-bit data on data out bus DO[7:0] and data in bus DI[7:0] when memory 16-bit status input signal M16I- is deasserted (FIGS. 43A and 43B) so that existing ISA 8-bit display boards may be supported by host interface module 310.

In ISA bus master mode, host interface module 310 write data bus lines DO[7:0] are driven after sampling DMA acknowledge input signal DAKI- asserted and an ISA turn-on delay has expired. Valid data is asserted prior to memory write command output signal MWTCO- being asserted and remains valid until after memory write command output signal MWTCO- is deasserted. In ISA bus master mode, host interface module write data out lines DO[7:0] are tri-stated when no more transfer cycles are required and signal DAKI- is deasserted. In ISA bus master mode, host interface module read data input lines DI[7:0] are sampled at the rising edge of memory read command output signal MRDCO- being deasserted.

Data out line DAO[15:8] are the high 8-bits of a 16-bit data word. Host interface module 310, as a 16-bit ISA bus master, uses data out lines DO[15:8] to output the high half of a 16-bit data word when system byte high enable output signal SBHEO- is asserted. The timing for signals on data out lines DO[15:8] is the same as described for data out lines DO[7:0] and is used in both ISA master modes except for ISA transfers within the video RAM address range when memory 16-bit status input signal M16I- is not asserted.

In ISA mode, data out lines DO[31:24] and DO[23:16] are not used or connected and are constantly enabled and asserted to supply self termination to lines DI[31:24] and DI[23:16].

Host interface module 310, in ISA mode, as an active bus master extends the assertion of command signals, i.e., memory read command output signal MRDCO- or memory write command output signal MWTCO-, while the signal on ISA channel ready input line CHRDYI is deasserted plus at least one to two 40 MHz host clock periods after sensing that the signal on ISA channel ready input line CHRDYI is asserted. The signal on line CHRDYI may not be deasserted for more than 2.1 μs in this embodiment so that refresh cycles for system memory are not affected. Line CHRDYI is not used in host interface module EISA mode or in ISA slave mode.

Address enable input signal AENI is deasserted before, during, and after signal IORCI- or signal IOWCI- is asserted. Address enable input signal AENI is driven by the ISA system board. Address enable input signal AENI is referenced to input pad AEN.

Figures 44A, 44B:
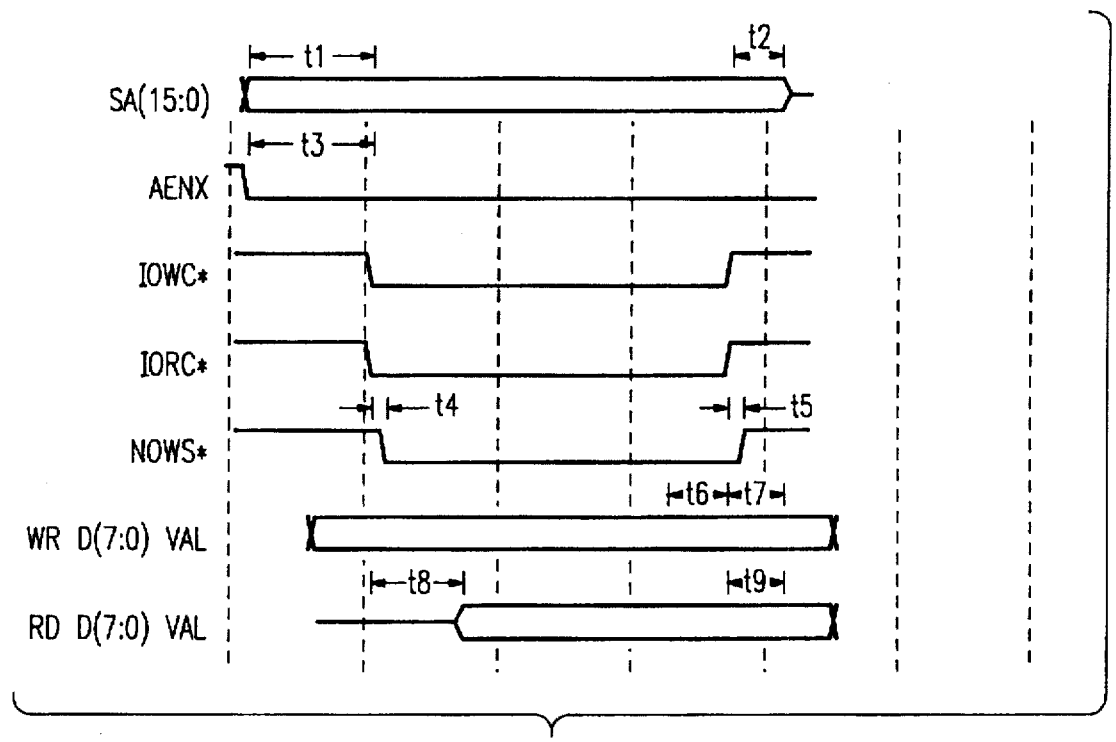
FIGS. 44A and 44B are a timing diagram with timing parameter variations for an ISA I/O slave for an 8-bit read/write transfer.

With host interface module 310, in ISA I/O slave mode for 8-bit write or read (FIGS. 44A and 44B), host interface module 310 samples for a valid host interface module I/O address on system address input lines SAI[15:0] along with the deassertion of address enable input signal AENI. The address on system address input lines SAI[15:0] is valid before, during, and after the assertion of either I/O write command input signal IOWCI- or I/O read command input signal IORCI-.

I/O write command input IOWCI- is generated by host interface module 310 in ISA slave mode after decoding a valid I/O address for the current value of I/O select lines IOSELI[2:0] with address enable input signal AENI deasserted. Host interface module 310 latches the 8-bit data value received from data in lines DI[7:0] into the addressed host interface module register with the deassertion edge of I/O write command input signal IOWCI-. Host interface module 310 always asserts no-wait state output signal NOWSO- to request a shortened the I/O cycle.

I/O select signals IOSELI[2:0] provides a means to select the primary I/O decode address range that is active when host interface module 310 is in ISA mode. The selection used depends on the combination of expansion boards installed in host computer system along with the board containing host adapter 7770. The signals on lines IOSELI [2:0] may be coded for selection with jumpers/switches or a board configuration register. Lines IOSELI[2:0] are host interface module 310 only control signals and are not defined in the ISA bus. Lines IOSELI[2:0] are not used in host interface module EISA mode.

I/O read command input signal IORCI- is generated by host interface module 310 in ISA mode, after decoding a valid I/O address for the current values of I/O select lines IOSELI[2:0] with address enable input signal AENI deasserted. Host interface module 310 drives the internally addressed 8-bit data onto data out lines DO[7:0] in response to I/O read command input signal IORCI- being sampled asserted and hold the data valid until I/O read command input signal IORCI- is deasserted. Host interface module 310 always asserts no-wait state output signal NOWSO- to request a shortened I/O cycle. I/O read command input signal IORCI- is not used by host interface module 310 in EISA mode. While I/O read command input signal IORCI- is asserted, data out lines DO[7:0] are in the driven state.

Figure 45A:
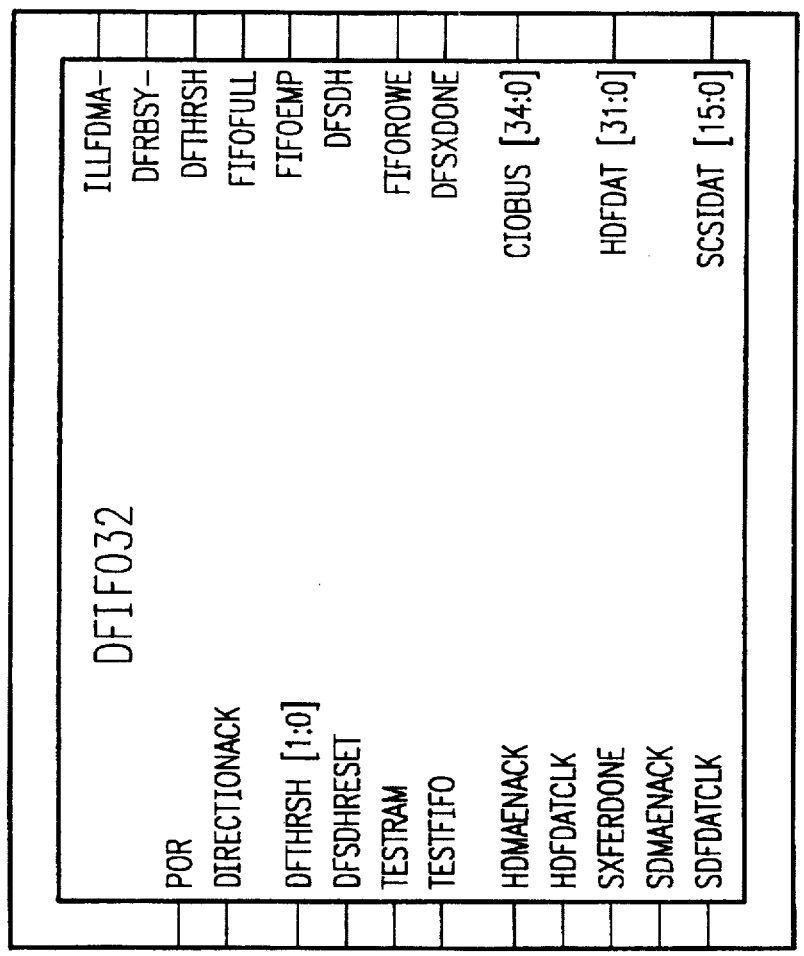
FIG. 45A is an illustration of the signal interface for the data FIFO memory circuit of this invention.
Figures 1, 45B:
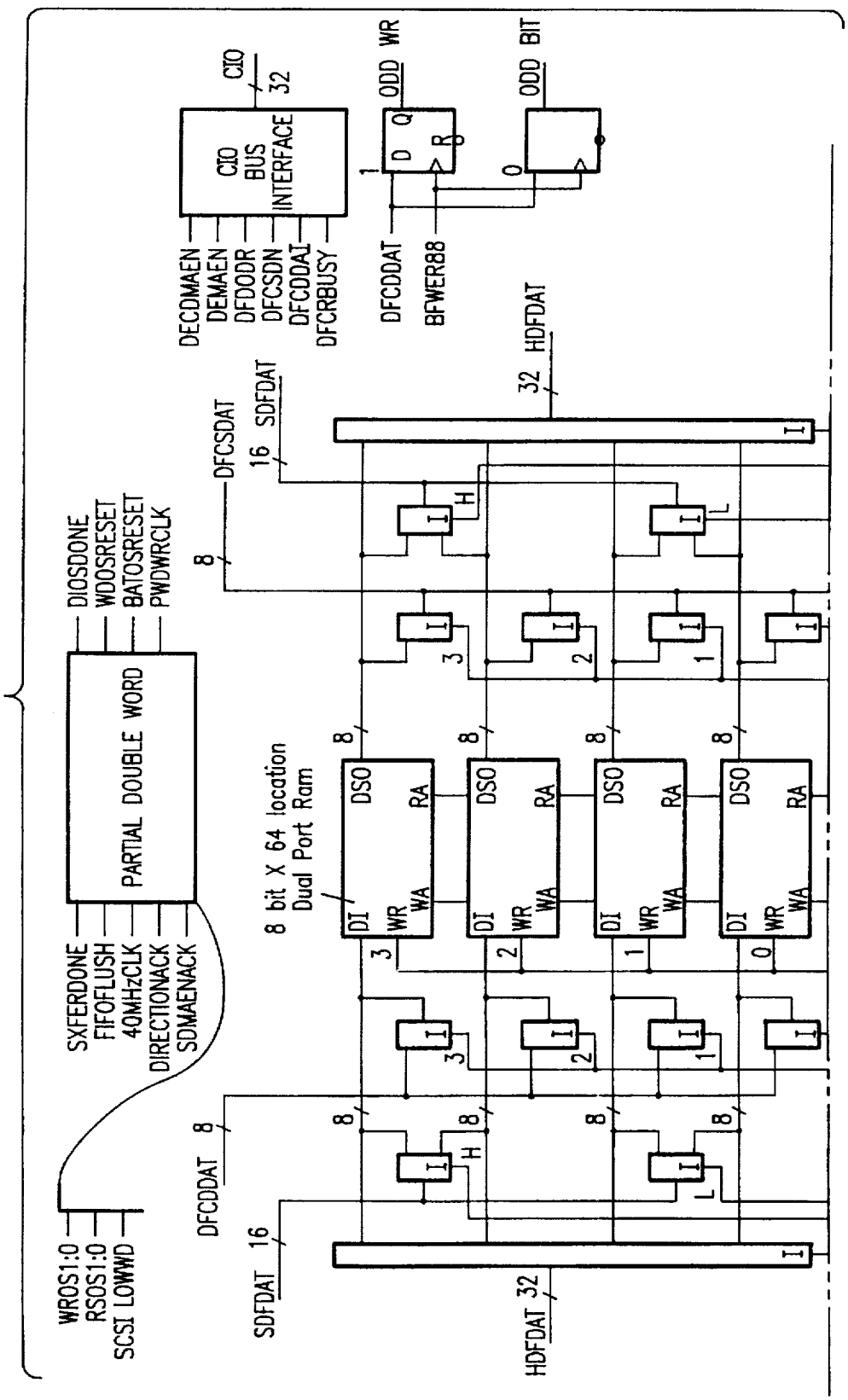
FIG. 45B, which is a key to FIGS. 45B-1, 45B-2, and 45B-3, is a block diagram of the data FIFO memory circuit of this invention.
Figures 2, 45B:
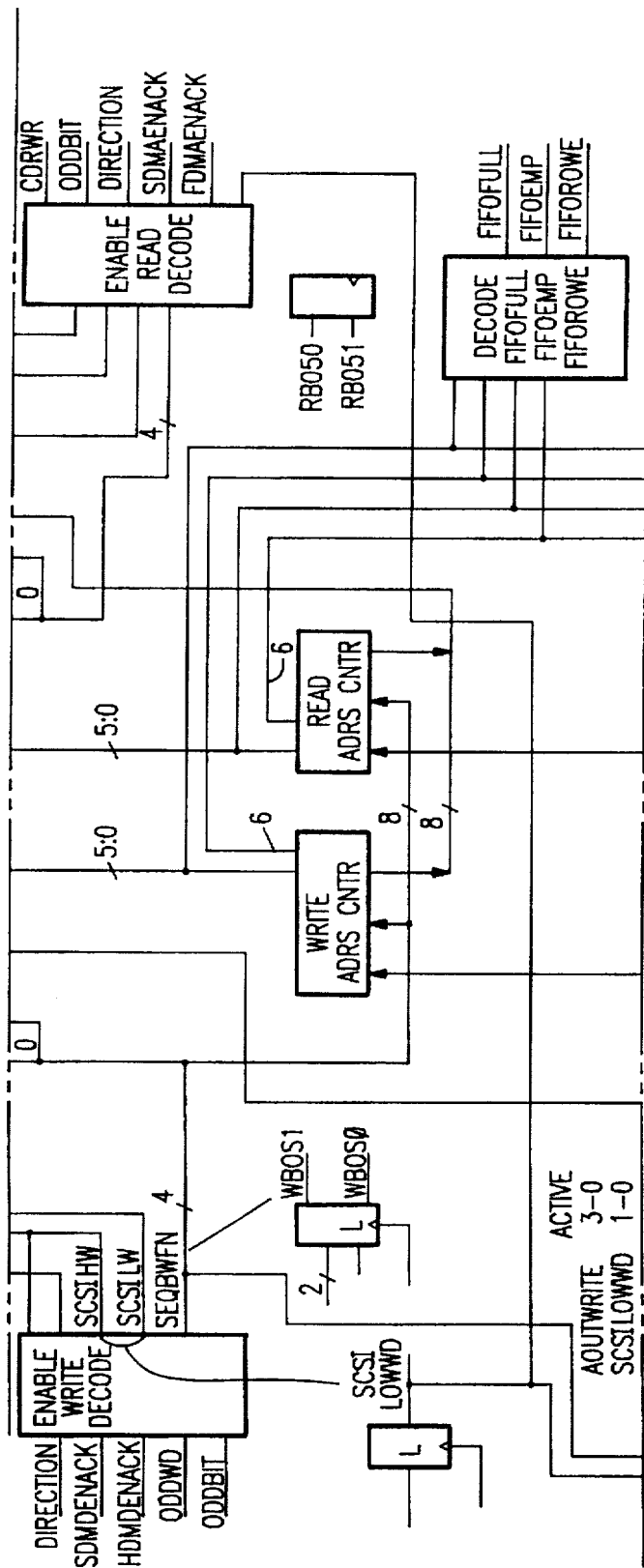
Figures 3, 45B:
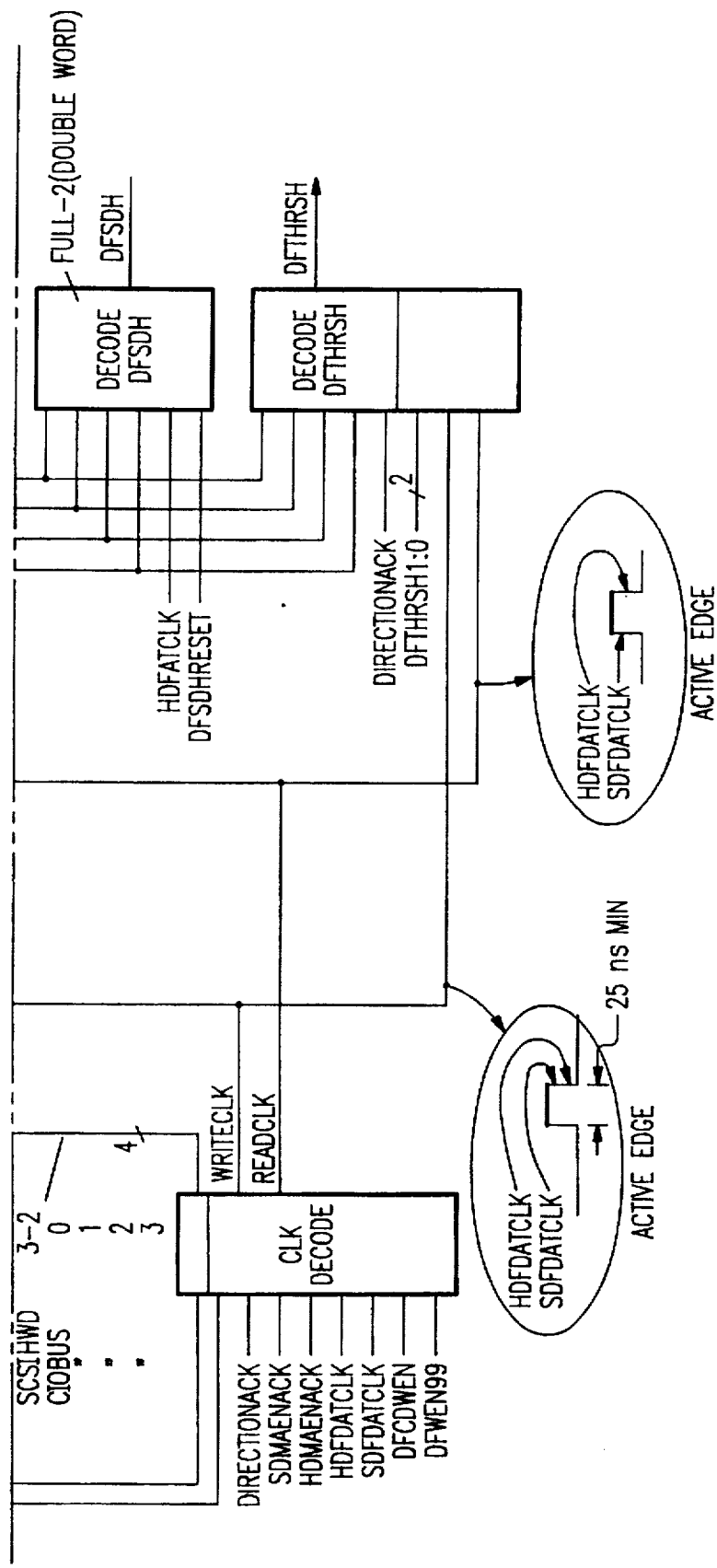

FIG. 45A is a signal interface of data FIFO memory circuit showing the input and output signals. Data FIFO memory circuit 360 contains a 32×64 data FIFO. I/O read and write decode circuitry, threshold level selection circuitry, and data FIFO status decode circuitry. The data FIFO is a dual port write to read (both same address) pass thru block. Data FIFO memory circuit 360 has an 80 MByte data path rate in this embodiment. FIG. 45B is a more detailed block diagram of data FIFO memory circuit. The circuit includes four 8×64 dual port RAMs, read and write address circuitry. A more detailed schematic diagram is given in Microfiche Appendix B and is incorporated herein by reference.

Data-FIFO data bus HDFDAT[31:0] is a 32-bit input/output data bus used for transferring data to and from host latch MDLAT32 from and to data FIFO memory circuit 360. Data is read from bus HDFDAT[31:0] by data FIFO memory circuit 360 when bit DIRECTION in register DFCNTRL is active and written to bus HDFDAT[31:0] when bit DIRECTION is inactive.

Specifically, when bits HDMAENACK and DIRECTION are active, system memory data is temporarily stored in MDLAT32 (FIG. 30A) for assembly into 32-bit doublewords and then transferred to the data FIFO memory. When bit HDMAENACK is active and host bit DIRECTION is inactive, 32-bit data from the data FIFO memory is prefetched and temporarily stored in MDLAT32 (FIG. 30B) and then transferred to system memory.

SCSI data bus SCSIDAT[15:0] is used to transfer data between data FIFO memory circuit 360 and SCSI module 330. Data is written to SCSI data bus SCSIDAT[15:0] by data FIFO memory circuit 360 when bit DIRECTION in register DFCNTRL is active and read from SCSI data bus SCSIDAT[15:0] when DIRECTION is inactive.

DFIFO empty signal FIFOROWE indicates that the data FIFO memory is in a byte empty status. This signal is used by sequencer 320 or host adapter driver 260 to determine when the data FIFO memory contains data.

DFIFO stored data high reset signal DFSDHRESET only becomes active when signal DFSDH is active and signals DRQ/MREQ are de-asserted. It is clocked by the rising edge of bus clock BCLK1 for EISA and the falling of clock HCLKM for ISA. When active, this signal forces signal DFSDH to become inactive.

CIOBUS[34:0] is used for I/O decodes and to provide source and destination addresses for data FIFO write address registers DFWADDR[1:0] and data FIFO read address registers DFRADDR[1:0] which are contained in data FIFO memory circuit 360.

Lines DFTHRSH[1:0], DIRECTIONACK, TESTRAM, TESTFIFO, HDMAENACK, and SDMAENACK are driven by the corresponding bits in the registers described in Appendix II. Host interface module data-FIFO clock HDFDATCLK is a control output line from host interface module 310 that when pulsed high, the falling edge changes the value of write address registers DFWADDR[1:0] and data FIFO read address registers DFRADDR[1:0] so that the data FIFO advances to the next 32-bit location. Host interface module data-FIFO clock HDFDATCLK is used for reading and writing to the data FIFO with the signal on line DIRECTIONACK selecting the proper operation.

SCSI data-FIFO clock SDFDATCLK is a control output line from SCSI module 330 that when pulsed high, the falling edge changes the value of write address registers DFWADDR[1:0] register and the rising edge changes the value of the data FIFO read address registers DFRADDR [1:0] so that the data FIFO advances to the next 32-bit location. SCSI module data-FIFO clock SDFDATCLK is used for reading and writing to the data FIFO with the signal on line DIRECTIONACK selecting the proper operation.

Power-on reset signal POR was described above, and that description is incorporated herein by reference. The signal on line ILLFDMA is active when an improper attempt has been made to access data FIFO memory circuit 360.

Line DFRBSY- is an output status signal that indicates I/O data is being transferred from a data FIFO memory circuit RAM or register. Line DFTHRSH is an output signal status that is driven by DFTHRSH decode circuit. This signal is used by host interface module to set MREQPEN and start a request for bus 226. Signal DFTHRSH may also be read in register DFSTATUS. Similarly, lines FIFOFULL and FIFOEMP are status output signals that drive the corresponding bits in register DFSTATUS and are used by both host interface module 310 and SCSI module 330 for DMA.

The signal on DFIFO threshold status line DFTHRSH is driven active when the quantity of data words stored in the data FIFO equals the value selected by the signals on lines DFTHRSH[1:0] from the corresponding bits in register BUSSPD. When the signal on line DFTHRSH is active, host interface module 310 requests system bus master status, providing bit HDMAEN is active, the value of counter HCNT is not zero, and in ISA mode that time BOFF has expired, to either empty the data FIFO for transfers to system memory 230 or to fill the data FIFO for transfers from system memory 230.

Data FIFO full status line FIFOFULL is driven active when all word positions in the data FIFO contain data. Data must not be written to the data FIFO when the signal on line FIFOFULL is active. The current full position for normal operation in the data FIFO changes depending on the number of data words read from the data FIFO prior to writing to it.

Data FIFO empty status line FIFOEMP is driven active when no data is stored in the data FIFO. Data must not be read from the data FIFO when the signal on line FIFOEMP is active. The current empty position for normal operation in the data FIFO changes depending on the number of data words written to the data FIFO prior to reading it.

Data FIFO stored data high line DFSDH is driven active only when the data FIFO is two doublewords short of being full. The active signal indicates to the ISA/EISA bus master control logic that data FIFO space is available for only two more 32-bit read transfers from system memory 230. Since this status is sampled only by clock DFDATCLK, when host interface module 310 gets off bus 226 due to a preempt with this line active, a new request to get back on bus 226 is preempted until bit DFSDH is cleared. Host interface module 310 senses this condition and clears this bit.

Threshold level selection circuitry receives as input data, the addresses from registers DFWADDR0 and DFRADDR0, and the signals on lines DIRECTIONACK and DFTHRSH[1:0]. Data FIFO threshold status bit DFTHRSH is set when the threshold level selection circuitry detects that the threshold specified by the signals on lines DFTHRSH[1:0] is reached. As explained above and incorporated herein by reference, data FIFO threshold status bit DFTHRSH is used to regulate requests for control of computer bus 226 so that the bus is used effectively.

Hence, the value stored in bits DFTHRSH[1:0] determines the quantity of 32-bit data words stored in the data FIFO that activate bit DFTHRSH. Table 28A demonstrates when data transfers are initiated for various threshold level as indicated by bits DFTHRSH[1:0].

TABLE 28A

| DFTHRSH [1:0] | TRANSFER DFIFO to SYS | | TRANSFER SYS to DFIFO | |
|---|---|---|---|---|
| | START | STOP | START | STOP |
| 00 | 4 DOUBLE WORDS* | EMPTY+*** | FULL- (4 DOUBLE WORDS)* | FULL++ |
| 01 | 50% FULL* | EMPTY+*** | 50% EMPTY* | FULL++ |
| 10 | 75% FULL* | EMPTY+*** | 75% EMPTY* | FULL++ |
| 11 | FULL** | EMPTY+*** | EMPTY*** | FULL++ |

*Status DFTHRSH active
**Status FIFOFULL active
***Status FIFOEMP active
+Initial start is when HDMAEN becomes active
++Status DFSDH active For a 32-bit data FIFO containing 64 doublewords, status bit DFTHRSH is driven active for data FIFO to system memory 230 transfers at stored doubleword levels of 4, 32, 48 and 64, which correspond to threshold settings of 00, 01, 10, and 11, respectively, and for system memory 230 to data FIFO transfers at stored doubleword levels of 60, 32, 16, 0, which correspond to threshold settings of 00, 01, 10, and 11, respectively. The signal on status line DFSDH is active only when the specified doublewords are stored.

Data transfer between SCSI bus 210 and host computer bus 226 using data FIFO memory circuit 360 is enabled by sequencer 320 using CIOBUS[34:0] to set register bits in SCSI module 330 and host interface module 310 with regard to direction, pointers and count values. The data FIFO in data FIFO memory circuit 360 is preferably cleared using bit FIFORESET. Setting bit FIFORESET clears data FIFO address registers DFWADDR and DFRADDR to zero and loads word and byte offset counters with the values stored in ODDWORD and ODDBYTE memories. These are latched when register HADDR0 is loaded with the new start address. After bit FIFORESET is set, bits HDMAEN, SDMAEN, and SCSIEN in register DFCNTRL are set to one. Data transfers are disabled by clearing any of bits HDMAEN, SDMAEN, and SCSIEN, but the state of these bits is polled for a zero value before the transfers are guaranteed to have stopped.

Setting DMA enable bit SDMAEN enables SCSI module 330 to transfer data to or from the data FIFO in data FIFO memory circuit 360. The value of bit SDMAEN directly controls the host interface module internal interface output line SDMAEN. However, the read value of bit SDMAEN-ACK reflects the state of the host interface module internal interface input line SDMAENACK which is driven active by SCSI module 330 after SCSI module 330 has entered the state requested by setting bit SDMAEN. No delay in dropping bit SDMAENACK is expected when writing to set but SDMAEN active. However a delay may be expected when writing to set bit SDMAEN inactive as a transfer between SCSI module 330 and data FIFO memory circuit 360 may be in progress and must be completed prior to exiting the active state of bit SDMAEN.

Setting data FIFO enable bit HDMAEN active enables host interface module 310 to request system board bus master status to transfer data between data FIFO memory circuit 360 and system memory 230 through the host interface module external interface 315. Data FIFO transfer byte counter HCNT[2:0] is pre-loaded with the length of the transfer by sequencer 320 using the data in the current SCB prior to setting bit HDMAEN active. Setting bit HDMAEN inactive prior to the count in data FIFO transfer byte counter HCNT[2:0] reaching zero halts data transfers without loss of data, status, address or byte count for either system memory 230 to data FIFO or data FIFO to system memory 230 transfers. Data transfer may be continued after halting by setting bit HDMAEN active. Delay may be expected in the host interface module internal interface output line HDMAENACK when changing bit HDMAEN to the active state if the state of bit DIRECTION is also changed. Delay may also be expected in the host interface module internal interface output line HDMAENACK changing bit HDMAEN to the inactive state when bit HDMAENACK is set inactive, as a transfer cycle may be in progress between the host interface module external interface (system memory) and the data FIFO that must be completed prior to exiting the active state of bit HDMAEN. The read value of the bit HDMAENACK reflects the state of the host interface module internal interface output line HDMAENACK.

While bit HDMAENACK is in the active state, no I/O write accesses may be made to host address registers HADDR[3:0], host byte counter HCNT[2:0], data FIFO write address registers DFWADDR[1:0], or data FIFO read address registers DFRADDR[1:0]. No I/O read access may be made to register DFDAT while bit DIRECTION is inactive. No I/O write access may be made to register DFDAT while bit DIRECTION is active.

Figure 46:
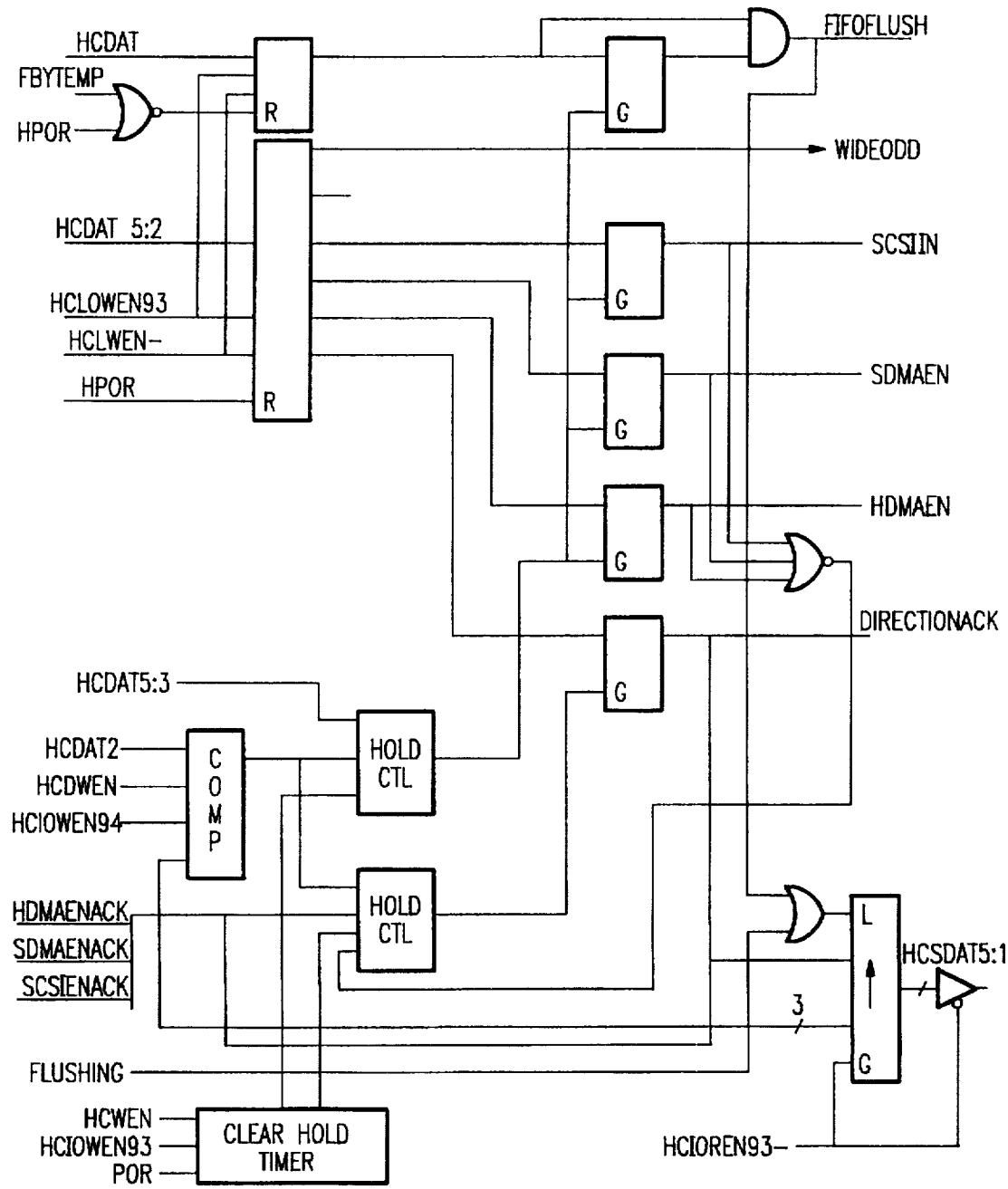
FIG. 46 is a block diagram of the control register with hold control so that signals are not inadvertently changed during a data transfer.

The state of the host interface module internal interface signal DIRECTION may not be changed immediately by I/O writes to register DFCNTRL. FIG. 46 is a block diagram of the circuitry that prevents change of signal DIRECTION until the appropriate time. The written data is stored in register DFCNTRL write bit DIRECTION but the requested change in direction is delayed until read bits SCSIENACK, SDMAENACK and HDMAENACK in register DFCNTRL are in the inactive state. The hold control circuits do not gate the latches driving lines FIFOFLUSH, WIDEOFF, SCSIEN, SDMAEN, HDMAEN or direction until the conditions described below are satisfied.

An I/O write, that happens to change the state of the bit DIRECTION bit and in the same access changes the states of bits SCSIEN, SDMAEN and HDMAEN to inactive, causes the change of the state of bit DIRECTIONACK to be delayed until host interface module internal interface signals SCSIENACK, SDMAENACK and HDMAENACK are in the inactive state.

An I/O write, that changes the state of bit DIRECTION bit to the desired state, and in the same access changes the state of bits SCSIEN, SDMAEN and/or HDMAEN from the inactive state to the active state, causes the host interface module internal interface signal DIRECTION to change without delay and cause host interface module internal signals SCSIEN, SDMAEN, HDMAENACK that are set active to be delayed in changing to the active state to allow logic that utilizes signal DIRECTIONACK to stabilize in it's new state.

An I/O read of bits SCSIENACK, SDMAENACK, HDMAENACK and DIRECTIONACK in register DFCNTRL reflects the current state of host interface module internal interface signals SCSIENACK, SDMAENACK, HDMAENACK and DIRECTIONACK. The value is affected by the most recent write data value, the previous state of the bits prior to that write and the operational activity in the modules receiving these signals.

This special register control action allows burdensome firmware to be eliminated from the sequencer firmware. This gives more space for other circuitry or other firmware and consequently enhances the performance of host adapter 7770.

The data FIFO may be read at any time or written when no other DMA activity is writing to the data FIFO. Any attempt to enable two sources to write to the data FIFO results in an interrupt BRKADRINT. There are three sources which may read or write the data FIFO: (i) the SCSI data transfer port, (ii) the host interface module data transfer port, and (iii) the I/O port register DFDAT.

Read data is pointed to by data FIFO read address register DFRADDR0 and write data is pointed to by data FIFO write address register DFWADDR0. Both of these pointers point to 32 bit doublewords. Data is properly aligned in conjunction with the state of bits HADDR(00) and HADDR(01) in host address register HADDR0. When bits HADDR(00) and HADDR(01) are set, sequencer 320 sets bit FIFORESET, bit 0 in register DFCNTRL, to clear FIFO address counters DFRADDR0 and DFWADDR0, sometimes called data FIFO read address register DFRADDR0 and data FIFO write address register DFWADDR0, and to load the word and byte offset pointers. The byte offset is decoded from bits HADDR(00) and HADDR(01) and the word offset from register HADDR1.

Normal data transfer does not require any intervention from sequencer 320. The correct offset is set up automatically when the host computer memory address is loaded in registers HADDR and bit FIFORESET is set. Counter DFWADDR is incremented by writes to the data FIFO from whatever source is active.

Data may be written to any location in the data FIFO by first setting up registers HADDR and then setting bit FIFORESET. The byte offset pointers point to the correct offset for the first byte transferred. Data FIFO write counter DFWADDR may be changed to point to any starting location in data FIFO while maintaining the same byte offset. Consecutive writes load consecutive data FIFO locations. Data may be sent to system memory 230 by setting up host address registers HADDR and counter HCNT, resetting the data FIFO, writing the data to register DFDAT, and setting bit DIRECTION inactive with bit HDMAEN in bit DFCN-TRL. When bit HDONE is set, the contents of the data FIFO have been written to system memory.

FIGS. 45C and 45D demonstrate the novel automated transfer of data according to the principles of this invention. The left hand side is the data in. In each case the data is transferred automatically and smoothly through from one bus to the other bus.

Data may be read from any location in the data FIFO by first setting up host address registers HADDR, and then setting FIFORESET. The byte offset pointers point to the correct offset for the first byte transferred. Data FIFO address pointer register DFRADDR may be changed to point to any starting location in the data FIFO while maintaining the same byte offset. Consecutive reads return data in consecutive data FIFO locations. Data may be read from system memory by setting up host address registers HADDR and host counter HCNT, resetting the data FIFO, and asserting bit DIRECTION and setting bit HDMAEN in register DFCNTRL. When bit HDONE is set, the contents of the data FIFO have been read from system memory, and the data may be read using register DFDAT.

Table 29 defines which port is active and in which direction with respect to the DATA FIFO.

TABLE 29

| DIRECTION BIT | HDMAEN BIT | SDMAEN BIT | Read FIFO | Write FIFO |
|---|---|---|---|---|
| 0 | 1 | 1 | Host | SCSI |
| 0 | 0 | 1 | Sequencer | SCSI |
| 0 | 1 | 0 | Host | Sequencer |
| 0 | 0 | 0 | Sequencer | Sequencer |
| 1 | 1 | 1 | SCSI | Host |
| 1 | 0 | 1 | SCSI | Sequencer |
| 1 | 1 | 0 | Sequencer | Host |
| 1 | 0 | 0 | Sequencer | Sequencer |

Bit HDONE for host interface module 310 and bit SDONE for SCSI module 330 indicate the end of the data transfer. Bits DMADONE is also implemented and is the logical AND of bits HDONE and SDONE. Bit DMADONE determines the end of transfer in either direction.

Data FIFO flush bit FIFOFLUSH, when active, forces host interface module 310 to continue to request bus master status from the system board to transfer data from data FIFO memory circuit 360 to system memory 230 when bit HDMAENACK is active (and in ISA mode that period BOFF period has expired) until either the data FIFO is empty or the value of host counter HCNT is zero. Bit FIFOFLUSH is not used when the transfer is from system memory 230 to data FIFO memory circuit 360 or when bit HDMAENACK is not active. In the case where data has been written to register DFDAT and the number of bytes was not a multiple of four, the last 1–3 bytes cannot be accessed by the SCSI module, only by sequencer 320. In this case, bit FIFOFLUSH is set to adjust the data FIFO register WRADDR to allow the SCSI module to read the host 1–3 bytes.

When the host interface module internal interface input line SXFERDONE is active, it causes the same action as if bit FIFOFLUSH was active. The action by the active signal on line SXFERDONE is considered as an automatic flush action. The flush action is required to force the host to request the computer bus now and not wait for bit DFTHRSH to be active as no more data will be written to the data FIFO memory and the existing data in the data FIFO memory must be sent to the computer system. Bit FIFOFLUSH bit should not be used if bit WIDEODD bit is active.

Figure 45E:
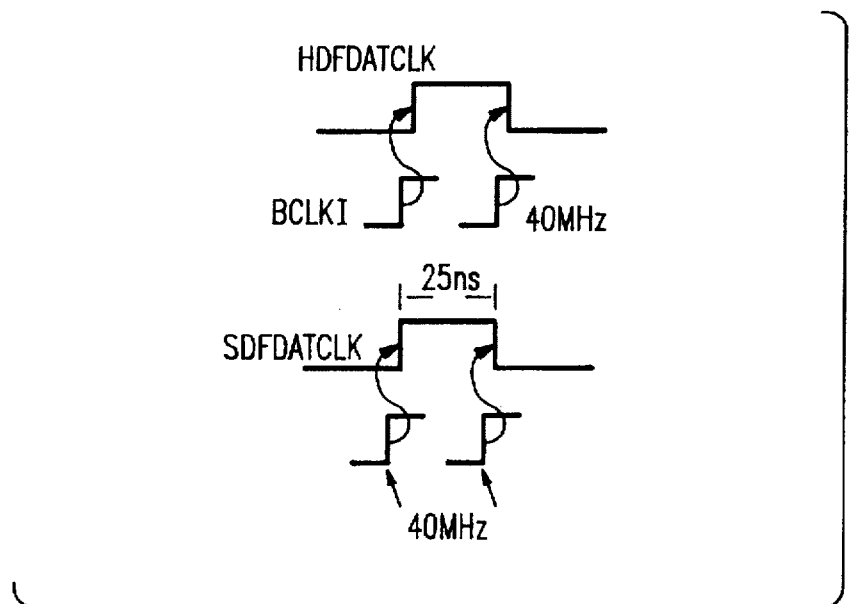
FIGS. 45E and 45F illustrate the clock edge used in the circuit of this invention.
Figure 45F:
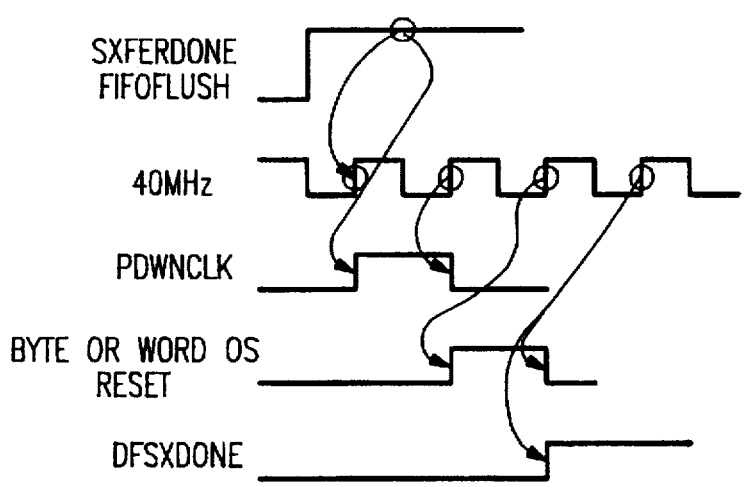

Data FIFO memory circuit 360 does not use an up/down counter. Both read and write address counters are up counters operating independently. However, all active clock edges are referenced to the rising edge of the 40 MHz clock to minimize status settle time. (See FIG. 45E and 45F). Moreover after reading or writing the third byte, the address is always incremented.

As explained above SCSI module 330 (FIG. 3) is connectable to two separate SCSI buses denoted as SCSI channel zero bus and SCSI channel one bus. Thus, SCSI module 330 of this invention, as described above, may be programmed to operate in a number of different SCSI configurations as summarized below:

1. Two single ended SCSI-2 buses
2. One differential SCSI-2 bus and one single-ended SCSI-2 bus;
3. one single ended wide SCSI-3 bus; and
4. One differential wide SCSI-3 bus.

Data transfers between SCSI bus 400 and host bus 226 can be accomplished by utilizing one of three modes: manual PIO, automatic PIO, or normal (DMA). During DMA type transfers, the active SCSI cell automatically handles transfers, for a particular SCSI Phase, between SCSI bus 400 and host data FIFO memory circuit 360. A SCSI FIFO is a data buffer that is used during DMA data transfers to provide an offset buffer during synchronous transfers.

DMA mode is used usually during the "Command" and "Data" phases. DMA mode supports asynchronous and synchronous SCSI transfers. Odd length WIDE SCSI, scatter/gather boundary conditions, and odd-length/odd-boundary (address) transfer conditions are handled automatically in DMA mode. Synchronous transfers and wide transfers can be enabled for "Data" phase only. A DMA data transfer is enabled by initializing the SCSI and host interface modules with regard to transfer direction, address pointers, transfer count values, and transfer enable controls.

Figure 47:
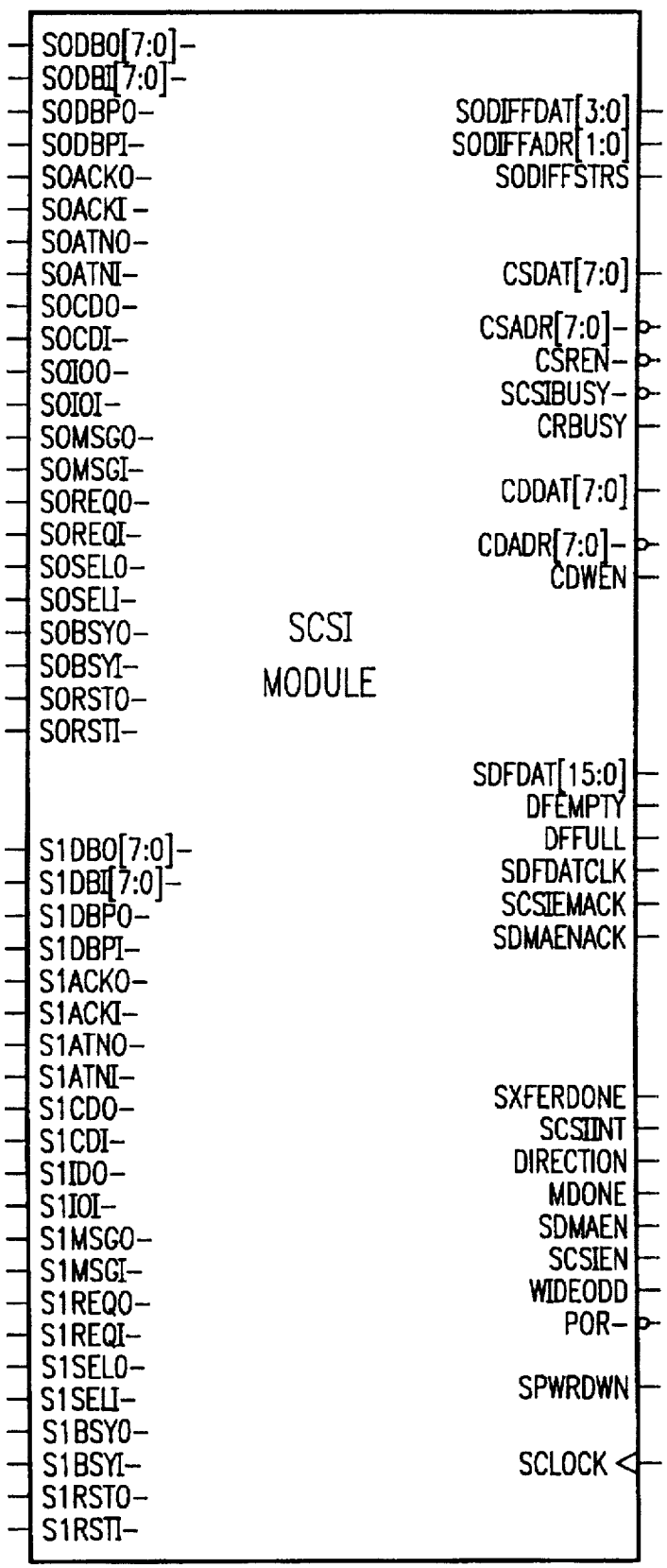
FIG. 47 is a diagram of the SCSI module signal interface of this invention.

FIG. 47 is a signal interface of one embodiment of SCSI module 330 showing the input signals and output signals to SCSI module 330. Tables 30 to 35 include the symbol name for each signal and a brief description of the signal.

TABLE 30

| SCSI Channel 0 Signal Identifiers | | |
|---|---|---|
| SYMBOL | TYPE | DESCRIPTION |
| S0DB0[7:0]- | 2S | Channel 0 SCSI data bus out (low byte). |
| S0P0- | 2S | Channel 0 SCSI Parity |
| S0ACKO- | 2S | Channel 0 SCSI ACK Out |
| S0ATNO- | 2S | Channel 0 SCSI ATN Out |
| S0CDO- | 2S | Channel 0 SCSI CD Out |
| S0IOO- | 2S | Channel 0 SCSI IO Out |
| S0MSGO- | 2S | Channel 0 SCSI MSG Out |
| S0REQO- | 2S | Channel 0 SCSI REQ Out |
| S0SELO- | 2S | Channel 0 SCSI SEL Out |
| S0BSYO- | 2S | Channel 0 SCSI BSY Out |
| S0RSTO- | 2S | Channel 0 SCSI RESET Out |
| S0DBI[7:0]- | | Channel 0 SCSI data bus in (low byte) |
| S0PI- | I/2 | Channel 0 SCSI Parity In |
| S0ACKI- | I/1 | Channel 0 SCSI ACK In |
| S0ATNI- | I/1 | Channel 0 SCSI ATN In |
| S0CDI- | I/1 | Channel 0 SCSI CD In |
| S0IOI- | I/1 | Channel 0 SCSI IO In |
| S0MSGI- | I/1 | Channel 0 SCSI MSG In |
| S0REQI- | I/1 | Channel 0 SCSI REQ In |
| S0SELI- | I/1 | Channel 0 SCSI SEL In |
| S0BSYI- | I/1 | Channel 0 SCSI BSY In |
| S0RSTI- | I/1 | Channel 0 SCSI RESET In |
| S0DIFFDAT[3:0] | 2ST/4 | Channel 0 Differential |

TABLE 30-continued

SCSI Channel 0 Signal Identifiers

| SYMBOL | TYPE | DESCRIPTION |
|---|---|---|
| S0DIFFSTRB | 2ST/4 | Control Data Out Channel 0 Differential Write Strobe |
| S0DIFFADR[1:0] | 2ST/4 | Channel 0 Differential Address Out |

TABLE 31

SCSI Channel 1 Signal Identifiers

| SYMBOL | TYPE | DESCRIPTION |
|---|---|---|
| S1DBO[7:0]- (S0DBO[15:8]-) | 2S | Channel 1 SCSI data bus or Channel 0 upper byte of Wide bus. |
| S1PO- (S0_P(H)O-) | 2S | Channel 1 Parity bit or Channel 0 upper byte Parity bit. |
| S1ACKO- | 2S | Channel 1 SCSI ACK Out |
| S1ATNO- | 2S | Channel 1 SCSI ATN Out |
| S1CDO- | 2S | Channel 1 SCSI CD Out |
| S1IOO- | 2S | Channel 1 SCSI IO Out |
| S1MSGO- | 2S | Channel 1 SCSI MSG Out |
| S1REQO- | 2S | Channel 1 SCSI Req Out |
| S1SELO- | 2S | Channel 1 SEL Out |
| S1BSYO- | 2S | Channel 1 SCSI BSY Out |
| S1RSTO- | 2S | Channel 1 SCSI RESET Out |
| S1DBI[7:0]- (S0DBI[15:8]-) | 2S | Channel 1 SCSI data bus or Channel 0 upper byte of Wide bus. |
| S1PO- (S0_P(H)I-) | I/2 | Channel 1 Parity bit or Channel 0 upper byte Parity bit. |
| S1ACKI- | I/1 | Channel 1 SCSI ACK In |
| S1ATNI- | I/1 | Channel 1 SCSI ATN In |
| S1CDI- | I/1 | Channel 1 SCSI CD In |
| S1IOI- | I/1 | Channel 1 SCSI IO In |
| S1MSGI- | I/1 | Channel 1 SCSI MSG In |
| S1REQI- | I/1 | Channel 1 SCSI REQ In |
| S1SELI- | I/1 | Channel 1 SCSI SEL In |
| S1BSYI- | I/1 | Channel 1 SCSI BSY In |
| S1RSTI- | I/1 | Channel 1 SCSI RESET In |

TABLE 32

Data Port Signal Identifiers

| SYMBOL | TYPE | DESCRIPTION |
|---|---|---|
| CSDAT[7:0] | T2/3 | Read port data (data driven by SCSI module). |
| CSADR[7:0]- | I/1 | Read port address. |
| CSREN- | I/1 | Read port data valid. |
| SCSIBUSY- | TS/2 | Output status indicating that the SCSI module is currently driving the CIO source bus (CSDAT[7:0]). |
| CRBUSY | I/1 | CIO source bus (CSDAT[7:0]) busy signal. Used as an interlock mechanism that insures that only one module will drive the CIO source bus at a time. The SCSI module may only drive the CIO source bus if CRBUSY is inactive, CSREN- is active and CSADR[7:0]- is a valid SCSI module address. |
| CDDAT[7:0] | I/1 | Write port date (data written in SCSI module). |
| CDADR[7:0]- | I/1 | Write port address |
| CDWEN- | I/1 | Write port data valid. |

TABLE 33

DMA Port Signal Identifier

| SYMBOL | TYPE | DESCRIPTION |
|---|---|---|
| SDFDAT[15:0] | TS/2 | SFIFO to DFIFO data bus. |
| DFEMPTY | I/2 | The Host DFIFO is currently empty. |
| DFFULL | I/2 | The Host DFIFO is currently full. |
| SDFDATCLK | 2ST/2 | Data R/W strobe to the DFIFO. |
| SXFERDONE | 2ST/2 | Indicates the current SCSI DMA transfer has completed (SDONE) or have been interrupted by a phase change. |

TABLE 34

Transfer Control Signal Identifiers

| SYMBOL | TYPE | DESCRIPTION |
|---|---|---|
| SCSIINT | 2S/3 | SCSI interrupt output. |
| HDONE | I/2 | Indicates the Host has finished the current transfer & HCNT = 0. |
| WIDEODD | I/2 | Multiple segment, wide, Scatter/Gather DMA transfer control. When active, the DNA transfer control logic assumes the individual segments are portions of a contiguous, single SCI bus transfer. |
| DIRECTIONACK | I/2 | Data path direction (write/read') control of the currently selected SCSI cell (W=1, R=0). |
| SCSIEN | I/2 | SCSI Bus DMA enable (Enable/Disable'). Controls DMA transfers between the SCSI FIFO (SFIFO) and the SCSI bus. |
| SCSIENACK | 2S/2 | Indicates activity of the SCSI DMA transfer control logic. Active when other SCSIEN is active or the SCSI Bus DMA transfer control logic is active. |
| SDMAEN | I/2 | DFIFO DMA enable (Enable/Disable'). Enables transfers between the SCSI FIFO (SFIFO) and the data FIFO (DFIFO). |
| SDMAENACK | 2S/2 | Indicates activity at the DFIFO DMA transfer control logic. Active when either SDMAEN is active or the DMA transfer control logic is active. |

TABLE 35

Miscellaneous Signal Identifiers

| SYMBOL | TYPE | DESCRIPTION |
|---|---|---|
| SCLOCK | I/1 | Primary SCSI clock input (40 MHZ). |
| CLK20 | I/1 | 20 MHz Timer clock input. |
| POR | I/1 | Power-on reset in. |
| TESTCHIP[7:0] | I/1 | Test control bus. Specific values of these signals place the SCSI module in to various test modes. See test section for more detail. |

Figure 48A:
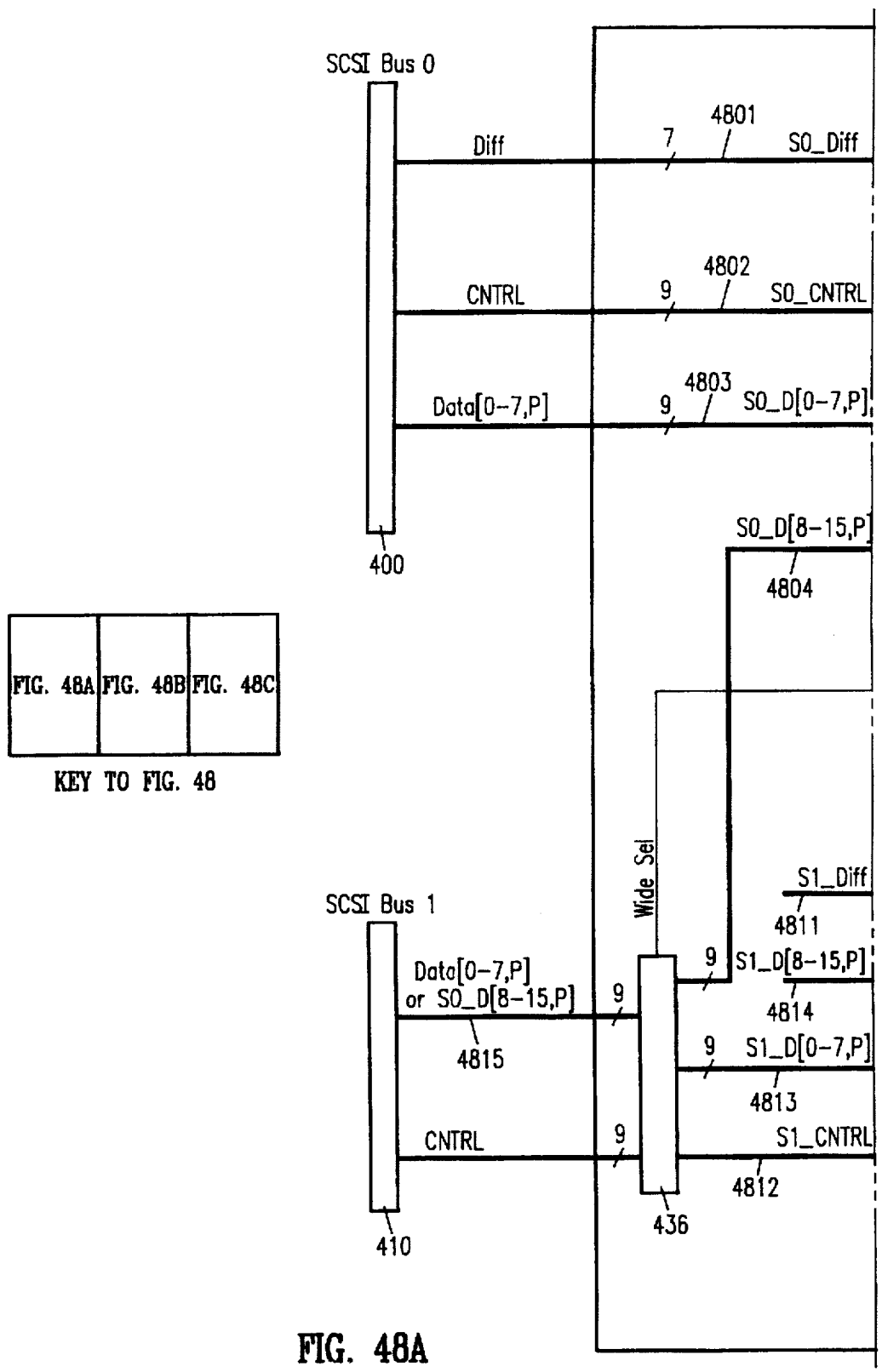
FIG. 48, which is the key to FIGS. 48A, 48B, and 48C, is a block diagram of the SCSI module of this invention.
Figure 48B:
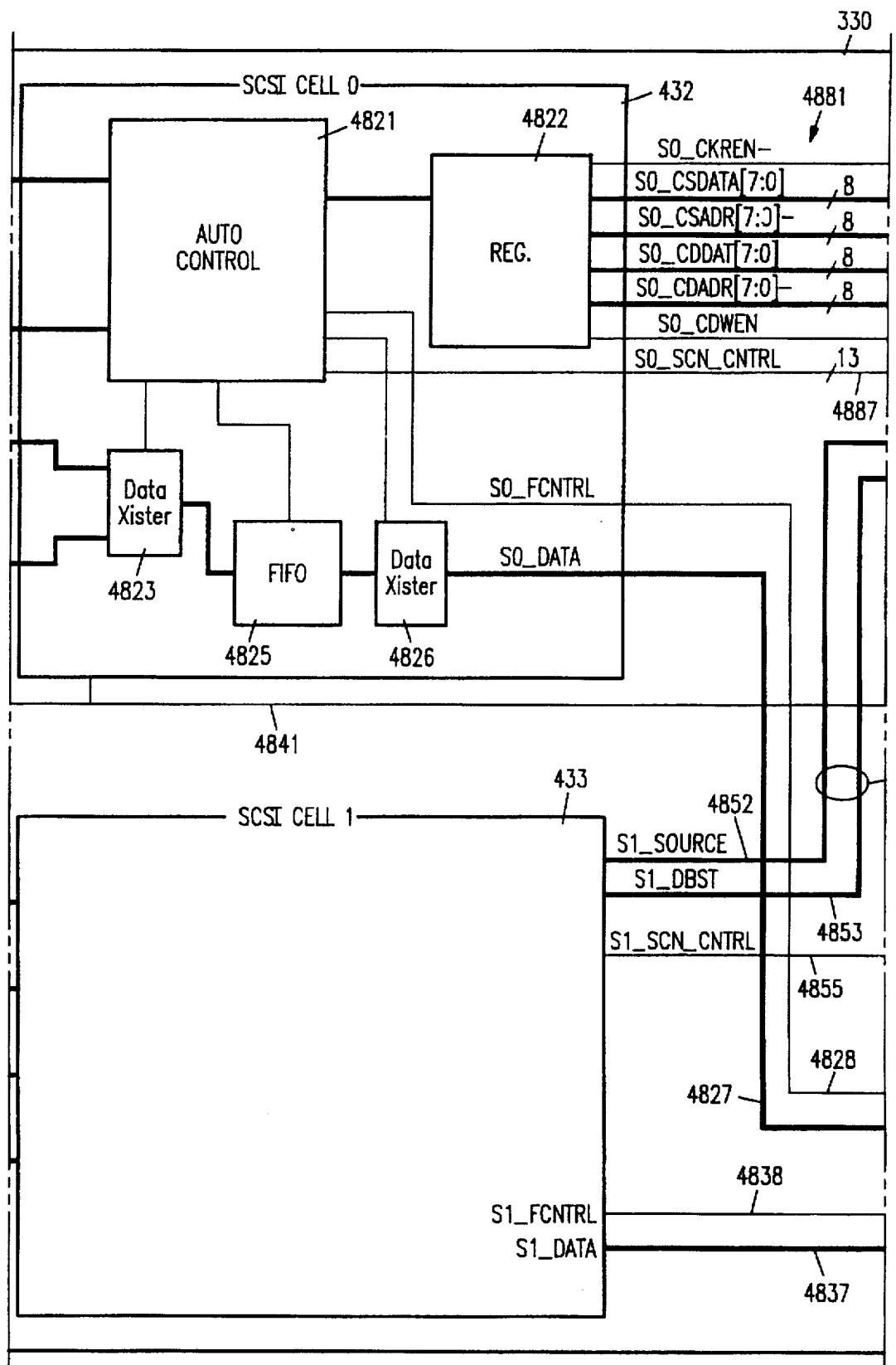
Figure 48C:
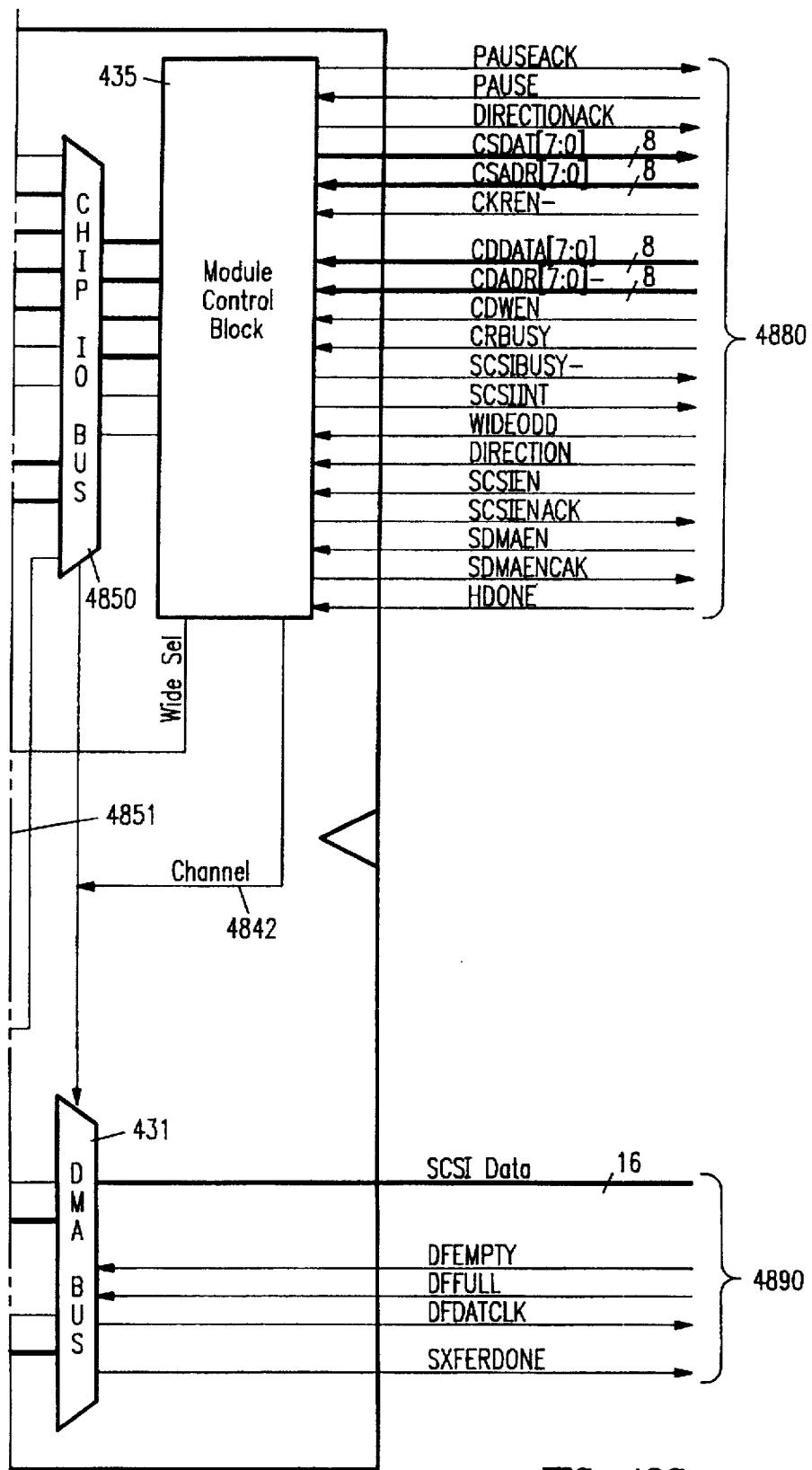

I/1 = Input/# of Loads
2S/x = Two State Output/Low drive current in MA
TS/x = Tristate Output/Low drive current in MA FIG. 48 is a simplified block diagram of SCSI module 330 of this invention. SCSI module 330 includes two independent SCSI 432, 433 and a module control block 435.

Each SCSI cell 432, 433 implements a single SCSI channel and although there are two distinct channels in SCSI module 330, only one channel may be active at a time. Module control block 435 contains a subset of the register set contained in SCSI module 330. This subset of registers provides stored data that controls the operations and performance of SCSI module 330, e.g., register SBLKCTL.

SCSI module 330 has four external buses, i.e., a SCSI channel zero bus 400, a SCSI channel one bus 410, a local bus 4880, and a data transfer bus 4890, which are sometimes referred to as ports. SCSI channel zero bus 400 includes a seven bit differential bus 4801, hereinafter S0_Diff bus 4801, a nine bit control bus 4802, hereinafter S0_CNTRL bus 4802, an eight bit data bus and a parity line S0_D[0–7, P] 4803, hereinafter S0_DATAL bus 4803. S0_Diff bus 4801 and S0_CNTRL bus 4802 are connected to automatic control circuit 4821. S0_DATAL bus 4803 is connected to automatic control circuit 4821 and to a first data translator circuit 4823 that provides automatic byte alignment that is address and data length sensitive.

SCSI channel one bus 410 includes a nine bit control bus 4812, hereinafter S1_CNTRL bus 4812, an eight bit data bus and a parity line 4815 which are connected to a multiplexer 436 that is controlled by a signal on wide select line 4841 from module control block 435. Multiplexer 436 includes a first multiplexer that couples and decouples data bus 4815 to S1_DATAL bus 4813 and a second multiplexer that couples and decouples data bus 4815 to S0_DATAH bus 4804. As explained more completely below, the configuration of SCSI channel one bus 410 is dependent upon the configuration of SCSI module 330. However, when the signal on wide select line 4841 is active, the signals on bus 4815 are passed through multiplexer 4870 to S0_DATAH bus 4804, which is connected to data translator circuit 4823 in SCSI cell zero 432. In response to control signals from automatic control circuit 4821, data translator circuit 4823 either provides data to or receives data from SCSI FIFO circuit 4825. The operation of SCSI FIFO circuit 4825 is controlled by signals from automatic control circuit 4821.

SCSI FIFO circuit 4825 is also connected to a second data translator circuit 4826 that is also controlled by signals from automatic control circuit 4821. Data translator circuit 4826 receives data from and transfers data to S0_DATA bus 4827 which is connected to DMA multiplexer 431. Automatic control circuit 4821, drives S0_FCNTRL line 4828 to DMA multiplexer 4860.

The operation of automatic control circuit 4821 is controlled by information stored in a second subset of registers 4822, e.g., registers with addresses from 00h to 1Eh, in this embodiment. Registers 4822 are illustrated in FIG. 49, and described more completely in Appendix III.

The majority of registers in SCSI module 330 reside in the second subset of registers 4822 in SCSI cell 432. Although the registers of both SCSI cells 432, 433 (FIG. 48) reside in the same address range, i.e., 00h to 1Eh, addressing a register in a SCSI cell accesses only the physical registers of the active SCSI cell. As described more completely below, a SCSI cell's register set includes status and transfer control registers as well as registers that provide direct access to and control over SCSI bus.

Registers 4822 are connected by an internal portion of CIOBUS 350 to local bus multiplexer 4850. Automatic control circuit 4821 is connected directly to local bus multiplexer 4850 by S0_SCSI_CNTRL bus 4887.

Thus, in this embodiment, SCSI cell zero 432 includes automatic control circuit 4821, first data translator circuit 4823, SCSI FIFO 4825, second data translator circuit 4826 and registers 4822. SCSI cell one 433 also includes an automatic control circuit 4831, first data translator circuit 4833, SCSI FIFO 4835, second data translator circuit 4836 and registers 4832, which are identical to those in SCSI cell zero 4820. For clarity, the components in cell 433 are not shown in FIG. 48.

S1_CNTRL bus 4812 is connected to automatic control circuit 4831 through multiplexer 436 when the signal on wide select line 4841 is inactive. Similarly, S1_DATAL bus 4813 is connected to automatic control circuit 4831 and to data translator circuit 4833 from multiplexer 436 and when the signal on wide select line 4841 is inactive, bus 4815 is connected to S1_DATAL bus line 4813. In this embodiment, S1_Diff bus 11 and S1_DATAH bus 4814 are not utilized.

Registers 4832 are connected by a second internal portion 4851 of CIOBUS 350 to local bus multiplexer 4850. Automatic control circuit 4831 is connected directly to local bus multiplexer 4850 by SCSI channel one control bus 4855, hereinafter S1_SCSI_CNTRL bus 4855.

Data translator circuit 4836 receives data from and transfers data to S1_Data bus 4837 which is connected to DMA multiplexer 431. Automatic control circuit 4831 drives S1_FCNTRL line 4838 to DMA multiplexer 431.

Local bus multiplexer 4850 passes signals to and from module control block 435 to either SCSI cell zero 432 or SCSI cell one 433 based on the level of the signal on channel line 4842 from module control block 435. Local bus 4880 transfers signals to module control block 435 and from module control block 435 to other modules in host adapter 7770. CIOBUS bus 350 is included in local bus 4880 (FIG. 48). Specifically, local bus 4880 includes the buses and lines listed in Tables 32 and 34 above. Thus, local bus 4880 provides access to the status control registers in module control block 4840 and in each SCSI cell 432, 433 as well as some transfer status and control signals, which are described more completely below.

DMA bus 4890 includes the lines defined above in Table 33 under DMA Port. DMA bus 4890 is the primary data path between the SCSI channel selected by the signal level on channel line 4842, as described more completely below, and host data FIFO circuit 360.

SCSI cell zero 432 is selected by clearing bit SELBUS1, bit 3, in register SBLKCTL (FIG. 49) and SCSI cell one 433 is selected by setting bit SELBUS1. SCSI cell zero 432 supports a (i) differential mode of operation with external components to host adapter 7773 and (ii) single-ended operation. SCSI cell one 433 supports single-ended operation only. Both SCSI cells 432, 433 are capable of supporting up to 10 MByte/sec transfer rates. SCSI cell zero 432 can also be operated as a "wide" channel, i.e., a sixteen bit data channel.

For the wide channel operation, data bits eight through fifteen plus the parity bit are tied to data bits zero through seven and the parity bit on SCSI channel one bus 410. In this configuration, SCSI cell one 433 is not operable. The control circuitry for SCSI channel zero bus 400 permits "fast," "differential," and "wide" data transfers or any combination thereof. The control circuitry for SCSI channel one bus 410 permits "fast" single ended data transfers only.

Figure 50B:
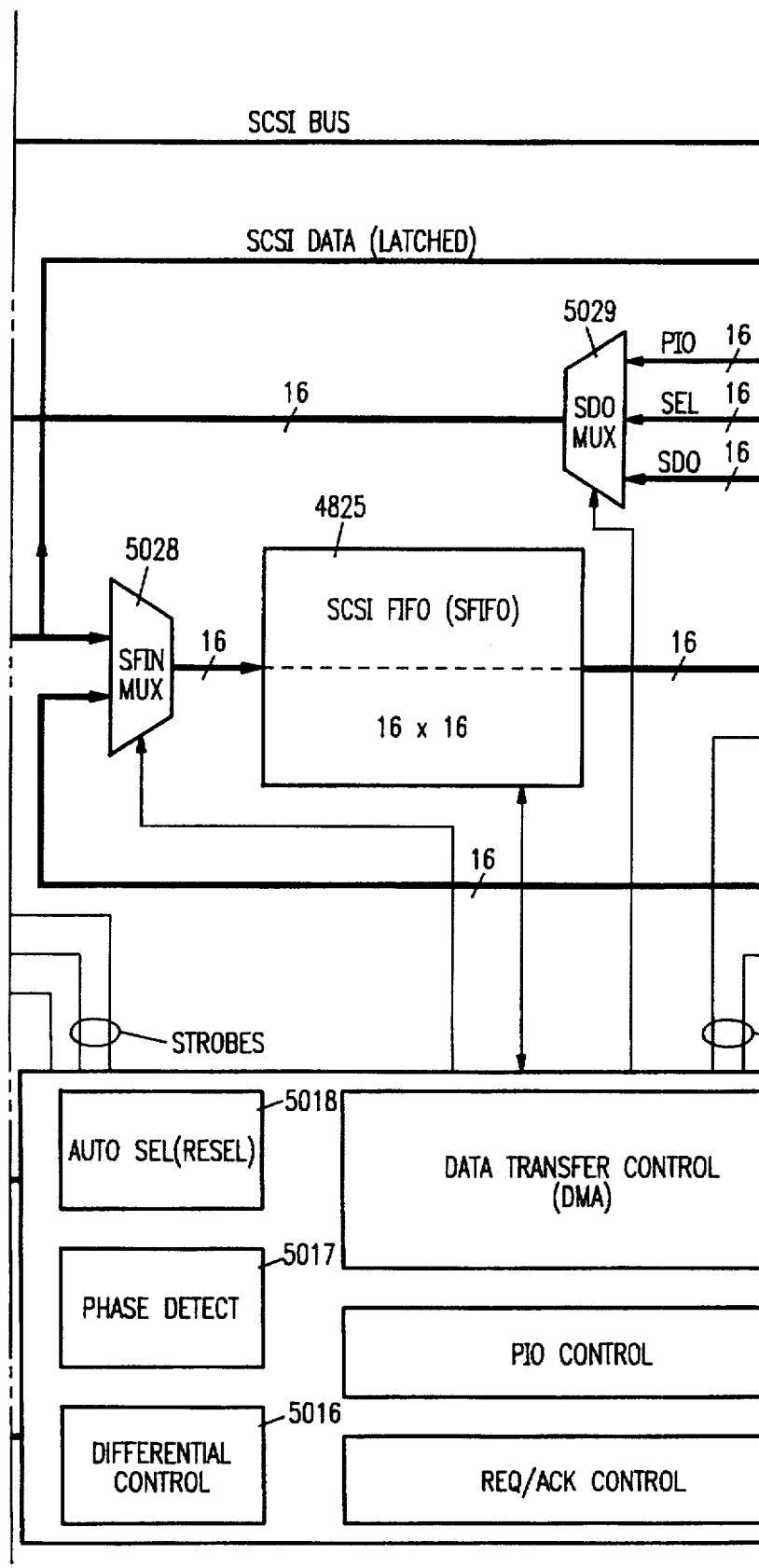
FIG. 50, which is a key to FIGS. 50A, 50B, and 50C, is a more detailed block diagram of the SCSI cells within the SCSI module of this invention.
Figure 50C:
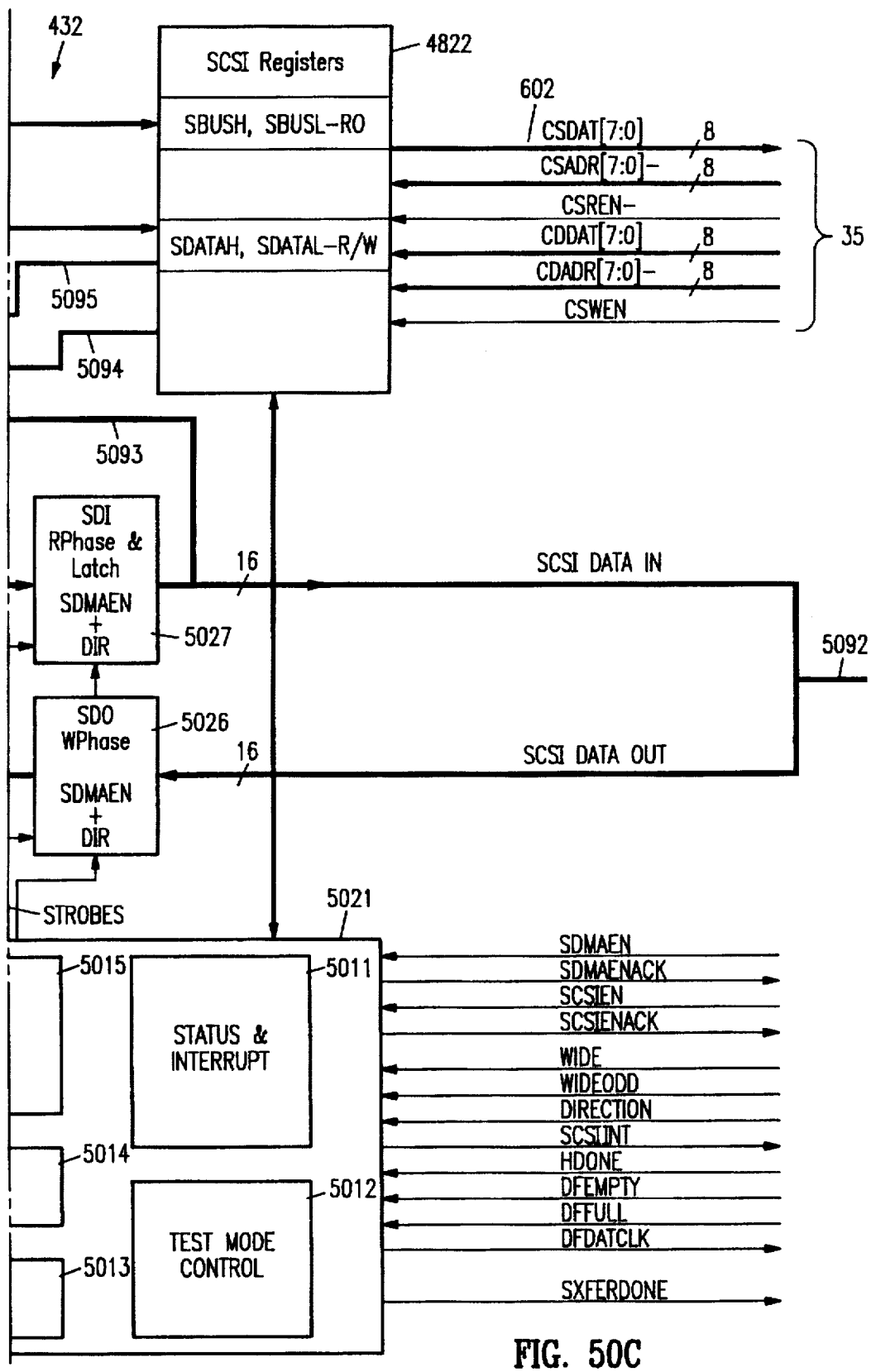

The basic SCSI cell structure for both SCSI cells 432, 433 (FIG. 48) is illustrated in more detail in FIG. 50. However, in FIG. 50, SCSI bus 400 is shown as having sixteen data bits and two parity bits. This is one possible configuration for SCSI cell zero 432 (FIG. 48). As indicated above, SCSI channel one bus 410 has only eight data bits and one parity bit. Thus, SCSI bus 400 is only illustrative and is not intended to limit the invention of the SCSI cell to this particular bus configuration.

SCSI cell 432 (FIG. 50) provides control and management function for SCSI bus 400, including management of SCSI transfers, control signal generation, and control signal decoding. Note that in FIG. 50, all the bus structures are shown as being connected directly to SCSI cell 432. This is illustrative only and is a simplified representation of the circuitry illustrated in FIG. 48.

Automatic direct memory access (DMA) data transfers are used to transfer data between SCSI bus 400 and host computer bus 226. SCSI cell 432 supports Initiator and Target modes and, as explained above, SCSI cell 432 (FIG. 50) supports "fast," "wide (16-bits)," and "differential" modes of operation.

Specifically, the circuitry and operation of SCSI cell 432 in host adapter 7770 of this invention is a function of the number of hardwired sequencers, SCSI interrupts and registers contained in SCSI cell 432 as well as the size and operation of SCSI FIFO 4825. For the embodiment that includes hardwired sequencers for SCSI Arbitration, Selection out (as initiator), Reselection in (as initiator), Selection in (as target), and Reselection out (as target) phases, fifteen status conditions are used. The status conditions are defined in Table 36.

TABLE 36

| Name | Status |
| --- | --- |
| SELDO | Selection or reselection out completed. |
| SELDI | H/A integrated circuit selected or reselected. |
| SELINGO | Arbitration won, selection started. |
| SWRAP | Transfer counter wrapped around. |
| SDONE | Data transfer complete. |
| SPIORDY | Automatic PIO data transfer enabled and ready to transfer data. |
| DMADONE | DMA data transfer is complete. |
| SELTO | Selection timeout. |
| ATNTARG | Mode=target, initiator set attention. |
| SCSIRSTI | Another device asserted a SCSI bus reset. |
| PHASEMIS | SCSI phase other than that expected. |
| BUSFREE | SCSI bus free occurred. |
| SCSIPERR | SCSI parity error. |
| PHASECHG | SCSI phase change. |
| REQINIT | Latched request, one or more request signals have been sent by the target for which no acknowledge signal has yet been sent by the initiator |

Most of the conditions in Table 36 are automatically generated by SCSI cell 432 in response to conditions on SCSI bus 400. Any one of these status conditions can generate a SCSI interrupt SCSIINT if the appropriate enable bit is set in registers SIMODE0 or SIMODE1; otherwise, the status condition may only set the status bit in registers 4822. An actual interrupt signal is sent to CPU 221 (FIG. 2) in the host computer only when the interrupt enable bit corresponding to the status condition is set in registers 22 and when a host computer hardware interrupt enable bit is set.

Hence, circuitry, as described more completely below, is provided in SCSI cell 432 to generate each of the fifteen status conditions and to perform the SCSI operations for each of the five automatic sequences. In addition, at least 24 registers are preferably contained in SCSI cell 432. The 24 registers are one embodiment of a data storage means. Table 37 lists each of the registers. The name of each register is followed by an acronym in parenthesis for the register and an indication of whether the register is read (R), written to (W), or both read and written to (R/W) by either sequencer 320 or host driver 260. The name of each register is preceded by the relative hexadecimal position of the register within the address space of host adapter 7770. Some of the registers are listed twice because these registers contain different data depending on whether data is being read from or written to the register.

TABLE 37

| | | | | |
| --- | --- | --- | --- | --- |
| 1. | 000h | SCSI Sequence Control | (SCSISEQ) | W/R |
| 2. | 001h | SCSI Transfer Control 0 | (SXFRCTL0) | W/R |
| 3. | 002h | SCSI Transfer Control 1 | (SXFRCTL1) | W/R |
| 4. | 003h | SCSI Signal Out | (SCSISIGO) | W |
| | | SCSI Signal In | (SCSISIGI) | R |
| 5. | 004h | SCSI Rate Control | (SCSIRATE) | W |
| 6. | 005h | SCSI Identification | (SCSIID) | W |
| | | Selection/Reselection Id. | (SELID) | R |
| 7. | 006h | SCSI Latched Data Low Byte | (SCSIDATL) | W/R |
| 8. | 007h | SCSI Latched Data Hi Byte | (SCSIDATH) | W/R |
| 9. | 008h | SCSI Transfer Count, lsb | (STCNT0) | W/R |
| 10. | 009h | SCSI Transfer Count, mid | (STCNT1) | W/R |
| 11. | 00Ah | SCSI Transfer Count, msb | (STCNT2) | W/R |
| 12. | 00Bh | Clear SCSI Interrupts 0 | (CLRSINT0) | W |
| | | SCSI Status 0 | (SSTAT0) | R |
| 13. | 00Ch | Clear SCSI Interrupts 1 | (CLRSINT1) | W |
| | | SCSI Status 1 | (SSTAT1) | R |
| 14. | 00Dh | SCSI Status 2 | (SSTAT2) | R |
| 15. | 00Eh | SCSI Status 3 | (SSTAT3) | R |
| 16. | 00Fh | SCSI Test Control | (SCSITEST) | W |
| 17. | 010h | SCSI Interrupt Mode 0 | (SIMODE0) | W/R |
| 18. | 011h | SCSI Interrupt Mode 1 | (SIMODE1) | W/R |
| 19. | 012h | SCSI Data Bus Low Byte | (SCSIBUSL) | R |
| 20. | 013h | SCSI Data Bus Hi Byte | (SCSIBUSH) | R |
| 21. | 014h | SCSI/Host Address | (SHADDR0) | R |
| 22. | 015h | SCSI/Host Address | (SHADDR1) | R |
| 23. | 016h | SCSI/Host Address | (SHADDR2) | R |
| 24. | 017h | SCSI/Host Address | (SHADDR3) | R |

FIG. 49 is a block diagram of each register within this embodiment of SCSI module 330 including those listed in Table 37. Each register is represented by a column in FIG. 49. The first row in the column gives the address for the register and the register name. The second row indicates whether the register is read only "R", write only "W", or read and write "R/W". The last eight rows in the column represent the bits in the register. The first number in these rows is the bit location within the register. The alphanumeric string is the name of the bit. If a number in quotes is used in place of the alphanumeric string, the number is the value of the bit. A "(0)" after the alphanumeric string indicates that the bit is cleared when bit RESET is active. A "(1)" after the alphanumeric string indicates that the bit is set when bit RESET is active. A "(x)" after the alphanumeric string, where "x" is a number other than zero or one, indicates that the bit is in an unknown state after reset. Each bit in FIG. 49 is described more completely in Appendix III which is incorporated herein by reference in its entirety. Herein, a bit that is set is loaded with a one and a bit that is cleared is loaded with a zero.

SCSI sequence control register SCSISEQ (FIG. 49) is read and written into by sequencer 320 in response to instructions in a SCB from host driver 260. Each bit in this register enables a specified hardware sequence. Since the register is readable, bit manipulation instructions are possible without saving a register image in the local scratch RAM of sequencer 320. All bits in the register except bit SCSIRSTO are disabled by a SCSI reset.

Register SXFRCTL0 and register SXFRCTL1 control the data path in SCSI module 330 (FIG. 49). The status of all conditions in Table 36 is always available in registers SSTAT0 and SSTAT1 (FIG. 49). Any status bit in these registers may be read at any time independent of whether the interrupt corresponding to the status bit has been enabled in registers SIMODE0 and SIMODE1. The generation of each interrupt is controlled by programming the enable registers SIMODE0 and SIMODE1 with the appropriate mask bit. When an interrupt occurs, the interrupt may be cleared by setting the appropriate bit in interrupt clear registers CLRSINT0 and CLRSINT1, or by clearing the appropriate interrupt enable bit in registers SIMODE0 and SIMODE1. Each bit in interrupt clear registers CLRSINT0 and CLRSINT1 is self-clearing and writing a zero to any bit in these register has no affect.

In the read mode, register SCSISIGI permits sequencer 320 to read the actual state on signals on SCSI CNTRL bus 4802. In the write mode, register SCSISIGO permits sequencer 320 to set the state of SCSI CNTRL bus signals. However, only those control signals appropriate to the current mode, either Initiator or Target, are enabled onto SCSI CNTRL bus 4802. The three most significant bits CDO, IOO, and MSGO in register SCSISIGO are used for SCSI bus phase comparison in initiator mode. All bits are cleared by a host adapter reset, a SCSI bus reset, and a SCSI bus free condition.

In the read mode, registers SCSIBUSL and SCSIBUSH permit sequencer 320 to read the actual data on the data portion of SCSI bus 400. Data is gated from SCSI data bus 5005 to CIOBUS 350 and is not latched in SCSI module 330. The initial state of these registers is unknown because the initial state of SCSI data bus 5005 is unknown. Registers SCSIBUSL and SCSIBUSH are used during manual selection/reselection.

Register SCSIRATE contains bits that select the synchronous SCSI data transfer rate and the maximum REG/ACK offset. An offset value of "0" in bits SOFS [03:00] disables synchronous transfers. Any offset value greater than zero enables synchronous data transfers.

Register SCSIID contains the SCSI ID of the currently active SCSI cell in SCSI module 330 (FIG. 3) and the ID of the SCSI device with which the active SCSI cell is to communicate. Register SELID is read only. Bits SELID [07:04] in register SELID are the SCSI ID of the (re) selecting device which was asserted during the last (re) selection-in SCSI bus phase. As explained more completely below, an automatic hardware sequencer removes the ID of SCSI module 330 and decodes the remaining ID. After a (re)selection has taken place, the ID may be read from this register to determine the ID of the device which initiated the (re)selection. If the (re)selection was anonymous (single-bit only), bit ONEBIT is set to a one to flag this condition and bits SELID[07:04] are set to 0.

Registers SCSIDATL and SCSIDATH are a read/write latches that are used to transfer data on SCSI bus 00 through SCSI automatic or manual PIO transfers. Bit 7 is the most significant bit (MSB) of register SCSIDATL and bit 15 is the MSB of register SCSIDATH. Data is written to these registers to send data out to SCSI data bus 5005. These registers are read to obtain data from SCSI data bus 5005 that was latched by SCSI request signal REQ. In an automatic PIO data transfer for either normal or wide bus mode, only reads and writes to register SCSIDATL send out the corresponding request signal REQ or acknowledge signal ACK, respectively. The initial read state of these registers is unknown since valid data is only latched by the first valid handshake signal REQ/ACK in sequence.

Registers STCNT0 through STCNT2 contain the DMA or automatic PIO byte transfer count on the SCSI interface. Register SSTAT2 is read only and gives the status of SCSI FIFO 4925. Register SSTAT3 contains the status of a current synchronous SCSI information transfer phase.

SCSI/Host Address registers SHADDR(n) reflect the state of the host address pointer according to the number of bytes transferred across SCSI data bus. The registers are incremented in response to each SCSI acknowledge signal ACK when the expected phase matches the SCSI phase. The value of these registers is saved in response to a "Save Data Pointers" message. These registers are set to zero on a reset.

Selection timeout timer register SELTIMER is used to monitor the state of the hardware selection timeout timer.

SCSI block control register SBLKCTL controls hardware selection options in SCSI module 330 outside of SCSI cells 432, 433. As explained above, this control includes address decodes and data multiplexing.

The operation of the on-board register set of SCSI cell 432 and the use of specific bits within the registers to control operations of host adapter 7770 are described more completely below.

SCSI data bus 4803 and SCSI data bus 4804 (FIG. 48) drive a SCSI data-in latch circuit 5023 which also receives signals SCSIEN and DIRECTION from automatic control circuit 5021. Signals SCSIEN and DIRECTION enable the data path through circuit 5023. Data is transmitted over this data path using strobes from automatic control circuit 5021. SCSI bus 5005 is connected directly to SCSI data bus registers SCSIBUSH and SCSIBUSL in registers 4822. Registers SCSIBUSH and SCSIBUSL read data on SCSI bus 5005 directly. This data is gated from SCSI bus 5005 to CSDAT bus 602, and is not latched in SCSI cell 432.

SCSI data-out latch circuit 5024, which also receives signals SCSIEN and DIRECTION from automatic control circuit 5021, drives SCSI bus 5005. SCSI data-in latch CIRCUIT 5023 and SCSI data-out latch CIRCUIT 5024 are one embodiment of first translator circuit 4823 (FIG. 48).

Data latched in SCSI data-in latch circuit 5023 (FIG. 50) are provided to registers SCSIDATH and SCSIDATL in registers 4822 via a 16-bit bus and to SCSI FIFO in multiplexer 5028 via 16-bit bus. Registers SCSIDATH and SCSIDATL are described more completely in Appendix III and that description is incorporated herein by reference.

SCSI FIFO in multiplexer 5028, hereinafter SFIN_MUX multiplexer 5028, also receives as a second set of signals the 16-bits of data latched in a second SCSI data out latch circuit 5026. The data in SCSI data-out latch circuit 5026 are provided by an internal SCSI data bus 5092 from data FIFO memory circuit 360. A control signal from automatic control circuit 5021 determines the data passed through SFIN_ MUX multiplexer 5028 to SCSI FIFO circuit 4825. SCSI FIFO circuit 4825 is a data buffer that is used during DMA data transfers to provide an offset buffer for synchronous data transfers. The maximum offset is 8 bytes for wide transfers and is 15 bytes for normal transfers. SCSI FIFO circuit 4825 is not used during PIO transfers.

The size of SCSI FIFO 4825 is determined by the allowable offset for a SCSI synchronous data transfer. As is known to those skilled in the art, in a synchronous SCSI data transfer, an offset number of bytes may be transferred without a corresponding number of "ACK" signals being sent by the initiator. The size of SCSI FIFO 4825 is determined by the maximum number of offset bytes that may be transferred in a synchronous data transfer without receiving a corresponding handshake "ACK" signal from the initiator.

The data passed to SCSI FIFO circuit 4825 are passed therethrough to a second SCSI data-in latch circuit 5027. The operation of SCSI data-in latch circuit 5027 and SCSI data-out latch circuit 5026 is controlled by direction signal DIRECTION and SCSI DMA enable signal SDMAEN. Latches 5026 and 5027 include a byte alignment capability, as described more completely below.

SCSI data-in latch circuit 5027 drives internal SCSI data-in bus 5092 and SCSI data-out SDO bus 5093, hereinafter SDO bus 5093, and SDO bus 5093 provides a first 16 bit input signal to SCSI data-out multiplexer 5029. Registers SCSIDATH and SCSIDATL drive PIO bus 5095, which provides a second 16 bit input signal to SCSI data-out multiplexer 5029. SEL bus 5094 provides a third 16-bit input signal from registers that contain SCSI ID to SCSI data-out multiplexer 5029. The 16-bit signal passed through SCSI data-out multiplexer 5029 to SCSI data-out latch circuit 5024 is determined by a signal from auto select/reselect circuit in automatic control circuit 4821.

Each of the individual circuits in automatic control circuits 4921 is described more completely below.

To further illustrate the operation of SCSI cell 432, each SCSI phase is considered more completely below. However, before any SCSI phase can be performed, power must be applied to SCSI cell 432. When host adapter 7770 (FIG. 2) is powered on, sequencer 320 is held in a paused state. Host adapter 260 accesses SCSI registers 4922 (FIG. 50) directly. SCSI cell 432 is initialized by writing OID, i.e. bits 0 to 3, in register SCSIID. OID is the ID of the currently active SCSI cell and is on SCSI bus 400 during any type of selection/reselection sequence. Host adapter 260 also disables SCSI interrupt SCSIINT, which is described more completely below as well as in the discussion of operation of sequencer 320, and turns off all automatic functions of SCSI cell 432.

Figure 51:
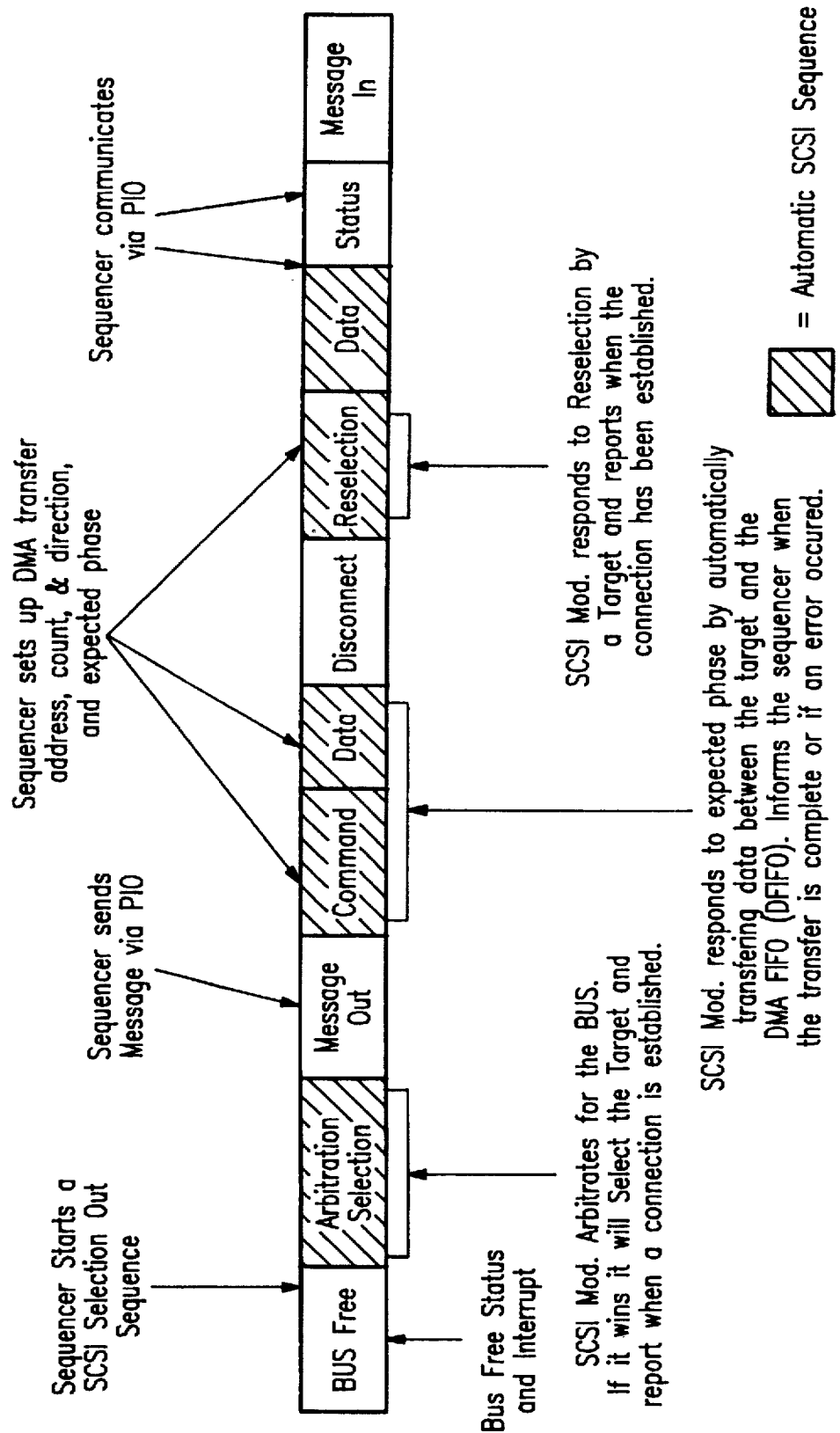
FIG. 51 is a time line of the SCSI bus execution illustrating the interaction between the SCSI bus module and the sequencer of this invention.

Automatic control circuit 5021 contains automatic hardware sequencers to perform SCSI arbitration and selection phases. FIG. 51 is a time line for a SCSI bus execution example which shows the interaction between the automated hardware in SCSI cell 432 and sequencer 320. When the SCSI "bus free" status is generated, HIM 462 takes any action that may be necessary associated with the bus free, as explained below. Sequencer 320 starts a SCSI selection out sequence after the bus free condition is handled by programming the arbitration/selection automated sequencers 5018 as discussed more completely below. SCSI hardware automated sequencers 5018 automatically arbitrate for the SCSI bus and if they win, select the target and report when a connection is established. Sequencer 320 polls the status bit for the arbitration/selection process and when it is set determines whether the SCSI phase is "Message Out." If the phase is "Message Out" sequencer 320 sends a message using a PIO transfer.

If the message phase is successful, sequencer 320 uses data in the SCB to set up the DMA transfer data address, direction and expected phase as explained more completely below. After sequencer 320 has initialized the data transfer, automated DMA hardware 5015 in SCSI cell 432 and automatic phase detection hardware 5017 respond to the expected phase by automatically transferring data between the target and data FIFO memory circuit 360.

Sequencer 320 is informed when the transfer is complete or if an error has occurred. If there is a disconnection, sequencer 320 saves the data pointers if instructed to and marks the SCB disconnected. If a reselection should occur, sequencer 320 sets up the necessary registers and transfer data for a reselection and the process goes back to the data phase. The automatic hardware in SCSI module 320 relieves sequencer 320 of many of the time consuming SCSI bus operations that would normally be performed by a microprocessor.

To initiate this process sequencer 320 uses data in the active SCB from queue-in FIFO 412. The SCSI target ID/LUN, byte 2 of its SCB, is used to set the target ID in register SCSIID.

Next register SCSISEQ has bit ENSELO set to enable a selection out sequence. Optionally, enable auto attention out bit ENAUTOATNO in register SCSISEQ may be set so that a SCSI attention is asserted when the selection out sequence is executed.

Specifically, status bit SELINGO is enabled to signal the completion of a successful arbitration and an initiation of the selection phase. Status bit SELDO is set to one when either a selection out has successfully been completed if bit TEMODEO is cleared, or a reselection out has successfully been completed if bit TEMODEO is set. Conversely, bit SELDI is set when the selection in phase has been processed. Bit TARGET is a one if host adapter 7770 has been selected and is a zero if host adapter 7770 has been reselected. An attempt to select out or reselect out may be preempted by a select in or reselect in. This completes the programming of the registers in SCSI cell 432 by sequencer 320.

SCSI Arbitration Phase

Figure 52:
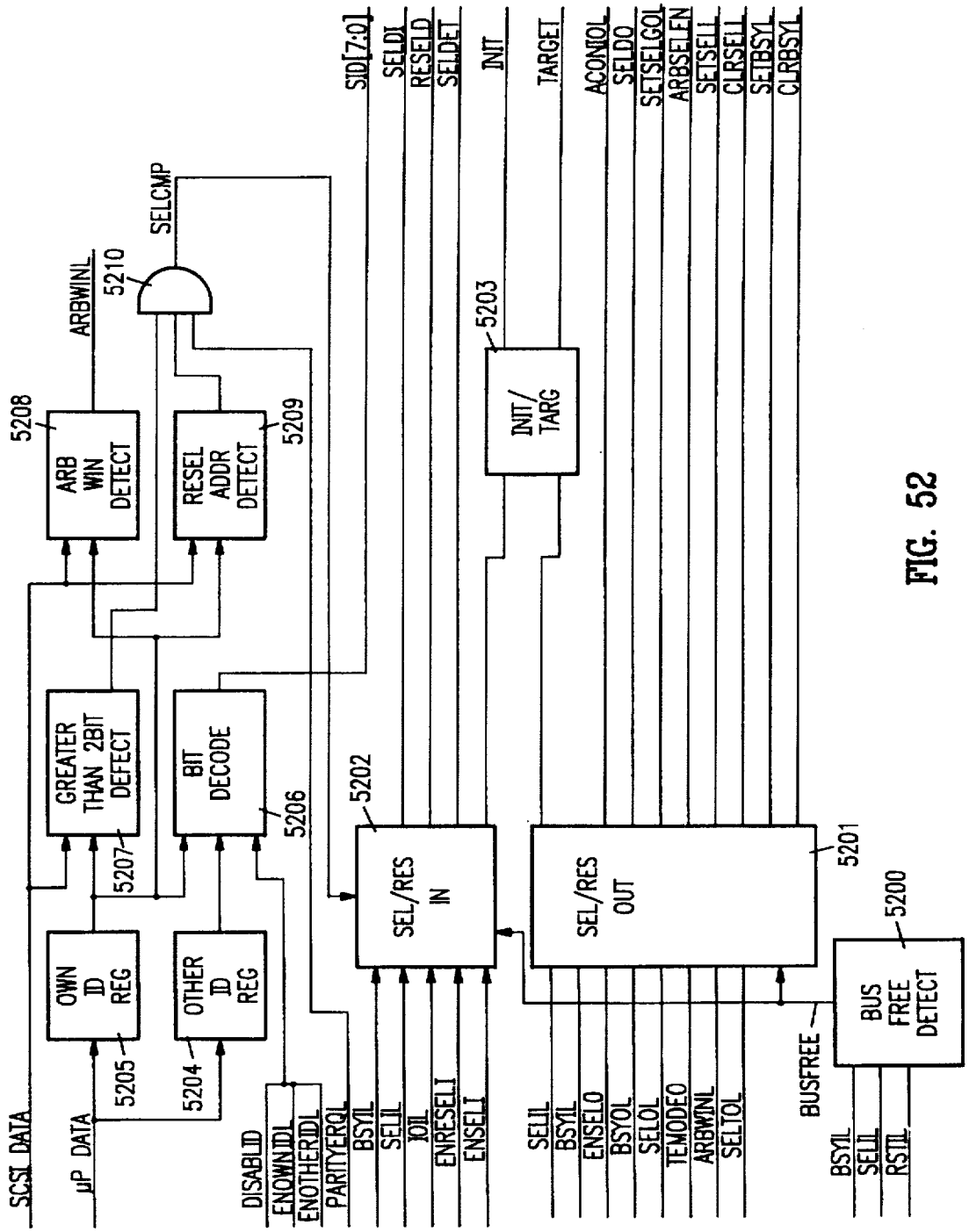
FIG. 52 is a diagram used to illustrate the automatic arbitration and reselection performed by the SCSI bus module of this invention.

The subsequent operation of SCSI cell 432 is illustrated by the block diagram of FIG. 52. In FIG. 52, signal SELIL corresponds to SCSI CNTRL bus signal SEL. Signal BSYIL corresponds to the SCSI CNTRL bus signal BSY. And signal IOIL corresponds to the SCSI CNTRL bus signal I/O. A SCSI bus free occurs when the SCSI CNTRL bus conditions of signals BSY and SEL are both false for 400 nanoseconds. Herein, reference to a line being driven means that the signal on the line is active or true. Also, a "device ID" refers to a unique bit significant ID assigned to every device on SCSI bus 400.

In response to setting bit ENSELO in register SCSISEQ by sequencer 320, SCSI arbitration phase is started by hardware selection/reselection sequencer 5018 (FIG. 50). The SCSI arbitration phase is started independent of the state of bit TEMODEO in register SCSISEQ, which is used to indicate whether a selection or reselection is desired.

When bus free detect circuit 5200 (FIG. 52) detects that signals BSYIL and SELIL from SCSI CNTRL bus 4802 (FIG. 48) are both false for 400 nanoseconds, bus free detect hardware 5200 provides a bus free signal to selection/reselection out circuit 5201. When bit ENSELO is set so that the signal on line ENSELO is driven and a bus free signal is on line BUSFREE, the signal on line SETBSYL from selection/reselection out circuit 5201 goes true after 8 20 MHz clock ticks which in turn causes a SCSI bus signal BSY on SCSI CNTRL bus 5002.

Signal BSY drives the signal on line BSYOL to select/reelect out hardware 5201 active. The active signal on line BSYOL in turn drives the signal on line ARBSELEN active. The signal on line ARBSELEN in combination with the signal on line ENOWNIDL to bit decode circuit 5206 causes circuit 5206 to drive on SCSI data bus 5003 bits OID in register SCSIID. Arb-win detect logic 5008 processes data on SCSI data bus 5003. If SCSI cell 432 has the highest priority, Arb-win detect logic 5208 drives the signal on line ARBWINL active which in turn provides an active signal to selection/reselection out circuit 5201. After 32 20 MHz clock ticks, the signal on line SETSELL goes high causing SCSI bus signal SEL to be driven on SCSI CNTRL bus 5002. Consequently, the signal on line ENOTHERID to bit decode circuit 5206 goes active causing bit decode circuit 5206 to drive on SCSI data bus 5003 the data in other device ID register 5204, i.e., the ID in bits TID of register SCSIID.

If, after 32 20 MHz clock ticks, host adapter 7770 does not have the highest priority, or alternatively SCSI CNTRL bus select signal SEL is driven by another device, i.e., the signal on line SELIL goes active, the signal on line CLRBSYL goes active causing SCSI CNTRL bus busy signal BSY to be released. The signal on line ENOWNIDL goes inactive with the signal on line ARBSELEN causing the ID bits to be released. If host adapter 7770 drives the SCSI CNTRL bus select signal SEL, i.e., the signal on line SELOL is active, host adapter 7770 control of SCSI bus 400 and proceeds to Selection out or Reselection out depending on the state of bit TEMODEO in register SCSISEQ.

SCSI Selection Out Phase

Since selection out as an initiator is being considered, bit TEMODEO in register SCSISEQ is cleared and so autoselection circuit 5018 in SCSI cell 432 attempts a selection as an initiator after the SCSI arbitration phase. After 44 20 MHz clock cycles, the signal on line INIT is driven active by init/targ hardware 5203. The active signal on line INIT is used to enable only certain parts of autoselection circuit 5018 in the initiator mode. After line SEL is driven active by the active signal on line SELOL, the signal on line ENOTHERID goes active and the ID of the target device is driven on SCSI bus 110, as detailed above. After forty-five 20 MHz clock ticks, the signal on line CLRBSYL goes active causing SCSI cell 432 to release the SCSI bus busy signal BSY which in turn signals the start of the SCSI selection phase.

Next, the signal on line SETSELGOL goes active causing bit SELINGO in register SSTAT0 to be driven active to indicate that the selection phase has started. After 49 20 MHz clock ticks, logic is enabled in hardware 5201 to look for an active signal on line BSYIL while SCSI bus select signal SEL stays active. The target device drives SCSI bus signal busy BSY upon matching the target device ID on SCSI bus 400 with its own ID when SCSI bus select signal SEL is active. The signal on line BSYIL going active causes bit SELDO in register SSTAT0 to go active after three 20 MHz clock ticks to indicate that the selection phase has been completed.

If the selection is successful, bit SELDO is set. The signal on line CLRSELDO goes active one clock tick after bit SELDO is set which releases the SCSI bus select signal SEL. Then, the signals on lines ENOWNID and ENOTHERID go inactive to release the IDs from the SCSI bus and at this time SCSI bus 400 is under control of the target.

Automatic sequencer hardware phase detect 5017 starts monitoring bits SELDO in registers STAT0 and bit SELTO in register STAT1 after bit SELINGO is set. If the selection is successful, bit SELDO is set, as just described. If the selection timer times out prior to a successful selection, bit SELTO is set and bit SELDO is cleared. The automatic hardware sets its appropriate status bits so that they can be polled by sequencer 320.

If bit ENAUTOATNO, bit 3, in register SCSISEQ is set, attention bit ATNO in register SCSISIGO is active during the selection phase. Hence, the next usual event on SCSI bus 400 after the selection phase is complete, is the message out phase. In the message out phase, a message from the SCB is sent out on SCSI bus 400. Host driver 260 has control over the content of the message and may disable disconnection by the target by loading an ID message with the proper bit cleared. If the attention signal is not driven during the selection phase, this phase is not entered by the target.

Host driver 260 can also execute synchronous negotiation or wide negotiation with this target at this time by setting the appropriate bit in the synchronous or wide control byte. Sequencer 320 generates an interrupt if it needs assistance to execute the phase after the ID message. If sequencer 320 generates an interrupt, host adapter driver 260 continues the message out sequence and/or handles other messages. Sequencer 320 is either released by host adapter driver 260 or allowed to continue the sequence.

After either message out phase or selection phase, the command phase is usually entered. However, prior to considering the command phase, in more detail, the operation of the other automatic hardware sequencers in SCSI cell 432 are considered.

SCSI Reselection In Phase

To perform a reselection in, the ID for host adapter 7770 is in register SCSIID. Bit ENRESELI in register SCSISEQ is set to enable reselection in by sequencer 320. Optionally, bit ENAUTOATNI is set to enable generation of signal ATN upon reselection. Host adapter 7770 is enabled to initiate reselection when bit ENRESELI in register SCSISEQ is set. The signals on the SCSI data bus 5005 are compared by the automated hardware against the ID of SCSI cell 432 as written in bits OID in register SCSIID using reselect address detect circuit 5209. When the comparison is true, AND gate 5210 drives the signal on line SELCMP to Selection/ Reselection in hardware 5202 active. When the signals on lines SELIL, IOIL and SELCMP are all true and the signal on line BSYIL is false, after a delay of eight 20 MHz clock ticks, selection/reselection in circuit 5202 drives the signal on line SELDI active which in turn sets bit SELDI in register SSTAT0 with bit TARGET in register SSTAT0 cleared. The active signal on line SELDET latches the IDs which are on SCSI bus 400.

Sequencer 320 waits for status bit SELDI to be set to "1" with bit TARGET set to "0". (If bit SELDI is set to 1 and bit TARGET is set to 1, host adapter 7770 has been selected by an initiator.) Upon setting of bit SELDI, sequencer 320 determines, as described more completely below, which target is reselecting the host and loads appropriate information in register SCSIRATE. The expected phase is set in register SCSISIGO. Sequencer 320 continues with an information transfer as described more completely below.

SCSI Selection In Phase

To execute an automatic selection in, bits OID in register SCSIID are set to the ID of the active SCSI cell and sequencer 320 sets bit ENSELI in register SCSISEQ to enable the selection in. Optionally, bit ENATNTARG is also set to enable an interrupt on assertion of signal ATN by the initiator. Sequencer 320 waits for status bit SELDI to be set to one with bit TARGET set to one. (If bit TARGET is "0" and bit SELDI is "1", the SCSI cell has been reselected by a target.) Upon setting of bit ENSELI, signals on SCSI data bus 5005 are compared against the ID written in bits OID of register SCSIID. Specifically, the signals on line SCSIDATA and the signals from Own ID Register 5205 are compared by circuit 5209 and if they are the same, the signal on line SELCMP is driven active.

When the address on the SCSI data bus 5003 matches the OID address, and the signal on line SELIL is true, the signal on line IOIL is false and line BSYIL false, after a delay of eight 20 MHz clock ticks, selection/reselection in hardware 5202 drives the signal on line SELDI active which in turn sets bit SELDI in register SSTAT0. Bit TARGET in register SSTAT0 is also set by init/targ circuit 5203. In addition, the signal on line SELDET goes true and latches the IDs which are on the SCSI bus.

When sequencer 320 detects that bit SELDI is set with bit TARGET equal to one, sequencer 320 determines which initiator is selecting host adapter 100 by examining register SELID. When the initiator is determined, the appropriate information is loaded in register SCSIRATE.

SCSI Reselection Out Phase

The final sequence performed automatically is reselection out as a target. For a reselection out, registers SCSIID and SCSIRATE are set up with the appropriate values for the reselection by sequencer 320. The phase that is to be entered after reselection is set in register SCSISIGO. Bits SEL0, BSY0, REQ0, ACK0 and ATN0 are set to "0". Bits ENSELO and TEMODEO in register SCSISEQ are set to "1" to enable the reselection out process. Bits ENAUTO-ATNO and ENAUTOATNP are set to "0."

When bit TEMODEO in register SCSISEQ is set, a reselection as a target is initiated after arbitration. After 44 20 MHz clock cycles, the signal on line ACONIOL from hardware 5201 goes active and drives the SCSI bus signal IO. In addition, the signal on line ENOTHERID also goes active and the ID of the device being reselected, i.e., the other ID, is driven on SCSI data bus 5003 by circuit 5206. The signal on line TARGET from init/targ circuit 5203 is also set to indicate target mode operation. After 45 20 MHz clock ticks, the signal on line CLRBSYL goes active causing to release of SCSI busy signal BSY, which signals the start of the reselection phase. The signal on line SETSELGOL goes active causing bit SELINGO in register SSTAT0 to be set which indicates that the selection phase has started.

At this point, sequencer 320 waits for the signal on line BSYIL to go active. The initiating device drives signal BSY active by matching the initiator's ID while the signals on lines SEL and I/O are active. Three clock ticks after this match, bit SELDO in register SSTAT0 goes active and the signals on lines SETBSYL and CLRSELL go active causing the automated reselection hardware to drive SCSI busy signal BSY and release SCSI select signal SEL. The initiator detects the signal on line SEL as false and releases signal BSY. When bit SELDO goes active, a the reselection is now complete.

Sequencer 320 polls for either the SELINGO or SELDO status in register STAT0 to be set or alternatively monitors the status of bit SELTO in register SSTAT1 if the hardware selection timeout is enabled. Upon sensing that bit SELDO is set, register SXFRCLT1 is set to enable the desired transfer options. Register STCNT is loaded with the transfer count. Register SXFRCTL0 is set to an enable SCSI transfer. The proper channel for the transfer is selected and cleared. If the SCSI transfer mode is SCSI PIO, the channel selects and clears are not necessary. The data transfer proceeds as described more completely below.

After either message out phase or selection phase, the command phase is usually entered. Sequencer 320 retrieves the command pointer from the SCB area and sends the number of bytes requested by the target up to the limit in the command byte count in the SCB. The command is sent to SCSI bus 400 using the DMA features in SCSI cell 432.

Typically, the data phase is the next process encountered. Data transfers between SCSI bus 400 and the host computer system in the data phase are accomplished by DMA transfers. During DMA type transfers, SCSI cell 432 controls all SCSI handshaking and controls the transfers between data FIFO circuit 360 and SCSI FIFO circuit 4825.

The direction of the data phase, determined by bit IOL is loaded into a bit in register DFCNTRL. The phase should be "data in" or "data out" at this time, and is loaded into the expected phase register, SCSIOUT. Once the control register and data/address pointers have been initialized and the appropriate conditions exist on SCSI bus, DMA transfer control logic transfers data automatically between SCSI bus 400 and data FIFO memory circuit 360 through the SCSI FIFO without further intervention from sequencer 320.

The number of bytes expected is loaded into a 24 bit counter, which is decremented for each byte transferred accesses the SCSI bus during the data phase. A byte is considered transferred when the associated handshake has occurred on SCSI Bus (REQ/ACK) in the write direction, or when the byte has been written to data FIFO circuit 360, which is discussed in the host interface module description, in the read direction.

Thus, the DMA logic works in conjunction with automated REQ/ACK logic to transfer data on the SCSI bus with the correct timing and protocol. The DMA logic also controls the transfer of data between the SCSI FIFO and data FIFO, and insures proper byte alignment of DIFIFO words with respect to the host memory starting address. If the DMA logic is executing a data transfer and is disabled or otherwise unexpectedly interrupted (i.e. unexpected phase change), the logic goes to an idle state in a manner that insures that no data is lost due to the interrupting event occurring when the logic is in a transitory/intermediate state. Counters and status reflect the true state of the transfer.

A transfer can be monitored via interrupts or by polling status bits. When a transfer between SCSI bus 400 and data FIFO memory circuit 360 is complete, SCSI module 330 posts a transfer done condition "SDONE" in register SSTAT0, and notifies host module 310 via signal SXFER-DONE. If the direction of transfer is a SCSI Read (from SCSI), signal SXFERDONE forces host module interface 310 to complete the current transfer to host memory 230 regardless of the data FIFO threshold settings. Bit DMA-DONE in register SSTAT0 is the logical AND of the SDONE and HDONE signals, and is used to inform the sequencer 320 that the transfer of data between SCSI bus 400 and host bus 226 is complete.

Two separate counters are maintained to accomplish direction dependent counting. The sense of signal DIREC-TION dictates which counter is actually accessed when reading the transfer count registers.

Registers SHADDR0 to SHADDR3 and registers STCNT0 to STCNT2 are the two transfer counters used in normal DMA data transfer and automatic PIO data transfers to regulate the flow of data and provide status information regarding the current transfer. These counters contain the next starting address and the number of bytes remaining to be transferred when a disconnect occurs. In DMA mode, both bit SDMAEN and bit SCSIEN must be disabled prior to reading or loading these counters. The counters are enabled when either bit SDMAEN, bit SPIOEN or bit SCSIEN is set and there is either a non-zero transfer count or a zero transfer count with bit SWRAPEN set.

An address pointer, which is contained in counters SHADDR0 to SHADDR3, is loaded when the host address pointer is loaded in registers HADDR0 to HADDR3 at address 088 to 08Bh. The current value of address pointer is obtained by reading registers SHADD0 to SHADDR3. Registers STCNT0 to STCNT2 are the 24-bit counter that contains the DMA SCSI transfer count, which is the number of byte remaining to be transferred.

Register STCNT0 is the least significant byte, register STCNT1 is the middle byte, and register STCNT2 is the most significant byte. Loading 000000h in registers STCNT0 to STCNT2 either gives a byte transfer count of 16777216 decimal (16M Hex) if bit SWRAPEN, bit 6, in register SXFRCTL1 is set, or gives a transfer count of 0 if bit SWRAPEN is cleared. The counter counts down one for each SCSI byte transferred when either bit SDMAEN, SPIOEN or SCSIEN is set and there is either a non-zero transfer count or a zero transfer count with bit SWRAPEN set.

Bit SDONE, bit 2, in register SSTAT0 is set when the value of the counter equals 000000h. Bit SWRAP is set when bit SWRAPEN is set and the transfer counter counts from 000000h to FFFFFFh. Bit SWRAP is preferably cleared by setting bit CLRSWRAP, bit 3, in register CLRSINT0 before the next wrap. Sequencer tracks the number of wraps. The count is set to zero on a chip reset.

Counter STCNT is examined by sequencer 320 after the data phase for correctness. An interrupt is generated by sequencer 320 to indicate an underrun condition when there is a residual count. Host adapter driver 260 may program host adapter 7770 to zero fill or to interrupt on a write operation overrun condition.

In manual PIO mode, SCSI cell 432 is used as a bus buffer and has no control functions. Host driver 260 transfers data directly to and from SCSI bus 400 via SCSI data latch registers SCSIDATH and SCSIDATL and processes SCSI control signals via SCSI signal registers SCSISIGI and SCSISIGO. Manual PIO only supports asynchronous transfers and is usually used during the message and status phases.

In automatic PIO mode, sequencer 120 transfers data directly to and from SCSI bus 400 via the SCSI data latch registers SCSIDATH and SCSIDATL, while SCSI cell 432 performs SCSI bus control automatically.

Automatic PIO transfers on SCSI bus 400 are enabled by setting bit SPIOEN, bit 3, in register SXFRCTL0. Completion of the data transfer is signaled by an interrupt or by polling status bit SPIORDY in register SSTAT0. Automatic PIO mode only supports asynchronous transfers and is usually used during the message and status phases. Automatic PIO may be enabled during normal DMA data transfers without adverse effect. This practice allows handshake of Message In bytes with no additional bit manipulation.

For 8-bit automatic PIO in initiator mode, when the SCSI I/O signal indicates the "out" direction with signal REQ active and bit SPIORDY a one, data may be written to register SCSIDATL. Writing data to register SCSIDATL clears bit SPIORDY. The data in register SCSIDATL is presented on SCSI bus 400, i.e., the data is passed through SDO multiplexer 29 and latched in SDO latch 24, and signal ACK is driven active. In response to signal ACK, signal REQ is driven inactive by the target, which in turn clears signal ACK. This process is repeated for each byte transferred in the automatic PIO mode.

For 8-bit automatic PIO in initiator mode, when the SCSI I/O signal indicates the "in" direction with signal REQ active and bit SPIORDY a one, valid data has been latched in register SCSIDATL. When register SCSIDATL is read, signal ACK is driven active on SCSI bus 400 and bit SPIORDY is cleared.

For 8-bit automatic PIO in target mode, when the SCSI I/O signal indicates the "out" direction, signal REQ is driven active. The initiator, as described above, in response to signal REQ, presents 8 bits of data on SCSI bus and drives signal ACK active. The data on SCSI bus 00 is latched in register SCSIDATL on the leading edge of signal ACK and bit SPIORDY in register SSTAT0 is set. In response to bit SPIORDY being set, the byte of data in register SCSIDATL is read. Reading register SCSIDATL with bit SPIOEN in register SXFRCTL0 set causes another signal REQ to be driven active on SCSI bus and clears bit SPIORDY.

For 8-bit automatic PIO in target mode, when the SCSI I/O signal indicates the "in" direction and data is written to register SCSIDATL, the data is driven on SCSI bus 400 by passing the data through SDO multiplexer 5029 and latching the data in SDO latch 5024, signal REQ is driven active and bit SPIORDY is cleared. When register SCSIDATL is read by the initiator, signal ACK is driven active on SCSI CNTRL bus 4802. In response to signal ACK, signal REQ is driven inactive and bit SPIORDY is set.

Automatic PIO may also be used for 16-bit SCSI data transfers if asynchronous timing is used. In this case register SCSIDATH is written to or read from first because, as just explained, the SCSI handshake signals REQ and ACK are triggered by access to register SCSIDATL.

In wide mode, SCSI cell 432 also performs the SCSI data transfers and bus control automatically. Data is transferred automatically between SCSI bus 400 and host interface module's data FIFO circuit 360 through SCSI FIFO circuit 4825. This transfer also can be monitored via interrupts or by polling status bits. Wide DMA transfers, which are of the odd length and/or odd boundary type, are also handled automatically.

Wide SCSI data transfers are enabled by setting bit SELWIDE bit in register SBLKCTL. When SCSI channel zero is operating in the wide mode, SCSI channel one is disabled by clearing bit SELBUS1 in register SBLKCTL because, as explained above, the upper byte D[8:15,P] for SCSI channel zero is routed from shared pins that are normally used by SCSI channel one. With SCSI channel zero in wide mode, the state of bit WIDEXFER in register SCSIRATE determines whether 8-bit or 16-bit SCSI data transfers occur in the data phase. Note that signals REQB and ACKB for the second SCSI channel are not supported and so a "P" type cable as defined in "SCSI-3" must be used to implement a wide SCSI bus.

Sixteen bit wide data transfers, that have an odd length and/or start on odd segment boundaries, are handled automatically by SCSI data transfer control logic. Since the first word from host bus 226 for an odd boundary write has a "dummy" low byte, (see FIG. 45D) SCSI data transfer logic 5015 reads only the high byte of the first word from data FIFO circuit 360 and subsequently packs the remaining bytes sent to SCSI bus 400. On an odd boundary read, SCSI data transfer logic 5015 writes the first (low) byte of the first word transferred from SCSI bus 400 to the high byte of data FIFO circuit 360. This causes the first word in data FIFO circuit 360 to have a "dummy" low byte. For odd length writes, the last byte is placed in the low byte position of the last word and a dummy byte is placed in the high byte position. Although usually done automatically, for scatter-gather considerations, the "stuffing" of a dummy byte can be held off temporarily until another valid byte can be packed (from the next segment) by setting bit WIDEODD before starting the transfer. Transfers that are odd length reads to even boundaries or even length reads to odd boundaries have a residual byte at the end of the transfer. This last byte is transferred to data FIFO circuit 360 in the low byte position of the last word with a "dummy" byte in the high position.

SCSI data transfer control logic 5015 automatically handles odd length and odd segment conditions described above by examining the state of bit DIRECTION, bit 0 of register STCNT0, and bit 0 of register SHADDR0 at the beginning of the wide data transfer. Table 38 illustrates how the decisions are made: (DIR 1=write, 1=read; CNT=bit 0 of register STCNT0; ADDR=bit 0 of register SHADDR0)

TABLE 38

| DIR | CNT | ADDR | Byte Align | Last Byte |
|---|---|---|---|---|
| 1 (W) | 0 | 0 | Normal | Normal |
| 1 (W) | 0 | 1 | Start DFIFO RD from High | Normal |
| 1 (W) | 1 | 0 | Normal | Auto Xfer last byte w/dummy to SCSI Bus |
| 1 (W) | 1 | 1 | Start DFIFO RD from High | Auto Xfer last byte w/dummy to SCSI Bus |
| 0 (R) | 0 | 0 | Normal | Normal |
| 0 (R) | 0 | 1 | Start DFIFO WR at High | Auto Xfer last byte w/dummy to DFIFO |
| 0 (R) | 1 | 0 | Normal | Auto Xfer last byte w/dummy to DFIFO |
| 0 (R) | 1 | 1 | Start DFIFO WR at High | Normal |

In a data transfer from SCSI bus 400 to SCSI FIFO 4825, the SCSI words are written to SCSI FIFO asynchronously with respect to the internal clock by the request signal REQ (INIT mode) or acknowledge ACK (Target mode) signals on the SCSI bus. If the transfer mode is 8-bits, SCSI FIFO 4825 appears as a 15 position, 8 bit wide FIFO memory. If the transfer mode is 16-bits, SCSI FIFO 4825 appears as an 8 position, 16-bit wide FIFO memory. The internal write pointer increments by one for each SCSI handshake signal REQ/ACK in both cases. The SCSI FIFO counter, i.e., register SSTAT2, is a byte counter and counts up by one or two depending on whether the SCSI transfer mode is 8-bit or 16-bit, respectively. The byte counter is incremented synchronously and is used to generate SCSI FIFO full and empty status signals.

In a data transfer from SCSI FIFO to data FIFO, data to be written to data FIFO is read from the SCSI FIFO one byte at time. Since words in the SCSI FIFO can be either 8-bits wide or 16-bits wide, the internal SCSI FIFO read pointers automatically adjust for the width of the transfer to insure the proper byte order from the SCSI FIFO is preserved. Thirty-two-bit data FIFO (herein "data FIFO is the same as "data FIFO memory") words are assembled or "packed" from individual bytes that have been read from the SCSI FIFO. The packing of 16-bit words insures the proper byte alignment with respect to the host memory by examining the starting address and the length of the current data transfer, as described above.

As an example consider, a 16-bit word [B,A] (B=high byte, A=low byte) from the SCSI bus containing the first two bytes of the current data transfer is read out of the SCSI FIFO one byte at a time—first [A], then [B]. The starting address of the current data transfer is an odd address. Instead of simply reassembling the word in the same order as it came from the SCSI bus, the first byte [A] is placed in the high byte position of the first DFIFO 2-byte word with a dummy byte [X] in the low byte position [A,X]. The second byte read from the SCSI FIFO is placed in the low byte position of the second DFIFO word [ ,B]. The second DFIFO word will be completed with data from the second SCSI word [D,C].

An odd length WIDE mode transfer contains a residual byte that is processed by SCSI FIFO 4825. This residual byte is automatically flushed from SCSI FIFO 4825 at the end of a transfer (STCNT=0) unless bit WIDEODD is set. Note that it is possible for a 16-bit SCSI word to be split by a scatter-gather segment boundary. If this occurs, the last byte of the currently programmed transfer (address and length) are the low byte in this word, and the first byte of the next segment (address and length) is the high byte. Bit WIDEODD insures that during a scatter-gather transfer, if a 16-bit SCSI word is split by a segment boundary, the high byte of the word is not mistakenly flushed as a residual byte, as it will be already in SCSI FIFO 4825 at the end of the current segment transfer. The counter logic is also cognizant of this fact and takes into account the extra byte already in SCSI FIFO 4825 at the beginning of the next segment transfer.

In a data FIFO to SCSI FIFO data transfer, data is read from data FIFO, one 16-bit word at a time. The configuration of SCSI FIFO 4825 during this type of transfer is 8-bits wide, thus data is written to SCSI FIFO 4285 only one byte at a time. Proper byte alignment with respect to host memory 230 is insured by examining the starting address and the length of the current data transfer. With the address and length information, the logic and determine whether to start reading from the high or low byte position of the first data FIFO word, as explained above.

In a SCSI FIFO to SCSI Bus data transfer, since the configuration of the SCSI FIFO during this type of transfer is 8-bits wide, data is read from SCSI FIFO 4825 only one byte at a time. If data is available in the SCSI FIFO, a SCSI byte (or a word if in WIDE mode) is output to the SCSI bus in response to a request by REQ/ACK control logic 5013 in automatic control logic 5021. Once the SF2S logic acknowledges the data is output to SCSI bus 400, REQ/ACK control logic 5013 in automatic control logic 5021 handles the actual writing or strobing of the SCSI data.

Arbitration in the wide mode is handled in a manner in accordance with the SCSI-2 specification. To accommodate 8-bit devices on a 16-bit wide bus, the priority scheme illustrated in Table 39, is followed.

TABLE 39

|  | Highest ID | Lowest ID |
|---|---|---|
| P-Cable | 7 ___ > 0 | 15 ___ > 8 |

This scheme insures that 8-bit devices are given fair consideration during arbitration.

SCSI module 330 has one interrupt signal, SCSIINT, which always originates from the active SCSI channel. SCSI status and interrupt logic 5011 (FIG. 50) provides for masking, generation, and clearing of all interrupts. This logic includes the interrupt mask register, i.e. register SIMODE, interrupt clear register, i.e., register CLRSINT, and interrupt status registers, i.e., SSTAT0 and SSTAT1 registers. A SCSI interrupt SCSIINT is caused by some significant event occurring such as Selection/Reselection Successful, SCSI Reset, Transfer Done, Unexpected Bus Free, or Selection Timeout.

A SCSI interrupt SCSIINT is generated only when an interrupt condition occurs and the enable bit associated with the condition is set in mask registers SIMODE0 or SIMODE1. When an interrupt is generated, the status registers SSTAT0 and SSTAT1 contain the cause of the interrupt. The interrupt condition that caused generation of interrupt SCSIINT is cleared by writing to the associated bit in the appropriate clear register CLRSINT0 or CLRSINT1, or by the condition that caused the interrupt going away. Upon receiving an interrupt, host adapter driver 260 may want to examine all bits in status registers SSTAT0 and SSTAT1 since the occurrence of another interrupt causing event before the host computer services the original interrupt sets another bit in one of the status registers but does not generate another SCSI interrupt while the original interrupt is active.

Sequencer 320 handles all disconnections. The SCB contains the address pointer and byte counter for the particular transfer. If the Save Data Pointers message is received, the current value of the data pointer is saved in the SCB area. If the Disconnect message is received without the Save Data Pointers message, the value in the SCB area is not changed. Sequencer 320 marks the SCB as a disconnected command so that the proper SCB may be found at reconnect time.

Reselection is always enabled, and when a target reselects host adapter 7770, sequencer 320 gets the logical unit number LUN from the ID message and attempts to match the target ID, channel, and logical unit number LUN to a disconnected SCB. If one is found the Tag Enable bit, bit 5, in the control byte of the SCB is checked, and if enabled, the Tag value is received and the correct SCB continued. Sequencer 320 then follows the target's phase and if the data phase is entered, the address pointer and byte counter are loaded and the data transfer continued from where it was left off. If a match to an SCB is not found, then host driver 260 is interrupted.

Host adapter 7770 will support the Modify Data Pointer message if Scatter/Gather of more than one segment is not being used. Sequencer 320 accepts the two's complement value of the offset from the target and adds the value to the current pointer. If Scatter/Gather is active for the present command, sequencer 320 sends a Message Reject message to the target.

The Status phase is handled by sequencer 320. The status byte is saved in a SCB location for examination later by host driver 260. If the status value or the command complete message is non-zero, host driver 260 is interrupted after the command complete message is received.

The command complete message is sent to the initiator after the status phase. This is handled by sequencer 320 and causes a command complete status bit to be set for a command complete interrupt. A Linked Command Complete message causes a sequencer interrupt with the appropriate code.

To implement a SCSI differential interface on SCSI channel zero, differential drivers with the appropriate logic are added externally. The SCSI differential interface functions automatically without the need for any intervention by host driver 160. The control signals for the differential interface (i.e., SO_Diff bus 01), have four data bits (DIFFDAT), one strobe (DIFFSTRB) and 2 address bits (DIFFADR). The hardware external to host adapter 100 is assumed to have the address map and bit definition given in Table 40.

TABLE 40

| | Address Definition | | |
|---|---|---|---|
| Data bits | Adr=0 | Adr=1 | Adr=2 |
| DIFFDAT3 | SCSI ID 3 | ENRST | |
| DIFFDAT2 | SCSI ID 2 | ENARB | ENDRV |
| DIFFDAT1 | SCSIID 1 | ENSEL | ENTARG |

TABLE 40-continued

| DIFFDAT0 | SCSIID 0 | ENBSY | ENINIT |
|---|---|---|---|
| | Bit Definition | | |
| SCSI ID | 0–3 Own ID from SCSIID register | | |
| ENARB | Enables OID onto SCSI Data bus | | |
| ENSEL | Enables SEL, Data drivers, and ATN onto SCSI bus | | |
| ENBSY | Enables BSY onto SCSI bus | | |
| ENDRV | Enables Data drivers onto SCSI bus | | |
| ENTARG | Enables C/D, I/O, MSG, REQ/ BSY onto SCSI bus | | |
| ENINIT | Enables ACK, ATN onto SCSI bus | | |
| ENRST | Enables RST onto SCSI bus | | |

Address zero is written when OID, bits 0–3, in SCSIID register are written. At this time the SCSI ID for SCSI channel zero is latched externally and used during arbitration. Address one is written to at the appropriate time with the appropriate values to enable RST, BSY, SEL, or the SCSI ID for arbitration and selection. Address two is written after a successful select or reselect and identifies the device as an initiator or a target and enables the drivers for the appropriate direction.

Figure 53A:
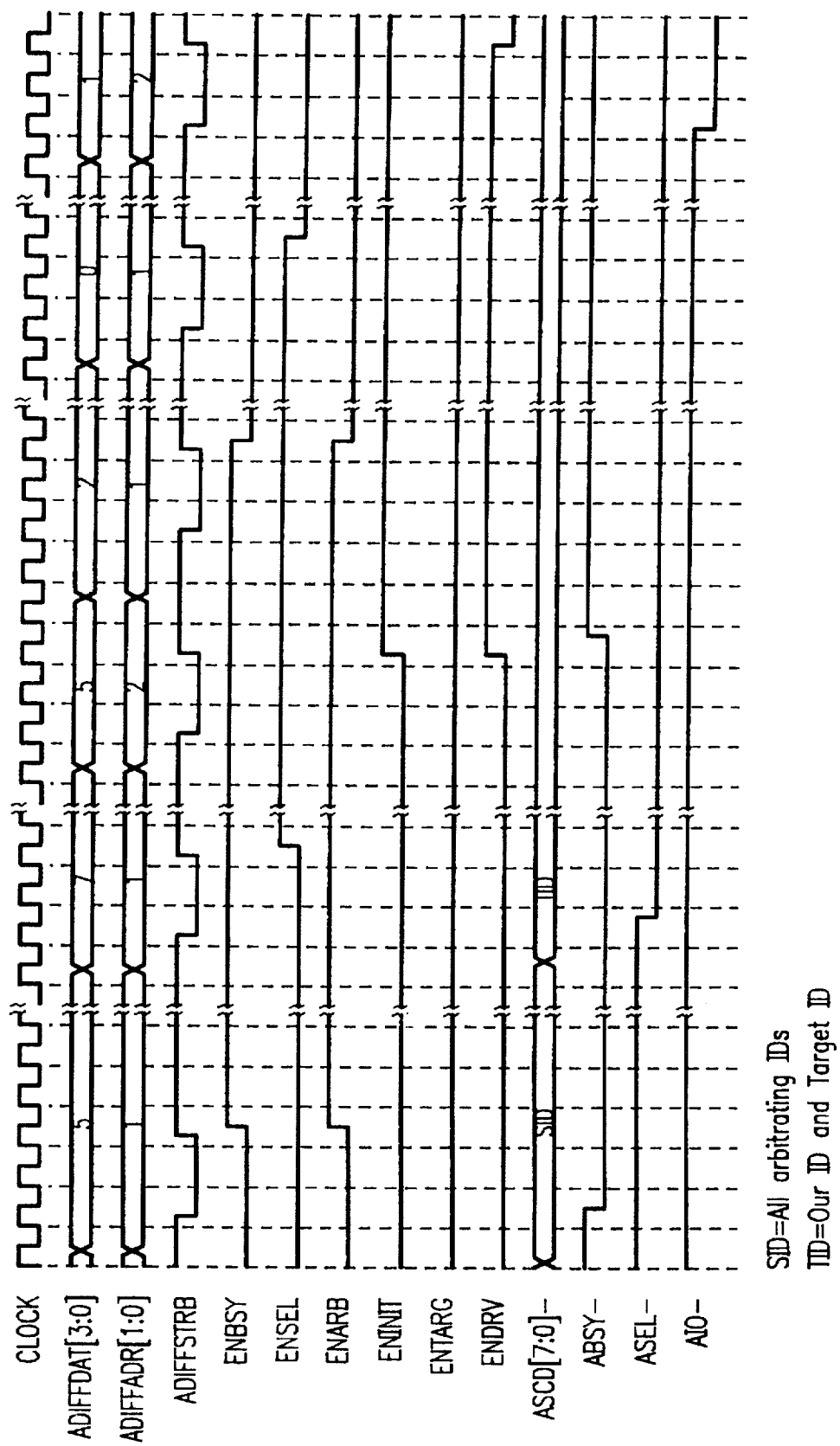
FIG. 53A is a timing diagram for initiator arbitration selection for differential operation of the SCSI bus module of this invention.
Figure 53B:
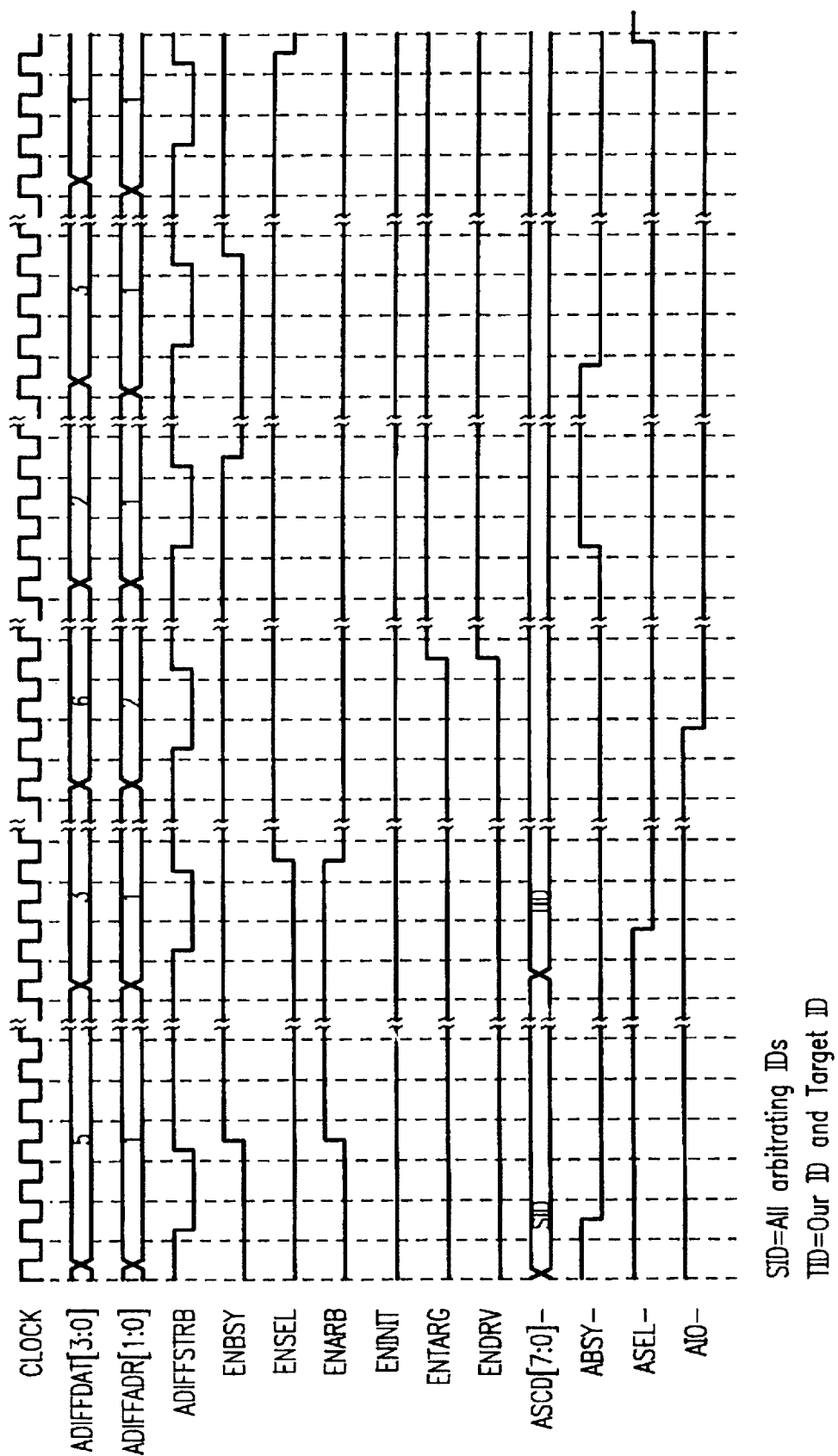
FIG. 53B is a timing diagram for target arbitration selection for differential operation of the SCSI bus module of this invention.
Figure 53C:
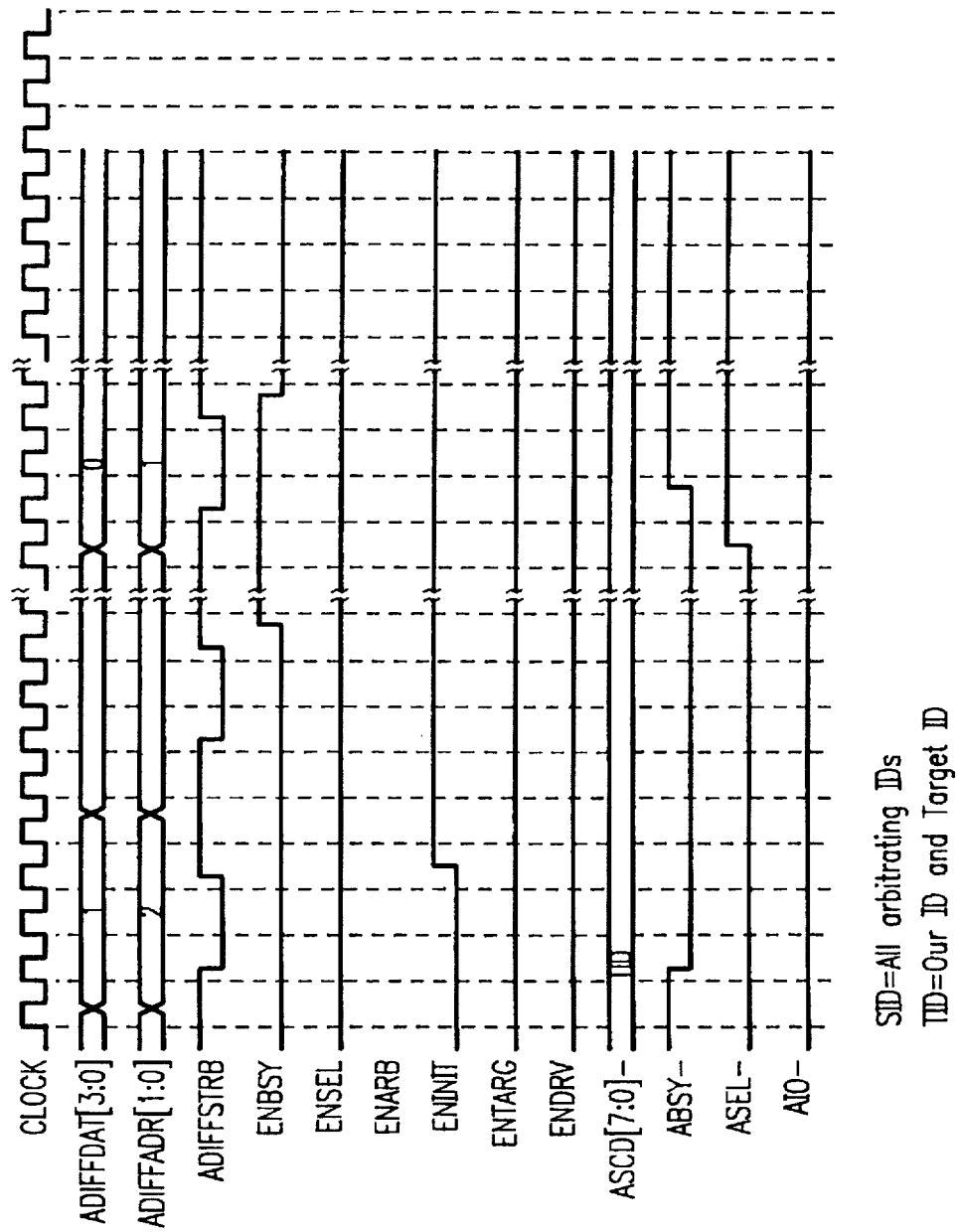

The operation of the differential section for a Selection from Arbitration on is as follows. After the detection of a BUS FREE condition, bits ENBSY and ENARB are automatically set. Setting bit ENBSY drives signal BSY onto the SCSI bus. Setting bit ENARB drives only the SCSI ID bits onto the SCSI bus. The SCSI data lines are monitored and if it is determined that arbitration is won, bits ENSEL and ENBSY are set and bit ENARB is cleared. The external logic turns on the data drivers to allow the cell's and the target's IDs to be driven, as well as the ATN driver. After the appropriate amount of time, bit ENBSY is cleared and bit ENSEL is set. When the target responds with signal BSY, the selection is complete. SCSI cell then sets bits ENDRV and ENINIT, and clears bits ENSEL and ENBSY in that order. FIGS. 53A to 53C are timing diagrams for differential operation.

There are several problems that arise when implementing 16-bit selection, and mixing 8- and 16-bit devices. The problem is to validate the selection before responding to it under all the conditions that may occur. Consider a 16-bit initiator and 8-bit target on a bus. When the target reselects, the upper 8-bits are not driven which causes a parity error to occur on the upper byte. In the case of a selection with the initiator having an ID in the upper byte, the target will be selected in single initiator mode and will not disconnect. An 8-bit initiator selecting a 16-bit target has similar problems. One solution is to decode the data bits to allow only certain combinations before responding to the selection. Following is a table of allowable low byte and high byte combinations that may occur during valid selections. The selections include 16 to 16, 8 to 16, 16 to 8, and single bit. The logic is as follows:

| Valid combinations | Low byte Data/Parity | High byte Data/Parity |
|---|---|---|
| 1. 16 to 16 OR 16 single bit | 0 bits/1 | 2 bits/1 |
| 2. 16 to 16, 16 to 8, OR 8 single bit | 1 bit/0 | 1 bit/0 OR 0 bits/x |
| 3. 16 to 16, OR 8 to 16 | 2 bits/1 | 0 bits/x |

Figure 54A:
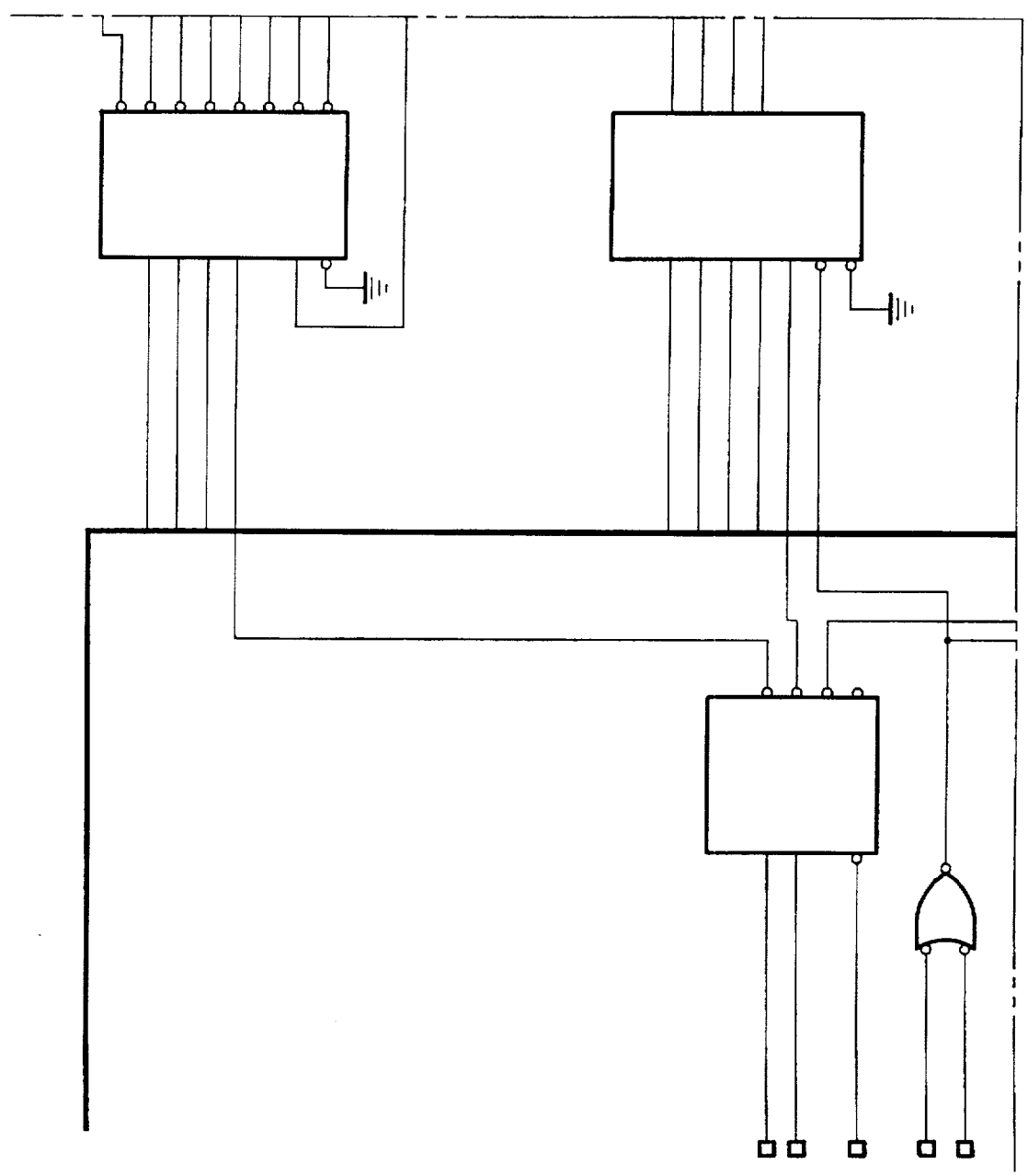
FIG. 54, which is a key to FIGS. 54A, 54B, and 54C, is a diagram of the differential controls for the SCSI module of this invention.
Figure 54B:
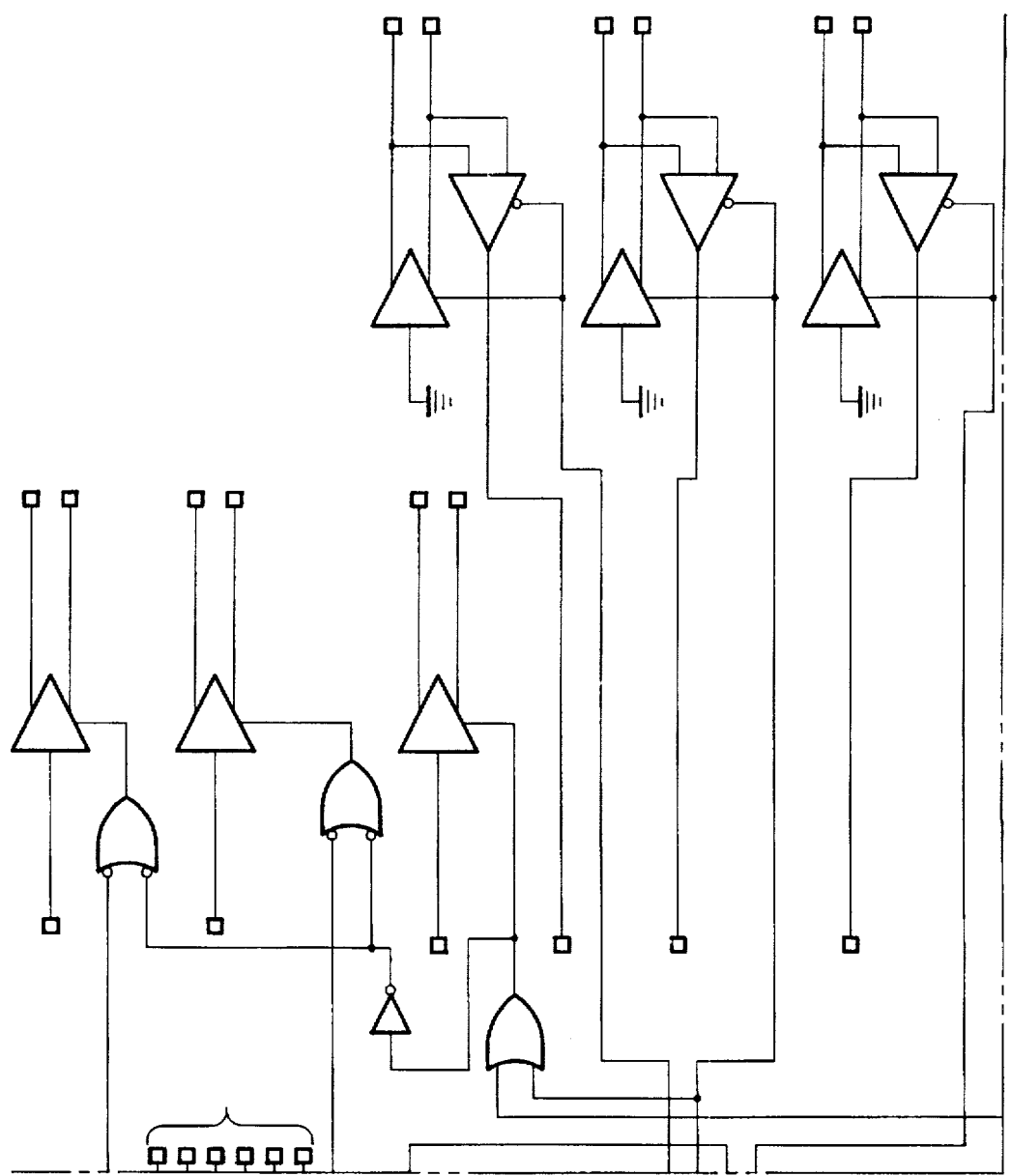
Figure 54C:
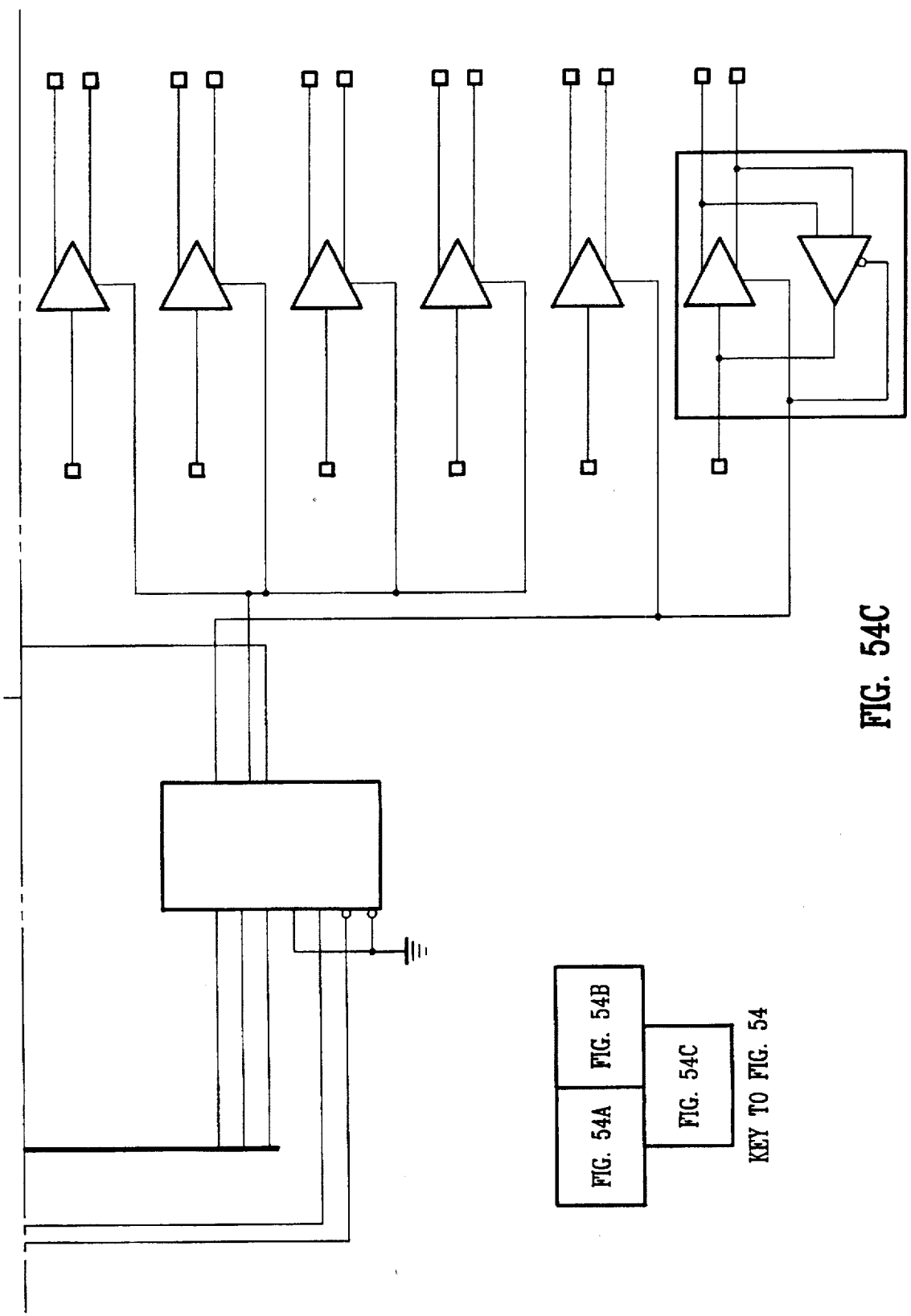

The differential controls have been defined for the purpose of eliminating any external microprocessor address decoding, and to make the controls transparent to the driver. Three groups of registers (FIG. 54) have been defined which are loaded by the device during various phases of operation. These groups are the ID, Arbitration/selection, and Operation. The ID group is loaded when the Target ID is written to the internal register SCSIID. The Arbitration/Selection group is written at various times during that operation. Bit ENARB drives the device ID on the SCSI bus during arbitration. Bit ENBSY drives signal BSY on the bus directly. Bit ENSEL drives SEL on the bus directly. Bit ENRST drives signal RST on the bus directly. The third group contains signals which determine whether a successful selection or reselection out or in was done. Bit ENINIT is set when a successful selection out or reselection in was accomplished. Bit ENTARG is set when a successful selection in or reselection out was accomplished. These signals are used to gate REQ, ACK, C/D, I/O, and MSG at the proper time. I/O is used to determine the direction but does not drive the SCSI bus unless validated by ENINIT or ENTARG. Host adapter reset causes all values to be loaded with zero.

Most registers in host adapter 7770 are accessible to both sequencer 320 and HIM 462. There are some exceptions, however, where some registers will be accessible to driver 462 but not sequencer 320 and vice versa. Also there are some registers which driver 462 should be allowed to read or write without disturbing the Sequencer (no pause). Below is a list of the exceptions.

Board ID (BID0–3), Read or Write by Host without pause.
Board Control (BCTL), Read or Write by Host without pause.
Host Control (HCNTRL), Read or Write by Host without pause.
Clear Interrupt (CLRINT), Write by Host without pause.
Interrupt Status (INTSTAT), Read by Host without pause, concurrent Write by Sequencer.
Queue Out FIFO (QOUTFIFO), Read by Host without pause, concurrent Write by Sequencer.
Queue Out Count (QOUTCNT), Read by Host without pause, concurrent Write by Sequencer.
SINDIR is not usable by the Host.
DINDIR is not usable by the Host.

According to the principles of this invention, host adapter driver 260 contains two segments, i.e., operating system specific module (OSM) 461 and hardware interface module (HIM) 462. HIM 462 off-loads all management of all hardware of host adapter 7770 from operating system specific module 461. In this embodiment, HIM 462 is written in the 'C' programming language to provide maximum portability. HIM 462 is re-entrant and is capable of supporting all possible hardware configurations of host adapter 7770 including EISA or ISA, single or dual SCSI channels, and 8-bit or 16-bit SCSI channels. HIM 462 is also capable of supporting a plurality of host adapters 7770.

HIM 462 controls host adapter 7770, but HIM 462 has neither knowledge of the computer system hardware in which HIM 462 resides other than host adapter 7770 nor knowledge of the operating system 402 used in computer system 200 (FIG. 2). Similarly, operating system specific module 461, need not have any knowledge of the hardware of host adapter 7770.

Prior to using host adapter 7770, host adapter driver 260 initializes host adapter 7770. The first function in initialization process 5600 (FIG. 56) is locating any or all host adapters 7770 resident in computer system 200. This function can be performed in either of two ways. Either (i) operating system specific module 461 scans all available EISA slots or all available ISA port addresses, or (ii) operating system specific module 461 verifies that a host adapter 7770 resides at a predetermined slot or port address.

In one embodiment, to locate host adapters 7770 resident in computer system 200, operating system specific module 461 issues a call to HIM 462 to initiate a find host adapter process 5610. Briefly, find host adapter process 5610 interrogates the hardware, if any, at a specified port to determine whether a host adapter 7770 is present at the port. One embodiment of software for the find host adapter process is given in Microfiche Appendix A as "scb_findha," which is incorporated herein by reference in its entirety.

In find host adapter process 5610, a sixteen bit port address is passed to the process by operating system specific module 461. This port address is either "zC00h" for an EISA host computer bus, where "z" is the slot number or an ISA base port address for an ISA host computer bus 226. The ISA ports available are 120h, 140h, 220h, 240h, 280h, 2A0h, 320h, and 340h. Upon completion of find host adapter process 5610, hardware interface module 462 returns an 8-bit value specifying the number of "host adapters" found at the supplied port address. A zero value signifies that no host adapter 7770 was detected at the port address. A non-zero value specifies the number of SCSI buses at the port address that host adapter 7770 is configured to support. If this value is more than one, operating system specific module 461 preferably treats each SCSI bus as separate host adapters 7770 sharing the same port address and interrupt, as explained more completely below. If operating system specific module 461 is performing a scan, find host adapter process 5600 is repeatedly performed with a different port address until the set of available port addresses is exhausted.

After host adapter(s) 7770 have been located, in the next step, allocate memory 5620, of the initialization process, operating system specific module 461, allocates memory in host computer system for data structures which enable hardware interface module 462 to operate independently of the operating system 402. Memory for three types of data structures is allocated by operating system specific module 461. The data structures are a host adapter configuration structure 5501, a host adapter structure 5502 and a sequencer control block structure 5503. Each of these structures are briefly considered here and a more detailed description of each of the structures is given below.

Host adapter configuration structure 5501 provides all the necessary configuration information for hardware interface module 462 to configure and initialize a host adapter 7770. This structure is shared by both operating system specific module 461 and hardware interface module 462. Operating system specific module 461 allocates in host memory 230 one host adapter configuration structure 5501 per SCSI bus. For example, if host adapter 7770 is configured for dual SCSI channels, so that find host adapter process 5610 returns a value of two, two host adapter configuration structures 5501 are allocated in memory 230. As explained more completely below, a host adapter configuration structure 5501 associated with a particular SCSI bus is indicated by a channel designator within structure 5501. Host adapter configuration structure 5501 also defines the base port address as well as host and SCSI interface configuration data. Host adapter configuration structure 5501 provides a pointer 5505 to a host adapter structure 5502 for host adapter 7770.

Host adapter structure 5502 provides information necessary for hardware interface module 462 to operate host adapter 7770. Host adapter structure 5502 is "internal memory" of hardware interface module 462. This structure allows hardware interface module 462 to be re-entrant, to support multiple host adapters 7770, and to support a plurality of computer bus interfaces, e.g. both EISA and ISA interfaces. Host adapter structure 5502 is only used by hardware interface module 462. Operating system specific module 461 in allocate memory step 5620 only allocates memory for host adapter structure 5502 and provides a pointer 5505 to structure 5502 in host adapter configuration structure 5501. One host adapter structure 5502 is allocated for each host adapter 7770. If host adapter 7770 is configured for dual SCSI channels, both host configuration structures 5501 provide a pointer to the same host adapter structure 5502.

Sequencer control block structure 5503, sometimes called "SCB 5503," provides information necessary for hardware interface module 462 to execute a SCSI command. A SCSI command includes all the SCSI phases needed to transfer data to or from system memory 230 from or to a SCSI device. This structure is shared by both operating system specific module 461 and hardware interface module 462. Operating system specific module 461 provides the necessary command opcodes, e.g. EXECUTE SCB SOFT RESET, HARD RESET, NO OPERATION (NOP) OR READ SENSE, data pointers (including logical to physical conversions), data lengths, control options, and SCSI commands. Hardware interface module 462 provides the appropriate status data. Operating system specific module 461 in allocate memory step 5620 allocates as many sequencer control block structures 5503 as deemed optimum. There is no limit to the number of sequencer control block structures 5503 that can be issued to hardware interface module 462.

Once the appropriate data structures have been allocated, operating system specific module 461 continues initialization process 5600 by instructing hardware interface module 462 to initiate a get host adapter configuration process. One embodiment of software for the get host adapter configuration process 5630 is given in Microfiche Appendix A as "scb_getconfig," which is incorporated herein by reference in its entirety.

To initiate get host adapter configuration process 5630, operating system specific module 461 provides HIM 462 with a pointer to a host adapter configuration structure 5502; that contains the base port address of the host adapter 7770; pointer 5505 to the appropriate host adapter structure 5502; and the appropriate SCSI channel designator. In get host adapter configuration process 5630, HIM 462 fills host adapter configuration structure 5501 pointed to by the pointer provided by operating system specific module 461 with configuration information for host adapter 7770 at the specified base port address and the designated SCSI channel.

Thus, upon return to operating system specific module 461 from get host adapter configuration process 5630, host adapter configuration structure 5501 contains host adapter configuration information. This information specifies the actual SCSI ID of host adapter 7770; the current configuration settings including those that were downloaded to scratch RAM of host adapter 7770 by the configuration utility (EISA) or default settings.

As is known in those skilled in the art, EISA includes a configuration utility that allows its user to set options that are subsequently stored in non-volatile memory. At boot time, the computer system BIOS reads the configuration information stored in the non-volatile memory and uses the information to configure devices, including host adapter 7770 on the EISA bus. This information is written to scratch RAM 442. This feature allows host adapter 7770 to be user configurable without the use of jumpers or switches. Operating system specific module 461 may use the returned configuration information "as is" or choose to make any necessary modifications. Information in the host configuration data structure 5501 is used by hardware interface module 462 to initialize host adapter 7770. Thus, get host adapter configuration process 5630 must be performed prior to the physical initialization of host adapter 7770.

After retrieving host adapter configuration information and possibly making any necessary modifications, operating system specific module 461 initiates host adapter initialization process 5640 to initialize host adapter 7770 by hardware interface module 462. One embodiment of software for host adapter initialization process 5640 is given in Microfiche Appendix A as "scb_initha," which is incorporated herein by reference in its entirety.

Operating system specific module 461 passes hardware interface module 462 a pointer to the appropriate host adapter configuration structure 5501 in the call to host adapter initialization process 5640.

If host adapter 7770 has not already been initialized as indicated by a flag in host adapter configuration structure 5501, HIM 462 first loads sequencer 320 with a program which performs a diagnostic process on host adapter 7770. In one embodiment, the diagnostic process includes a series of register and RAM verifications as well as diagnostics that verify the sequencer and internal data paths. The series of tests listed in Table 41 are performed in this embodiment. Normally, the diagnostic process is performed only upon power-up of computer system 200.

TABLE 41

| Diagnostic Tests Performed in Initialization Process 5640 | |
|---|---|
| TEST PERFORMED | ACTION TAKEN |
| Sequencer RAM check by Driver | Driver verifies Sequencer RAM thorough Host interface |
| Scratch and SCB RAM check by Driver | Driver verifies Scratch and SCB RAM through host interface |
| FIFO check by Driver | Driver verifies Host/DFIFO interface |
| Register check by Driver | Driver verifies Write/Read registers where possible |
| Sequencer Instructions | Diagnostic code is loaded to verify Sequencer operation |
| Register check by Sequencer | Sequencer verifies Write/Read registers where possible |
| Scratch and SCB RAM check by Sequencer | Sequencer verifies Scratch and SCB RAM |
| FIFO check by Sequencer | Sequencer verifies Write/Read ability |
| Data path | Sequencer transfers data through DFIFO/SCSI interface |
| Interrupts | Driver verifies proper interrupt operation |
| Queue IN/Queue OUT | Driver verifies proper operation |
| Power Down Mode | Driver verifies power down non-operation |
| EISA Enable bit | Driver verifies enable bit when EISA bus is selected |

When the diagnostics process is completed, sequencer 320 generates an interrupt. Since at this time the hardware interrupt is disabled, sequencer 320 polls register INTSTAT to determine if the interrupt is generated. HIM 462 in determining the cause of the interrupt receives either a pass or a fail status.

If the diagnostics process was successful, HIM 462 resets host adapter 7770 and HIM 462 downloads to sequencer 320 the main SCSI command program and incorporates configuration options specified in host adapter configuration structure 5501 into host adapter 7770. An important aspect of this invention is the compact nature of the sequencer firmware, about 1.5 Kbytes, because all the sequencer firmware is contained wholly within sequencer RAM.

If an error is detected during either the downloading of the sequencer firmware or the running of the diagnostics, hardware interface module 462 returns a non-zero error code. If no error is detected, a value of 00 is returned. If a value of 00 is returned, sequencer 320 is unpaused; host adapter interrupt is enabled; and host adapter 7770 is ready to receive and execute SCSI commands.

If host adapter 7770 has already been initialized by some other process, e.g., a BIOS, hardware interface module 462 bypasses the diagnostics and the downloading of the sequencer firmware during initialization process 5640, unless a flag in host adapter configuration structure 5501 was set by operating system specific module 461. In this case only the configuration options specified in host adapter 7770 are incorporated into host adapter configuration structure 5501.

If host adapter 7770 is configured for dual SCSI channels, operating system specific module 461 also performs get host adapter configuration process 5630 and host adapter initialization process 5640 using a host adapter configuration structure 5501 for the secondary SCSI channel. The primary SCSI channel is always initialized first. Hardware interface module 462 does not download any sequencer firmware or run any diagnostics when initializing the secondary channel, since HIM 462 assumes that these operations were done when the primary channel was initialized.

To send a SCSI command to hardware interface module 462, operating system specific module 461 builds a sequencer control block 5503 and issues a SCB send command to hardware interface module 462. One embodiment of software for the SCB send command is given in Microfiche A as "scb_send," which is incorporated herein by reference in its entirety. In the SCB send command, pointers to the appropriate host adapter configuration structure 5501 and sequencer control block 5503 are provided.

In response to the SCB send command, hardware interface module 462 determines (i) whether host adapter 7770 has a free SCB slot in SCB array 443 and (ii) whether the maximum number of outstanding SCBs for the target/LUN/ channel specified in sequencer control block 5503 has not been reached. If both of those conditions are true, hardware interface module 462 pauses sequencer 420, sends the SCB to an available SCB slot in host adapter 7770, unpauses sequencer 420, and returns to operating system specific module 461. Otherwise, hardware interface module 462 queues the SCB and returns to operating system specific module 461. There is no limit to the number of SCBs that can be queued by HIM 462.

When a hardware interrupt occurs on line IRQ, control is transferred to operating system specific module 461 by operating system 401 which in turn calls hardware interface module 462 to handle the interrupt. One embodiment of software for an interrupt handler is given in Microfiche Appendix A as "int_handler," which is incorporated herein by reference in its entirety. Although most host adapter interrupts indicate a completed command, this is not always the case since sequencer 420 may issue an interrupt to allow hardware interface module 462 to handle abnormal SCSI phases or errors, as explained more completely below.

When an interrupt is detected, operating system specific module 461 determines which host adapter configuration structure 5501 belongs to the interrupt. If host adapter 7770 is configured for dual SCSI channels, either pointer to the host adapter configuration structure 5501 can be used. Next, operating system specific module 461 directs HIM 462 to initiate an interrupt handler process and passes to HIM 462 the pointer to the appropriate host adapter configuration structure 5501. One embodiment of software for an interrupt handler is given in Microfiche Appendix A as "int_handler," which is incorporated herein by reference in its entirety. Hardware interface module 462 handles the interrupt, as explained more completely below, and returns to operating system specific module 461 which in turn issues an end of interrupt message EOI to operating system 401.

If the interrupt is a completed command interrupt, hardware interface module 462 directs operating system specific module 461 to initiate a SCB complete process. A pointer to the completed SCB as well as a pointer to the appropriate host adapter configuration structure 5501 are provided to operating system specific module 461 by hardware interface module 462.

In the SCB complete process, operating system specific module 461 handles the completed command and returns program control back to hardware interface module 462, which then completes the interrupt handler process. Operating system specific module 461 may initiate a SCB send command while in SCB completed process. Hardware interface module 462 also may call the SCB complete process more than once from the same interrupt handler process.

Upon detecting a completed SCB, hardware interface module 462 determines if any SCBs queued in memory 230 can be issued to host adapter 7770. If so, hardware interface module 462 sends a new SCB to a SCB slot in host adapter 7770 prior to returning from the interrupt handler process.

Table 42 illustrates one embodiment of the information in host adapter configuration structure 5501.

TABLE 42

HOST ADAPTER CONFIGURATION STRUCTURE 5501
Host Adaptor Identification

| | Size | Description |
|---|---|---|
| 0. | Word | Host Adapter ID, i.e., 0x7770 |
| 1. | Byte | HIM 462 Release Level |
| 2. | Byte | HIM 462 Revision Level |

Initialization Parameters

| | | |
|---|---|---|
| 3. | Word | Base Port Address(ISA or EISA) |
| 4. | | Pointer to Host Adapter Data Structure |
| 5. | Byte | SCSI Channel Designator |

Host Configuration

| | | |
|---|---|---|
| 6. | Byte | Interrupt Channel Number |
| 7. | Byte | DMA Channel Number (ISA) |
| 8. | Byte | DMA Bus Release Timing (EISA) |
| 9. | Byte | DMA Bus-on Timing (ISA) |
| 10. | Byte | DMA Bus-off Timing (ISA) |
| 11. | Word | DMA Strobe-on Bus Timing (ISA) |
| 12. | Word | DMA Strobe-off Bus Timing (ISA) |
| 13. | Byte | Data FIFO Threshold |

SCSI Configuration

| | | |
|---|---|---|
| 14. | Byte | Host Adapter Configuration Flags |
| 15. | Byte | Host Adapter SCSI's ID |
| 16. | Byte | Maximum Number of Targets on SCSI bus |
| 17. | Byte | SCSI Configuration Options (1 byte/target) |
| 18. | Word | Bit Map to Disconnection |

The host adapter identification field (Table 42) in host adapter configuration structure 5501 is a 16-bit field that specifies the actual host adapter identification. For example, if host adapter 7770 is on the motherboard of computer system 200, the host adapter identification field contains a value of 0×7770. (The notation 0×7770 is the same as 7770h.) The host adapter identification is supplied by hardware interface module 462 for information purposes only, and should not be altered by operating system specific module 462.

Hardware interface module release level field (Table 42) is an 8-bit field that specifies the production release level of the hardware interface module sequencer computer program. For example, if the current release of the hardware interface module sequencer computer program as Version 1.3, this field contains a value of 0×01. The HIM release level is supplied by hardware interface module 462 for information purposes only, and should not be altered by operating system specific module 461.

Hardware interface module 462 revision level field (Table 42) is an 8-bit field that specifies the production release level of the hardware interface module sequencer computer program. For example, if the current release of the hardware interface module sequencer computer program was Version 1.3, this field contains a value of 0×03. The HIM revision level is supplied by the hardware interface module 462 for information purposes only, and should not be altered by the operating system specific module 461. The host adapter identification, HIM release level and HIM revision level are the "Host Adapter Identification."

Base port address field (Table 42) is a 16-bit field that specifies the base port address for host adapter 7770. The value for the base port address field is supplied by operating system specific module 461. For an EISA bus, the base address is 'zC00h' where 'z' specifies the slot number. For an ISA bus, the base address is one of the following 120h, 140h, 220h, 240h, 280h, 2A0h, 320h, or 340h.

Pointer to host adapter structure field (Table 42) is a virtual pointer to the host adapter structure 5502 that corresponds to this host adapter configuration structure 5502. This pointer is supplied by operating system specific module 461.

SCSI channel designation field (Table 42) is an 8-bit field that indicates which SCSI channel this host adapter configuration structure 5501 supports in SCSI module 330. A value of 0×00 indicates that the information in this host adapter configuration structure 5501 pertain to SCSI channel zero 432, which is sometimes referred to either as SCSI channel A, or as the primary channel. A value of 0×08 indicates that the values in this host adapter configuration structure 5501 pertain to SCSI channel one 433, which is sometimes referred to either as SCSI channel B, or as the secondary channel. If host adapter 7770 is configured for one SCSI channel only, this field contains the value 0×00, which is supplied by operating system specific module 461. The base port address, host adapter data structure pointer, and SCSI channel designation are initialization parameters for host adapter 7770.

Interrupt channel number field (Table 42) is an 8-bit field that specifies the interrupt channel of host adapter 7770. The interrupt channel number is supplied by hardware interface module 462. For an ISA bus, the default value is "11" while for an EISA bus the default value is determined by the configuration information stored in non-volatile memory, as described above. The interrupt channel number may be changed by the operating system specific module 461 prior to the start of host adapter initialization process 5640, but the value of the interrupt channel number must match the actual host adapter configuration.

DMA channel number field (Table 42), which is used for an ISA host computer bus only, is an 8-bit field that specifies the DMA channel of host adapter 7770. The value of the DMA channel number is supplied by hardware interface module 462. For an EISA host computer bus, a value of 0×FFh is supplied by hardware interface module 462 for the DMA channel number field, while for an ISA bus the default value is "5". The value of the DMA channel number may be changed by the operating system specific module 461 prior to the start of host adapter initialization process 5640, but the value of the DMA channel number must match the actual host adapter configuration.

The bus release timing after preemption field (Table 42), which is used for an EISA host computer bus (EISA bus) only, is an 8-bit field that specifies the number of EISA bus clock cycles that host adapter 7770 continues transferring data (assuming availability of data) before releasing the EISA bus after being preempted. The minimum value of the bus release timing after preemption is two decimal while the maximum value is 60 decimal. The value of the bus release timing after preemption is supplied by hardware interface module 462. This value may be also changed by the operating system specific module 461 prior to the start of host adapter initialization process 5640. If operating system specific module 461 supplies a value greater than the maximum value, hardware interface module 462 truncates the value provided in host adapter initialization process 5640. Hardware interface module 462 may round up a value supplied by operating system specific module 461 to a value acceptable for host adapter 7770. For an ISA computer bus, this field is ignored by hardware interface module 462.

The bus-on timing field (Table 42), which is used only for an ISA host computer bus (ISA bus), is an 8-bit field that specifies the maximum amount of time, in microseconds, host adapter 7770 stays on the ISA host computer bus during data transfers. The minimum value for the bus-on timing is zero microseconds and the maximum value is 15 microseconds. In one embodiment, a default value of 11 microseconds is used. If the value of the bus-on timing is zero microseconds, host adapter 7770 stays on the ISA host computer bus for a minimum of two ISA bus clock cycles, and always completes at least one transfer. The value of the bus-on timing is supplied by hardware interface module 462.

The value may be changed by the operating system specific module 461 prior to the start of host adapter initialization process 5640. If operating system specific module 461 supplies a value greater than the maximum value, hardware interface module 462 truncates the value in host adapter initialization process 5640. For an EISA host computer bus, the bus-on timing field is ignored by the hardware interface module 462.

The bus-off timing field (Table 42), which is used for an ISA host computer bus, sometimes called the ISA bus, only, is an 8-bit field that specifies the minimum amount of time, in microseconds, host adapter 7770 stays off the ISA bus during data transfers. The minimum value of the bus-off timing is zero microseconds, while the maximum value is 60 microseconds. If the value is zero microseconds, host adapter 7770 stays off the ISA bus for a minimum of two ISA bus clock cycles. The value of the bus off timing is supplied by hardware interface module 462. In one embodiment the default value is "4".

The value of bus-off timing may be changed by operating system specific module 461. If operating system specific module 461 supplies a value greater than the maximum value, hardware interface module 462 truncates the value in host adapter initialization process 5640. Hardware interface module 462 may round up a value supplied by operating system specific module 461 to a value acceptable for host adapter 7770. For an EISA host computer bus, the bus-off timing field is ignored by hardware interface module 462.

Strobe-on-memory read/memory write assertion timing field (Table 42), which is used for an ISA bus only, is a 16-bit field that specifies, in nanoseconds, the amount of time host adapter 7770 asserts memory read strobe MEMR or memory write strobe MEMW during data transfers on the ISA bus. The minimum value is 100 nanoseconds and the maximum value is 500 nanoseconds with a default value of 200 nanoseconds. This value is supplied by hardware interface module 462.

Strobe-on-memory read/memory write assertion timing may be changed by operating system specific module 461 prior to the start of host adapter initialization process 5640. If operating system specific module 461 supplies a value greater than the maximum value, hardware interface module 462 truncates the value in host adapter initialization process 5640. Hardware interface module 462 may round up a value supplied by operating system specific module 461 to a value acceptable for host adapter 7770. For an EISA computer bus, this field is ignored by hardware interface module 462.

Strobe-off-memory read/memory write assertion timing field (Table 42), which is used for an ISA bus only, is a 16-bit field that specifies, in nanoseconds, the amount of time host adapter 7770 deasserts memory read strobe MEMR or memory write strobe MEMW during data transfers on the ISA bus. The minimum value is 100 nanoseconds and the maximum value is 500 nanoseconds with a default value of 200 nanoseconds. The value of Strobe-Off-memory read/memory write assertion timing is supplied by hardware interface module 462. The value may be changed by operating system specific module 461 prior to the start of host adapter initialization process 5640. If operating system specific module 461 supplies a value greater than the maximum value, hardware interface module 462 truncates the value. Hardware interface module 462 may round up a value supplied by operating system specific module 461 to a value acceptable for host adapter 7770. For an EISA host computer bus, this field is ignored by hardware interface module 462.

Data FIFO threshold field (Table 42) is an 8-bit field that specifies how host adapter 7770 manages its internal data FIFO memory. Bits 2 through 7 of this field are reserved. Bits zero and one are used to specify four different threshold values as illustrated in Table 43.

TABLE 43

Specification of DFIFO Threshold Value in Data FIFO Threshold Field

| BIT 1 | BIT 0 | THRESHOLD VALUE |
| --- | --- | --- |
| 0 | 0 | 0% |
| 0 | 1 | 50% |
| 1 | 0 | 75% |
| 1 | 1 | 100% |

When the host computer bus speed is slower than the SCSI bus speed, e.g. 8 MBytes/sec vs. 20 MBytes/sec, the threshold value for data FIFO memory circuit 360 is 0%. Hence, in reading data from SCSI bus 210, host adapter 7770 starts transferring data from data FIFO memory circuit 360 to host memory 230 as soon as data is available in data FIFO memory circuit 360. Similarly, in writing data to SCSI bus 210, host adapter 7770 starts transferring data from host memory to data FIFO memory circuit 360 as soon as there is room in data FIFO memory circuit 360.

When the host computer bus speed is nearly equal to the SCSI bus speed, e.g. 8 MBytes/sec vs. 10 MBytes/sec, the threshold value for data FIFO memory circuit 360 is 50%. Hence, in reading data from SCSI bus 210, host adapter 7770 starts transferring data from data FIFO memory circuit 360 to host memory 230 as soon as data FIFO memory circuit 360 is 50% full. Similarly, in writing data to SCSI bus 210, host adapter 7770 starts transferring data from host memory 230 to data FIFO memory circuit 360 as soon as data FIFO memory circuit DFIFO is 50% empty.

When the host computer bus speed is faster than the SCSI bus speed, e.g. 33 MBytes/sec v. 20 MBytes/sec, and/or utilization of the host computer bus is shared among several devices, the threshold value for data FIFO memory circuit 360 is 75%. Hence, in reading data from SCSI bus 210, host adapter 7770 starts transferring data from data FIFO memory circuit 360 to host memory 230 as soon as data FIFO memory circuit 360 is 75% full. Similarly, in writing data to SCSI bus 210, host adapter 7770 starts transferring data from host memory 230 to data FIFO memory circuit 360 as soon as data FIFO memory circuit 360 is 75% empty.

When the host computer bus speed is much faster than the SCSI bus speed, e.g. 33 MBytes/sec v. 5 MBytes/sec, the threshold value for data FIFO memory circuit 360 is 100%. Hence, in reading data from SCSI bus 210, host adapter 7770 starts transferring data from data FIFO memory circuit 360 to host memory 230 as soon as data FIFO memory circuit 360 is full. Similarly, in writing data to SCSI bus 210, host adapter 7770 starts transferring data from host memory 230 to data FIFO memory circuit 360 as soon as data FIFO memory circuit 360 is empty. For an ISA bus the default threshold value is 0% while for an EISA bus, the default threshold value is 100%.

The above examples of relative data transfer speeds are illustrative only and are not intended to limit this invention or the particular values given. In view of this disclosure, the user can select a value suitable for the computer system containing host adapter 7770.

In this embodiment, interrupt channel number, DMA-channel number, DMA bus release timing, DMA bus-on timing, DMA bus-off timing, DMA strobe-on bus timing, DMA strobe-off bus timing, and data FIFO threshold define the host computer system configuration.

Host adapter configuration flags field (Table 44) is an 8-bit field that specifies configuration and initialization options for hardware interface module 462. Configuration flags field is initially set by hardware interface module 462 during get host adapter configuration process 5630. In this embodiment, the flag represented by each bit in the field is given in Table 44.

TABLE 44

| BIT | FLAG |
| --- | --- |
| 7 | Initialization Needed |
| 6 | Reset SCSI Bus |
| 5 | Check Parity |
| 4 | Selection Response Time |
| 3 | Selection Response Time |
| 2 | Interrupt Level |
| 1 | Reserved |
| 0 | Reserved |

Initialization needed flag INIT_NEEDED in bit 7 of host adapter configuration flags field (Table 44) is set by hardware interface module 462 if, during get host adapter configuration process 5630, HIM 462 detects that host adapter 7770 has not been initialized. If this bit is set, operating system specific module 461 must not change the value prior to starting host adapter initialization process 5640. During host adapter initialization process 5640, hardware interface module 462 resets host adapter 7770, downloads the sequencer instructions, runs host adapter diagnostics, and incorporates configuration options specified in host adapter configuration structure 5501 into host adapter 7770.

Initialization needed flag INIT_NEEDED (Table 44) is set to zero if hardware interface module 462 detects that host adapter 7770 has been initialized previously. In this case, during the host adapter initialization process 5640, hardware interface module 462 only incorporates the configuration options stored in the registers of host adapter 7770 into host adapter configuration structure 5501. Operating system specific module 461 may choose to set this flag to one if full initialization is desired.

Reset bus flag RESET_BUS (Table 44) in bit 6 of host adapter configuration flags field specifies whether SCSI bus 210 is reset by hardware interface module 462 during full initialization. If bit 6 is set to one, SCSI bus 210 is reset during host adapter initialization process 5640. The value of reset bus flag RESET_BUS is supplied by hardware interface module 462 via get host adapter configuration process 5630. The value may be changed by operating system specific module 461 prior to initiation of host adapter initialization process 5640. Hardware interface module 462 ignores reset bus flag RESET_BUS (Table 44) during host adapter initialization process 5640 if initialization needed flag INIT_NEEDED (Table 44) is set to zero.

SCSI parity check flag SCSI_PARITY (Table 44) in bit 5 of host adapter configuration flags field specifies whether host adapter 7770 checks parity on incoming SCSI data. Host adapter 7770 always generates parity on outbound SCSI data. If bit 5 is set to one, parity checking is enabled. The value of SCSI parity check flag SCSI_PARITY is supplied by hardware interface module 462 via get host adapter configuration process 5630. The value may be changed by operating system specific module 461 prior to initiation of host adapter initialization process 5640.

Selection response time flags STIMESEL in bits 3 and 4 (Table 44) of host adapter configuration flags field specify the length of time in milliseconds that host adapter 7770 waits for a target to respond to selection before aborting the selection procedure. One embodiment of the timeout values are given in Table 45.

TABLE 45

Selection Time Out Values Specified by Flags STIMESEL

| Bit 4 | Bit 3 | Selection Timeout Value |
|---|---|---|
| 0 | 0 | 256 ms |
| 0 | 1 | 128 ms |
| 1 | 0 | 64 ms |
| 1 | 1 | 32 ms |

The values of selection time response flags STIMESEL are supplied by hardware interface module 462 via get host adapter configuration process 5630. The value may be changed by operating system specific module 461 prior to initiation of host adapter initialization process 5640.

Interrupt level flag INTHIGH in bit 2 (Table 44) of host adapter configuration flags field specifies which IRQ mode host adapter 7770 uses when asserting interrupts. If interrupt level flag INTHIGH is set to one, high true edge interrupts are used. If interrupt level flag INTHIGH is set to zero, low true level interrupts are used. The value of this flag is supplied by hardware interface module 462 in get configuration process 5630. The value may be changed by operating system specific module 461 prior to initiation of host adapter initialization process 5640.

All other bits in configuration flags field (Tables 42 and 44) are reserved for future enhancements and should not be altered by operating system specific module 461.

In one embodiment, for EISA reset and parity one on, STIMESEL is set to 256 and INTHIGH is set to zero. For ISA, reset parity and STIMESEL are set the same as for EISA, but INTHIGH is set to one.

Host Adapter's SCSI ID field (Table 42) is an 8-bit field that specifies the SCSI ID host adapter 7770 uses when selecting targets on SCSI bus 210. SCSI ID is supplied by hardware interface module 462 in get host adapter configuration process 5630. In one embodiment the SCSI ID is "7". SCSI ID may be changed by operating system specific module 461 prior to initiating host adapter initialization process 5640.

Maximum number of devices allowed on SCSI bus field (Table 42) is an 8-bit field that specifies the number of devices, including host adapter 7770, supported by SCSI bus 210. If SCSI bus 210 has an 8-bit data channel, this field specifies a maximum of 8 devices. If SCSI bus 210 has a 16-bit data channel, this field specifies a maximum of 16 devices. In one embodiment, only values of 8 or 16 may be entered in this field. The value of the maximum number of devices allowed on SCSI bus is supplied by the hardware interface module 462 in get host adapter configuration process 5630. This value must not be changed by operating system specific module 461.

SCSI target negotiation options field (Table 42) is a 16-byte array that specifies the negotiation options for synchronous and wide transfers for each target. Each byte of the array represents one target. In this embodiment, byte 0 of the array corresponds to target ID 0, byte 1 corresponds to target ID 1, etc. If the value of maximum number of devices allowed on SCSI bus field (Table 42) is eight targets, only the first 8 bytes of the 16-byte array are used. The values for each byte in the array are supplied by hardware interface module 462 in the format given in Table 46.

TABLE 46

Bit Definitions for Each Byte in SCSI Target Negotiation Options Field

| BIT | FUNCTION |
|---|---|
| 0 | Synchronization Mode |
| 1 | Reserved |
| 2 | Reserved |
| 3 | Reserved |
| 4 | Synchronization Rate |
| 5 | Synchronization Rate |
| 6 | Synchronization Rate |
| 7 | Wide Mode |

If bit 0 synchronization mode is set to one, host interface module 310 attempts to negotiate for synchronous SCSI data transfers. If bit 0 is set to zero, host interface module 310 does not initiate synchronous negotiation. However, host interface module 310 responds to synchronous negotiations initiated by a target. The response to a target's initiated negotiation depends on the value in synchronization rate bits 4 to 6 (Table 46).

Synchronization rate bits 4 to 6 (Table 46) of SCSI target negotiations options field specify the rate at which host interface module 310 negotiates for synchronous SCSI transfers. This rate is used whether the negotiation is initiated by host interface module 310 or by a target. One embodiment of the transfer rate represented by various combinations of values for bits 4 to 6 (Table 46) is given in Table 47.

TABLE 47

| SYNC RATE (Bits 4-6) | ACK Assertion | ACK Deassertion | Rate (MHz) |
|---|---|---|---|
| 000 | 50 nsec | 50 nsec | 10.0 |
| 001 | 50 nsec | 75 nsec | 8.0 |
| 010 | 50 nsec | 100 nsec | 6.7 |
| 011 | 50 nsec | 125 nsec | 5.7 |
| 100 | 100 nsec | 100 nsec | 5.0 |
| 101 | 100 nsec | 125 nsec | 4.4 |
| 110 | 100 nsec | 150 nsec | 4.0 |
| 111 | 100 nsec | 175 nsec | 3.6 |

If wide mode bit 7 (Table 46) is set to one, host interface module 310 attempts to negotiate for 16-bit SCSI data transfers. If bit 7 is set to zero, host interface module does not initiate wide negotiation, but host interface module 310 responds to wide negotiation initiated by the target. The response to a target's initiated negotiation depends on the value in maximum number of devices allowed on SCSI bus field (Table 42).

Operating system specific module 461 may change the values in any or all bytes of SCSI target negotiations option array (Table 42). However, the actual negotiations do not take effect until after a SCSI bus reset has occurred. Bits 3 to 1 (Table 46) are reserved and should always be zero.

Allow disconnection mask field (Table 42) is a 16-bit field that is a bit mask where each bit corresponds to a target ID, i.e., bit 0 for target ID 0, bit 1 for target ID 1, etc. If a bit is set to one, disconnections are allowed for the corresponding target ID. The allowing of disconnection may be overridden on a command basis. If the bit is set to zero, disconnections are not allowed for the corresponding target ID and cannot be overridden on a command basis. The values in this field are supplied by hardware interface module 462 in get host adapter configuration process 5630. The value may be changed by operating system specific module 461 prior to initiation of host adapter initialization process 5640.

Figure 55:
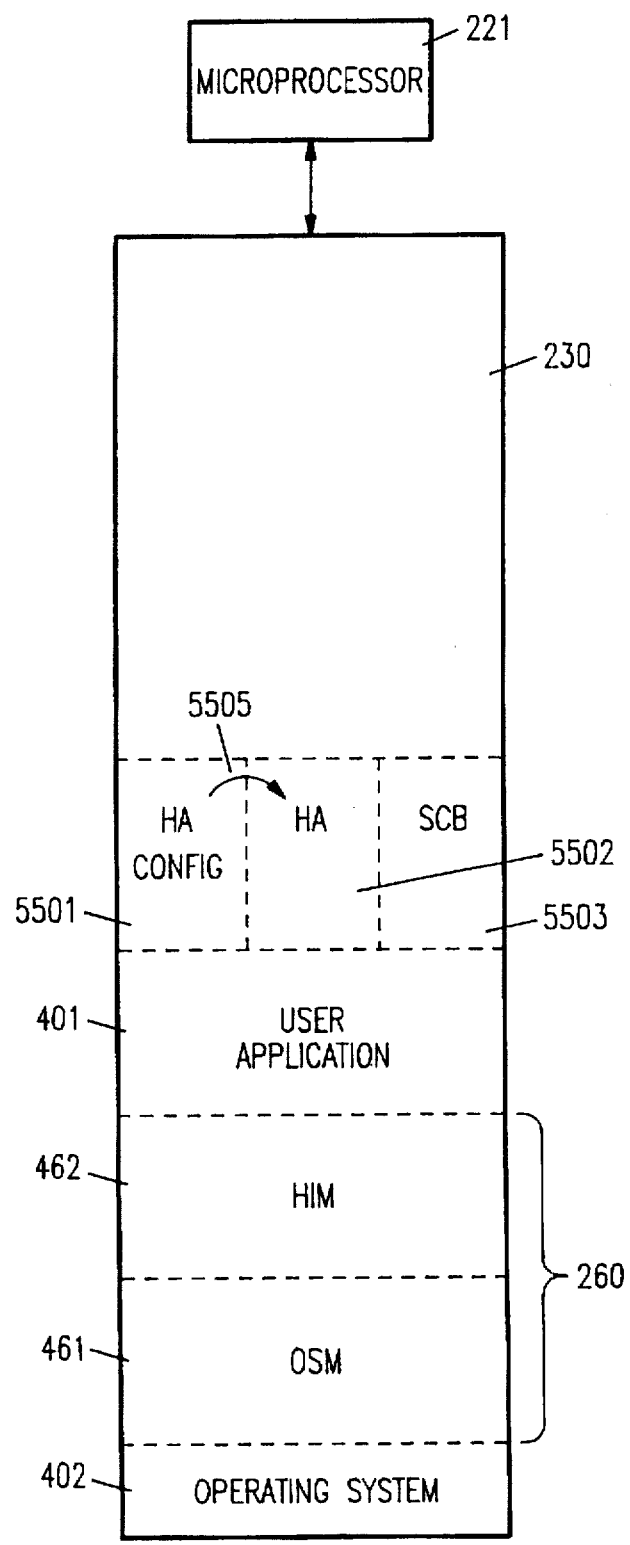
FIG. 55 is a block diagram illustrating the host adapter configuration structure, the host adapter structure, and the sequencer control block structure of this invention.

Host adapter data structure 5502 (FIG. 55) is used exclusively by hardware interface module 462. Host adapter data structures support multi-tasking SCB commands as well as multiple host adapters. Operating system specific module 461 allocates space in host memory 230 for one host adapter data structure 5502 per host adapter 7770. Table 48 is an example of a host adapter structure for an 8-bit single-ended SCSI channel.

TABLE 48

| SIZE | DESCRIPTION |
|---|---|
| 0 | Pointer to primary configuration structure |
| 1 | Pointer to secondary configuration structure |
| 2 Word | Address of SCSI Sequence Control Register |
| 3 Word | Address of SCSI Transfer Control Register 0 |
| 4 Word | Address of SCSI Transfer Control Register 1 |
| 5 Word | Address of SCSI Control Signals Register |
| 6 Word | Address of SCSI Rate Control Register |
| 7 Word | Address of SCSI ID Register |
| 8 Word | Address of SCSI Latched Data Register Low |
| 9 Word | Address of Clear SCSI Interrupts Register 0 |
| 10 Word | Address of Clear SCSI Interrupts Register 1 |
| 11 Word | Address of SCSI Status Register 1 |
| 12 Word | Address of SCSI Interrupt Mask Register 1 |
| 13 Word | Address of SCSI Data Bus Register Low |
| 14 Word | Address of SCSI Block Control Register |
| 15 Word | Address of SCSI Data Transfer Options Array |
| 16 Word | Address of Sequencer Interrupt Into Register |

TABLE 48-continued

| SIZE | DESCRIPTION |
|---|---|
| 17 Word | Address of Sequencer Address Register Low |
| 18 Word | Address of Host Control Register |
| 19 Word | Address of SCB Pointer Register |
| 20 Word | Address of Interrupt Status Register |
| 21 Word | Address of Clear Interrupt Status Register |
| 22 Word | Address of SCB Count Register |
| 23 Word | Address of Queue In FIFO Register |
| 24 Word | Address of Queue In Count Register |
| 25 Word | Address of Queue Out FIFO Register |
| 26 Word | Address of Queue Out Count Register |
| 27 Word | Address of Start of SCB Array |
| 28 Word | Address of Scatter/Gather List Count |
| 29 Word | Address of LSB of Scatter/Gather Pointer |
| 30 Word | Address of SCSI Command Descriptor Block Length |
| 31 Word | Address of Target Status |
| 32 | First SCB Pointer on Queue |
| 33 | Last SCB Pointer on Queue |
| 34 4 Bytes | Status of SCB Array Slots (Active or Free) |
| 35 | Array of SCB pointers |
| 36 Byte | Host Adapter Flag Values |
| 37 Byte | Maximum Number of SCBs That Can Be Loaded |
| 38 Byte | Maximum Number of Non-Tagged Commands per Target |
| 39 Byte | Maximum Number of Tagged Commands per Target |
| 40 Byte | Done Command |
| 41 256 Bytes | Array - number of active SCB's per target |

Recall that host adapter structure 5502 is contained in host memory 230. As explained more completely below, some of the fields in host adapter structure 5502 contain values that mirror values of registers or other stored information for a particular configuration of host adapter 7770. However, items numbered 2 through 31 in Table 48 contain 16-bit values that correspond to the actual port address of the registers described. This gives EISA/ISA independence and permits handling of multiple host adapters.

Primary configuration pointer (Table 48) is a pointer to the host adapter configuration structure for the primary SCSI channel of host adapter 7770 while secondary configuration pointer is a pointer to the host adapter configuration structure for the secondary SCSI channel. Items numbered 2 through 14 in Table 48 are the post address of the corresponding registers in SCSI module 330 and the description of those registers is incorporated herein by reference.

SCSI data transfer options array, item 15 in Table 48, contains the post address of the first byte of a 16 byte array for wide/synchronous transfers that is in scratch RAM 442 and is formed using information in SCSI target negotiation options field in host adapter configuration structure 5501 (Table 42). Sequence interrupt info register is the post address of register INTSTAT.

Sequencer address register low (Table 48) is the post address for sequencer address register zero SEQADDR0 in sequencer registers 421. Items numbered 18 through 26 in Table 48 correspond to the address for the registers with the same name in host interface module's registers 411.

Start of SCB array, item 27 in Table 48, contains the register location of the first word in SCB array 443. Note SCB 5503 is described more completely below.

Scatter/gather list count and least significant byte (LSB) of scatter gather pointer (Table 48) are the second and third words in the SCB slot and contain addresses to its information indicated by the name of the field. Similarly, SCSI command descriptor block length contains the address to the field length of SCB in SCB 5503 and the target status is an address to the corresponding field in the SCB.

Items numbered 32 to 35 in Table 48 contain information about the SCB array and pointers to the queue-in FIFO and SCB array.

The second bit in host adapter flags field (Table 48) is set if queue-in FIFO contains SCB pointers and is zero otherwise. All other bits in host adapter flags field are reserved and are set to zero.

Items numbered 37 to 39 in Table 48 are defined in get host adapter configuration process 5630.

Item 40 is a record of SCBs completed. More than one SCB can be completed. i.e., the completion of a first SCB results in a command complete interrupt but before that interrupt is processed, a second SCB is completed. An interrupt is not generated in the case. this by examining field DONE commands, HIM 462 knows that two SCBS are completed.

The final field is used to target the number of active SCBs per target as its name suggests.

The structure of SCB 5503 is defined in Table 49. Each of the fields in SCB 5503 are defined more completely below.

TABLE 49

| 0. | Byte | SCB command type |
|---|---|---|
| 1. | Byte | SCB command status |
| 2. | Byte | SCB Option flags |
| 3. | Byte | Reserved = 0 |
| 4. | Byte | SCB intermediate status |
| 5. | Byte | Control register |
| 6. | Byte | Target/Channel/LUN |
| 7. | Byte | Number of Scatter/Gather segments |
| 8. | Double Word | Pointer to Scatter/Gather list |
| 9. | Double Word | Pointer to Command Descriptor Block CDB |
| 10. | Byte | Length of Command Descriptor Block |
| 11. | Byte | Reserved = 0 |
| 12. | Byte | Host Adapter status |
| 13. | Byte | Target status |
| 14. | Double Word | Residual byte count |
| 15. | 12 Bytes | SCSI Command Descriptor Block |
| 16. | Double Word | Pointer to Sense Area |
| 17. | Double Word | Sense Length |
| 18. | Variable | Pointer to Next SCB on Queue |
| 19. | 6 Bytes | Work Area For Extended Messages |

SCB command type field (Table 49) is an 8-bit field that is used to identify the operation to be performed by hardware interface module 462. The SCB command type field is written to by operating system specific module 461. Table 50 illustrates one embodiment of the values of the SCB command type field and the corresponding SCB command type.

TABLE 50

| NAME | SCB COMMAND TYPE VALUE | SCB COMMAND TYPE |
|---|---|---|
| EXEC_SCB | 0x02 | Standard SCSI Command |
| RESET_DEV | 0x04 | Bus Device Reset For A Given Target/LUN |

An unsupported SCB command type value results in return of an error by hardware interface module 462. The values in Table 50 are illustrative only. Other SCB commands can be implemented.

SCB command status field (Table 49) is an 8-bit field that indicates the current status of the SCB. The SCB command status field is written to by hardware interface module 462. It is not necessary for operating system specific module 461 to initialize this field. Table 51 illustrates one embodiment of the values of the SCB command status field and the corresponding SCB command status.

TABLE 51

| NAME | SCB COMMAND STATUS VALUE | SCB COMMAND STATUS |
|---|---|---|
| SCB_PENDING | 00 | SCSI Request In Progress |
| SCB_COMP | 01 | SCSI Request Completed Without Error |
| SCB_ABORTED | 02 | SCSI Request Aborted |
| SCB_ERR | 04 | SCSI Request Completed With Error |
| INV_SCB_CMD | 80 | Invalid SCB command |

Upon return from SCB send process, the value of SCB command status is either 00h or 80h. Upon completion of the command in an SCB, if the SCB command status field indicates an error occurred, host adapter status (Item 12, Table 49) and target status (Item 13, Table 49) are analyzed by operating system specific module 461 to determine the cause of the error. If the SCB completed without error, no other field needs to be analyzed, and the SCB may be discarded or reused for another request.

SCB option flags (Table 49) is an 8-bit field that specifies execution options for SCB 5503. Table 52 gives the values of the option flags and the corresponding option.

TABLE 52

| NAME | SCB OPTION FLAGS VALUE | SCB OPTION FLAG |
|---|---|---|
| NEGO_IN_PROG | 02 | Negotiation In Progress |
| SCB_HEAD | 04 | SCB Is At Head Of Chain |
| SCB_CHAINED | 08 | SCB_Next Valid |
| NO_UNDERRUN | 40 | 1 = Suppress Underrun Errors |
| AUTO_SENSE | 80 | 1 = Automatic Request Sense Enabled |

The values in the SCB options field are written by operating system specific module 461. In this embodiment, bit 7 of the field is an auto sense flag and bit 6 is a no underrun flag.

The value of the auto sense flag in bit 7 of SCB option flags field indicates whether hardware interface module 462 automatically issues a "request sense" command to the target if the target responds to the SCSI operation specified in the SCB with a "Check Condition." If bit 7 is set to one, hardware interface module 462 automatically issues a "Request Sense" command to the target immediately following receipt of a "Check Condition" (Target Status=02), and prior to posting completion of the SCB to operating system specific module 461. The number of bytes of sense information hardware interface module 462 requests is specified in the sense length field (Item 17, Table 49). Hardware interface module 462 stores the bytes at the memory address pointed to by sense pointer field (Item 16, Table 49). If bit 7 is set to zero, hardware interface module 462 does not issue a "request sense" command and ignores the values of the sense length field, and the sense position field.

The value of no underrun flag in bit 6 of SCB option flags field indicates whether host adapter 7770 considers a data underrun as an error. A data underrun occurs when the number of bytes of data transferred is less than the number of bytes specified by the scatter/gather list (Item 7, Table 49). If bit 6 is set to one, host adapter 7770 does not report a data underrun as an error. If bit 6 is set to zero (Item 12, Table 49), host adapter 7770 treats a data underrun as an error condition. The host adapter status field, which is described more completely below, reflects that a data overrun/underrun error occurred. The residual count field, which is also described more completely below, contains an indication of the amount of data that was not transferred.

All other bits in SCB options flags field (Item 2, Table 49) are either used by hardware interface module 462 or reserved for future enhancements and should be initialized to zero by operating system specific module 461 before issuing a SCB send command. The other option flags are included in Table 52.

SCB intermediate status field (Table 49) is an 8-bit field that is reserved for use by hardware interface module 462 only. It is not necessary for the operating system specific module 461 to initialize this field. The values stored in this field are given in Table 53 along with the name associated with the value and the function.

TABLE 53

| NAME | INTERMEDIATE STATUS VALUE | FUNCTION |
| --- | --- | --- |
| SCB_PROCESS | 00 | SCB Needs To Be Processed |
| SCB_DONE | SCB_COMP | SCB Finished Without Error |
| SCB_DONE_ABT | SCB_ABORTED | SCB Finished Due To Abort From Host |
| SCB_DONE_ERR | SCB_ERR | SCB Finished With Error |
| SCB_READY | 10 | SCB Ready To Be Loaded Into Arrow |
| SCB_WAITING | 20 | SCB Waiting For Another To Finish |
| SCB_ACTIVE | 40 | SCB Loaded Into HA |
| SCB_DONE_ILL | INV_SCB_CMD | SCB Finished Due To Illegal Command |

SCB control register field (Table 49) is an 8-bit field that specifies execution parameters for the SCB. The SCB control field is written by operating system specific module 461. Table 54 illustrates one embodiment of the function assigned to each bit in the SCB control register field.

TABLE 54

| Bit Definition for SCB Control Register | | | |
| --- | --- | --- | --- |
| NAME | VALUE | BIT | FUNCTION |
| REJECT_MDP | 80 | 7 | Reject Modify Data Pointer Messages |
| DIS_ENABLE | 40 | 6 | Disconnect During Command Execution |
| TAG_ENABLE | 20 | 5 | Tagged Queuing |
| | | 4 | Reserved |
| SWAIT | 08 | 3 | Sequencer Trying To Select Target |
| SDISCON | 04 | 2 | Target Currently Disconnected |
| TAG TYPE | 03 | 1 | Tag Type |
| | | 0 | Tag Type |

Reject modify data pointer messages REJECT_MDP in bit 7 of SCB control register indicates to sequencer 320 whether the data to be transferred either to or from host memory 230 is contiguous. If a contiguous memory transfer is specified, the number of scatter/gather segments is one. If a non-contiguous memory transfer is specified the number of scatter/gather segments is more than one. This flag is necessary because sequencer 320 does not allow handling of "modify data pointer" messages from the target when there are multiple segments in the scatter/gather list. Operating system specific module 461 sets bit 7 to one if the value of scatter/gather segment count field (Table 49), which is described below, is greater than one, i.e., there are multiple scatter/gather segments. If sequencer 320 receives a "modify data pointer" message from a target and bit 7 is set to one, sequencer responds 320 with a "message reject" message which in turn forces the target to transfer all the data contiguously. If bit 7 is set to zero, sequencer 320 accepts any "Modify Data Pointer" messages, thereby allowing the target to transfer data out of order.

The disconnect during command execution flag DIS_ENABLE in bit 6 (Table 54) of SCB control register field determines whether the target is allowed to disconnect during command execution. If bit 6 is set to zero, sequencer 320 overrides the target's configuration setting and instructs the target, via the "Identify" message, not to disconnect during command execution. If bit 6 is set to one, sequencer 320 uses the target's configuration setting, i.e., the value of allow disconnect field in host configuration status structure 5501 (Table 42) to determine whether disconnection is allowed.

The tagged queuing flag TAG_ENABLE in bit 5 (Table 54) of SCB control register field indicates whether tagged queuing is implemented for this SCB. If bit 5 is set to one, sequencer 320 sends a two byte "Tag Queue" message to the target immediately following the "Identify" message. The first "Tag Queue" message byte contains the tag code and specifies the type of ordering that is desired for this SCSI command. The contents of the first "Tag Queue" byte is determined by the value of tag type flags in bits 0 and 1 (Table 54). Table 55 gives a description of the tag enable and tag type flags. The second "Tag Queue" message byte is a unique Tag ID assigned by sequencer 320. If bit 5 is set to zero, tagged queuing is not implemented for this SCB.

The tag type flags in bits 0 and 1 (Table 54) of SCB control register field are used by sequencer 320 to determine which Tag Code, i.e., which Tag Queue message byte 1, to send to the target. These flags are ignored by host adapter 7770 if the tag queuing flag in bit 3 is set to zero. Table 55 gives a description of the operations controlled by tagged queuing flags in bit 5 and tag type flags in bits 1 and 0.

TABLE 55

| Description of TAG ENABLE and TAG TYPE flags | | | |
| --- | --- | --- | --- |
| TAG_TYPE | | | Description of |
| Bit 1 | Bit 0 | TAG_ENABLE | Tag Queuing option flags |
| X | X | 0 | Tagged Queuing not implemented for this command. |
| 0 | 0 | 1 | A Simple Queue Tag (Tag Code = 20h) followed by a unique Tag ID is sent to the target immediately after the Identify message. |
| 0 | 1 | 1 | A Head of Queue Tag (Tag Code = 21h) followed by a unique Tag ID is sent to the target immediately after the Identify message. |
| 1 | 0 | 1 | An Ordered Queue Tag (Tag Code = 22h) followed by a unique Tag ID is sent to the target immediately after the Identify message |
| 1 | 1 | 1 | INVALID. |

Note:
X means "don't care"

All other bits in SCB control register field (Table 49) are either used by hardware interface module 462, sequencer 320 or reserved and should be initialized to zero by operating system specific module 461 before issuing a SCB send command.

Target/channel/LUN indicator field (Table 49) is an 8-bit field that indicates the specific target for which the SCB is to be executed. This field is written to by operating system specific module 461 in the format given in Table 56.

TABLE 56

Format for Target/LUN Indicator

| BIT | FUNCTION |
|-----|----------|
| 7 | SCSI Target ID |
| 6 | SCSI Target ID |
| 5 | SCSI Target ID |
| 4 | SCSI Target ID |
| 3 | CHANNEL |
| 2 | LUN |
| 1 | LUN |
| 0 | LUN |

Bits 4 to 7 (Table 56) in target/channel/LUN indicator field are a 4-bit field specifying the SCSI address of the particular target. For an 8-bit SCSI bus, the valid range for this SCSI ID field is from 0 to 7. For a 16-bit SCSI bus, the valid range is from 0 to 15. The valid range can be determined via the maximum number of targets on SCSI bus field in the host adaptor configuration data structure 5501 (Table 42).

The channel field (Table 56), bit 3 within target/channel/LUN indicator field, is a 1-bit field specifying the SCSI channel on which the target resides. If host adapter 7770 is configured for dual SCSI channels and this bit is set to one, sequencer 320 attempts to execute the SCB on the secondary SCSI channel. Otherwise, the SCB is executed on the primary SCSI channel. The SCSI channel field in host adapter configuration structure 5501 (Table 42) indicates which channel should be selected. Operating system specific module 461 simply takes the logic OR function of the value of the SCSI channel field (Table 42) with the target/channel/lun channel field value (Table 56). If SCSI module 330 is configured for dual channels and the SCB is for channel B, the SCSI channel field value is "08." The logical OR of this field with its target/channel/lun field sets the channel field bit to one. If host adapter 7770 is not configured for dual SCSI channels, bit 3 is always zero.

The LUN field (Table 56) is a 3-bit field specifying the Logical Unit Number of the target for which the SCB is to be executed.

Scatter/gather segment count field (Item 7, Table 49) is an 8-bit field that indicates the number of segments contained in the scatter/gather list. This field is written to by operating system specific module 461. The valid range of values for the scatter/gather segment count field is from 0 to 255. A value of 0 indicates that no data transfer is expected during execution of the SCB. A value of 1 indicates that all the data to be transferred to or from host memory 230 is contiguous. A value greater than 1 indicates that the data written to or read from host memory 230 is transferred in segments. If the value is greater than 1, reject modify data pointer messages (Bit 7, Table 54) flag in SCB control register (Item 5, Table 49) must be set to 1.

Scatter/gather segment pointer field (Table 49) is a 32-bit field that contains the physical address of the first byte of a list of data pointers and lengths to be used during the data phase of the SCSI command. This field is written to by operating system specific module 461, starting with the least significant byte first. Table 57 illustrates the structure of the scatter/gather list. The pointer in scatter/gather segment field is to "data pointer 1" in Table 57. In Table 57, each pair of a data pointer a data length defines one segment of data that is to be transferred.

TABLE 57

| Bit 32 | | Bit 0 |
|--------|---|-------|
| | DATA POINTER 1 | |
| | DATA LENGTH 1 | |
| | DATA POINTER 2 | |
| | DATA LENGTH 2 | |
| | DATA POINTER 3 | |
| | DATA LENGTH 3 | |
| | . | |
| | . | |
| | DATA POINTER n | |
| | DATA LENGTH n | |

Each data pointer is a 32-bit field containing the physical memory address (least significant byte first) of the first byte of a host memory data area to or from which data is to be transferred. Each data length is a 32-bit field containing the length in bytes (least significant byte first) of the data to be transferred to or from the data area pointed to by the corresponding data pointer. The maximum number of segments hardware interface module 462 supports is 255.

Data transfer by sequencer 320 is always via the Scatter/Gather mode. For commands which do not involve a data transfer, the number of scatter/gather list segments is set to zero by HIM 462. When the list contains only one segment, sequencer 320 can accept and execute a Modify Data Pointers message from a target. For lists containing more than one segment, HIM sets bit REJECT_MDP, as discussed above.

The pointer to the scatter/gather list must always be defined. To specify no data transfer, the number of scatter/gather segments must be set to 00h, and a dummy segment must be defined. The first 4 bytes of the segment element in the list can be any value. The last 4 bytes must be 00h.

SCSI command descriptor block pointer field (Item 9, Table 49) is a 32-bit field that contains the physical memory address of the first byte of the SCSI CDB to be sent to the target. This field is written to by operating system specific module 461, starting with the least significant byte. The command description block pointer actually points to the SCSI command descriptor block field (Item 15, Table 49) in the SCB data structure 5503, which is described more completely below. This pointer is required because sequencer 320 transfers the command descriptor block from host memory 230 to the target using a DMA transfer.

Command descriptor block length field (Item 10, Table 49) is an 8-bit field that specifies the length in bytes of the CDB. Normal SCSI commands are 6, 10, or 12 bytes. The value in the CDB length field is written to by operating system specific module 461. The maximum CDB length, in this embodiment, is 12 bytes so that all normal SCSI commands can be utilized.

Host adapter status field (Item 12, Table 49) is an 8-bit field that contains error information pertaining to either host adapter 7770 or SCSI module 330 in general. The value in this field is written by hardware interface module 462. This field is checked when SCB command status field (Item 1, Table 49) reports that either the SCB completed with an error or that the SCB was aborted. Table 58 gives the hexadecimal value of the host adapter status field and a description of the status corresponding to that value.

TABLE 58

HOST ADAPTER STATUS

| Name | Value (Hex) | Description |
| --- | --- | --- |
| HOST_NO_STATUS | 00 | No Host Adapter Status Available |
| HOST_ABT_STATUS | 04 | Command Aborted by Host |
| HOST_ABT_HA | 05 | Command Aborted by Host Adapter |
| HOST_SEL_TO | 11 | Selection Timeout |
| HOST_DU_DO | 12 | Data Overrun or Underrun Occurred |
| HOST_BUS_FREE | 13 | Unexpected Bus Free Occurred |
| HOST_PHASE_ERR | 14 | Invalid Bus Phase Detected (SCSI Reset) |
| HOST_INV_LINK | 17 | Invalid SCSI Linking |
| HOST_SNS_FAIL | 1B | Request Sense Command Failed |
| HOST_TAG_REJ | 1C | Tagged Queuing Message Rejected by Target |
| HOST_HW_ERROR | 20 | Host Adapter Hardware Error |
| HOST_ABT_FAIL | 21 | Target Failed to Respond to Attention (SCSI Reset) |
| HOST_RST_HA | 22 | SCSI Bus Reset by Host Adapter |
| HOST_RST_OTHER | 23 | SCSI Bus Reset by Other Device |

Target status field (Table 49) is an 8-bit field that contains the data byte returned by the target during SCSI "Status Phase". The value in this field is written to by hardware interface module 462. If the command operation terminated before the target was able to transfer a status byte, the value in this field is set to zero and the host adapter status is non-zero. Table 59 gives one embodiment of values for target status and the corresponding target status.

TABLE 59

TARGET STATUS

| Name | Value (Hex) | Description |
| --- | --- | --- |
| UNIT_GOOD | 00 | Good Status or No Target Status Available |
| UNIT_CHECK | 02 | Check Condition |
| UNIT_MET | 04 | Condition Met (For Search Data and Pre-Fetch Commands) |
| UNIT_BUSY | 08 | Target Busy |
| UNIT_INTERMED | 10 | Intermediate (For Linked SCSI Commands) |
| UNIT_INTMED_GD | 14 | Intermediate-Condition Met |
| UNIT_RESERV | 18 | Reservation Conflict |

If the target returns a "Queue Full Status", i.e., a value of 28h, HIM 462 queues the SCB internally. Therefore, "a value of 28h" is never stored in the target status field. Thus, OSM 461 never sees a target status of 28h.

Residual byte count field (Table 49) is a 32-bit field that contains the number of bytes that remains to be transferred to or from host memory 230. This field is written to by hardware interface module 462, starting with the least significant byte first. This field is valid only if host adapter status field (Item 12, Table 61) reports a data overrun/ underrun status, i.e., has a value of 012h. If the error was a data overrun, this field is set to zero.

Command descriptor block (CDB) (Table 49) is a 12-byte field that contains the 6, 8, or 12 byte CDB that is sent to the target during "Command" phase. This field is written to by operating system specific module 461.

Sense information pointer (Table 49) is a 32-bit field that contains the physical memory address of the first byte of the host memory data area where the target's sense information is to be stored. This field is written by operating system specific module 461, starting with the least significant byte first, if the Auto sense bit, bit 7, in SCB option flags field is set to one. The number of bytes transferred does not exceed the value specified in the sense length field (Table 49).

Sense length field (Table 49) is a 32-bit field that specifies the maximum number of sense information bytes that the host adapter 7770 transfers. The actual number of bytes transferred may be less. The supported values are from 0 to 256 bytes. If a value of zero is stored in this field, no bytes are transferred and the sense information is lost.

Pointer to next SCB on queue field (Table 49) is a virtual pointer to the next SCB on the queue. This pointer is used exclusively by hardware interface module 462. When an SCB is sent via SCB send command, hardware interface module 462 queues the SCB by attaching it to a chain of SCBs using this field. Therefore, an unlimited number of SCBs can be maintained by hardware interface module 462.

Hardware interface module work area (Item 19, Table 49) is a 6-byte field that is reserved for use by the hardware interface module 462 only. It is not necessary for the operating system specific module 461 to initialize this field.

Initialization process 5600 obtains information about host adapter 7770 from a file that is contained in computer system 200. This file defines the register name for all registers in host adapter 7770; the name for each bit in each register that is used by host adapter 7770 to store data; and the address offset of each register and bit relative to the address for the module in which the register is physically located. This information is presented in Appendices I, II, and III.

In addition, the size of the data FIFO, 8- and 16-bit synchronous transfer offsets, the maximum SCSI data width, and the size of SCB array 443 are specified. Each SCSI message processed by sequencer 320 is also assigned a name and a constant value. SCSI messages for one embodiment are given in Table 60.

TABLE 60

| MESSAGE | | NAME | VALUE (Hex) |
| --- | --- | --- | --- |
| SCSI | Command Complete | MSG00 | 0 |
| SCSI | Extended Message | MSG01 | 1 |
| | Synchronous Data Transfer Message | MSGSYNC | 1 |
| | Wide Data Transfer Message | MSGWIDE | 3 |
| SCSI | Save Data Pointers | MSG02 | 2 |
| SCSI | Restore Data Pointers | MSG03 | 3 |
| SCSI | Disconnect | MSG04 | 4 |
| SCSI | Initiator Detected Error | MSG05 | 5 |
| SCSI | Abort | MGS06 | 6 |
| SCSI | Message Reject | MSG07 | 7 |
| SCSI | NOP | MSG08 | 8 |
| SCSI | Message Parity Error | MSG009 | 9 |
| SCSI | Linked Command Complete | MSG0A | 0a |
| SCSI | Linked Command Complete | MSG0B | 0d |
| SCSI | Bus Device Reset | MSG0C | 0c |
| | Identify Message, No Disconnection | MSGID | 80 |
| | Identify Message, Disconnection | MSGID_D | c0 |

Interrupt codes (Table 61) are also defined that identify actions to be taken by HIM.

TABLE 61

| DESCRIPTION | NAME | VALUE (Hex) |
| --- | --- | --- |
| Initiate Synchronous Negotiation | SYNC_NEGO_NEEDED | 00 |
| Possible Parity Error In CDB:Retry | CDB_XFER_PROBLEM | 10 |

TABLE 61-continued

| DESCRIPTION | NAME | VALUE (Hex) |
|---|---|---|
| Handle Message Out Phase | HANDLE_MSG_OUT | 20 |
| Data Overrun Detected | DATA_OVERRUN | 30 |
| Handle The Message In From Target | UNKNOWN_MSG | 40 |
| Check Condition From Target | CHECK_CONDX | 50 |
| Unexpected SCSI Bus Phase | PHASE_ERROR | 60 |
| Handle Expected Message From Target | EXTENDED_MESSAGE | 70 |
| Abort Connected Target | ABORT_TARGET | 80 |
| Reselection With No ID Message | NO_ID_MSG | 90 |

The interrupt codes are compared to the most significant four bits of register INTSTAT when a sequencer interrupt SEQINT occurs. Finally, data stored in scratch RAM 442 (Table 62) are defined as well as offset to the scratch RAM 442, SCB array 443, and to the registers in SCSI module 330, sequencer 320, and host interface module 310, respectively. One embodiment, of the information used in initialization process 5600 is presented in Microfiche appendix in file "him_equ.h," which is incorporated herein by reference in its entirety.

TABLE 62

| DESCRIPTION | NAME | VALUE (Hex) |
|---|---|---|
| Offset From Base To EISA Host Registers | EISA_SCRATCH1 | 20 |
| Offset From Base To ISA Host Registers | ISA_SCRATCH1 | 0400 |
| 16-Byte Array For Wide/Sync Transfers | XFER_OPTION | 00 |
| 2-Byte Mask For Parity (1 = enabled) | PARITY_OPTION | 10 |
| 2-Byte Mask For Discon (1 = disabled) | DISCON_OPTION | 12 |
| Information Byte Passed To Driver | PASS_TO_DRIVER | 1a |
| Offset From Base To EISA Host Registers | EISA_SCRATCH2 | 40 |
| Offset From Base To ISA Host Registers | ISA_SCRATCH2 | 0800 |
| Bios Configuration Options | BIOS_CONFIG | 0d |
| 2-Byte Mask For BIOS Scan | IGNORE_IN_SCAN | 0e |
| Table Of INT13 Drives (up to 8) | INT13_DRIVES | 10 |
| 2-Byte Mask For Start Unit Command | START_UNIT | 18 |
| SCSI Configuration Info (1 byte/bus) | SCSI_CONFIG | 1a |
| Storage For Interrupt Level | INTR_LEVEL | 1c |
| Threshold And Bus Release Information | HOST_CONFIG | 1d |
| Storage For DMA Channel | DMA_CHANNEL | 1e |
| Copy OF SBLKCTL After Reset | SBLKCTL_COPY | 1f |

As explained above, find host adapter process 5610 is provided a port address and returns the number of SCSI channels if a host adapter 7770 is at that address. If a scan of ports is desired find host adapter process 5610 if repeatedly called with a different port address each time. Table 63 gives the syntax, return values and parameters for routine "scb_findha" in Microfiche Appendix A.

TABLE 63

| scb_findha Process | |
|---|---|
| Syntax | |
| #include "scb.h" unsigned char scb_findha (unsigned int port_addr); | |
| Return Value | |
| 0x00 | No host adapter found. |
| 0x01 | Host adapter found (single channel, 8 or 16 bit SCSI). |
| 0x02 | Host adapter found (dual SCSI, both channels 8 bit). |
| Parameters | |
| port_addr | host adapter based port address. For EISA, port_addr = 'xC00' where 'z' = slot number. For ISA, port_addr = 120, 140, 220, 240, 280, 2A0, 320, or 340. |

Figure 57:
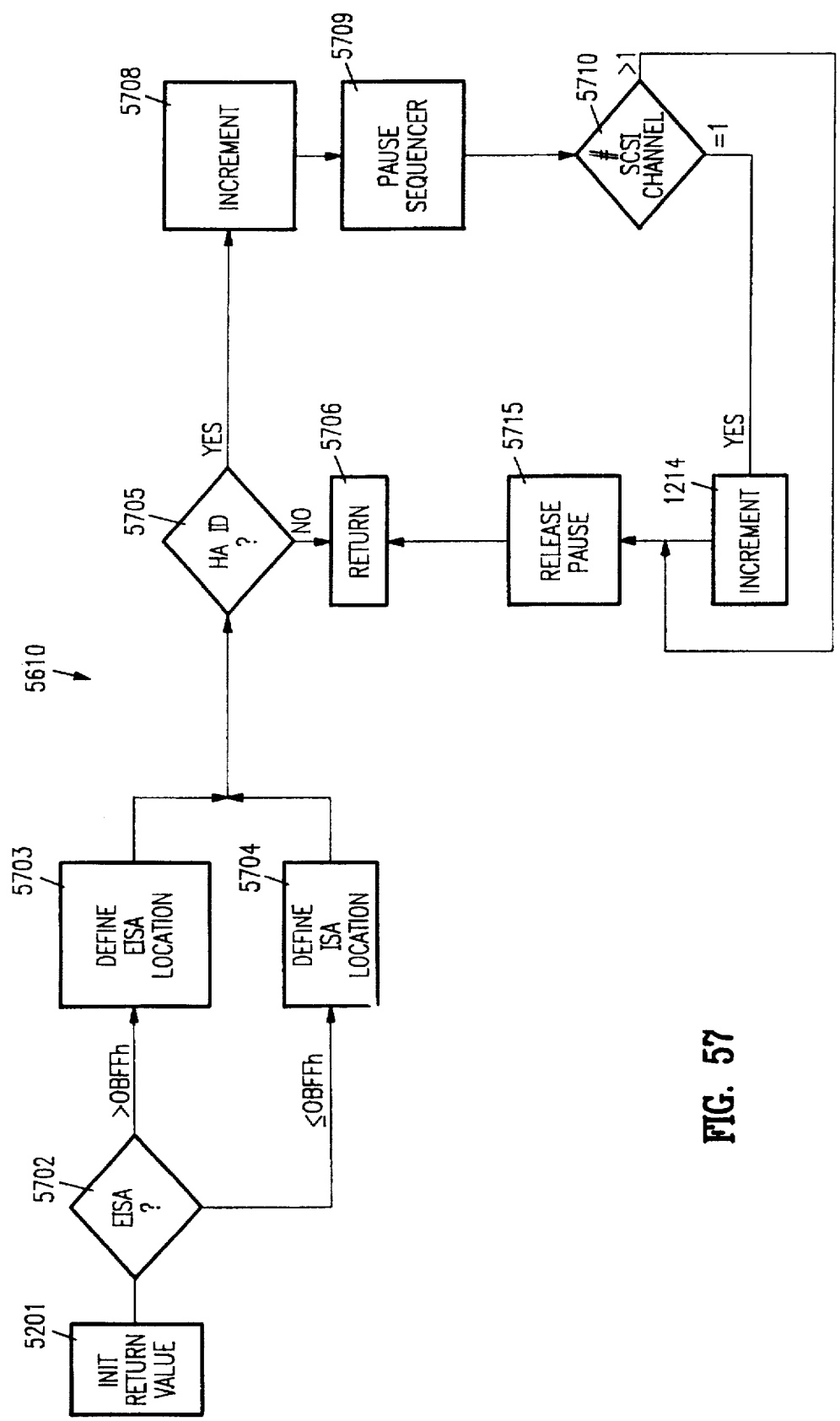
FIG. 57 is a more detailed process flow diagram for the host adapter process of this invention.

One embodiment of find host adapter process 5600 is illustrated in FIG. 57. In initialize return value step 5701, the number of SCSI channels is set to zero. EISA check step 5702 compares the port address passed in with 0bffh and if the port address is greater than 0bffh passes to define EISA locations step 5703 and otherwise to define ISA locations step 5704. In both steps 5703 and 5704, the locations of board ID register BID0, host control register HCNTRL, and the copy of SCSI block control register SBLKCTL in scratch RAM 442 are defined relative to the port address.

Host adapter ID check step 5705, compares the value stored in registers BID0, BID1, and BID2 with "ADP77xx." If the check is not satisfied processing goes to return 5706. If host adapter product check is satisfied, increment step 5708 increments the return value for the number of SCSI channels in the host adapter at the base port.

Pause sequencer step 5709 sets bit PAUSE in register in host control register HCNTRL and waits for sequencer 320 to generate a signal that sets bit PAUSEACK in that register. Note that hardware in sequencer 320 responds to bit PAUSE being set so this is possible even though the sequencer firmware has not yet been downloaded to sequencer RAM 441. Number of SCSI channels check 5710 examines bit SELWIDE in register SELWIDE. If bit SBLKCTL is set, host adapter 7770 is configured for one 16-bit channel and so processing transfer to release pause step 5715.

If bit SELWIDE is zero, HIM 462 selects channel B by writing "08" to register SBLKCTL. HIM 462 then reads bits BSY and MSG in register SCSISIGI. If bit BSY is zero and bit MSG is one, host adapter 7770 is configured for one 8-bit channel and processing transfers to release pause step 5715. Otherwise, host adapter 7770 is configured for two 8-bit SCSI channels and so increment step 5714 increments the return value. In either case processing goes to release pause step 5715, where bit PAUSE is cleared and then returns through return 5706.

As explained above, get host adapter configuration process 5630 is passed a pointer to a host adapter configuration structure 5501. OSM 461, prior to initiating get host adapter configuration process, initializes the port address field, the pointer to host adapter structure 5502, and the SCSI channel field (Table 42) in host adapter configuration structure 5501.

Table 64 gives the syntax, return values and parameters for routine "scb_getconfig" in Microfiche Appendix A. which is incorporated herein by reference.

143

TABLE 64 scb_getconfig PROCESS

Syntax include "scb.h"
 void scb_getconfig(ha_config *config_ptr);

Return Value

None

Parameters config_ptr      Pointer to a host adapter configuration structure.

---

Figure 58A:
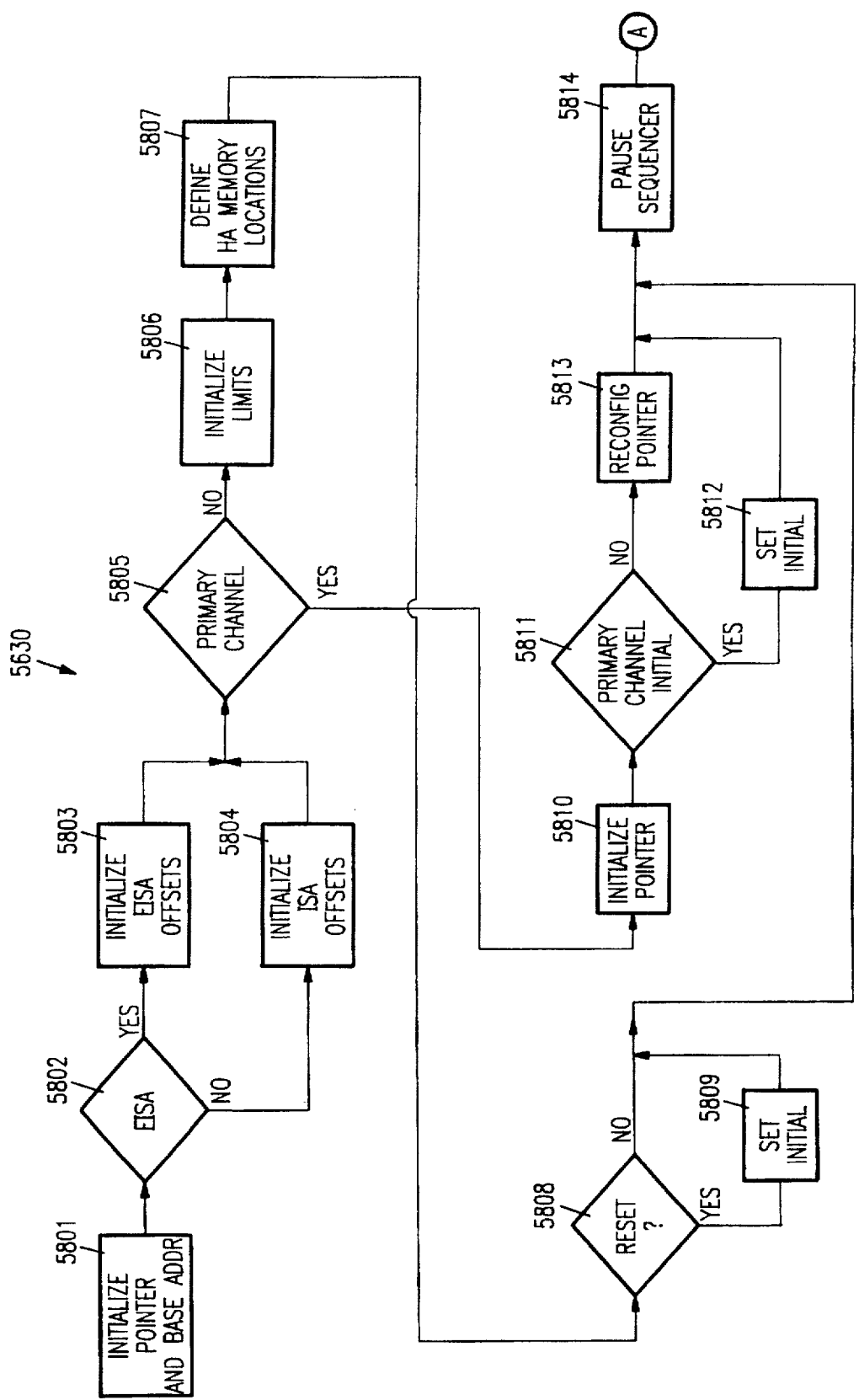
FIGS. 58A and 58B are a more detailed process diagram of the process host adapter configuration of this invention.
Figure 58B:
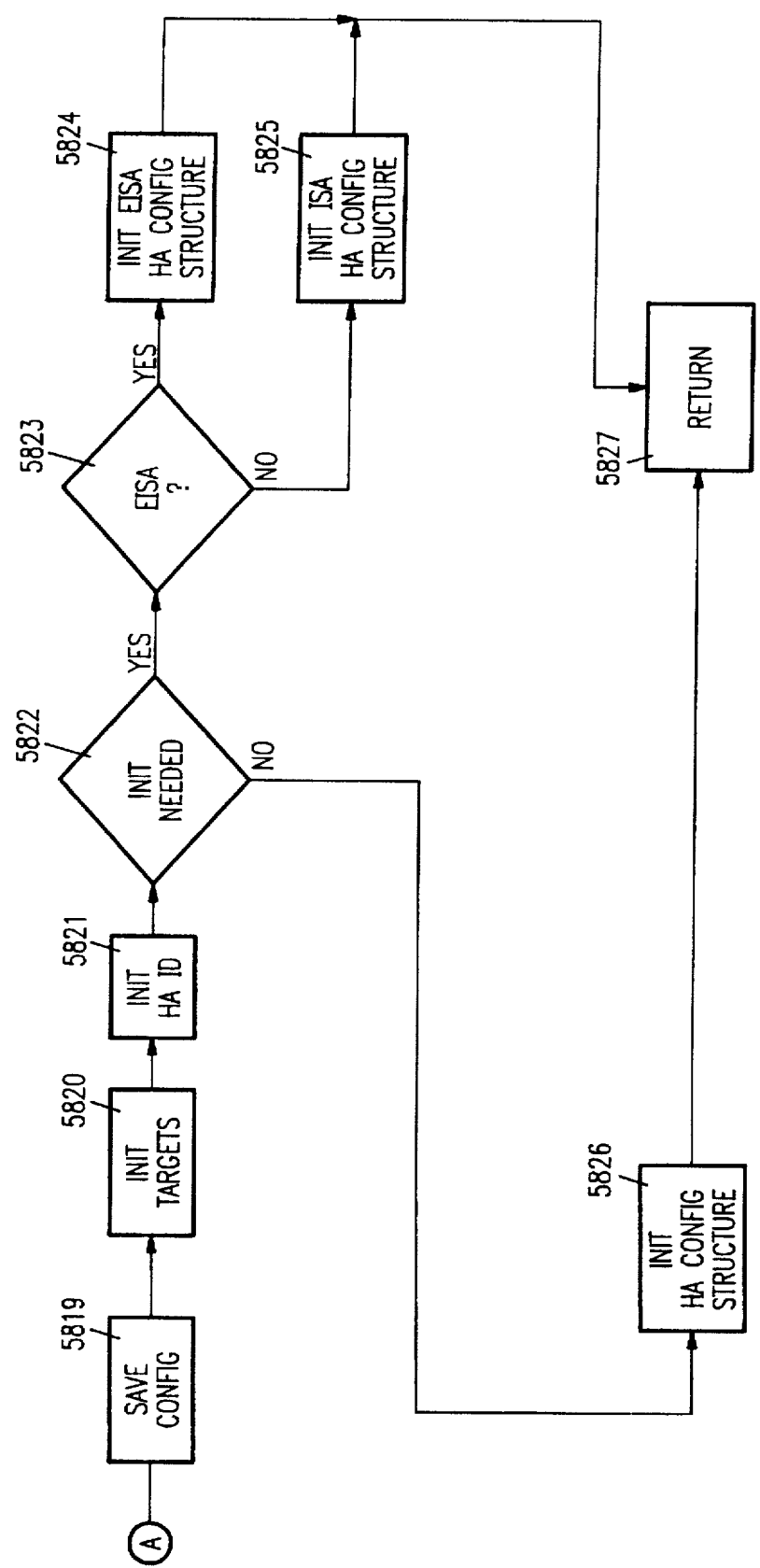
Figure 59:
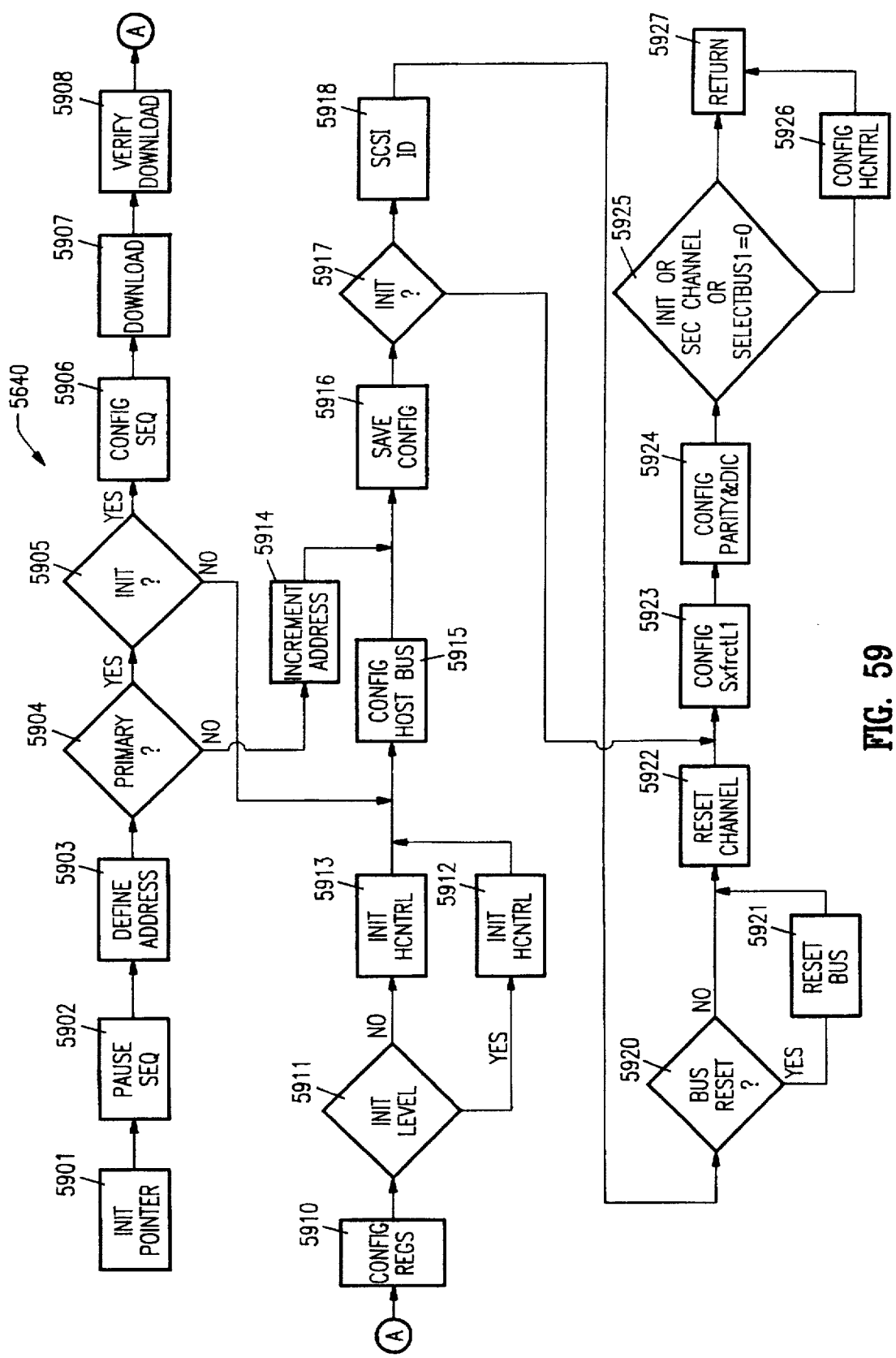
FIG. 59 is a process flow diagram for the host adapter initialization process of this invention.
Figure 60:
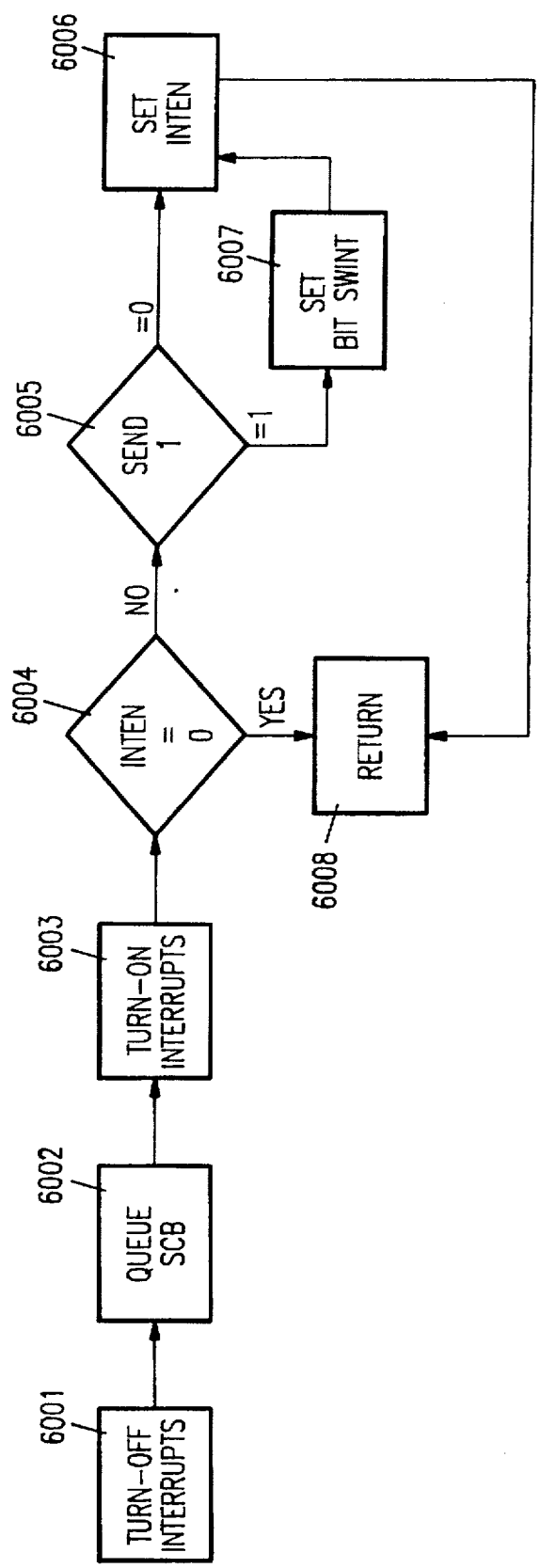
FIG. 60 is a process flow diagram for the SCB_SEND process of this invention.

FIGS. 58A and 58B are a process flow diagram for one embodiment of get host adapter configuration 5630. In initialize pointer and base address step 5801, pointer passed to the process is used to identify the host adapter configuration structure 5501 and then the port address in that structure is assigned to the base address.

EISA check step 5802 compares the base address to 0bffh and if the base address is greater than 0bffh branches to initialize EISA offsets step 5803 and otherwise to initialize ISA offsets step 5804. In steps 5803 and 5804, the offsets from the base address for scratch space in scratch RAM 442 for SCSI channels A and B, the memory locations in sequencer 320, host interface module 310 and SCB array 443 are initialized.

Primary channel check step 5805 examines the SCSI channel designator field in host adapter configuration structure 5501 to determine whether the channel is the primary channel. If host adapter configuration structure is for the primary channel processing transfers to step 5806 and to step 5810 otherwise.

Initialize limits step 5806 specifies the depth of SCB array 443, e.g., 4; the maximum number of tagged commands per target, e.g., 3; and the maximum number of non-tagged command per target, e.g., 2. Define host adapter memory locations step 5807 specifies the locations for registers SCSISEQ, SXFRCTL0, SXFRCTL1, SCSISIG, SCSIRATE, SCSIID, SCSIDATL, CLRSINT0, CLRSINT1, SSTAT1, SIMODE1, SCSIBUSL, and SBLKCTL in SCSI module 330; for registers XFER_OPTION and PASS_TO_DRIVER in scratch RAM 442; for the low byte of the program counter register SEQADDR0 in sequencer 320; for registers HCNTRL, SCBPTR, INTSTAT, CLRINT, SCBCNT, QINFIFO, QINCNT, QOUTFIFO, and QOUTCNT in host interface module 310; and for locations scb00, scb02, scb03, scb11, scb 14 in SCB array 443.

Reset check step 5808 examines bit CHIPRESET in register HCNTRL to determine whether it is set. If bit CHIPRESET is set, bit initialization needed flag INIT_NEEDED in host adapter configuration flags field of host adapter configuration structure is set. Processing transfers to pause sequencer step 5814.

Recall that if host adapter configuration structure was for the secondary SCSI channel, primary channel check step 5805 transferred control to initialize pointer step 5810. Initialize pointer step uses the pointer passed to get host adapter configuration process 5630 to identify host adapter configuration structure 5501 for the secondary SCSI channel.

Primary channel initialization check step 5811 changes the pointer back to the host adapter configuration structure of the primary channel and examines bit initialization needed flag INIT_NEEDED in host adapter configuration flags field. If bit INIT_NEEDED is set, processing transfers to set initialization step 5812 and otherwise to reconfigure pointer step 5813.

144

Set initialization step 5812 changes the pointer back to the host configuration structure for the secondary channel and sets bit INIT_NEEDED in host adapter configuration flags field. Reconfigure pointer step 5813 changes the pointer back to the host configuration structure for the secondary channel.

Pause sequencer step 5814 pauses sequencer 320 using the same steps as previously described. In step 5819, the configuration of registers SBLKCTL and HCNTRL are stored in memory 230.

Initialization maximum targets step 5820, samples bit SELWIDE in SCSI block control register SBLKCTL. If the bit is set, the maximum number of targets is set to 16 and otherwise to 8. Initialize HA ID step 5821 initializes the host adapter identification fields (Table 42) in host adapter configuration structure 5501. Hardwired registers BID2 and BID3 in host adapter 7770 are read and used to appropriately configure host adapter ID field. The EISA release and revision level are retrieved from host memory 230 and assigned to the release and revision fields respectively.

Initialization needed step 5822 examines bit initialization needed flag INIT_NEEDED in host adapter configuration flags field of host adapter configuration structure 5501. If bit initialization needed is set, processing transfers to EISA check step 5823 and otherwise to initialize host adapter configuration structure step 5826.

EISA check step 5802 compares the base address to 0bffh and if the base address is greater than 0bffh branches to initialize EISA HA configuration structure step 5824 and otherwise to initialize ISA HA configuration structure step 5825. The above discussion of host adapter configuration structure 5501 is incorporated herein by reference. Steps 5824 and 5825 complete specifying the various field in structure 5501 as described therein.

Steps 5824 and 5825 transfer to return step 5827 restores the configuration stored in memory 230 to registers SBLKCTL and HCNTRL.

Initialize HA configuration structure step 5826 reads the required data from appropriate registers in host adapter 7770 and transforms the data as necessary to provide the required values in host adapter structure 5501. Step 5826 also transfers to return 5827, which was described above.

As explained above, host adapter initialization process 5640 is passed a pointer to a host adapter configuration structure. Table 65 gives the syntax, return values and parameters for routine "scb_initha" in Microfiche Appendix A, which is incorporated herein by reference.

TABLE 65 scb_initha PROCESS

Syntax unsigned char scb_initha(ha_config *config_ptr);

Return Value

| 0x00 | Initialization successful. |
|---|---|
| Otherwise initialization failed | |

Parameters config_ptr      Pointer to a host adapter configuration structure. hardware interface module 462 uses this pointer to fill host adapter configuration structure with the correct data.

---

In initialize pointer step 5901, the host adapter structure pointer field value in host adapter configuration structure pointed to by the pointer passed to host adapter initialization process 5640 is assigned to the host adapter structure pointer. Pause sequencer step 5902 pauses sequencer 320 and waits for bit PAUSEACK in register HCNTRL to be set. When bit PAUSEACK is set, define address step 5903 defines the location of register PARITY_OPTION and register DISCON_OPTION in scratch RAM 442.

Primary channel check 5904 examines the value of the SCSI channel designator field in host adapter configuration structure 5501 and if the value indicates a primary channel transfers to initialization needed step 5905. Conversely, if the value indicates the secondary channel processing transfers to increment address step 5914.

Initialization needed step 5905 examines bit INIT_NEEDED in host adapter configuration flags field of host adapter configuration structure 5501. If bit INIT_NEEDED is set, processing transfers to configure sequencer step 5906 and otherwise to configure host bus step 5914.

Configure sequencer step 5906 configures sequencer 320 for download step 5907. First, the port address is configured to the base address for the sequencer registers. Next, bits PERRORDIS and LOADRAM in register SEQCTL are set. Program counter register SEQADDR0 is zeroed and processing transfers to download 5907.

Download 5907 transfers the sequencer firmware from host memory 230 to sequencer RAM 441 through register SEQRAM. The sequencer firmware is assembled and linked with the program for HIM 462 when the HIM program is compiled and linked. To explain how this operation is preferably performed, the discussion of host adapter initialization process 5640 is briefly interrupted and the process for linking the sequencer firmware with the HIM driver program is described.

Two INCLUDE files are shared by HIM 462 and the sequencer firmware. The first file, which is named "arrowequ.inc" in Microfiche Appendix A and which is incorporated herein by reference in its entirety, contains the definition of all registers and bits within the registers in host adapter 7770. The mnemonics are the same as those used herein and in Appendices I, II and III.

The second file, which is named "scb.inc" in Microfiche Appendix A and which is incorporated herein by reference in its entirety, contains a definition of the SCB structure 5503, host adapter structure 5502, and host adapter configuration structure 5503, as each was defined above. Further, structures 5501 and 5503 may contain operating specific system members. All SCB and host adapter register definitions used by sequencer 320 are contained within these two files.

Several sequencer firmware address labels have been declared public for use by HIM 462. The HIM program must declare these labels as external for assembly and linking. The labels are listed below in a block which can be placed at the top of the HIM module, outside of the code segment:

| EXTRN sequencer_program:NEAR; | start of Sequencer program |
|---|---|
| EXTRN idle_loop:NEAR; | entry to idle loop |
| EXTRN start_link_cmd:NEAR; | entry for linked SCSI command |
| EXTRN siostr3:NEAR; | restart after a CDB transfer problem |
| EXTRN sio204:NEAR; | restart after a CDB transfer problem |
| EXTRN ackreq:NEAR; | restart after parity error |

To use these labels for starting sequencer 320, the HIM program must preface the label with the directive OFFSET, but without a segment override. To restart sequencer 320 at label 'sio204', the following example code could be used to load the sequencer address registers:

```
mov     dx,seqaddr0
mov     ax,OFFSET sio204
out     dx,al
inc     dx
mov     al,ah
out     dx,al
```

The OFFSET directive provides the address of 'sio204', referenced to the beginning of the sequencer firmware segment.

To access the sequencer firmware in the HIM program, the HIM program must preface a code label with the directive OFFSET and a segment override specifying the HIM program segment. The address of the sequencer firmware code label is then referred to the beginning of the HIM program segment. For example, the 'si' source index register needs to be loaded with the beginning of the sequencer firmware in the HIM module in preparation for loading the sequencer firmware from the HIM module to sequencer RAM 442. The instruction is:

mov si,OFFSET HIM Segment: sequencer program to move the address of 'sequencer program' with respect to the HIM segment into 'si'.

The only segment in the sequencer firmware module is 'sequence_code'. This segment is included in the HIM's program segment list, but not within a GROUP statement. By not grouping with other segments, the OFFSET directive refers sequencer addresses to the beginning of the sequencer segment. The module to be linked with the HIM object code is 'sequence.obj'.

Returning to download step 5907, HIM 462 does a block move from system memory 230 starting at address "sequencer program". A number of bytes equal to the size of the sequencer firmware is transferred through register SEQRAM to sequencer RAM 441. When all the sequencer firmware has been downloaded, bit LOADRAM in register SEQCTL is cleared.

In verify download step 5908, bits PERRORDIS and LOADRAM in register SEQCTL are again set, and program counter register SEQADDR0 is zeroed. Each byte of the sequencer firmware is read from sequencer RAM 441 through register SEQRAM. If the number of bytes read from sequencer RAM 441 equals the size of the sequencer firmware, bit LOADRAM in register SEQCTL is cleared and processing continues to configure registers step 5910. If the number of bytes is not equal to the size of the sequencer firmware, an error is returned and host adapter initialization process 5640 is terminated.

Configure registers step 5910 sets bits FAILDIS and SEQRESET in register SEQCTL. Bit FAILDIS, when set, disables illegal opcode and illegal address interrupts. Bit SEQRESET, when set, clears the address pointer for sequencer RAM 441 so that the sequencer begins execution of the sequencer firmware at location zero. Configure registers step 5910 also sets bit BRKDIS in register in register BRKADD1, which disables the break on compare feature of sequencer 320.

Interrupt level flag INTHIGH in bit 2 (Table 44) of host adapter configuration flags field (Table 42) is compared with zero. If the value of interrupt level flag INTHIGH is zero, processing transfers to initialize register HCNTRL step 5912 and otherwise to initialize HCNTRL step 5913. In step 5912, bits PAUSE and IRQMS in register HCNTRL are set and in step 5913 only bit PAUSE is set.

In configure host bus step 5915, the data FIFO threshold in host adapter 7770 is set and the information in host adapter configuration structure specifying the operational characteristics for host computer bus 226 is loaded in host adapter registers BUSTIME and BUSSPD as required. For an EISA bus, bit ENABLE in register BCTL is set. For an ISA bus, the parameters are adjusted if needed to maintain the parameters within the allowable limits. Configure host bus step 5915 transfers processing to step 5916.

In step 5916, the data in register SBLKCTL and HCNTRL is stored in memory 230.

Recall that primary channel step check 5904 transferred processing to increment address step 5914 if the secondary channel is being initialized. Increment address step increments the address for register PARITY_OPTION and register DISCON_OPTION in scratch RAM 442 and transfers processing to step 5916.

Initialization needed step 5917 examines bit INIT_NEEDED in host adapter configuration flags field of host adapter configuration structure 5501. If bit INIT_NEEDED is set, processing transfers to SCSI ID step 5918, which writes the SCSI ID in host configuration structure 5501 to register SCSIID, and otherwise to configure register SXFRCTL1 step 5923.

SCSI ID step 5918 transfer processing reset SCSI bus check step 5920 which examines the reset bus bit in host adapter configuration flags field (Table 42). If the bus reset bit is set, host adapter 7770 is used to reset SCSI bus 400. Specifically, bit SCSIRSTO in register SCSISEQ is set and then after a selected time, register SCSISEQ is cleared.

In the next step, reset channel step 5922, the SCSI channel in SCSI module 330 is reset. Specifically, the sequencer registers listed in Table 66 are initialized. If specific bits are not listed in Table 66, the entire register is initialized.

TABLE 66

| register | bits | comment |
|---|---|---|
| SCSISEQ | | set to 00 |
| CLRSINTO | | set to 0ffh |
| CLRSINT1 | | set to 0ffh |
| SIMODE1 | ENSCSIPERR | parity error interrupt enable: set to 1 |
| XFER_OPTION | | SCSI data transfer option (16 registers) |

All data transfer options, i.e., 16 bytes, starting at register XFER_OPTION, are set to 8fh to cause sequencer to initiate synchronous negotiation if either bit 7, WIDE_MODE, or bit 0, SYNC_MODE, in SCSI target negotiation options field (Table 46) in host adapter configuration structure 5502 are set. Registers CLRINT, DFCNTRL, QINFIFO, and QOUTFIFO are also initialized.

Configure register SXFRCTL1 step 5923 uses the data in selection timeout value in bits 3 and 4 of host adapter configuration flags field to set bits STIMESEL and sets bit ENSTIMER.

Configure parity and disconnection options set 5924 specifies the disconnection and parity checking on a per target basis. The disconnection options are loaded in registers DISCON_OPTION and DSICON_OPTION+1 in scratch RAM 442 and the parity checking options are stored in registers PARITY_OPTION and PARITY_OPTION+1 in scratch RAM 442. Each bit in these registers represents a target, with the lowest order bit corresponding to the lowest target address. The targets represented by these two-byte options depends on whether the SCSI bus is narrow or wide:

| | narrow: |
|---|---|
| byte 0: | channel 0 targets 7–0 |
| byte 1: | channel 1 targets 7–0 |
| | wide: |
| byte 0: | targets 7–0 |
| byte 1: | targets 15–8 |

Parity checking is enabled by setting the option bit to 1. Disconnection is disabled by setting the option bit to 1. After registers PARITY_OPTION and DISCON_OPTION are initialized, the data stored in memory 230 for register SBLKCTL is written back to that register.

Check step 5925 tests whether flag INIT_NEEDED is set, the SCSI channel is the secondary channel, or bit SELBUS1 in register SBLKCTL is zero. If any one of this conditions is true, processing transfers to configure register HCNTRL step 5925 and otherwise to return step 5927.

Configure HCNTRL step 5926 clears bit PAUSE to release sequencer 320 and sets bit INTEN in register HCNTRL and then goes to return step 5927.

As explained above, user application 401 communicates with the SCSI devices through operating system 402 which calls OSM 461. OSM 461, in response to a command from operating system 402, constructs a SCB 5503, as defined above, and sends SCB 5503 via a SCB send command to HIM 462. HIM 462 sends the SCB to SCB array 443 if a slot is available and otherwise queues the SCB in memory 230. One embodiment of the SCB send command is presented in Microfiche Appendix A as "scb_send," which is incorporated herein by reference in its entirety. The syntax, parameter, and return values for "scb_send" are given in Table 67.

TABLE 67 scb_send PROCESS

Syntax include "scb.h"
void scb_send(ha_config *config_ptr,
    scb_struct *scb_pointer);

Return Value

None

Parameters

| config_ptr | Pointer to a host adapter configuration structure. |
|---|---|
| scb_pointer | Pointer to sequencer control block (SCB) which is to be executed. |

In SCB send process, turn-off interrupts step 6001 disables system interrupts. The state of register HCNTRL is saved in memory 230 and bit INTEN is turned off.

Queue SCB step 6002 places the SCB passed to SCB send process on the queue managed by HIM 462. Initially, host adapter flags field in host adapter structure 5502 pointed to by the pointed passed to SCB send process is examined. If bit QUEUE_ACTIVE in host adapter flags field is zero, bit SCB_HEAD is set. Head-of-queue pointer in host adapter structure 5502 is set to point to the SCB options flag field in the SCB and bit QUEUE_ACTIVE in host adapter flags field is set.

If bit QUEUE_ACTIVE is not set initially, the SCB pointer is set to end of queue pointer in host adapter structure 5502 and next SCB pointer on the queue in SCB 5503 is assigned the value of the. SCB pointer passed to SCB send process. Bit SCB_CHAINED in SCB options flag field is set to indicate that the next SCB is valid.

Next, the SCB command status is set to SCB_PENDING and the intermediate status of SCB field is set to SCB_PROCESS to indicate that the SCB needs to be processed. The bit SCB_CHAINED is checked to ascertain that it is set. If the bit is not set, processing goes to step 6003. Finally, the end of queue pointer in host adapter structure 5502 is assigned the value of the SCB pointer to complete the queue process.

In turn are interrupts step 6003, the hardware interrupts on enabled and in step 6004 bit INTEN in register HCNTRL is checked. If bit INTEN is not set, the SCB send process returns. Send check 6005 call process send command which HIM 462 uses to determine whether to send the SCB to host adapter 7770. If send command returns with a non-zero value, a SCB finished due to an illegal command and step set bit SWINT sets that bit so a hardware interrupt is generated when bit INTEN is set. Step 6006 sets bit INTEN and returns.

In the queue active check step of send command, the return status is initialized to one and the status of host adapter flags field in the host adapter structure 5502 passed to send command process is checked to ascertain whether the SCB queue is active. If the SCB queue is active processing continues, and otherwise returns. Interrupt off step disables all system interrupts from host adapter 7770, as described above.

The following steps are performed for each SCB in the queue starting at the head of the queue. The SCB intermediate status field is read and if the status is SCB_PROCESS, the SCB is queued. Specifically, if SCB command type field has the value EXEC_SCB, the SCB Target/Channel/LUN field is read. For the specified target if the command is a non-tagged command, it is determined whether the maximum number of SCB with non-tagged commands are pending for the target. If maximum number are pending, the intermediate status for the SCB is set to SCB_WAITING and otherwise to SCB_READY.

Similarly, for the specified target if the command is a tagged command, it is determined whether maximum number of SCB with tagged commands are pending for the target. If maximum number are pending, the intermediate status for the SCB is set to SCB_WAITING and otherwise to SCB_READY. In either case, processing transfers to send scb step.

If the SCB status is SCB_PROCESS and the SCB command type field has a value other than those supported by HIM 462, the intermediate status is set to SCB_DONE_ILL and the processing proceeds to the next SCB in the queue.

If when the SCB intermediate status field is read, the status is SCB_READY, processing jumps directly to send scb step. In send scb step, the array of SCB pointers in host adapter structure 5502 is examined to determine whether an empty slot exists in the SCB array 443. If an empty slot exists, it is marked busy in the array of SCB pointer in host adapter structure 5502. The SCB intermediate status field for the SCB is set to SCB_ACTIVE.

Next sequencer 320 is paused and the pointer in register SCBPTR is saved in memory 230. The empty slot in the SCB array is selected by placing the slot address in register SCBPTR. Bit SCBAUTO in register SCBCNT is then set. The 19 bytes in the SCB from intermediate status field to residual byte count field are then downloaded to SCB array 443.

After the SCB is downloaded, bit SCBAUTO is cleared and the slot address is placed in register QINFIFO. The value stored in memory 230 is restored to register SCBPTR and sequencer 320 is unpaused and the next SCB in the queue is processed. Finally, the hardware and system interrupts are enabled and processing returns to the calling process.

When an uncommon situation is encountered by sequencer, i.e., a situation that sequencer 320 is not configured to handle, sequencer 320 notifies HIM 462 by setting either bit SCSIINT or bit SEQINT in register INTSTAT. When bit SCSIINT is set, sequencer 320 has been paused automatically by one or more interrupts enabled in registers SIMODE0 and SIMODE1. When bit SEQINT is set, sequencer 320 has paused itself, and requested assistance from HIM 462. Bits INTCODE in register INTSTAT indicate the response required from HIM 462. The codes written to bits INTCODE are given in Table 61 above, which is incorporated herein by reference. Also, HIM 462 may encounter an uncommon situation, and wish to abort an SCB already loaded into sequencer 320. These situations are discussed more completely below.

When HIM 462 is interrupted with bit SCSIINT set in register INTSTAT, HIM 462 first checks registers SIMODE0 and SIMODE1 to determine which interrupts are enabled. HIM 462 next checks register SSTAT1 to determine whether a bus reset, a selection timeout condition, or a bus free condition caused the SCSI interrupt. The bits are checked in the order stated.

If bit SCSIRSTI is set in register SSTAT1, the SCSI bus has been reset by another device. Complete commands in the queue-out FIFO are removed from the fifo and SCB array 443. SCB array 443 and the queue-in FIFO are cleared. All sequencer registers are reinitialized and sequencer 320 is restarted at 'sequencer_program'.

If bit SELTO is set in register SSTAT1, host adapter 7770 timed out while attempting to I/O select a target. HIM 462 scans the SCBs in SCB array 443 for an SCB marked 'waiting', and removes that SCB from SCB array 443. HIM 462 then simply unpauses sequencer 320.

If bit BUSFREE is set in register SSTAT1, an unexpected SCSI bus free state occurred. The SCB array pointer in register SCBPTR is always defined. If the SCB array pointer is invalid, a reselection failed. HIM 462 simply restarts sequencer 320 at label 'idle_loop'. If the SCB array pointer is valid, the pointer points to the SCB for which the bus free occurred. HIM 462 terminates the SCB. If the SCB status is 'waiting' or 'disconnected', the command did not actually start or resume. If the SCB status is 'active', the command was executing and a DMA transfer could be in progress. HIM 462 resets any registers that were programmed by sequencer 320 that are no longer valid due to the bus free condition, and restarts sequencer 320 at 'idle_loop'. If the bus free interrupt occurred after a target selection completed, the corresponding selection enable has been cleared by sequencer 320.

If bit SCSIPERR is set register SSTAT1, a SCSI bus parity error has been detected by host adapter 7770. If the SCSI phase is "Data", HIM 462 clears the parity error status, and then unpauses sequencer 420. SCSI Attention is automatically asserted by host adapter 7770. HIM 462 needs to take no more action at this point.

For other SCSI bus phases, HIM 462 clears the parity error status, and checks the status again. If the status is not 'active', the parity error was a relic, e.g., the error occurred during a Data phase and the current byte on the SCSI bus does not have an error. In this case, HIM 462 simply unpauses sequencer 320. If the parity error status is still 'active', the byte currently on the SCSI bus has a parity error. HIM 462 clears the error status, sets the expected SCSI bus phase to the current phase, asserts signal ACK on the SCSI bus, waits for the next request signal REQ, and then unpauses sequencer 320.

If bit SEQINT is set in register INTSTAT is set, sequencer 320 has generated the interrupt and written the type into bits 4 to 7 in register INTSTAT. In this case, sequencer 320 has encountered an unusual situation, and requires assistance from HIM 462. Sequencer 320 has paused itself, and has issued an interrupt to HIM 462. Bits 4 to 7, i.e., bits INTCODE specify the nature of the situation. Bit INTCODE assignments are included in the 'arrowequ.inc' INCLUDE file, as described above in Table 61. For some codes, additional information is passed to HIM 462 via register PASS_TO_DRIVER in scratch RAM 442. Each of the various situations are considered in turn.

When bits INTCODE are set to SYNC_NEGO_NEEDED, HIM 462 may need to initiate either wide or synchronous negotiations with the target. HIM 462 uses the pointer in register SCBPTR to locate the active SCB and determine the target connected. HIM 462 then checks the corresponding transfer option register in scratch RAM 442. If the value of the transfer option register is 8fh, negotiation is required. Thus, HIM 462 initiates negotiation for wide or synchronous data transfers. If the value of the transfer option register is 00h or 80h, HIM 462 has already negotiated for wide, and may need to negotiate for synchronous. If the value of the transfer option register is not 00h, 80h, or 8fh, HIM 462 sends a "NOP message" to the target. In any case, HIM 462 sends an acknowledge signal ACK, by setting bit ACKO in register SCSISIGO, for the last message byte to or from the target. HIM 462 finally unpauses sequencer 320.

Prior to sending an extended negotiation message, HIM 462 checks that the SCSI phase is "Message Out" by checking bits 5, 6, and 7 in register SCSISIGO. If the phase is "Message Out," HIM 462 checks that signal "Attention" is asserted, i.e., checks if bit 4 in register SCSISIGO is set, and if not, HIM 462 asserts signal "Attention" as specified for the extended message. If the SCSI phase is "Command", i.e., bit 7 in register SCSISIGO is set, HIM 462 does not send the extended message. Rather, HIM 462 changes the value of the transfer option register from 8fh to 00h, and unpauses sequencer 320 without sending an acknowledge signal ACK to the target.

If bits 4 to 7 in register INTSTAT are set to CDB_XFR_PROBLEM, there is a possible parity error in the CDB. An unexpected phase change occurred during the CDB transfer in "Command" phase. The new phase is not "Status". HIM 462 checks the current SCSI phase in register in register SCSISIGO. If bits 5, 6, and 7 are not set, i.e., the phase is not "Message In", the phase is invalid and HIM 462 resets SCSI bus and sequencer 320. If the phase is "Message In", HIM 462 checks the message. If the message is "Restore Data Pointers", a possible parity error was detected by the target while transferring a CDB. HIM 462 simply sends an acknowledge signal ACK to the message by setting bit ACKO in register SCSISIGO, and restarts sequencer at label 'siostr3'. If the message is not "Restore Data Pointers", HIM 462 rejects the message, completes the handshake, waits for the next request signal REQ, and restarts sequencer 420 at label 'sio204'.

If bits 4 to 7 in register INTSTAT are set to HANDLE_MSG_OUT, the target has entered phase "Message Out" which was not expected by sequencer 320. HIM 462 checks the status of bit 4, bit ATNO, in register SCSISIGO and if the bit is active, HIM 462 sends the error message "Initiator Detected Error" to the target. If bit 4 is inactive, HIM 462 sends message "NOP". HIM 462 supplies the acknowledge signal ACK for either message by setting bit ACKO in register SCSISIGO, and then unpauses sequencer 320.

If bits 4 to 7 in register INTSTAT are set to DATA_OVERRUN, sequencer 320 has encountered either an overrun or underrun during a data transfer. There are two ways HIM 462 can distinguish between the overrun and underrun conditions. First, the SCSI bus phase is "Data" for an overrun and "Status" for an underrun. Second, the residual transfer length saved in the SCB residual byte count field is zero for an overrun and non-zero for an underrun. The value of register SCBPTR points to the active SCB. The host adapter data channel is disabled. The target is still on the SCSI bus with signal REQ asserted. HIM 462 saves the overrun or underrun status at this point, because sequencer 320 does not save it in the SCB. When sequencer 320 eventually completes the command, it does not interrupt HIM 462 again with an error. The residual transfer length in the SCB is still valid after sequencer 320 has completed the command.

For an overrun condition, HIM 462 enables the bit-bucket mode by setting bit 7 in register SXFERCTL1, and then waits for a phase change. Upon detecting request signal REQ for the new phase, HIM 462 unpauses sequencer 320, which continues command execution to completion.

For an underrun condition, sequencer has entered its status phase process, and has interrupted HIM 462. After noting the underrun status, HIM 462 unpauses sequencer 320, which continues command execution to completion.

If bits 4 to 7 in register INTSTAT are set to CHECK_CONDX, a status other than "Good" was received from the target. Message "Command Complete" is still on SCSI bus, awaiting an acknowledge signal ACK from HIM 462. Register SCBPTR points to the active SCB for the target, but the SCB has not been loaded into register QOUTFIFO. The active target is held on the SCSI bus to allow HIM 462 to reconfigure host adapter 7770 in response to the check condition interrupt before releasing the SCSI bus. Ultimately, HIM 462 must send acknowledge signal ACK to the active target to allow the target to go "Bus Free". After retrieving the completed SCB from SCB array 443, HIM 462 restarts sequencer 320 at label 'idle_loop'.

If bits 4 to 7 in register INTSTAT are set to PHASE_ERROR, sequencer 320 has detected an invalid or inappropriate SCSI bus phase, and has abandoned the command. Register SCBPTR points to the active SCB. A corresponding pointer has not been placed in register QOUTFIFO. If the SCSI phase is "Message Out", HIM 462 sends an "Abort" message to the target. Otherwise, HIM 462 resets the SCSI bus. HIM 462 can reset the SCSI bus without using sequencer 320.

If bits 4 to 7 in register INTSTAT are set to EXTENDED_MSG, an extended message has been received from the target. Message byte zero was read and discarded by sequencer 320. Message byte one was acknowledged by sequencer 320 and stored in register PASS_TO_DRIVER in scratch RAM 442. Message byte two has not been acknowledged by sequencer 320, and is still on the SCSI bus with signal REQ asserted. HIM 462 handles the message, but does not acknowledge the last message byte. When done, HIM 462 unpauses the sequencer.

Modify data pointers extended message is a special case. If sequencer 320 has interrupted HIM 462 with this message, bit REJECT_MDP was set in the SCB. HIM 462 rejects the message, and returns to sequencer 320 as for a normal extended message. HIM 462 does not acknowledge the last message byte.

If bits 4 to 7 in register INTSTAT are set to ABORT_TARGET, something has gone wrong while executing a command, and sequencer 320 recognizes a need to abort the target. For example, HIM 462 had previously aborted the command for a disconnected target by removing the SCB from SCB array 443, and the target has reconnected. The target is still on the SCSI bus, but the pointer in register SCBPTR cannot be assumed to be valid. When possible, sequencer 320 has asserted signal "Attention" in an attempt to get the target into "Message Out" phase. HIM 462 waits for request signal REQ, by observing the status of bit REQINIT in register SSTAT1, and takes the appropriate action for the current SCSI bus phase. When done, HIM 462 restarts sequencer at label 'idle_loop'.

For the case of tagged queuing, the pointer in register SCBPTR is defined but invalid when all SCBs in the queue had been removed from SCB array 443 prior to reselection. All commands queued in the target must be aborted. If one or more SCBs in the queue remain in SCB array 443, the pointer in register SCBPTR is valid, and equals the tag of the command which was aborted and for which the target is reselecting. This command is selectively aborted in the target.

If bits 4 to 7 in register INTSTAT are set to NO_ID_MSG, a reselection occurred, but the target did not send an "Identify" message. The SCSI bus phase is "Message In" with a message on the bus and request signal REQ asserted with the target waiting for an acknowledge signal ACK. The target address is in register SELID, but the pointer in register SCBPTR is not valid. HIM 462 aborts the target, and then terminate all SCBs for the reselecting target. HIM 462 restarts sequencer 320 at label 'idle_loop'.

An interrupt code of NO_ID_MSG is also passed to HIM 462 by sequencer 320 when tagged queuing is enabled and the target failed to correctly return the two tagged queue message bytes following reselection. Sequencer 320 had successfully sent two tagged queue message bytes to the target after selection. The target reselected, and sent the "Identify" message, followed by one or two additional message bytes. Either the first or second additional byte was invalid. The pointer in register SCBPTR is valid, and points to one of the SCBs in the queue, in fact, the first one in the SCB array. (When interrupt code NO_ID_MSG was caused by a missing "Identify" message, the pointer in register SCBPTR is equal an invalid value.) The SCSI bus phase is "Message In", with a message on the bus and signal REQ asserted with the target waiting for an acknowledge signal ACK. HIM 462 aborts the target, and then terminates all SCBs for the reselecting target/lun. HIM 462 restarts sequencer 320 at label 'idle loop'.

If bits 4 to 7 in register INTSTAT are set to UNKNOWN_MSG, a message has been sent by a target to sequencer 320, as an initiator, that cannot be handled by sequencer 320. Thus, sequencer 320 has requested HIM 462 to handle a message from the target. The SCSI message code is passed from sequencer 320 to HIM 462 via register SCSIBUSL. The message byte is still on SCSI bus, and has not been acknowledged. HIM 462 acknowledges the message by reading register SCSIDATL. The pointer in register SCBPTR points to the active SCB. The responses by HIM 462 to the various messages which generate this interrupt code are described below.

When the value of register SCSIBUSL is 07h, a "Message Reject" message has been received from the target. An image of the message rejected is in register PASS_TO_DRIVER. HIM 462 reads the message image and defines the appropriate response. HIM 462 acknowledges the message, and unpauses sequencer 320.

When HIM 462 sends a message to the target, the message can be rejected. HIM 462 prepares for rejection in one of two ways. First, following "Message Out" phase, HIM 462 waits for the next request signal REQ, and if the phase on the SCSI bus at that time is "Message In" phase, HIM 462 checks for a Message Reject. Second, HIM 462 loads register 'pass_to_driver' with the last message out to the target, acknowledges the message, and unpauses sequencer 320. Sequencer 320 interrupts HIM 462 again if there is a message reject, and HIM 462 handles the rejection the same as if sequencer 320 had sent the message.

When the value of register SCSIBUSL is 20h, a target has reselected and sent a tagged queue message to sequencer 320 when, in fact, tagged queuing is not enabled. HIM 462 rejects the message, but aborts the command, since something is amiss. For a simple message rejection, HIM 462 acknowledges the Message Reject message, and unpauses sequencer 320. The abort is handled as if the interrupt code was ABORT_TARGET.

When the value of register SCSIBUSL is 23h, an "Ignore Wide Residue" message has been received during a read data transfer. HIM 462 first acknowledges the message, and then reads in the remaining message byte, which specifies the number of data bytes already received by host adapter 7770 to be ignored. HIM 462 reduces this number by the number in register SSTAT2. The bytes in the SCSI FIFO that are reflected by the number in register SSTAT2 have already been ignored. HIM 462 increments register STCNT and the number in bytes 15-17 in the SCB, after the target status field, by the reduced number, decrements registers SHADDR[2:0] by the reduced number, acknowledges the second message byte, and then unpauses sequencer 320.

When the value of register SCSIBUSL is either 0Ah or 0Bh, a "Command Complete" message has been received from the target at the end of a linked command. The pointer in register SCBPTR points to the active SCB. Target completion status has been received and loaded into the SCB. HIM 462 checks for consistency between status and the message. Status should also indicate command linking. HIM 462 posts command complete to the host for the active SCB, loads the next linked command into the SCB, acknowledges the message, and restarts sequencer 320 at label 'start_link_cmd'. The pointer in register SCBPTR has not been loaded into register QOUTFIFO, and bit CMDCMPLT in registers INTSTAT is not set for the command just completed.

Other Command Complete messages can be defined. HIM 462 should handle the message, and then unpauses sequencer 420 without acknowledging the message. By not acknowledging the message, sequencer 320 is able to disable the bus free interrupt before allowing the target to go bus free.

For other messages other than command complete on the SCSI bus, sequencer 320 requests HIM 462 to handle the message currently on the SCSI bus. Normally, HIM 462 handles the message, acknowledges the message, and finally unpauses sequencer 320. HIM 462 may wish to reject the message. If the message is "Disconnect", HIM 462 rejects it. Sequencer 320 has determined that disconnection is not allowed. To reject a message, HIM 462 asserts Attention, acknowledges the message, waits for Message Out phase, sends Message Reject to the target, acknowledges the message, and then unpauses sequencer 320.

To cleanly abort a command issued to sequencer 320, HIM 462 pauses sequencer 320, defines a breakpoint at label 'idle_loop', and unpauses sequencer 320. When HIM 462 is interrupted by the breakpoint, HIM 462 removes the SCB from the array and possibly registers QINFIFO and QOUTFIFO, removes the breakpoint, and unpauses sequencer 320. Sequencer 320 handles any future consequences of aborting the command.

If HIM 462 times out while waiting for the breakpoint interrupt, one of the SCBs is active, and sequencer 320 might be hung. The pointer in register SCBPTR points to the active SCB. HIM 462 aborts the active SCB, but deals with the target on the SCSI bus. When the abortion is finished, HIM 462 restarts the sequencer 320 at 'idle loop'.

One embodiment of routines to carry out each of the above functions is presented in Microfiche Appendix A which is incorporated wherein by reference. A "scb_abort" routine instructs HIM 462 to attempt to abort the given SCB request. The syntax, parameters and return values for this routine are given in Table 68.

TABLE 68 scb_abort PROCESS

Syntax include "scb.h";
unsigned char scb_abort(ha_config *config_ptr,
    scb_struct *scb_pointer);

Return Value

| | |
|---|---|
| 0x00 | HIM 462 successfully aborted the given SCB. |
| 0x01 | The given SCB pointer was invalid. No abort occurred. |

Parameters

| | |
|---|---|
| config_ptr | Pointer to a host adapter configuration structure. |
| scb_pointer | Pointer to the Sequencer Control Block (SCB) which is to be aborted. |

A "int_handler" routine handles interrupts from host adapter 7770. The syntax, parameters and return values for this routine are given in Table 69.

TABLE 69 int_handler PROCESS

Syntax include "scb.h"
unsigned char int_handler(ha_config
    *config_ptr);

Return Value

| | |
|---|---|
| 0x00 | No host adapter interrupt was pending. Otherwise the interrupt was handled and cleared at the host adapter level. |

Parameters

| | |
|---|---|
| config_ptr | Pointer to a host adapter configuration structure |

A "scb_force_int" routine forces a host adapter 7770 hardware interrupt. This routine may be used to test whether the interrupt channel specified in the host adapter configuration structure is working properly. The syntax, parameters and return values for this routine are given in Table 70.

TABLE 70 scb_force_int PROCESS

Syntax include "scb.h"
void scb_force_int(ha_config *config_ptr);

Return Value

None

Parameters

| | |
|---|---|
| config_ptr | Pointer to a host adapter configuration structure. |

A "scb_enable_int" routine enables a host adapter 7770 hardware interrupt. The syntax, parameters and return values for this routine are given in Table 71.

TABLE 71 scb_enable_int PROCESS

Syntax include "scb.h";
void scb_enable_int(ha_config *config_ptr);

Return Value

None

Parameters

| | |
|---|---|
| config_ptr | Pointer to a host adapter configuration structure. |

A "scb_disable_int" routine disables a host adapter 7770 hardware interrupt. The syntax, parameters and return values for this routine are given in Table 72.

TABLE 72 scb_disable_int PROCESS

Syntax include "scb.h"
void scb_disable_int(ha_config *config_ptr);

Return Value

None

Parameters

| | |
|---|---|
| config_ptr | Pointer to a host adapter configuration structure. |

A "scb_poll_int" routine polls host adapter 7770 to determine whether a hardware interrupt is pending. This routine may be called while there is an outstanding SCB request and the host adapter's hardware interrupt is disabled. This routine may be periodically called until it returns a non-zero value. At that point, the int_handler routine may be called. The syntax, parameters and return values for this routine are given in Table 73.

TABLE 73 scb_poll_int PROCESS

Syntax include "scb.h"
unsigned char scb_poll_int(ha_config
    *config_ptr);

Return Value

| | |
|---|---|
| 0x00 | No interrupt pending. |

TABLE 73-continued

Otherwise, an interrupt is pending.
Parameters config_ptr    Pointer to a host adapter configuration structure.

Figure 61A:
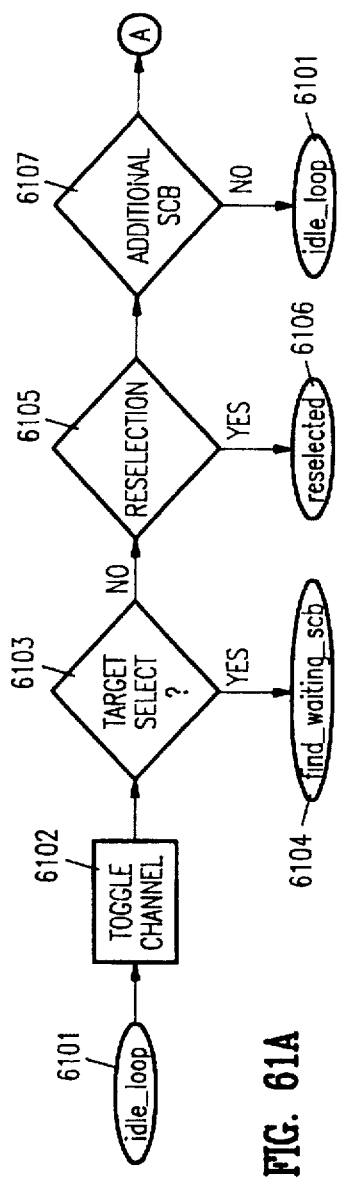

Thus, in this embodiment, the following are the hardware interface module 462 routines that are available to the operating system specific module 461:

unsigned char scb_findha(unsigned int port_addr);
    void scb_getconfig(ha_config *config_ptr);
    unsigned char scb_initha(ha_config *config_ptr);
    void scb_send(ha_config *config_ptr, scb_struct *scb_pointer);
    unsigned char scb_abort(ha_config *config_ptr, scb_struct *scb_pointer);
    unsigned char int_handler(ha_config *config_ptr);
    void scb_force_int(ha_config *config_ptr);
    void scb_enable_int(ha_config *config_ptr);
    void scb_disable_int(ha_config *config_ptr);
    unsigned char scb_poll_int(ha_config *config_ptr);

The following are routines the operating system specific module 461 must provide to the hardware interface module 462:

void scb_completed(ha_config *config_ptr, scb_struct *scb_pointer);

As explained above, the sequencer firmware that is loaded into sequencer RAM 441, controls the operations of sequencer 320. Specifically, sequencer 320 controls the SCSI operations, discussed above, as well as data transfer to and from a SCSI device, and data transfer to and from host computer system 220. Within host adapter 7770, SCSI module 330, as explained above, can be configured as (i) two single ended SCSI channels, (ii) one single ended SCSI channel and a differential SCSI channel, (iii) a wide SCSI channel, or (iv) a wide differential SCSI channel. Thus, in the sequencer idle loop, which starts at label IDLE_LOOP 6101 (FIG. 61A), the first operation is toggle channel step 6102 which changes the active SCSI channel in SCSI module 330. This is referred to as a "fairness algorithm" and is intended to prevent monopolization of host adapter 7770 by only one of the SCSI channels.

Target select check 6103 examines bit SELDO in register SSTATO. If bit SELDO is set, the target selection has been completed and the SCB corresponding to the selection must be found. Accordingly, processing transfers to label FIND_WAITING_SCB 6104, which is described more completely below.

Figure 61B:
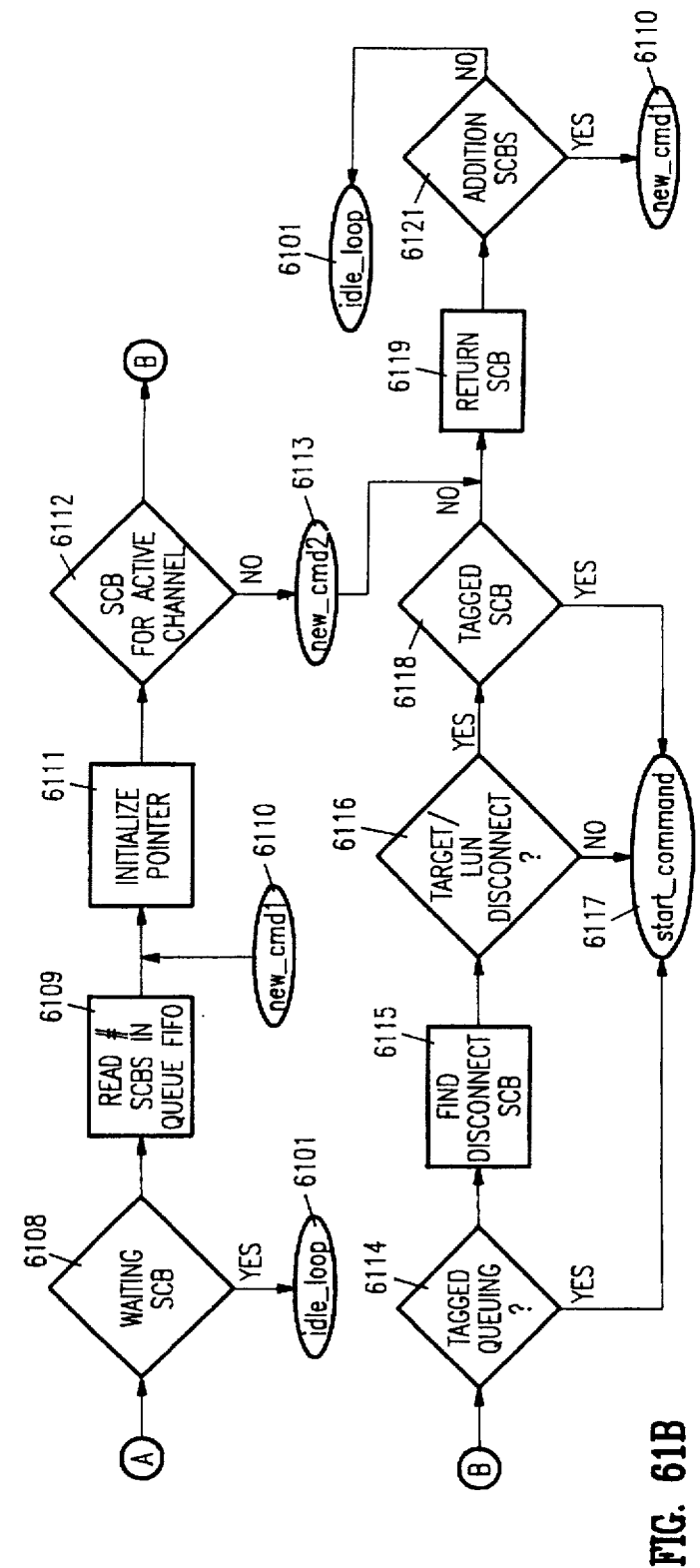

If bit SELDO is not set, processing transfers to reselection check 6105. In reselection check 6105, bit SELDI in register SSTATO is examined and if bit SELDI is set processing transfers to label RESELECTED 6106. If bit SELDI is not set, processing transfers to additional SCB check 6107. If there are no additional SCBs, as indicated by the value of register QINCNT, processing transfers from check 6107 to label IDLE_LOOP 6101. However, if there are additional SCBs, processing transfers to waiting SCB check 6108 (FIG. 61B).

If there is a waiting SCB, the active SCSI channel is busy and so the command in another SCB cannot be started. Therefore, bit ENSELO in register SCSISEQ is checked. If bit ENSELO is set, a selection out has been enabled, and so processing transfers to label IDLE_LOOP 6101. If bit ENSELO is not set, the SCSI channel is available and processing transfers to read SCBs in queue-in FIFO 6109. In step 6109, the value in register QINCNT is loaded in a temporary register. Initialize pointer step 6111 loads the address at the top of queue-in FIFO 412 into register SCBPTR. The value in register SCBPTR is then loaded in register DINDEX.

SCB for active channel check step 612 compares the channel specified in field target/channel/lun of the SCB pointed to by the value of register SCBPTR with the active channel. If the channels are not the same, processing transfers to return SCB step 6119, which is described more completely below.

However, if the SCB being processed is for the active channel, tagged queuing step 6114 checks bit TAG_ENABLE in the SCB control register. If bit TAG_ENABLE is set, tag queuing is enabled and processing transfers to label START_COMMAND 6117. Conversely, if bit TAG_ENABLE is not set, it must be determined whether the target device specified in the target/channel/lun field of the SCB is free. The target is free unless for some reason it has disconnected from host adapter 7770 and subsequently will reconnect. Accordingly, find disconnected SCB step 6115, which is described more completely below, examines the SCBs in the SCB array to determine whether the target will seek reconnection.

Accordingly, target/lun disconnect check step 6116 transfers to start to label START_COMMAND 6117 if the target is not disconnected, and if the target is disconnected, transfers to tagged SCB check 6118.

Tagged SCB check 6118 checks bit TAG_ENABLE in the control register of the disconnected SCB and if the bit is set, transfers to labels START_COMMAND 6117, otherwise tagged SCB check transfers to return SCB step 6119.

At this point, if processing has not transferred to label START_COMMAND 6117, it is not possible to process the SCB at this time and so the address in register DINDEX is written back to queue-in FIFO 412, and the value that was stored in the temporary register is decremented. Additional SCBs check 21 examines the value of the temporary register to determine whether the register has reached a selected value, i.e., 0. If the temporary register has not reached the selected value, there are additional SCBs to process and so test 21 transfers to label NEW_CMD1 6110. Conversely, if all the SCBs in SCB array have been processed, transferring goes back to label IDLE_LOOP 6101.

Figure 62:
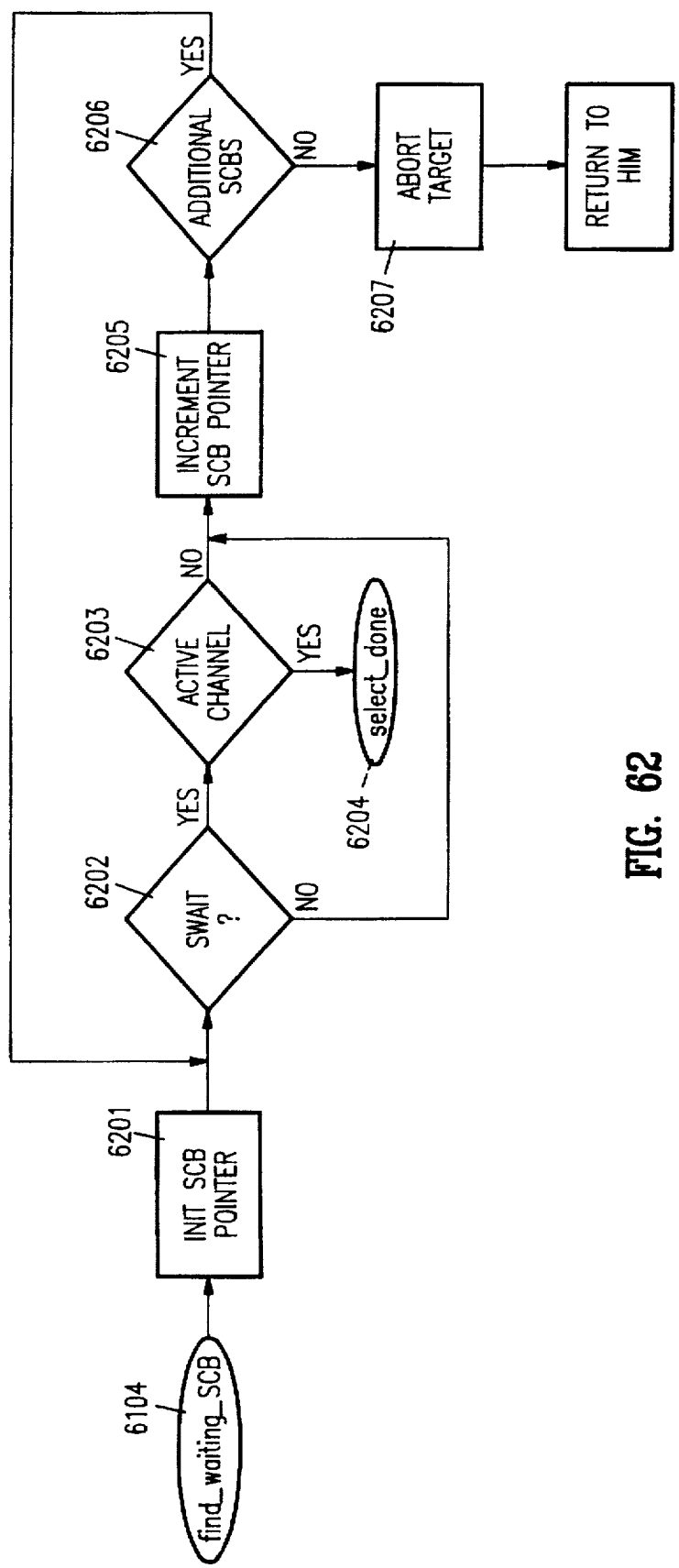

Target select check 6103 (FIG. 61A) transfers processing to label FIND_WAITING_SCB 6104, if bit SELDO was set. At label FIND_WAITING_SCB 6104, initialize SCB pointer step 6201 (FIG. 62) zeros register SCBPTR. Next, SWAIT check 6202 examines bit SWAIT in the SCB control register. If bit SWAIT is not set, processing transfers to increment SCB pointer step 6205. Conversely, if bit SWAIT is set, active channel check 6203 examines target/channel/lun field in the SCB to determine whether this SCB is for the active channel. If the SCB is for the active channel, the waiting SCB has been found and processing transfers to label SELECT_DONE 6204. The operations that are performed at label SELECT_DONE 6204 are described more completely below.

If active channel check 6203 finds that the SCB is not for the active channel, processing goes to increment SCB pointer step 6205, which increments the SCB pointer, and then to additional SCB check 6206. If there are additional SCBs in SCB array 443, processing returns to SWAIT check 6202 and otherwise to abort target step 6207.

In abort target step 6207, bit SEQINT in register INTSTAT is set and bits 4–7 are set with the interrupt code that indicates to HIM driver 462 to abort the target.

Figure 63A:
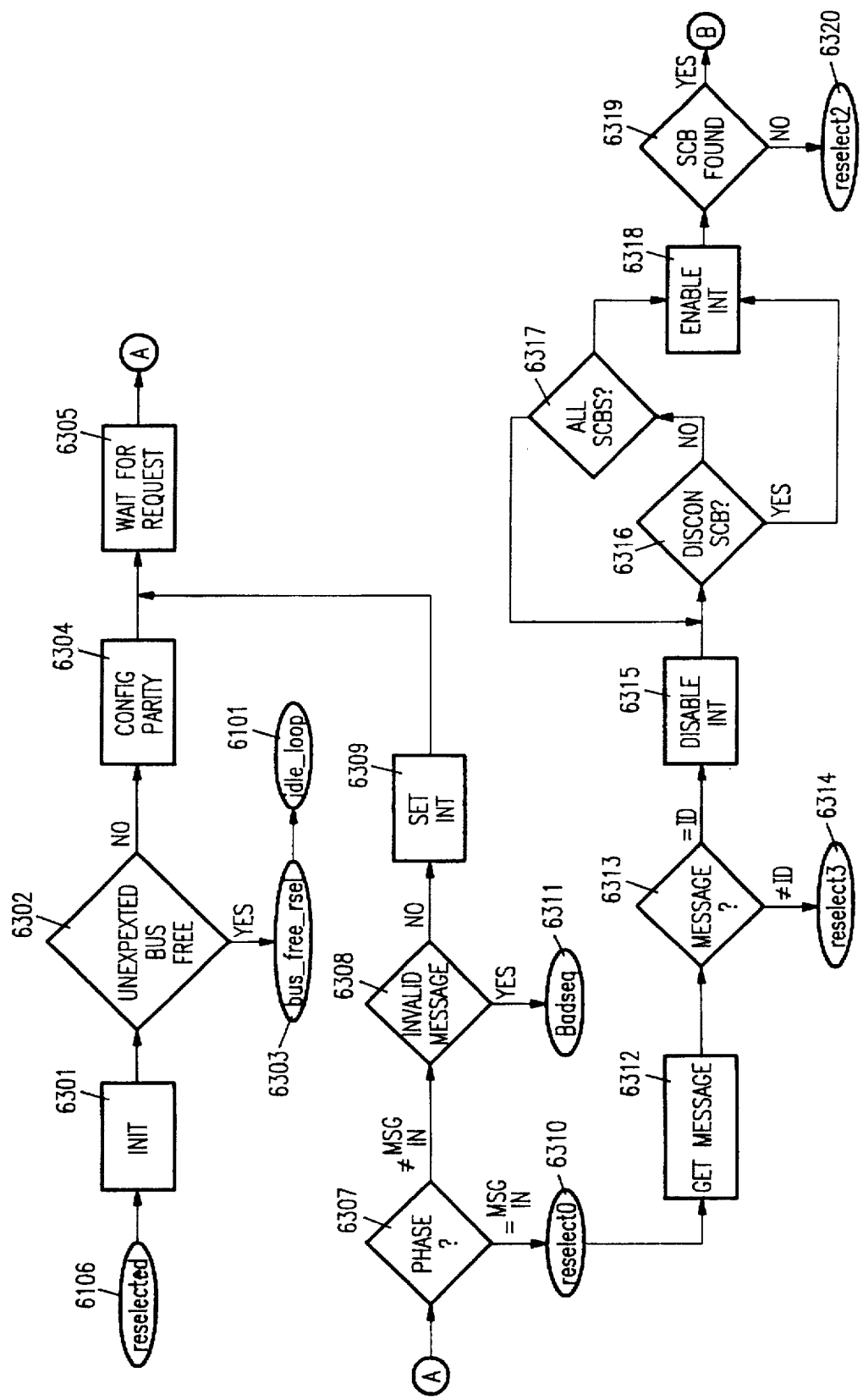

In the idle loop, reselection check step 6105 jumps to label RESELECTED 6106 if bit SELDI in register SSTAT0 was set. Upon jumping to label RESELECTED 6106 (FIG. 63A), initialization step 6301 loads an invalid address into register SCBPTR. Clear bus free interrupt bit CLRBUSFREE and clear parity error parity status bit CLRSCSIPERR in register CLRSINT1 are both set. Finally, in initialization step 6301, a bus free interrupt is enabled by setting bit ENBUSFREE in register SIMODE1.

In unexpected bus free check 6302, bit SELDI in register SSTAT0 is checked and if the bit is cleared, an unexpected bus free has occurred so that processing jumps to label BUS_FREE_RSEL 6303, which in turn transfers to label IDLE_LOOP 6101. Conversely, if bit SELDI is set, processing transfers to configure parity step 6304.

In configure parity step 6304, bit CLRSELDI in register CLRSINT0 is set and auto attention signal on a parity error is enabled by setting bit ENAUTOATNP in register SCSISEQ. Next, a subroutine PARITY_CHECK is called which determines whether parity checking should be enabled for the current target and sets enable parity checking bit ENSPCHK in register SXFRCTL1 correspondingly.

Next, wait for request 6305 first tests bit REQINIT in register SSTAT1 and if the bit is zero, repeats the test. Thus, wait for request 6305 waits until there is a latched request as indicated by bit REQINIT being set. Next, bit SCSIPERR in register SSTAT1 is checked to determine whether there is a parity error. If the bit is set, there is a parity error and the test on bit REQINIT and bit SCSIPERR are repeated until HIM 462 handles the error and unpauses sequencer 320. At that time the attention signal has been automatically asserted by SCSI module 330. If there is not a parity error, the expected SCSI phase is set in register SCSISIGO and the SCSI phase is stored in variable "A" and passed out from wait for request step 6305.

In phase check 6307 (FIG. 63A) if the SCSI phase is "message in" processing transfers through flag RESELECT0 6310 to step get message 6312. However, if the SCSI phase is not "message in" processing transfers from step 6307 to invalid phase check 6308. If the SCSI phase is not "message out" processing transfers to label BADSEQ 6311. If the SCSI phase is "message out," processing transfers to set interrupt step 6309. In step interrupt step 6309, the interrupt code is set to "handle_msg_out" and bit SEQINT is set in register INTSTAT. Processing then returns to wait for request step 6305.

In get message step 6312, the data in register SCSIBUSL from the SCSI bus is loaded into register SINDEX. In message check step 6313, if the message in register SINDEX is an ID message, processing transfers to disable interrupt step 6315 and otherwise to flag RESELECT3 6314. In disable interrupt step 6315, the target/channel/lun field from the SCB is loaded into register SINDEX and bit ENBUSFREE in register SIMODE1 is cleared so that HIM 462 is not interrupted by a bus free interrupt until the value in register SCBPTR is stable.

Disconnected SCB check 6316 tries to find the disconnected SCB. Initially, the value of register SINDEX is stored in location "A" and then register SCBPTR is zeroed so as to move the SCB pointer to the top of SCB array 443. The control register in the SCB at the top of SCB array 443 is checked to determine whether bit SDISCON is set. If the bit is not set, processing transfers to more SCBs checks 6317 which increments the SCB pointer and then checks to see whether there are any SCBs in SCB array 443 that have not been tested. If additional SCBs remain, processing transfers to disconnect SCB check 6316 and otherwise to enable interrupt check 6318.

When an SCB with bit SDISCON set is found, check 6316 tests the SCB target/channel/logical unit field to ascertain whether the channel for the disconnected SCB is the same as the active channel. If the channels are the same, the disconnected SCB has been found and processing transfers from disconnect SCB check 6316 to enable interrupt 6318. Enable interrupt 6318 sets bit ENBUSFREE in register SIMODE1 to re-enable a bus free interrupt.

Figure 63B:
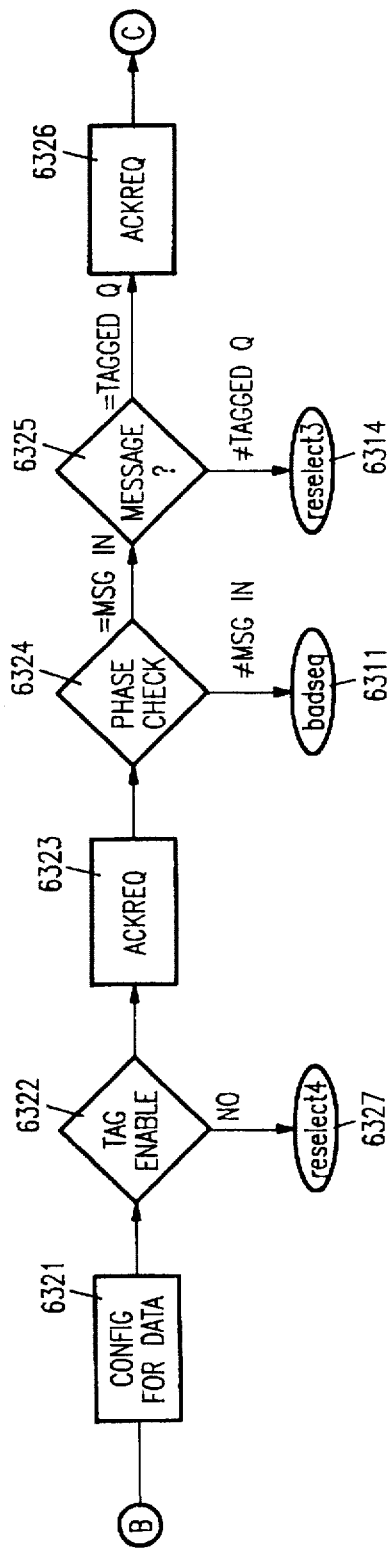

Since step 6318 is reached whether the disconnected SCB is found or not, SCB found check 6319 examines the SCB pointer and if it has a valid value passes to configure for data step 6321 (FIG. 63B). However, if a SCB was not found, the SCB pointer has an invalid address and processing jumps to label "RESELECT2" 6320.

In configure for data step 6321, an auto attention on parity error is enabled by setting bit ENAUTOATNP in register SCSISEQ. Next, the SCSI FIFO and the transfer count are cleared and an automatic PIO enabled by setting bits CLRSTCNT, CLRCHN, and SPIOEN in register SXFRCTL0. Finally, in step configure for data 6321, bit CLRSCSIPERR in register CLRSINT1 is set to clear the parity error status, and the transfer options for the data phase are set.

In step tag enabled check 6322, bit TAG_ENABLE in the SCB control register is checked and if the bit is not set, processing transfers to label RESELECT4 6327. If bit TAG_ENABLE is set, processing transfers to ACKREQ step 6323. Step 6323 first asserts an acknowledge signal on the SCSI bus by reading register SCSIDATL. Processing then goes into the wait for request process, which loops until bit REQINIT in register SSTAT1 is set and then checks for a parity error and if bit SCSIPERR is set, remains in the loop. However, if bit REQINIT is set and there is not a SCSI parity error, the expected SCSI phase is loaded into register SCSISIGO and the SCSI phase is loaded into storage location "A." Processing returns to phase check step 6324. If the phase is "message in" processing transfers to message check 6325 and otherwise to label BADSEQ 6311.

If the SCSI phase is "tagged queue" processing transfers to ACKREQ step 6326 from message check 6325 and otherwise processing jumps to label RESELECT3 6314. ACKREQ step 6326 acknowledges the tag message and waits for a request signal.

Figure 63C:
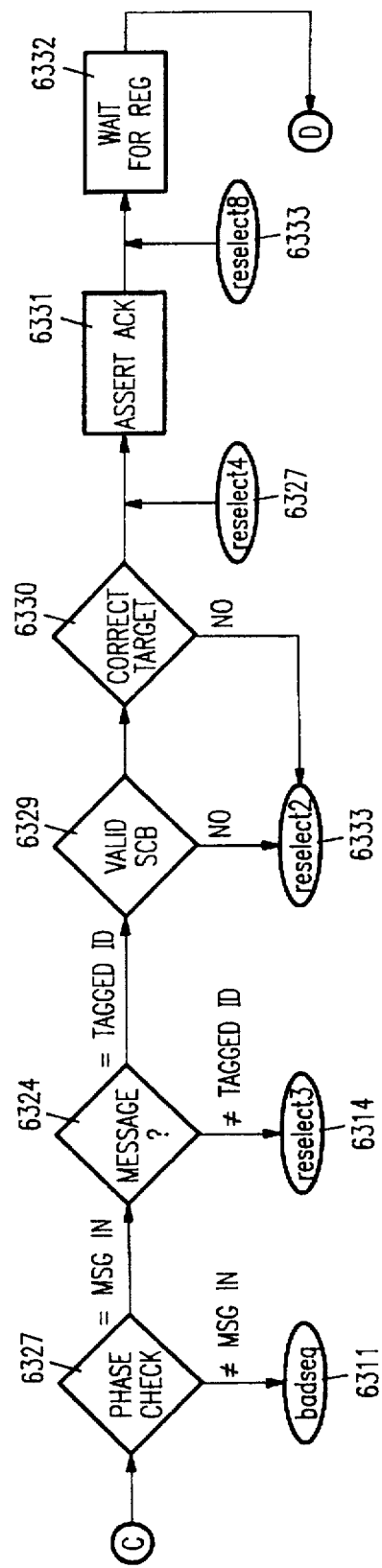

Upon receipt of the request signal, processing transfers to phase check 6327 (FIG. 63C) which functions identically to phase 6324. If the SCSI phase is "message in" processing transfers to message check 6328. If the message is not "tagged ID," processing jumps to flag RESELECT3 6314 and conversely to valid SCB check 6329.

If the message in is "tagged ID," valid SCB check 6329 looks at status byte SCONTROL to determine whether the SCB is disconnected and if it is disconnected whether the SCB is valid. Processing transfers to correct target check 6330. Correct target check 6330 determines whether the target in the SCB is the disconnected target. If the correct target is found, assert ACK 6331 asserts an acknowledge signal on SCSI bus 210. If either the SCB is not valid, or the correct target is not found, test 6329 and test 6330 respectfully transfer to flag RESELECT2 6333.

After step 6331 asserts the acknowledge signal, processing goes to wait for request 6332, which was described previously and is incorporated herein by reference.

When the request signal is received, wait for request 6332 loads the expected SCSI phase into register SCSISIGO and the SCSI phase into temporary storage location "A." Phase check 6334 (FIG. 63D) transfers processing to label RESELECT5 6337 if the SCSI phase is "message in" and to phase check 6335 otherwise.

Phase check 6335 transfers processing to label "RESELECT6" if the SCSI phase is not message out and otherwise to set interrupt step 6336. Step 6336 sets the interrupt code in register INTSTAT to "handle_msg_out" and sets bit SEQINT so that sequencer 320 can handle the message out. Processing jumps to label RESELECT8 6333.

Several of the above steps transfer to label RESELECT3 6314 (FIG. 63E) which transfers to set interrupt step 6340. In set interrupt step 6340, the interrupt code is set to "no_id_msg" and the sequencer interrupt bit SEQINT is set in register INTSTAT. HIM 462 handles the "no_id_msg" message, and returns to the idle loop.

Similarly, label RESELECT2 6333 (FIG. 63F) transfers to step 6342, abort target, which sets bits ATNO and MIPHASE in register SCSISIGO to assert attention and to abort the target. Next an acknowledge is sent to positively identify the second tagged queuing message. Finally, processing transfers to set interrupt 6344 which sets the interrupt code to "abort_target" and sets sequencer interrupt bit SEQINT in register INTSTAT.

Figure 63G:
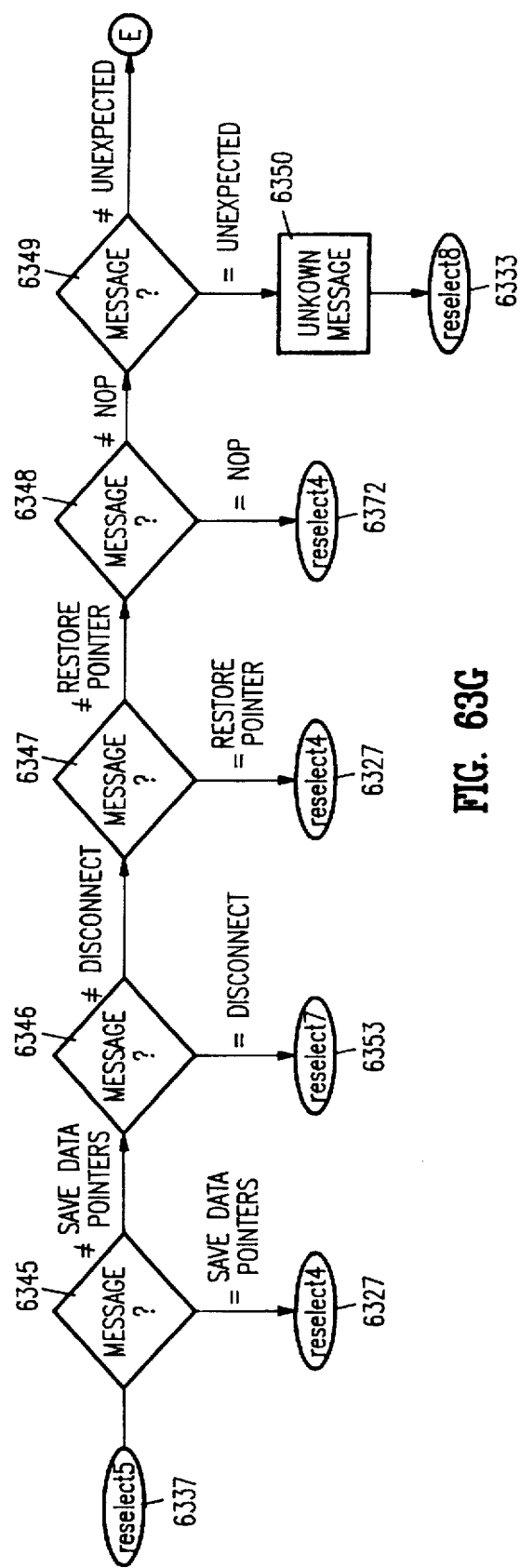

Label RESELECT5 6337 (FIG. 63G) transfers processing to a series of message checks 6345 to 6349 which attempt to identify the message in. If the message in is "save data pointers" processing transfers from check 6345 to label "RESELECT4" 6327 and otherwise to message check 6346. If the message is "disconnection," processing from check 6346 transfers to label "RESELECT7" and otherwise to message check 6347. If the message is "restore pointers," processing transfers from check 6347 to label RESELECT4 6327 and otherwise to message check 6348. If the message is NOP, processing transfers from check 6348 to label RESELECT4 6372 and otherwise to message check 6349.

If the message is an "unexpected message," processing transfers to unknown message step 6350 and then to label RESELECT8 6333. Unknown message step 6350 sets the interrupt opcode to "unknown_msg" in register INTSTAT and sets bit SEQINT and then transfers processing to label RESELECT8 6333. If the message is not an "unexpected message," processing transfers from check 6349 to set SCB status 6351.

Figure 63I:
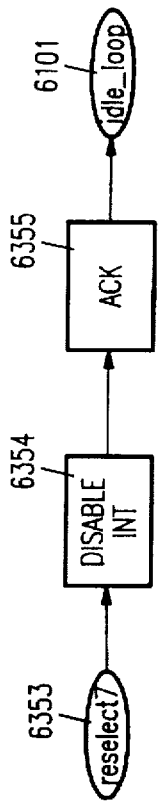
Figure 63H:
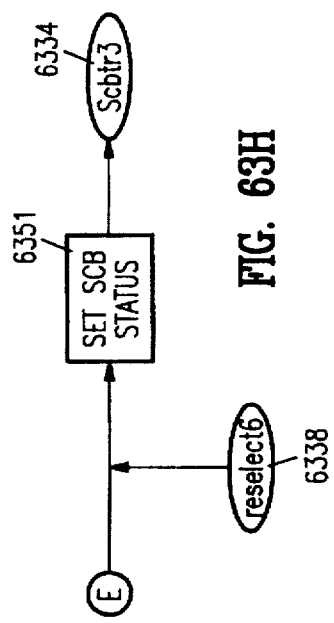

At label RESELECT6, 6338 (FIG. 63H) set SCB status step 6351 changes the SCB status from "disconnected" to "active." Processing jumps to label SIOSTR3 6352. At label RESELECT7 6353 (FIG. 63I), disable interrupt 6354 turns off bit ENBUSFREE thereby disabling the bus free interrupt. ACK step 6355 calls assert ack which was described above. Processing branches to label IDLE_LOOP 6101.

Figures 64A, 64B:
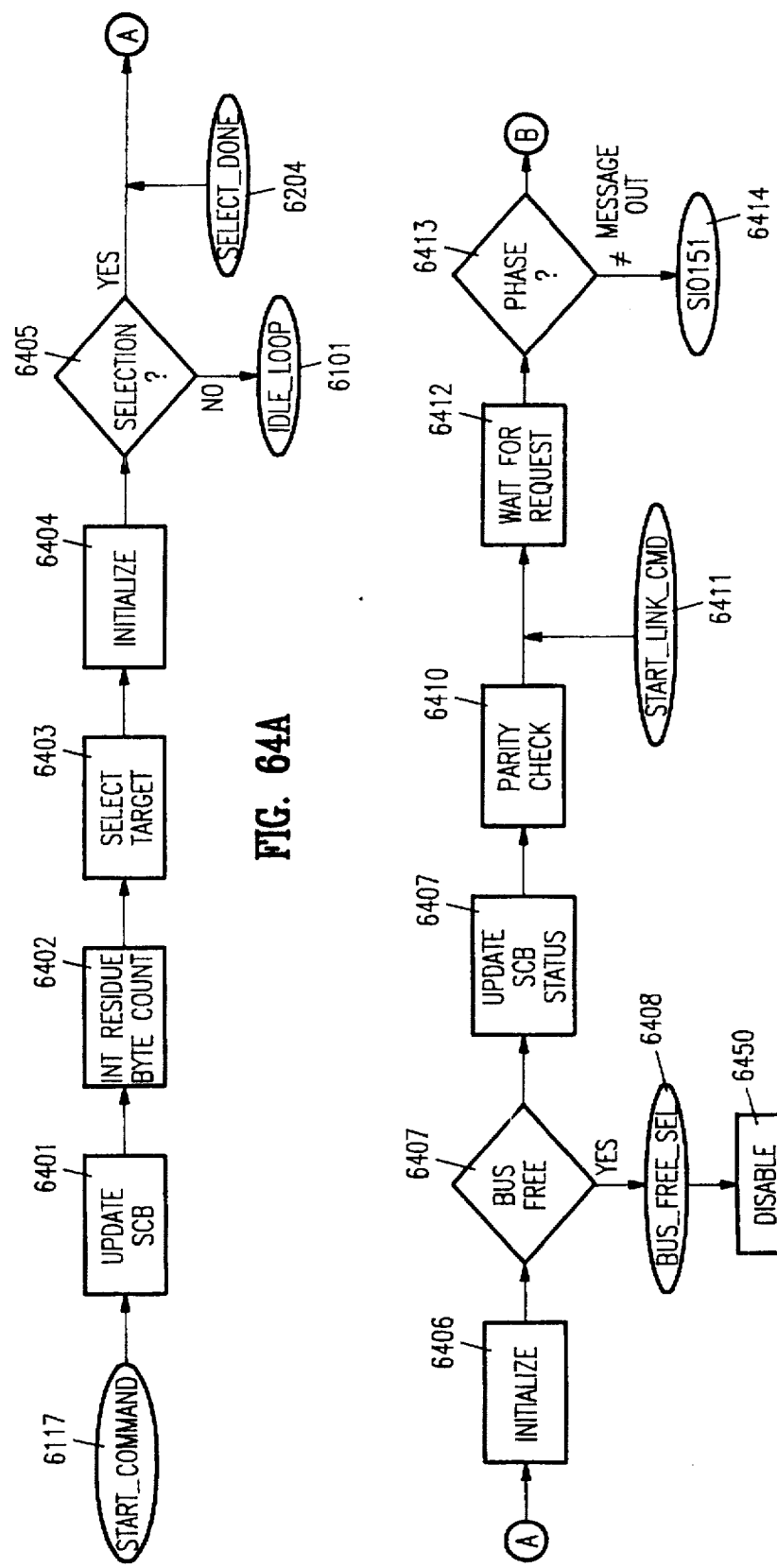

Label "START_COMMAND" 6117 (FIG. 61B) transfers processing to update SCB step 6401. In update SCB step 6401, (FIG. 64A) the SCB pointer in register SCBPTR is restored to a new command SCB by loading the value in register DINDEX into register SCBPTR. The SCB status in the new command SCB is then changed to "waiting." Initialize residual byte count length 6402 sets the residual count field to the number of scatter/gather segments. Select target step 6403 loads the target ID and the SCSI ID into register SCSIID.

In initialization step 6404, the data channel is disabled by zeroing register DFCNTRL. The SCSI transfer counter is cleared and automatic PIO is enabled by setting bits CLRSTCNT and SPIOEN in register SXFRCTL0. Next, the selection time out and SCSI reset interrupts are cleared by setting bits CLRSELTIMO and CLRSCSIRSTI in register CLRSINT1. Finally, in initialization step 6404, selection time out and SCSI reset interrupts are enabled by setting bits ENSELTIMO and ENSCSIRST in register SIMODE1.

To initiate arbitration and selection by SCSI module 330 and to assert attention, bits ENSELO, ENRSELI, and ENAUTOANTNO are set in register SCSISEQ. In selection check 6405, bit SELD0 in register SSTAT0 is checked and if it is not set, processing transfers to label "IDLE_LOOP" 6101.

As explained above, when bit SELDO is set, processing jumps from active channel check 6203 to label "SELECT_DONE" 6204. At label "SELECT_DONE" 6204, initialization step 6406 (FIG. 64B) first clears bus free and parity error status by setting bits CLRBUSFREE and CLRSCSIPERR in register CLRSINT1. Next, reselection is enabled as is auto attention on parity error by setting bits ENRSELI and ENAUTOATNP in register SCSISEQ. Finally, in this initialization step, bus free interrupt is enabled by setting bit ENBUSFREE in register SIMODE1.

Bus free check 6407 tests bit SELD0 in registers SSTAT0 and if the bit is zero, an unexpected bus free has occurred and processing transfers to label BUS_FREE_SEL 6408 at label BUS_FREE_SEL 6408, disable interrupt step 6450 clears bit ENBUSFREE in register SIMODE1. Re-enable selection 6451 sets bits ENSELO, ENRSELI, and ENAUTOATNO in register SCSISEQ and processing transfers to label IDLE_LOOP 6101.

If the bus does not go unexpectedly free, bit CLRSELDO in register CLRSINT0 is set in step 6407 and update SCB status 6409 changes the status of the current SCB to "active." The process in parity check 6410 was described above in step 6304 and that description is incorporated herein by reference. Upon completion of parity check 6410, the selection is complete, and the process proceeds at the entry point for a linked command, i.e., label "START_LINK_CMD" 6411.

Figure 64C:
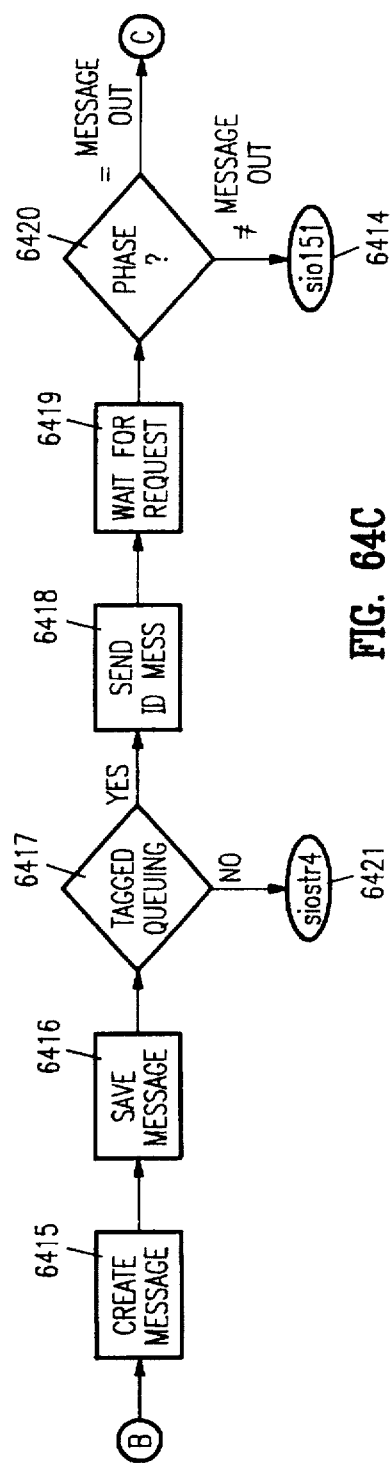

Wait for request 6412 was described above and that description is incorporated herein by reference. When the request signal is received, phase check 6413 tests the SCSI phase to determine whether the phase is "message out." If the phase is not "message out" processing jumps to label SIO151 6414 and to create message step 6415 (FIG. 64C) otherwise.

In create message step 6415, (FIG. 64C) an identify ID message is constructed that includes the disconnection option. Next, save message step 6416 loads the message ID into register PASS_TO_DRIVER for the eventuality that the ID message is rejected by the target.

Tag queuing check 6417 determines whether bit TAG_ENABLE is set in the SCB control register, and if it is not, processing transfers to label SIOSTR4 6421. If tagged queuing is enabled, send message step 6418 writes to register SCSIDATL, which drives the ID message onto the SCSI bus and asserts an acknowledge signal.

Wait for request step 6419 waits for the handshake signal REQ from the target, as explained above and incorporated herein by reference. Phase check 6420 determines whether the SCSI phase is "message out." If the SCSI phase is not "message out," processing transfers to label SIO151 6414.

Figure 64D:
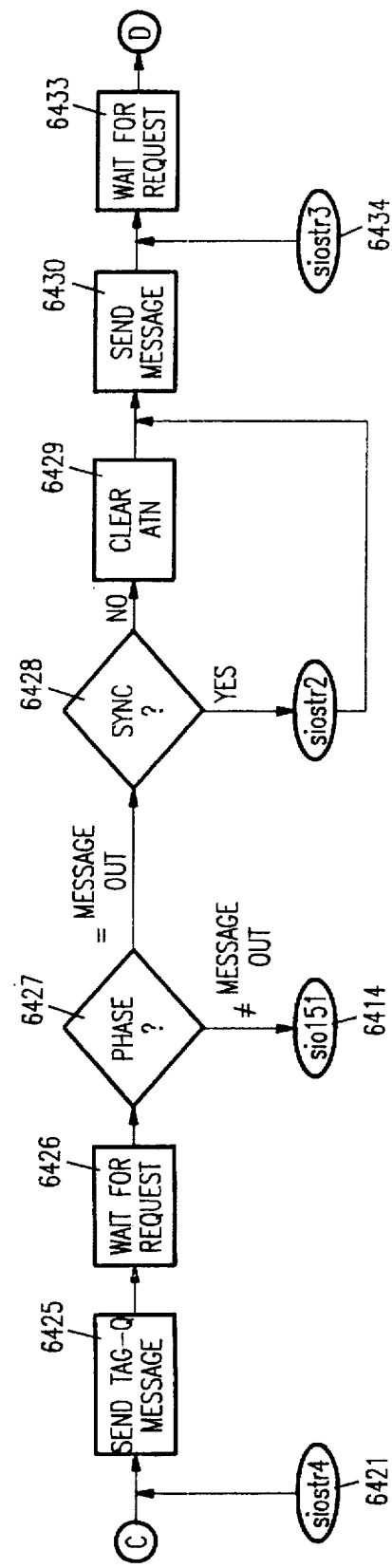

Conversely, if the SCSI phase is "message out," send tagged queue message 6425 (FIG. 64D) constructs a tagged queue message that is again saved in register PASS_TO_DRIVER. The message is then written to register SCSIDATL and consequently acknowledge is asserted.

Wait for request step 6426 waits for the handshake signal REQ, and phase check 6427 is similar to check 6420.

If the phase is "message out," sync check 6428 determines whether SCSI negotiations are requested. If SCSI negotiations are requested, processing transfers to label SIOSTR2 and then to step 6430, and otherwise to clear attention step 6429.

Figure 64E:
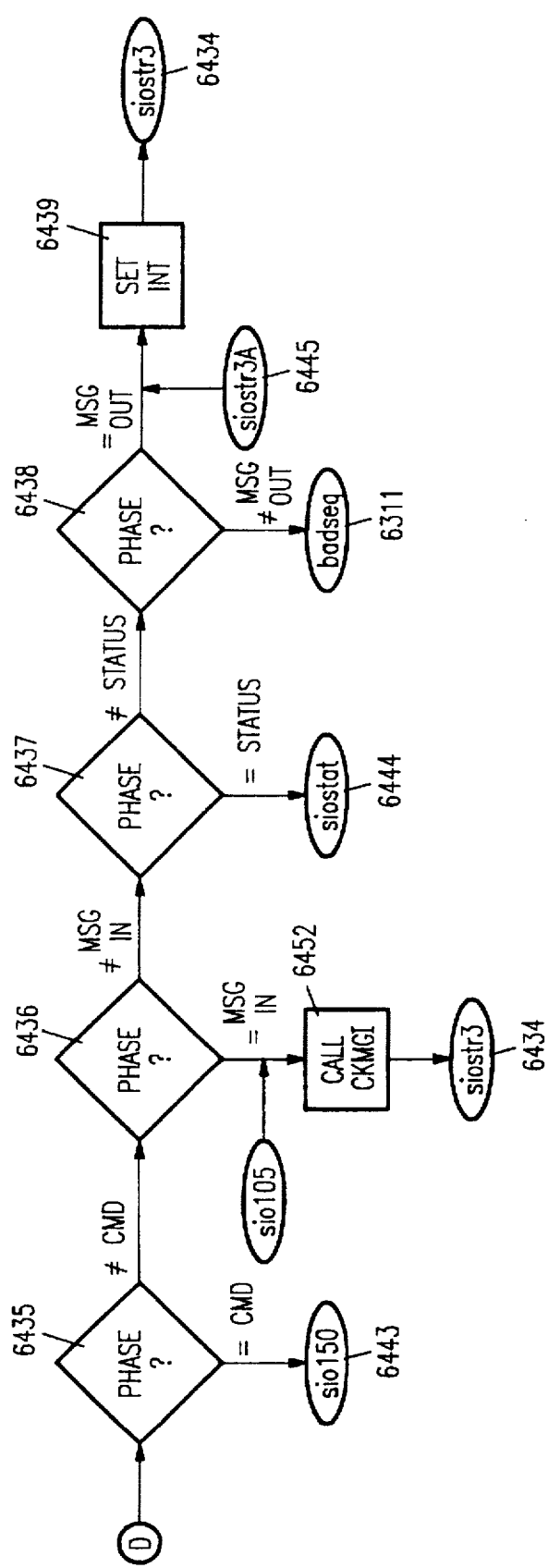

Step 6429 resets bit CLRATNO in register CLRSINT1 so that attention is no longer asserted. Send message 6480 loads the tagged queue ID message into register SCSIDATL which, in turn drives the message onto the SCSI bus and simultaneously asserts the acknowledge signal. Step wait for request 6433 is the same process that was described above. The SCSI phase returned from wait for request 6433 is sequentially compared with the "command" phase, "message in" phase, "status" phase, and finally with "message out" phase 6435 (FIG. 64E).

If a "command" phase is detected, check 6435 transfers processing to label SIO150 6443. If a "message in" phase is detected, check 6436 transfers processing to label SIO105. If a "status" phase is detected, check 6437 transfers processing to label SIOSTAT 6414. If the "message out" phase is not detected by check 6438, processing transfers to label BAD_SEQUENCE 6311.

If the phase is "message out," it is necessary to negotiate with the target if it hasn't been done and so HIM 462 must be interrupted. Accordingly, in set interrupt step 6439, the interrupt code in register INTSTAT is set to SYNC_NEGO_NEEDED and sequencer interrupt bit SEQINT is set. Processing then jumps to label SIOSTR3 6434.

Figure 65:
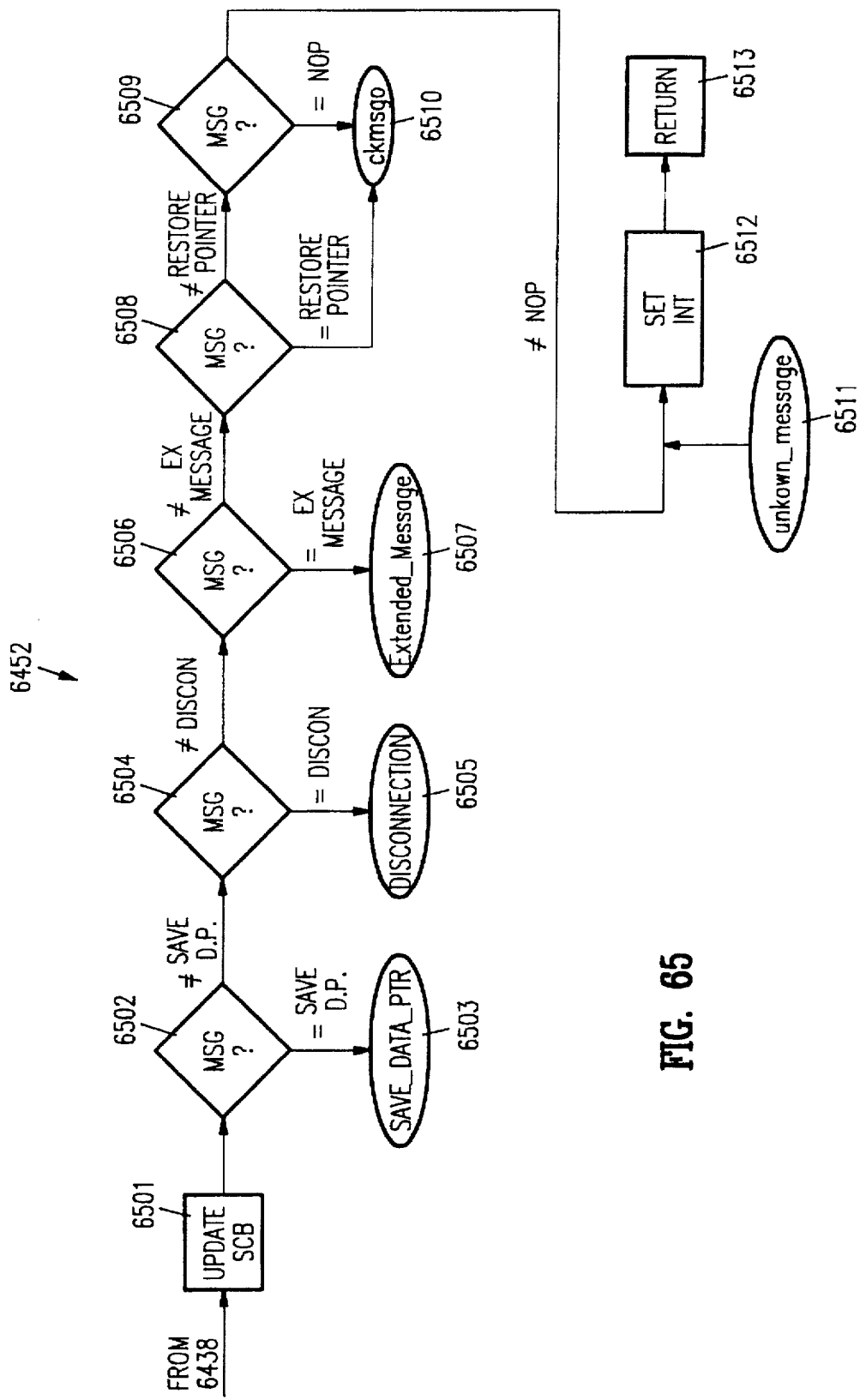

At label SIO105, processing calls check message process 6452. Check message process 6452 codes the reentry tag in the SCB in update SCB step 6501 (FIG. 65) and then handles the message on the SCSI bus. Sequentially, the message is checked to see whether it is a "save data pointer" message, a "disconnection" message, an "extended" message, a "restore pointer" message, or a "NOP" message. NOP message check 6509 is reached only if all of the earlier checks 6502, 6504, 6506, 6508 are not satisfied. If none of these checks are satisfied, it is a "unknown" message and set interrupt step 6512 sets the interrupt code to UNKNOWN_MESSAGE in register INTSTAT and as well as sequencer interrupt bit SEQINT and then returns.

If the message is "save data pointers," save data pointer check 6502 transfers processing to label SAVE_DATA_PTR 6503. If the message is "disconnection," disconnection check 6504 transfers processing to label DISCONNECTION 6505. Similarly, extended message check transfers to label EXTENDED_MESSAGE 6507 if the message is an "extended" message. If the message is either "restore data pointers" or "NOP", processing transfers to label CKMSGO 6510.

Label SAVE_DATA_POINTER 6503 initiates the save data pointers process which stores the remaining scatter/gather bit count, the scatter/gather list pointer, the next host address, and the number of bytes remaining to be transferred in the SCB. The acknowledge signal is asserted to complete the message handshake and processing transfers to label SIO215, which calls process next phase data that is discussed more completely below with respect to a data transfer.

At label DISCONNECTION 6505, check disconnection step determines whether disconnection is disabled. If disconnection is disabled, processing transfers to label UNKNOWN_MESSAGE. At label UNKNOWN_MESSAGE, interrupt code UNKNOWN_MESSAGE is set in register INTSTAT as is bit SEQINT and processing returns.

If disconnection is enabled, check disconnection step transfers to update SCB status step, which in turn changes the SCB status to "disconnected." Processing then transfers through label RESELECT7 (FIG. 63I) to disable bus free interrupt. Disable bus free interrupt clears bit ENBUSFREE in register SIMODE1. An acknowledge signal is driven on the SCSI bus and processing jumps to label IDLE_LOOP 6101.

At label CKMSGO 6510, the handshake is completed by driving an acknowledge signal on the SCSI bus and processing returns.

Figure 66:
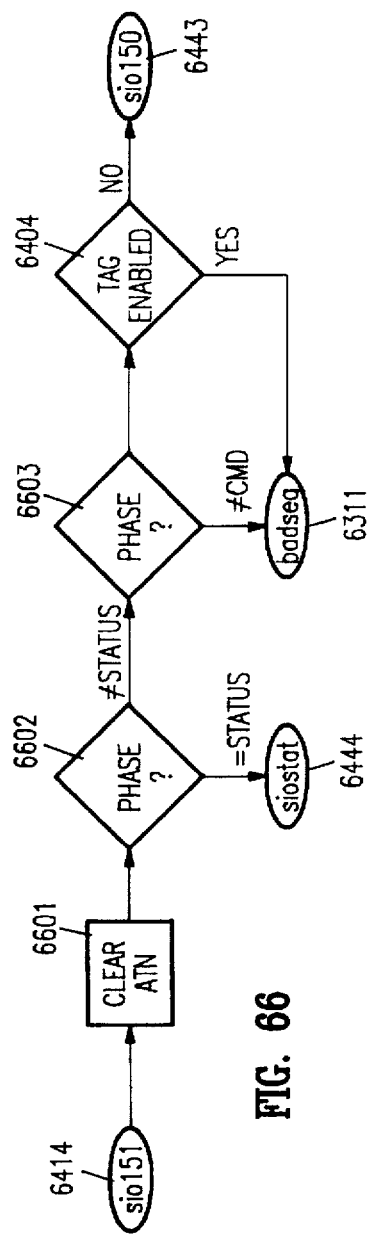

Label SIO151 6414 transfers processing to clear attention step 6601 (FIG. 66) which sets bit CLRATNO in register CLRSINT1. Next the SCSI phase is checked in phase check 6602 to determine whether the phase is "status." If the phase is "status" processing transfers to label SIOSTAT 6444. If the phase is not "status," command phase check 6603 determines whether the SCSI phase is "command." If the phase is not "command," processing transfers to label BAD-SEQ 6311. Tag enable check 6604 determines whether bit TAG_ENABLE is set. If the bit is set, there is an error because another send tag message is needed. Accordingly, processing transfers to label BADSEQ 6311. If bit TAG_ENABLE is not set, processing falls through to label SIO150 6443 which starts the command transfer.

Figure 67:
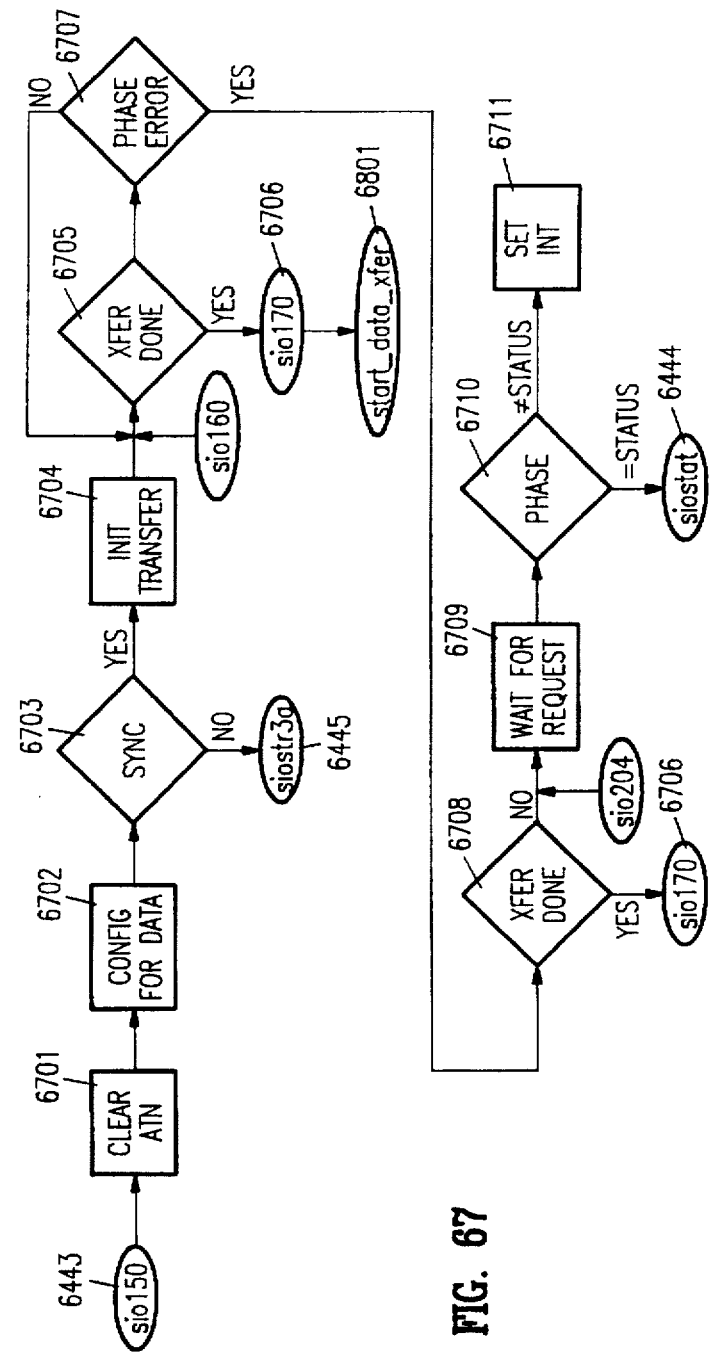

At label SIO150, it is too late to initiate synchronous negotiation, and so step clear attention 6701 (FIG. 67) sets bit CLRATNO in register CLRSINT1 to clear the attention signal. Next, configure for data 6702 configures host adapter 7770 for a DMA transfer of the CDB. The steps in configure for data were described above in step 6321 and that description is incorporated herein by reference.

Synchronous negotiation check 6703 determines whether synchronous transfer was negotiated and if it was not processing transfers to label SIOSTR3A 6445 where the interrupt code is set to SYNC_NEGO_NEEDED and bit SEQINT is set in register INTSTAT and then processing transfers to label SIOSTR3.

Initialize command transfer step 6704 first loads the CDB pointer into host address register HADDR0. The CDB length from the SCB is loaded into host count register DINDIR and then into SCSI transfer counter STCNT0. Finally, the data FIFO is cleared, the direction is set to write, and transfer of the CDB to the target is enabled. Specifically bits SCSIEN, SDMAEN, HDMAEN, DIRECTION and FIFORESET in register DFCNTRL are set.

Transfer done check 6705 tests bit SDONE in register SSTAT0. If bit SDONE is set, all the bytes have been transferred and so processing jumps to label SIO170 6706. Conversely, if data bytes are still being transferred, bit PHASEMIS in register SSTAT1 is checked in phase error check 6707. If bit PHASEMIS is not set, processing transfers to transfer done check 6705. If bit PHASEMIS is set, transfer done check 6708 checks bit SDONE and transfers to label SIO170 6706 if bit SDONE is set.

However, if bit SDONE is not set there has been an unexpected phase change during the CDB transfer. Accordingly, at label SIO204, wait for request 6709 returns with the SCSI phase. Phase check 6710 branches to label SIOSTAT 6444 if SCSI phase equals "status" and otherwise to set interrupt 6711 which sets the interrupt code to CDB_XFER_PROBLEM in register INTSTAT as well as sequencer interrupt bit SEQINT. After HIM 462 manages the interrupt, it returns to either label SIOSTR3 or label SIOSTR4.

When all of the bits have been transferred in the command phase, processing transfers to label SIO170 and the CDB transfer is complete and so processing goes on to label START_DATA_XFER.

Label START_DATA_XFER 6801 (FIG. 68A) transfers processing to initialize transfer 6802. In initialize transfer 6802, the scatter/gather list count is moved to a scatter/gather work count and the scatter/gather list pointer is moved to a scatter/gather work pointer. The data channel is disabled and the scatter/gather information for segment zero is fetched and loaded into registers HADDR and registers HCNT. The data in registers HADDR and HCNT are loaded into variable "saddress" and "slength" respectively. Next, the remaining scatter/gather list count is loaded into the SCB as is the scatter/gather list pointer. Transfer length check 6806 transfers to label SIO215 6808 if the data transfer length equals zero. If the data transfer length is not zero, transfer length check 6806 transfers to last segment check 6810.

If the last segment has been processed, check 6810 transfers to label S10500 6812. Conversely, if this is not the last segment, next data phase step 6814 is called. Since next data phase is called several times in this data transfer process, this process is considered in more detail and then the discussion returns to step 6816.

Figure 69:
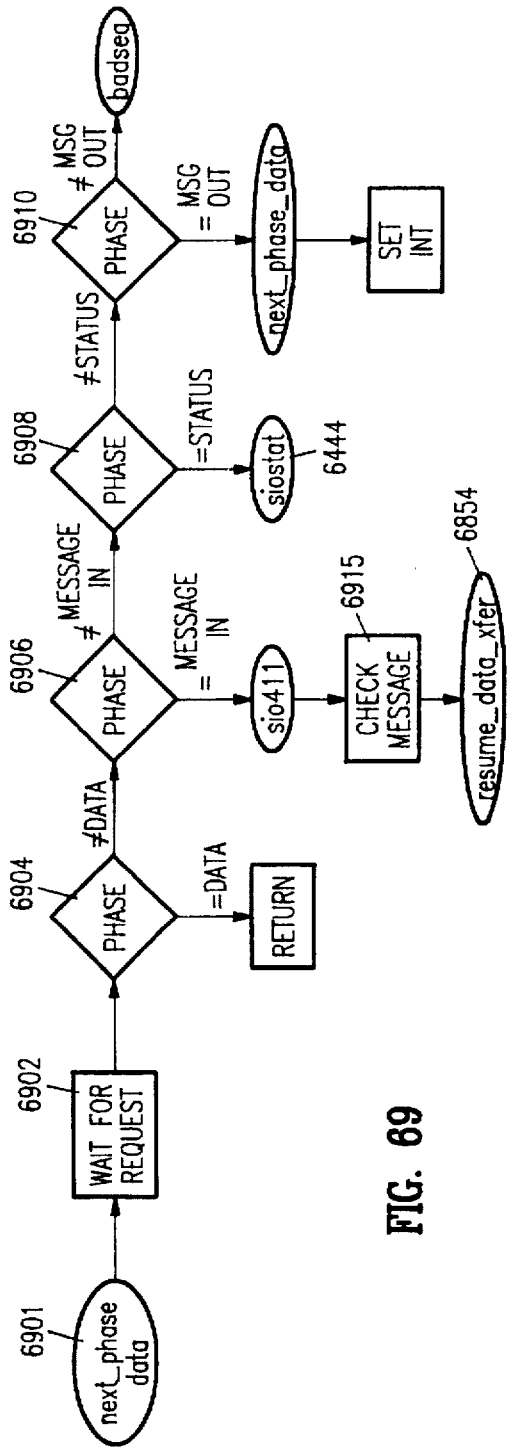

Next phase data process, 6814 starts at label NEXT_DATA_PHASE, which transfers to wait for request 6902 (FIG. 69). Step 6902 waits for the next request signal, and as previously described, loads the expected SCSI phase into register SCSISIGO and SCSI phase into a temporary variable "A". Data phase check 6904 examines the SCSI phase and if the phase is "data" returns. If the SCSI phase is not "data," message in phase check phase 6906 branches to label SIO411 if the phase is "message in" and otherwise transfers to check phase 6908 which branches to label SIOSTAT if the phase is "status" and otherwise to check phase 6910. If the phase is message in, check 6910 branches to label NEXT_PHASE_DAT0 and otherwise to label BADSEQ. At label BADSEQ the interrupt code PHASE_ERROR is loaded into register INTSTAT and bit SEQINT is set. An invalid SCSI sequence has been detected and so the command is abandoned.

At label SIO411, check message 6915 performs the same process as described for step 6450 and that description is incorporated herein by reference. After check message 6915 processing jumps to label RESUME_DATA_XFER 6854.

Figure 68A:
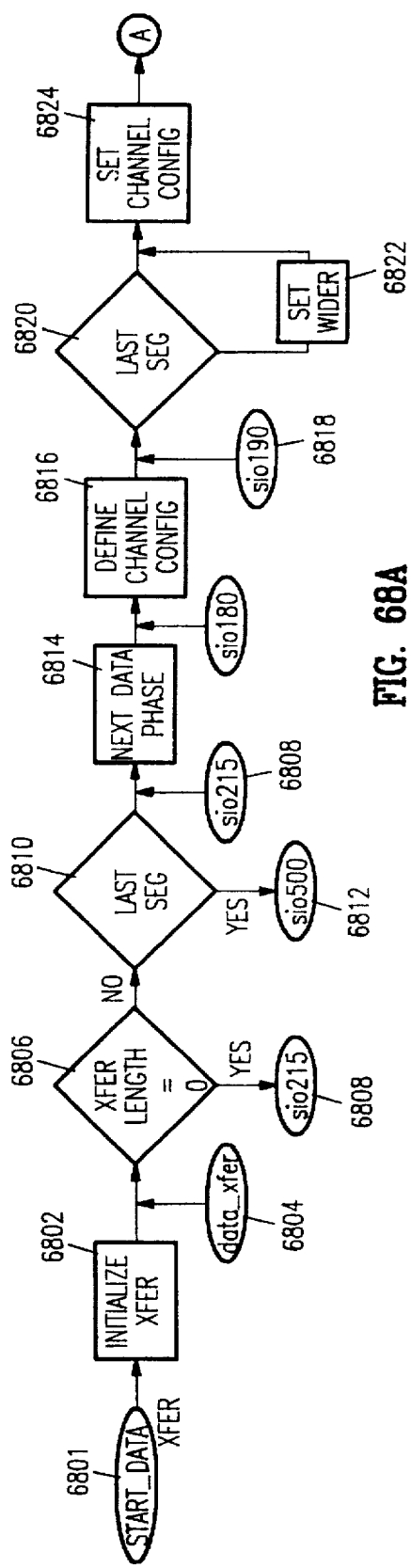

If the SCSI phase is "data" next data phase 6814 transfers processing to define channel configuration 6816 (FIG. 68A). In define channel configuration 6816, the data FIFO control byte is defined, the data FIFO memory is cleared, the transfer direction is defined and the DMA transfer is enabled. Specifically, bits SCSIEN, SDMAEN, HDMAEN, and FIFORESET are set. Bit DIRECTION is set depending on whether the data transfer is a read or a write and this is determined by analyzing bit IOI in register SCSISIGI. This completes the definition of channel configuration step 6816.

Last segment check 6820 determines whether the last segment is being processed. If the last segment is not being processed, processing transfers directly to set channel configuration 6824. However, if this is not the last segment, to prevent a flush of the data FIFO at the end of the segment, bit WIDEODD is set by set wide bit 6822. Set channel configuration 6824 configures register DFCNTRL to have each of the bits just described as active so that the DMA transfer is enabled. At this point the host interface module 310, data FIFO memory circuit 360 and SCSI module 330 take control and transfer the data between the SCSI bus and the host computer bus 226. Sequencer 320 is now simply waiting for the end of the transfer of the data segment or for a SCSI phase change.

Figure 68B:
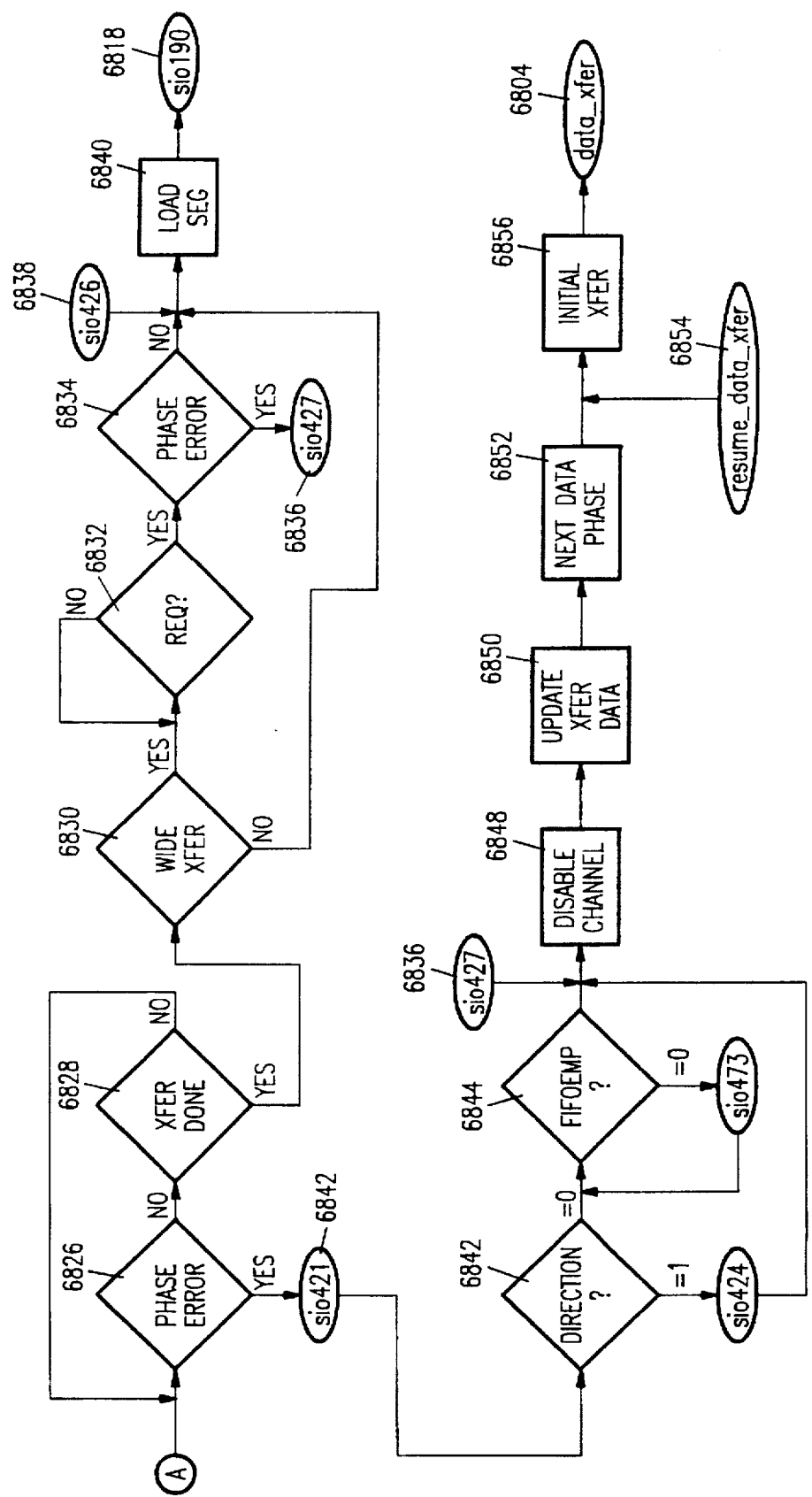

Accordingly, phase error check 6826 (FIG. 68B) examines bit PHASEMIS in register SSTAT1 and if the bit is set, branches to label SIO421 6842. If the bit is not set, transfer done check 6828 examines bit DMADONE in register SSTAT0. If bit DMADONE is set, processing transfers to wide transfer check 6830 and otherwise to phase error check 6826.

Wide transfer check 6830 tests bit WIDE_XFER in register SCSIRATE and if the bit is set transfers to request check 6832. If the bit is not set, processing transfers to load segment 6840. Thus, if there is a wide data transfer, steps 6832 and 6834 are processed, but if there is not a wide transfer, sequencer 320 does not wait until a latched REQ signal is received. For a wide SCSI transfer, sequencer 320 must wait for the next latched request signal before loading up the next segment data to be certain that the phase is still "data." If the target changes the phase to "message in" with an "ignore wide residue" message, sequencer 320 must leave the completed segment loaded for modification by HIM 462.

Load segment 6840 first checks to see if it is the end of the data transfer, and if it is, jumps to label SIO400 which evokes the end of data transfer process. If it is not the end of the data transfer, the next segment is fetched and loaded into the appropriate registers and processing branches to label SIO190 6818.

If a phase error was detected by phase error check 6826, processing transfers to direction check 6842. If bit DIRECTION is set to one, processing transfers to disable channel step 6848. However, if bit DIRECTION is not set, FIFO empty check 6844 cycles until bit FIFOEMP in register DFSTATUS is set to one and then FIFO empty check 6844 also transfers to disable channel 6848. When the data FIFO memory circuit 361 is empty, the SCSI FIFO is empty. When a segment boundary falls in the middle of a word from a wide SCSI transfer, host adapter 7770 waits for the next segment to be loaded before acknowledging the SCSI word. As a result, the last byte is transferred from the SCSI FIFO to the data FIFO before a phase change can occur. Therefore, if a phase change has occurred, the SCSI FIFO is empty. Disable channel 6848 clears bits SCSIEN, SDMAEN and HDMAEN in register DFCNTRL. Disable channel 6848 waits for bit HDMAENACK to be cleared and then processing transfers to update transfer data 6850.

In update transfer data 6850, the data transfer residue information from register STCNT is loaded into SCB to indicate the number of bytes in the current segment remaining to be transferred. Also, the number of segments after the current segment remaining to be transferred is stored in the SCB. Processing then transfers to next data phase 6852, which was just described above.

If the phase is data, initialize transfer 6856 transfers the scatter/gather list count to the scatter/gather work count and the scatter/gather list pointer to the scatter/gather work pointer. The host registers are loaded from the SCB, i.e., "saddress" is transferred to register HADDR and "slength" is transferred to registers HCNT and STCTN. Finally, bits SDONE and DMADONE are cleared. Transferring then branches to label DATA_XFER 6804.

After all data bytes have been transferred to the host, and handshakes have been completed on both the SCSI and the EISA/ISA buses, processing transfers to label SIO400, where initially a zero residue is loaded in the residue field in the SCB. The data channel is disabled by clearing bits SCSIEN, SDMAEN, and HDMAEN in register DFCNTRL. A test overrun step examines register SSTAT3 to determine, whether it has a zero value. If it has a zero value, processing transfers to label SIO500 and otherwise to label SIO501, where set interrupt step sets the interrupt code in register INTSTAT to DATA_OVERRUN and sets bit SEQINT to send an interrupt to HIM 462. After HIM 462 process the data overrun, HIM 462 returns to label SIO500, where next phase data step is executed.

At label SIOSTAT, check residue branches to process RESIDUE, if the transfer residue is not zero and otherwise processing goes to label SIOSTA2 where a disabled data channel step zeros register DFCNTRL. Process RESIDUE is passed the number of bytes of the last open segment that were not transferred; the number of segments remaining after the last open segment; the number of segments remaining, not including the current segment that were last saved in the SCB; and the pointer to the next segment that was last saved in the SCB. The residue routine calculates the final data transfer residue for pass out for HIM 462.

Read target status reads register SCSIDATL and saves the data in the target status of the SCB. As described previously, reading register SCSIDATL drives an acknowledge onto the SCSI bus. The next step is wait for request that was described previously and that description is incorporated herein by reference.

When the next request signal is received processing transfers to check phase which branches to label "BAD-SEQ" if the phase is not "message in". If the phase is message in, the completion message is read. If the completion message is not "command complete" without linking, HIM 462 is interrupted to handle the message. Specifically, a check message branches to label SIOSTA0 if the message equals "command complete without link" and otherwise to set interrupt which loads the interrupt code UNKNOWN MESSAGE into register INTSTAT and sets bit SEQINT.

After HIM 462 handles the interrupt, HIM 462 branches back to label SIOSTA0. A disable bus free interrupt step turns off bit ENBUSFREE in register SIMODE1. Target status check branches to label SIOSTA1 if the target status is not equal to zero and otherwise loads the value of register SCBPTR into queue-out FIFO 413. Next an assert acknowledge drives an acknowledge signal onto the SCSI bus and a set interrupt step sets bit CMDCMPLT in register INTSTAT then processes transferring to label IDLE_LOOP 6101.

If the target status is non-zero, processing transfers to label SIOSTA1 where a set interrupt step loads interrupt code CHECK_CONDX into register INTSTAT and sets bit SEQINT. In response to this interrupt, HIM 462 acknowledges the command complete message and restarts sequencer 320.

At label EXTENDED_MESSAGE, ACKREQ step drives an acknowledge signal onto the SCSI bus and then transfers processing to the wait for request process described previously. Upon receipt of the request signal, processing transfers to message check phase which branches to return if the SCSI phase is not "message in" and to a load register step if the phase is "message in." In step load register, the data in register SCSIBUSL is saved in register PASS_TO_DRIVER for use by HIM 462.

Another ACKREQ step obtains the third message byte, and another check phase returns if the phase is not "message in." A check message branches to label EXT_MSG1 if the message is not "modify data pointers." Next, bit REJECT_MDP in the SCB is checked and if the bit is zero, processing transfers to label EXT_MSG3 and otherwise to set interrupt which loads the interrupt code UNKNOWN_MSG into register INTSTAT and sets bit SEQINT.

The interrupt notifies HIM 462 to reject message "modify data pointers" if bit REJECT_MDP was set in the SCB. If bit REJECT_MDP was not set, processing transfers to label EXT_MSG3. A step read argument reads in a four bit argument from the target and transfers to step ACKREQ.

Upon receipt of signal REQ, step ACKREQ branches to a check phase. If the phase is not "message in" the extended message process returns. If the phase is "message in" the SCSI and data FIFOs are cleared the handshake is completed and processing resumes at label SIO215.

In one embodiment, the bus master host adapter integrated circuit of this invention is made using a one micron two layer metal CMOS process. However, the embodiments of this invention disclosed herein are illustrative only of the principles of the invention and are not intended to limit the invention to those particular embodiments. For example, each of the SCSI module, host interface module, RISC processor, CIOBUS, and the queue-in and queue-out FIFOs in combination with the SCB array have applicability in a wide variety of applications. Further, the particular address locations and ranges used herein are illustrative only as are the interrupt codes and other codes used in the operation of the host adapter. In view of this disclosure, those skilled in the art will be able to implement the features of this invention in a wide variety of ways.

APPENDIX I

The following conventions are used throughout these appendices:

set (to one) - Indicates the loading of a 1
cleared - Indicates the loading of a 0
(0) - Indicates that the bit is cleared when the reset pin is active
(1) - Indicates that the bit is set when the reset pin is active
(x) - Indicates that the bit is in an unknown state after the reset condition
C-xxh - Device internal address decode
I-xxxxh - ISA I/O address decode
E-Zxxxh - EISA I/O address decode Sequencer Control (SEQCTL)

| Type: | R/W |
|---|---|
| Address: | I-0F40h, E-zC60h, C-60h |
| 7 (0) | PERRORDEN: When this bit is cleared sequencer RAM parity errors are detected. When this bit is cleared, parity error detection is disabled. Sequencer RAM parity error detection should be disabled while loading the RAM to prevent false error |
| 6 (0) | PAUSEDIS: If this bit is set, disables the Pause function when bit PAUSE (bit 2, register HCNTRL) is set. A pause due to interrupts or error conditions is still enabled. SCSI interrupts, illegal opcode interrupts, sequencer RAM parity error interrupts and illegal address interrupts reset this bit. The software driver cannot write to this bit. NOTE: If the firmware relies on setting this bit to avoid being interrupted (paused) while entering critical sections of code, the following needs to be noted: (1) There can be a race condition between the firmware trying to set this bit and the host module trying to pause the sequencer in response to the software driver request. (2) If the software driver request wins, the hardware guarantees that at least the instruction following the one that disables this interrupt is not executed. (3) If the sequencer firmware wins, the software driver request is pending until the firmware executes an instruction that enables this request. |
| 5 (1) | FAILDIS: If this bit is set, illegal opcode or address interrupt feature is disabled. If this bit is cleared, an illegal opcode or address causes a break interrupt BRKADRINT to occur and pauses the sequencer. |
| 4 (0) | FASTMODE: If this bit is set, the sequencer clock is divided by the four from the input clock. If reset, the input clock is divided by 5. |
| 3 (0) | BRKADRINTEN: When this bit is set, the breakpoint status is enabled to drive the interrupt pin. When cleared and the breakpoint is enabled, (clear bit BRKDIS in register BRKADDR1), bit BRKADRINT (bit 3, register INTSTAT) is set, but IRQ is not asserted. |
| 2 (0) | STEP: The sequencer should be first paused before setting this bit. The software driver should then unpause the sequencer. The |

|  |  |
|---|---|
|  | sequencer executes one instruction and then self pauses. The sequencer responds with signal PAUSEACK. The software driver can single step repeatedly by writing a zero to bit PAUSE. Normal execution can be resumed by writing a zero to bit STEP. |
| 1 (0) | SEQRESET: When this bit is set, the address pointer for the sequencer RAM is cleared and program execution starts at location zero. This bit is self clearing. The sequencer should be paused before setting this bit. |
| 0 (0) | LOADRAM: When this bit is set, the sequencer RAM can be loaded or read by writing or reading a series of bytes to or from register SEQRAM. This bit must be cleared for normal operation. This bit should be toggled by the software driver if the software driver desires to read out the contents of the sequencer RAM immediately after writing to it without unpausing the sequencer. |

Sequencer RAM Data (SEQRAM)
Type: R/W
Address: I-0F41h, E-zC61h, C-61h

This register is a port to the sequencer RAM area. The RAM may be loaded by first pausing the sequencer and then asserting the LOADRAM bit in register SEQCTL. The starting address is then written into SEQADDR0 and SEQADDR1 before writing to this register. The byte ordering should be from the least significant byte first to the most significant. The address auto increments after the most significant byte is written to facilitate loading the program.

Sequencer Address 0/1 (SEQADDR0/1)
Type: R/W
Address: I-0F42/0F43h, E-zC62/zC63h, C-62/63h These registers contain the address of the instruction within the sequencer RAM that is executed on the next clock edge. These registers may be written to for the purpose of changing the execution location after first pausing the sequencer. They may also be written to on the fly by the sequencer. Either the low byte or the high byte may be written to when the sequencer has not been paused. This accomplishes an indirect jump instruction. These registers are also used to specify the starting location when loading sequencer firmware. The address will automatically increment while loading the program after every fourth byte. The fourth byte index is cleared when this register is written. Each bit of these two registers power up to a value of zero.

Accumulator (ACCUM)
Type: R/W
Address: I-0F44h, E-zC64h, C-64h

This register is a temporary holding place for arithmetic or logical operations. This register is the second source to the ALU when the value of the 'immediate' field is zero. An exception to this would be ORI operations where operand2 is always the value contained in the immediate field. All bits of this register power up to a value of zero.

Source Index (SINDEX)
Type: R/W
Address: I-0F45h, E-zC65h, C-65h

This register is a temporary holding register or may be used as an indirect address for source operands for some ALU operations. The software driver must not use this register to indirectly address a source operand. All bits of this register power up to a value of zero.

Destination Index (DINDEX)
Type: R/W
Address: I-0F46h, E-zC66h, C-66h

This register is a temporary holding register or may be used as an indirect address for destination operands for some ALU operations. The software driver must not use this register to indirectly address the destination. All bits of this register power up to a value of zero.

Break Address Low (BRKADDR0)
Type: R/W
Address: I-0F47h, E-zC67h, C-67h

This register is used for diagnostic purposes to halt the sequencer at a specific address. It is loaded with the lower byte of the break address. All bits of this register power up to a value of zero.

Break Address High (BRKADDR1)
Type: R/W
Address: I-0F48h, E-zC68h, C-68h

This register is used for diagnostic purposes to halt the sequencer at a specific address. It is loaded with the upper byte of the break address. In addition, bit 7 is a break condition disable.

Note: To break at an instruction located at address 'X' the value of the break address should be 'X+1' provided the instruction at address 'X+1' is the logical outcome of the instruction located at 'X'.

| 7 (1) | BRKDIS: | Break disable. When set, this bit disables the break on compare feature of the sequencer. When cleared, this feature is enabled. |
|---|---|---|
| 6 (0) | Not Used: |  |
| 5 (0) | RSVD: |  |
| 4 (0) | RSVD: |  |
| 3 (0) | RSVD: |  |
| 2 (0) | RSVD: |  |
| 1 (0) | RSVD: |  |
| 0 (0) | BRKADDR(08): | Address bit 08 used for comparison with BRKADDR0. |

All Ones (ALLONES)
Type: R
Address: I-0F49h, E-zC69h, C-69h

This port returns all ones when read. This register may be used to feed a value of FFh onto operand1 to the ALU.

All Zeros (ALLZEROS)
Type: R
Address: I-0F4Ah, E-zC6Ah, C-6Ah

This port returns all zeros when read. This register may be used to feed a value of 00h onto operand1 to the ALU.

No Destination (NONE)
Type: W
Address: I-0F4Ah, E-zC6Ah, C-6Ah

This address is used to modify no registers.

Flags (FLAGS)
Type: R
Address: I-0F4Bh, E-zC6Bh, C-6Bh

This register returns the flag values.

| | | | |
|---|---|---|---|
| 7 (0) | Not Used: | | |
| 6 (0) | Not Used: | | |
| 5 (0) | Not Used: | | |
| 4 (0) | Not Used: | | |
| 3 (0) | Not Used: | | |
| 2 (0) | Not Used: | | |
| 1 (0) | Carry: | | This flag is the carry flag from the ALU. Modified only by arithmetic and rotate operations. |
| 0 (0) | Zero: | | This flag is the Zero flag from the ALU. Modified on every ALU operation. |

Source Index Indirect (SINDIR)
Type: R
Address: C-6Ch

This address is used for indirectly addressing the source data. When a transfer is done from this port, the contents of register SINDEX is used as the source address. Contents of register SINDEX are auto incremented the clock after this register has been addressed. This address must not be used by the software driver.

Destination Index Indirect (DINDIR)
Type: W
Address: C-6Dh

This address is used for indirectly addressing the destination write register. When a transfer is done from this port the contents of register DINDEX is used as the destination address. Contents of DINDEX will be auto incremented the clock after this register has been addressed. This address must not be used by the software driver.

Function 1 (FUNCTION1)
Type: R/W
Address: I-0F4Eh, E-zC6Eh, C-6Eh

This register provides a specific function for use by the sequencer firmware to minimize the number of instructions.

Sequencer Stack (STACK)
Type: R
Address: I-0F4Fh, E-zC6Fh, C-6Fh

The contents of the stack are reported one byte at a time starting from the last location pushed on the stack until all entries are reported. The stack entries are reported on consecutive reads alternating Low byte then High byte. Location 0 points to the last pushed entry, location 1 points to the entry pushed before that, etc. The stack pointer increments after a read of the high byte, therefore eight reads must be made to restore the location of the stack pointer to the original value if it is intended to continue proper program execution.

APPENDIX II

Board ID [3:0] (BID3, BID2, BID1, BID0)

Type: R (HIOBUS)
Address: I-1340h/1341h,1342h/1343h, E-zC80h/zC81h/zC82h/zC83h, C-80h/81h/82h/83h

BID0

7 (0) Always reads 0, EISA spec reserved
6 (0) Always reads 0, 1st mfg ID char MSB
5 (0) Always reads 0, 1st mfg ID char
4 (0) Always reads 0, 1st mfg ID char
3 (0) Always reads 0, 1st mfg ID char
2 (1) Always reads 1, 1st mfg ID char LSB
1 (0) Always reads 0, 2nd mfg ID char MSB
0 (0) Always reads 0, 2nd mfg ID char

BID1

7 (1) Always reads 1, 2nd mfg ID char
6 (0) Always reads 0, 2nd mfg ID char
5 (0) Always reads 0, 2nd mfg ID char LSB
4 (1) Always reads 1, 3rd mfg ID char MSB
3 (0) Always reads 0, 3rd mfg ID char
2 (0) Always reads 0, 3rd mfg ID char
1 (0) Always reads 0, 3rd mfg ID char
0 (0) Always reads 0, 3rd mfg ID char LSB

BID2

7 (0) Always reads 0, 1st prod ID char MSB, lease significant char
6 (1) Always reads 1, 1st prod ID char
5 (1) Always reads 1, 1st prod ID char
4 (1) Always reads 1, 1st prod ID char LSB
3 (0) Always reads 0, 2nd prod ID char MSB
2 (1) Always reads 1, 2nd prod ID char
1 (1) Always reads 1, 2nd prod ID char
0 (1) Always reads 1, 1st prod ID char LSB

BID3

7 (0) Always reads 0, 3rd prod ID char MSB
6 (1) Always reads 1, 3rd prod ID char
5 (1) Always reads 1, 3rd prod ID char
4 (1) Always reads 1, 3rd prod ID char LSB
3 (0) Always reads 0, 4th prod ID char (single bit)
2 (0) Always reads 0, EISA spec rev MSB
1 (0) Always reads 0, EISA spec rev
0 (0) Always reads 0, EISA spec rev LSB Board Control (BCTL)

Type: R/W (HIOBUS)
Address: I-1344h, E-zC84h, C-84h 7 (0) Not Used: Always reads 0, EISA spec reserved
6 (0) Not Used: Always reads 0, EISA spec reserved
5 (0) Not Used: Always reads 0, EISA spec reserved
4 (0) ACE: This is a programmable bit which may be used to indicate an external ROM and intercept logic is available to support other processors. (See Advanced RISC Computing Standard Specification and Addendum for EISA-based systems.)
3 (0) Not Used: Always reads 0, EISA spec reserved
2 (0) Reserved: Always reads 0
1 (0) Reserved: Always reads 0
0 (0) Enable: ENABLE board. When this bit is set, the host adapter board is enabled for normal operation. When cleared, the host adapter is disabled and must not drive any bus signals. It may only respond to EISA (also ISA) slot specific I/O. Bit ENABLE is also forced to the inactive state when signal RESDRV is asserted or an external interface I/O write was

APPENDIX II performed to activate signal CHIPRST.
Bus on/off time (BUSTIME)

Type: R/W (CIOBUS)
Address: I-1345h, E-zC85h, C-85h 7-4 (0) BOFF [3,0]: The meaning of this register changes depending on whether ISA or EISA mode is selected. In ISA mode, this value gives the minimum time that host adaptor stays off the bus during data transfers, except that a value of zero means the off time is determined by counting bus clock periods. The time is coded according to the following table. This time is measure from signal DACK going false to signal DREQ going true. The power on default is one. In EISA mode, this register is used to count the number of bus clock periods before releasing the bus when preempted by the system.

| BOFF (hex) | ISA Time (μs) | EISA BCLKS |
|---|---|---|
| 0 | 2BCLKS | 2 |
| 1 | 4 | 4 |
| 2 | 8 | 8 |
| 3 | 12 | 12 |
| ... | ... | ... |
| F | 60 | 60 |

3-0 (0) BON[3:0] This value gives the maximum time on the bus. In EISA mode, the values loaded are the number of microseconds that the host adaptor keeps the bus, provided that no other event such as a lack of data causes it to release the bus. The time is measured from signal DACK going true to signal DREQ going false. In EISA mode, this count is not used.

| BON (hex) | Time (μs) |
|---|---|
| 0 | 2 BCLKS |
| 1 | 1 |
| 2 | 2 |
| 3 | 3 |
| ... | ... |
| F | 15 |

Bus Speed (BUSSPD)

Type: R/W (CIOBUS)
Address: I-1346h, E-zC86h, C-86h

This register adjusts the speed of transfer on ISA bus to accommodate various implementations. The speeds and discussion of the values loaded are given above. In ISA mode, bits STBON[3:0] and STBOFF[3:0] have no meaning, but bits DFTHRSH[1:0] are still used 7-6 (0) DFTHRSH1, DFTHRSH0.
5-3 (0) The value loaded in STBOFF determines high or off time that the ISA memory write or read strobe will remain between strobes.
2-0 (0) The value loaded in STBON determines low or on time that the ISA memory write or read strobe will remain active.

Host Control (HCNTRL)

Type: R/W (HIOBUS)
Address: I-1347h, E-zC87h, C-87h
7 (0) Not used: Always reads zero
6 (0) POWRDN: The power down bit when active (=1) indicates to host interface module and the other associated modules in host adapter 7770 that they should go into a mode that minimizes power used. While in the power down state normal function is not required, however external control of the module signals directly interfacing to the external die pads must be maintained. While in state POWRDN, host interface module minimizes the use of clocks HCLK and BCLK, data bus D[31:0] and address buses LA[31:0] and SA[19:0] and inhibit active interrupt conditions. Note, prior to placing POWRDN in the active state, software must ensure that bits SCSIENACK, SDMAENACK and HDMAENACK are in the inactive state to prevent errors from being transferred to the SCSI bus, to the System board, or to the System memory.

5 (0) Not used: Always reads zero
4 (0) SWINT: Software Interrupt bit. When this bit is set, signal IRQ is asserted. Signal IRQ remains asserted until this bit is cleared. Clearing bit INTEN inhibits bit SWINT and de-asserts signal IRQ.
3 (0) IRQMS: IRQ Mode Select bit. When this bit is set, a low true level interruption on pin IRQ is selected.
2 (0) PAUSE[ACK]: Pause/Pause Acknowledge bit. When this bit is set, the sequencer is paused. When this bit is read, it gives the PAUSEACK status and should be polled to be sure that the sequencer is paused. The driver may start at the address that was paused or at this time change the program counter (SEQADDR). Clearing this bit releases the sequencer and it continues at the current value of the program counter. This bit is also set by certain hardware conditions listed below.

| | |
|---|---|
| BRKADRINT | bit 3, INTSTAT |
| SCSIINT | bit 2, INTSTAT |
| STEP | bit 2, SEQCTL |
| RSTDRV | pin |
| CHIPRST | bit 0, HCNTRL |

1 (0) INTEN: Interrupt Enable bit. When this bit is set, system interrupts are enabled and occur when a interrupt event happens. Interrupt events are those listed in INTSTAT, SIMODE1, SIMODE0, or SWINT.
0 (1) CHIPRESET: Device Reset bit. When set, this bit resets the device and then self clears. The device is held reset for four input clock cycles an then is released automatically. This reset is the same as a hard reset to the RESDRV pin. This bit always reads zero except for one clock cycle after the bit is set. See Test Register Description for details of operation.

Host Address (HADDR(n))

Type: R/W (CIOBUS)
Address: I-1348/1349/134A/134Bh, E-zC88/zC89/zC8A/zC8Bh, C-88/89/8A/8Bh Host Count (HCNT(n))

Type: R/W (CIOBUS)
Address: I-134C/134D/134Eh, E-zC8C/zC8D/zC8Eh, C-8C/8D/8Eh

SCB Pointer (SCBPTR)

Type: R/W (CIOBUS)
Address: I-1350h, E-zC90h, C-90h
7 (0) Not Used: Always reads 0
6 (0) Not Used: Always reads 0
5 (0) Not Used: Always reads 0
4 (0) Not Used: Always reads 0
3 (0) Not Used: Always reads 0
2 (0) SCBVAL(2): This bit returns the value that

APPENDIX II was written to it, and has no other function.

1-0 (0) SCBVAL(1,0): This value selects the page of the SCB Array which appears in the SCB address range.

Interrupt Status (INTSTAT)

Type: R (HIOBUS) /W (CIOBUS)
Address: I-1351h, E-zC91h, C-91h 7-4 (0) INTCODE(3,0): This value is a code which further describes the situation of the interrupt. It is valid when SEQINT is set. See the discussion on interrupts for a definition of this codes. Briefly, these bits enable a code to be stored to identify the condition causing the SEQINT bit to be active. By convention the INTCODE[3:0] bits are only considered valid when the SEQINT bit is active and should be written in the same write operation that activates SEQINT.

3 (0) BRKADRINT: This bit is set when the program counter of the sequence and the break address are equal and the breakpoint is enabled (BRKDIS=0). When this bit is set, the sequencer is paused immediately. BRKADRINT is cleared by setting CLRBRKADRINT (bit 3, CLRINT). This bit is also set by a hardware failure upon detection of the following events:
Illegal Sequencer opcode
Illegal I/O address
HADDR write with HDMAEN set
HCNT write with HDMAEN set
DFIFO I/O write when SDMAEN or HDMAEN set 2 (0) SCSIINT: SCSI Interrupt Bit. This bit is set when there is a catastrophic SCSI event. Causes are SCSI Reset, Parity Error, Selection Timeout or Unexpected Bus Free. Any interrupt condition in the SCSI section may cause this interrupt if the corresponding interrupt is enabled in SIMODE0 or SIMODE1. This interrupt is also qualified with SELBUS1 (bit 3, SBLKCTL) so that it reflects only the currently selected channel. When this bit is set the sequencer is paused immediately.

1 (0) CMDCMPLT: Command Complete Interrupt Bit. This bit is set during normal operation after a command has been completed and the SCB pointer has been loaded on the Queue Out FIFO. The sequencer continues running when this bit is set.

0 (0) SEQINT: Sequence Interrupt Bit. This bit is set by the sequencer when it requires driver intervention to complete a command or to handle an exception condition. The sequencer is paused by the interrupt immediately.

Clear Interrupt Status (CLRINT)

Type: W (HIOBUS)
Address: I-1352h, E-zC92h 7 (0) Not Used: Always reads 0
6 (0) Not Used: Always reads 0
5 (0) Not Used: Always reads 0
4 (0) Not Used: Always reads 0
3 (1) CLRBRKADRINT: Clear Break Address Interrupt Bit. When this bit is set, the interrupt is cleared. The bits in this register are self clearing. The Sequencer may not write to this register and the driver may write to the register without pausing the Sequencer.
2 (0) Not Used: Always reads 0
1 (1) CLRCMDINT: Clear Command Complete Interrupt Bit. When this bit is set, CMDCMPLT bit is cleared in the INTSTAT register. This bit will self clear and does not need to be cleared.
0 (0) CLRSEQINT: Clear Sequencer Interrupt Bit. When this bit set, the SEQINT bit is cleared in the INTSTAT register. This bit will self clear and does not need to be cleared.

Hard Error (ERROR)

Type: R (HIOBUS)
Address: I-1352h, E-zC92h, C-92h 7 (0) Not Used: Always reads 0
6 (0) Not Used: Always reads 0
5 (0) Not Used: Always reads 0
4 (0) Not Used: Always reads 0
3 (0) PARERR: Sequencer Parity Error Bit. This bit is a one when a parity error is detected while the Sequencer firmware is running.
2 (0) ILLOPCODE: Illegal Opcode Bit. This bit is set when a instruction is executed by the Sequencer which is not defined.
1 (0) ILLSADDR: Illegal Sequencer Address Bit. This bit is set when the Sequencer accesses an address which does not decode to a defined register, an illegal OP code is detected, HADDR or HCNT is written with HDMAEN set, or DFIFO is written when HDMAEN or SDMAEN is set.
0 (0) ILLHADDR: Illegal Host Address Bit. This bit is set when the Host accesses a register while the Sequencer is not paused which is unavailable to the Host.

Data FIFO Control Register (DFCNTRL)

Type: R/W (CIOBUS)
Address: I-1353h, E-zC93h, C-93h 7 (0) Not Used: Always reads 0
6 (0) WIDEODD: Wide Odd Bit. When the Wide odd bit is set, it prevents flushing of the SCSI fifos in the case of a WIDE transfer with an odd number of bytes during a Scatter/Gather type transfer. In this case, the last byte is held in the SCSI block until the first byte of the next transfer is received, and then the data transfer continues as a 16-bit transfer.
5 (0) SCSIEN[ACK]: SCSI Transfer Enable Acknowledge Bit. When the SCSI transfer enable acknowledge bit is set to a one, it enables transfers between the SCSI bus and one of the SCSI FIFOs. Clearing this bit cleanly halts the transfer by preventing ACKs to the SCSI bus. Reading this bit gives SCSIENACK. This a status bit which indicates the state of the hardware. When this bit is cleared, it must be read back as zero before the transfer is guaranteed to have halted. Synchronous data-in transfer to the SCSI FIFO is always enabled when the synchronous offset value programmed in SCSIRATE is non-zero and the SCSI bus is in DATA IN phase.
4 (0) SDMAEN[ACK]: The SCSI DMA Enable/SCSI DMA Enable Acknowledge Bit. When this bit is set to a one it enables transfers between the SCSI block and the data FIFO. Reading this bit gives SDMAENACK, a status bit which indicates the state of the hardware. When this bit is cleared, transfers are disabled, but it must be read back as zero before the transfer is guaranteed to have halted.
3 (0) HDMAEN[ACK]: Host DMA Enable/Host DMA Enable Acknowledge Bit. When this bit is set, it enables the host interface to transfer data to or from system memory. The address pointer and byte

APPENDIX II

|  |  |
|---|---|
|  | counter must be set up prior to setting this bit. Clearing this bit halts transfers without losing data, status or byte count. Transfers may be continued after halting. Reading this bit gives HDMAENACK. This is a status bit which indicates the state of the hardware. When this bit is cleared, transfers are disabled, but it must be read back as zero before the transfer is guaranteed to have halted. |
| 2 (0) DIRECTION: | DMA Direction bit. The DMA Direction bit configures the hardware for the direction of transfer. The bit is set for a write operation, this is from the host bus to the SCSI bus. When the bit is cleared, a read operation is assumed, that is from the SCSI bus to the host bus. DIRECTION may not be changed unless the enable bits (bits 3, 4, and 5) are cleared. |
| 1 (0) FIFOFLUSH: | Data FIFO Flush Bit. The DFIFO flush bit, when set, forces the Data Fifo to send the remaining bytes to the host memory during a read operation. This bit is self clearing and has no effect during a write operation. The FIFO is also flushed by hardware on STCNT=0 or a SCSI phase change. When this bit is read as a one, it indicates a flush operation is pending or in progress due to either a firmware or hardware flush. It is read as a zero when the flush operation is done. This bit should not be used if WIDEODD is set. |
| 0 (0) FIFORESET: | FIFO Reset Bit. When this bit is set, the Data Fifo Pointers are reset. The status reflects that the FIFO is empty. The byte offset pointers are also loaded from HADDR(00) and HADDR(01). This bit is self clearing. |

Data FIFO Status (DFSTATUS)

Type: R (CIOBUS)
Address: I-1354h, E-zC94h, C-94h

|  |  |
|---|---|
| 7 (0) Not Used: |  |
| 6 (0) Not Used: |  |
| 5 (0) DWORDEMP: | Double Word Empty Bit. This bit indicates that the DFIFO read and write addresses are the same. There may be data elsewhere in the channel. |
| 4 (0)MREQPEND: | Master Request Pending Bit. This bit is set when the Host interface logic has reaches a condition which requires a data transfer on the Host bus. When this occurs, this bit is set and a request for Bus Master control of the bus is generated. The MREQ signal is still subject other conditions and may not appear on the bus at the same time this bit is set. The bit is cleared when there is no requirement for a host transfer, or when HDONE is set, or when FIFORESET (bit 0, DFCNTRL) is set. |
| 3 (0) HDONE: | Host Done Status Bit. This bit is the logical AND of HCNT=0 and the last transfer complete. This bit is cleared when HDMAEN (bit 3, DFCNTRL) is cleared. |
| 2 (0) DFTHRSH: | DFIFO Threshold Status Bit. When set, this bit indicates that the threshold condition is now met. When cleared, this bit indicates that the threshold condition is not being met. This signal is only valid when the count of bytes in the FIFO is equal to the threshold limit written to DFTHRSH(1:0). It is used for IC test only. |
| 1 (0) FIFOFULL: | Data Fifo Full Bit. The DFIFO full status bit, when set, indicates that the Data Fifo is full. |
| 0 (1) FIFOEMP: | Data Fifo Empty Bit. The DFIFO empty status bit, when set, indicates that the Data Fifo and all data registers are empty. |

Data FIFO Write Address 0 (DFWADDR0)

Type: R/W (CIOBUS)
Address: I-1355/1356, E-zC95/zC96h, C-95/96h

|  |  |
|---|---|
| 7 (0) TESTLOCK: | This bit gives the status of a test mode bit. See TESTCHIP register. |
| 6 (0) DFWADDR(6) | DFIFO Write Address Bit 6. This bit indicates that the write address bits 5-0 have rolled over from '000000' to '111111'. This bit is used to determine DFIFO full and empty status. It may be set to one or zero with a write to DFWADDR(5:0). |
| 5 (0) DFWADDR(5:0) | DFIFO Write Address Bits 5 to 0. Normally used DFIFO read address. |

Data FIFO Read Address 0 (DFRADDR0)

Type: R/W (CIOBUS)
Address: I-1357/1358h, E-zC97/zC98h, C-97/98h

RESERVED

| R/W | R/W |
|---|---|
| 7 (0) DFSDH: | This bit gives the status of a test mode bit. See TESTCHIP register. |
| 6 (0) DFRADD(6) | DFIFO Read Address Bit 6. This bit indicates that the read address bits 5-0 have rolled over from '000000' to '111111'. This bit is used to determine DFIFO full and empty status. It may be set to one or zero with a write to DFRADDR(5:0). |
| 5 (0) DFWADDR(5:0) | DFIFO Read Address Bits 5 to 0. These bits are normally used for the DFIFO read address. |

Data FIFO Register (DFDAT)

Type: R/W (CIOBUS)
Address: I-1359h, E-zC99h, C-99h

This register stores data into the Data FIFO using DFWADDR0 when written and reads data from the Data FIFO using DFRADDR0 when read. Before writing or reading to system memory, HADDR should be set up and FIFORESET(bit 0, DFCNTRL) should be set to initialize the correct offset into the FIFO. DFWADDR and DFRADDR may be adjusted after the FIFORESET if a specific location is desired.

SCB Auto Increment (SCBCNT)

Type: R/W (CIOBUS)
Address: I-135Ah, E-zC9Ah, C-9Ah

|  |  |
|---|---|
| 7 (0) SCBAUTO: | When set, enables SCBCNT to supply the address offset in the SCB array. |
| 6 (0) Reserved: | Always reads 0 |
| 5 (0) Reserved: | Always reads 0 |
| 4-0 (0) SCBCNT4-0: | SCB Array Counter. When SCBAUTO is set, the value written to these bits is used as the offset into the SCB array. After each access, the count is incremented by one. When SCBAUTO is cleared, this field is ignored. |

179
-continued

Queue In FIFO (QINFIFO)

Type: R/W (CIOBUS)
Address: I-135Bh, E-zC9Bh, C-9Bh

This register is written by the controlling driver with the SCB pointer value of the SCB which was just loaded. Writing to QINFIFO puts a value onto the queue. The FIFO is as deep as the number of SCB Array pages, and so it can queue as many commands as may be loaded in the SCB area. The sequencer will read the FIFO which will remove one value from the queue. The status of the FIFO is given in QOUTCNT.

Queue In Count (QINCNT)

Type: R (CIOBUS)
Address: I-135Ch, E-zC9Ch, C-9Ch
7 (0) Reserved:
6 (0) Reserved:
5 (0) Reserved:
4 (0) Reserved:
3 (0) Reserved:
2-0 (0) QINCNT: These bits contain the count of the number of entries in the QINFIFO. A value of zero means the FIFO is empty, a value of one means there is one entry, etc. QINCNT will only have values between 0 and 4.

Queue Out FIFO (QOUTFIFO)

Type: R (HIOBUS) /W (CIOBUS)
Address: I-135Dh, E-zC9Dh, C-9Dh

This register is written by the sequencer with the SCB pointer value of SCB which was just completed. Writing to QOUTFIFO puts a value onto the queue. The FIFO is as deep as the number of SCB Array pages, and so it can queue as many commands as may be loaded in the SCB area. The controlling driver will read the FIFO which will remove one value from the queue. The status of the FIFO is given in QSTAT. QOUTFIFO may be read by the drive without pausing the Sequencer.

Queue Out Count (QOUTCNT)

Type: R (HIOBUS)
Address: I-135Eh, E-zC9Eh, C-9Eh
7 (0) Reserved:
6 (0) Reserved:
5 (0) Reserved:
4 (0) Reserved:
3 (0) Reserved:
2-0 (0) QOUTCNT: These bits contain the count of the number of entries in the QOUTFIFO. A value of zero means the QOUTFIFO is empty, a value of one means there is one entry, etc. QOUTFIFO only has values between zero and four.

Test Chip (TESTCHIP)

Type: R/W (CIOBUS)
Address: I-135Fh, E-zC9Fh, C-9Fh
7 (0) TESTSEL(2:0): These bits are used to select the appropriate hardware configuration for testing. These bits are used only for chip test. Their meaning varies with the specific hardware section selected.
6 (0) Not used: tbd
5 (0) Not used: tbd
4 (0) TESTRAM: This bit is used only for chip test for special RAM stress testing.
3 (0) TESTHOST: This bit is used to select the Host block for testing.
2 (0) TESTSEQ: This bit is used to select the Sequencer block for testing.
1 (0) TESTFIFO: This bit is used to select the DFIFO block for testing.
0 (0) TESTSCSI: This bit is used to select the SCSI block for testing.

APPENDIX III

SCSI Sequence Control (SCSISEQ)

Type: R/W
Address: I-0340h, E-zC00h, C-00h

Each bit, when set, enables the specified hardware sequence. The register is readable to allow bit manipulation instructions without saving a register image in scratch RAM. All bits except bit SCSIRSTO are cleared by SCSI Bus Reset.

7 (0) TEMODEO: Target Enable Mode Out. This bit is used to select whether bit ENSELO starts a Selection Out (TEMODEO=0) or a Reselection Out (TEMODEO=1) SCSI BUS sequence.
6 (0) ENSELO: Enable Selection Out. When this bit is set to a one, the SCSI logic performs a Selection Sequence (TEMODEO=0) as an Initiator (ID = OID field of register SCSIID) and selects a Target (ID = TID field of the SCSIID Register) or performs a Reselection Sequence (TEMODEO=1) as a Target (ID = OID field of SCSIID Register) and reselects an initiator (ID = TID field of the SCSIID Register). The SELINGO Status (bit 4, in register SSTAT0) is one when the SCSI logic has entered the Selection/Reselection Phase and is waiting for signal BSY back from the Target/Initiator. The sequencer must wait for SELDO status (bit 6, in register SSTAT0) to be one or for bit SELTO (bit 7, in register SSTAT1) to be one if the hardware selection is enabled (bit 2, in register SXFRCTL1 is set to one), or for the software selection timeout if the hardware timeout is not enabled. This control is set to zero by the sequencer, or by a hard reset.
5 (0) ENSELI: Enable Selection In. When this bit is set to a one, the SCSI logic responds to a valid Selection Sequence. When selected, the SELDI status (bit 5, in register SSTAT0) is set to one and TARGET status (bit 7, in register SSTAT0) is set to one. This control is only set to zero by the sequencer when no more selections are wanted.
4 (0) ENRSELI: Enable Reselection In. When this bit is set to a one, the SCSI logic responds to a valid Reselection sequence. When reselected, the SELDI status (bit 5, in register SSTAT0) is one and TARGET status (bit 7, in

APPENDIX III

|  |  |
|---|---|
| 3 (0) ENAUTOATNO: | Enable Auto Attention Out. When this bit is set to one, SCSI ATN is asserted when a Selection Sequence (ENSELO=1, TEMODEO=0) is executed. This is used when the host adapter is an Initiator and wants to follow the Selection with a message out. SCSI ATN may be cleared by the sequencer by writing a one to bit CLRATNO (bit 6, in register CLRSINT1), or by a Bus Free state on the SCSI bus. Writing a zero to this bit does not clear ATN. |
| 2 (0) ENAUTOATNI: | Enable Auto Attention In. When this bit is set to a one, SCSI ATN will be asserted when the host adapter is reselected by a Target (ENRSELI=1). This is used when the host adapter is an Initiator and wants to follow the Reselection with a message out (refer to SCSI-2 Spec). SCSI ATN may be cleared by the sequencer by writing one to bit CLRATNO (bit 6, in register CLRSINT1), or by a Bus Free state on the SCSI bus. Writing a zero to this bit does not clear ATN. |
| 1 (0) ENAUTOATNP: | Enable Auto Attention Parity bit. When this bit is set to a one, and the host adapter is an Initiator, SCSI ATN is asserted during information transfer in phases (Data In, Message In, Status In) if a parity error is detected on SD[7:0] or on SD[15:8] if in Wide mode. The current DMA transfer is not interrupted by SCSI ATN being set by a parity error. SCSI ATN may be cleared by the sequencer by writing one to bit CLRATNO (bit 6, in register CLRSINT1), or by a Bus Free state on the SCSI bus. Writing a zero to this bit does not clear ATN. |
| 0 (0) SCSIRSTO: | SCSI Reset Out Bit. When this bit is set to a one, SCSI RST is asserted on the SCSI Bus. It must be cleared by the sequencer with a write of 0 to this bit. This control is not gated with the Target/Initiator Mode. |

SCSI Transfer Control 0 (SXFRCTL0)

Type: R/W
Address: I-0341h, E-zC01h, C-01h

|  |  |
|---|---|
| 7 (0) Not used: | Always reads 0 |
| 6 (0) Not used: | Always reads 0 |
| 5 (0) Not used: | Always reads 0 |
| 4 (0) CLRSTCNT: | When set to a one, both the SCSI Transfer-Counter (STCNT) and the Host Address Counter (SHADDR) are Reset to 0h. The hardware generates a clear pulse so this bit need not be toggled. This bit is always read back as zero. |
| 3 (0) SPIOEN: | When set to one, automatic PIO mode is enabled. This bit must remain set for the entire PIO transfer. The individual PIO transfers are triggered by reading or writing to register SCSIDAT depending on data direction and Target/Initiator Mode. Writing a zero to this bit stops any further PIO transfers without corrupting any valid data in register SCSIDAT. This bit may be left on even when in DMA mode since bit SCSIEN or bit SDMAEN override this bit. |
| 2 (0) Not used: | Always reads 0 |
| 1 (0) CLRCHN: | When set to a one, the SCSI FIFO (SCSI FIFO) and the Synchronous REQ/ACK Offset Counter, are cleared and the transfer control logic are reset to an initialized state. The SCSI transfer counters STCNT and SHADDR are not cleared. This is used to initialize the channel for a transfer. |
| 0 (0) Not used: | Always reads 0 |

SCSI Transfer Control 1 (SXFRCTL1)

Type: R/W
Address: I-0342h, E-zC02h, C-02h
See description under register SXFRCTL0.

|  |  |
|---|---|
| 7 (0) BITBUCKET: | SCSI Bit Bucket Mode Bit. When this bit is set to a one, it enables the SCSI logic to read data from the SCSI Bus and throw it away or supply 00h write data to the SCSI bus. No data is saved and no transfer stops occur because of SCSI FIFO full/empty conditions. This only applies while in Initiator Mode. |
| 6 (0) SWRAPEN: | When this bit is set to one, register STCNT is allowed to wrap past 0 to allow the transfer count to exceed a 24 bit value. The status bit SWRAP is set to one when the wrap occurs. If it is not the last wrap, clear the SWRAP status by writing a one to CLRSWRAP Control (bit 3, in register CLRSINT0) and wait for the next SWRAP interrupt. If it is the last wrap, clear SWRAP by setting bit CLRSWRAP (bit 3, in register CLRSINT0) and bit clear SWRAPEN, and then wait for SDONE Interrupt (bit 2, in register SSTAT0). |
| 5 (0) ENSPCHK: | When this bit is set to a one, parity checking is enabled on the SCSI Bus during selection, reselection, and information transfer cycles. If there exists a previous or current parity error condition, bit SCSIPERR (bit 3, in register SSTAT1) reflects this condition when this bit is set to one. When this bit is set to a zero, bit SCSIPERR always reads as a zero. |
| 4,3 (0) STIMESEL [1,0]: | These bits define the selection timeout time used by the hardware selection timer (SELTIMER). The selection timeout timer can be monitored via SELTIMER (bits 5-0) |

| Bit 4 3 | Time |
|---|---|
| 0 0 | 256 ms |
| 0 1 | 128 ms |
| 1 0 | 64 ms |

APPENDIX III

| | |
|---|---|
| | 1 1 - 32 ms |
| 2 (0) ENSTIMER: | When this bit is set to one, the hardware selection timer is enabled. During selection or reselection out, if the selection timer times out, bit SEL will be turned off, and bit SELTO is set to one in register SSTAT1. If this bit is set to zero, bit SEL remains on the bus until it is cleared by the sequencer. |
| 1 (0) Not used: | Always reads 0 |
| 0 (0) Not used: | Always reads 0 |

SCSI Control Signal Write Register (SCSISIGO)

Type: W
Address: I-0343h, E-zC03h, C-03h

The write register SCSISIGO allows the sequencer to set the state of the SCSI Bus control signals. However, only those control signals appropriate to the current mode (Target or Initiator) are enabled onto the SCSI Bus. The most significant three bits (CDO, IOO, and MSGO) are used for SCSI Bus phase comparison in Initiator mode. All bits are cleared by Chip reset, SCSI Bus Reset, or SCSI Bus Free.

| | |
|---|---|
| 7 (0) CDO: | In Target mode, C/D on the SCSI Bus is set to reflect the state of this bit. In Initiator mode, this bit is set to the state of C/D expected on the next REQ pulse. |
| 6 (0) IOO: | In Target mode, I/O on the SCSI Bus is set to reflect the state of this bit. In Initiator mode, this bit is set to the state of I/O expected on the next REQ pulse. |
| 5 (0) MSGO: | In Target mode, MSG on the SCSI Bus is set to reflect the state of this bit. In Initiator mode, this bit is set to the state of MSG expected on the next REQ pulse. |
| 4 (0) ATNO: | In Target mode, this bit is not used. In Initiator mode, writing one to this bit sets ATN on the SCSI Bus. Writing a zero to this bit has no effect on ATN. ATN may be cleared by writing one to bit CLRATNO (bit 6 in register CLRSINT1). |
| 3 (0) SELO: | In either Target or Initiator mode, SEL on the SCSI Bus is set to reflect the state of this bit. |
| 2 (0) BSYO: | In either Target or Initiator mode, BSY on the SCSI Bus is set to reflect the state of this bit. |
| 1 (0) REQO: | In Target mode, REQ on the SCSI Bus is set to reflect the state of this bit. This bit is not functional in Initiator mode. |
| 0 (0) ACKO: | In Initiator mode, ACK on the SCSI Bus is set to reflect the state of this bit. This bit is not functional in Target mode. |

SCSI Control Signal Read Register (SCSISIGI)

Type: R
Address: I-0343h, E-zC03h, C-03h

Register SCSISIGI reads the actual state of the Signals on the SCSI Bus pins.

| | |
|---|---|
| 7 (x) CDI: | Reads the state of the C/D signal on the SCSI Bus. |
| 6 (x) IOI: | Reads the state of the I/O signal on the SCSI Bus. |
| 5 (x) MSGI: | Reads the state of the MSG signal on the SCSI Bus. |
| 4 (x) ATNI: | Reads the state of the ATN signal on the SCSI Bus. |
| 3 (x) SELI: | Reads the state of the SEL signal on the SCSI Bus. |
| 2 (x) BSYI: | Reads the state of the BSY signal on the SCSI Bus. |
| 1 (x) REQI: | Reads the state of the REQ signal on the SCSI Bus. |
| 0 (x) ACKI: | Reads the state of the ACK signal on the SCSI Bus. |

SCSI Rate Control (SCSIRATE)

Type: R/W
Address: I-0344h, E-zC04h, C-04h

The contents of this register determine the Synchronous SCSI data transfer rate and the maximum synchronous Req/Ack offset. An offset value of 0 in bits SOFS (3:0) disables synchronous data transfers. Any offset value greater than 0 enables synchronous transfers.

| | |
|---|---|
| 7 (0) WIDEXFER: | When bit SELWIDE (bit 1, in register SBLKCTL) is one and this bit is set, 16 bit data transfers take place during the Data Phase. If zero, 8 bit transfers take place even though bit SELWIDE is one. If bit SELWIDE is 0 this bit is ignored. |
| 6-4 (0) SXFR[2:0]: | Synchronous SCSI Transfer Rate 2:0. These bits select the transfer rate as shown below. Times are shown for a 40MHz clock. These bits have no effect unless in Data Phase. |
| 3-0 (0) SOFS[3:0]: | SCSI Offset. When these bits are set to 0000 the SCSI Transfer Mode is Asynchronous. When these bits are set to any other value the Transfer Mode is Synchronous with the indicated offset. Valid ranges besides 0000 are 0001 through 1000 for 16 bit transfers and 0001 through 1111 for 8 bit transfers. This field only applies to Data Phases. This bit should be set up properly per the SCSI Device synchronous negotiation since the Target could force a Data Phase even though a different phase may be expected. |

| SXFR | REQ/ACK Width | REQ/ACK Period | Rate |
|---|---|---|---|
| 000 | 50 nsec (2T) | 100 nsec (4T) | 10 MHz |
| 001 | 50 nsec (2T) | 125 nsec (5T) | 8.0 MHz |
| 010 | 50 nsec (2T) | 150 nsec (6T) | 6.7 MHz |
| 011 | 50 nsec (2T) | 175 nsec (7T) | 5.7 MHz |
| 100 | 100 nsec (4T) | 200 nsec (8T) | 5.0 MHz |
| 101 | 100 nsec (4T) | 225 nsec (9T) | 4.4 MHz |
| 110 | 100 nsec (4T) | 250 nsec (10T) | 4.0 MHz |
| 111 | 100 nsec (4T) | 275 nsec (11T) | 3.6 MHz |

Note: For transfer rates below 3.6 B/S use Asynchronous transfer mode.

SCSI ID (SCSIID)

Type: R/W
Address: I-0345h, E-zC05h, C-05h

185

This register contains the ID of the currently active cell and the ID of the SCSI device that you want to communicate with.

| | |
|---|---|
| 7-4 (0) TID[3:0]: | Other ID bits. These bits are the other device's ID on the SCSI Bus during any selection/ reselection sequence. These bits are the other Target ID during Selection Out (ENSELO=1, TEMODEO=0) and Reselection In (ENRSELI). These bits are the Other Initiator during Selection In (ENSELI) and Reselection Out (ENSELO, TEMODEO=1). In any case, these bits are the other device's ID. |
| 3-0 (0) OID[3:0]: | Own ID bits. These bits are your own device ID on the SCSI Bus during any type of selection/ reselection sequence. These bits are your own Initiator ID during Selection Out (ENSELO=1, TEMODEO=0) and Reselection In (ENRSELI). These bits are your own Target ID during Selection In (ENSELI) and Reselection Out (ENSELO, TEMODEO=1). In any case, these bits are this device's ID. |

Selection/Reselection ID (SELID)

| | |
|---|---|
| Type: | R |
| Address: | I-0359h, E-zC19h, C-19h |
| 7-4 (0) SELID (3-0): | These bits are the ID of the selecting or reselecting SCSI device. |
| 3 (0) ONEBIT: | Only one bit detected on the SCSI bus in the last selection or reselection in phase. |
| 2 (0) Not Used: | |
| 1 (0) Not Used: | |
| 0 (0) Not Used: | |

SCSI Latched Data (SCSIDATL, [H])

| | |
|---|---|
| Type: | R/W |
| Address: | I-0346/0347h, E-zC06/zC07h, C-06/07h |

This is a read/write latch used to transfer data on the SCSI Bus during Automatic or Manual SCSI PIO Transfer. Bit 7 is the MSB. These registers are used in both 8 bit and 16 bit data transfer modes. In 8 bit mode, data is written to or read from SCSIDATL only. The SCSI ACK (as Initiator) or REQ (as Target) is driven active when the write or read occurs. In 16 bit mode, SCSIDATH should be written to or read from before SCSIDATL. Direct access to the SCSI Bus is provided via read of SCSIBUS Register. The initial read value after a chip reset is unknown. Valid data will be loaded after the first REQ/ACK In.

SCSI Transfer Count (STCNT(n))

| | |
|---|---|
| Type: | R/W |
| Address: | I-0348/0349/034Ah, E-zC08/zC09/zC0Ah, C-08/09/0Ah |

These registers contain the DMA or automatic PIO byte transfer count on the SCSI Interface. Register STCNT0 is the least significant byte. Register STCNT1 is the middle byte. Register STCNT2 is the most significant byte. Loading 00000h gives a byte transfer count of 16777216 decimal (16M Hex) if bit SWRAPEN (bit 6, in register SXFRCTL1) is set, and gives a transfer count of 0 if bit SWRAPEN is cleared. The byte transfer count is decremented for each SCSI byte transferred when either bit SDMAEN, bit SPIOEN or bit SCSIEN is set and there is either a non-zero byte transfer count or a zero byte transfer count with SWRAPEN set. Bit SDONE (bit 2, in register SSTAT0) is

186 set when the value of register STCNT equals 000000h. A byte is considered transferred when the associated handshake has occurred on the SCSI Bus (REQ/ACK) in the write direction, or when the byte has been written to the data FIFO circuit 60 in the read direction. Two separate counters are maintained to accomplish this. The sense of the DIRECTION input signal dictates which counter is actually accessed when reading this register. Bit SWRAP is set when bit SWRAPEN is set and the transfer counter counts from 000000h to FFFFFFh. Bit SWRAP should then be cleared via bit CLRSWRAP (bit 3, in register CLRSINT0) before the next wrap (that time is 16M times the SCSI Bus transfer period). The sequencer must keep track of the number of wraps. The byte transfer count is set to zero on a chip reset.

Clear SCSI Interrupt Register 0 (CLRSINT0)

| | |
|---|---|
| Type: | W |
| Address: | I-034Bh, E-zC0Bh, C-0Bh |

Writing a one to a bit in this register clears the associated SCSI interrupt bit in register SSTAT0. Each bit is self clearing and writing a zero to any bit in this register has no effect.

| | | | |
|---|---|---|---|
| 7 | (0) | Not Used: | Always reads 0. |
| 6 | (0) | CLRSELDO: | Clears the SELDO interrupt and status. |
| 5 | (0) | CLRSELDI: | Clears the SELDI interrupt and status. |
| 4 | (0) | CLRSELINGO: | Clears the SELINGO interrupt and status. |
| 3 | (0) | CLRSWRAP: | Clears SWRAP interrupt and status. |
| 2 | (0) | Not Used: | Always reads 0. |
| 1 | (0) | CLRSPIORDY: | Clears SPIORDY interrupt and status. |
| 0 | (0) | Not Used: | Always reads 0. |

SCSI Status Register 0 (SSTAT0)

| | |
|---|---|
| Type: | R |
| Address: | I-034Bh, E-zC0Bh, C-0Bh |

This register contains the SCSI status/interrupt bits. Any status bit may be read at any time whether or not it has been enabled in register SIMODE0. If a status bit is set to one and the corresponding interrupt bit is enabled the SCSIINT interrupt line is driven to the active state (except TARGET which is a status bit only).

| | | | |
|---|---|---|---|
| 7 | (0) | TARGET: | When this bit is one, it signals that you are a Target. It is only valid after a selection or reselection has completed and before bus free. |
| 6 | (0) | SELDO: | This bit is set to a one when a Select Out or a Reselect Out Sequence has been successfully done. Bit TARGET decides whether it was Select (TARGET=0) or Reselect (TARGET=1). This bit is cleared by a Bus Free condition or by setting bit CLRSELDO (bit 6, in register CLRSINT0). If after a successful selection out, the Target unexpectedly goes Bus Free, another Selection Out sequence is started if bit ENSELO is still a one. Interrupts may be enabled by setting bit ENSELDO (bit 6, in register SIMODE0) to one. |
| 5 | (0) | SELDI: | This bit is set to a one when you have been selected or reselected. If bit TARGET is a one, you have been selected, and if zero, you have been reselected. This bit is cleared by a Bus Free condition or by setting bit |

| | | | |
|---|---|---|---|
| 4 | (0) | SELINGO: | After successful arbitration, this bit is set to a one when starting the attempt to select or reselect another device. This interrupt is used to start looking for bit SELDO or Bus Timeout. When a successful selection has been completed (bit SELDO is one), this bit is cleared. This bit may also be cleared by setting bit CLRSELINGO (bit 4, in register CLRSINT0). |
| 3 | (0) | SWRAP: | This bit is set to one when register STCNT counts from 000000h to FFFFFFh and bit SWRAPEN is set. Bit SWRAPEN (bit 6 in register SXFRCTL1) must be set to enable the counter to count down past 000000h. Bit SWRAP is also set if bit SDMAEN is set to one, and both registers are equal to zero and bit SWRAPEN is one. This bit may be cleared by setting bit CLRSWRAP (bit 3, in register CLRSINT0). |
| 2 | (0) | SDONE: | This bit is set to one when register STCNT equals 000000h, and bit SWRAPEN is zero, bit or bit SPIOEN is set, and the transfer has completed (last ACK has gone out). This bit may be cleared by writing a non-zero count to register STCNT, setting bit SWRAPEN, or by clearing bit SDMAEN and bit SPIOEN. Bit SCSIEN (bit 5, in register DFCNTRL) should be cleared before this bit is cleared to prevent false transfers. |
| 1 | (0) | SPIORDY: | This bit is one when Automatic PIO has been enabled and data is ready from or needed by the SCSI data transfer logic. As an initiator, this bit is set to one by the leading edge of REQ. In target mode, this bit is set by the leading edge of ACK. In both initiator and target mode, during a transfer to the SCSI bus, this bit is cleared on a write to register SCSIDATL. During a transfer from the SCSI bus, this bit is cleared on a read from register SCSIDATL. This bit may also be cleared by setting bit CLRSPIORDY (bit 1, in register CLRSINT0) or by clearing bit SPIOEN (bit 3, in register SXFRCTL0). |
| 0 | (0) | DMADONE: | This bit is the logical AND of bit SDONE (bit 2, in register SSTAT0) and input signal HDONE. It indicates that current transfer has completely finished. |

Clear SCSI Interrupt 1 (CLRSINT1)

Type: W
Address: I-034Ch, E-zC0Ch, C-0Ch

Writing a one to a bit in this register clears the associated SCSI interrupt bit in register SSTAT1. Each bit is self clearing and writing a zero to any bit in this register has no effect.

| | | | |
|---|---|---|---|
| 7 | (0) | CLRSELTIMO: | Clears the SELTO interrupt and status. |
| 6 | (0) | CLRATNO: | In initiator mode, clears the SCSI ATN bit if set by the Sequencer or any automatic mode. ATN is also cleared by the BUS FREE condition. In Target mode, clears ATNTARG interrupt and status. |
| 5 | (0) | CLRSCSIRSTI: | Clears SCSIRSTI interrupt and status. |
| 4 | (0) | Not Used | |
| 3 | (0) | CLRBUSFREE: | Clears BUSFREE interrupt and status. |
| 2 | (0) | CLRSCSIPERR: | Clears previously latched SCSIPERR interrupt and status but not any current status. |
| 1 | (0) | CLRPHASECHG: | Clears PHASECHG interrupt and status. |
| 0 | (0) | CLRREQINIT: | Clears REQINIT interrupt and status. |

SCSI Status 1 (SSTAT1)

Type: R
Address: I-034Ch, E-zC0Ch, C-0Ch

This register contains the status of SCSI interrupt bits. Any interrupt bit may be read at any time whether or not it has been enabled in SIMODE1. If enabled and set to one, it will cause the interrupt line to go to the active state. All interrupt bits are cleared by the corresponding bits in CLRSINT1 Register (except PHASEMIS).

| | | | |
|---|---|---|---|
| 7 | (0) | SELTO: | This bit is set when the hardware selection timer is enabled and a selection or reselection timeout occurs. The timer is enabled by setting ENSTIMER (bit 2, SXFRCTL1) to one along with the timeout value in bits 3 and 4. This bit is cleared by setting CLRSELTIMO in CLRSINT1 to one. |
| 6 | (0) | ATNTARG: | This bit is set to a one when you are a Target and the Initiator asserts ATN. It is latched and will be cleared when ATN is deasserted or when CLRATNO is set. |
| 5 | (0) | SCSIRSTI: | This bit is set to a one when another device asserts RST on the SCSI Bus. It remains set until cleared by writing a one to CLRSCSIRSTI in CLRSINT1. |
| 4 | (0) | PHASEMIS: | Initiator Mode only bit. This bit is set to a one when the phase on the SCSI Bus sampled by REQ (the last REQ) does not match expected phase contained in the SCSISIGO Register. It is qualified with REQINIT (bit 0, SSTAT1) and is cleared by writing the matching phase in SCSISIGO. It can also be cleared by clearing REQINIT. |
| 3 | (0*) | BUSFREE: | This bit is set to a one when the BSY and SEL signals have been negated on the SCSI Bus for 400 ns. This signal is latched and may be cleared by setting CLRBUSFREE in CLRSINT1 to one. |

\* = State of SCSI Bus Upon Reset

| | | | |
|---|---|---|---|
| 2 | (0) | SCSIPERR: | This bit is set to a one when a parity error is detected on the incoming SCSI Information transfer. Parity is sampled on the leading edge of REQ if in Initiator mode or the leading edge of ACK if in Target mode. If WIDEXFER in SXFRCTL0 is set, then parity will be checked on the upper byte of the SCSI bus during the Data Phase only. If parity is enabled (ENSPCHK in SXFRCTL1 is set to one), a parity error will cause a one to be latched in this bit until cleared by writing one to CLRSCSIPERR in CLRSINT1. After writing to CLRSCSIPERR, this bit reflects the status of the parity of the current valid byte on the bus. If ENSPCHK is set to zero, this bit will always be read as a zero. |
| 1 | (0) | PHASECHG: | This bit is set to a one when the phase on the SCSI bus changes to a |

-continued

| | | | |
|---|---|---|---|
| | | | phase that does not match the expected phase contained in the SCSISIGO register. It is not qualified with REQ. This bit can be cleared by writing a one to CLRPHASECHG in CLRSINT1. |
| 0 | (0) | REQINIT: | Initiator Mode Only bit. This bit is set to a one on the leading edge of a REQ being asserted on the SCSI Bus. It is cleared on the leading edge of any ACK sent out on the SCSI bus or with CLRREQINIT. |

SCSI Status 2 (SSTAT2)

Type: R
Address: I-034Dh, E-zC0Dh, C-0Dh

These bits are read only and give the status of the SCSI FIFO.

| | | | |
|---|---|---|---|
| 7 | (0) | OVERRUN: | During Synchronous transfers this bit is set to one when an offset over-run is detected in the read direction for Initiator mode only. An offset over-run is defined as the situation where the maximum offset has been reached and another REQ comes in before an ACK is sent out. Once set, this can be cleared with CLRCHN (bit 1, SXFRCTL0). |
| 6-5 | (0) | Not Used | |
| 4-0 | (0) | SFCNT[4:0] - | SCSI FIFO Byte Count 0-16 (000000-100000). |

SCSI Status 3 (SSTAT3)

Type: R
Address: I-034Eh, E-zC0Eh, C-0Eh

This register is the status of the current Synchronous SCSI Information Transfer Phase.

| | | | |
|---|---|---|---|
| 7-4 | (0) | SCSICNT[3:0]: | Gives the difference between what the offset count says is in the SCSI FIFO and what the FCNT says is in the SCSI FIFO. Used by hardware to prevent SCSI FIFO overrun. Do not read this counter unless transfers are stopped. |
| 3-0 | (0) | OFFCNT[3:0]: | Gives the current SCSI Offset count. Do not read this counter unless transfers are stopped. |

SCSI Test Control (SCSITEST)

Type: W/R
Address: I-034Fh, E-zC0Fh, C-0Fh

This register is used to force test modes in the SCSI Module Logic.

| | | | |
|---|---|---|---|
| 7-3 | (x) | Not Used | |
| 2 | (0) | RQAKCNT: | For test purposes, this bit inverts the meaning of the DIRECTION input signal for STCNT. If DIRECTION=1 (write) and this bit is set then reading the STCNT register will access the STCNT counter instead of RQAKCNT. If DIRECTION=0 (read) and this bit is set then reading the STCNT register will access the RQAKCNT counter instead of STCNT. |
| 1 | (0) | CNTRTEST: | When this bit is set to a one the SCSI transfer counter STCNT and the Selection time-out counter SELTIMER are put into a mode where they count down at the input clock rate and the SCSI host address counter SHADDR is put into a mode where it counts up at the input clock rate. |
| 0 | (0) | CMODE: | When this bit is set to a one, it forces a stage to stage carry true in STCNT, SHADDR, and SELTIMER. During the Transfer count test, the counter contents can be monitored by reading the desired stage. |

SCSI Interrupt Mode 0 (SIMODE0)

Type: R/W
Address: I-0350h, E-zC10h, C-10h

Setting any bit will enable the corresponding status bit in SSTAT0 to generate a SCSIINT interrupt.

| | | | |
|---|---|---|---|
| 7 | (0) | Not Used - | Always reads 0 |
| 6 | (0) | ENSELDO: | Enables SELDO status to assert SCSIINT. |
| 5 | (0) | ENSELDI: | Enables SELDI status to assert SCSIINT. |
| 4 | (0) | ENSELINGO: | Enables SELINGO status to assert SCSIINT. |
| 3 | (0) | ENSWRAP: | Enables SWRAP status to assert SCSIINT. |
| 2 | (0) | ENSDONE: | Enables SDONE status to assert SCSIINT. |
| 1 | (0) | ENSPIORDY: | Enables SPIORDY status to assert SCSIINT. |
| 0 | (0) | ENDMADONE: | Enables DMADONE status to assert SCSIINT. |

SCSI Interrupt Mode 1 (SIMODE1)

Type: R/W
Address: I-0351h, E-zC11h, C-11h

Setting any bit will enable the corresponding status bit in SSTAT1 to generate a SCSIINT interrupt.

| | | | |
|---|---|---|---|
| 7 | (0) | ENSELTIMO: | Enables the SELTO status to assert SCSIINT. |
| 6 | (0) | ENATNTARG: | Enables ATNTARG status to assert SCSIINT. |
| 5 | (0) | ENSCSIRST: | Enables SCSIRST status to assert SCSIINT. |
| 4 | (0) | ENPHASEMIS: | Enables PHASEMIS status to assert SCSIINT. |
| 3 | (0) | ENBUSFREE: | Enables BUSFREE status to assert SCSIINT. |
| 2 | (0) | ENSCSIPERR: | Enables the latched SCSIPERR status to assert SCSIINT. |
| 1 | (0) | ENPHASECHG: | Enables PHASECHG status to assert SCSIINT. |
| 0 | (0) | ENREQINIT: | Enables REQINIT status to assert SCSIINT. |

SCSI Data Bus 1 (SCSIBUSL,[H])

Type: R
Address: I-0352/0353h, E-zC12/zC13h, C-12/13h

This register reads data on the SCSI Data Bus directly. Data is gated from the SCSI data bus to the internal data bus, it is not latched in the SCSI Module. The initial state of these registers is unknown (X) since the initial state of the SCSI Bus is unknown.

SCSI/Host Address (SHADDR(n))

Type: R
Address: I-0354/0355/0356/0357h, E-zC14/zC15/zC16/zC17h, C-14/15/16/17h

These registers reflect the state of the host address pointer according to the number of bytes transferred across the SCSI bus. They are counted up with SCSI ACKs when the expected phase matches the SCSI phase. This value should be saved when the Save Data Pointers message is received. These registers will be set to zero on a reset.

Selection Timeout Timer (SELTIMER)

Type: R
Address: I-0358h, E-zC18h, C-18h

This register is used to monitor the state of the hardware selection timeout timer.

| Bit | | |
|---|---|---|
| 7-6 (0) | Not Used | |
| 5 (0) | Stage 6( /2, output) | |
| 4 (0) | Stage 5( /2, output) | |
| 3 (0) | Stage 4( /2, output) | |
| 2 (0) | Stage 3( /10, output) | |
| 1 (0) | Stage 2( /256, output) | |
| 0 (0) | Stage 1( /256, output). | |

SCSI Block Control (SBLKCTL)

Type: R/W
Address: I-035Fh, E-zC1Fh, C-1Fh

This register controls the hardware selection options outside of the SCSI cells. This control includes address decodes and data multiplexing.

| Bit | Name | Description |
|---|---|---|
| 7-4 (0) | Not Used: | Always reads 0 |
| 3 (*) | SELBUS1: | When this bit is set, SCSI channel 1 is selected. Device addresses 00h-1Eh reflect the channel 1 registers. When this bit is cleared, addresses 00h-1Eh reflect channel 0 registers. If SELWIDE (bit 1, this register) is set to one, this bit will be cleared. |
| 2 (0) | Not Used: | Always reads 0 |
| 1 (*) | SELWIDE: | When this bit is set, the internals of the device are configured for 1 sixteen bit Wide SCSI channel. The SCSI data lines of channel 1 are gated to the upper lines of channel 0. It is expected that the external bus is Wide. When this bit is cleared, the device is configured for 2 eight bit channels. |
| 0 (0) | Not Used: | Always reads 0 |

*Note:
SELBUS will be set to zero on reset if MSG-=0 & BSY-=1 on the Channel 1 SCSI Bus, otherwise it will be set to one. SELWIDE will be set to one on reset if CD-=0 and BSY-=1 on the Channel 1 SCSI Bus, otherwise it will be set to zero.

SCSI/Host Address (SHADDR(n))

Type: W
Address: I-1348/1349/134A/134Bh, E-zC88/zC89/ZC8A/zCBh, C-88/89/8A/8Bh

These registers reflect the state of the host address pointer according to the number of bytes transferred across the SCSI bus. They are counted up in the same manner that STCNT is counted down. This value is saved when the Save Data Pointers message is received. These registers are loaded automatically when the Host address registers (HADDR) are written.

We claim:

1. In an integrated circuit for using with an EISA computer bus having a signal START and a signal CMD when said signals START and CMD may overlap, a host comprising:
   an EISA bus interface having:
      an EISA start signal line wherein said EISA start signal line receives said signal START from said EISA computer bus;
      an EISA CMD signal line wherein said EISA CMD signal line receives said signal CMD from said EISA computer bus;
      a deskew circuit connected to said EISA start signal line and to said EISA CMD line, and having an output line wherein said deskew circuit receives said signals CMD and START as input signals on said EISA CMD signal line and said EISA CMD line, respectively, and generates an output signal on said output line that is the first of said signals CMD and START to be input to said deskew circuit thereby preventing overlap of said signals CMD and START within said host interface module.

* * * * *